US010951310B2

(12) United States Patent
Aoyama et al.

(10) Patent No.: US 10,951,310 B2
(45) Date of Patent: Mar. 16, 2021

(54) COMMUNICATION METHOD, COMMUNICATION DEVICE, AND TRANSMITTER

(71) Applicant: PANASONIC INTELLECTUAL PROPERTY CORPORATION OF AMERICA, Torrance, CA (US)

(72) Inventors: Hideki Aoyama, Osaka (JP); Mitsuaki Oshima, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/370,764

(22) Filed: Mar. 29, 2019

(65) Prior Publication Data

US 2019/0334619 A1 Oct. 31, 2019

Related U.S. Application Data

(63) Continuation-in-part of application No. 15/843,790, filed on Dec. 15, 2017, now Pat. No. 10,530,486, (Continued)

(30) Foreign Application Priority Data

Dec. 27, 2012 (JP) ............................ JP2012-286339
Mar. 28, 2013 (JP) ............................ JP2013-070740
(Continued)

(51) Int. Cl.
*H04B 10/116* (2013.01)
*G06T 7/13* (2017.01)
(Continued)

(52) U.S. Cl.
CPC .......... *H04B 10/116* (2013.01); *G06F 3/017* (2013.01); *G06K 9/2054* (2013.01); *G06T 7/13* (2017.01); *G06T 2207/10016* (2013.01)

(58) Field of Classification Search
CPC . G06T 7/13; G06T 2207/10016; G06F 3/017; G06K 9/2054; H04B 10/116
See application file for complete search history.

(56) References Cited

U.S. PATENT DOCUMENTS 4,807,031 A 2/1989 Broughton et al.
4,812,909 A 3/1989 Yokobayashi et al.
(Continued)

FOREIGN PATENT DOCUMENTS

AU 2007253450 11/2007
CN 2187863 1/1995
(Continued)

OTHER PUBLICATIONS

Office Action dated Jun. 28, 2019 in U.S. Appl. No. 16/380,190.
(Continued)

*Primary Examiner* — Yu Chen
(74) *Attorney, Agent, or Firm* — Greenblum & Bernstein, P.L.C.

(57) ABSTRACT

A communication method including: determining whether a terminal is capable of performing visible light communication; when the terminal is determined to be capable of performing the visible light communication, obtaining a decode target image by an image sensor capturing a subject whose luminance changes, and obtaining, from a striped pattern appearing in the decode target image, first identification information transmitted by the subject; and when the terminal is determined to be incapable of performing the visible light communication in the determining pertaining to the visible light communication, obtaining a captured image
(Continued)

by the image sensor capturing the subject, specifying a predetermined specific region by performing edge detection on the captured image, and obtaining, from a line pattern in the specific region, second identification information transmitted by the subject.

18 Claims, 226 Drawing Sheets

Related U.S. Application Data which is a continuation-in-part of application No. 15/381,940, filed on Dec. 16, 2016, now Pat. No. 10,303,945, which is a continuation-in-part of application No. 14/973,783, filed on Dec. 18, 2015, now Pat. No. 9,608,727, which is a continuation-in-part of application No. 14/582,751, filed on Dec. 24, 2014, now Pat. No. 9,608,725, which is a continuation-in-part of application No. 14/142,413, filed on Dec. 27, 2013, now Pat. No. 9,341,014.

(60) Provisional application No. 62/808,560, filed on Feb. 21, 2019, provisional application No. 62/806,977, filed on Feb. 18, 2019, provisional application No. 62/558,629, filed on Sep. 14, 2017, provisional application No. 62/467,376, filed on Mar. 6, 2017, provisional application No. 62/466,534, filed on Mar. 3, 2017, provisional application No. 62/457,382, filed on Feb. 10, 2017, provisional application No. 62/446,632, filed on Jan. 16, 2017, provisional application No. 62/434,644, filed on Dec. 15, 2016, provisional application No. 62/338,071, filed on May 18, 2016, provisional application No. 62/276,454, filed on Jan. 8, 2016, provisional application No. 62/251,980, filed on Nov. 6, 2015, provisional application No. 62/028,991, filed on Jul. 25, 2014, provisional application No. 62/019,515, filed on Jul. 1, 2014, provisional application No. 61/904,611, filed on Nov. 15, 2013, provisional application No. 61/896,879, filed on Oct. 29, 2013, provisional application No. 61/895,615, filed on Oct. 25, 2013, provisional application No. 61/872,028, filed on Aug. 30, 2013, provisional application No. 61/859,902, filed on Jul. 30, 2013, provisional application No. 61/810,291, filed on Apr. 10, 2013, provisional application No. 61/805,978, filed on Mar. 28, 2013, provisional application No. 61/746,315, filed on Dec. 27, 2012.

(30) Foreign Application Priority Data

| | | |
|---|---|---|
| Apr. 10, 2013 | (JP) | JP2013-082546 |
| May 24, 2013 | (JP) | JP2013-110445 |
| Jul. 30, 2013 | (JP) | JP2013-158359 |
| Aug. 30, 2013 | (JP) | JP2013-180729 |
| Oct. 25, 2013 | (JP) | JP2013-222827 |
| Oct. 29, 2013 | (JP) | JP2013-224805 |
| Nov. 15, 2013 | (JP) | JP2013-237460 |
| Nov. 22, 2013 | (JP) | JP2013-242407 |
| Sep. 19, 2014 | (JP) | JP2014-192032 |
| Nov. 14, 2014 | (JP) | JP2014-232187 |
| Dec. 19, 2014 | (JP) | JP2014-258111 |
| Feb. 17, 2015 | (JP) | JP2015-029096 |
| Feb. 17, 2015 | (JP) | JP2015-029104 |
| Dec. 17, 2015 | (JP) | JP2015-245738 |
| May 18, 2016 | (JP) | JP2016-100008 |
| Jun. 21, 2016 | (JP) | JP2016-123067 |
| Jul. 25, 2016 | (JP) | JP2016-145845 |
| Nov. 10, 2016 | (JP) | JP2016-220024 |
| Apr. 14, 2017 | (JP) | JP2017-080595 |
| Apr. 14, 2017 | (JP) | JP2017-080664 |
| Nov. 9, 2017 | (JP) | JP2017-216264 |
| Mar. 30, 2018 | (JP) | JP2018-066406 |
| Apr. 24, 2018 | (JP) | JP2018-083454 |
| Nov. 1, 2018 | (JP) | JP2018-206923 |
| Mar. 8, 2019 | (JP) | JP2019-042442 |

(51) Int. Cl.
*G06F 3/01* (2006.01)
*G06K 9/20* (2006.01)

(56) References Cited

U.S. PATENT DOCUMENTS

| | | | | |
|---|---|---|---|---|
| 5,484,998 | A | 1/1996 | Bejnar et al. | |
| 5,734,328 | A | 3/1998 | Shinbori | |
| 5,765,176 | A | 6/1998 | Bloomberg | |
| 5,822,310 | A | 10/1998 | Chennakeshu et al. | |
| 5,974,348 | A | 10/1999 | Rocks | |
| 6,062,481 | A | 5/2000 | Storch et al. | |
| 6,345,104 | B1 | 2/2002 | Rhoads | |
| 6,347,163 | B2 | 2/2002 | Roustaei | |
| 6,933,956 | B2 | 8/2005 | Sato et al. | |
| 7,308,194 | B2 | 12/2007 | Iizuka et al. | |
| 7,415,212 | B2 | 8/2008 | Matsushita et al. | |
| 7,429,983 | B2 | 9/2008 | Islam | |
| 7,502,053 | B2 | 3/2009 | Kagawa et al. | |
| 7,570,246 | B2 | 8/2009 | Maniam et al. | |
| 7,715,723 | B2 | 5/2010 | Kagawa et al. | |
| 7,728,893 | B2 | 6/2010 | Kagawa et al. | |
| 7,787,012 | B2 | 8/2010 | Scales et al. | |
| RE42,848 | E | 10/2011 | Sato et al. | |
| 8,054,357 | B2 | 11/2011 | Tay | |
| 8,093,988 | B2 | 1/2012 | Takene et al. | |
| 8,248,467 | B1 | 8/2012 | Ganick et al. | |
| 8,256,673 | B1 | 9/2012 | Kim | |
| 8,264,546 | B2 | 9/2012 | Witt | |
| 8,331,724 | B2 | 12/2012 | Rhoads | |
| 8,334,898 | B1 * | 12/2012 | Ryan | G01C 21/206 348/61 |
| 8,334,901 | B1 * | 12/2012 | Ganick | G01S 1/70 348/131 |
| RE44,004 | E | 2/2013 | Sato et al. | |
| 8,451,264 | B2 | 5/2013 | Yamaguchi et al. | |
| 8,493,483 | B2 | 7/2013 | Nishihara | |
| 8,493,485 | B2 | 7/2013 | Hirose | |
| 8,542,906 | B1 | 9/2013 | Persson et al. | |
| 8,550,366 | B2 | 10/2013 | Myodo et al. | |
| 8,571,217 | B2 | 10/2013 | Ishii et al. | |
| 8,587,680 | B2 | 11/2013 | Okumura et al. | |
| 8,594,840 | B1 | 11/2013 | Chiappetta et al. | |
| 8,634,725 | B2 | 1/2014 | Jang et al. | |
| 8,648,911 | B2 | 2/2014 | Okumura | |
| 8,720,779 | B2 | 5/2014 | Asami | |
| 8,731,301 | B1 | 5/2014 | Bushman et al. | |
| 8,749,470 | B2 | 6/2014 | Furihata et al. | |
| 8,780,342 | B2 | 7/2014 | DiBernardo et al. | |
| 8,823,852 | B2 | 9/2014 | Yamada et al. | |
| 8,908,074 | B2 | 12/2014 | Oshima et al. | |
| 8,913,144 | B2 | 12/2014 | Oshima et al. | |
| 8,922,666 | B2 | 12/2014 | Oshima et al. | |
| 8,953,072 | B2 | 2/2015 | Nishihara | |
| 8,965,216 | B2 | 2/2015 | Oshima et al. | |
| 8,994,841 | B2 | 3/2015 | Oshima et al. | |
| 9,058,764 | B1 | 6/2015 | Persson et al. | |
| 9,083,543 | B2 | 7/2015 | Oshima et al. | |
| 9,083,544 | B2 | 7/2015 | Oshima et al. | |
| 9,085,927 | B2 | 7/2015 | Oshima et al. | |
| 9,087,349 | B2 | 7/2015 | Oshima et al. | |
| 9,143,339 | B2 | 9/2015 | Oshima et al. | |
| 9,166,810 | B2 | 10/2015 | Oshima et al. | |

(56) References Cited

U.S. PATENT DOCUMENTS

| | | | |
|---|---|---|---|
| 9,184,838 | B2 | 11/2015 | Oshima et al. |
| 9,258,058 | B2 | 2/2016 | Oshima et al. |
| 9,277,154 | B2 | 3/2016 | Nishihara |
| 9,300,845 | B2 | 3/2016 | Oshima et al. |
| 9,380,227 | B2 | 6/2016 | Oshima et al. |
| 9,560,284 | B2 | 1/2017 | Oshima et al. |
| 9,608,725 | B2 | 3/2017 | Aoyama et al. |
| 1,030,394 | A1 | 5/2019 | Aoyama et al. |
| 2002/0018446 | A1 | 2/2002 | Huh et al. |
| 2002/0167701 | A1 | 11/2002 | Hirata |
| 2002/0171639 | A1 | 11/2002 | Ben-David |
| 2003/0026422 | A1 | 2/2003 | Gerheim et al. |
| 2003/0058262 | A1 | 3/2003 | Sato et al. |
| 2003/0067660 | A1 | 4/2003 | Oda et al. |
| 2003/0076338 | A1 | 4/2003 | Hashimoto |
| 2003/0171096 | A1 | 9/2003 | Ilan et al. |
| 2003/0193699 | A1 | 10/2003 | Tay |
| 2004/0101309 | A1 | 5/2004 | Beyette, Jr. et al. |
| 2004/0125053 | A1 | 7/2004 | Fujisawa |
| 2004/0137898 | A1 | 7/2004 | Crandell, Jr. et al. |
| 2004/0161246 | A1 | 8/2004 | Matsushita et al. |
| 2005/0018058 | A1 | 1/2005 | Aliaga et al. |
| 2005/0162584 | A1 | 7/2005 | Yamamoto et al. |
| 2005/0190274 | A1 | 9/2005 | Yoshikawa et al. |
| 2005/0265731 | A1 | 12/2005 | Keum et al. |
| 2006/0044741 | A1 | 3/2006 | Bussan |
| 2006/0056855 | A1 | 3/2006 | Nakagawa et al. |
| 2006/0145824 | A1 | 7/2006 | Frenzel et al. |
| 2006/0164533 | A1 | 7/2006 | Hsieh et al. |
| 2006/0171360 | A1 | 8/2006 | Kim et al. |
| 2006/0239675 | A1 | 10/2006 | Iizuka et al. |
| 2006/0239689 | A1 | 10/2006 | Ashdown |
| 2006/0242908 | A1 | 11/2006 | McKinney |
| 2007/0024571 | A1 | 2/2007 | Maniam et al. |
| 2007/0046789 | A1 | 3/2007 | Kirisawa |
| 2007/0058987 | A1 | 3/2007 | Suzuki |
| 2007/0070060 | A1 | 3/2007 | Kagawa et al. |
| 2007/0091055 | A1 | 4/2007 | Sakuda |
| 2007/0092264 | A1 | 4/2007 | Suzuki et al. |
| 2007/0126909 | A1 | 6/2007 | Kuruma |
| 2007/0222743 | A1 | 9/2007 | Hirakata |
| 2007/0273610 | A1 | 11/2007 | Baillot |
| 2007/0276590 | A1 | 11/2007 | Leonard et al. |
| 2008/0007512 | A1 | 1/2008 | Honbo |
| 2008/0018751 | A1 | 1/2008 | Kushida |
| 2008/0023546 | A1 | 1/2008 | Myodo et al. |
| 2008/0044188 | A1 | 2/2008 | Kagawa et al. |
| 2008/0048968 | A1 | 2/2008 | Okada et al. |
| 2008/0055041 | A1 | 3/2008 | Takene et al. |
| 2008/0063410 | A1 | 3/2008 | Irie |
| 2008/0074424 | A1 | 3/2008 | Carignano |
| 2008/0106608 | A1 | 5/2008 | Clark et al. |
| 2008/0122994 | A1 | 5/2008 | Cernasov |
| 2008/0180547 | A1 | 7/2008 | Hirose |
| 2008/0187318 | A1 | 8/2008 | Osanai |
| 2008/0205848 | A1 | 8/2008 | Kobayashi |
| 2008/0290988 | A1 | 11/2008 | Crawford |
| 2008/0297360 | A1 | 12/2008 | Knox et al. |
| 2008/0297615 | A1 | 12/2008 | Kagawa et al. |
| 2009/0002265 | A1 | 1/2009 | Kitaoka et al. |
| 2009/0033757 | A1 | 2/2009 | Shimada |
| 2009/0052902 | A1 | 2/2009 | Shinokura |
| 2009/0066689 | A1 | 3/2009 | Yamaguchi et al. |
| 2009/0129781 | A1 | 5/2009 | Irie |
| 2009/0135271 | A1 | 5/2009 | Kurane |
| 2009/0214225 | A1 | 8/2009 | Nakagawa et al. |
| 2009/0274381 | A1 | 11/2009 | Kirenko |
| 2009/0297156 | A1 | 12/2009 | Nakagawa et al. |
| 2009/0297157 | A1 | 12/2009 | Nakagawa |
| 2009/0297166 | A1 | 12/2009 | Nakagawa et al. |
| 2009/0297167 | A1 | 12/2009 | Nakagawa et al. |
| 2009/0310976 | A1 | 12/2009 | Nakagawa et al. |
| 2009/0317088 | A1 | 12/2009 | Niiho et al. |
| 2010/0020970 | A1 | 1/2010 | Liu et al. |
| 2010/0034540 | A1 | 2/2010 | Togashi |
| 2010/0107189 | A1 | 4/2010 | Steelberg et al. |
| 2010/0111538 | A1 | 5/2010 | Arita et al. |
| 2010/0116888 | A1 | 5/2010 | Asami |
| 2010/0129087 | A1 | 5/2010 | Kim et al. |
| 2010/0135669 | A1 | 6/2010 | Kim et al. |
| 2010/0157121 | A1 | 6/2010 | Tay |
| 2010/0164922 | A1 | 7/2010 | Nose et al. |
| 2010/0315395 | A1 | 12/2010 | Kang et al. |
| 2010/0328359 | A1 | 12/2010 | Inoue et al. |
| 2011/0002695 | A1 | 1/2011 | Choi et al. |
| 2011/0007160 | A1 | 1/2011 | Okumura |
| 2011/0007171 | A1 | 1/2011 | Okumura et al. |
| 2011/0019016 | A1 | 1/2011 | Saito et al. |
| 2011/0025730 | A1 | 2/2011 | Ajichi |
| 2011/0052214 | A1 | 3/2011 | Shimada et al. |
| 2011/0063510 | A1 | 3/2011 | Lee et al. |
| 2011/0064416 | A1 | 3/2011 | Rajagopal et al. |
| 2011/0069951 | A1* | 3/2011 | Son .................... H04B 10/1149 398/17 |
| 2011/0069971 | A1 | 3/2011 | Kim et al. |
| 2011/0080510 | A1 | 4/2011 | Nishihara |
| 2011/0096192 | A1 | 4/2011 | Niikura |
| 2011/0105134 | A1 | 5/2011 | Kim et al. |
| 2011/0135317 | A1 | 6/2011 | Chaplin |
| 2011/0150285 | A1 | 6/2011 | Kimura |
| 2011/0164881 | A1 | 7/2011 | Rajagopal et al. |
| 2011/0221779 | A1 | 9/2011 | Okumura et al. |
| 2011/0227827 | A1 | 9/2011 | Solomon et al. |
| 2011/0229147 | A1 | 9/2011 | Yokoi |
| 2011/0243325 | A1 | 10/2011 | Ishii et al. |
| 2011/0299857 | A1 | 12/2011 | Rekimoto |
| 2012/0032977 | A1 | 2/2012 | Kim et al. |
| 2012/0069131 | A1 | 3/2012 | Abelow |
| 2012/0076509 | A1 | 3/2012 | Gurovich et al. |
| 2012/0077431 | A1 | 3/2012 | Fyke et al. |
| 2012/0080515 | A1 | 4/2012 | van der Merwe |
| 2012/0133815 | A1 | 5/2012 | Nakanishi et al. |
| 2012/0155889 | A1 | 6/2012 | Kim et al. |
| 2012/0169605 | A1 | 7/2012 | Lin et al. |
| 2012/0188442 | A1 | 7/2012 | Kennedy |
| 2012/0206648 | A1 | 8/2012 | Casagrande et al. |
| 2012/0220311 | A1 | 8/2012 | Rodriguez et al. |
| 2012/0224743 | A1 | 9/2012 | Rodriguez et al. |
| 2012/0257082 | A1 | 10/2012 | Kato et al. |
| 2012/0281987 | A1 | 11/2012 | Schenk et al. |
| 2012/0320101 | A1 | 12/2012 | Goden et al. |
| 2012/0328302 | A1 | 12/2012 | Iizuka et al. |
| 2013/0109961 | A1 | 5/2013 | Bose et al. |
| 2013/0127980 | A1 | 5/2013 | Haddick et al. |
| 2013/0136457 | A1 | 5/2013 | Park et al. |
| 2013/0141555 | A1 | 6/2013 | Ganick et al. |
| 2013/0169663 | A1 | 7/2013 | Seong et al. |
| 2013/0170695 | A1 | 7/2013 | Anan et al. |
| 2013/0194457 | A1 | 8/2013 | Tanaka |
| 2013/0201369 | A1 | 8/2013 | Hirose |
| 2013/0212453 | A1 | 8/2013 | Gudai et al. |
| 2013/0249900 | A1 | 9/2013 | Lee et al. |
| 2013/0251374 | A1 | 9/2013 | Chen et al. |
| 2013/0251375 | A1 | 9/2013 | Ozaki et al. |
| 2013/0256422 | A1 | 10/2013 | Osborne et al. |
| 2013/0271631 | A1 | 10/2013 | Tatsuzawa et al. |
| 2013/0272717 | A1 | 10/2013 | Deguchi et al. |
| 2013/0299677 | A1 | 11/2013 | Nishihara |
| 2013/0317916 | A1 | 11/2013 | Gopalakrishnan et al. |
| 2013/0329440 | A1 | 12/2013 | Tsutsumi et al. |
| 2013/0330088 | A1 | 12/2013 | Oshima et al. |
| 2013/0335592 | A1 | 12/2013 | Yamada et al. |
| 2013/0337787 | A1 | 12/2013 | Yamada et al. |
| 2014/0010549 | A1 | 1/2014 | Kang |
| 2014/0022547 | A1 | 1/2014 | Knox et al. |
| 2014/0035952 | A1 | 2/2014 | Mikuni |
| 2014/0037296 | A1 | 2/2014 | Yamada et al. |
| 2014/0055420 | A1 | 2/2014 | Yokoi et al. |
| 2014/0079281 | A1 | 3/2014 | Williams et al. |
| 2014/0093238 | A1 | 4/2014 | Roberts |
| 2014/0093249 | A1 | 4/2014 | Roberts et al. |
| 2014/0117074 | A1 | 5/2014 | Kim |
| 2014/0125852 | A1 | 5/2014 | Baer et al. |
| 2014/0184883 | A1 | 7/2014 | Shimamoto |

(56) References Cited

U.S. PATENT DOCUMENTS

| | | | | |
|---|---|---|---|---|
| 2014/0184914 | A1 | 7/2014 | Oshima et al. | |
| 2014/0185860 | A1 | 7/2014 | Oshima et al. | |
| 2014/0186026 | A1 | 7/2014 | Oshima et al. | |
| 2014/0186047 | A1 | 7/2014 | Oshima et al. | |
| 2014/0186048 | A1 | 7/2014 | Oshima et al. | |
| 2014/0186049 | A1 | 7/2014 | Oshima et al. | |
| 2014/0186050 | A1 | 7/2014 | Oshima et al. | |
| 2014/0186052 | A1 | 7/2014 | Oshima et al. | |
| 2014/0186055 | A1 | 7/2014 | Oshima et al. | |
| 2014/0192185 | A1 | 7/2014 | Oshima et al. | |
| 2014/0192226 | A1 | 7/2014 | Oshima et al. | |
| 2014/0193162 | A1 | 7/2014 | Iizuka et al. | |
| 2014/0204129 | A1 | 7/2014 | Oshima et al. | |
| 2014/0205136 | A1 | 7/2014 | Oshima et al. | |
| 2014/0207517 | A1 | 7/2014 | Oshima et al. | |
| 2014/0212145 | A1 | 7/2014 | Oshima et al. | |
| 2014/0212146 | A1 | 7/2014 | Oshima et al. | |
| 2014/0232896 | A1 | 8/2014 | Oshima et al. | |
| 2014/0232903 | A1 | 8/2014 | Oshima et al. | |
| 2014/0270793 | A1 | 9/2014 | Bradford | |
| 2014/0286644 | A1 | 9/2014 | Oshima et al. | |
| 2014/0290138 | A1 | 10/2014 | Oshima et al. | |
| 2014/0294397 | A1 | 10/2014 | Oshima et al. | |
| 2014/0294398 | A1 | 10/2014 | Oshima et al. | |
| 2014/0307155 | A1 | 10/2014 | Oshima et al. | |
| 2014/0307156 | A1 | 10/2014 | Oshima et al. | |
| 2014/0307157 | A1 | 10/2014 | Oshima et al. | |
| 2014/0314420 | A1 | 10/2014 | De Bruijn et al. | |
| 2014/0321859 | A1 | 10/2014 | Guo et al. | |
| 2014/0354846 | A1* | 12/2014 | Muguruma ............ | H04N 5/369<br>348/222.1 |
| 2014/0376922 | A1 | 12/2014 | Oshima et al. | |
| 2015/0023673 | A1 | 1/2015 | Iizuka et al. | |
| 2015/0030335 | A1 | 1/2015 | Son et al. | |
| 2015/0050027 | A1 | 2/2015 | Oshima et al. | |
| 2015/0071439 | A1 | 3/2015 | Liu et al. | |
| 2015/0108330 | A1 | 4/2015 | Nishihara | |
| 2015/0160175 | A1 | 6/2015 | Knox et al. | |
| 2015/0235423 | A1 | 8/2015 | Tobita | |
| 2015/0249496 | A1 | 9/2015 | Muijs et al. | |
| 2015/0263807 | A1 | 9/2015 | Yamasaki | |
| 2016/0028478 | A1 | 1/2016 | Rietman et al. | |

FOREIGN PATENT DOCUMENTS

| | | |
|---|---|---|
| CN | 1702984 | 11/2005 |
| CN | 100340903 | 10/2007 |
| CN | 101088295 | 12/2007 |
| CN | 101099186 | 1/2008 |
| CN | 101105920 | 1/2008 |
| CN | 101159799 | 4/2008 |
| CN | 101350669 | 1/2009 |
| CN | 101355651 | 1/2009 |
| CN | 101358846 | 2/2009 |
| CN | 101395901 | 3/2009 |
| CN | 101432997 | 5/2009 |
| CN | 101490985 | 7/2009 |
| CN | 101647031 | 2/2010 |
| CN | 101710890 | 5/2010 |
| CN | 101751866 | 6/2010 |
| CN | 101959016 | 1/2011 |
| CN | 101960508 | 1/2011 |
| CN | 102006120 | 4/2011 |
| CN | 102036023 | 4/2011 |
| CN | 102053453 | 5/2011 |
| CN | 102224728 | 10/2011 |
| CN | 102654400 | 9/2012 |
| CN | 102679200 | 9/2012 |
| CN | 102684869 | 9/2012 |
| CN | 102739940 | 10/2012 |
| CN | 102811284 | 12/2012 |
| CN | 102842282 | 12/2012 |
| CN | 102843186 | 12/2012 |
| EP | 1912354 | 4/2008 |
| EP | 2503852 | 9/2012 |
| JP | 07-200428 | 8/1995 |
| JP | 2748263 | 2/1998 |
| JP | 2002-144984 | 5/2002 |
| JP | 2002-290335 | 10/2002 |
| JP | 2003-179556 | 6/2003 |
| JP | 2003-281482 | 10/2003 |
| JP | 2004-064465 | 2/2004 |
| JP | 2004-72365 | 3/2004 |
| JP | 2004-306902 | 11/2004 |
| JP | 2004-326241 | 11/2004 |
| JP | 2004-334269 | 11/2004 |
| JP | 2005-151015 | 6/2005 |
| JP | 2005-160119 | 6/2005 |
| JP | 2006-020294 | 1/2006 |
| JP | 2006-092486 | 4/2006 |
| JP | 2006-121466 | 5/2006 |
| JP | 2006-227204 | 8/2006 |
| JP | 2006-237869 | 9/2006 |
| JP | 2006-319545 | 11/2006 |
| JP | 2006-340138 | 12/2006 |
| JP | 2007-19936 | 1/2007 |
| JP | 2007-036833 | 2/2007 |
| JP | 2007-043706 | 2/2007 |
| JP | 2007-049584 | 2/2007 |
| JP | 2007-060093 | 3/2007 |
| JP | 2007-082098 | 3/2007 |
| JP | 2007-096548 | 4/2007 |
| JP | 2007-124404 | 5/2007 |
| JP | 2007-189341 | 7/2007 |
| JP | 2007-201681 | 8/2007 |
| JP | 2007-221570 | 8/2007 |
| JP | 2007-228512 | 9/2007 |
| JP | 2007-248861 | 9/2007 |
| JP | 2007-264905 | 10/2007 |
| JP | 2007-274052 | 10/2007 |
| JP | 2007-295442 | 11/2007 |
| JP | 2007-312383 | 11/2007 |
| JP | 2008-015402 | 1/2008 |
| JP | 2008-033625 | 2/2008 |
| JP | 2008-057129 | 3/2008 |
| JP | 2008-124922 | 5/2008 |
| JP | 2008-187615 | 8/2008 |
| JP | 2008-192000 | 8/2008 |
| JP | 2008-224536 | 9/2008 |
| JP | 2008-252466 | 10/2008 |
| JP | 2008-252570 | 10/2008 |
| JP | 2008-282253 | 11/2008 |
| JP | 2008-292397 | 12/2008 |
| JP | 2009-88704 | 4/2009 |
| JP | 2009-117892 | 5/2009 |
| JP | 2009-130771 | 6/2009 |
| JP | 2009-206620 | 9/2009 |
| JP | 2009-212768 | 9/2009 |
| JP | 2009-232083 | 10/2009 |
| JP | 2009-538071 | 10/2009 |
| JP | 2009-290359 | 12/2009 |
| JP | 2010-102966 | 5/2010 |
| JP | 2010-103746 | 5/2010 |
| JP | 2010-117871 | 5/2010 |
| JP | 2010-147527 | 7/2010 |
| JP | 2010-152285 | 7/2010 |
| JP | 2010-226172 | 10/2010 |
| JP | 2010-232912 | 10/2010 |
| JP | 2010-258645 | 11/2010 |
| JP | 2010-268264 | 11/2010 |
| JP | 2010-278573 | 12/2010 |
| JP | 2010-287820 | 12/2010 |
| JP | 2011-023819 | 2/2011 |
| JP | 2011-029735 | 2/2011 |
| JP | 2011-29871 | 2/2011 |
| JP | 2011-119820 | 6/2011 |
| JP | 4736397 | 7/2011 |
| JP | 2011-223060 | 11/2011 |
| JP | 2011-250231 | 12/2011 |
| JP | 2011-254317 | 12/2011 |
| JP | 2012-010269 | 1/2012 |
| JP | 2012-043193 | 3/2012 |
| JP | 2012-95214 | 5/2012 |

(56) References Cited

FOREIGN PATENT DOCUMENTS

| | | |
|---|---|---|
| JP | 2012-113655 | 6/2012 |
| JP | 2012-169189 | 9/2012 |
| JP | 2012-195763 | 10/2012 |
| JP | 2012-205168 | 10/2012 |
| JP | 2012-209622 | 10/2012 |
| JP | 2012-244549 | 12/2012 |
| JP | 2013-042221 | 2/2013 |
| JP | 2013-197849 | 9/2013 |
| JP | 2013-223043 | 10/2013 |
| JP | 2013-223047 | 10/2013 |
| JP | 2013-223209 | 10/2013 |
| JP | 2013-235505 | 11/2013 |
| JP | 5393917 | 1/2014 |
| JP | 5395293 | 1/2014 |
| JP | 5405695 | 2/2014 |
| JP | 5521125 | 6/2014 |
| JP | 5541153 | 7/2014 |
| WO | 94/26063 | 11/1994 |
| WO | 96/036163 | 11/1996 |
| WO | 99/044336 | 9/1999 |
| WO | 00/07356 | 2/2000 |
| WO | 01/093473 | 12/2001 |
| WO | 03/036829 | 5/2003 |
| WO | 2005/001593 | 1/2005 |
| WO | 2006/013755 | 2/2006 |
| WO | 2006/123697 | 11/2006 |
| WO | 2007/004530 | 1/2007 |
| WO | 2007/032276 | 3/2007 |
| WO | 2007/135014 | 11/2007 |
| WO | 2008/114104 | 9/2008 |
| WO | 2008/133303 | 11/2008 |
| WO | 2009/113415 | 9/2009 |
| WO | 2009/113416 | 9/2009 |
| WO | 2009/144853 | 12/2009 |
| WO | 2010/071193 | 6/2010 |
| WO | 2011/034346 | 3/2011 |
| WO | 2011/086517 | 7/2011 |
| WO | 2011/155130 | 12/2011 |
| WO | 2012/026039 | 3/2012 |
| WO | 2012/035825 | 3/2012 |
| WO | 2012/120853 | 9/2012 |
| WO | 2012/123572 | 9/2012 |
| WO | 2012/127439 | 9/2012 |
| WO | 2013/109934 | 7/2013 |
| WO | 2013/171954 | 11/2013 |
| WO | 2013/175803 | 11/2013 |

OTHER PUBLICATIONS

Office Action dated Aug. 2, 2019 in U.S. Appl. No. 16/380,053.
Office Action, dated Feb. 17, 2020, in Indian Patent Application No. 3622/CHENP/2015.
Office Action dated Nov. 21, 2014 in U.S. Appl. No. 14/261,572.
Office Action dated Jan. 30, 2015 in U.S. Appl. No. 14/539,208.
Office Action dated Mar. 6, 2015 in U.S. Appl. No. 14/087,707.
International Search Report dated Feb. 3, 2015 in International Application No. PCT/JP2014/006448.
Dai Yamanaka et al., "An investigation for the Adoption of Subcarrier Modulation to Wireless Visible Light Communication using Imaging Sensor", The Institute of Electronics, Information and Communication Engineers IEICE Technical Report, Jan. 4, 2007, vol. 106, No. 450, pp. 25-30, with English translation.
International Search Report and Written Opinion in PCT/JP2013/007708, dated Feb. 10, 2014.
International Search Report (Appl. No. PCT/JP2013/006895), dated Feb. 25, 2014.
English translation of Written Opinion of the International Search Authority, dated Feb. 25, 2014 in International Application No. PCT/JP2013/006895.
International Search Report (Appl. No. PCT/JP2013/003319), dated Jun. 18, 2013.
Office Action from (U.S. Appl. No. 13/902,436), dated Nov. 8, 2013.
English translation of Written Opinion of the International Search Authority, dated Jun. 18, 2013 in International Application No. PCT/JP2013/003319.
International Search Report (Appl. No. PCT/JP2013/006858), dated Feb. 4, 2014.
International Search Report (Appl. No. PCT/JP2013/006857), dated Feb. 4, 2014.
International Search Report (Appl. No. PCT/JP2013/006861), dated Feb. 4, 2014.
International Search Report (Appl. No. PCT/JP2013/006863), dated Feb. 4, 2014.
International Search Report (Appl. No. PCT/JP2013/006859), dated Feb. 10, 2014.
International Search Report (Appl. No. PCT/JP2013/006860), dated Feb. 10, 2014.
International Search Report (Appl. No. PCT/JP2013/006871), dated Feb. 18, 2014.
Takao Nakamura et al., "Fast Watermark Detection Scheme from Analog Image for Camera-Equipped Cellular Phone", IEICE Transactions, D-II, vol. J87-D-II, No. 12, pp. 2145-2155, Dec. 2004 with English translation.
International Search Report (Appl. No. PCT/JP2013/003318), dated Jun. 18, 2013.
Office Action from (U.S. Appl. No. 13/902,393), dated Jan. 29, 2014.
English translation of Written Opinion of the International Search Authority, dated Feb. 4, 2014 in International Application No. PCT/JP2013/006894.
International Search Report (Appl. No. PCT/JP2013/006869), dated Feb. 10, 2014.
International Search Report (Appl. No. PCT/JP2013/006870), dated Feb. 10, 2014.
English translation of Written Opinion of the International Search Authority, dated Feb. 10, 2014 in International Application No. PCT/JP2013/006870.
International Search Report (Appl. No. PCT/JP2013/007709), dated Mar. 11, 2014.
English translation of Written Opinion of the International Search Authority, dated Mar. 11, 2014 in International Application No. PCT/JP2013/007709.
International Search Report (Appl. No. PCT/JP2013/007684), dated Feb. 10, 2014.
International Search Report (Appl. No. PCT/JP2013/007675), dated Mar. 11, 2014.
English translation of Written Opinion of the International Search Authority, dated Mar. 11, 2014 in International Application No. PCT/JP2013/007675.
International Search Report (Appl. No. PCT/JP2013/006894), dated Feb. 4, 2014.
Office Action from (U.S. Appl. No. 14/087,635), dated Jun. 20, 2014.
Office Action from (U.S. Appl. No. 14/087,645), dated May 22, 2014.
Office Action from (U.S. Appl. No. 14/141,833), dated Jul. 3, 2014.
Office Action from (U.S. Appl. No. 13/911,530), dated Apr. 14, 2014.
Office Action from (U.S. Appl. No. 13/902,393), dated Apr. 16, 2014.
English translation of Written Opinion of the International Search Authority, dated Feb. 18, 2014 in International Application No. PCT/JP2013/006871.
English translation of Written Opinion of the International Search Authority, dated Feb. 4, 2014 in International Application No. PCT/JP2013/006857.
English translation of Written Opinion of the International Search Authority, dated Feb. 4, 2014 in International Application No. PCT/JP2013/006858.
English translation of Written Opinion of the International Search Authority, dated Feb. 10, 2014 in International Application No. PCT/JP2013/006860.
English translation of Written Opinion of the International Search Authority, dated Feb. 4, 2014 in International Application No. PCT/JP2013/006861.

(56) References Cited

OTHER PUBLICATIONS

English translation of Written Opinion of the International Search Authority, dated Feb. 10, 2014 in International Application No. PCT/JP2013/006869.
Office Action from (U.S. Appl. No. 14/210,688), dated Aug. 4, 2014.
Office Action from (U.S. Appl. No. 13/911,530), dated Feb. 4, 2014.
Office Action from (U.S. Appl. No. 14/087,619), dated Jul. 2, 2014.
Office Action from (U.S. Appl. No. 14/261,572), dated Jul. 2, 2014.
Office Action from (U.S. Appl. No. 14/087,639), dated Jul. 29, 2014.
Office Action from (U.S. Appl. No. 13/902,393), dated Aug. 5, 2014.
Office Action from (U.S. Appl. No. 13/911,530), dated Aug. 5, 2014.
Office Action from (U.S. Appl. No. 14/315,509), dated Aug. 8, 2014.
Office Action, dated Aug. 25, 2014, in U.S. Appl. No. 13/902,215.
Office Action, dated Sep. 18, 2014, in U.S. Appl. No. 14/142,372.
Office Action, dated Oct. 1, 2014, in U.S. Appl. No. 14/302,913.
Office Action, dated Oct. 14, 2014, in U.S. Appl. No. 14/087,707.
Gao et al., "Understanding 2D-BarCode Technology and Applications in M-Commerce-Design and Implementation of A 2D Barcode Processing Solution", IEEE Computer Society 31st Annual International Computer Software and Applications Conference (COMPSAC 2007), Aug. 2007.
Jiang Liu et al., "Foundational Imaging Systems Analysis of Spatial Optical Wireless Communication Utilizing Image Sensor", and Techniques (IST), 2011 IEEE International Conference on Imaging Systems and Techniques, IEEE, May 17, 2011, pp. 205-209, XP031907193.
Christos Danakis et al., "Using a CMOS Camera Sensor for Visible Light Communication", 2012 IEEE Globecom Workshops, U.S., Dec. 3, 2012, pp. 1244-1248.
Extended European Search Report, dated May 21, 2015 in European Patent Application No. 13793716.5.
Extended European Search Report, dated Jun. 1, 2015 in European Patent Application No. 13793777.7.
USPTO Office Action, dated Jun. 23, 2015, in U.S. Appl. No. 14/142,413.
USPTO Office Action, dated Apr. 28, 2015 in U.S. Appl. No. 14/141,833.
Office Action issued in Japan Patent Application No. 2015-129247, dated Jul. 28, 2015.
Extended European Search Report, dated Nov. 10, 2015, in European Application No. 13869757.8.
Extended European Search Report, dated Nov. 10, 2015, in European Application No. 13868814.8.
Extended European Search Report, dated Nov. 10, 2015, in European Application No. 13868307.3.
Extended European Search Report, dated Nov. 10, 2015, in European Application No. 13868118.4.
Extended European Search Report, dated Nov. 10, 2015, in European Application No. 13867350.4.
Extended European Search Report, dated Nov. 23, 2015, in European Application No. 13867905.5.
Extended European Search Report, dated Nov. 23, 2015, in European Application No. 13866705.0.
Extended European Search Report, dated Nov. 23, 2015, in European Application No. 13869275.1.
Extended European Search Report, dated Nov. 27, 2015, in European Application No. 13869196.9.
U.S. Office Action dated Sep. 4, 2015 in U.S. Appl. No. 14/141,829.
U.S. Office Action dated Nov. 16, 2015 in U.S. Appl. No. 14/142,413.
U.S. Office Action dated Jan. 4, 2016 in U.S. Appl. No. 14/711,876.
U.S. Office Action dated Jan. 14, 2016 in U.S. Appl. No. 14/526822.
U.S. Office Action dated Jan. 22, 2016 in U.S. Appl. No. 14/141,829.
USPTO Office Action, dated Mar. 11, 2016 in U.S. Appl. No. 14/087,605.
Singapore Office Action, dated Apr. 20, 2016, in Singapore Patent Application No. 11201505027U.
Extended European Search Report, dated May 19, 2016, in European Patent Application No. 13868645.6.
China Office Action, dated May 27, 2016, in Chinese Patent Application 201380002141.0, with an English language translation of a Search Report.
USPTO Office Action, dated Jun. 2, 2016 in U.S. Appl. No. 15/086,944.
USPTO Office Action, dated Jun. 10, 2016 in U.S. Appl. No. 14/087,605.
USPTO Office Action, dated Jun. 30, 2016, in U.S. Appl. No. 14/141,829.
USPTO Office Action, dated Jul. 6, 2016 in U.S. Appl. No. 14/957,800.
Singapore Office Action, dated Jun. 29, 2016, in Singapore Patent Application No. 11201504980T.
USPTO Office Action, dated Jul. 15, 2016 in U.S. Appl. No. 14/973,783.
Singapore Office Action, dated Jul. 8, 2016, in Singapore Patent Application No. 11201504985W.
USPTO Office Action, dated Jul. 22, 2016, in U.S. Appl. No. 14/582,751.
USPTO Office Action, dated Aug. 22, 2016, in U.S. Appl. No. 15/161,657.
USPTO Office Action, dated Jan. 13, 2017, in U.S. Appl. No. 15/333,328.
U.S. Office Action dated Feb. 24, 2017 in U.S. Appl. No. 15/393,392.
U.S. Office Action, dated Mar. 22, 2017, in U.S. Appl. No. 15/161,657.
U.S. Office Action, dated May 5, 2017, in U.S. Appl. No. 15/403,570.
U.S. Office Action, dated Jun. 2, 2017, in U.S. Appl. No. 15/384,481.
Japan Office Action, dated Nov. 14, 2017, in Japan Patent Application No. 2014-49554, together with an English language translation thereof.
Japan Office Action, dated Nov. 28, 2017, in Japan Patent Application No. 2014-57304, together with an English language translation thereof.
Japan Office Action, dated Dec. 5, 2017, in Japan Patent Application No. 2014-56211.
Office Action, dated Mar. 7, 2018, in U.S. Appl. No. 15/386,814.
Office Action, dated Apr. 10, 2018, in European Patent Application No. 13868043.4.
Office Action dated Jun. 1, 2018 in U.S. Appl. No. 15/813,244.
Office Action dated Jun. 14, 2018 in EP application No. 13869196.9.
Office Action dated Jun. 20, 2018 in EP application No. 13868814.8.
Office Action dated Jun. 21, 2018 in U.S. Appl. No. 15/381,940.
Office Action dated Sep. 25, 2018, in European Application No. 13867350.4.
USPTO Office Action, dated Mar. 8, 2019, in U.S. Appl. No. 16/217,515.
USPTO Office Action, dated Apr. 2, 2019, in U.S. Appl. No. 15/843,790.
USPTO Office Action, dated Sep. 6, 2019, in U.S. Appl. No. 16/380,515.

* cited by examiner

When $t_{HT}$ = 20 microseconds

Notify by sound upon discovery of transmitter and upon signal reception

Change sound type, reproduction time, and number of reproductions according to number of transmitters or type of received or display information

FIG. 31A

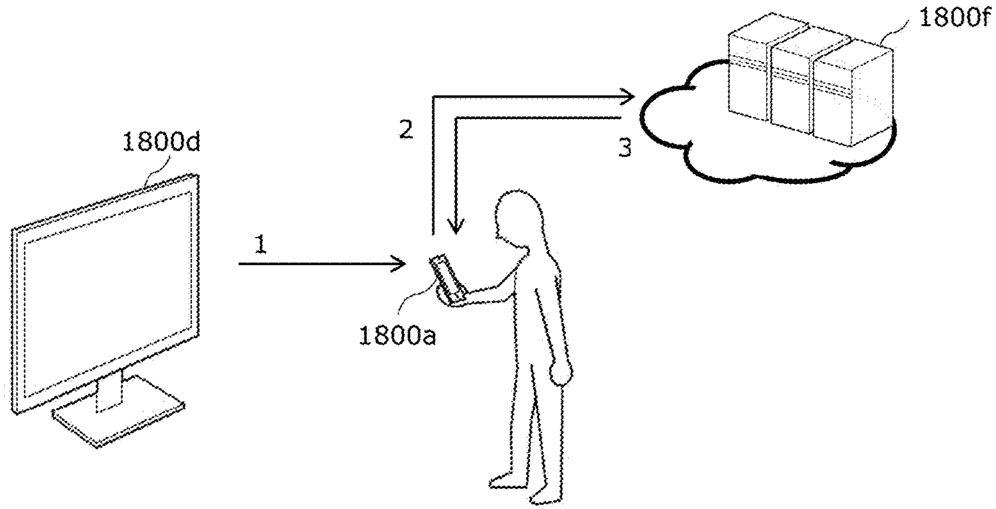

| | 1 | 2 | Server | 3 | Receiver operation |
|---|---|---|---|---|---|
| a | Content ID, ongoing content reproduction time point | Content ID | | Content | Reproduce content from point of time of (ongoing content reproduction time point + elapsed time since ID reception) |
| b | Content ID, ongoing content reproduction time point | Content ID, ongoing content reproduction time point | | Partial content on and after ongoing content reproduction time point | Reproduce partial content after point of time of (elapsed time since ID reception) |
| c | Transmitter ID, ongoing content reproduction time point | Transmitter ID | Identify content that is being reproduced, from reproduction schedule of each transmitter and server time point | Content | Reproduce content from point of time of (ongoing content reproduction time point + elapsed time since ID reception) |
| d | Transmitter ID, transmitter time point | Transmitter ID, transmitter time point | Identify content that is being reproduced, from reproduction schedule of each transmitter and server time point | Content, ongoing content reproduction time point | Reproduce content from point of time of (ongoing content reproduction time point + elapsed time since ID reception) |
| e | Transmitter ID | Transmitter ID | Identify content that is being reproduced, from reproduction schedule of each transmitter and server time point | Content, content reproduction start time point | Clock setting of receiver Reproduce content from point of time of (receiver time point − content reproduction start time point) |

FIG. 63
(a)
Decode target image $P_{dec11}$
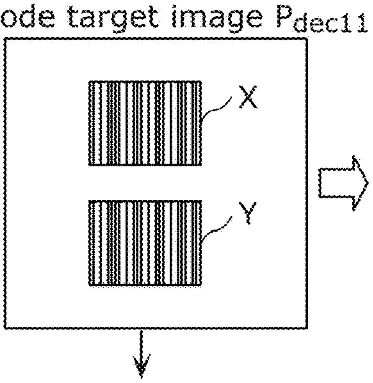
| | Address | Data |
|---|---|---|
| X | 0 | 5 |
| Y | 0 | 5 |
(b)
Decode target image $P_{dec12}$
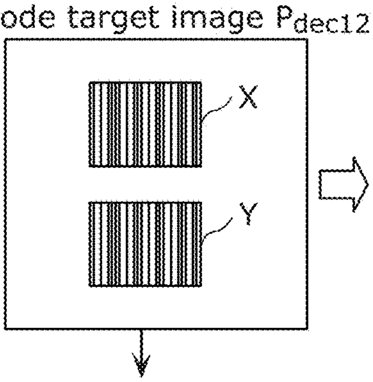
| | Address | Data |
|---|---|---|
| X | 1 | 2 |
| Y | 1 | 2 |
(c)
Decode target image $P_{dec13}$
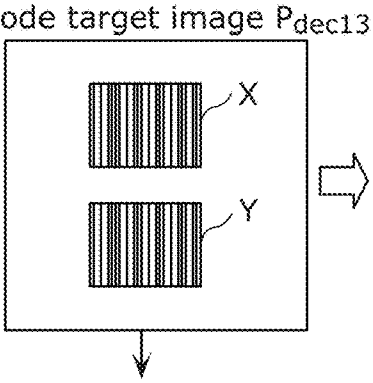
| | Address | Data |
|---|---|---|
| X | 2 | 8 |
| Y | 2 | 7 |
(d)
Decode target image $P_{dec14}$
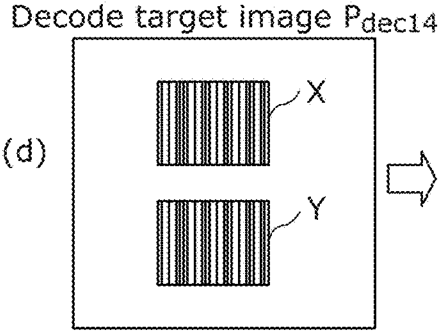
| | Address | Data |
|---|---|---|
| X | 3 | 4 |
| Y | 3 | 7 |
(e)
| Address | 0 | 1 | 2 | 3 | 4 | 5 | 6 | 7 | 8 | 9 |
|---|---|---|---|---|---|---|---|---|---|---|
| Light ID for X | 5 | 2 | 8 | 4 | 3 | 6 | 1 | 9 | 4 | 3 |
| Light ID for Y | 5 | 2 | 7 | 7 | 1 | 5 | 3 | 2 | 7 | 4 |

FIG. 110

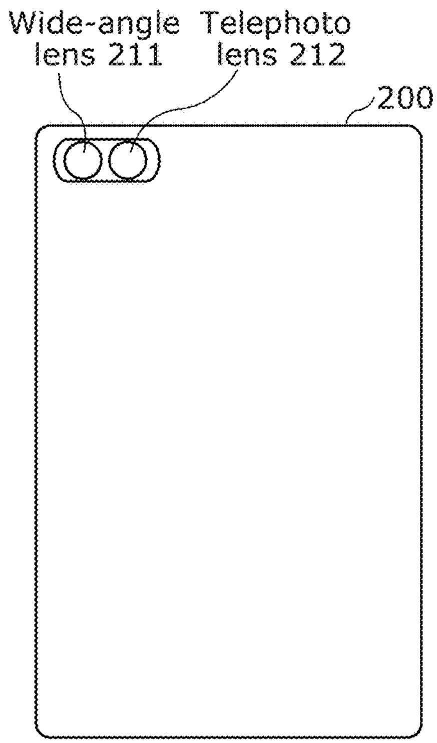

| Uses of lenses | |
|---|---|
| Use A | Always use telephoto lens |
| Use B | If decode target image obtained using wide-angle lens includes bright line pattern region, switch to telephoto lens and obtain decode target image |
| Use C | Use wide-angle lens to obtain captured display image, and use telephoto lens to obtain decode target image |
| Use D | Switch between wide-angle lens and telephoto lens, according to user operation |
| Use E | Switch between wide-angle lens and telephoto lens, according to decoding result |

FIG. 121

| PHY Operating Modes | | | | |
|---|---|---|---|---|
| **Modulation** | **RLL Code** | **Optical Clock Rate** | **FEC** | **(Typical) Data Rate** |
| Packet PWM | None | 100 kHz | Temporal repeat coding | 5.5 kbps |
| Packet PPM | None | 100 kHz | Temporal repeat coding | 8 kbps |

FIG. 123

| | |
|---|---|
| 0-14 bit | Variable |
| Sequence number | Frame payload |
| MHR | MSDU |

FIG. 126

| Attribute | Type | Range | Description | Default |
|---|---|---|---|---|
| *macMpmSnLength* | Integer | 0x0-0xf | This parameter indicates bit length of sequence number sub-field. Values from 0x0 to 0xe indicate (fixed) bit lengths, and value of 0xf indicates that bit length is variable. | 0xf |
| *macMpmMpduLength* | Integer | 0x00-0xff | This parameter indicates bit length of MPDU. | 12 |

FIG. 128

| Attribute | PCLP center | Range | Description |
|---|---|---|---|
| *phyMpmMode* | Integer | 0-1 | This parameter indicates MPM PHY mode.<br>0: PWM mode<br>1: PPM mode |
| *phyMpmPlcpHeaderMode* | Integer | 0x0-0xf | This parameter indicates PLCP header sub-field mode, and<br>PLCP footer sub-field mode. |
| *phyMpmPlcpCenterMode* | Integer | 0x0-0xf | This parameter indicates PLCP center sub-field mode. |
| *phyMpmSymbolSize* | Integer | 0x0-0xf | This parameter indicates the number of symbols of payload sub-field.<br>0x0 indicates that it is variable and is referred to as $N$. |
| *phyMpmOddSymbolBit* | Integer | 0x0-0xf | This parameter indicates bit length included in each odd symbol in payload sub-field and is referred to as *Modd*. |
| *phyMpmEvenSymbolBit* | Integer | 0x0-0xf | This parameter indicates bit length included in each even symbol in payload sub-field and is referred to as *Meven*. |
| *phyMpmSymbolOffset* | Integer | 0x00-0xff | This parameter indicates offset value of symbol of payload sub-field, and is referred to as $W_1$. |
| *phyMpmSymbolUnit* | Integer | 0x00-0xff | This parameter indicates unit value of symbol of payload sub-field, and is referred to as $W_2$. |
| | | | |

FIG. 130

| *phyMpmPlcpHeaderMode* | Symbol of PLCP header sub-field | |
|---|---|---|
| | PWM mode | PPM mode |
| 0 | 0, 0, 0, 0 | 0, 0, 0 |
| 1 | 20, 10, 20, 20 | 90, 80, 80 |
| 2 | 30, 20, 30, 30 | 100, 90, 90 |
| 3 | 40, 30, 40, 40 | 110, 100, 100 |
| 4 | 50, 40, 50, 50 | 120, 110, 110 |
| 5 | 60, 50, 60, 60 | 130, 120, 120 |
| 6 | 70, 60, 70, 70 | 140, 130, 130 |
| 7 | 80, 70, 80, 80 | 150, 140, 140 |
| 8 | 90, 80, 90, 90 | 160, 150, 150 |
| 9 | 100, 90, 100, 100 | 170, 160, 160 |
| 10 | 110, 100, 110, 110 | 180, 170, 170 |
| 11 | 120, 110, 120, 120 | 190, 180, 180 |
| 12 | 130, 120, 130, 130 | 200, 190, 190 |

FIG. 131

| *phyMpmPlcpCenterMode* | Symbol of PLCP center sub-field | |
|---|---|---|
| | PWM mode | PPM mode |
| 0 | 0, 0, 0, 0 | 0, 0, 0 |
| 1 | 20, 10, 10, 20 | 80, 90, 80 |
| 2 | 30, 20, 20, 30 | 90, 100, 90 |
| 3 | 40, 30, 30, 40 | 100, 110, 100 |
| 4 | 50, 40, 40, 50 | 110, 120, 110 |
| 5 | 60, 50, 50, 60 | 120, 130, 120 |
| 6 | 70, 60, 60, 70 | 130, 140, 130 |
| 7 | 80, 70, 70, 80 | 140, 150, 140 |
| 8 | 90, 80, 80, 90 | 150, 160, 150 |
| 9 | 100, 90, 90, 100 | 160, 170, 160 |
| 10 | 110, 100, 100, 110 | 170, 180, 170 |
| 11 | 120, 110, 110, 120 | 180, 190, 180 |
| 12 | 130, 120, 120, 130 | 190, 200, 190 |

FIG. 132

| *phyMpmPlcpHeaderMode* | Symbol of PLCP footer sub-field | |
|---|---|---|
| | PWM mode | PPM mode |
| 0 | 0, 0, 0, 0 | 0, 0, 0 |
| 1 | 20, 20, 10, 20 | 80, 80, 90 |
| 2 | 30, 30, 20, 30 | 90, 90, 100 |
| 3 | 40, 40, 30, 40 | 100, 100, 110 |
| 4 | 50, 50, 40, 50 | 110, 110, 120 |
| 5 | 60, 60, 50, 60 | 120, 120, 130 |
| 6 | 70, 70, 60, 70 | 130, 130, 140 |
| 7 | 80, 80, 70, 80 | 140, 140, 150 |
| 8 | 90, 90, 80, 90 | 150, 150, 160 |
| 9 | 100, 100, 90, 100 | 160, 160, 170 |
| 10 | 110, 110, 100, 110 | 170, 170, 180 |
| 11 | 120, 120, 110, 120 | 180, 180, 190 |
| 12 | 130, 130, 120, 130 | 190, 190, 200 |

| Area of bright region | Size of AR image |
|---|---|
| Large | Large |
| Small | Small |

FIG. 141

| Factor | Processing | Details of processing |
|---|---|---|
| Aging of light source | Adjust parameter to increase intensity of light as light source ages | Adjust parameter according to use time measured by timer |
| | | Detect intensity of irradiation light, and adjust parameter according to the intensity |
| Irradiation distance to screen | Adjust parameter to increase intensity of light as distance becomes longer | Detect intensity of light reflected by screen, and adjust parameter according to the intensity |
| | | Adjust parameter according to irradiation distance detected by distance measuring sensor |
| Color of screen | Adjust parameter to increase intensity of light as color becomes closer to black | Detect color of screen by capturing image of screen, and adjust parameter according to the color |
| Natural light | Adjust parameter to increase intensity of light as intensity of natural light increases | Detect difference between intensity of reflection light when projector is ON and intensity of reflection light when projector is OFF, and adjust parameter according to the difference |
| | | Detect intensity of solar light, and adjust parameter according to the intensity of solar light |

| Transmittance of preparatory member | Light source | Pulse width of light ID |
|---|---|---|
| 100% | Dark | Wide |
| 20% | Bright | Narrow |

FIG. 185

MAC Header

| address | 0 | 1-2 | 3 |
|---|---|---|---|
| description | Header version | Protocol | Protocol 2 |
| value | 0:ver 1 | 00: IEC<br>01: LinkRay Data<br>10: IEEE | When IEC<br>0: IEC 4 bit<br>1: IEC 8 bit<br>When LinkRay Data<br>0: 32 bit<br>When IEEE<br>0: unset |

FIG. 186

Calculation of packet division count

| datapart length / division count | 4 bit | 8 bit | 16 bit | 32 bit | 64 bit |
|---|---|---|---|---|---|
| 1 | - | - | 6 | 18 | 50 |
| 2 | - | 6 | 18 | 50 | 110 |
| 3 | 2 | 14 | 34 | 78 | 174 |
| 4 | 6 | 18 | 50 | 110 | 238 |
| 5 | 10 | 26 | 62 | 142 | 294 |
| 6 | 14 | 34 | 78 | 174 | 358 |
| 7 | 14(15) | 42 | 94 | 206 | 422 |
| 8 | 18 | 50 | 110 | 238 | 486 |
| 9 | 22 | 58 | 126 | 262 | 550 |
| 10 | 26 | 62 | 142 | 294 | 614 |
| 11 | 30 | 70 | 158 | 326 | 678 |
| 12 | 34 | 78 | 174 | 358 | 742 |
| 13 | 38 | 86 | 190 | 390 | 806 |
| 14 | 42 | 94 | 206 | 422 | 870 |
| 15 | 46 | 102 | 222 | 454 | 934 |
| 16 | 50 | 110 | 238 | 486 | 998 |

ID length

ID length

PHY version

Indicate PHY version via header symbol position

| PHY ver. | N (bit count per PHY symbol) | ECC | PHY body | MAC frame | Maximum ID length | ID2 |
|---|---|---|---|---|---|---|
| 1 | 2 | 16 | 60 | 44 | 34 | 5 |
| 2 | 3 | 20 | 90 | 70 | 62 | 3 |

ECC: Error Check Code

FIG. 190

2 bit

| Decimal | Binary | Gray code |
|---|---|---|
| 0 | 00 | 00 |
| 1 | 01 | 01 |
| 2 | 10 | 11 |
| 3 | 11 | 10 |

3 bit

| Decimal | Binary | Gray code |
|---|---|---|
| 0 | 000 | 000 |
| 1 | 001 | 001 |
| 2 | 010 | 011 |
| 3 | 011 | 010 |
| 4 | 100 | 110 |
| 5 | 101 | 111 |
| 6 | 110 | 101 |
| 7 | 111 | 100 |

COMMUNICATION METHOD, COMMUNICATION DEVICE, AND TRANSMITTER

CROSS REFERENCE TO RELATED APPLICATION

The present application is a continuation-in-part of U.S. application Ser. No. 15/843,790 filed on Dec. 15, 2017, and claims the benefit of U.S. Provisional Patent Application No. 62/808,560 filed on Feb. 21, 2019, U.S. Provisional Patent Application No. 62/806,977 filed on Feb. 18, 2019, Japanese Patent Application No. 2019-042442 filed on Mar. 8, 2019, Japanese Patent Application No. 2018-206923 filed on Nov. 1, 2018, Japanese Patent Application No. 2018-083454 filed on Apr. 24, 2018, and Japanese Patent Application No. 2018-066406 filed on Mar. 30, 2018. U.S. application Ser. No. 15/843,790 is a continuation-in-part of U.S. application Ser. No. 15/381,940 filed on Dec. 16, 2016, and claims the benefit of U.S. Provisional Patent Application No. 62/558,629 filed on Sep. 14, 2017, U.S. Provisional Patent Application No. 62/467,376 filed on Mar. 6, 2017, U.S. Provisional Patent Application No. 62/466,534 filed on Mar. 3, 2017, U.S. Provisional Patent Application No. 62/457,382 filed on Feb. 10, 2017, U.S. Provisional Patent Application No. 62/446,632 filed on Jan. 16, 2017, U.S. Provisional Patent Application No. 62/434,644 filed on Dec. 15, 2016, Japanese Patent Application No. 2017-216264 filed on Nov. 9, 2017, Japanese Patent Application No. 2017-080664 filed on Apr. 14, 2017, and Japanese Patent Application No. 2017-080595 filed on Apr. 14, 2017. U.S. application Ser. No. 15/381,940 is a continuation-in-part of U.S. application Ser. No. 14/973,783 filed on Dec. 18, 2015, and claims the benefit of U.S. Provisional Patent Application No. 62/338,071 filed on May 18, 2016, U.S. Provisional Patent Application No. 62/276,454 filed on Jan. 8, 2016, Japanese Patent Application No. 2016-220024 filed on Nov. 10, 2016, Japanese Patent Application No. 2016-145845 filed on Jul. 25, 2016, Japanese Patent Application No. 2016-123067 filed on Jun. 21, 2016, and Japanese Patent Application No. 2016-100008 filed on May 18, 2016. U.S. application Ser. No. 14/973,783 filed on Dec. 18, 2015 is a continuation-in-part of U.S. application Ser. No. 14/582,751 filed on Dec. 24, 2014, and claims the benefit of U.S. Provisional Patent Application No. 62/251,980 filed on Nov. 6, 2015, Japanese Patent Application No. 2014-258111 filed on Dec. 19, 2014, Japanese Patent Application No. 2015-029096 filed on Feb. 17, 2015, Japanese Patent Application No. 2015-029104 filed on Feb. 17, 2015, Japanese Patent Application No. 2014-232187 filed on Nov. 14, 2014, and Japanese Patent Application No. 2015-245738 filed on Dec. 17, 2015. U.S. application Ser. No. 14/582,751 is a continuation-in-part of U.S. patent application Ser. No. 14/142,413 filed on Dec. 27, 2013, and claims benefit of U.S. Provisional Patent Application No. 62/028,991 filed on Jul. 25, 2014, U.S. Provisional Patent Application No. 62/019,515 filed on Jul. 1, 2014, and Japanese Patent Application No. 2014-192032 filed on Sep. 19, 2014. U.S. application Ser. No. 14/142,413 claims benefit of U.S. Provisional Patent Application No. 61/904,611 filed on Nov. 15, 2013, U.S. Provisional Patent Application No. 61/896,879 filed on Oct. 29, 2013, U.S. Provisional Patent Application No. 61/895,615 filed on Oct. 25, 2013, U.S. Provisional Patent Application No. 61/872,028 filed on Aug. 30, 2013, U.S. Provisional Patent Application No. 61/859,902 filed on Jul. 30, 2013, U.S. Provisional Patent Application No. 61/810,291 filed on Apr. 10, 2013, U.S. Provisional Patent Application No. 61/805,978 filed on Mar. 28, 2013, U.S. Provisional Patent Application No. 61/746,315 filed on Dec. 27, 2012, Japanese Patent Application No. 2013-242407 filed on Nov. 22, 2013, Japanese Patent Application No. 2013-237460 filed on Nov. 15, 2013, Japanese Patent Application No. 2013-224805 filed on Oct. 29, 2013, Japanese Patent Application No. 2013-222827 filed on Oct. 25, 2013, Japanese Patent Application No. 2013-180729 filed on Aug. 30, 2013, Japanese Patent Application No. 2013-158359 filed on Jul. 30, 2013, Japanese Patent Application No. 2013-110445 filed on May 24, 2013, Japanese Patent Application No. 2013-082546 filed on Apr. 10, 2013, Japanese Patent Application No. 2013-070740 filed on Mar. 28, 2013, and Japanese Patent Application No. 2012-286339 filed on Dec. 27, 2012. The entire disclosures of the above-identified applications, including the specifications, drawings and claims are incorporated herein by reference in their entireties.

FIELD

The present disclosure relates to a communication method, a communication device, a transmitter, and a program, for instance.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by internet protocol (IP) connection using Ethernet® or wireless local area network (LAN). However, there are home electric appliances whose computational performance is insufficient to have a communication function, and home electric appliances which do not have a communication function due to a matter of cost.

In order to solve such a problem, Patent Literature (PTL) 1 discloses a technique of efficiently establishing communication between devices among limited optical spatial transmission devices which transmit information to a free space using light, by performing communication using plural single color light sources of illumination light.

CITATION LIST

Patent Literature

[Patent Literature 1] Japanese Unexamined Patent Application Publication No. 2002-290335

SUMMARY

Technical Problem

However, the conventional method is limited to a case in which a device to which the method is applied has three color light sources such as an illuminator. Moreover, a receiver that receives transmitted information cannot display an image useful to the user.

Non-limiting and exemplary embodiments disclosed herein solve the above problem, and provide, for example, a communication method which enables communication between various kinds of apparatuses.

Solution to Problem

A communication method according to an aspect of the present disclosure is a communication method which uses a terminal including an image sensor, and includes: determining whether the terminal is capable of performing visible light communication; when the terminal is determined to be capable of performing the visible light communication, obtaining a decode target image by the image sensor capturing a subject whose luminance changes, and obtaining, from a striped pattern appearing in the decode target image, first identification information transmitted by the subject; and when the terminal is determined to be incapable of performing the visible light communication in the determining pertaining to the visible light communication, obtaining a captured image by the image sensor capturing the subject, extracting at least one contour by performing edge detection on the captured image, specifying a specific region from among the at least one contour, and obtaining, from a line pattern in the specific region, second identification information transmitted by the subject, the specific region being predetermined.

These general and specific aspects may be implemented using a system, a method, an integrated circuit, a computer program, or a computer-readable recording medium such as a CD-ROM, or any combination of systems, methods, integrated circuits, computer programs, or computer-readable recording media. A computer program for executing the method according to an embodiment may be stored in a recording medium of a server, and the method may be achieved in such a manner that the server delivers the program to a terminal in response to a request from the terminal.

The written description and the drawings clarify further benefits and advantages provided by the disclosed embodiments. Such benefits and advantages may be individually yielded by various embodiments and features of the written description and the drawings, and all the embodiments and all the features may not necessarily need to be provided in order to obtain one or more benefits and advantages.

Advantageous Effects

According to the present disclosure, it is possible to implement communication between various kinds of apparatuses.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 31A is a diagram for describing a specific method of synchronous reproduction in Embodiment 3.

FIG. 63 is a diagram illustrating an example in which a receiver 200 according to Embodiment 4 locates a bright line pattern region.

FIG. 99 is a diagram illustrating an example of superimposing an AR image by a receiver according to Variation 3 of Embodiment 4.

FIG. 100 is a diagram illustrating an example of superimposing an AR image by a receiver according to Variation 3 of Embodiment 4.

FIG. 101 is a diagram for describing an example of how a receiver according to Variation 3 of Embodiment 4 obtains a line-scan time.

FIG. 102 is a diagram for describing an example of how a receiver according to Variation 3 of Embodiment 4 obtains a line scanning time.

FIG. 103 is a flowchart illustrating an example of how a receiver according to Variation 3 of Embodiment 4 obtains a line scanning time.

FIG. 104 is a diagram illustrating an example of superimposing an AR image by a receiver according to Variation 3 of Embodiment 4.

FIG. 105 is a diagram illustrating an example of superimposing an AR image by a receiver according to Variation 3 of Embodiment 4.

FIG. 106 is a diagram illustrating an example of superimposing an AR image by a receiver according to Variation 3 of Embodiment 4.

FIG. 107 is a diagram illustrating an example of an obtained decode target image depending on the orientation of a receiver according to Variation 3 of Embodiment 4.

FIG. 108 is a diagram illustrating other examples of an obtained decode target image depending on the orientation of a receiver according to Variation 3 of Embodiment 4.

FIG. 109 is a flowchart illustrating an example of processing operation of a receiver according to Variation 3 of Embodiment 4.

FIG. 110 is a diagram illustrating an example of processing of switching between camera lenses by a receiver according to Variation 3 of Embodiment 4.

Figure 111:
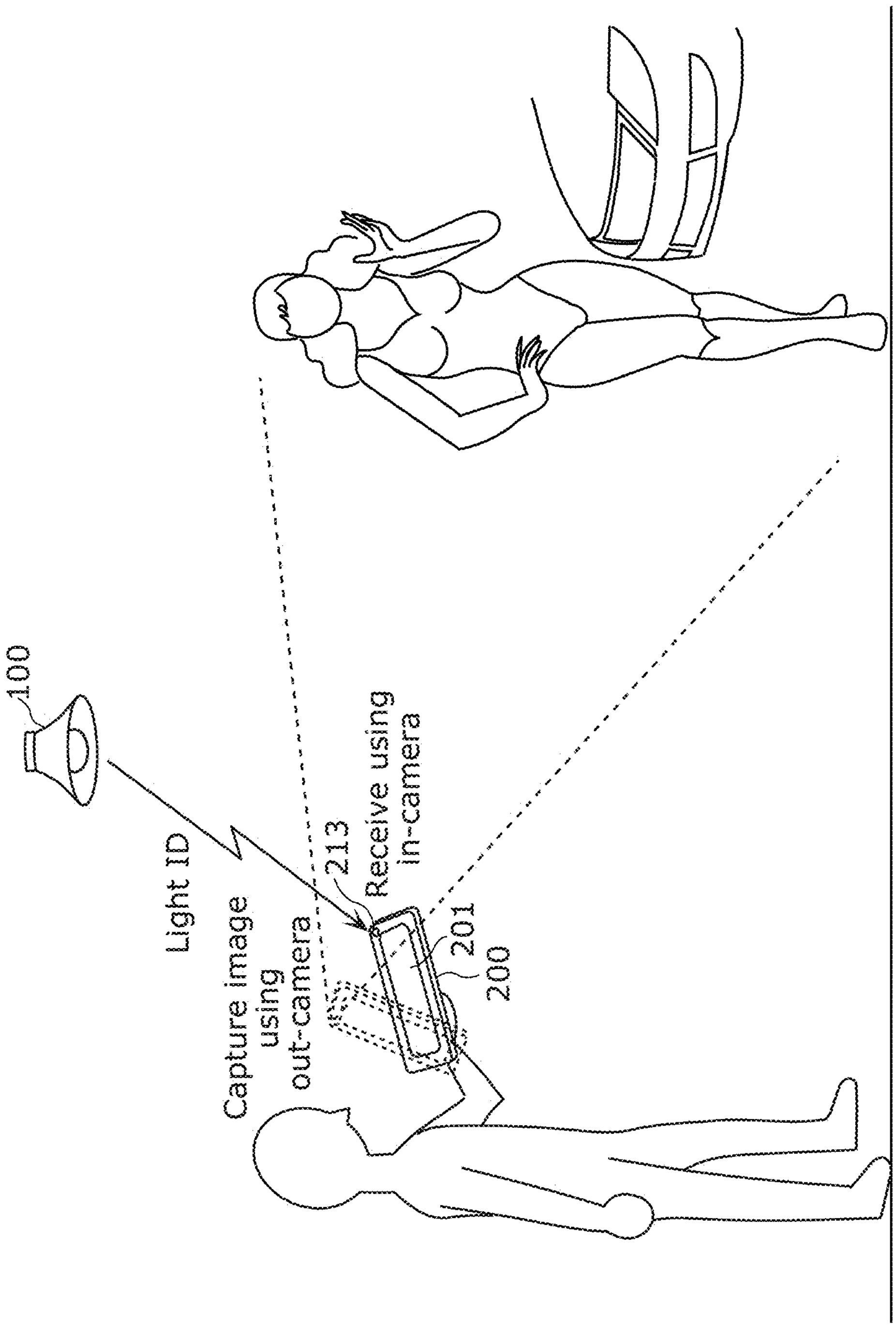

FIG. 111 is a diagram illustrating an example of camera switching processing by a receiver according to Variation 3 of Embodiment 4.

Figure 112:
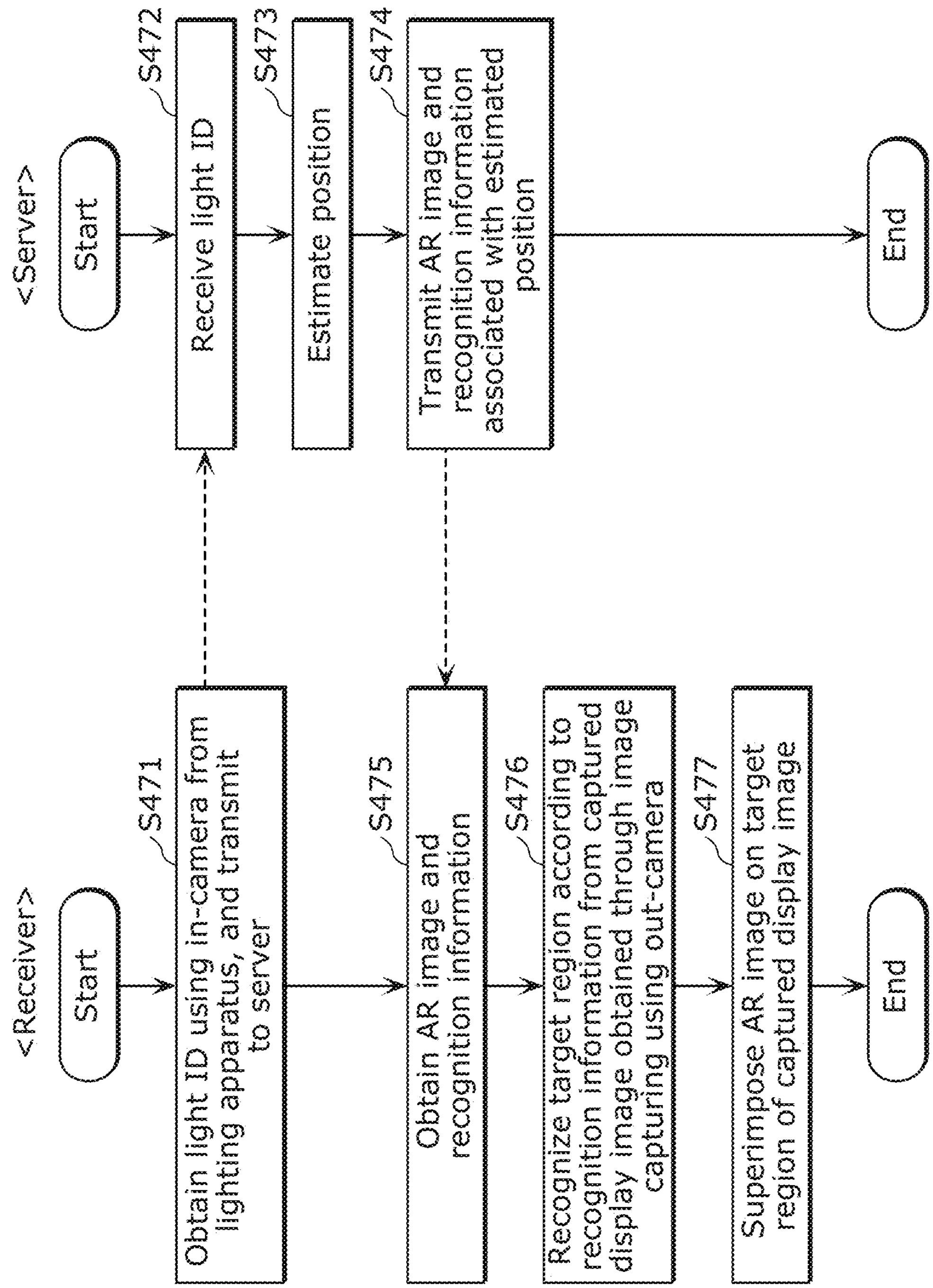

FIG. 112 is a flowchart illustrating an example of processing operation of a receiver according to Variation 3 of Embodiment 4 and a server.

Figure 113:
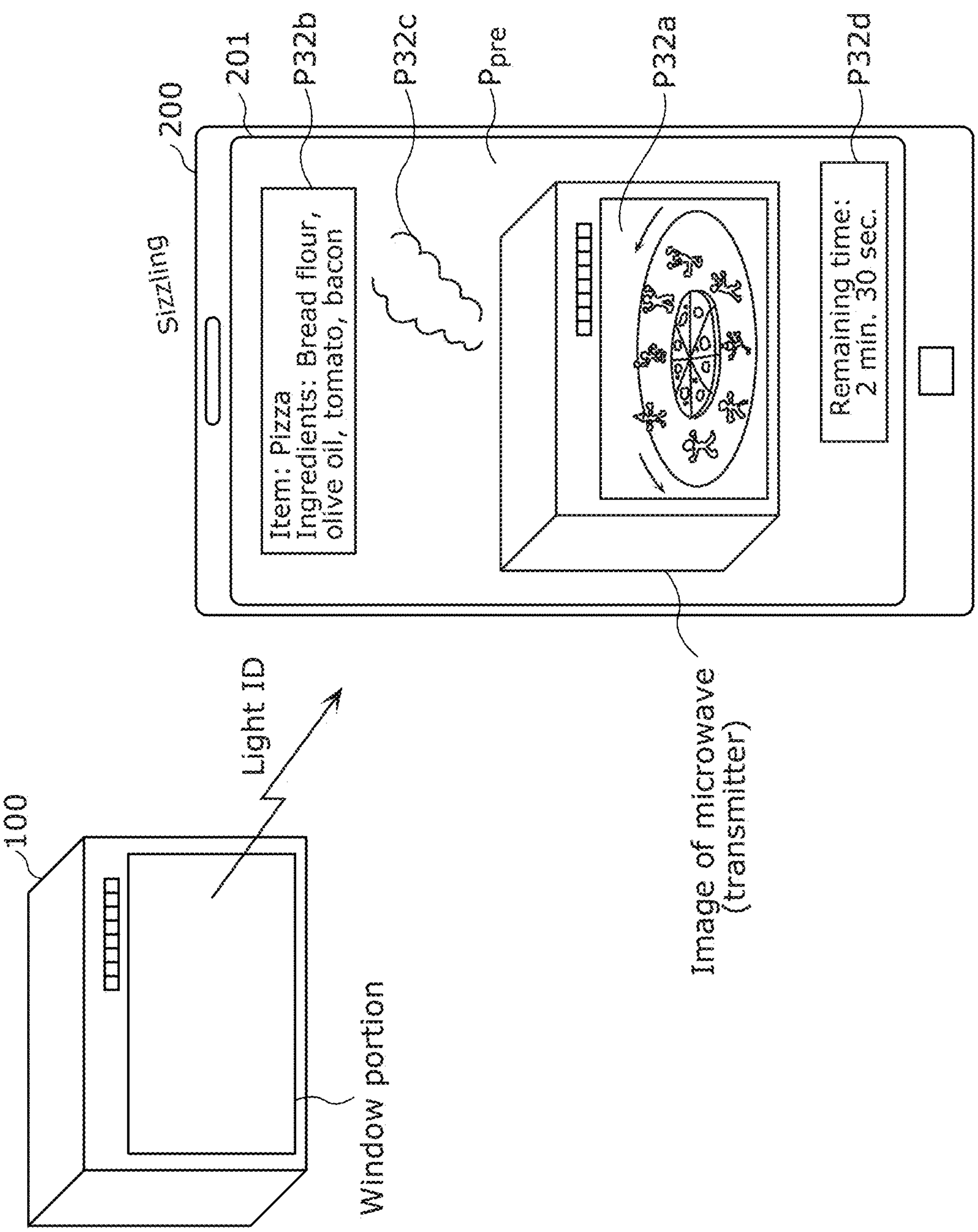

FIG. 113 is a diagram illustrating an example of superimposing an AR image by a receiver according to Variation 3 of Embodiment 4.

Figure 114:
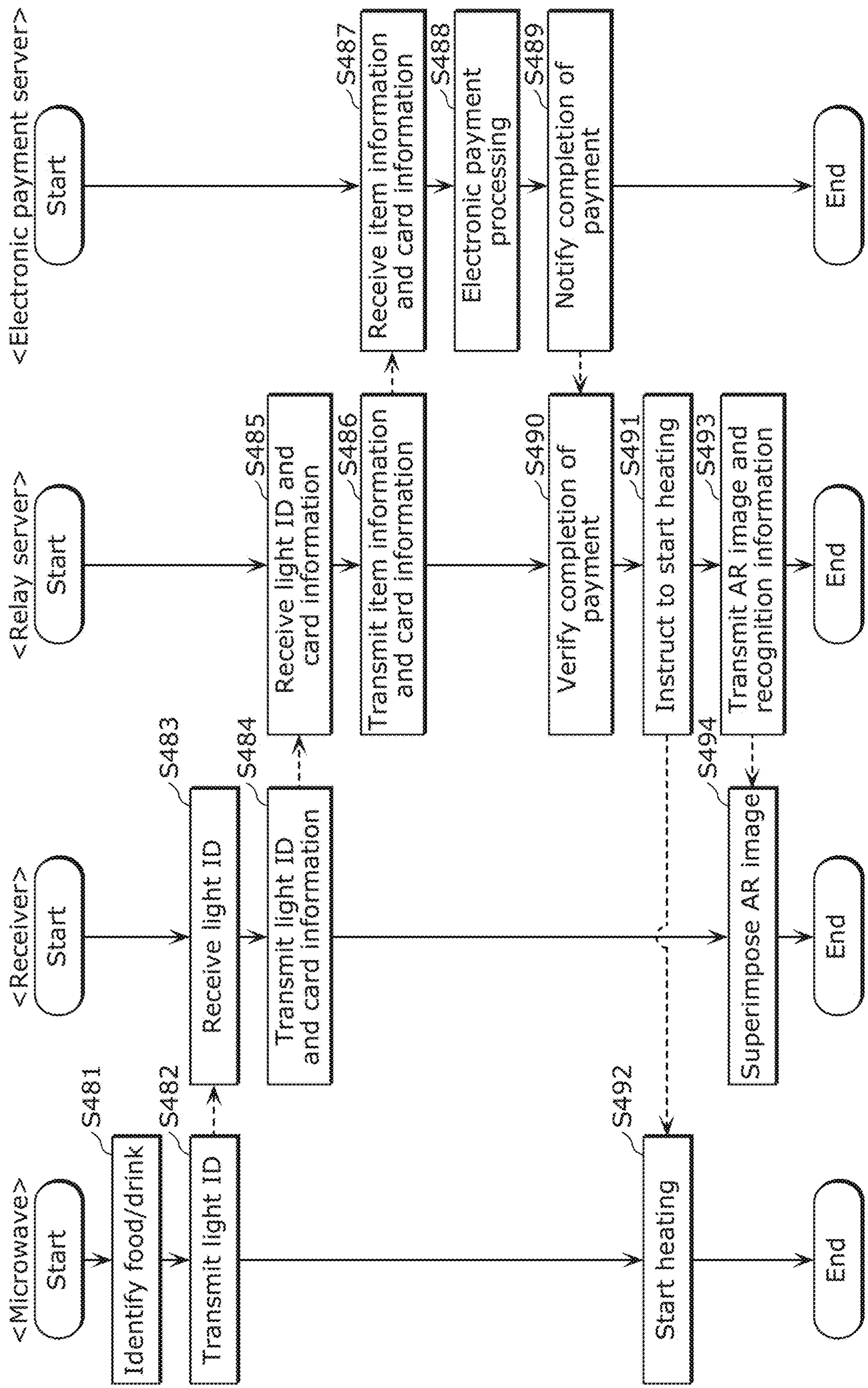

FIG. 114 is a sequence diagram illustrating processing operation of a system which includes a receiver according to Variation 3 of Embodiment 4, a microwave, a relay server, and an electronic payment server.

Figure 115:
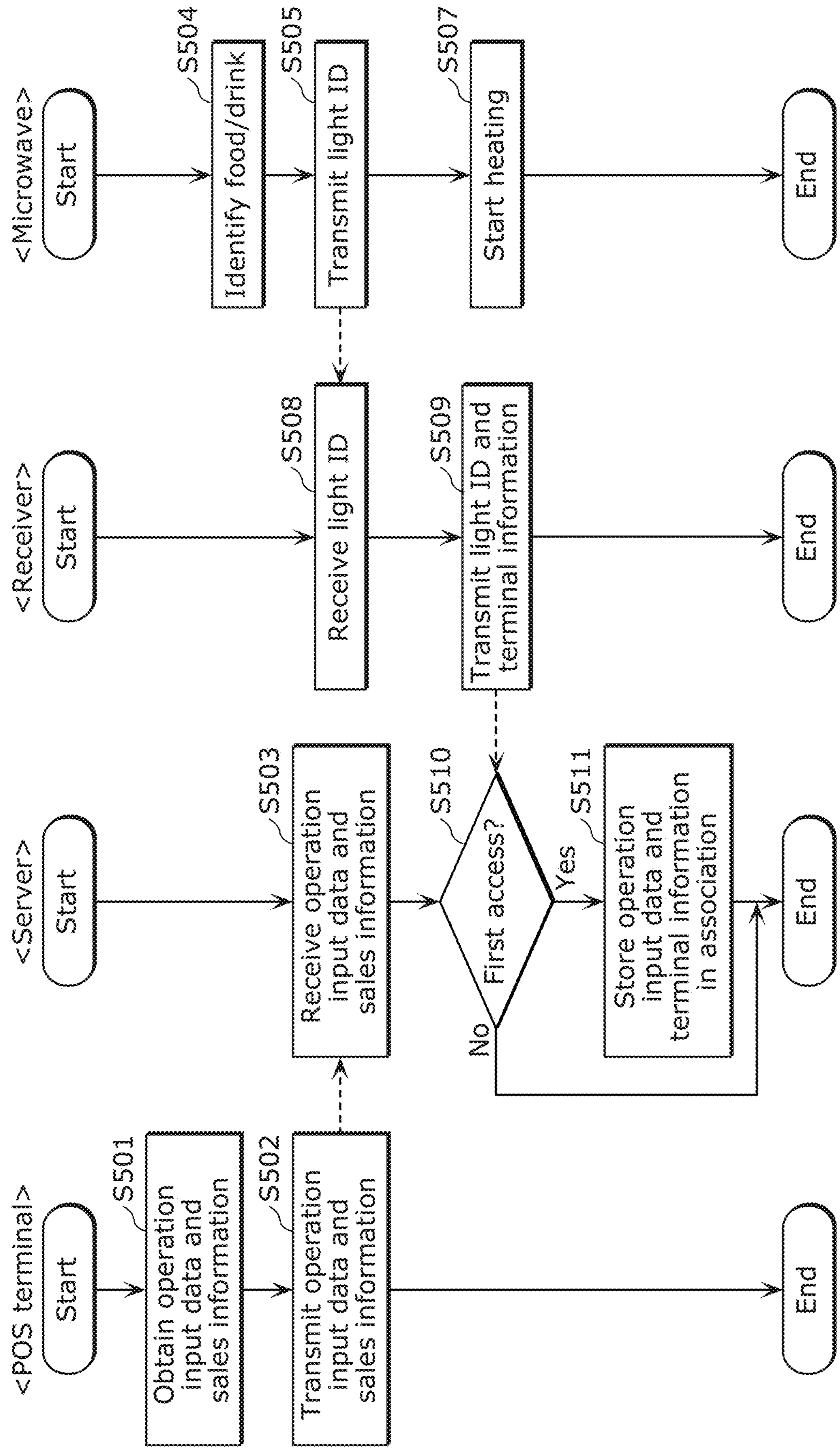

FIG. 115 is a sequence diagram illustrating processing operation of a system which includes a point-of-sale (POS) terminal, a server, a receiver 200, and a microwave, according to Variation 3 of Embodiment 4.

Figure 116:
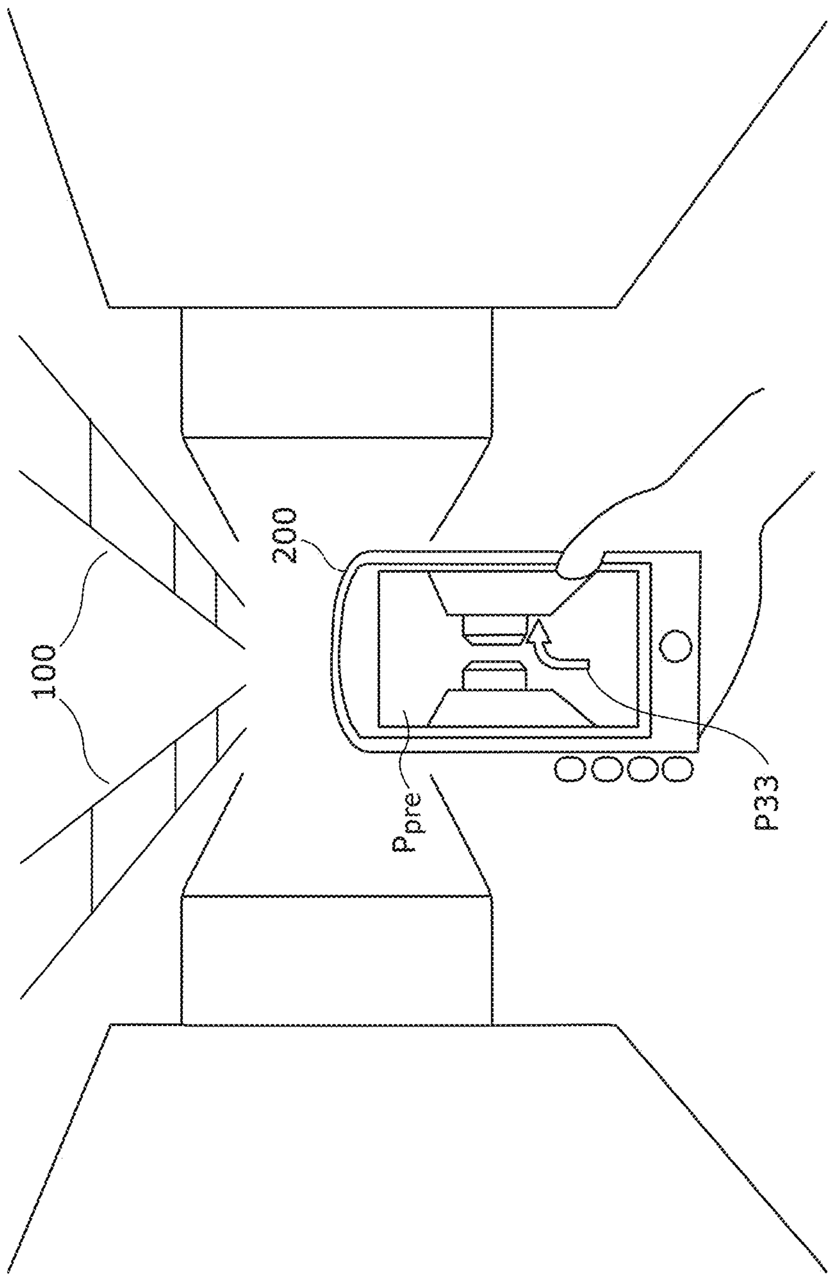

FIG. 116 is a diagram illustrating an example of utilization inside a building, according to Variation 3 of Embodiment 4.

Figure 117:
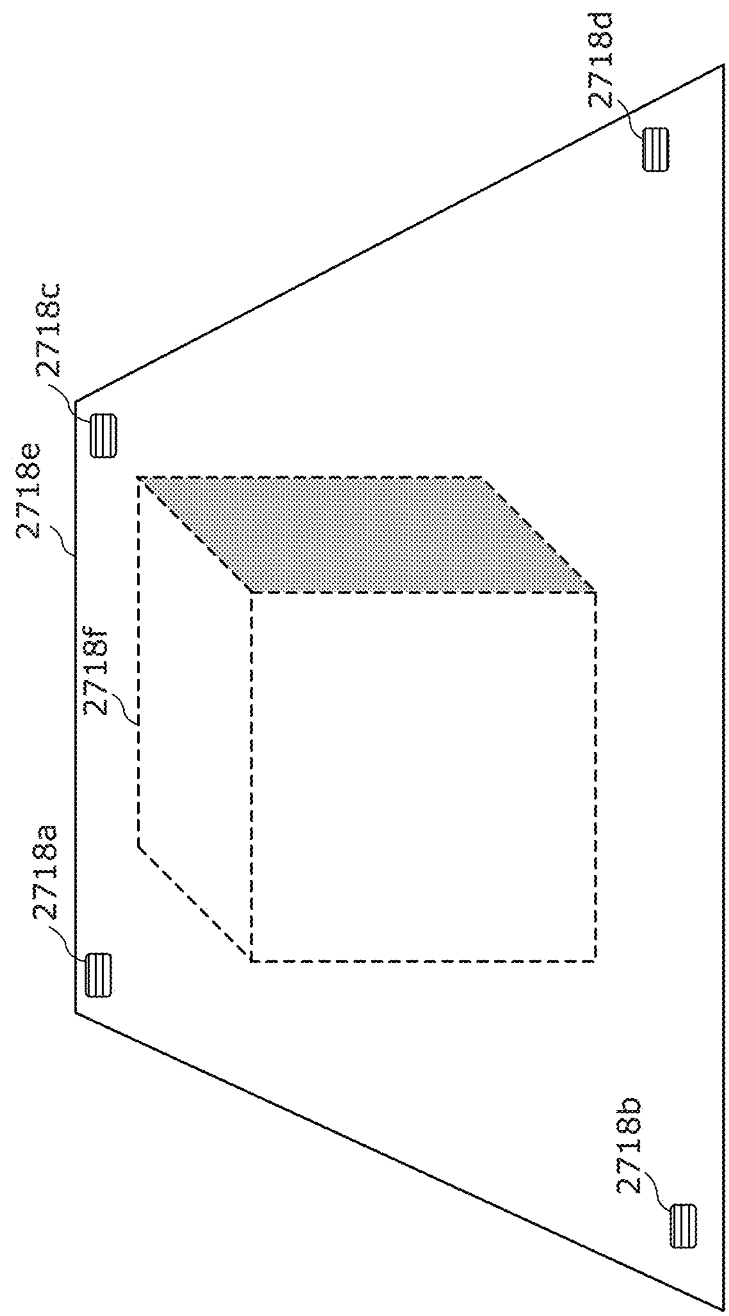

FIG. 117 is a diagram illustrating an example of the display of an augmented reality object according to Variation 3 of Embodiment 4.

Figure 118:
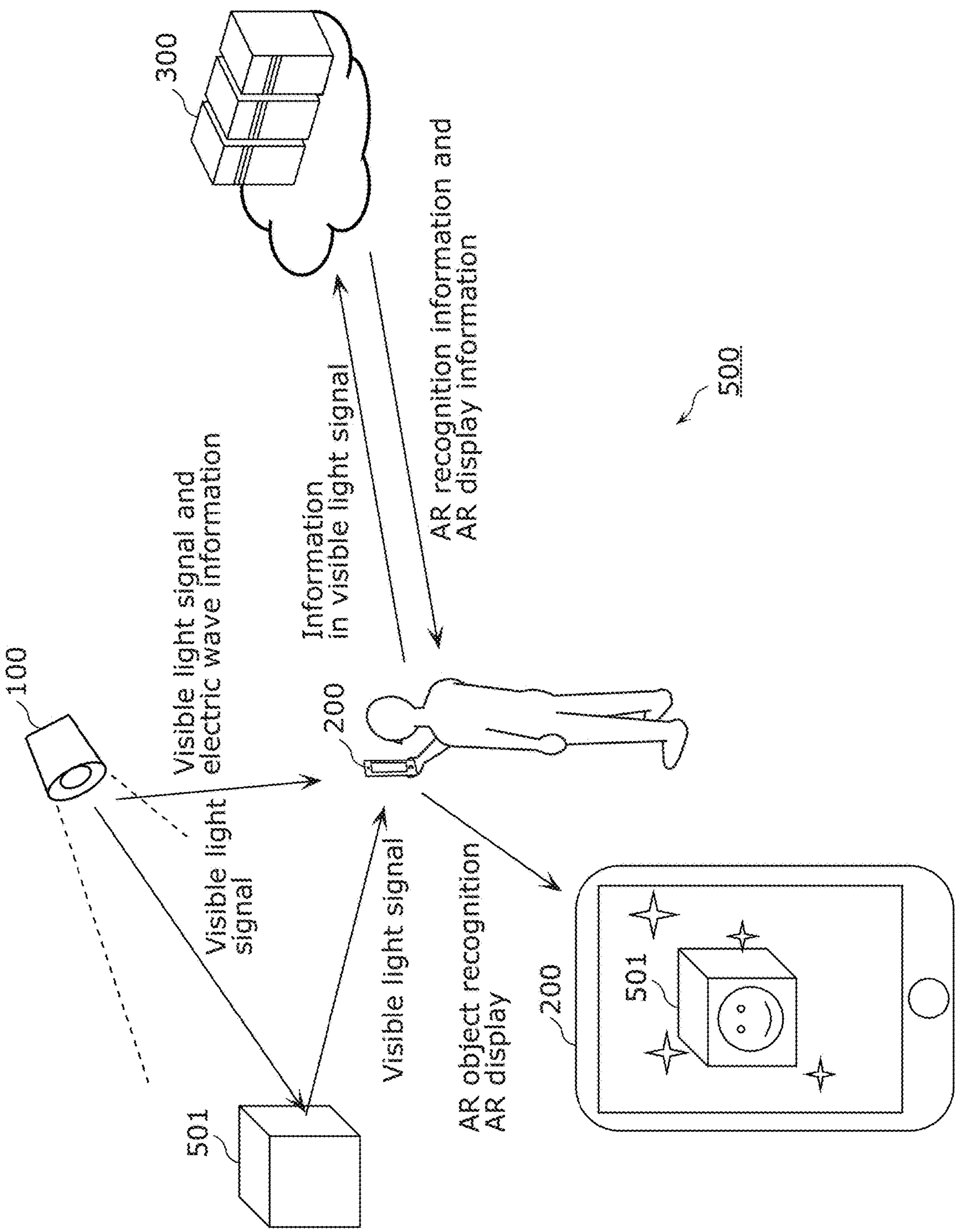

FIG. 118 is a diagram illustrating a configuration of a display system according to Variation 4 of Embodiment 4.

Figure 119:
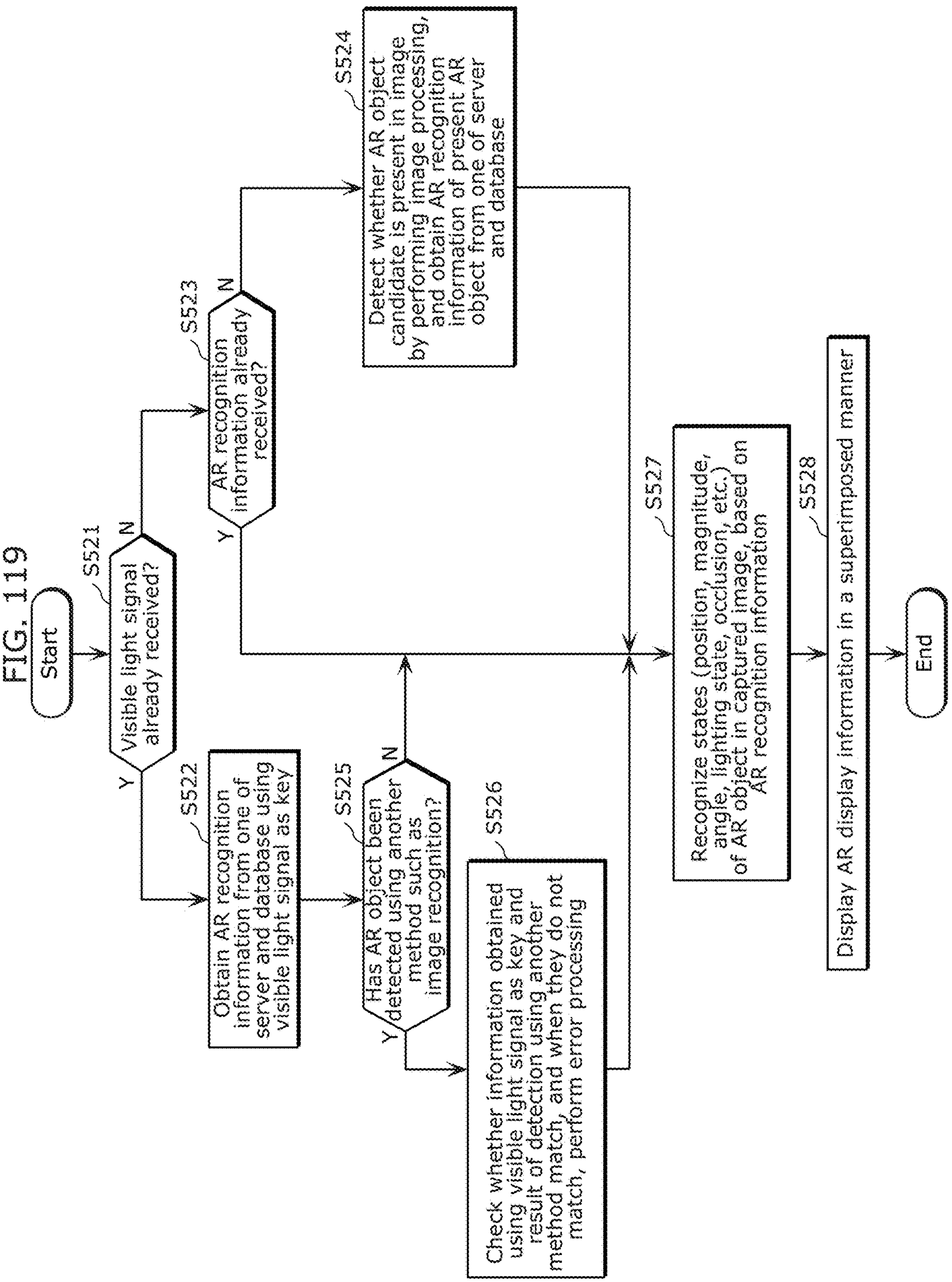

FIG. 119 is a flowchart indicating processing operations performed by a display system according to Variation 4 of Embodiment 4.

Figure 120:
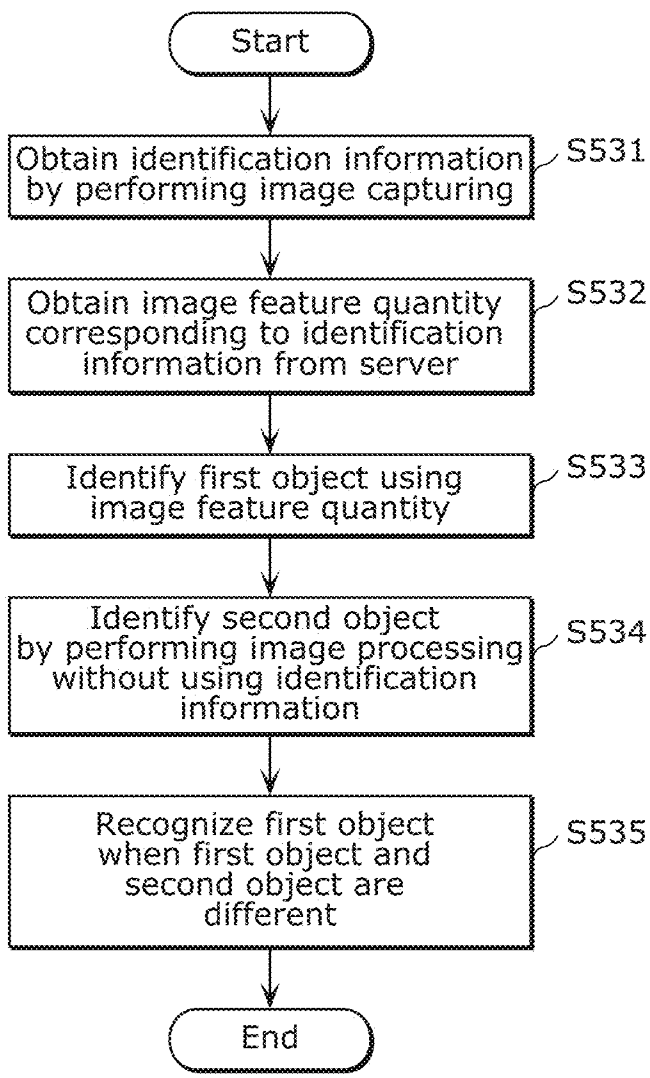

FIG. 120 is a flowchart indicating a recognition method according to an aspect of the present disclosure.

FIG. 121 is a diagram indicating examples of operation modes of visible light signals according to Embodiment 5.

Figure 122A:
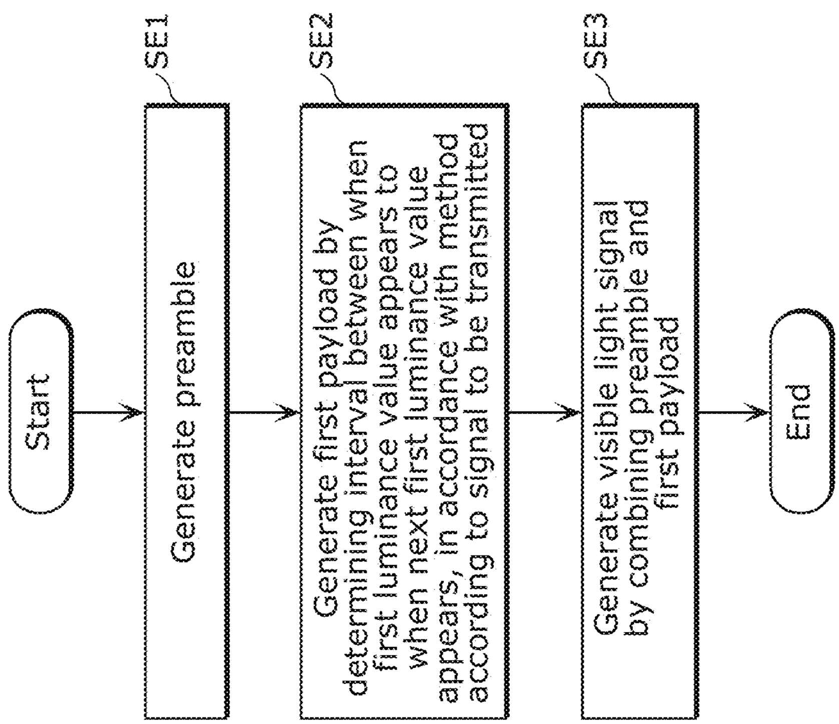

FIG. 122A is a flowchart indicating a method for generating a visible light signal according to Embodiment 5.

Figure 122B:
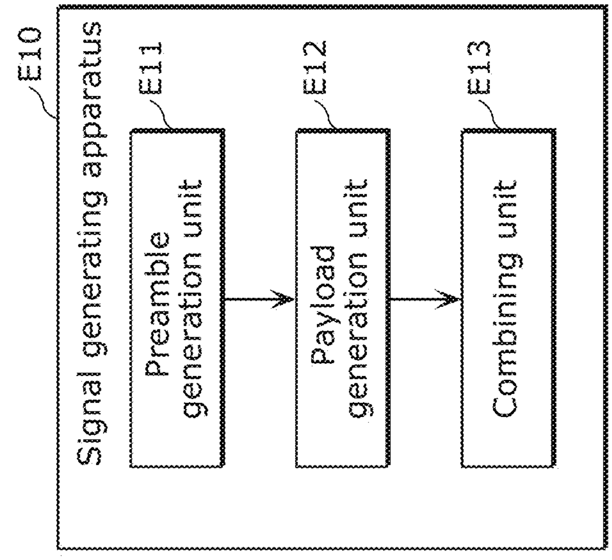

FIG. 122B is a block diagram illustrating a configuration of a signal generating apparatus according to Embodiment 5.

FIG. 123 is a diagram indicating formats of MAC frames in MPM according to Embodiment 6.

Figure 124:
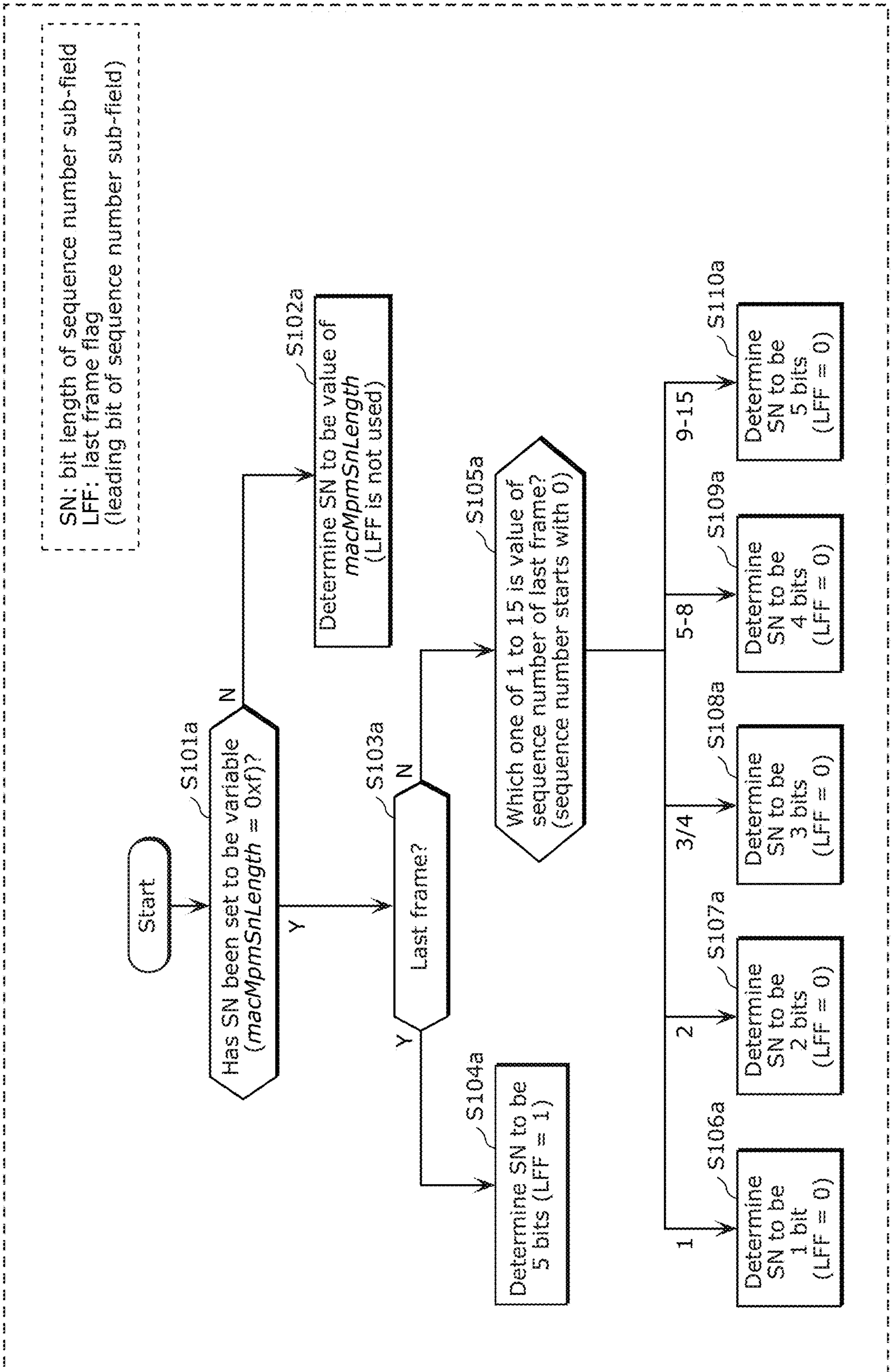

FIG. 124 is a flowchart indicating processing operations performed by an encoding apparatus which generates MAC frames in MPM according to Embodiment 6.

Figure 125:
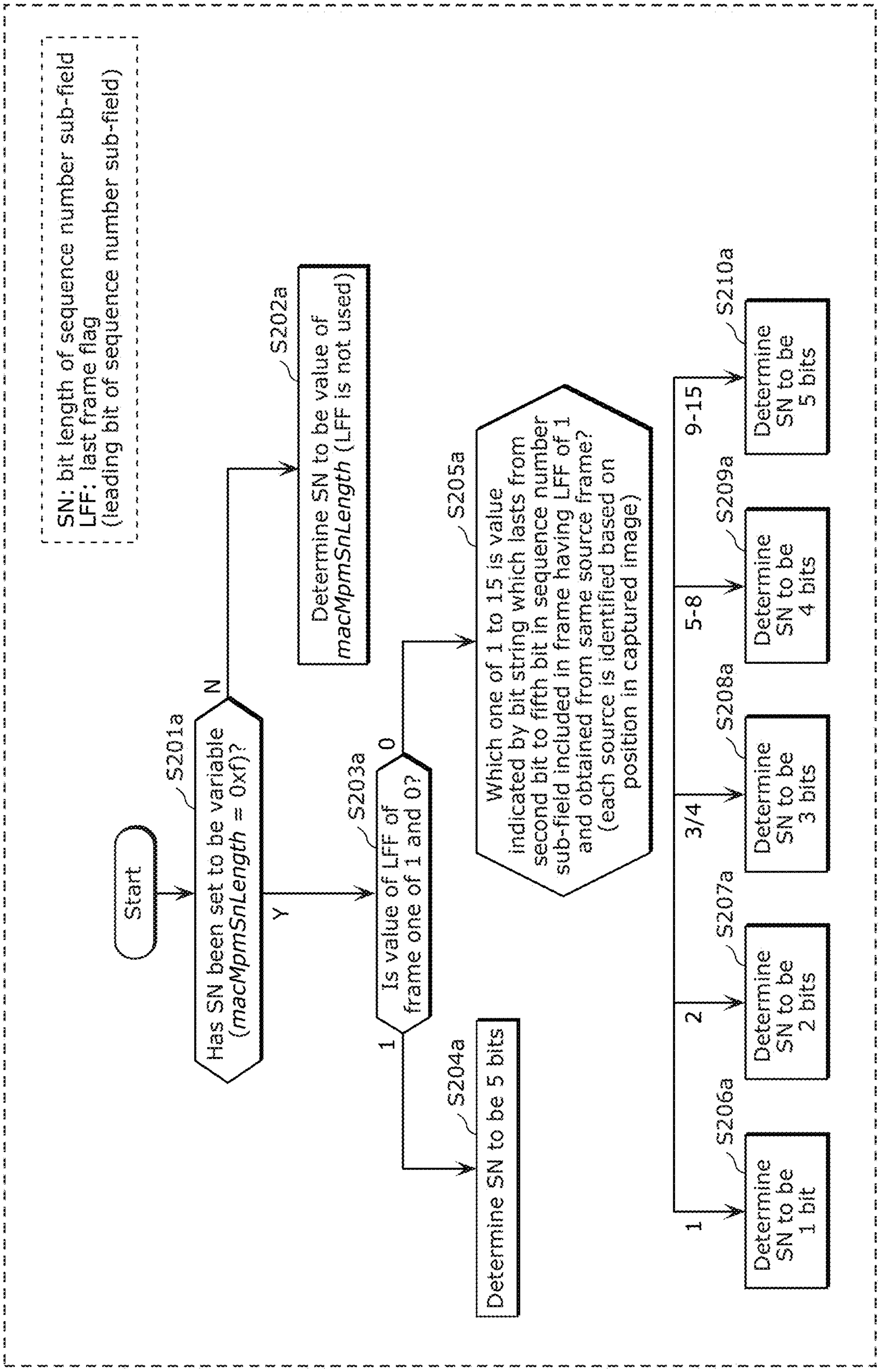

FIG. 125 is a flowchart indicating processing operations performed by a decoding apparatus which decodes MAC frames in MPM according to Embodiment 6.

FIG. 126 is a diagram indicating PIB attributes in MAC according to Embodiment 6.

Figure 127:
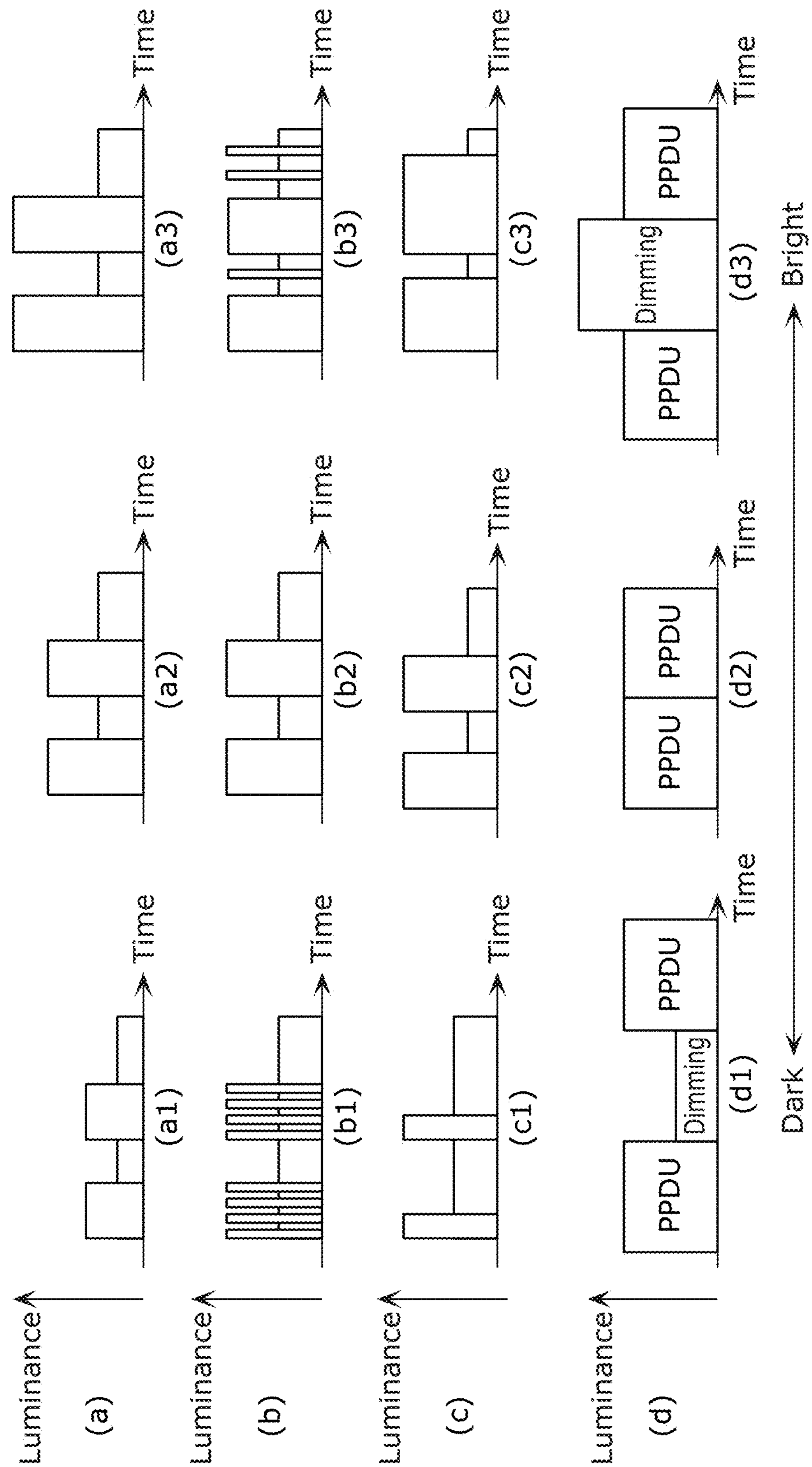

FIG. 127 is a diagram for explaining dimming methods in MPM according to Embodiment 6.

FIG. 128 is a diagram indicating PIB attributes in a PHY according to Embodiment 6.

Figure 129:
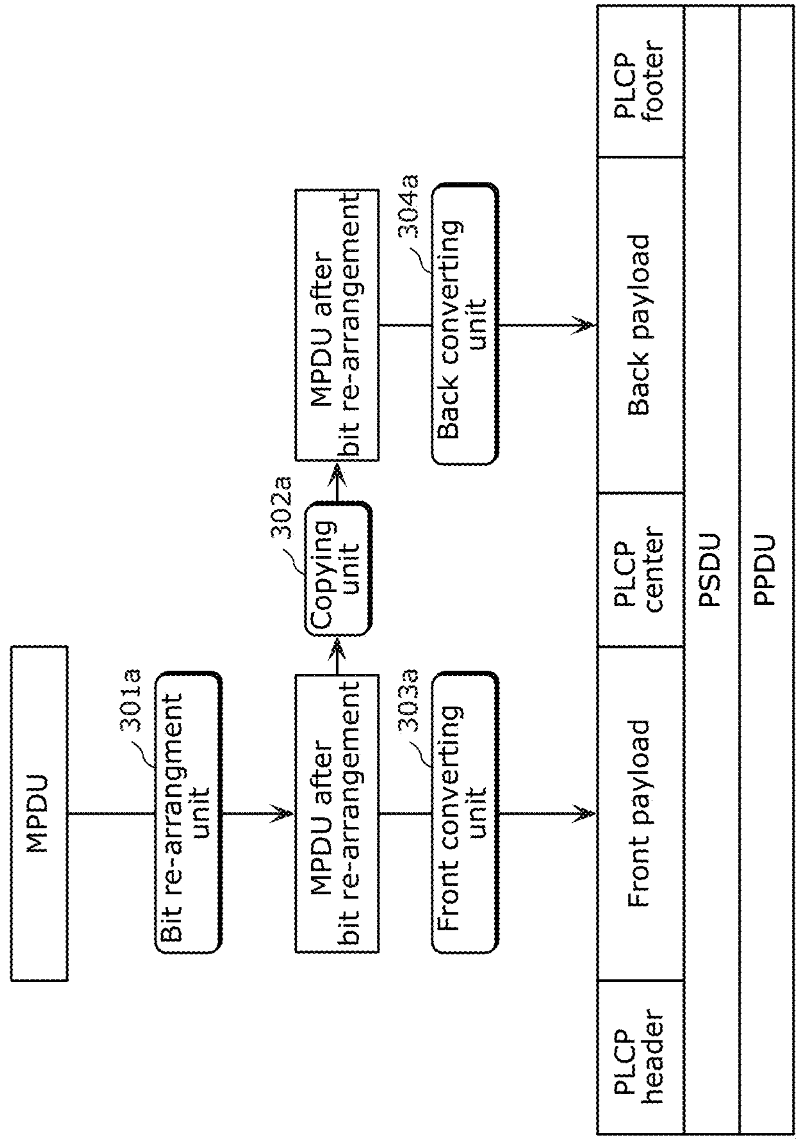

FIG. 129 is a diagram for explaining MPM according to Embodiment 6.

FIG. 130 is a diagram indicating PLCP header sub-fields according to Embodiment 6.

FIG. 131 is a diagram indicating PLCP center sub-fields according to Embodiment 6.

FIG. 132 is a diagram indicating PLCP footer sub-fields according to Embodiment 6.

Figure 133:
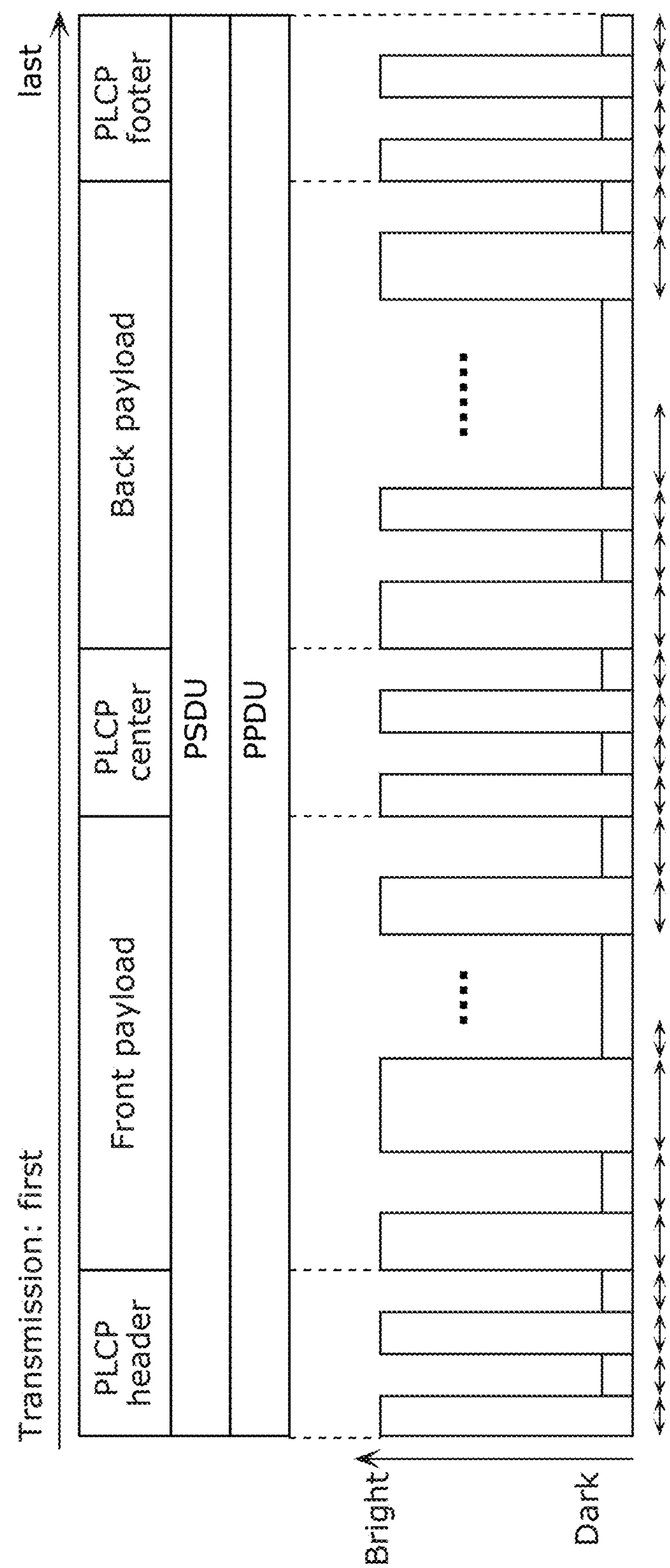

FIG. 133 is a diagram illustrating a waveform in a PWM mode of a PHY in MPM according to Embodiment 6.

Figure 134:
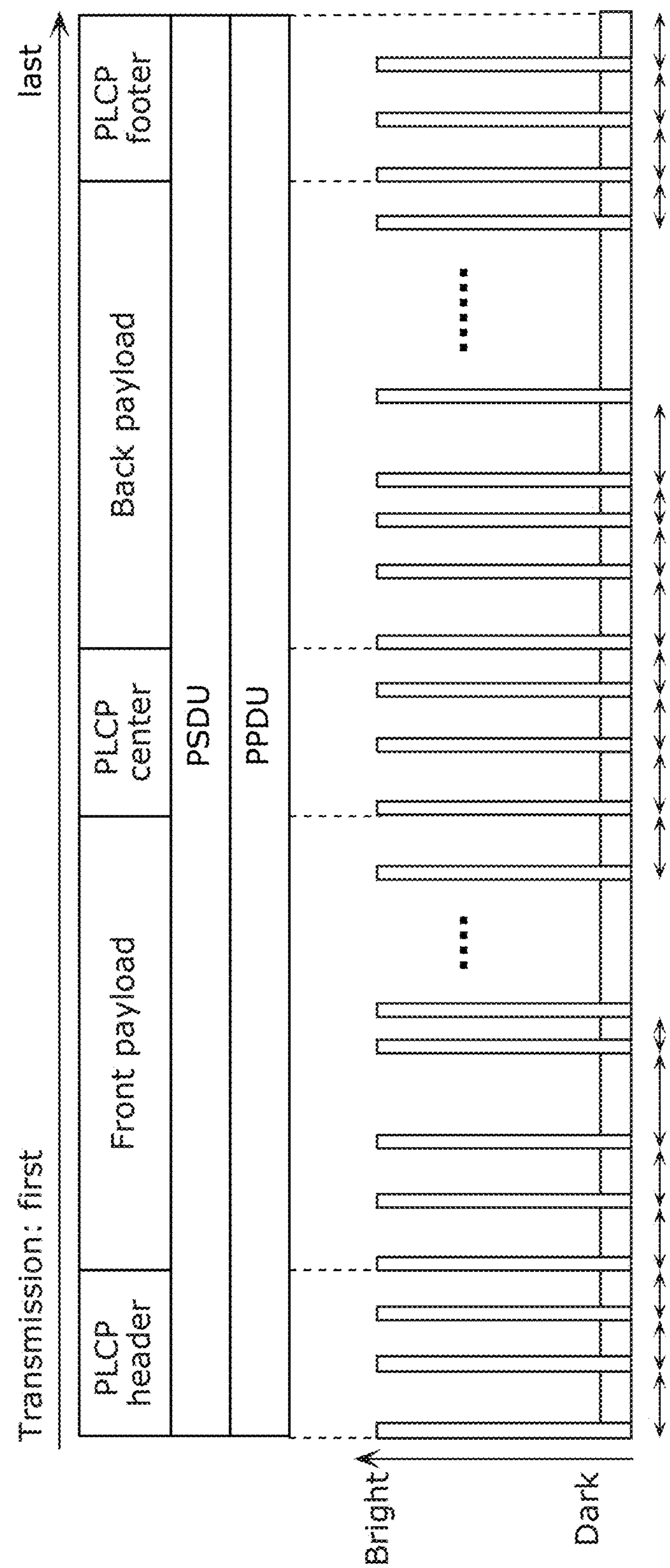

FIG. 134 is a diagram illustrating a waveform in a PPM mode of a PHY in MPM according to Embodiment 6.

Figure 135:
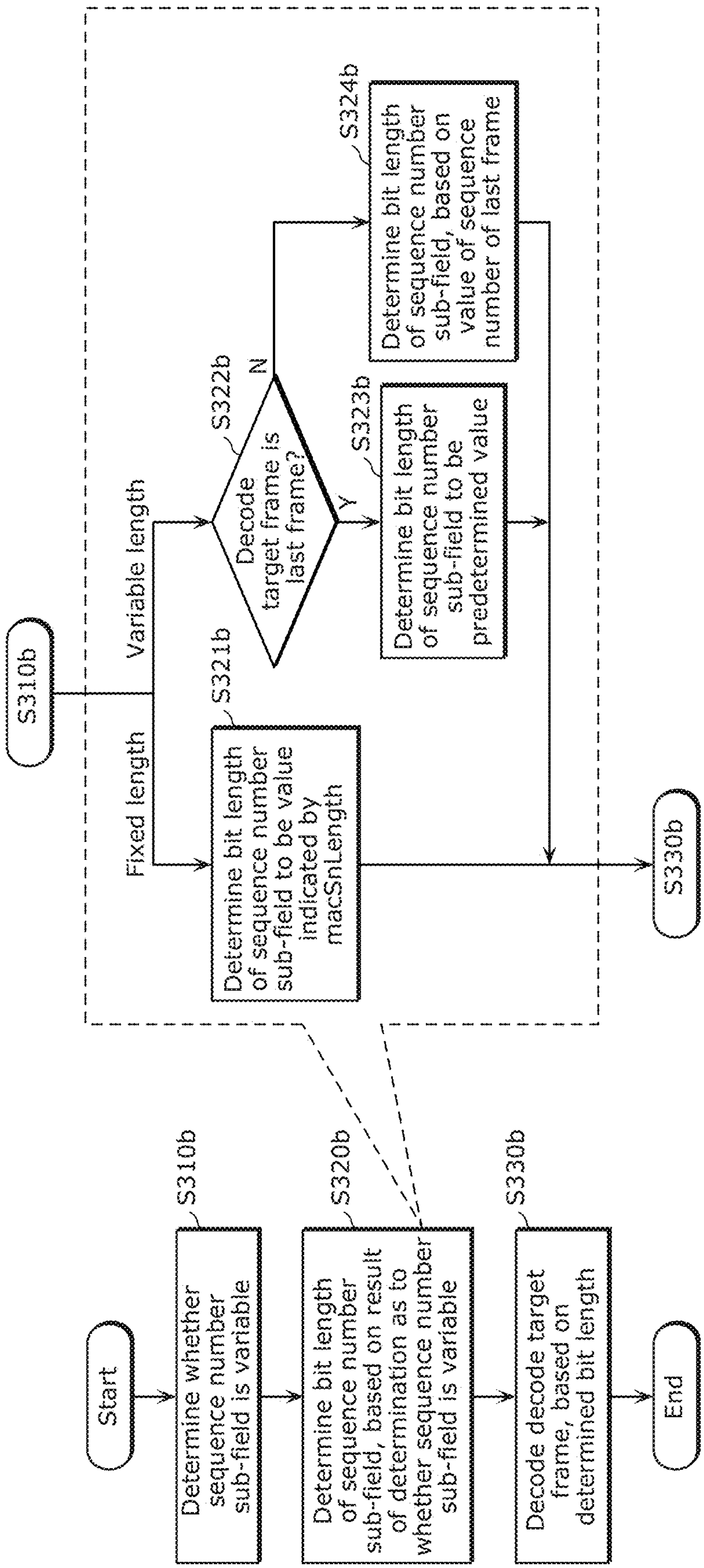

FIG. 135 is a flowchart indicating an example of a decoding method according to Embodiment 6.

Figure 136:
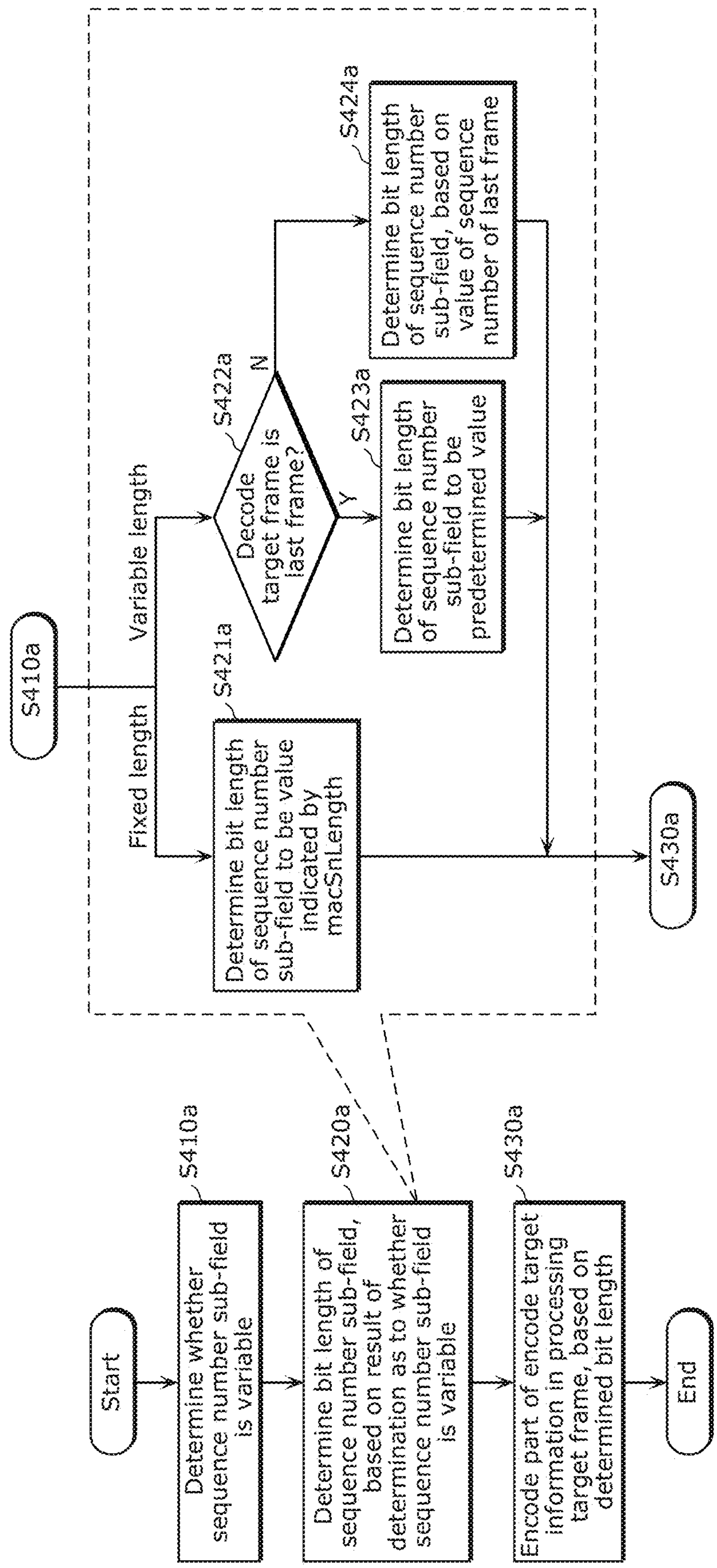

FIG. 136 is a flowchart indicating an example of an encoding method according to Embodiment 6.

Figure 137:
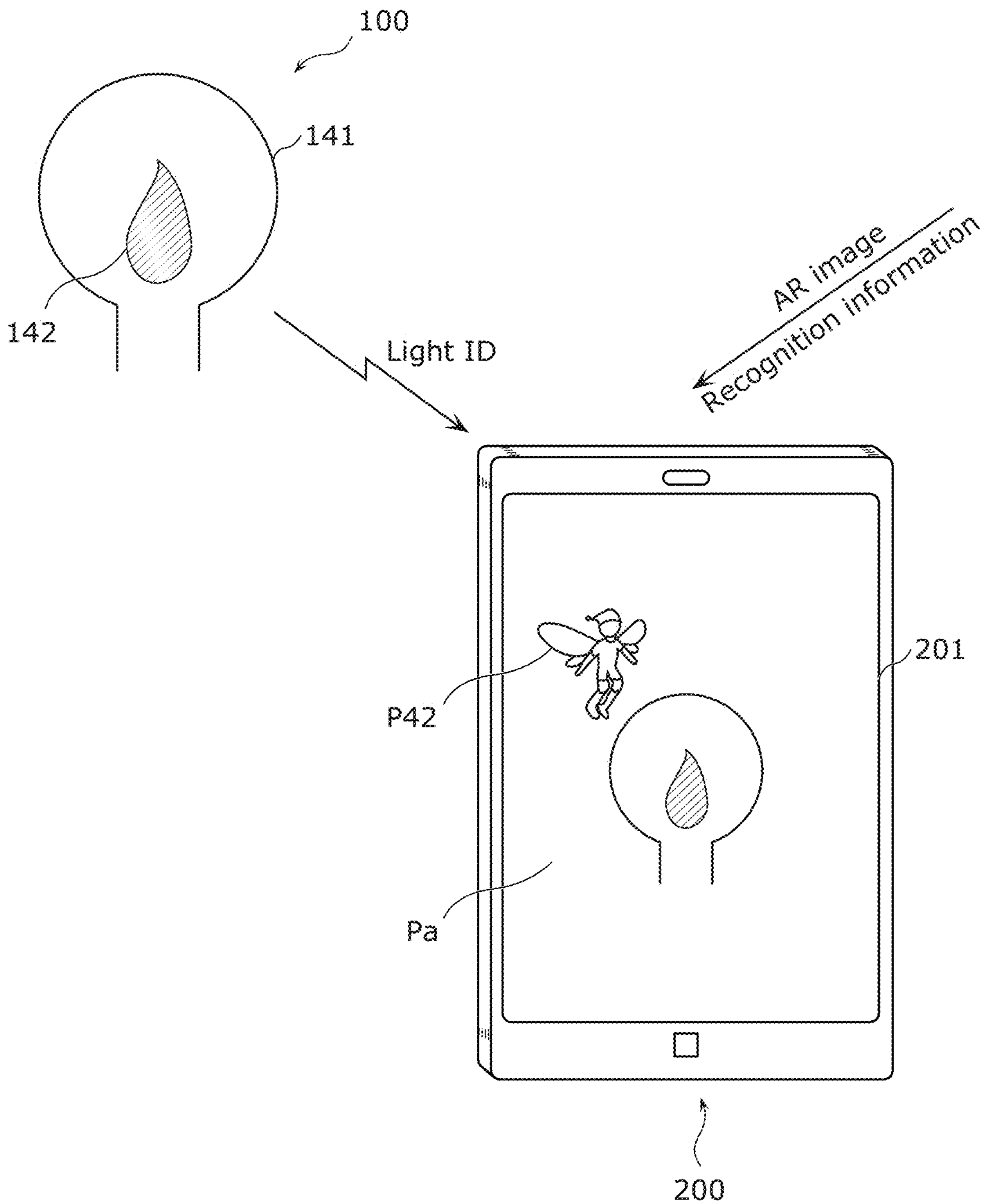

FIG. 137 is a diagram illustrating an example in which a receiver according to Embodiment 7 displays an AR image.

Figure 138:
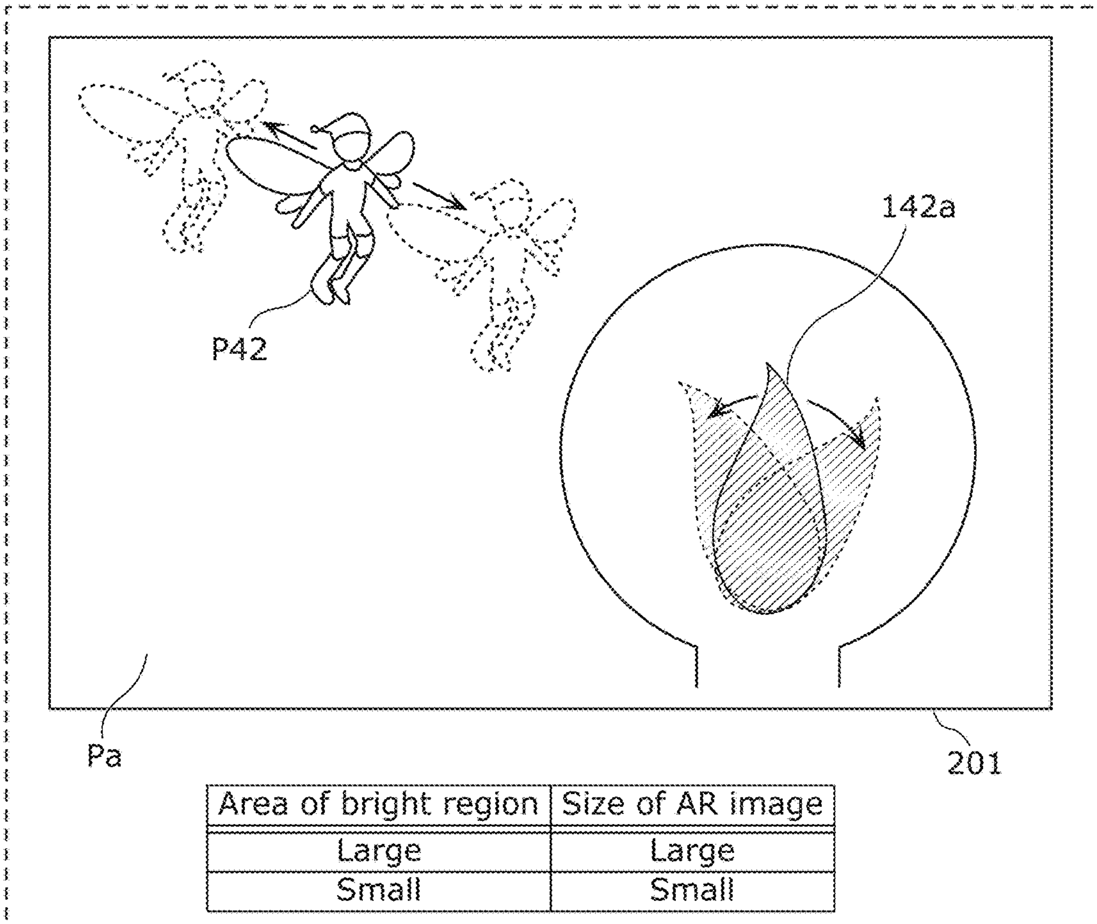

FIG. 138 is a diagram illustrating an example of a captured display image in which an AR image has been superimposed, according to Embodiment 7.

Figure 139:
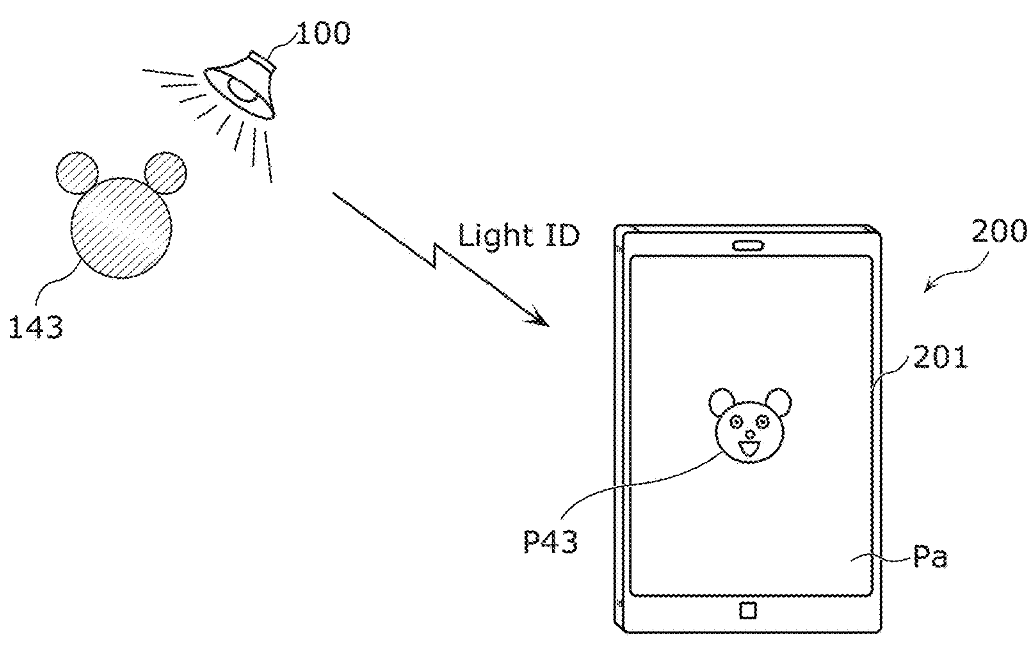

FIG. 139 is a diagram illustrating an example in which the receiver according to Embodiment 7 displays an AR image.

Figure 140:
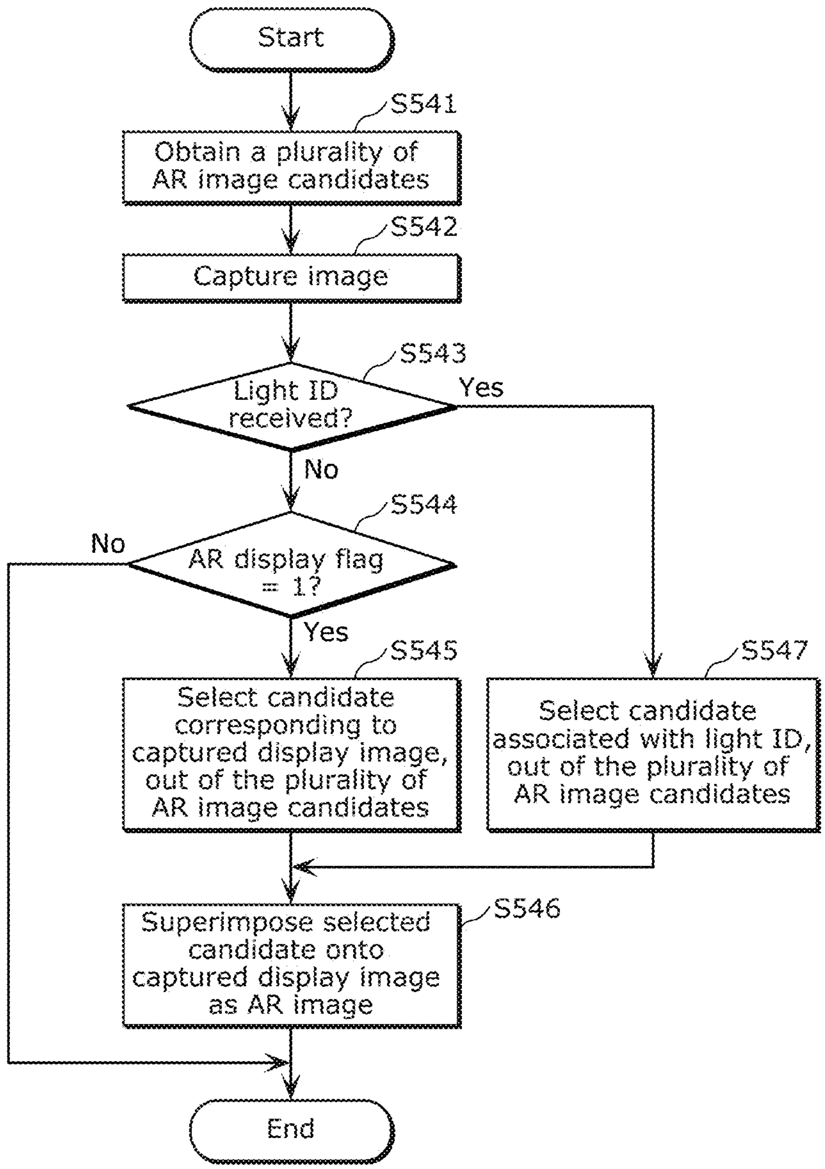

FIG. 140 is a flowchart indicating operations performed by the receiver according to Embodiment 7.

FIG. 141 is a diagram for explaining operations performed by a transmitter according to Embodiment 7.

Figure 142:
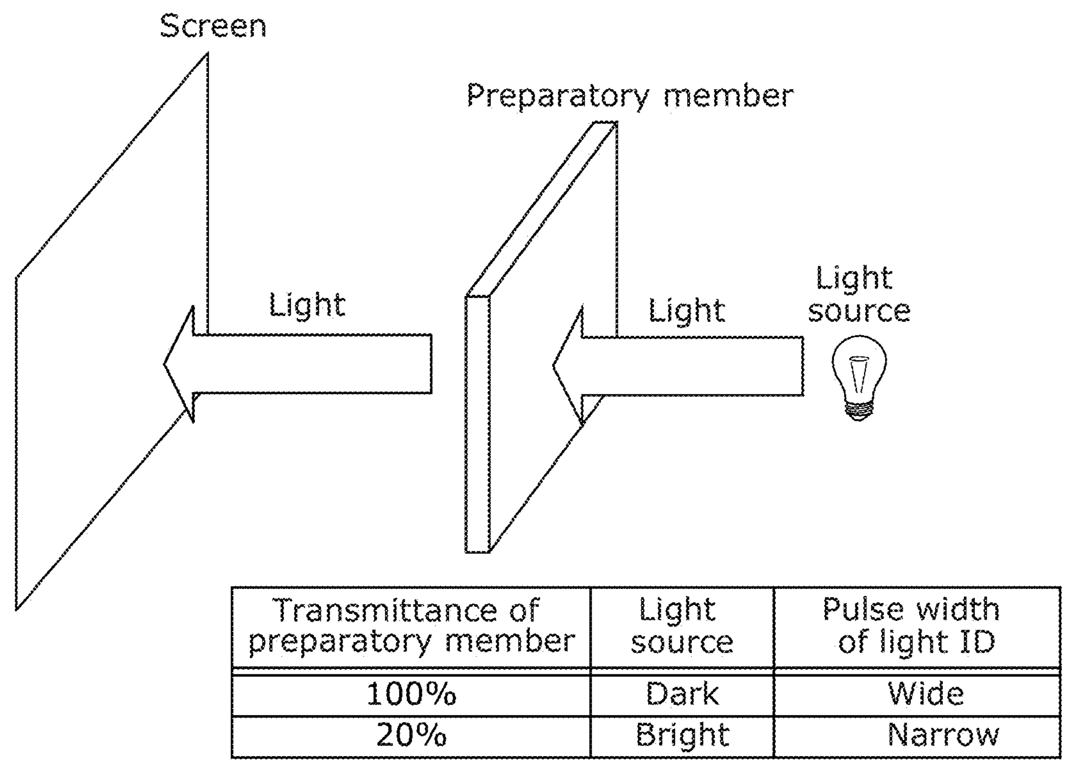

FIG. 142 is a diagram for explaining other operations performed by the transmitter according to Embodiment 7.

Figure 143:
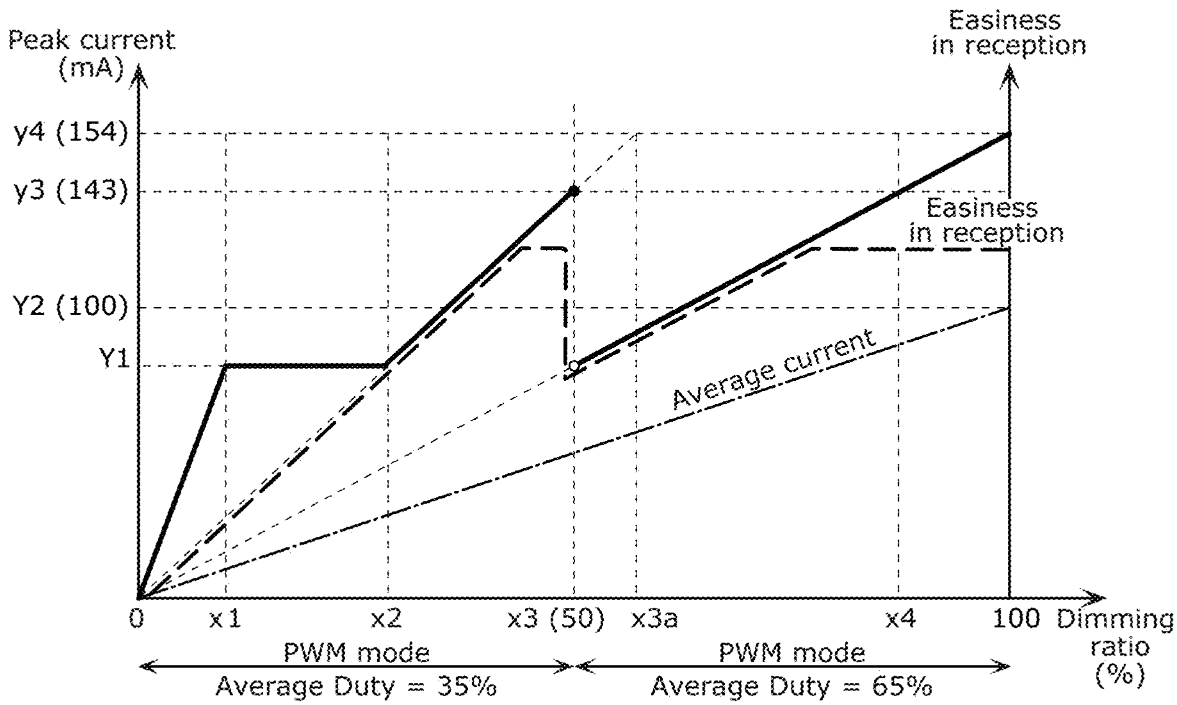

FIG. 143 is a diagram for explaining other operations performed by the transmitter according to Embodiment 7.

Figure 144:
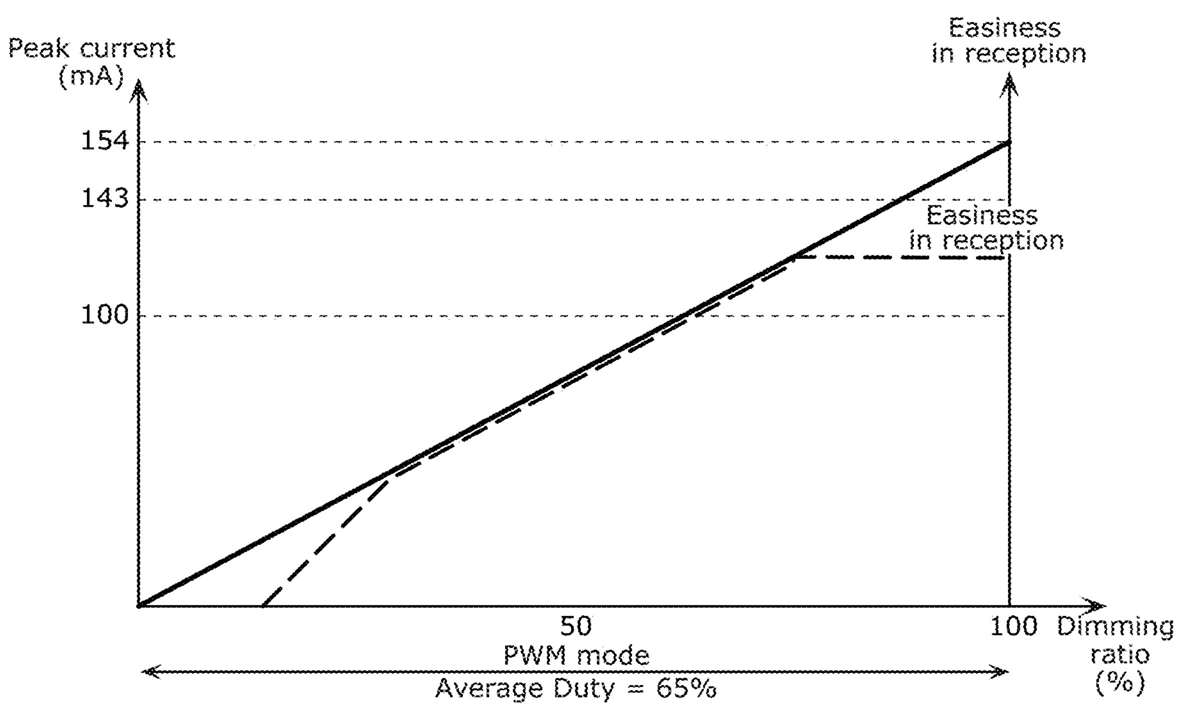

FIG. 144 is a diagram explaining a comparative example used to illustrate easiness in reception of a light ID according to Embodiment 7.

Figure 145A:
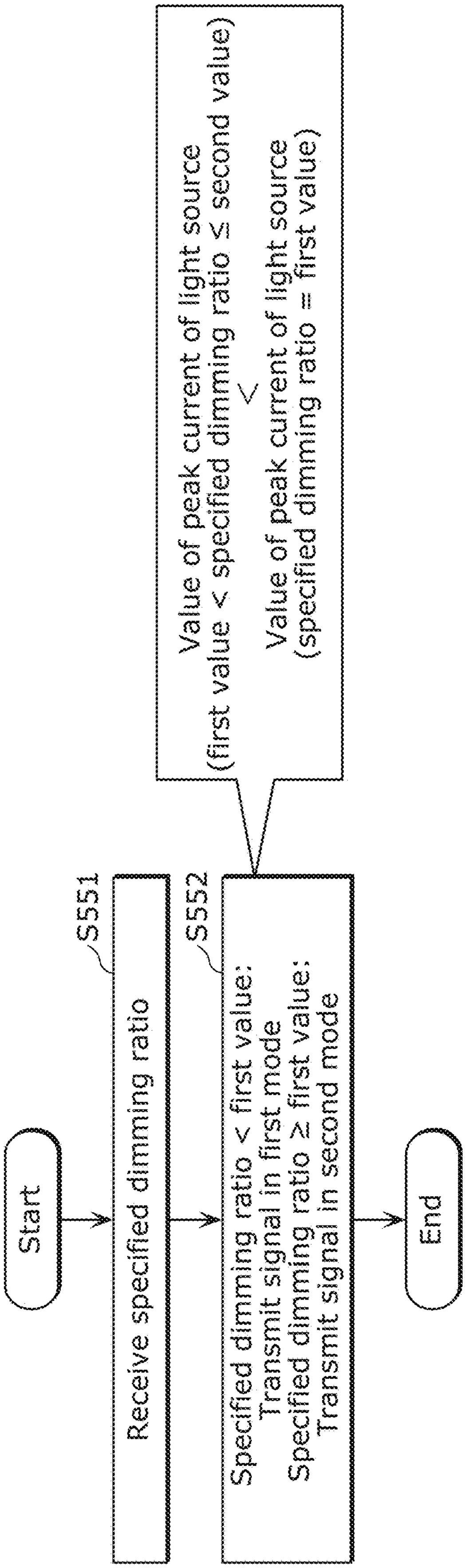

FIG. 145A is a flowchart indicating operations performed by a transmitter according to Embodiment 7.

Figure 145B:
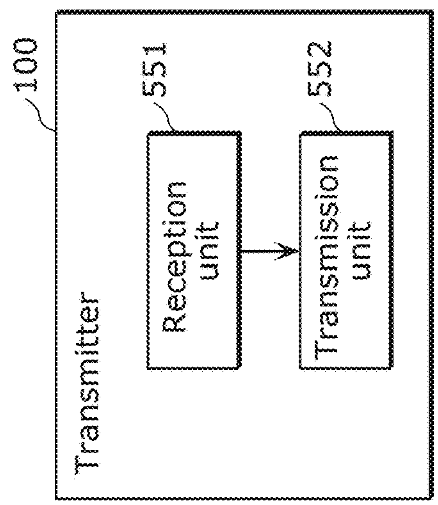

FIG. 145B is a block diagram illustrating a configuration of the transmitter according to Embodiment 7.

Figure 146:
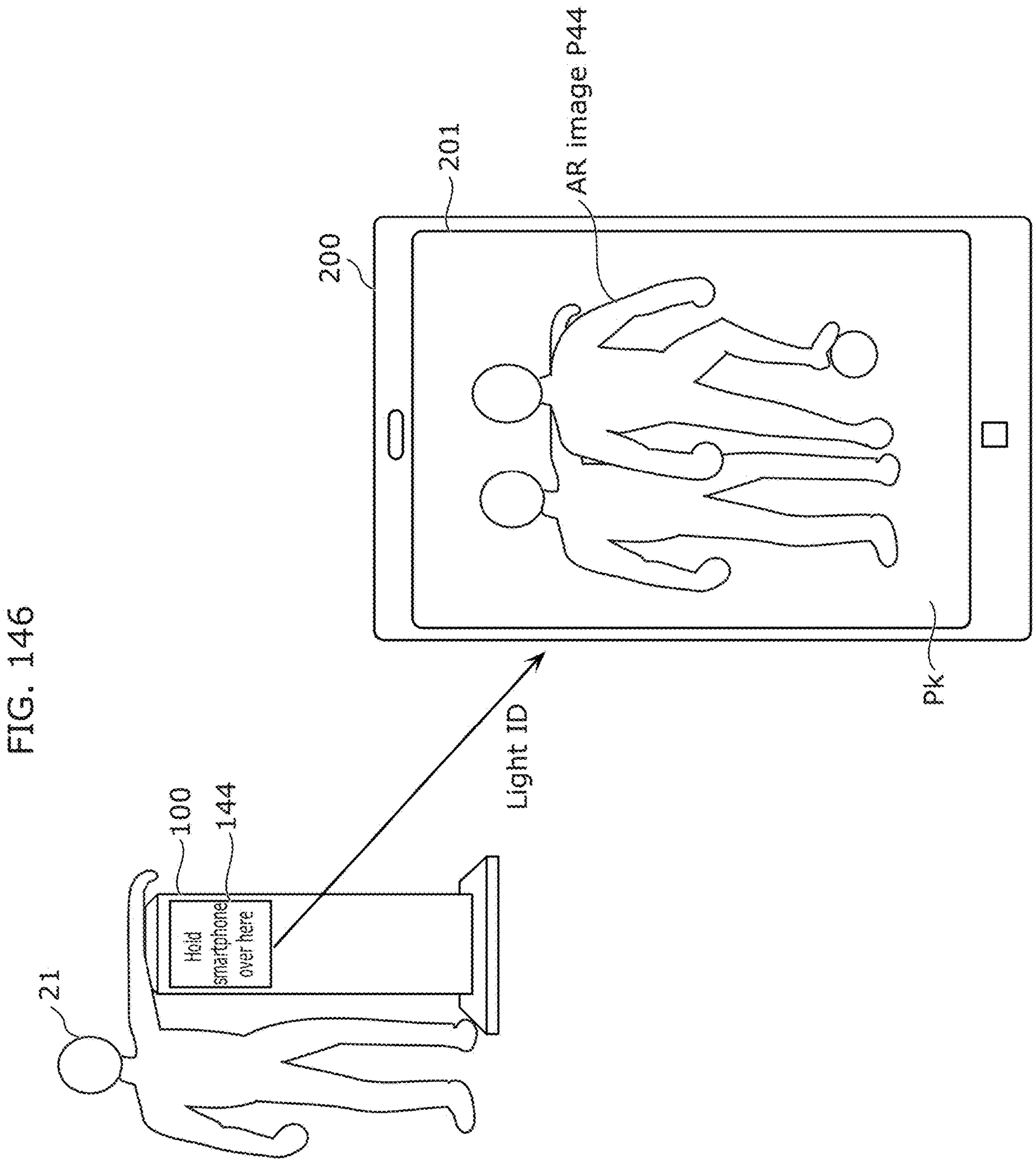

FIG. 146 is a diagram illustrating an example in which the receiver according to Embodiment 7 displays an AR image.

Figure 147:
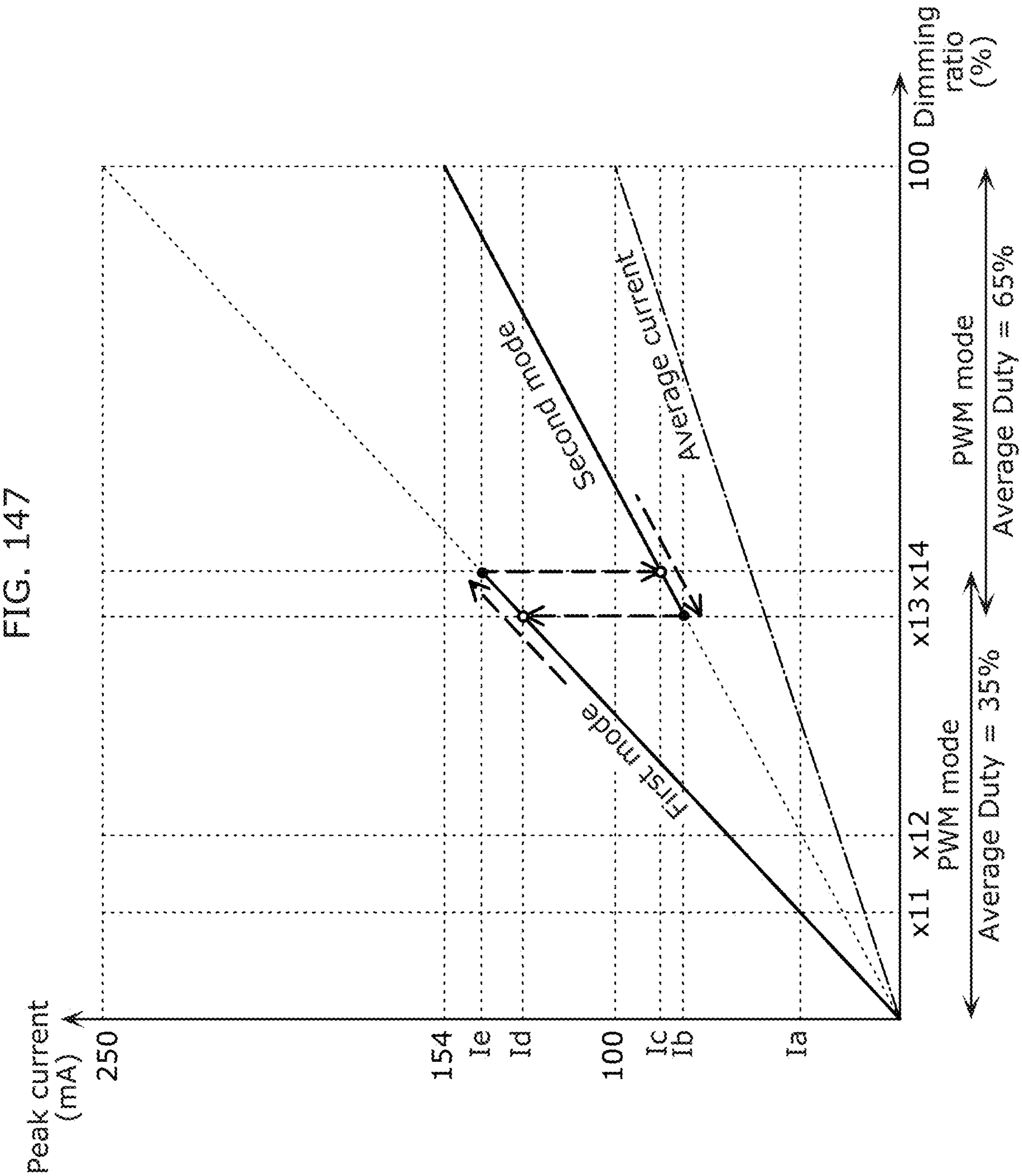

FIG. 147 is a diagram for explaining operations performed by a transmitter according to Embodiment 8.

Figure 148A:
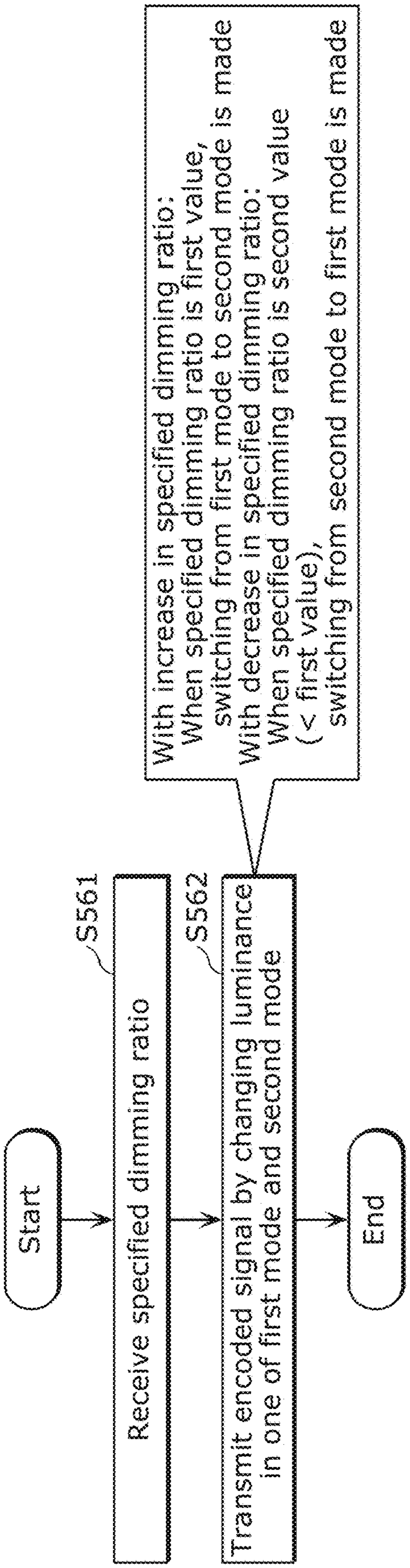

FIG. 148A is a flowchart indicating a transmitting method according to Embodiment 8.

Figure 148B:
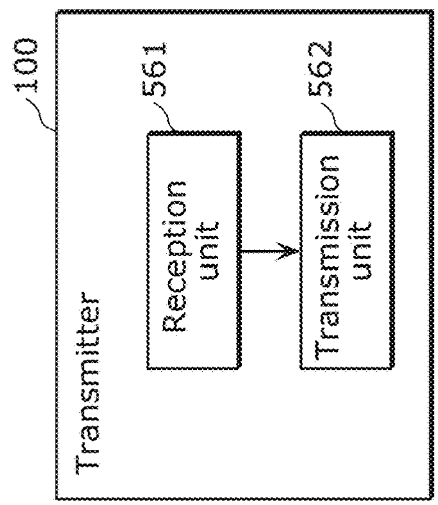

FIG. 148B is a block diagram illustrating a configuration of the transmitter according to Embodiment 8.

Figure 149:
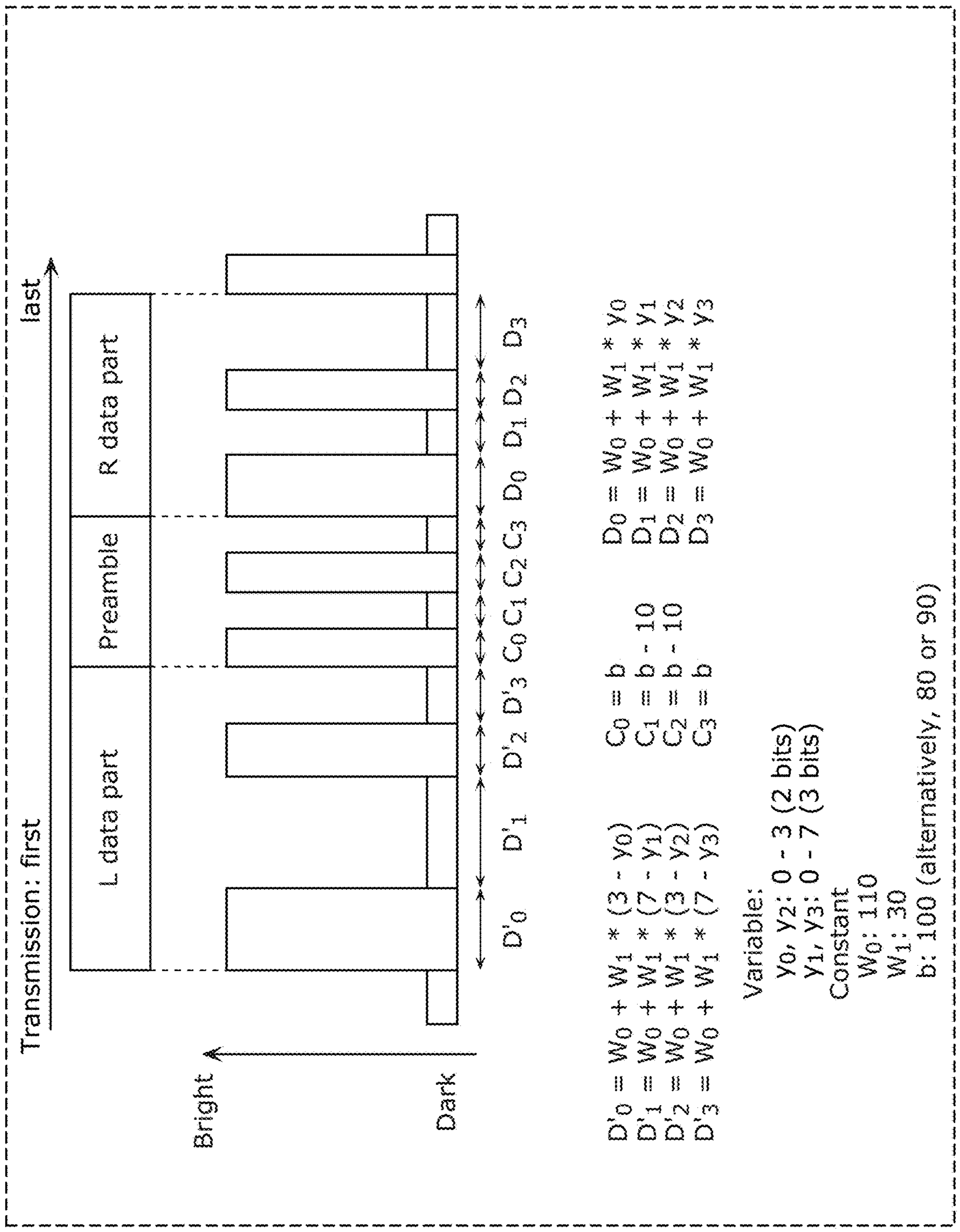

FIG. 149 is a diagram illustrating an example of a specific configuration of a visible light signal according to Embodiment 8.

Figure 150:
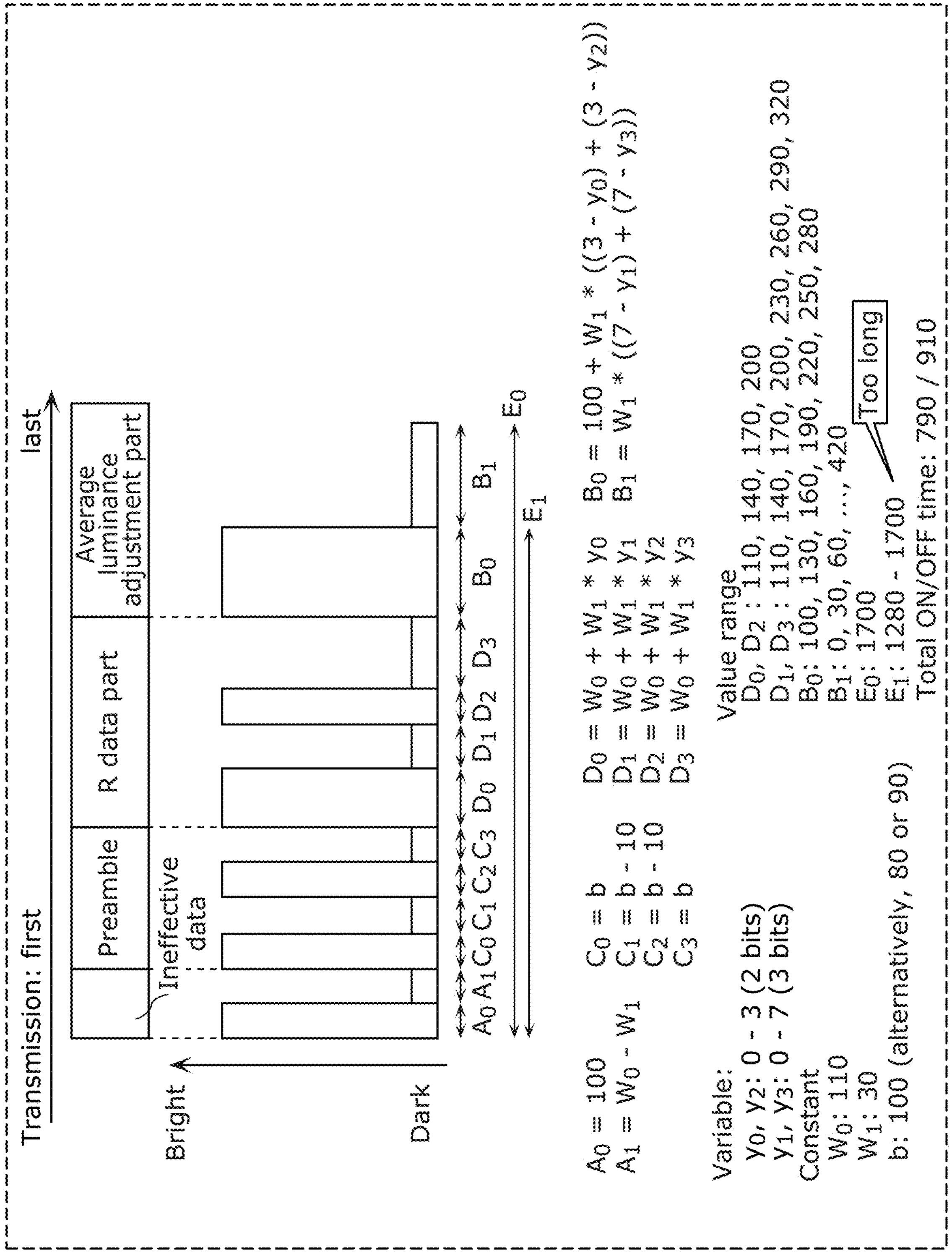

FIG. 150 is a diagram illustrating another example of a specific configuration of a visible light signal according to Embodiment 8.

Figure 151:
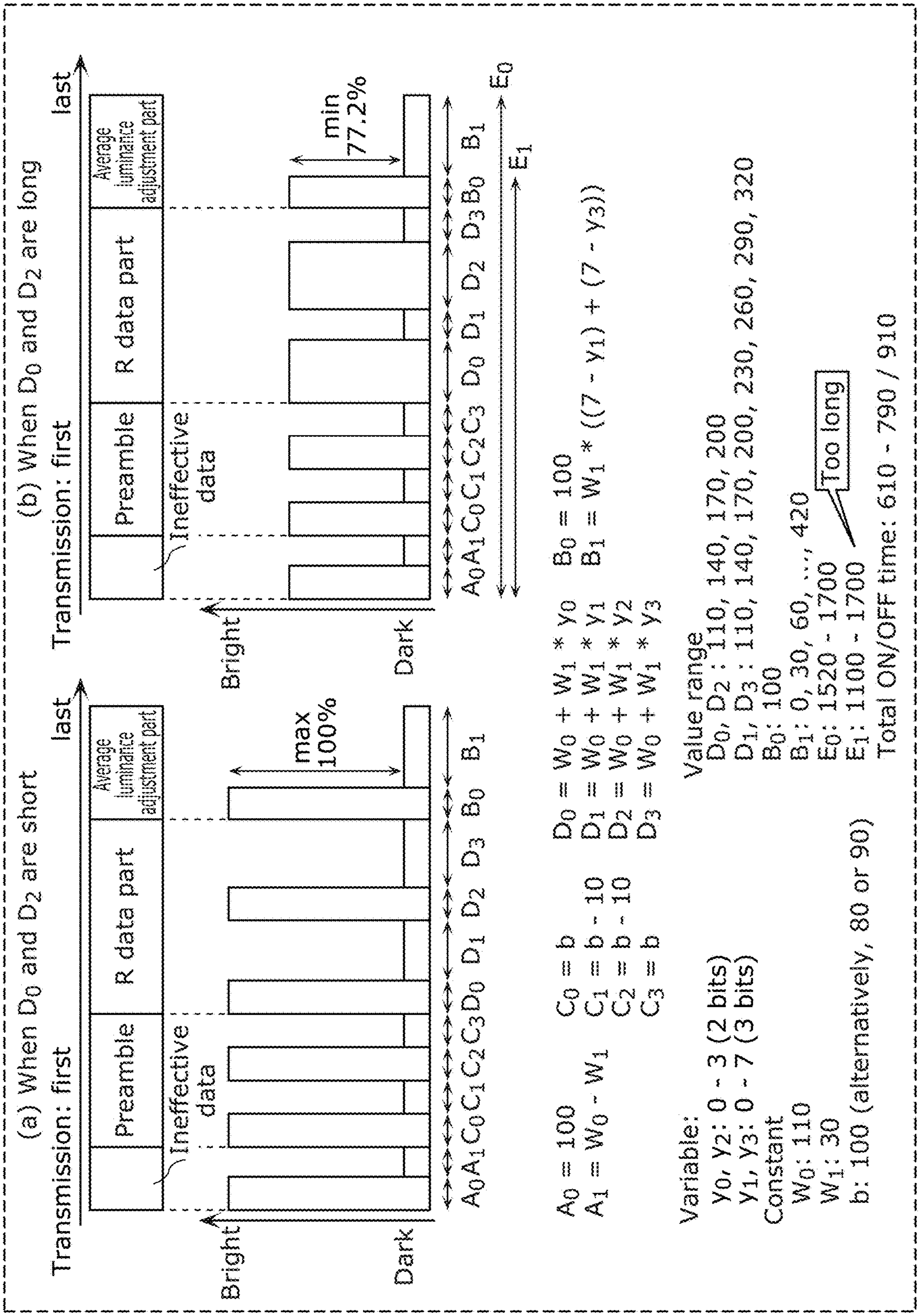

FIG. 151 is a diagram illustrating another example of a specific configuration of a visible light signal according to Embodiment 8.

Figure 152:
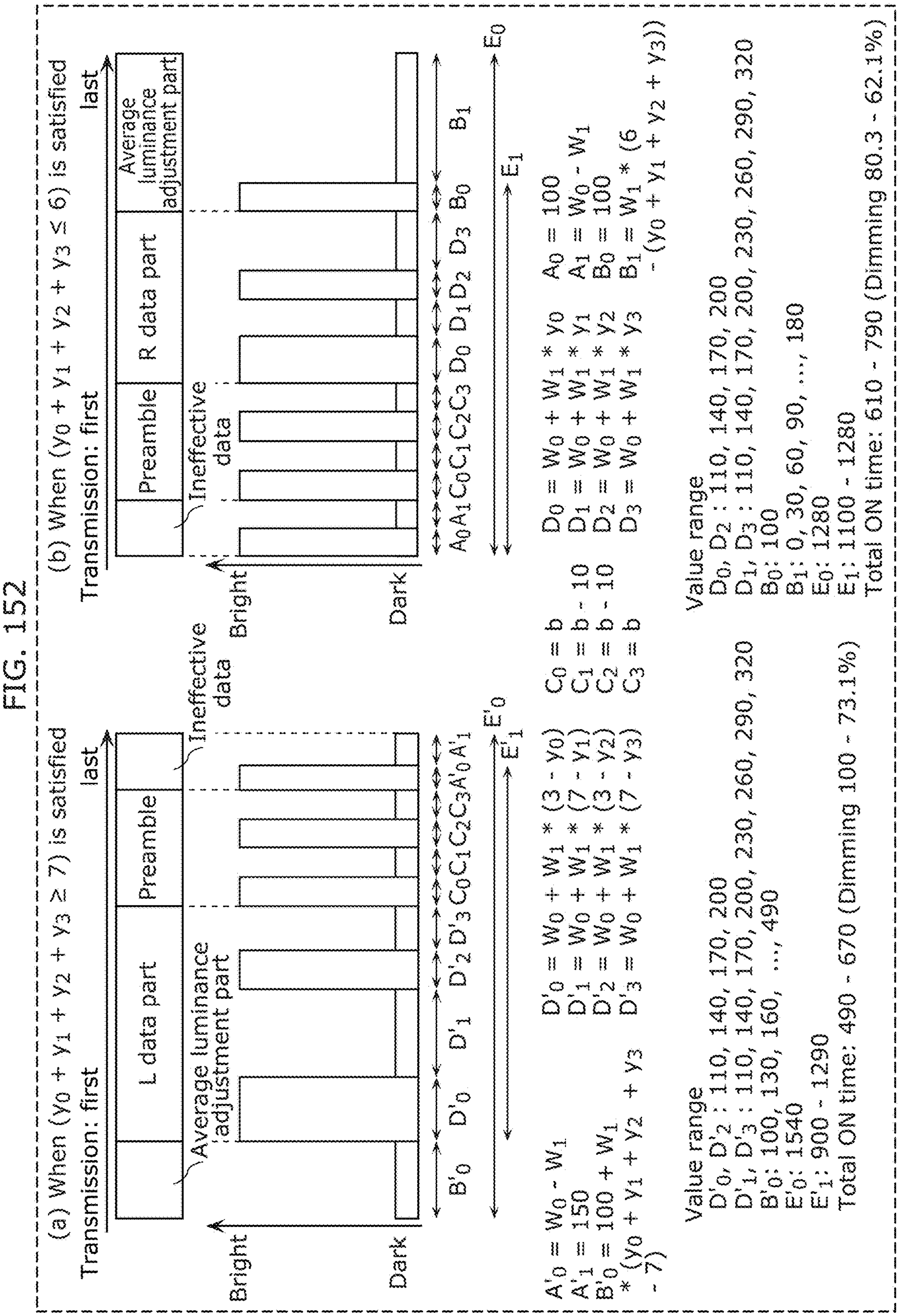

FIG. 152 is a diagram illustrating another example of a specific configuration of a visible light signal according to Embodiment 8.

Figure 153:
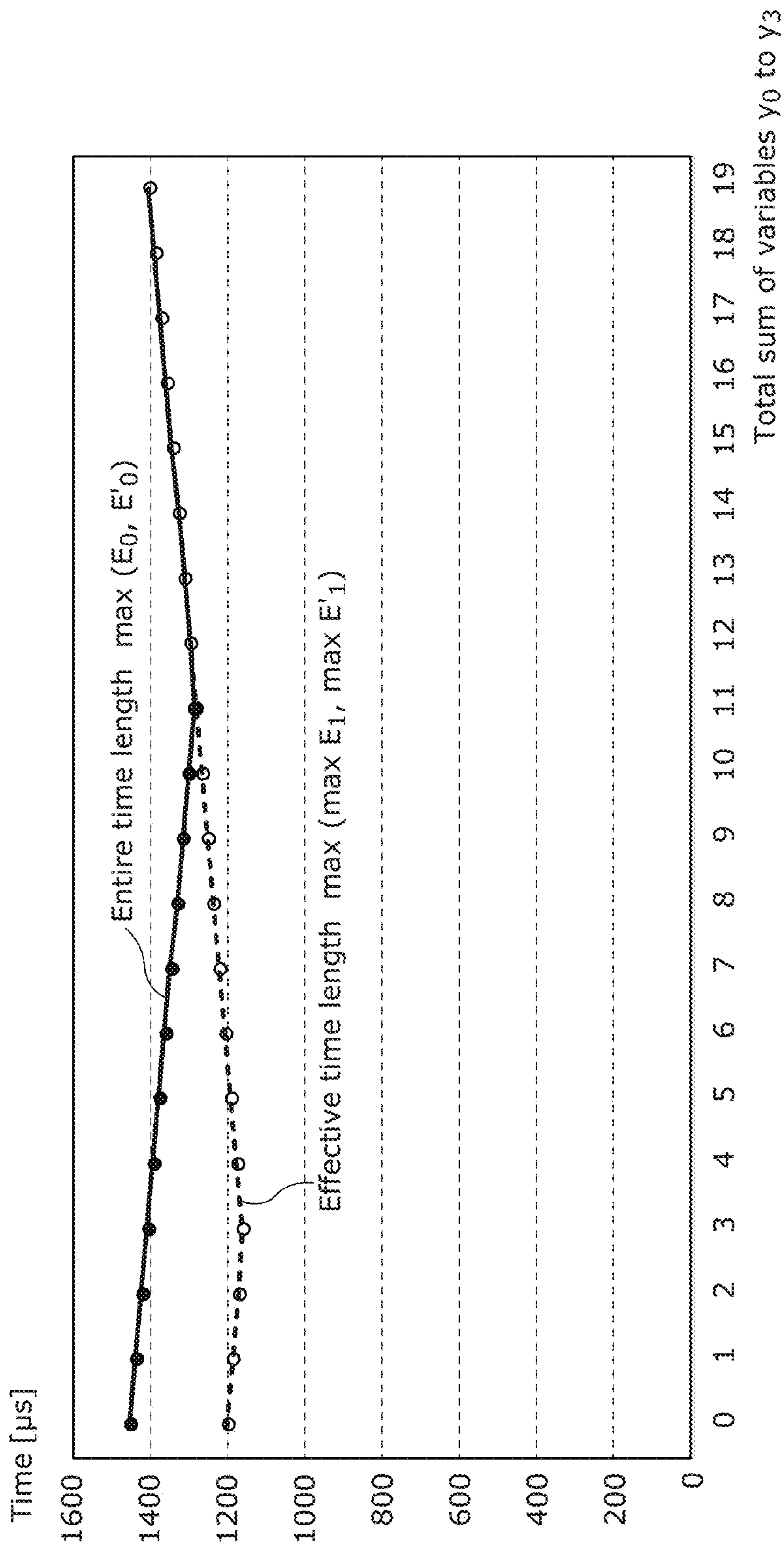

FIG. 153 is a diagram illustrating relations between a total sum of variables $y_0$ to $y_3$, the entire time length, and an effective time length according to Embodiment 8.

Figure 154A:
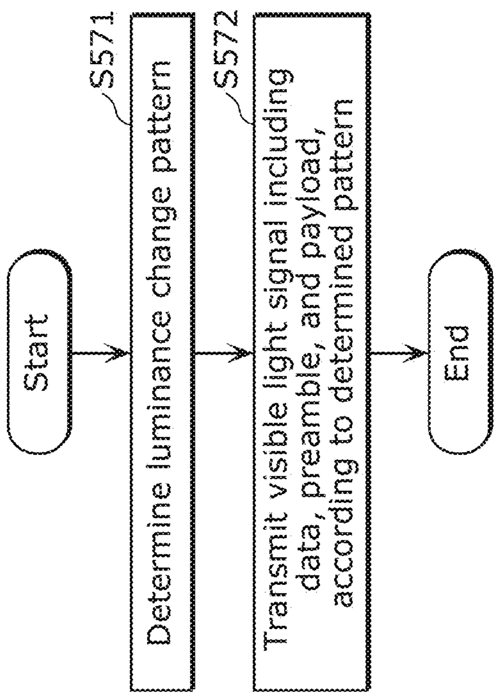

FIG. 154A is a flowchart indicating a transmitting method according to Embodiment 8.

Figure 154B:
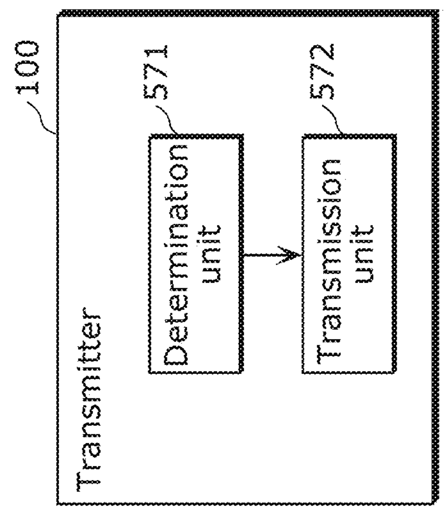

FIG. 154B is a block diagram illustrating a configuration of the transmitter according to Embodiment 8.

Figure 155:
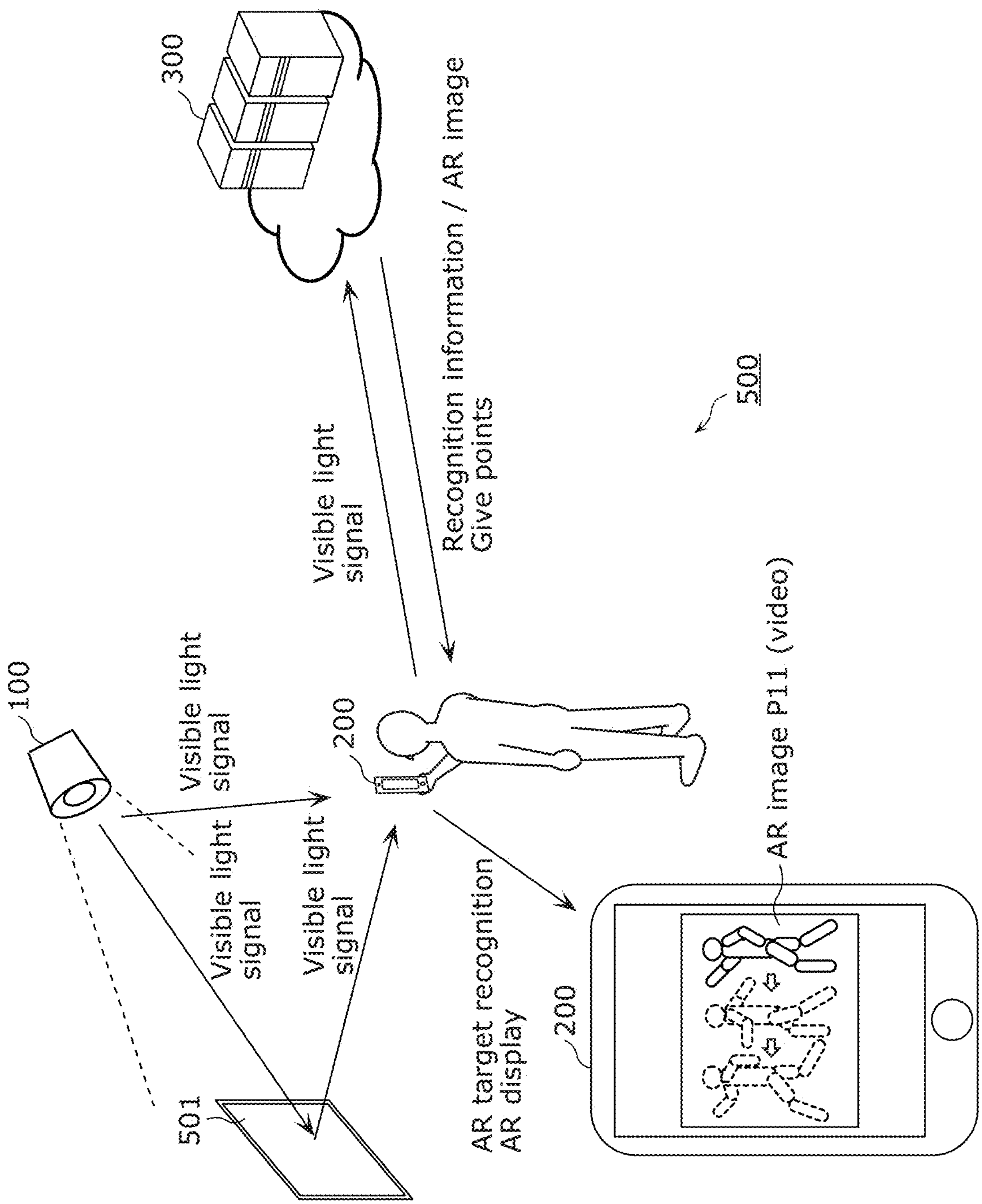

FIG. 155 is a diagram illustrating a configuration of a display system in Embodiment 9.

Figure 156:
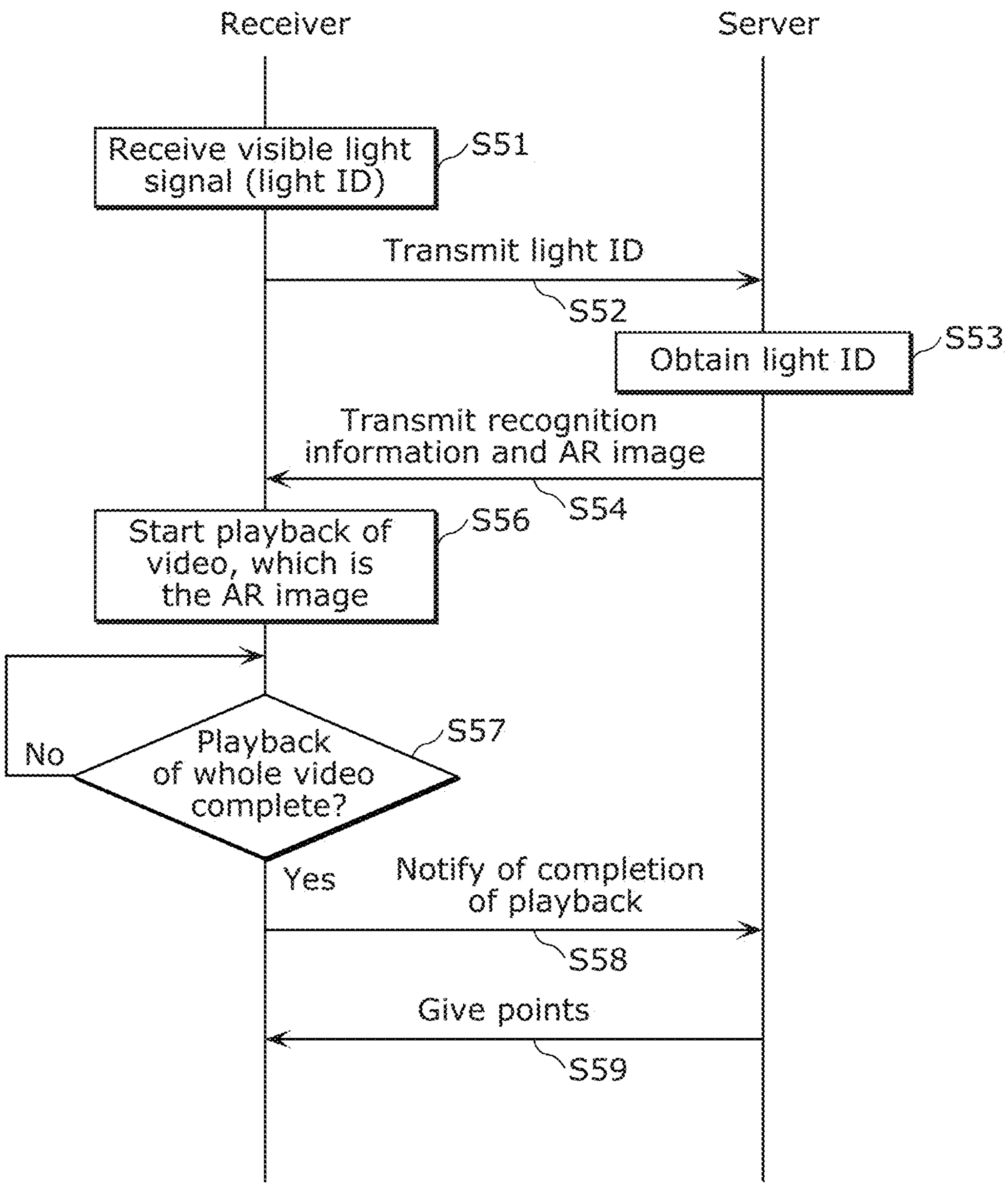

FIG. 156 is a sequence diagram illustrating processing operations performed by a receiver and a server in Embodiment 9.

Figure 157:
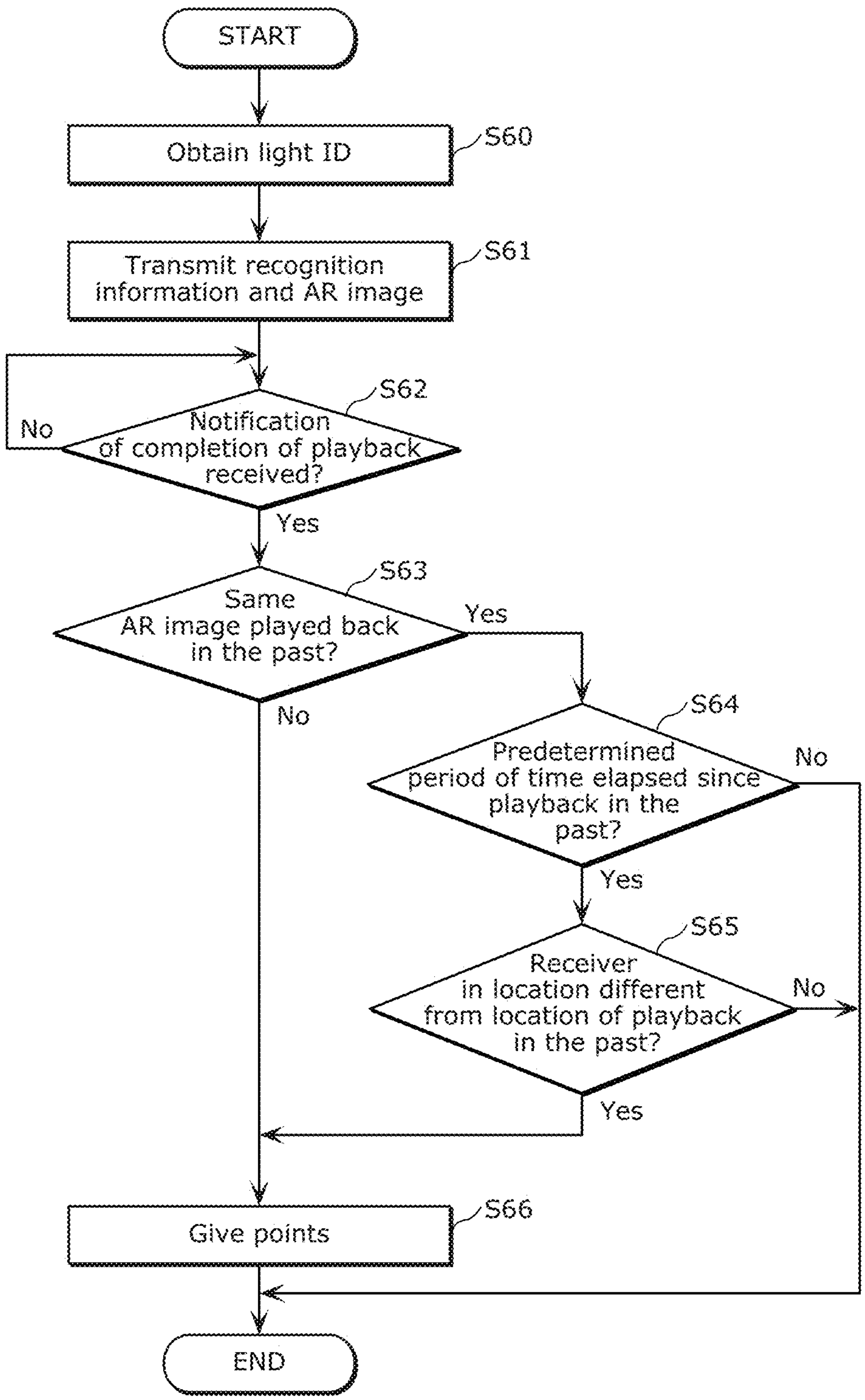

FIG. 157 is a flowchart illustrating processing operations performed by a server in Embodiment 9.

Figure 158:
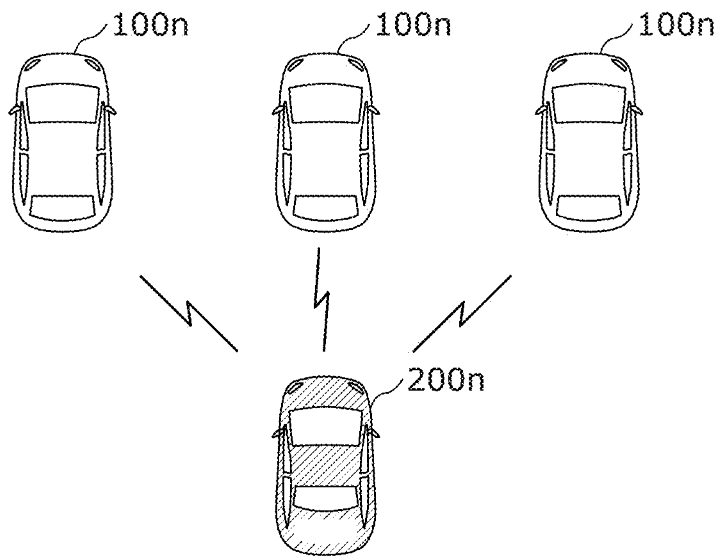

FIG. 158 is a diagram illustrating a communication example when a transmitter and a receiver in Embodiment 9 are provided in vehicles.

Figure 159:
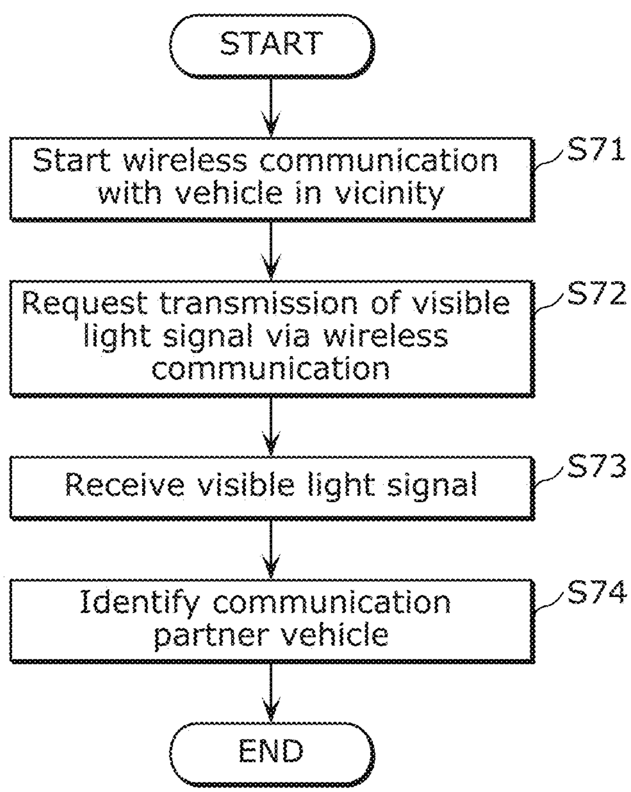

FIG. 159 is a flowchart illustrating processing operations performed by a vehicle in Embodiment 9.

Figure 160:
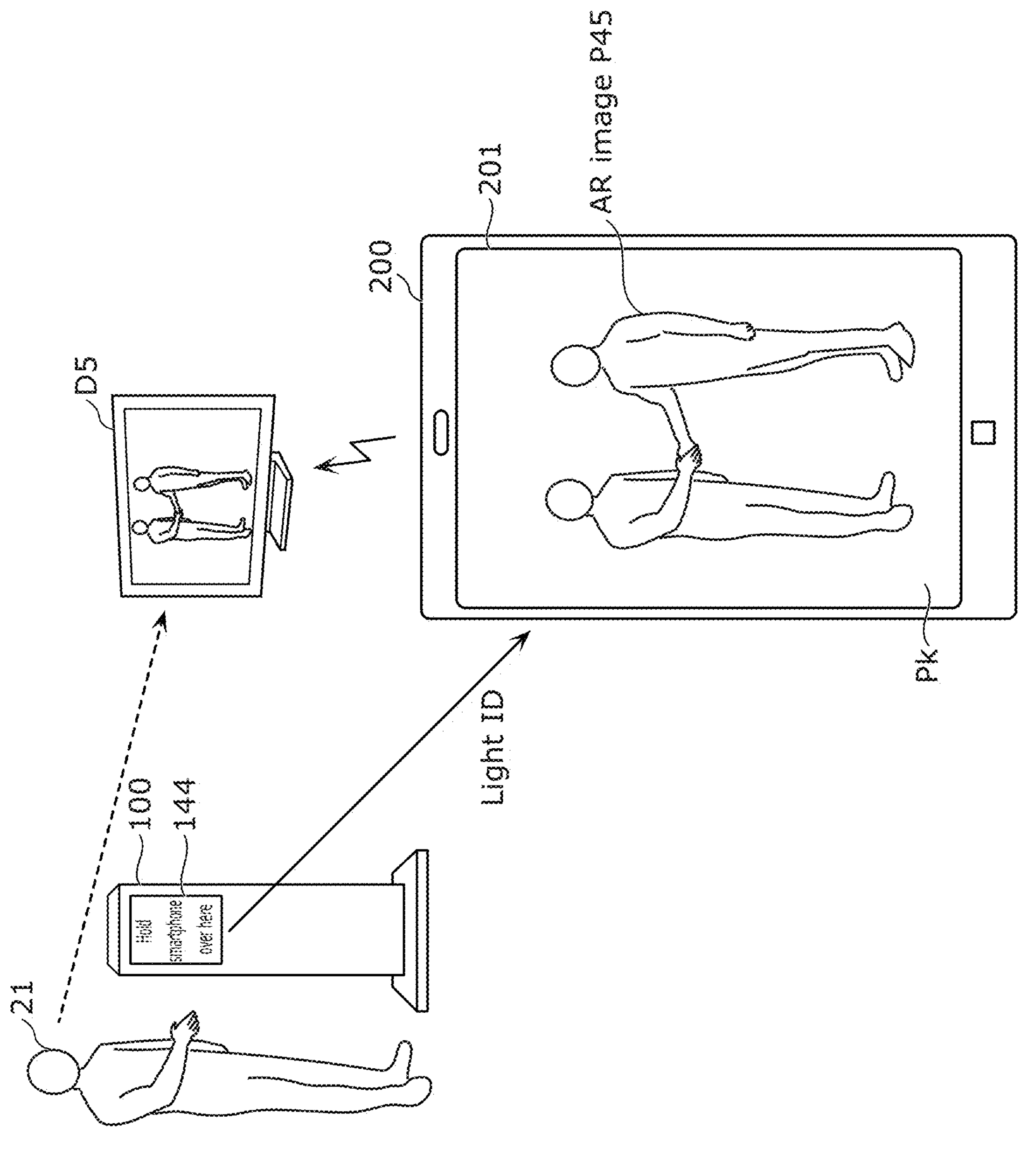

FIG. 160 is a diagram illustrating an example of the display of an AR image by a receiver in Embodiment 9.

Figure 161:
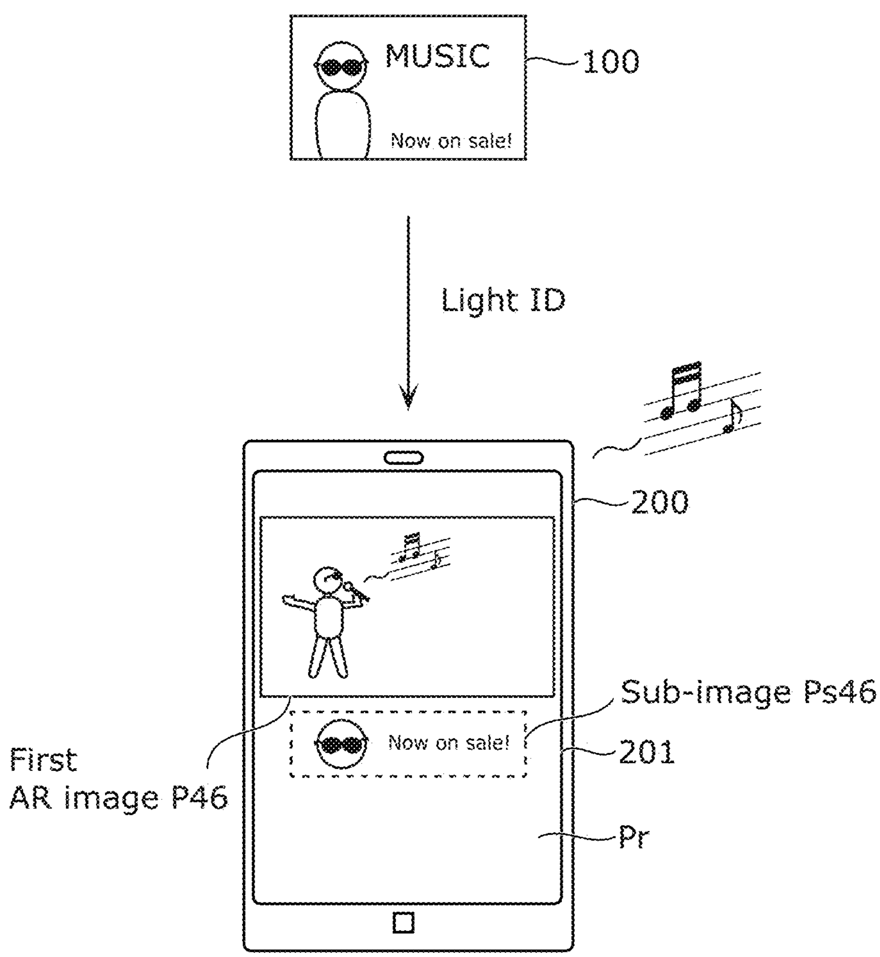

FIG. 161 is a diagram illustrating another example of the display of an AR image by a receiver in Embodiment 9.

Figure 162:
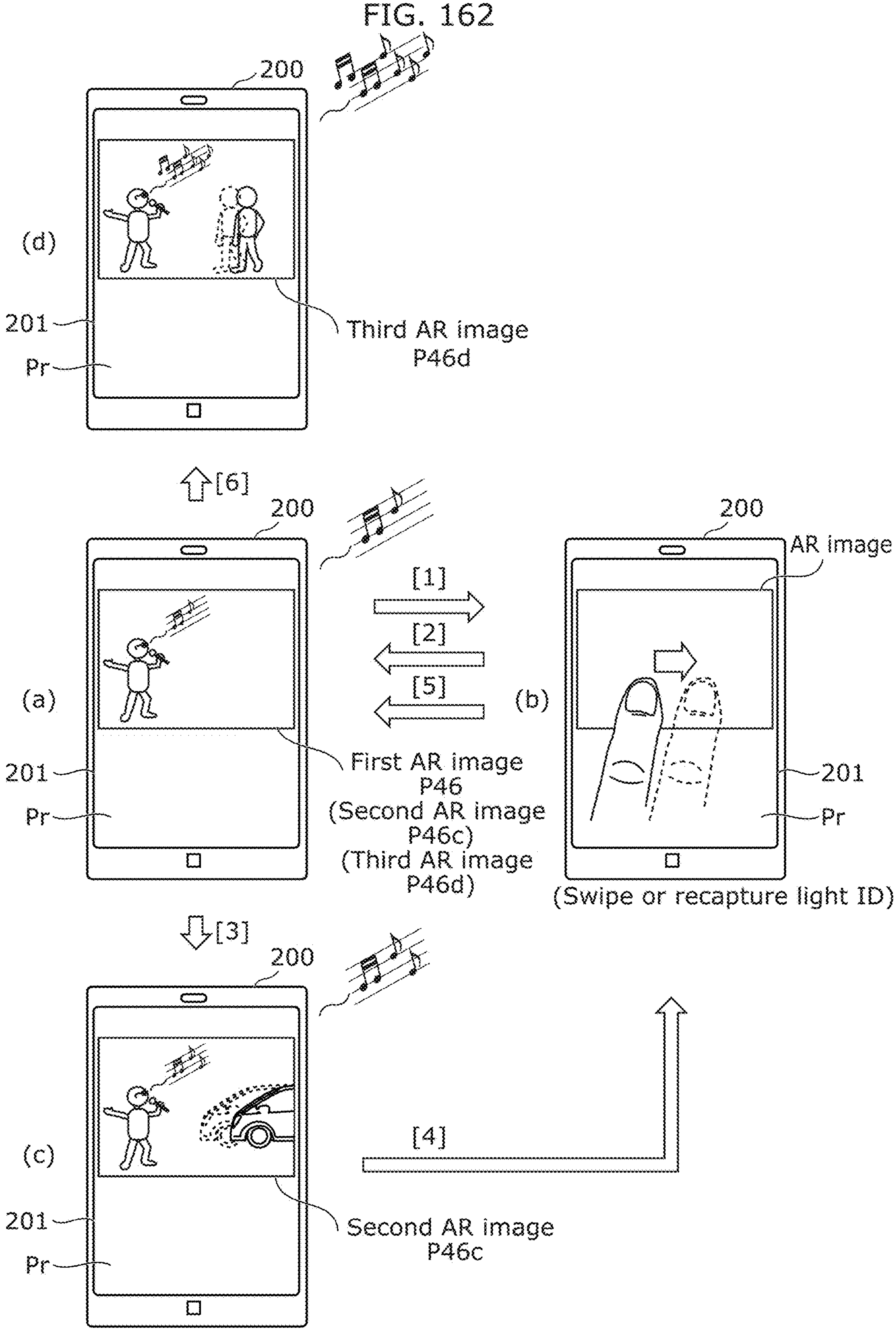

FIG. 162 is a diagram illustrating processing operations performed by a receiver in Embodiment 9.

Figure 163:
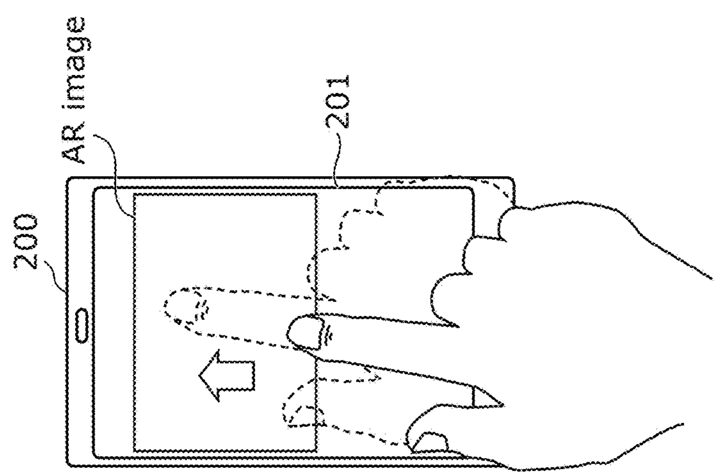

FIG. 163 is a diagram illustrating one example of a gesture made on a receiver in Embodiment 9.

Figure 164:
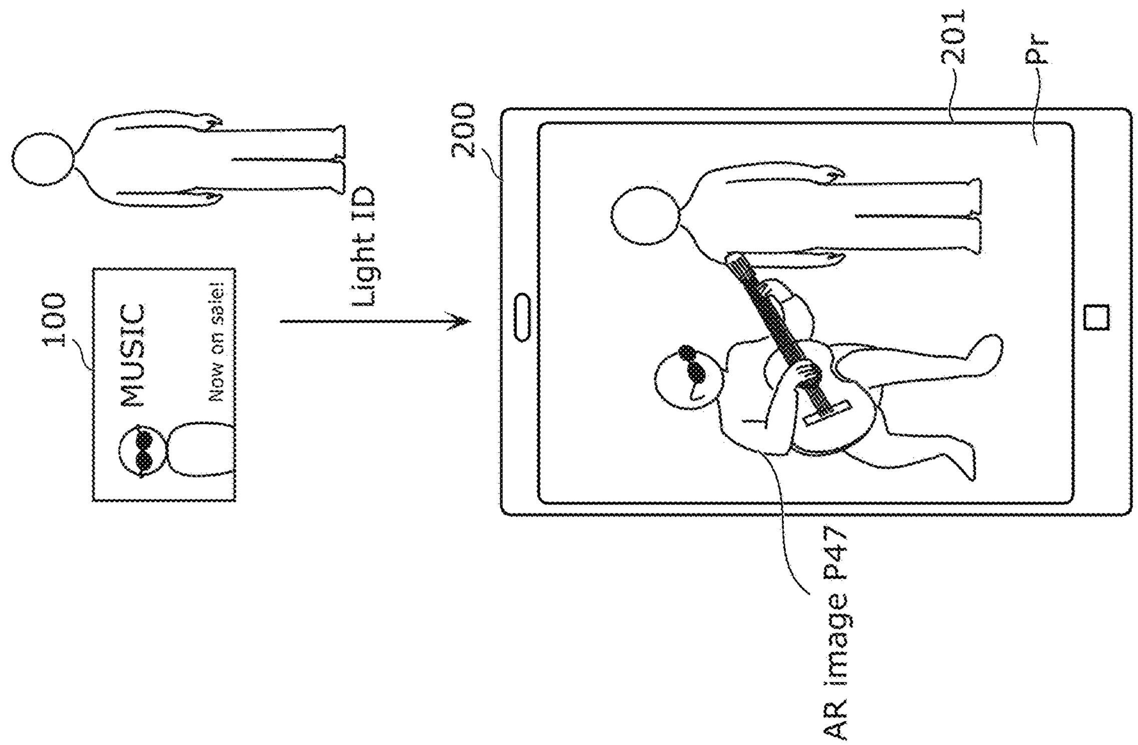

FIG. 164 is a diagram illustrating an example of an AR image displayed on a receiver in Embodiment 9.

Figure 165:
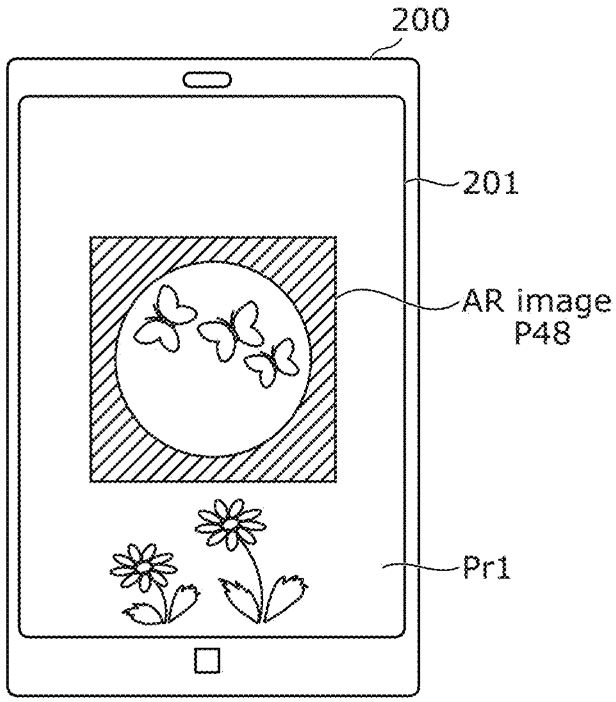

FIG. 165 is a diagram illustrating an example of an AR image superimposed on a captured display image in Embodiment 9.

Figure 166:
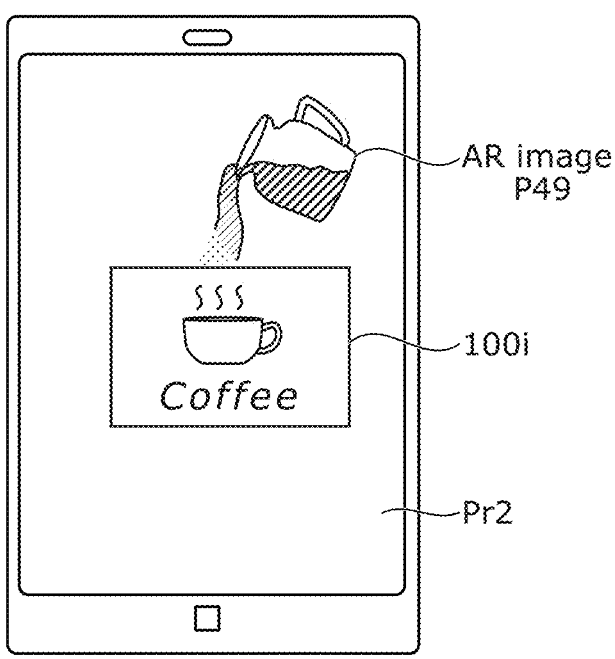

FIG. 166 is a diagram illustrating an example of an AR image superimposed on a captured display image in Embodiment 9.

Figure 167:
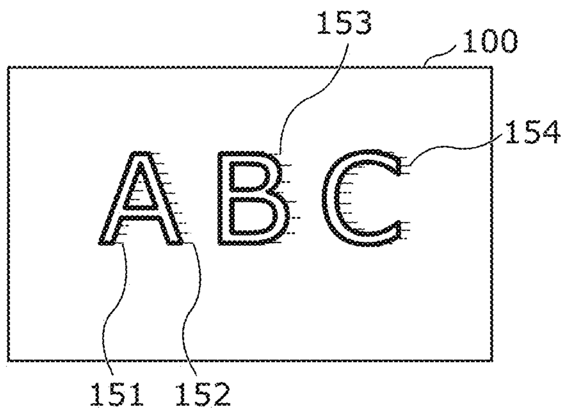

FIG. 167 is a diagram illustrating one example of a transmitter in Embodiment 9.

Figure 168:
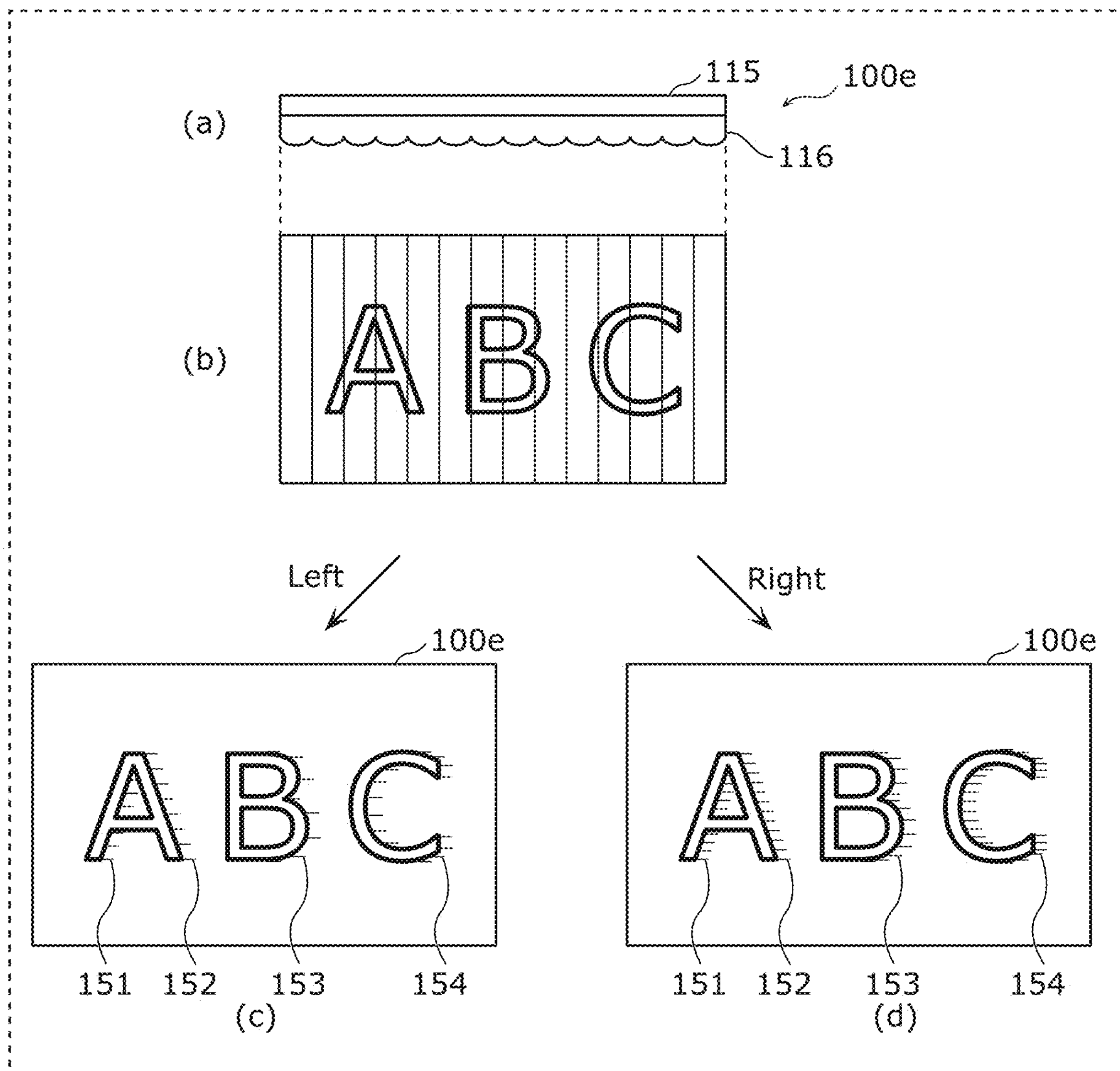

FIG. 168 is a diagram illustrating another example of a transmitter in Embodiment 9.

Figure 169:
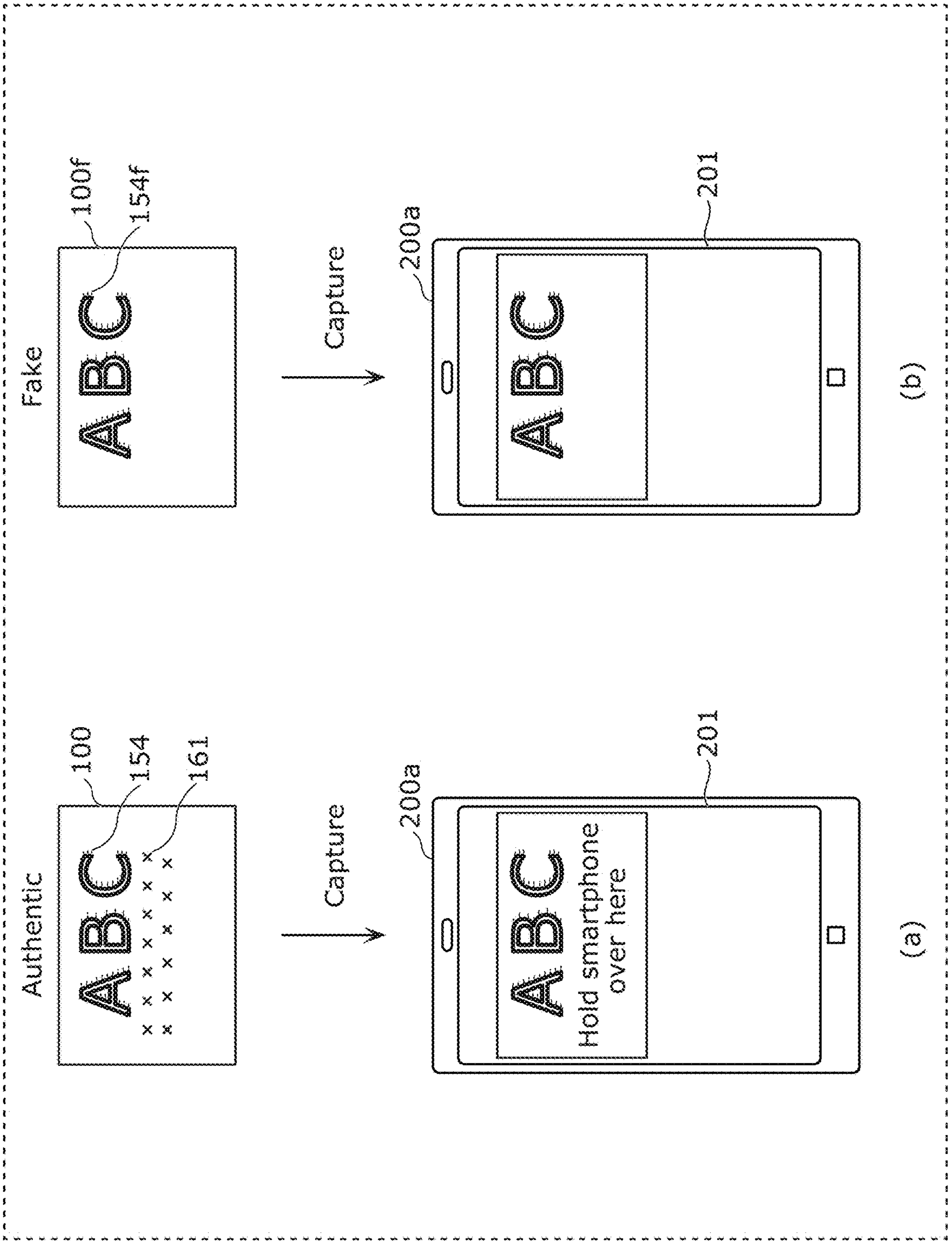

FIG. 169 is a diagram illustrating another example of a transmitter in Embodiment 9.

Figure 170:
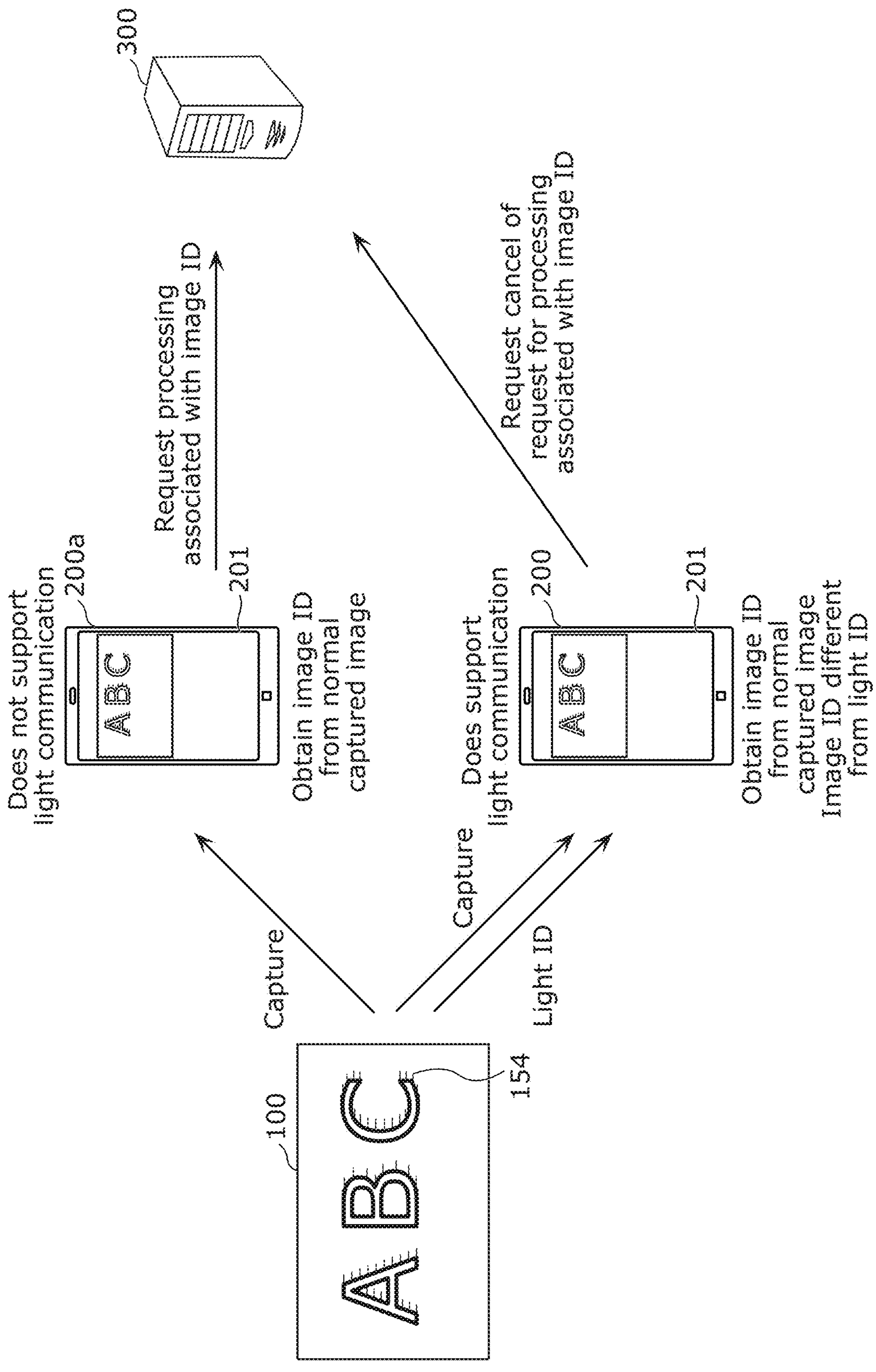

FIG. 170 is a diagram illustrating one example of a system that uses a receiver that supports light communication and a receiver that does not support light communication in Embodiment 9.

Figure 171:
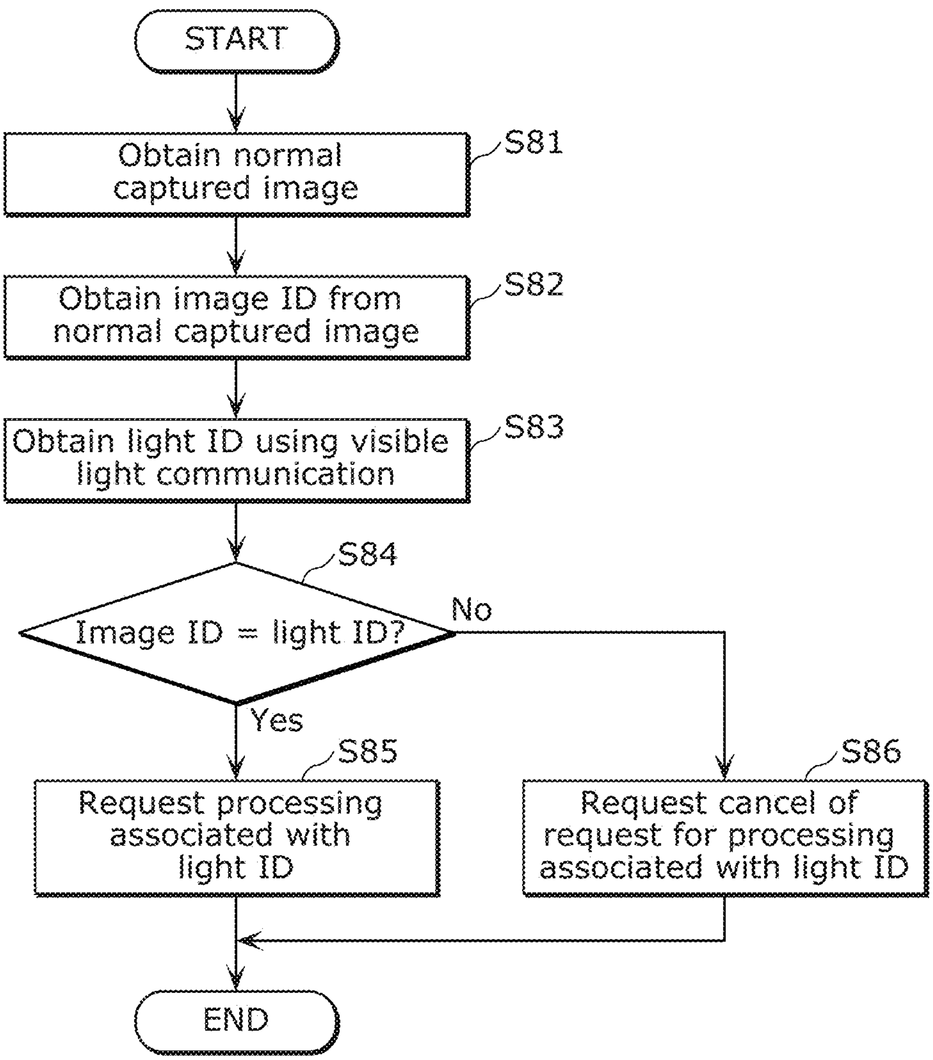

FIG. 171 is a flowchart illustrating processing operations performed by a receiver in Embodiment 9.

Figure 172:
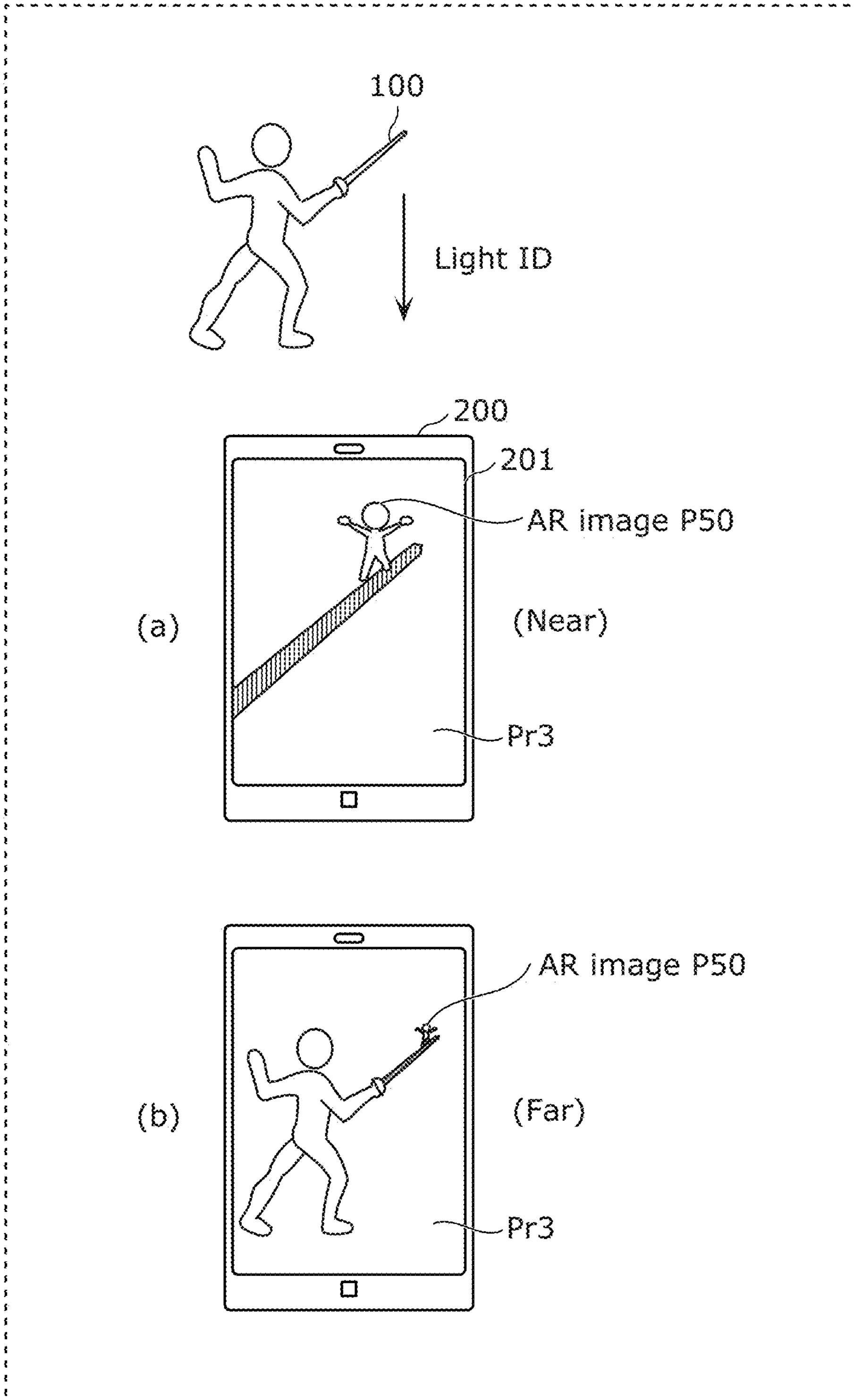

FIG. 172 is a diagram illustrating an example of displaying an AR image in Embodiment 9.

Figure 173A:
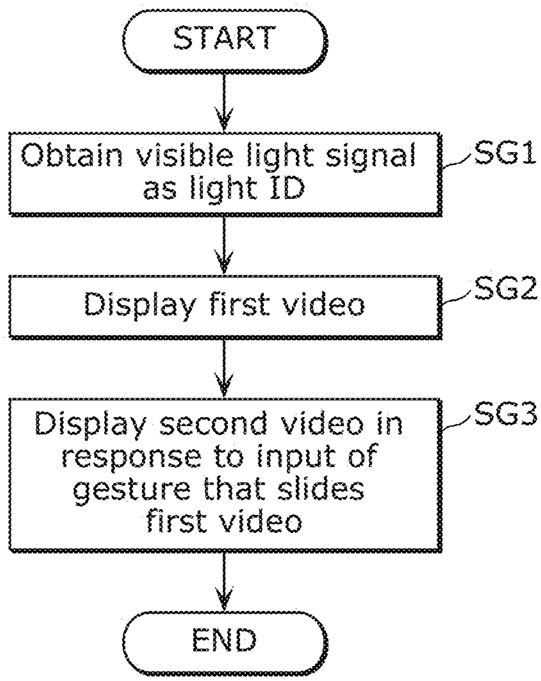

FIG. 173A is a flowchart illustrating a display method according to one aspect of the present disclosure.

Figure 173B:
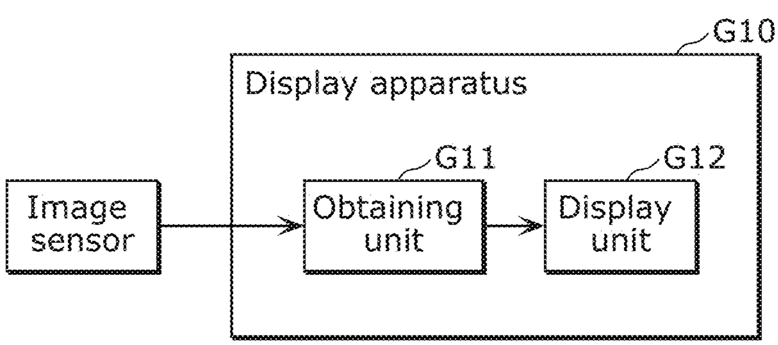

FIG. 173B is a block diagram illustrating a configuration of a display apparatus according to one aspect of the present disclosure.

Figure 174:
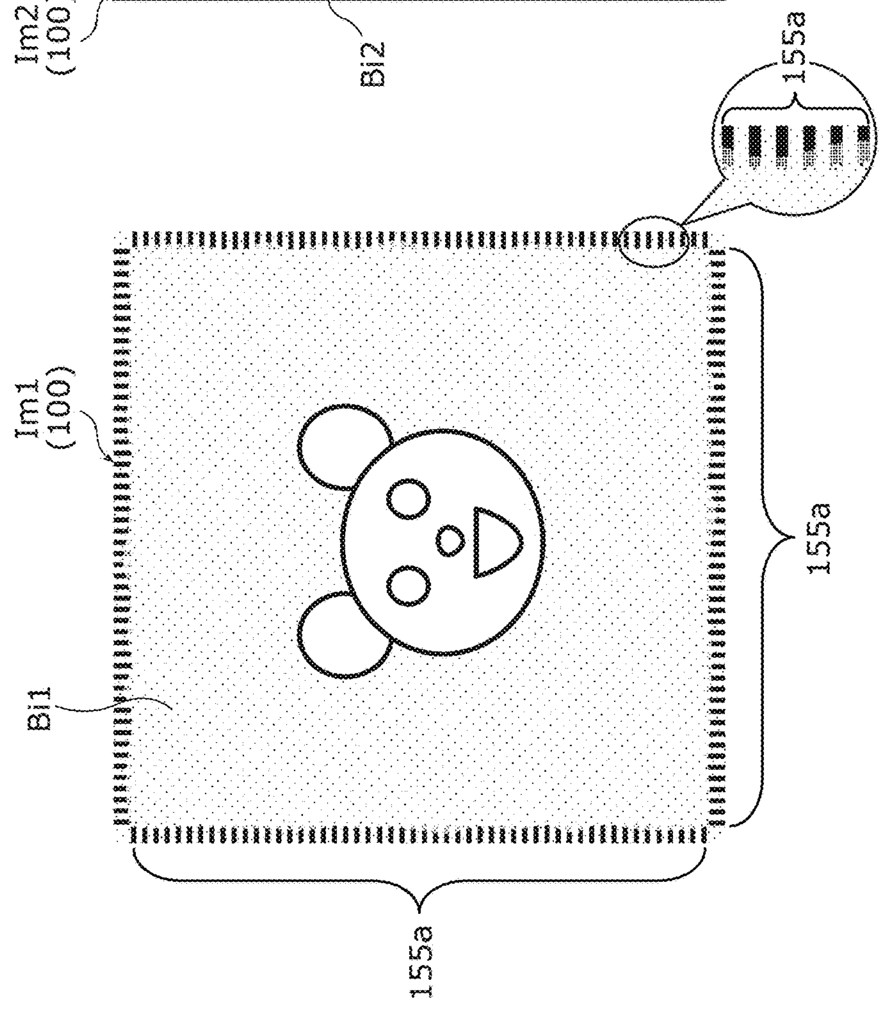

FIG. 174 is a diagram illustrating one example of an image drawn on a transmitter in Embodiment 10.

Figure 175:
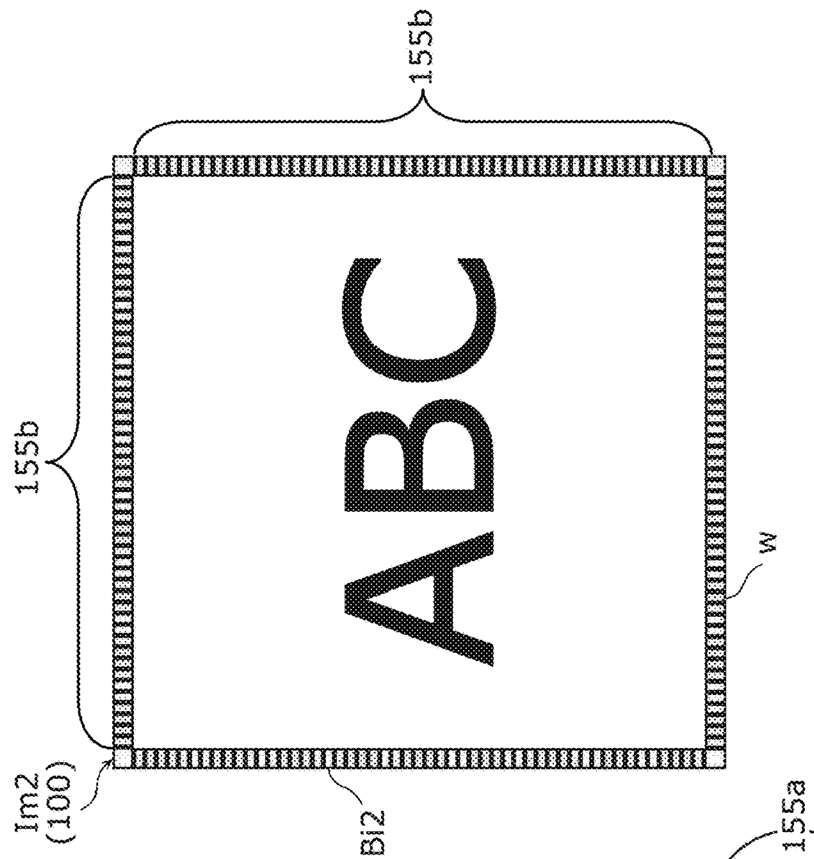

FIG. 175 is a diagram illustrating another example of an image drawn on a transmitter in Embodiment 10.

Figure 176:
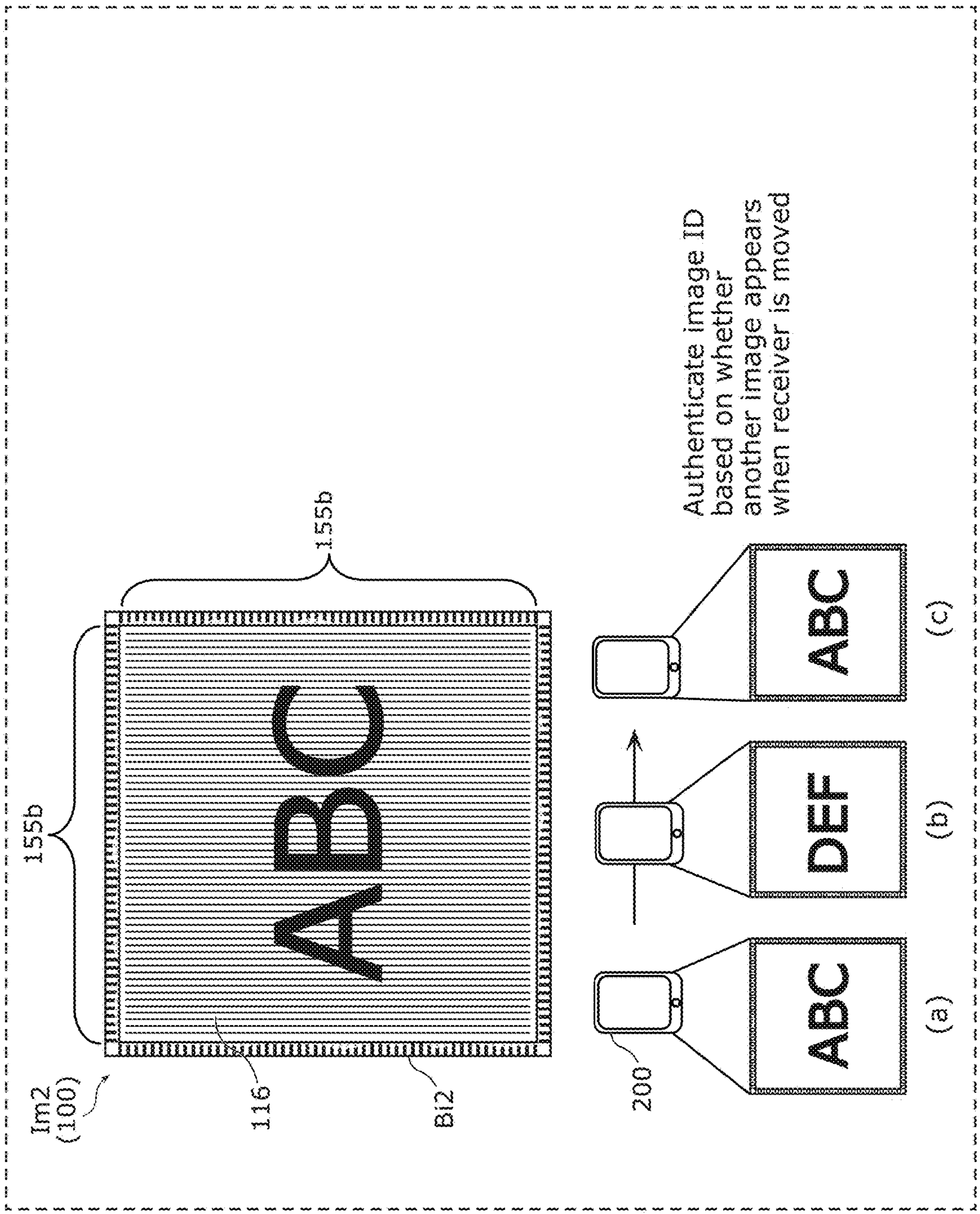

FIG. 176 is a diagram illustrating another example of a transmitter and a receiver in Embodiment 10.

Figure 177:
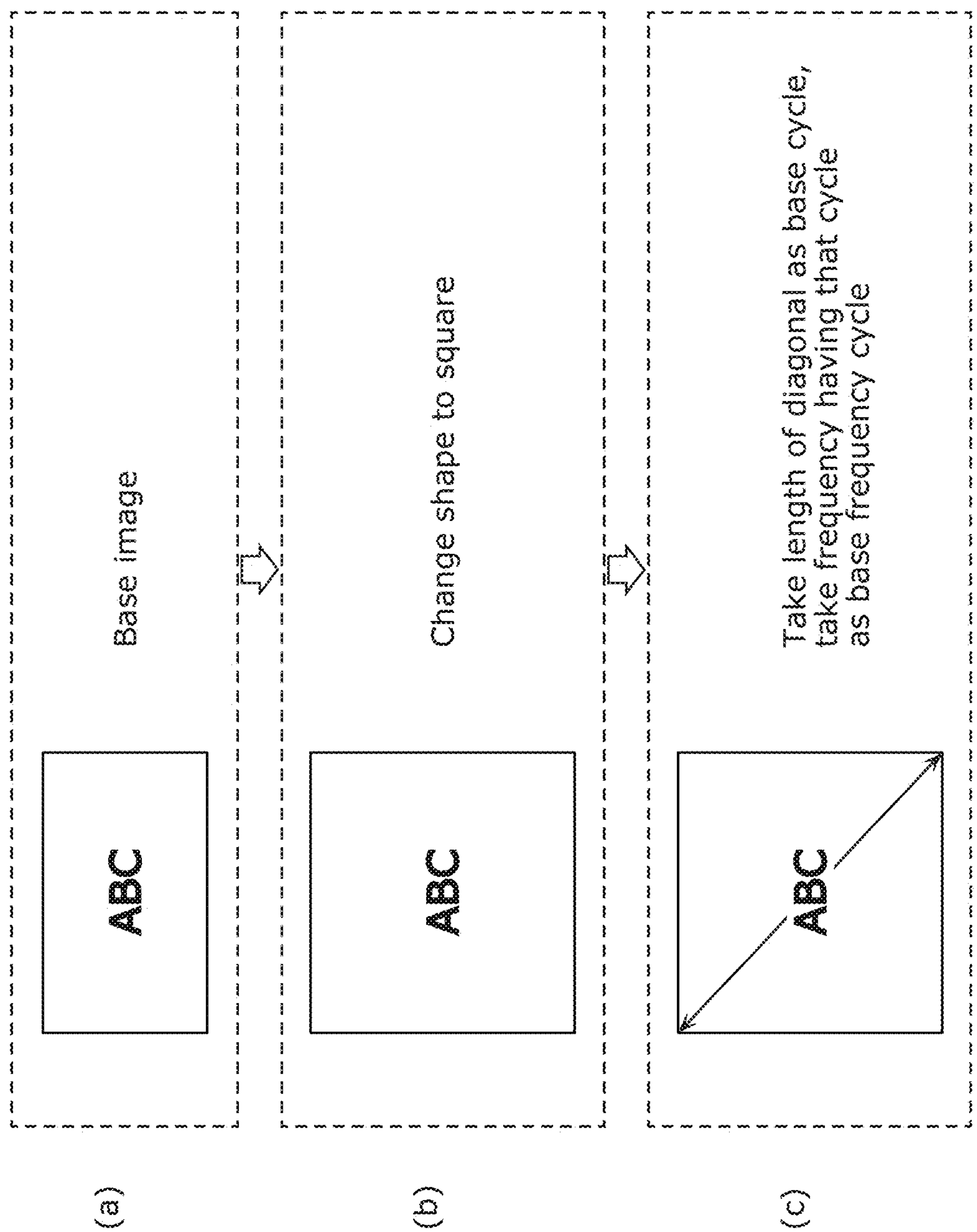

FIG. 177 is a diagram for illustrating base frequency of a line pattern in Embodiment 10.

Figure 178A:
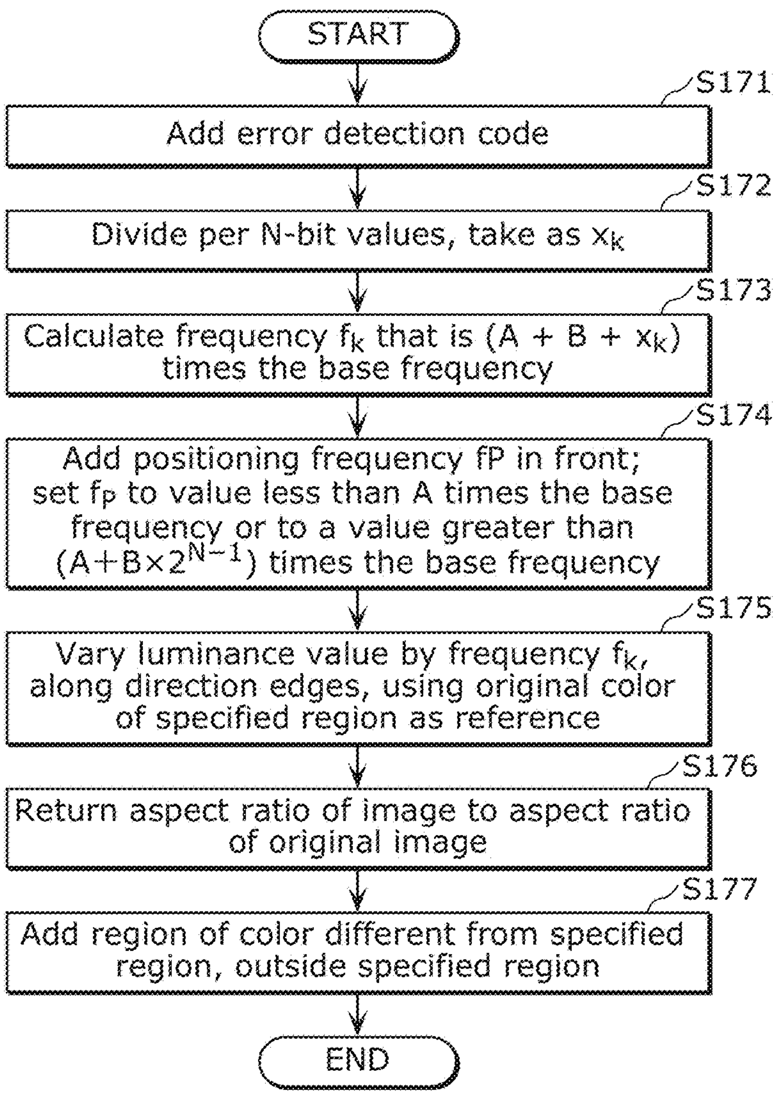

FIG. 178A is a flowchart illustrating processing operations performed by an encoding apparatus in Embodiment 10.

Figure 178B:
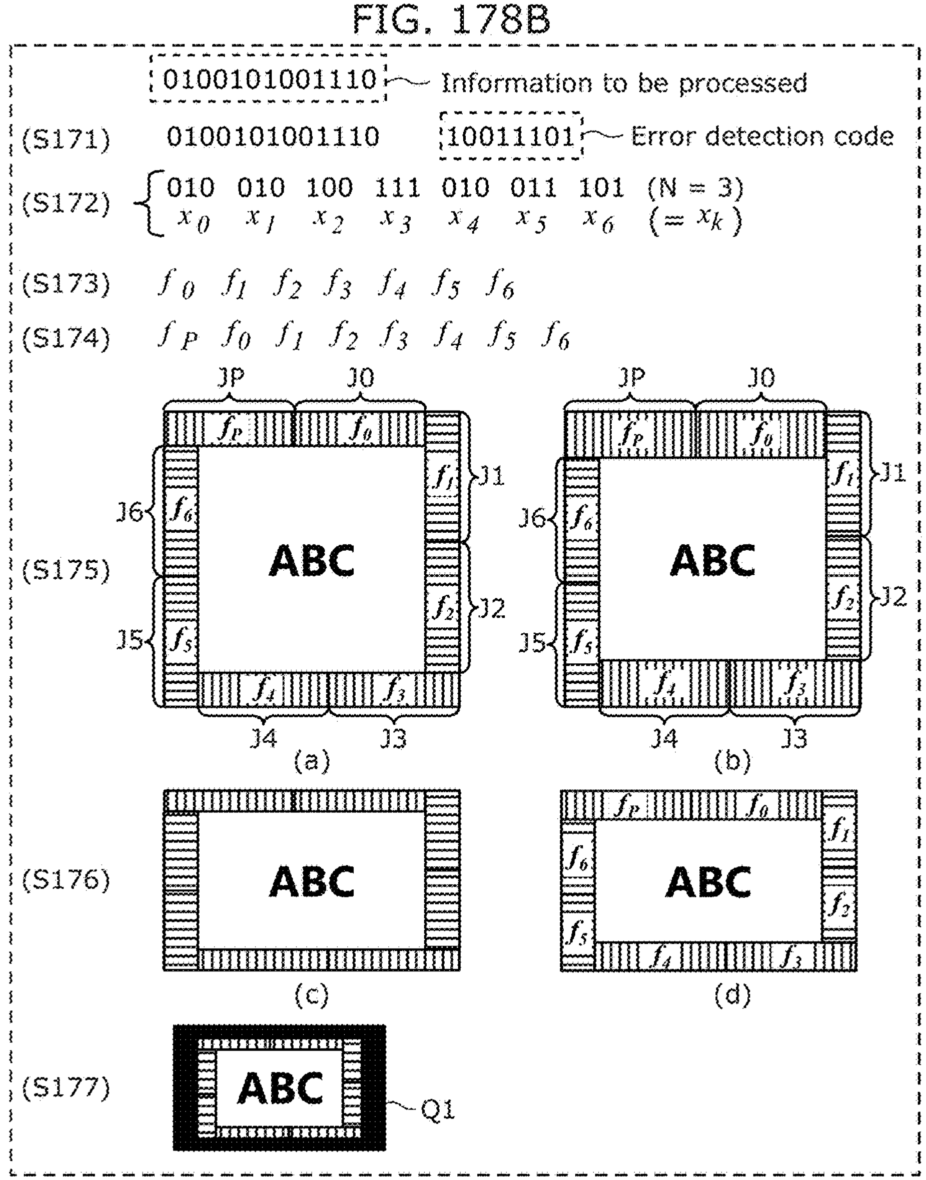

FIG. 178B is a diagram for explaining processing operations performed by an encoding apparatus in Embodiment 10.

Figure 179:
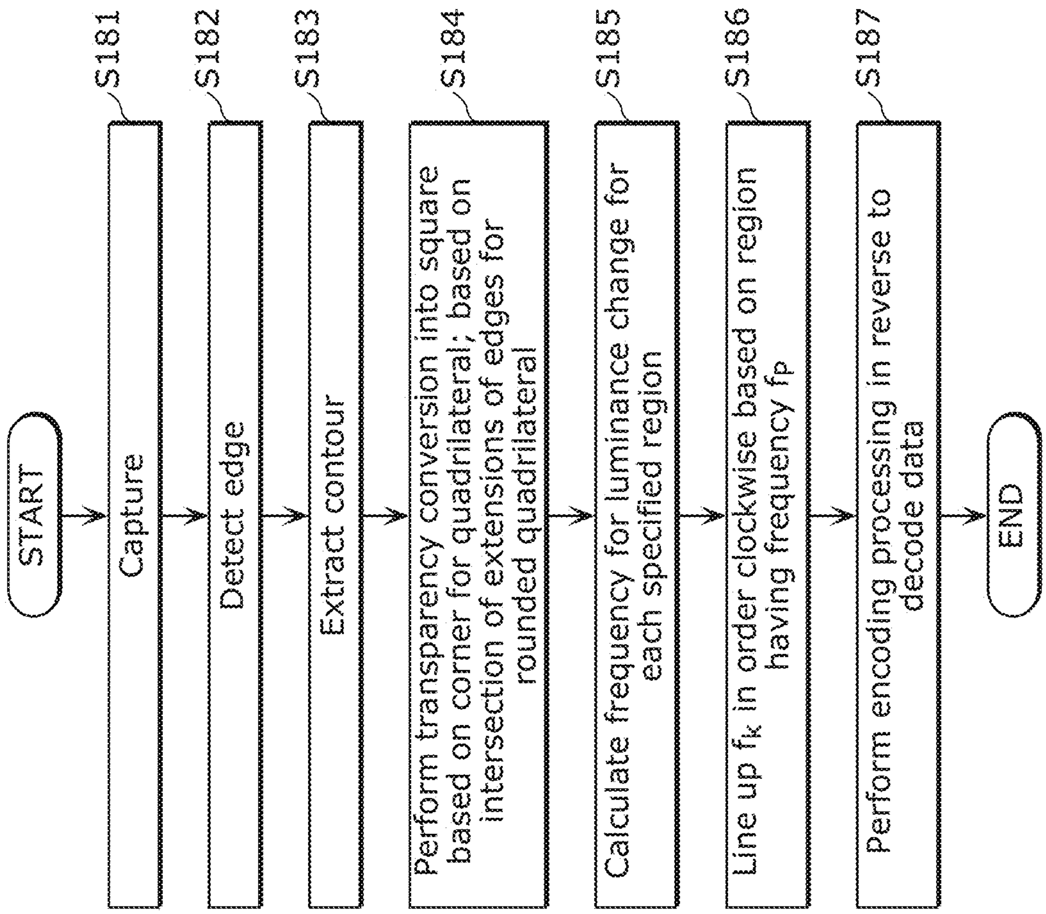

FIG. 179 is a flowchart illustrating processing operations performed by a receiver, which is a decoding apparatus, in Embodiment 10.

Figure 180:
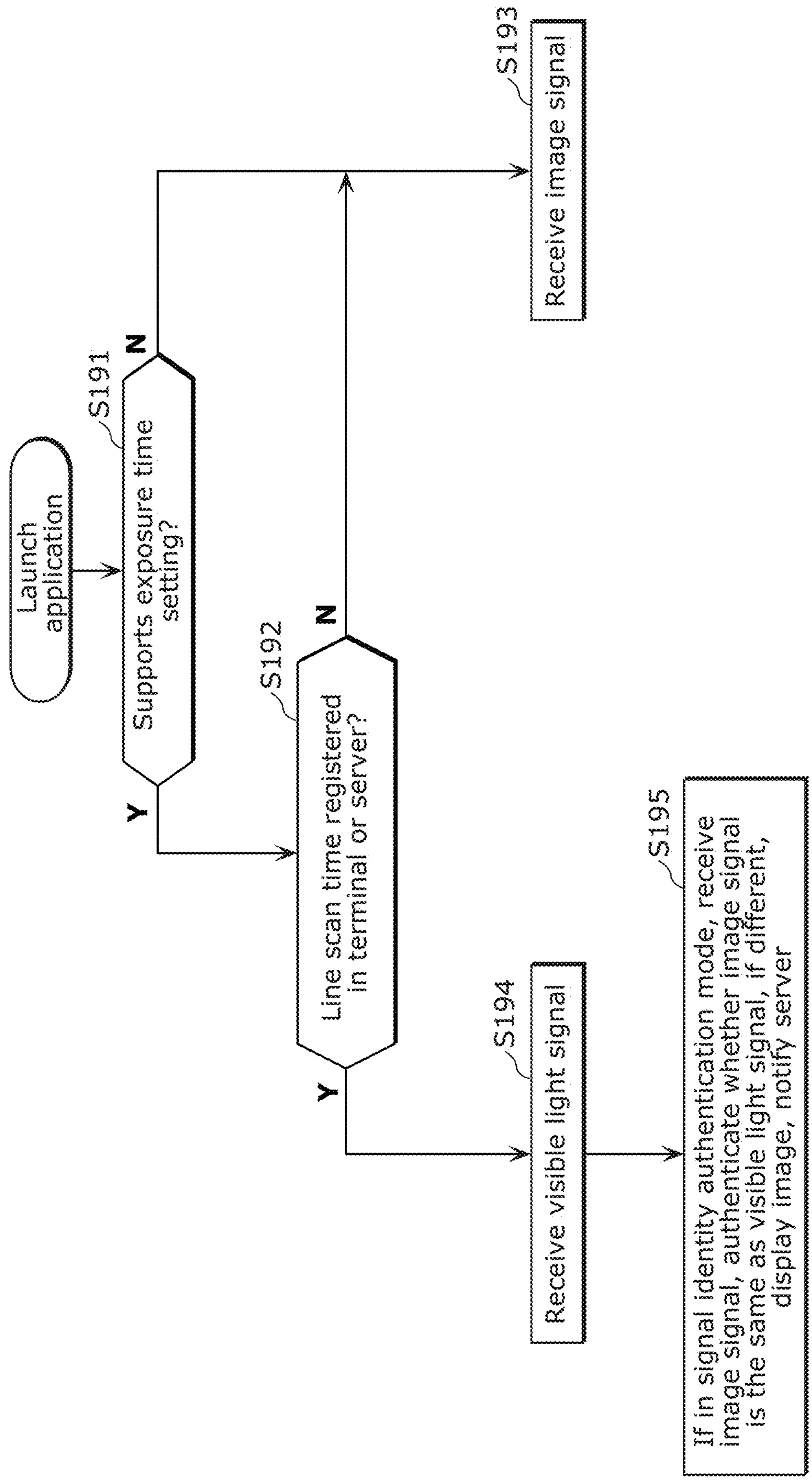

FIG. 180 is a flowchart illustrating processing operations performed by a receiver in Embodiment 10.

Figure 181A:
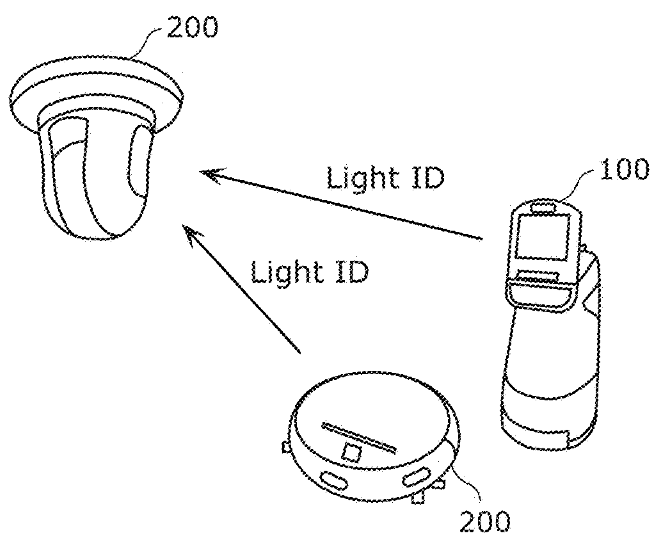

FIG. 181A is a diagram illustrating one example of the configuration of a system in Embodiment 10.

Figure 181B:
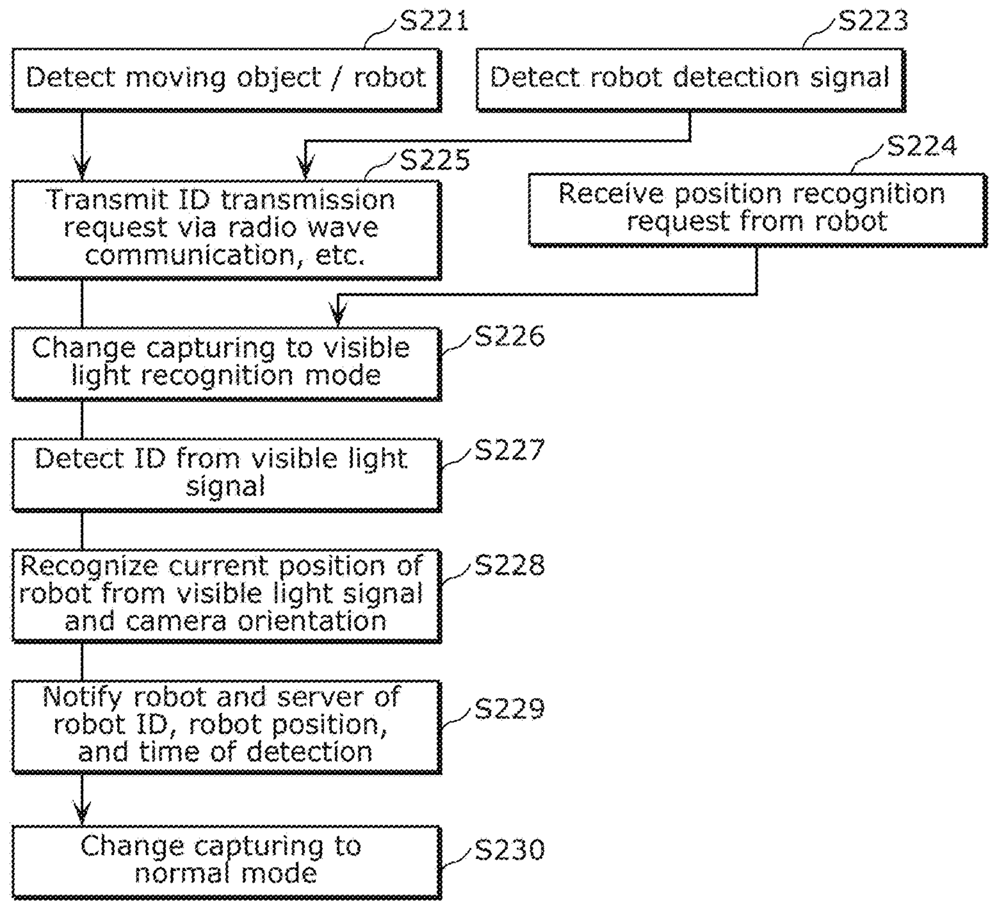

FIG. 181B is a diagram illustrating processes performed by a camera in Embodiment 10.

Figure 182:
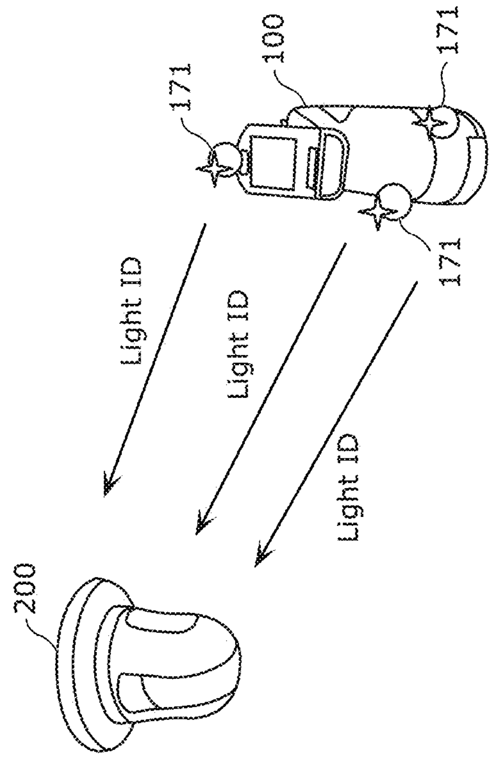

FIG. 182 is a diagram illustrating another example of a configuration of a system in Embodiment 10.

Figure 183:
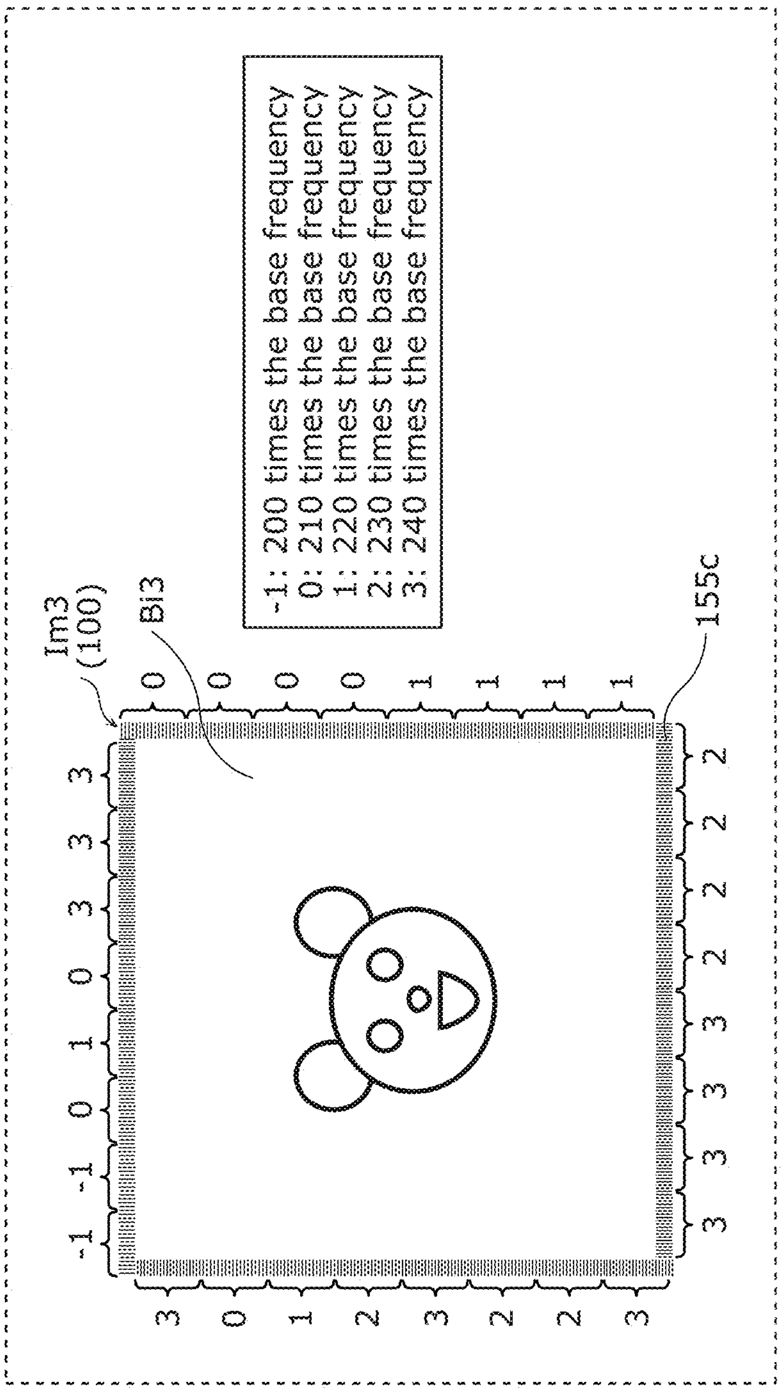

FIG. 183 is a diagram illustrating another example of an image drawn on a transmitter in Embodiment 10.

Figure 184:
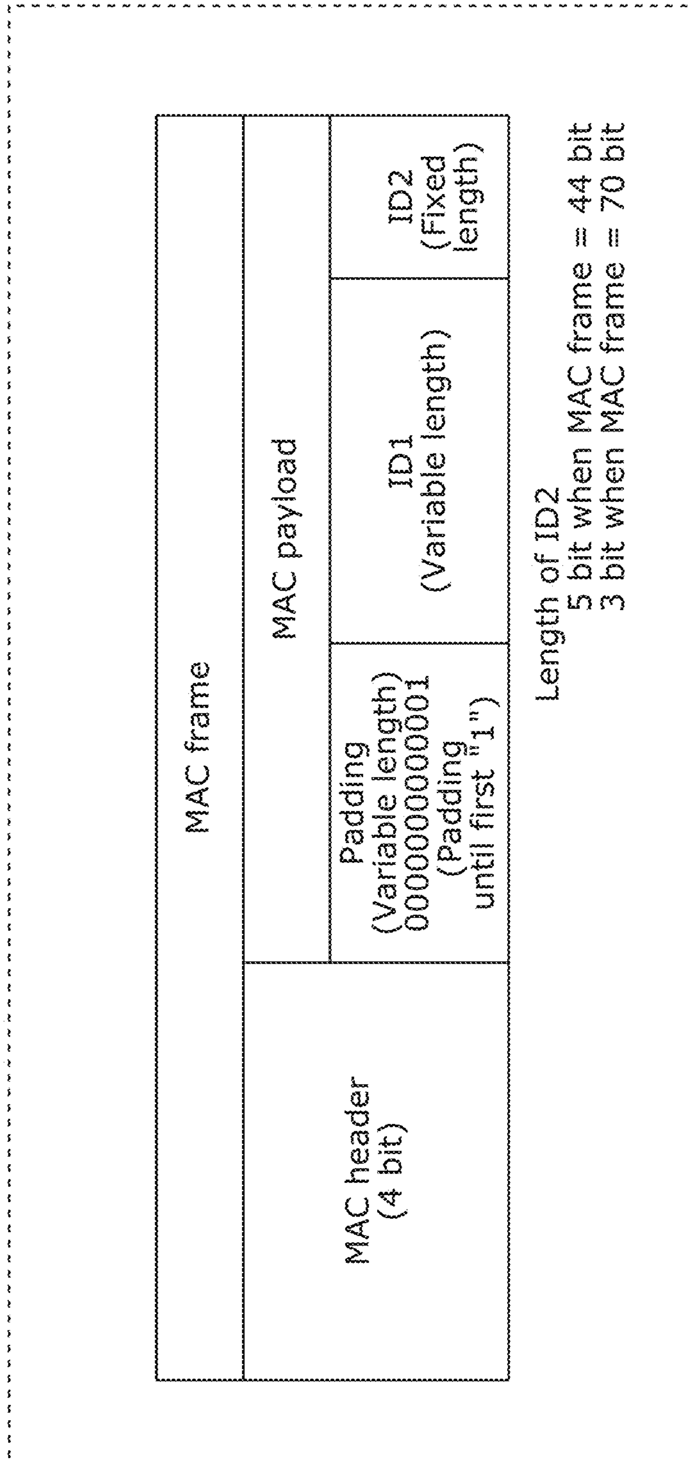

FIG. 184 is a diagram illustrating one example of the format of a MAC frame that makes up an frame ID in Embodiment 10.

FIG. 185 is a diagram illustrating one example of a configuration of a MAC header in Embodiment 10.

FIG. 186 is a diagram illustrating one example of a table for deriving packet division count in Embodiment 10.

Figure 187:
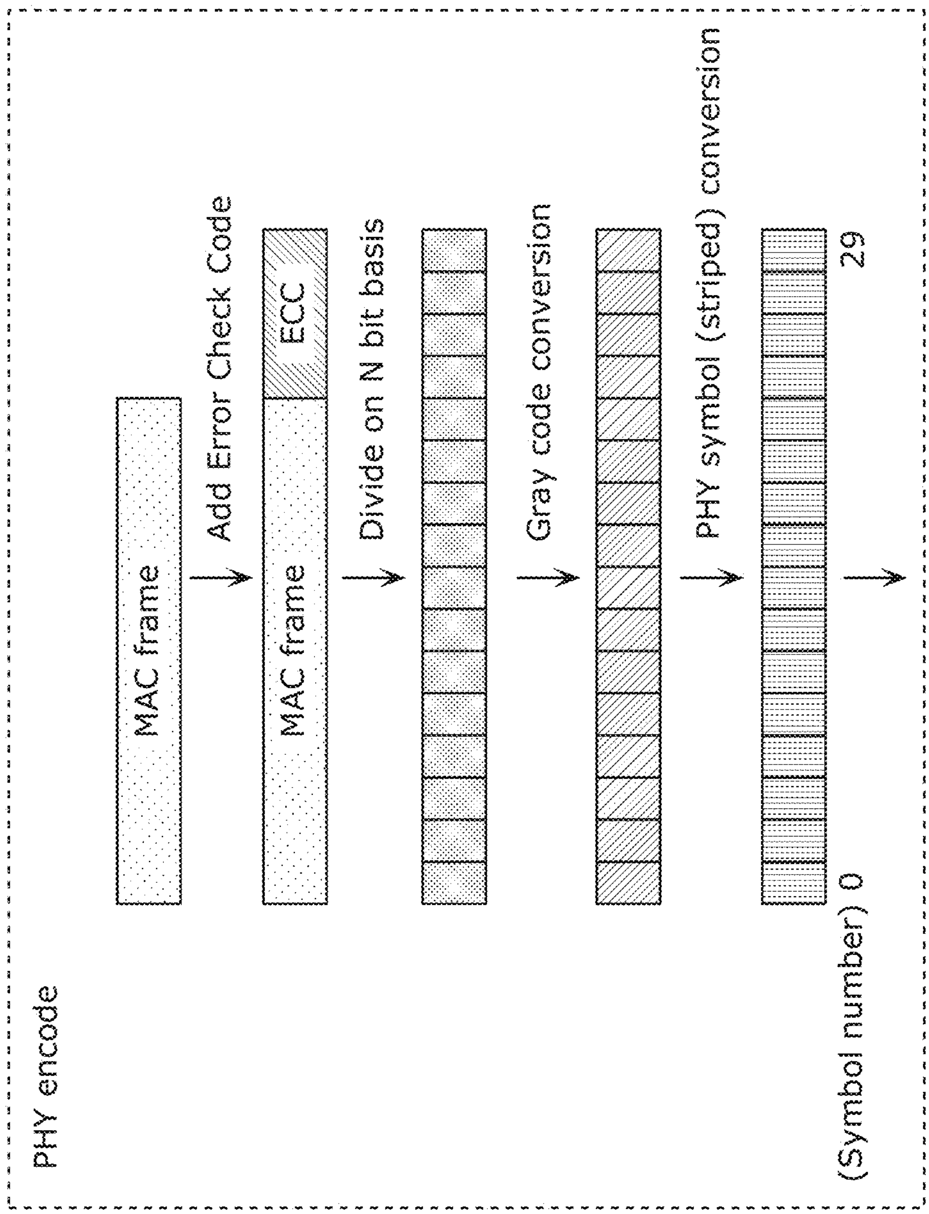

FIG. 187 is a diagram illustrating PHY encoding in Embodiment 10.

Figure 188:
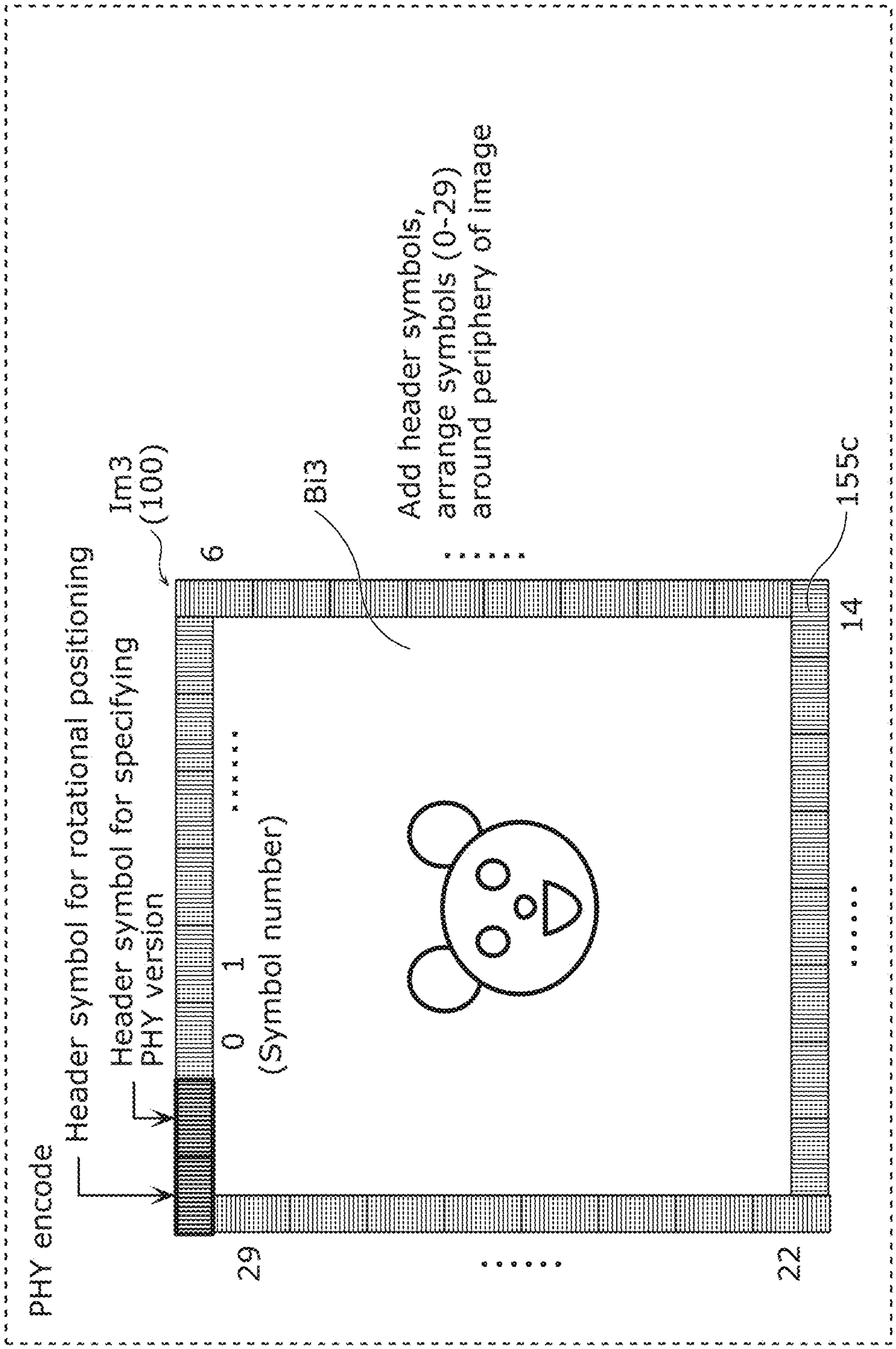

FIG. 188 is a diagram illustrating one example of a transmission image Im3 having PHY symbols in Embodiment 10.

Figure 189:
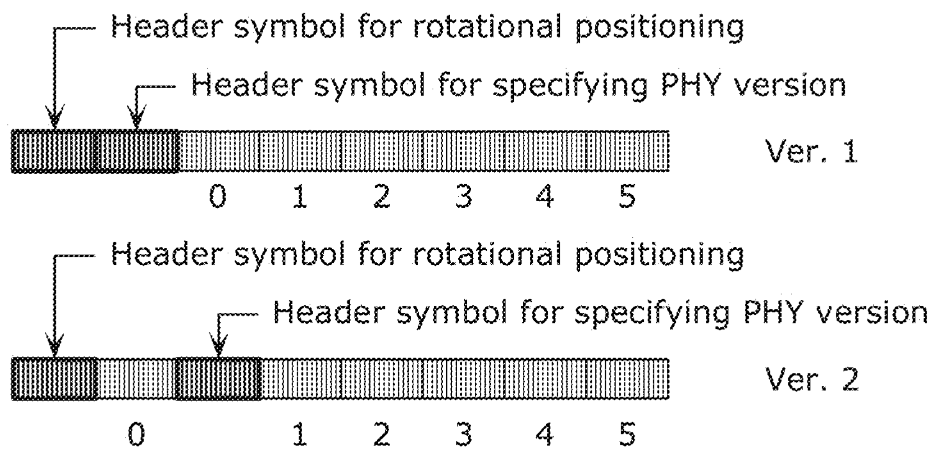

FIG. 189 is a diagram for explaining two PHY versions in Embodiment 10.

FIG. 190 is a diagram for explaining gray code in Embodiment 10.

Figure 191:
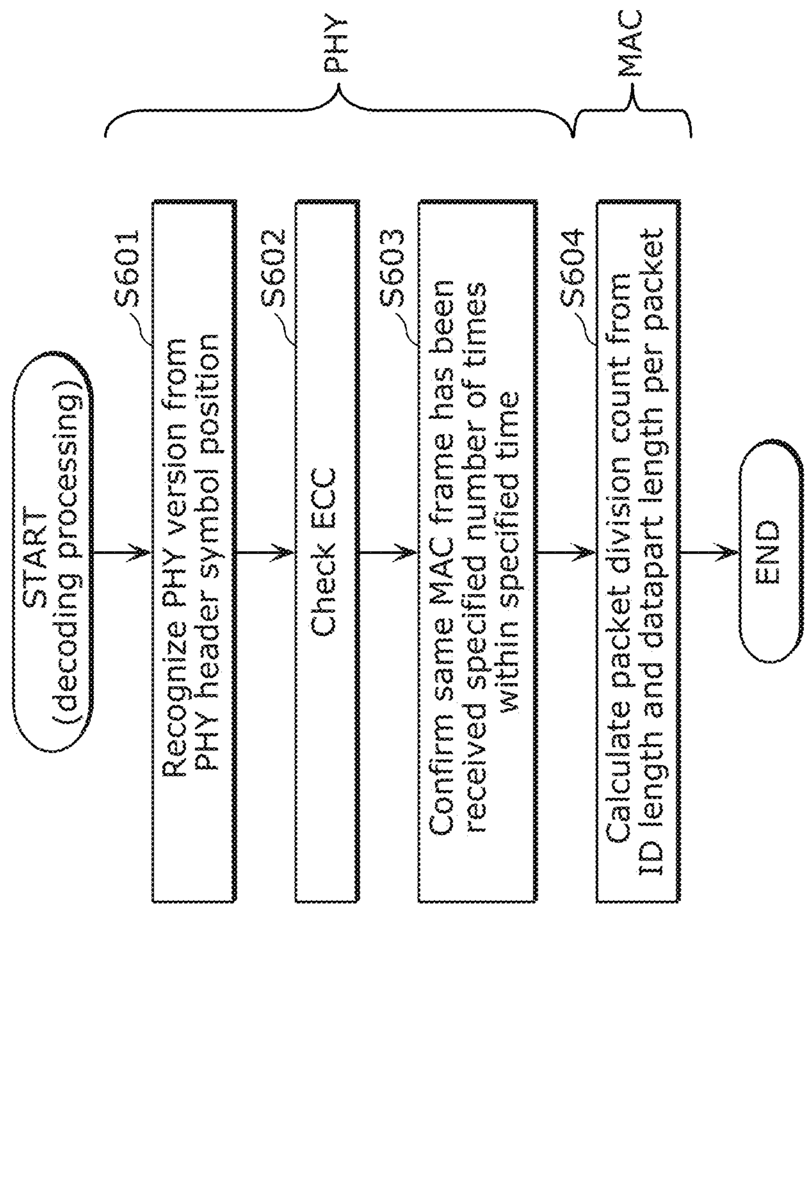

FIG. 191 illustrates one example of decoding processes performed by a receiver in Embodiment 10.

Figure 192:
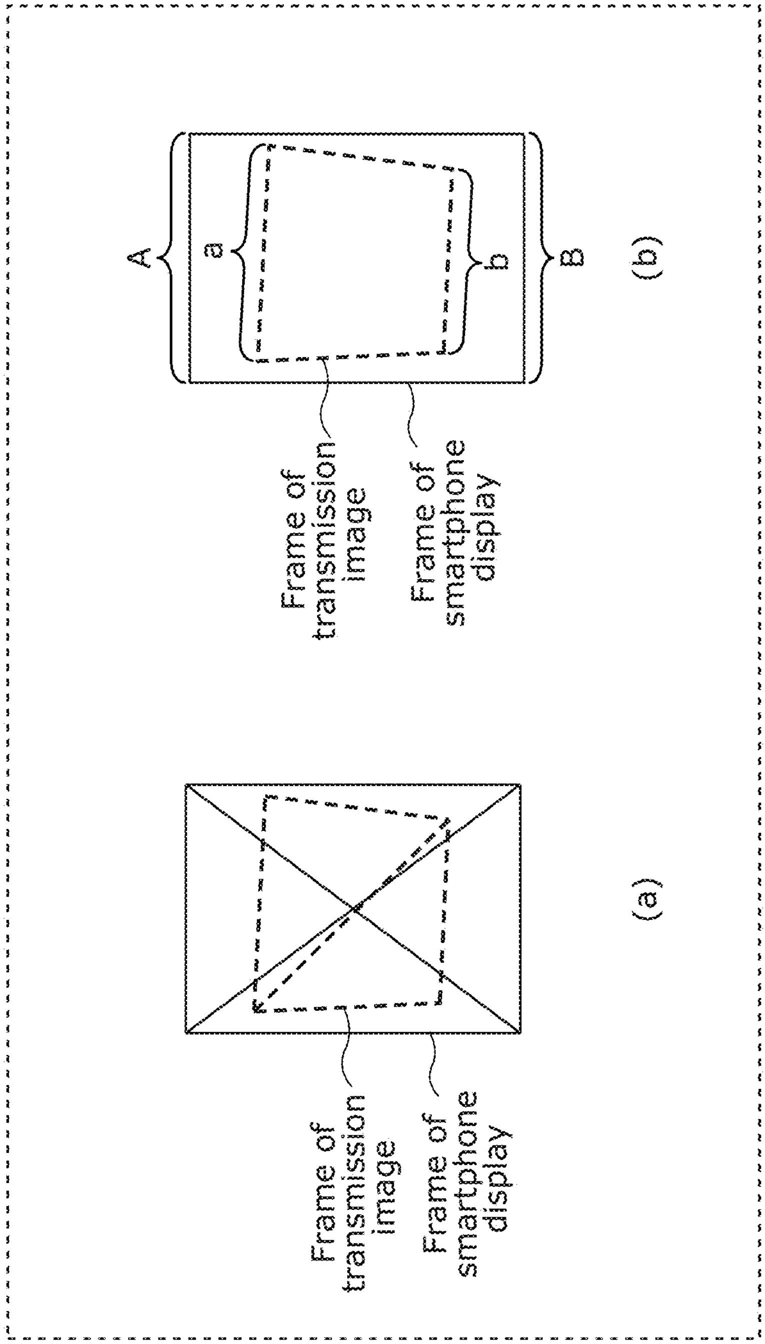

FIG. 192 is a diagram illustrating a method for detecting the fraudulence of a transmission image performed by a receiver in Embodiment 10.

Figure 193:
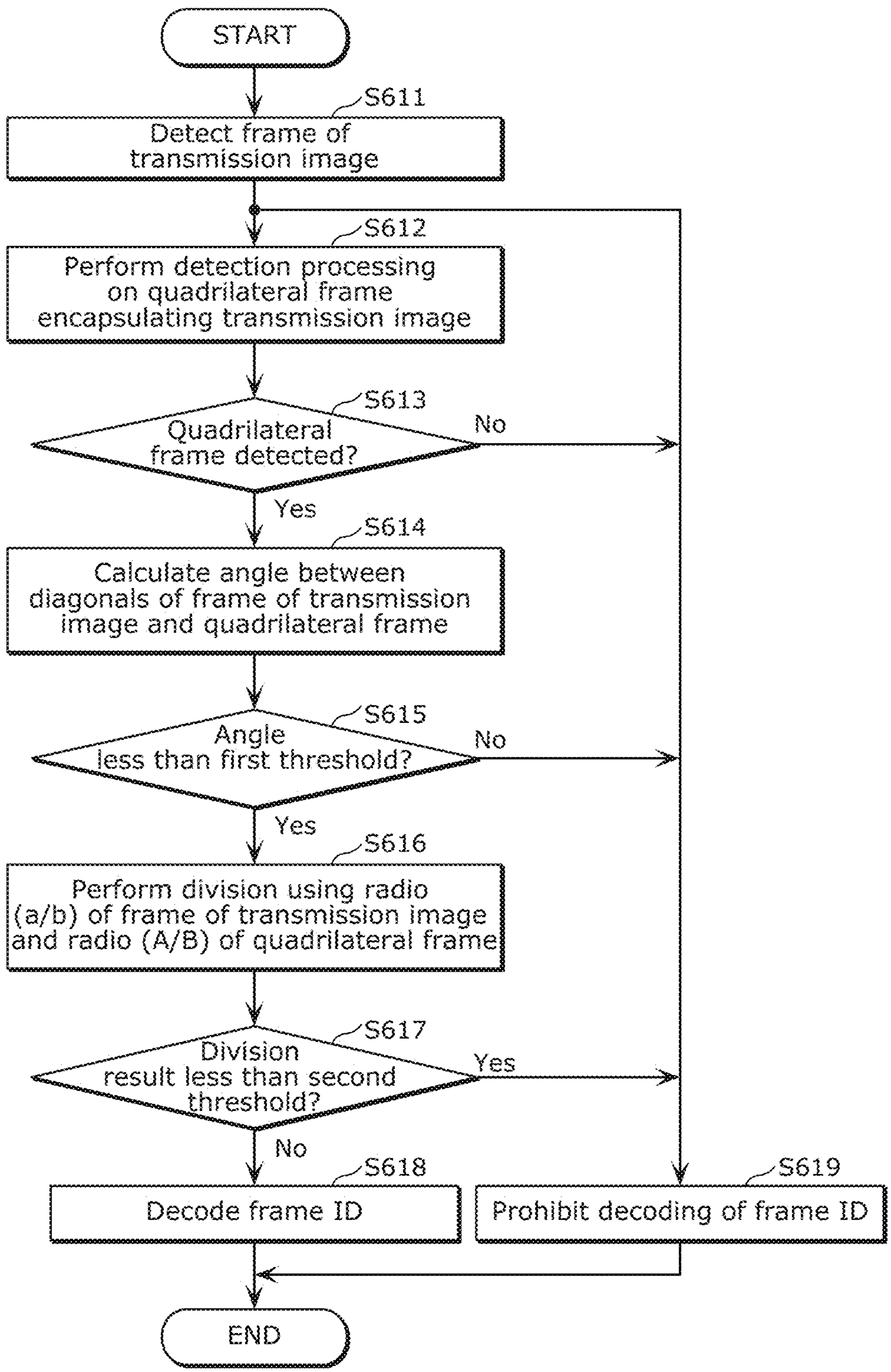

FIG. 193 is a flowchart illustrating one example of decoding processes including transmission image fraudulence detection performed by a receiver in Embodiment 10.

Figure 194B:
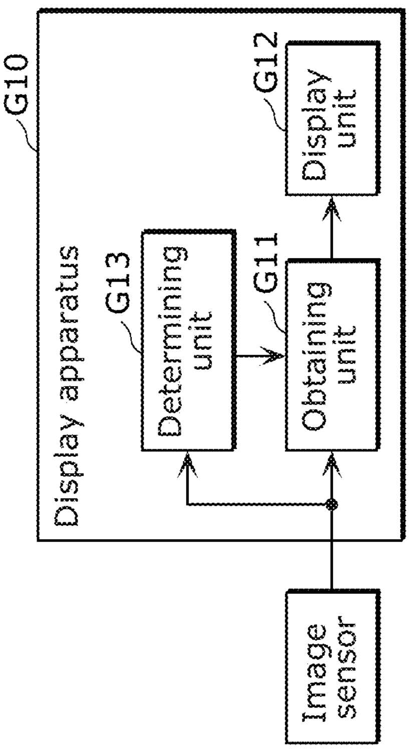
Figure 194A:
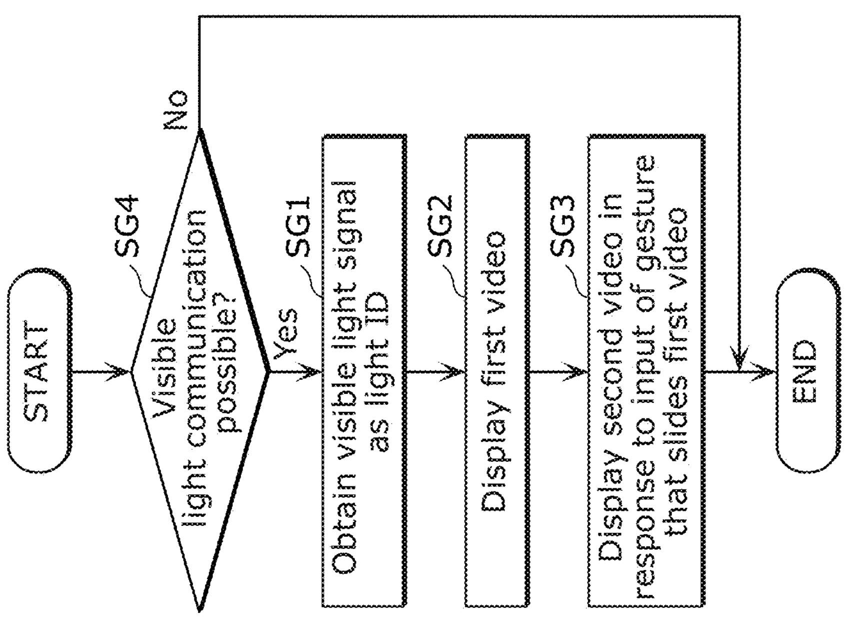

FIG. 194A is a flowchart illustrating a display method in a variation of Embodiment 10.

FIG. 194B is a block diagram illustrating a configuration of a display apparatus in a variation of Embodiment 10.

Figure 194C:
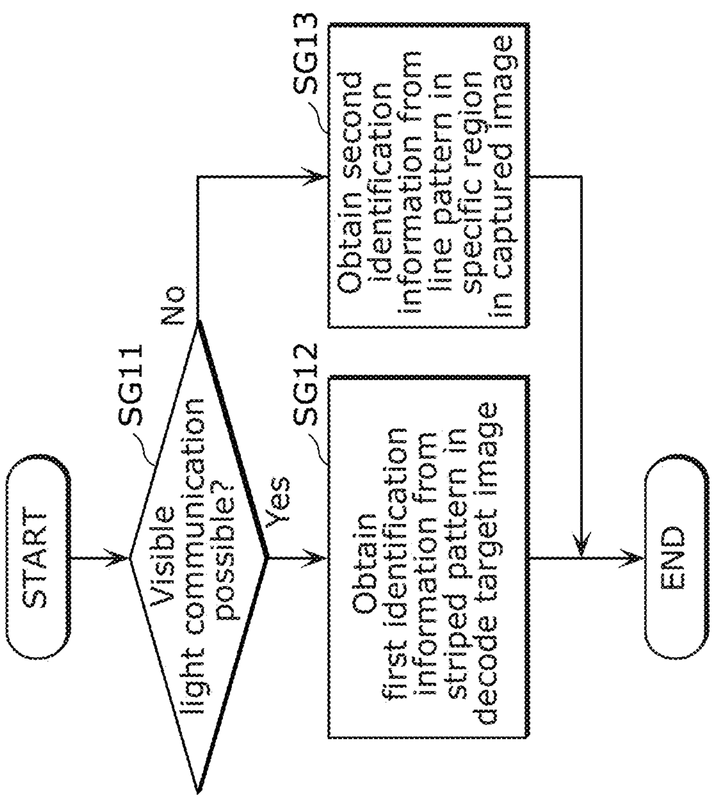

FIG. 194C is a flowchart illustrating a communication method in a variation of Embodiment 10.

Figure 194D:
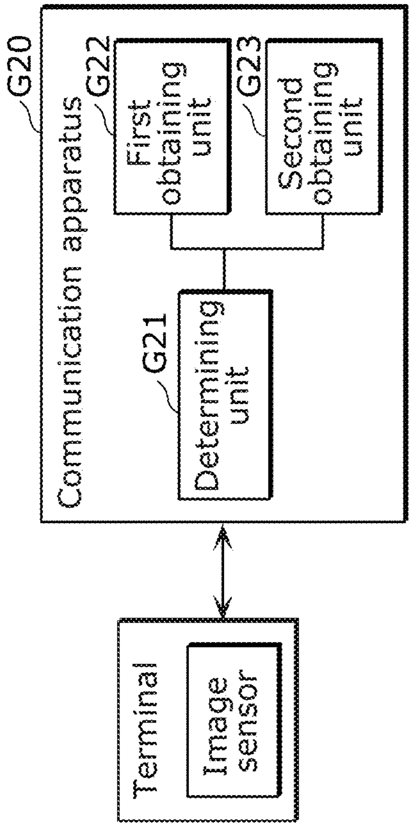

FIG. 194D is a block diagram illustrating a configuration of a communication apparatus in a variation of Embodiment 10.

Figure 194E:
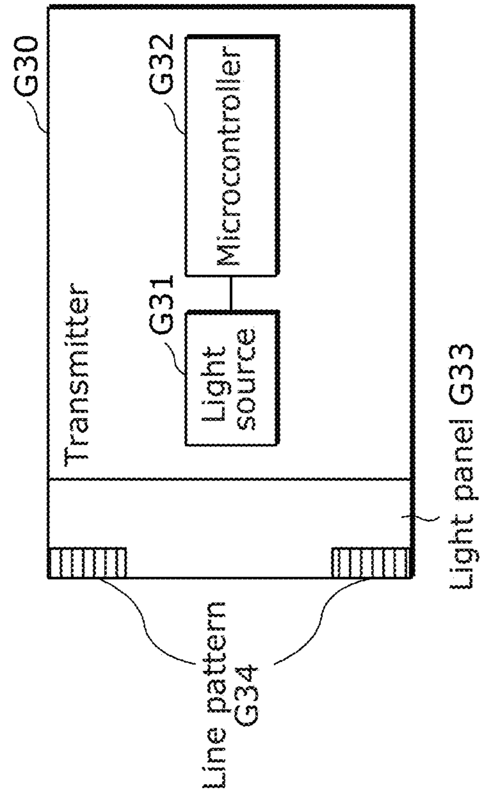

FIG. 194E is a block diagram illustrating a configuration of a transmitter in Embodiment 10 and in a variation of Embodiment 10.

Figure 195:
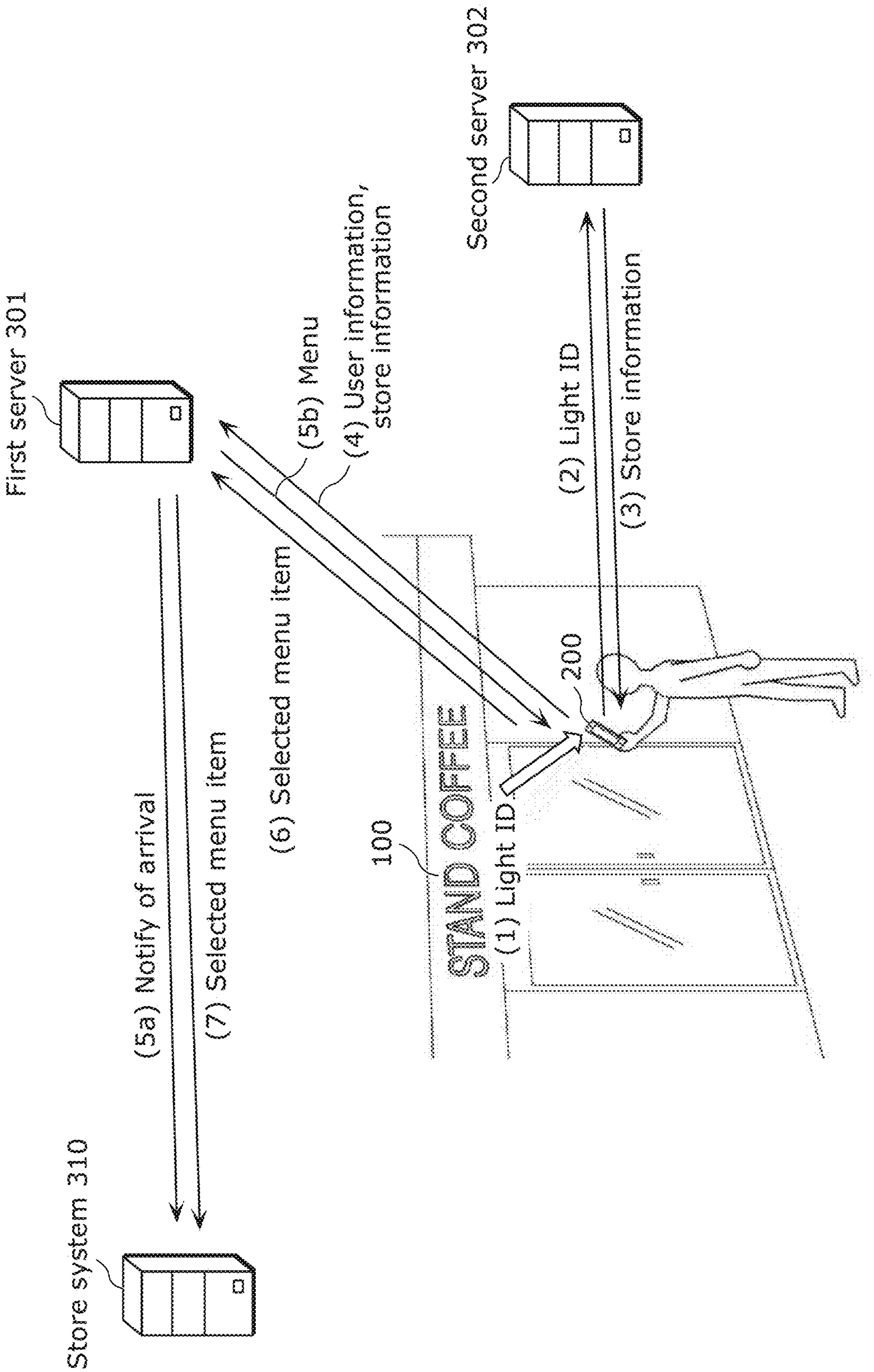

FIG. 195 is a diagram illustrating one example of a configuration of a communication system including a server in Embodiment 11.

Figure 196:
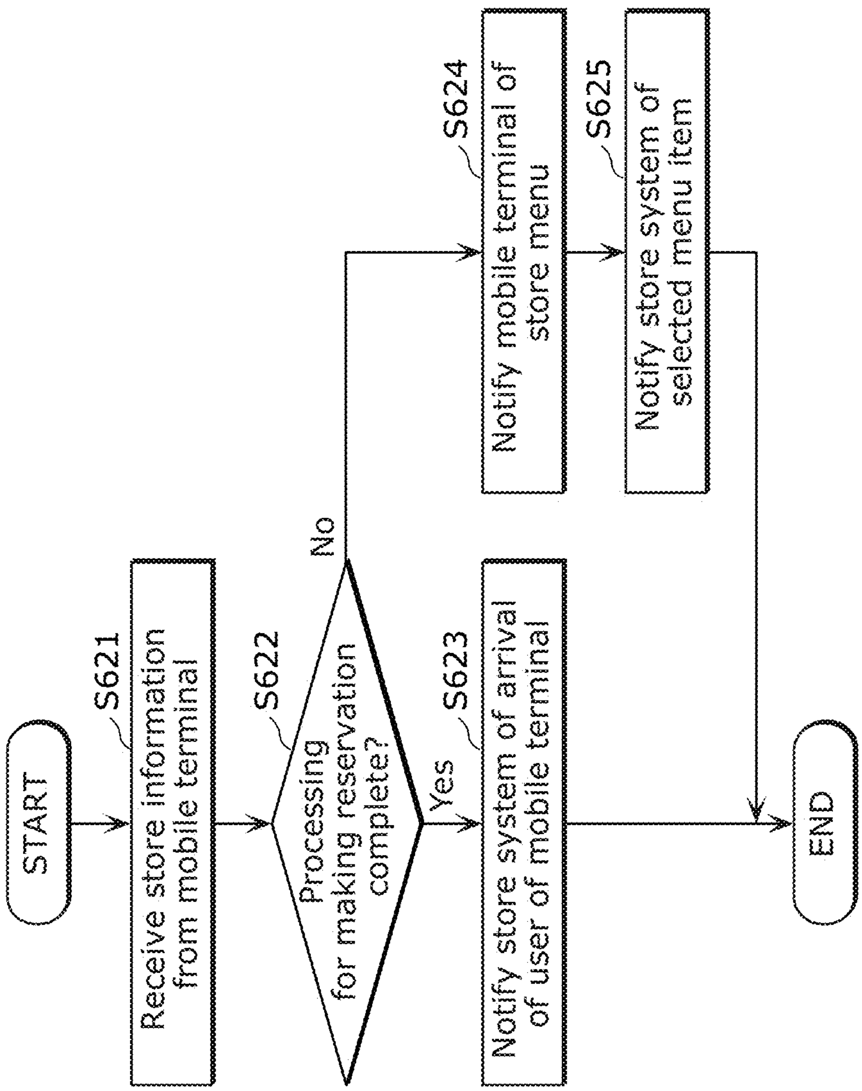

FIG. 196 is a flowchart illustrating a management method performed by a first server in Embodiment 11.

Figure 197:
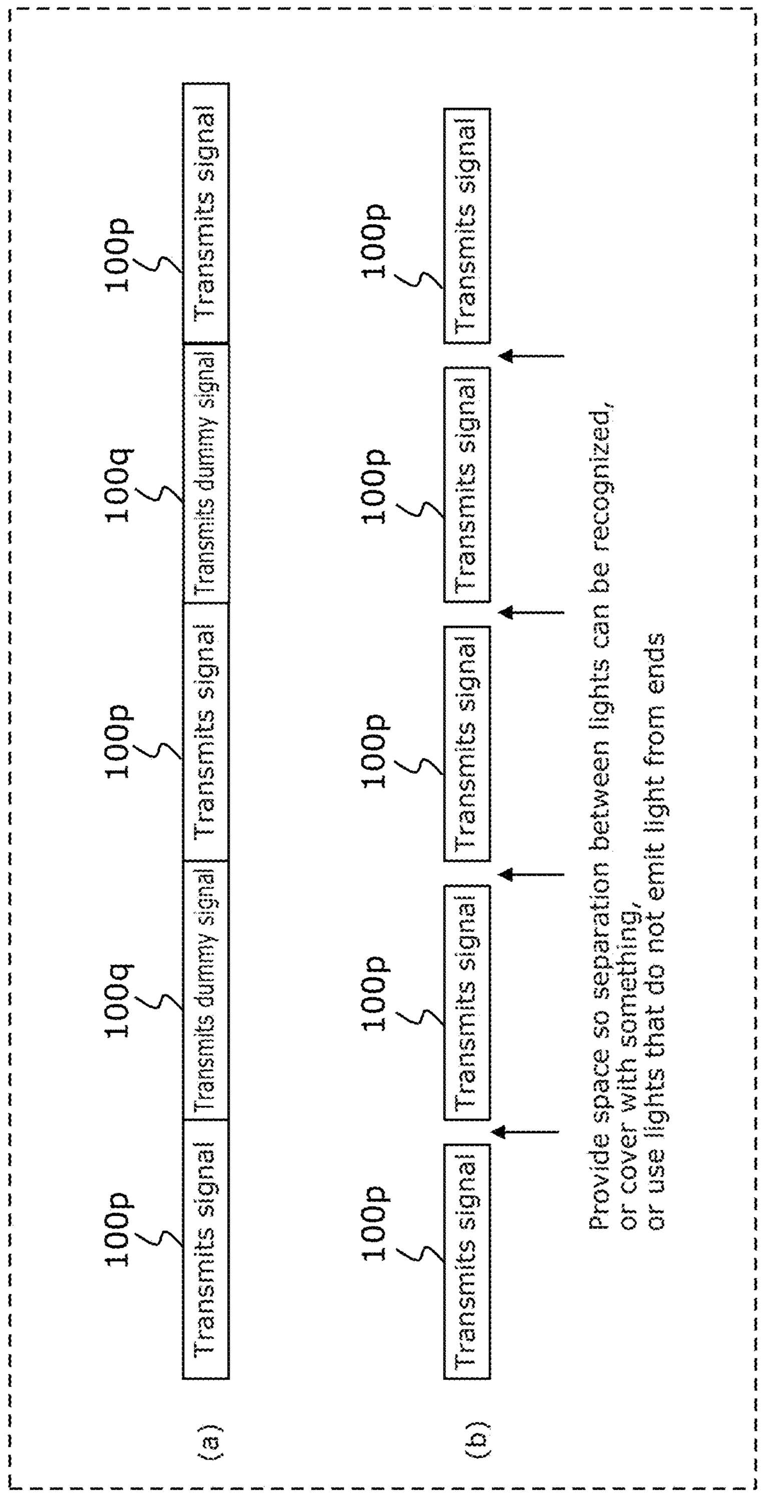

FIG. 197 is a diagram illustrating a lighting system in Embodiment 12.

Figure 198:
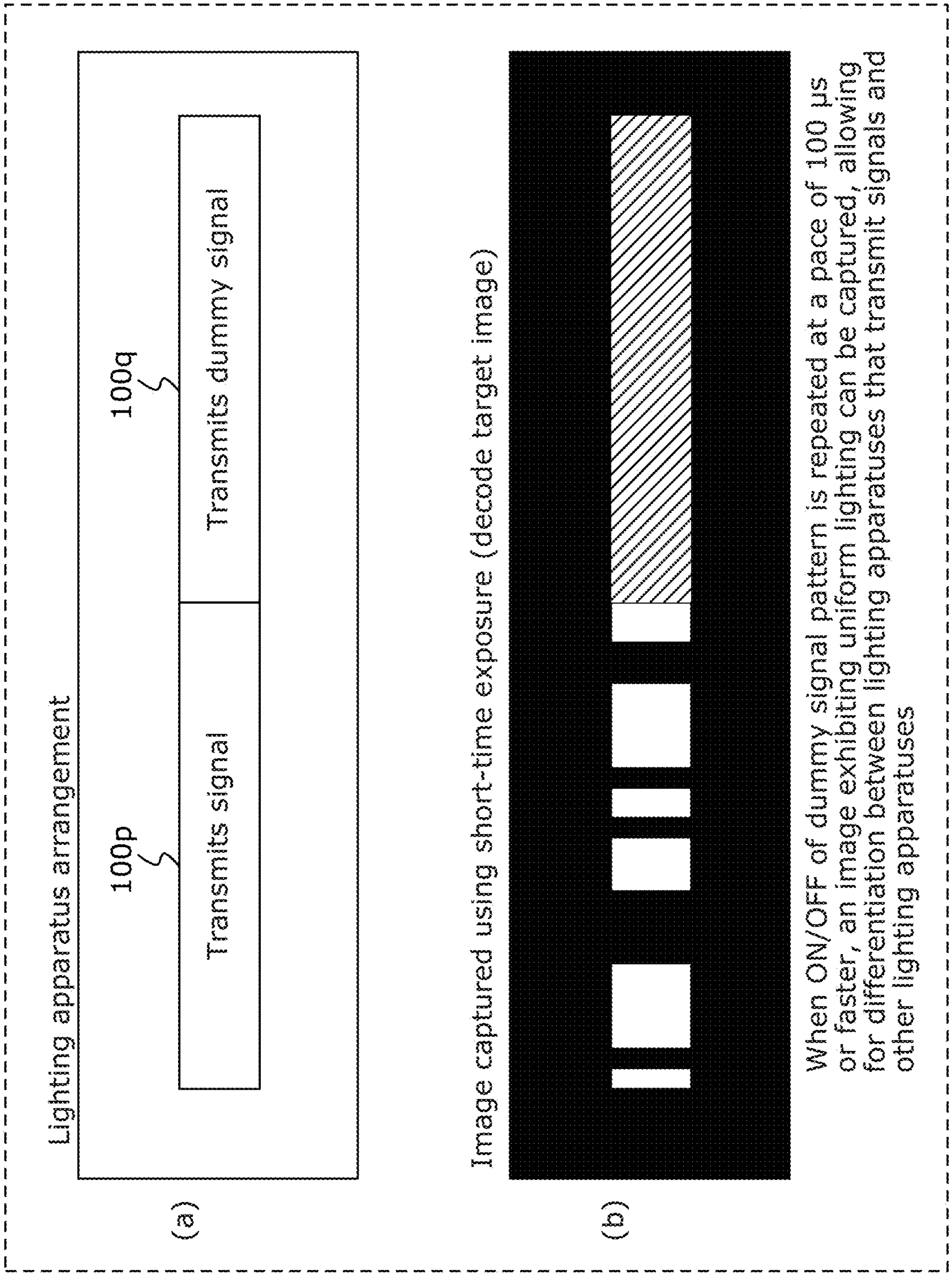

FIG. 198 is a diagram illustrating one example of the arrangement of lighting apparatuses and a decode target image in Embodiment 12.

Figure 199:
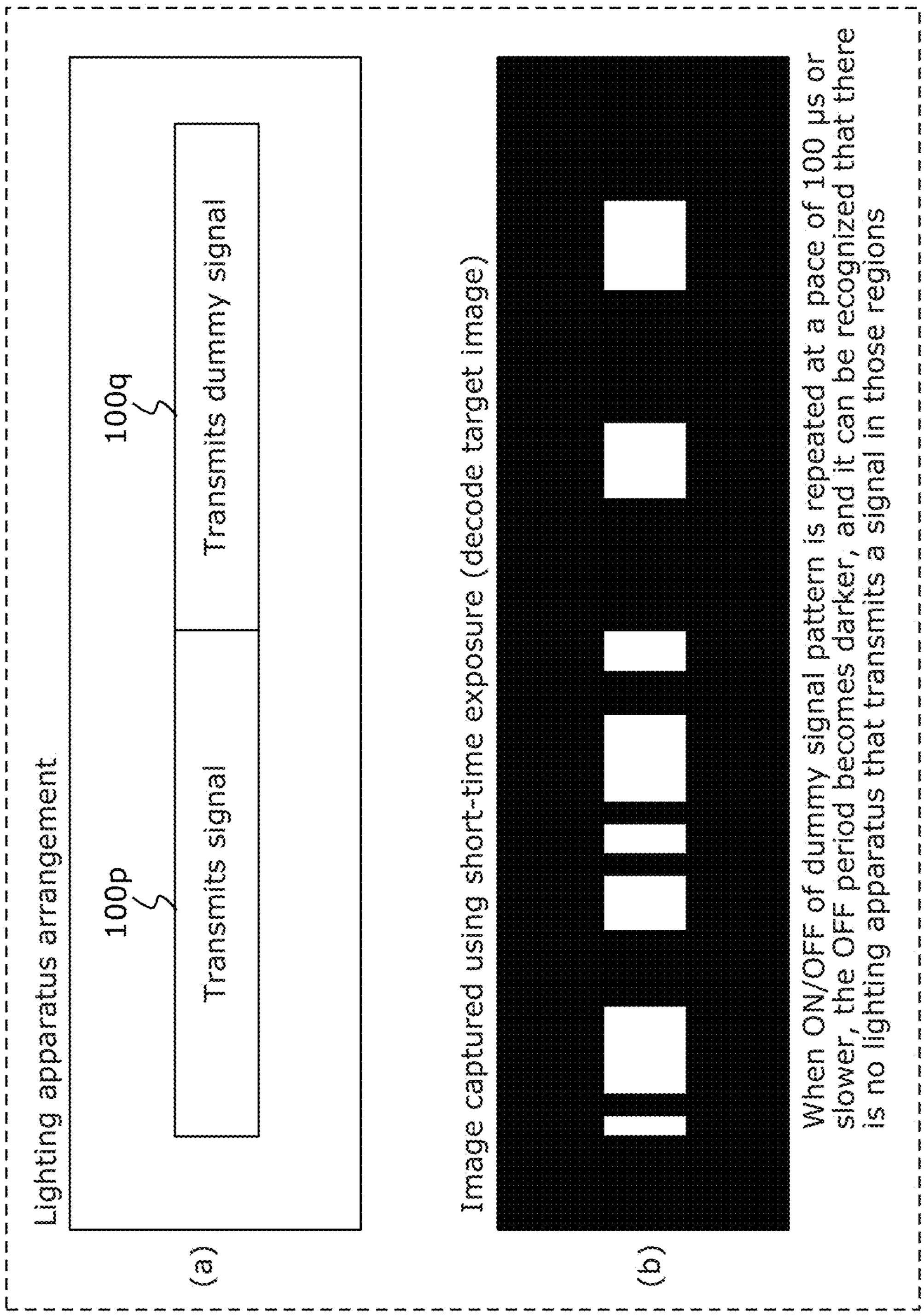

FIG. 199 is a diagram illustrating another example of the arrangement of lighting apparatuses and a decode target image in Embodiment 12.

Figure 200:
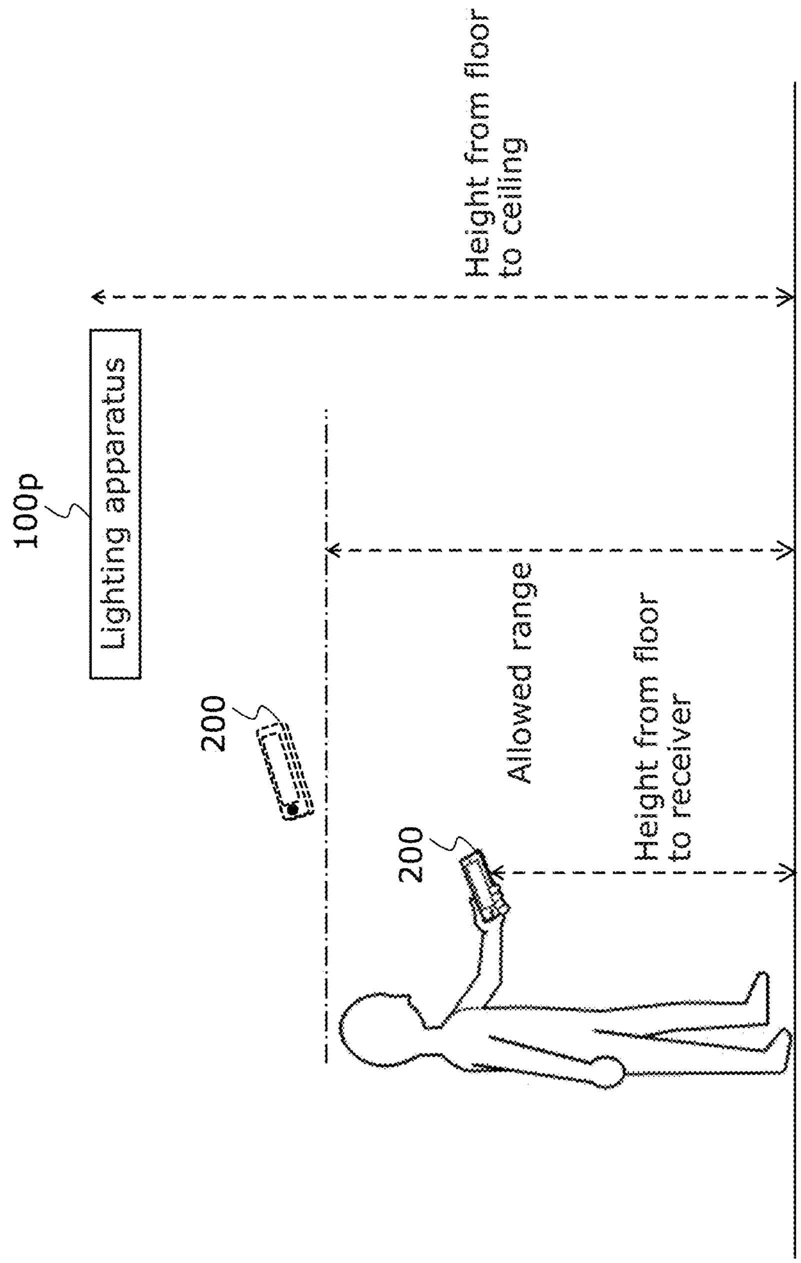

FIG. 200 is a diagram for explaining position estimation using a lighting apparatus in Embodiment 12.

Figure 201:
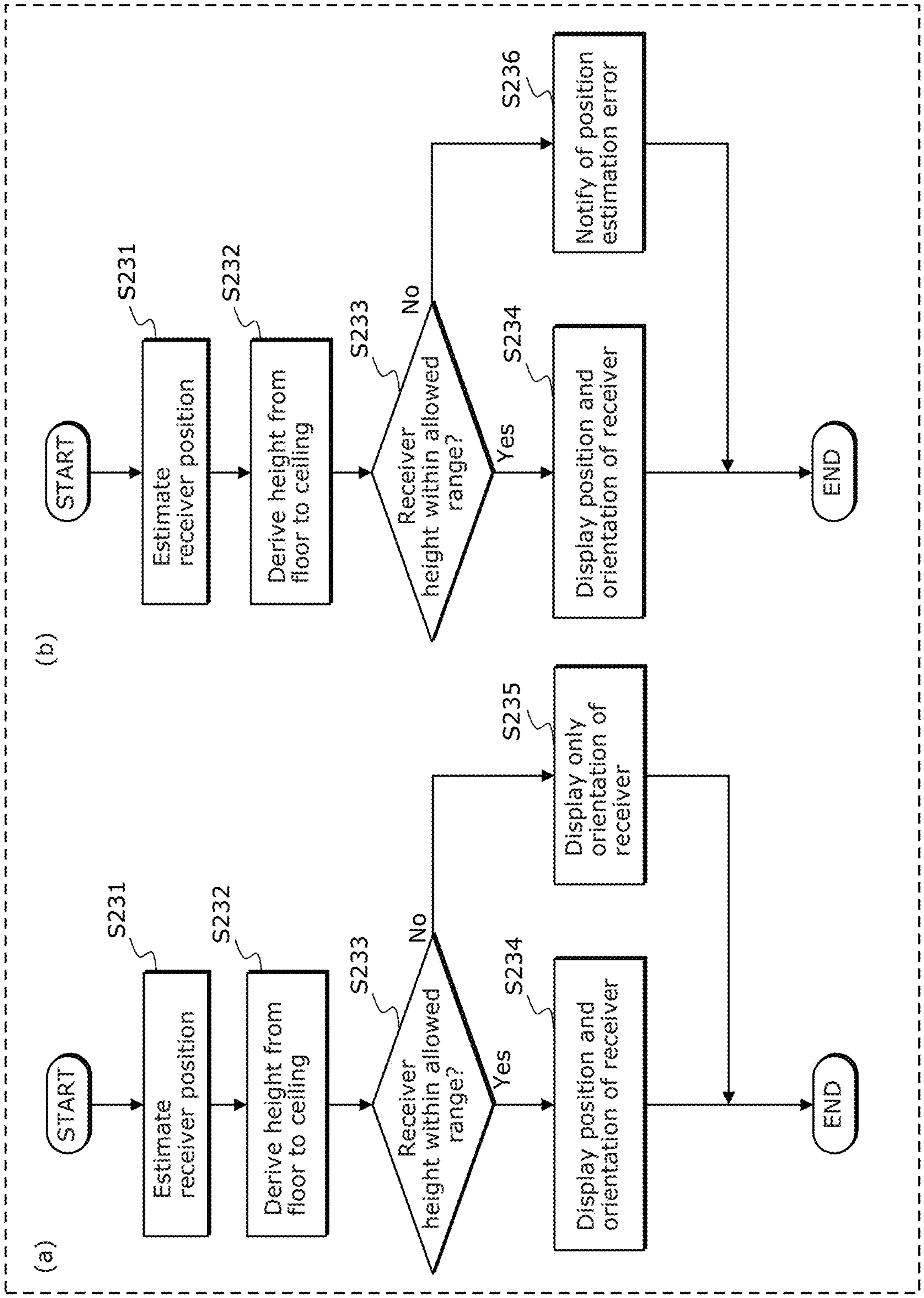

FIG. 201 is a flowchart illustrating processing operations performed by a receiver in Embodiment 12.

Figure 202:
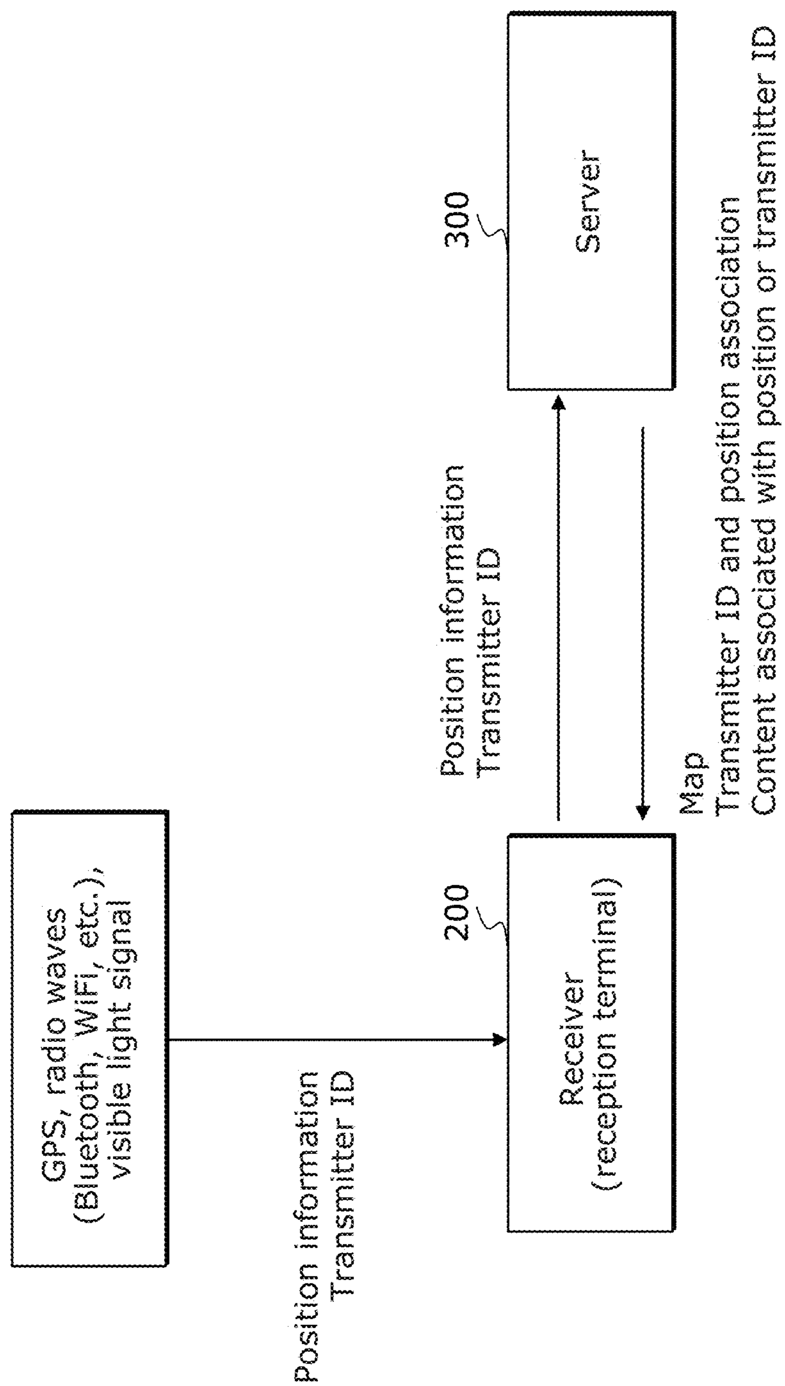

FIG. 202 is a diagram illustrating one example of a communication system in Embodiment 12.

Figure 203:
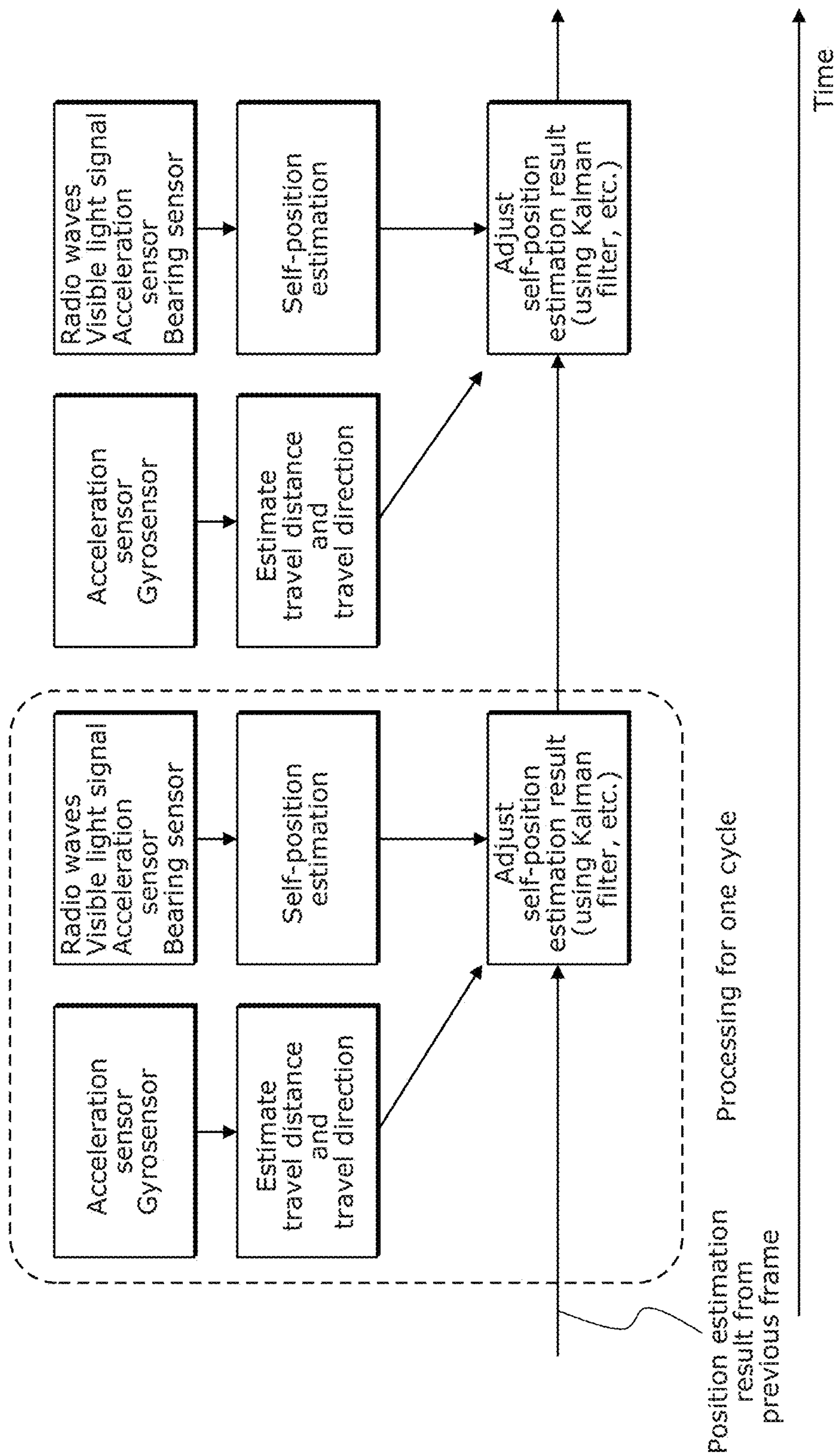

FIG. 203 is a diagram for explaining self-position estimation performed by a receiver in Embodiment 12.

Figure 204:
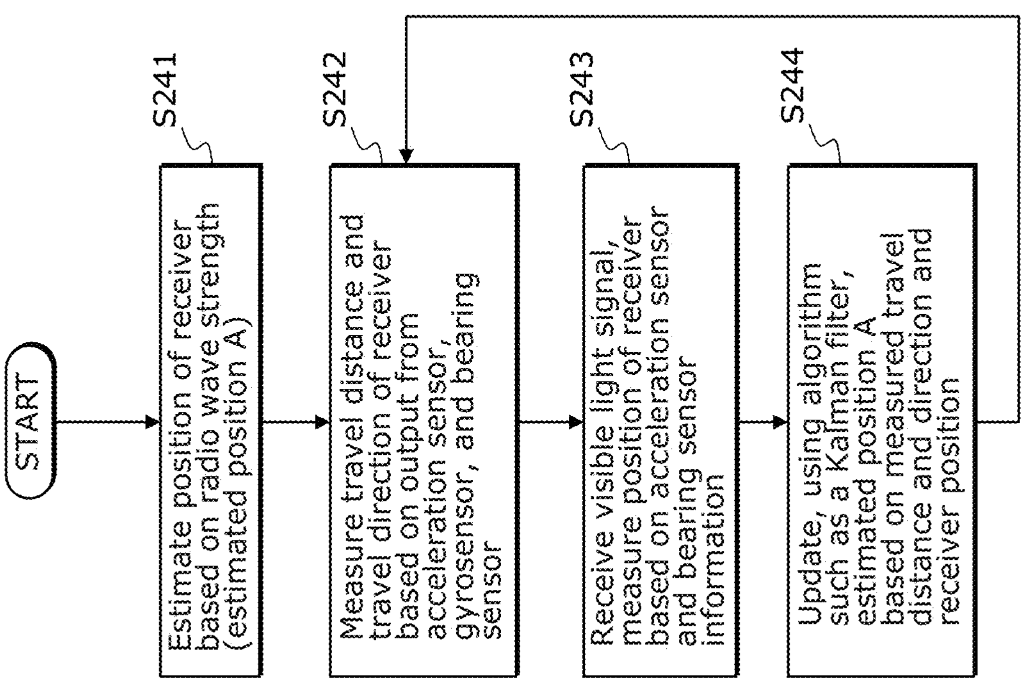

FIG. 204 is a flowchart of self-position estimation processes performed by a receiver in Embodiment 12.

Figure 205:
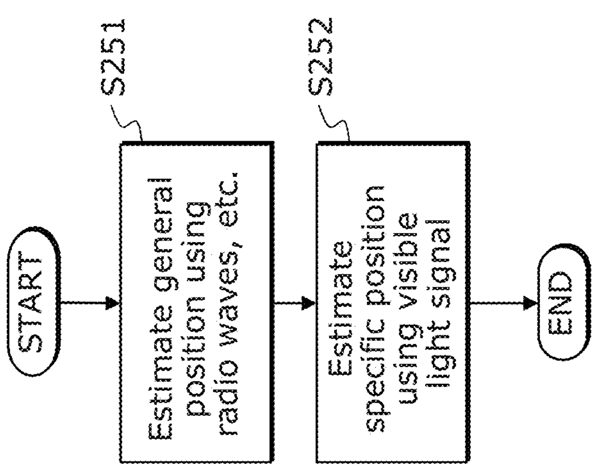

FIG. 205 is flowchart illustrating an outline of processes performed n the self-position estimation by a receiver in Embodiment 12.

Figure 206:
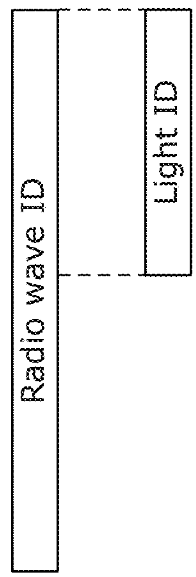

FIG. 206 is a diagram illustrating the relationship between radio wave ID and light ID in Embodiment 12.

Figure 207:
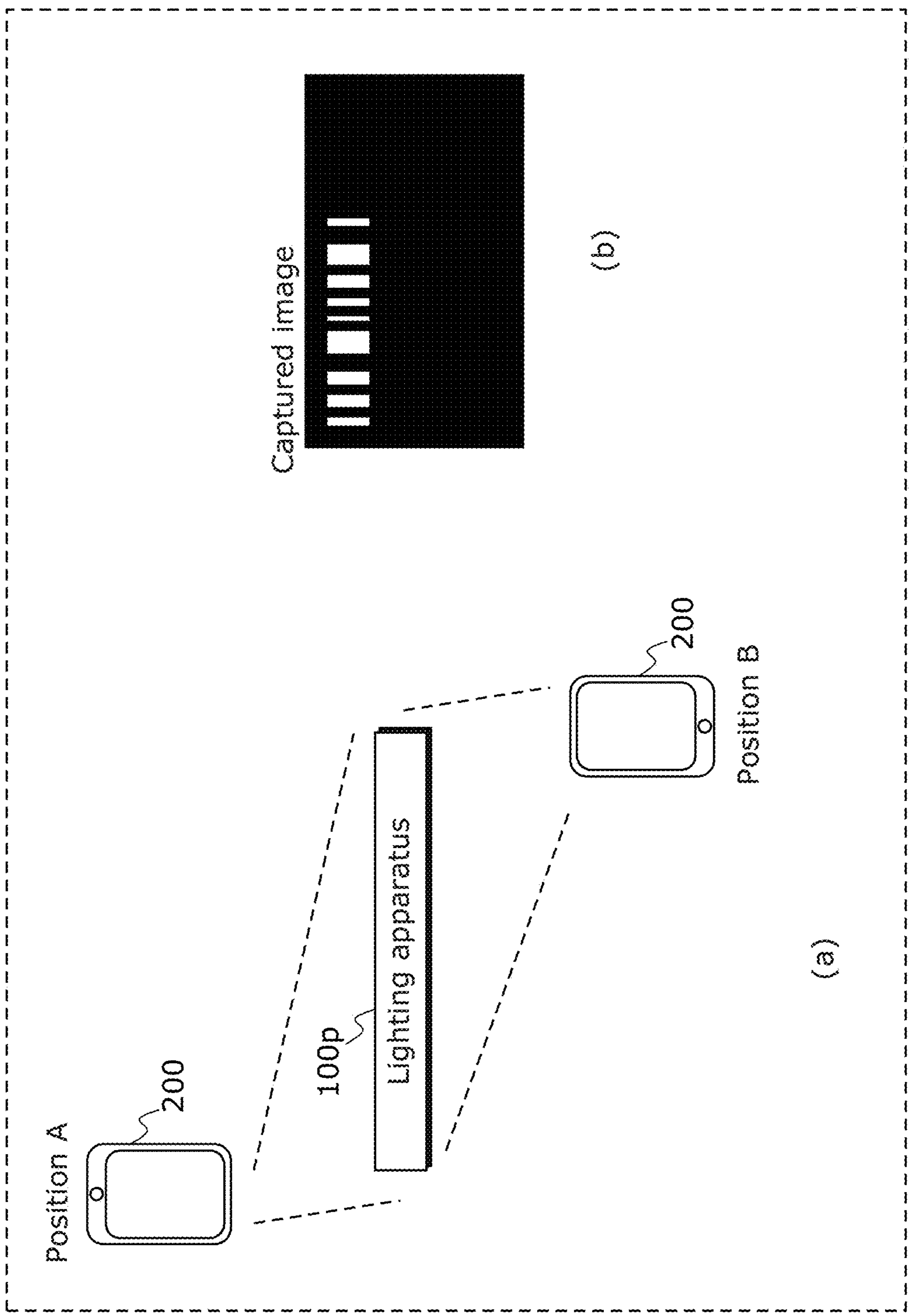

FIG. 207 is a diagram illustrating one example of capturing performed by a receiver in Embodiment 12.

Figure 208:
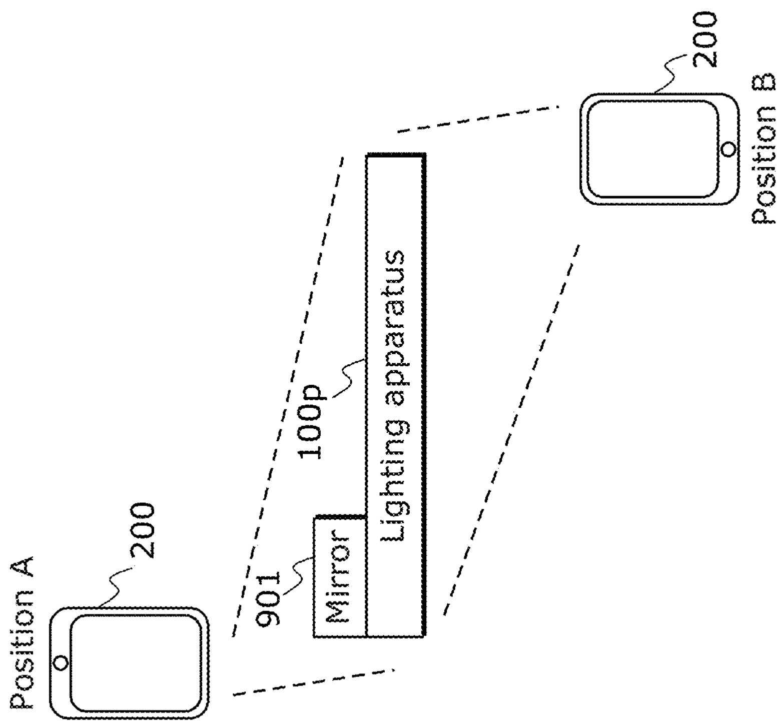

FIG. 208 is a diagram illustrating another example of capturing performed by a receiver in Embodiment 12.

Figure 209:
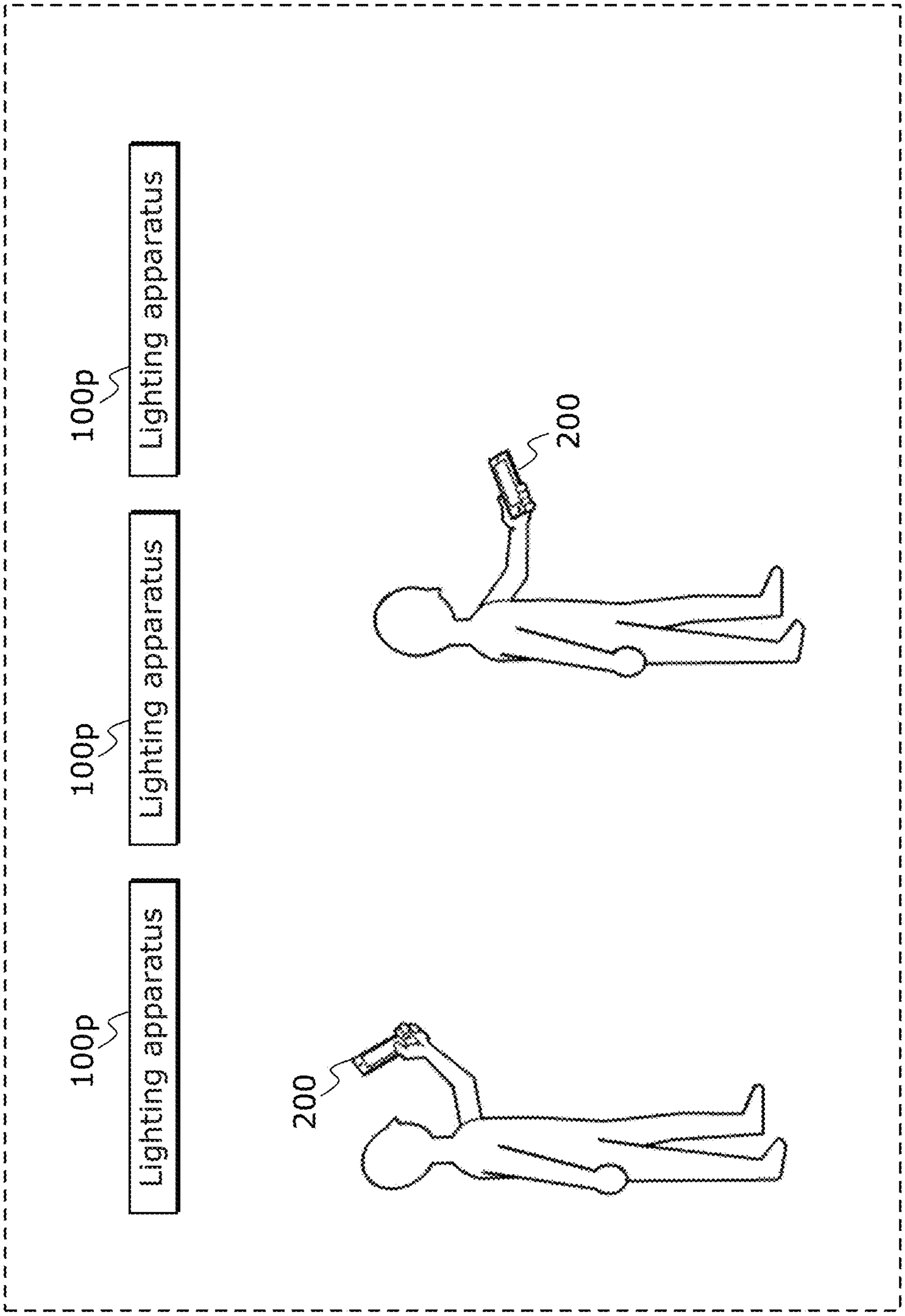

FIG. 209 is a diagram for explaining the cameras used by a receiver in Embodiment 12.

Figure 210:
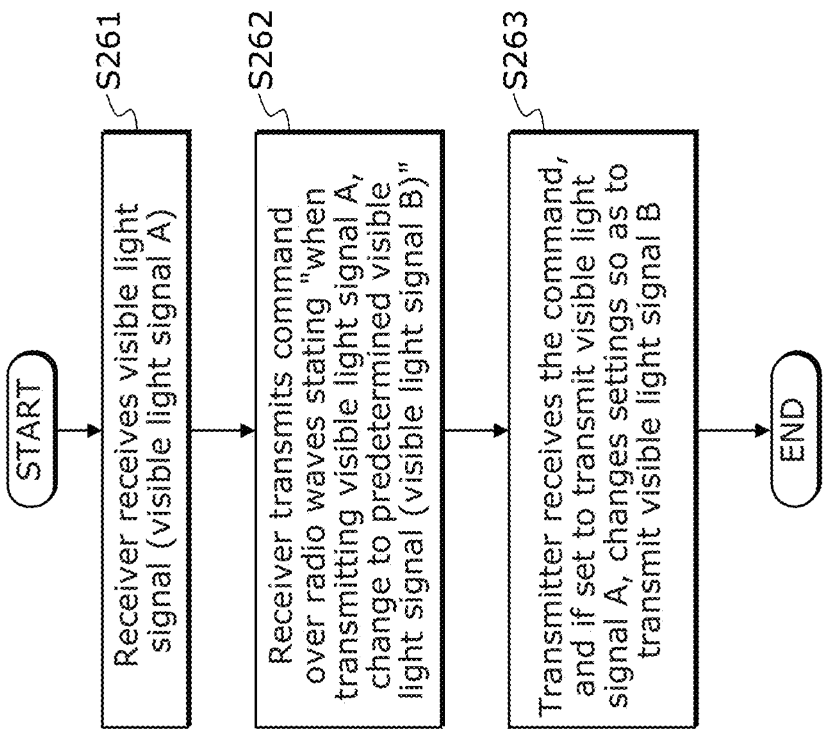

FIG. 210 is a flowchart illustrating one example of processing that changes the visible light signal of a transmitter by a receiver in Embodiment 12.

Figure 211:
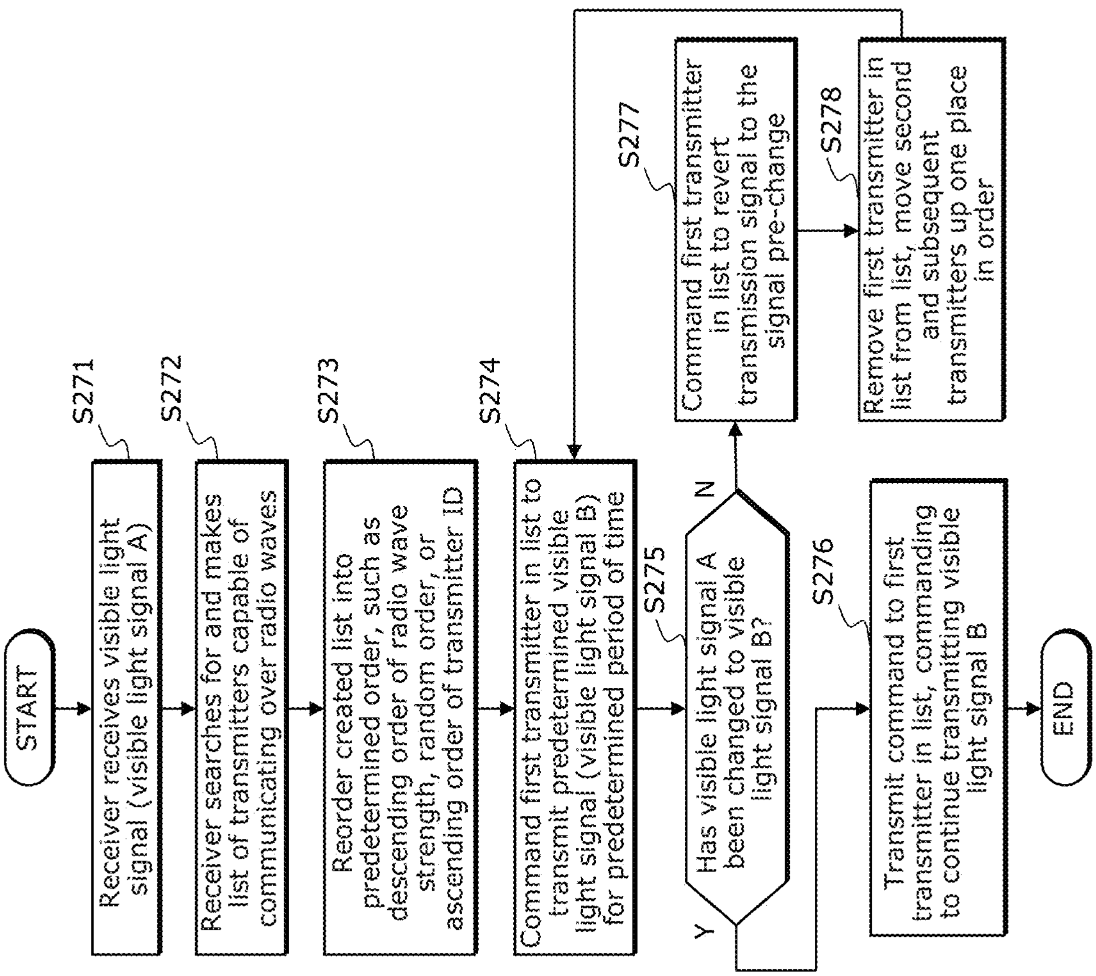

FIG. 211 is a flowchart illustrating another example of processing that changes the visible light signal of a transmitter by a receiver in Embodiment 12.

Figure 212:
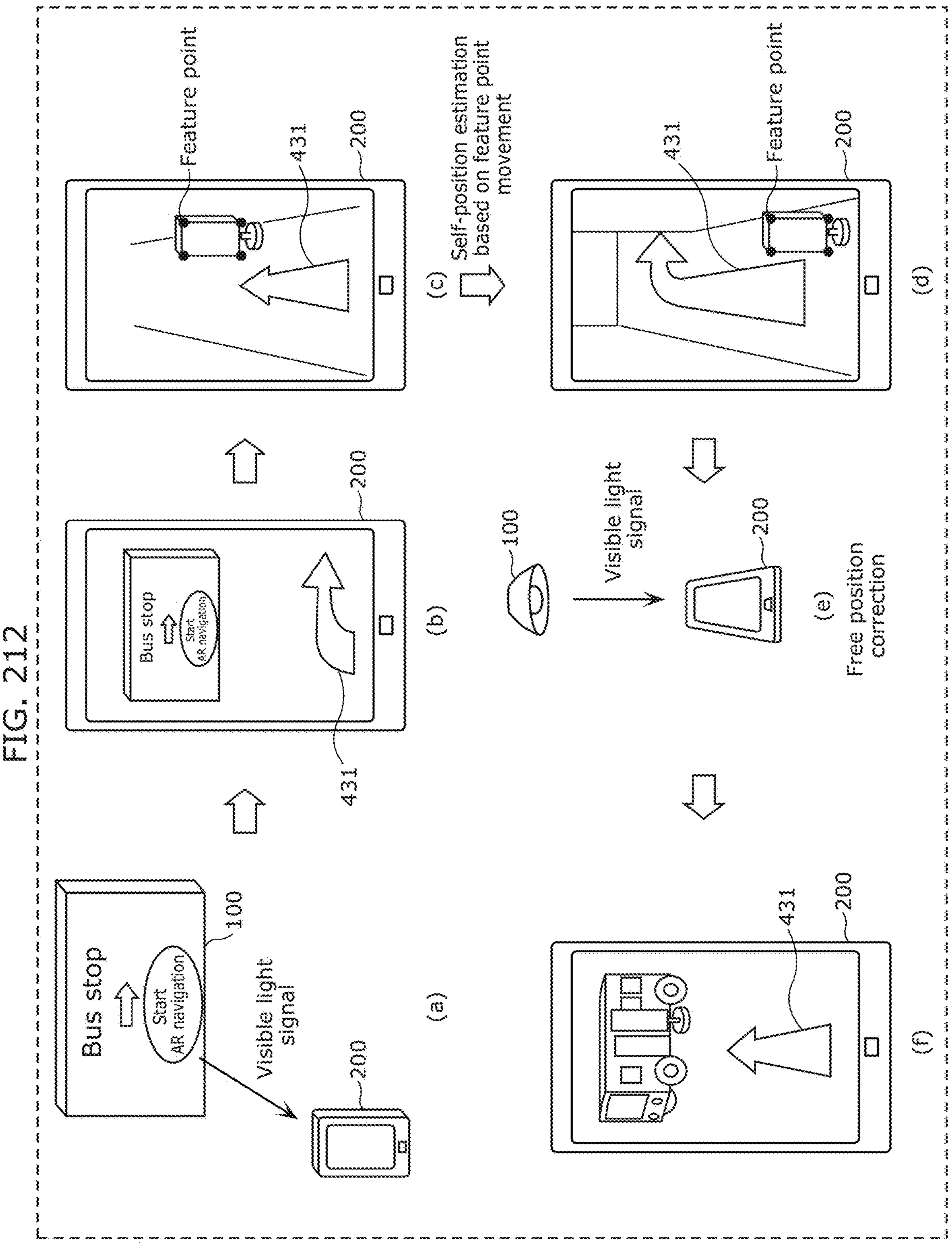

FIG. 212 is a diagram for explaining navigation performed by a receiver in Embodiment 13.

Figure 213:
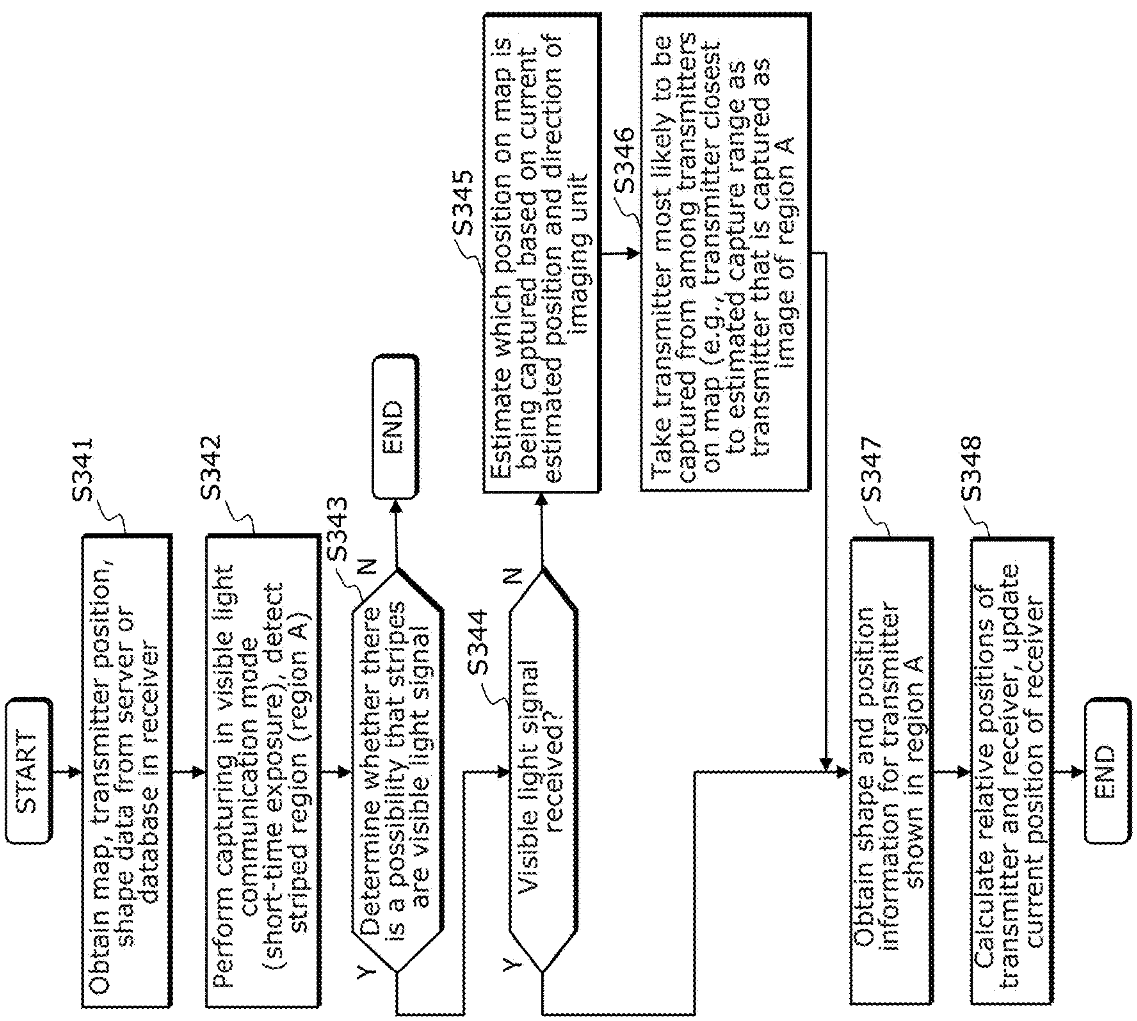

FIG. 213 is a flowchart of one example of self-position estimation processes performed by a receiver in Embodiment 13.

Figure 214:
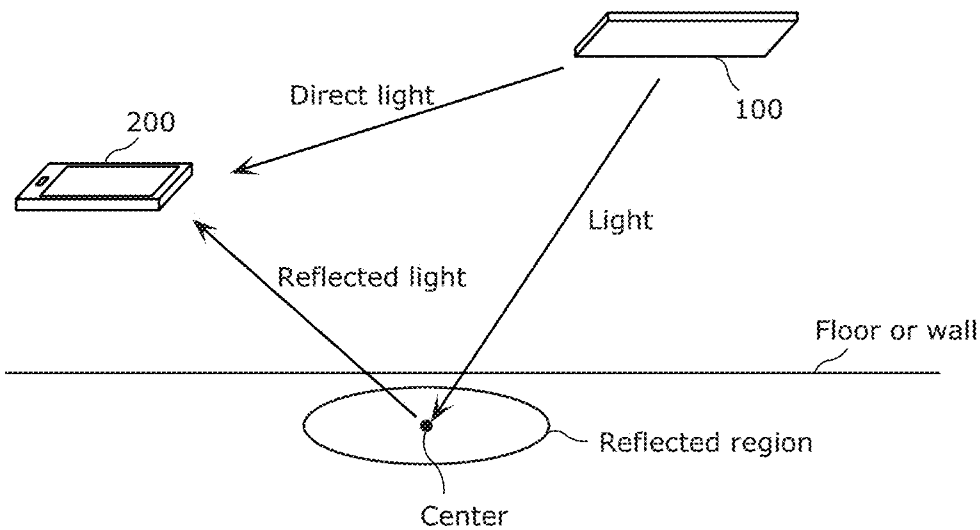

FIG. 214 is a diagram for explaining the visible light signal received by a receiver in Embodiment 13.

Figure 215:
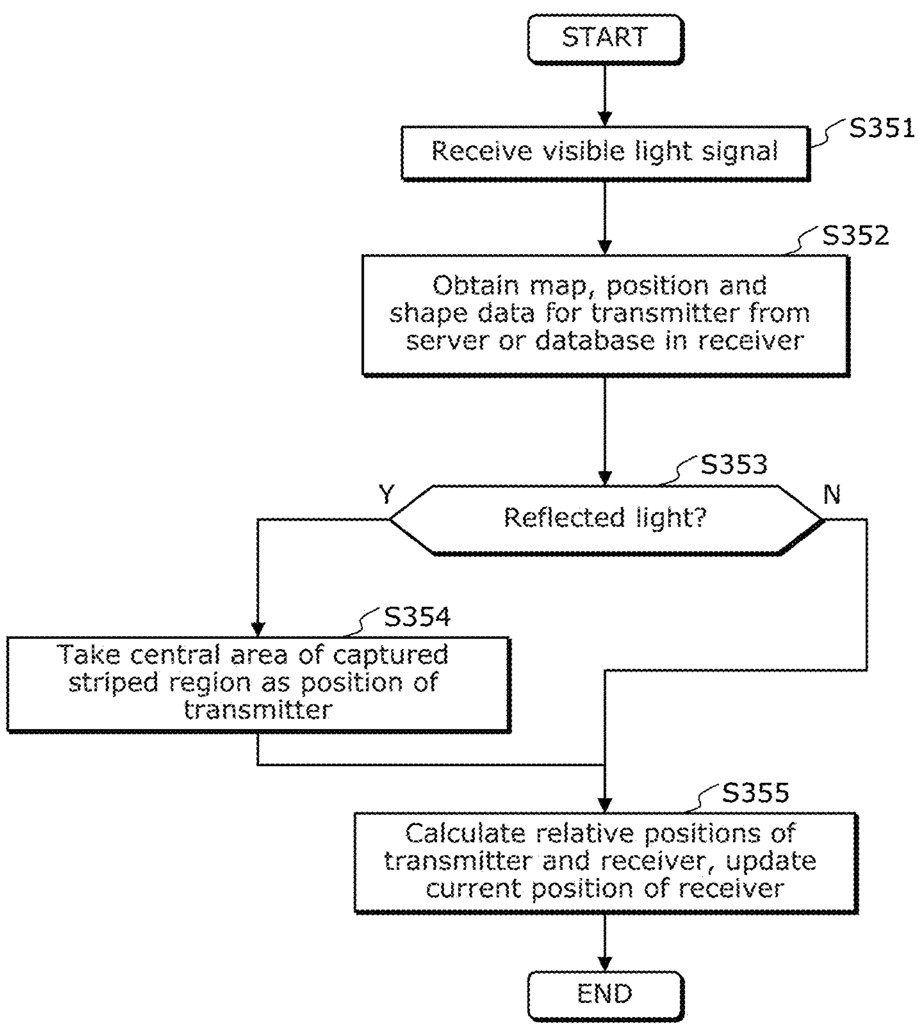

FIG. 215 is a flowchart of another example of self-position estimation processes performed by a receiver in Embodiment 13.

Figure 216:
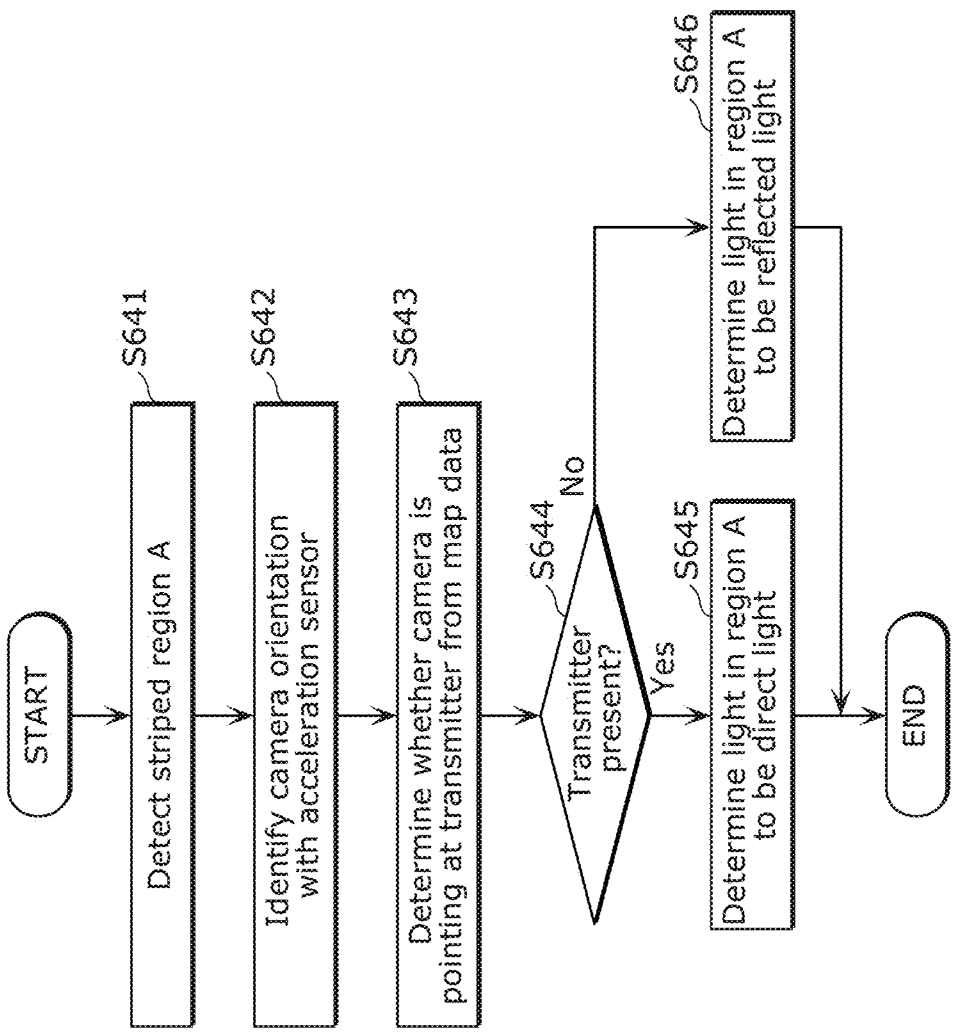

FIG. 216 is a flowchart illustrating an example of reflected light determination performed by a receiver in Embodiment 13.

Figure 217:
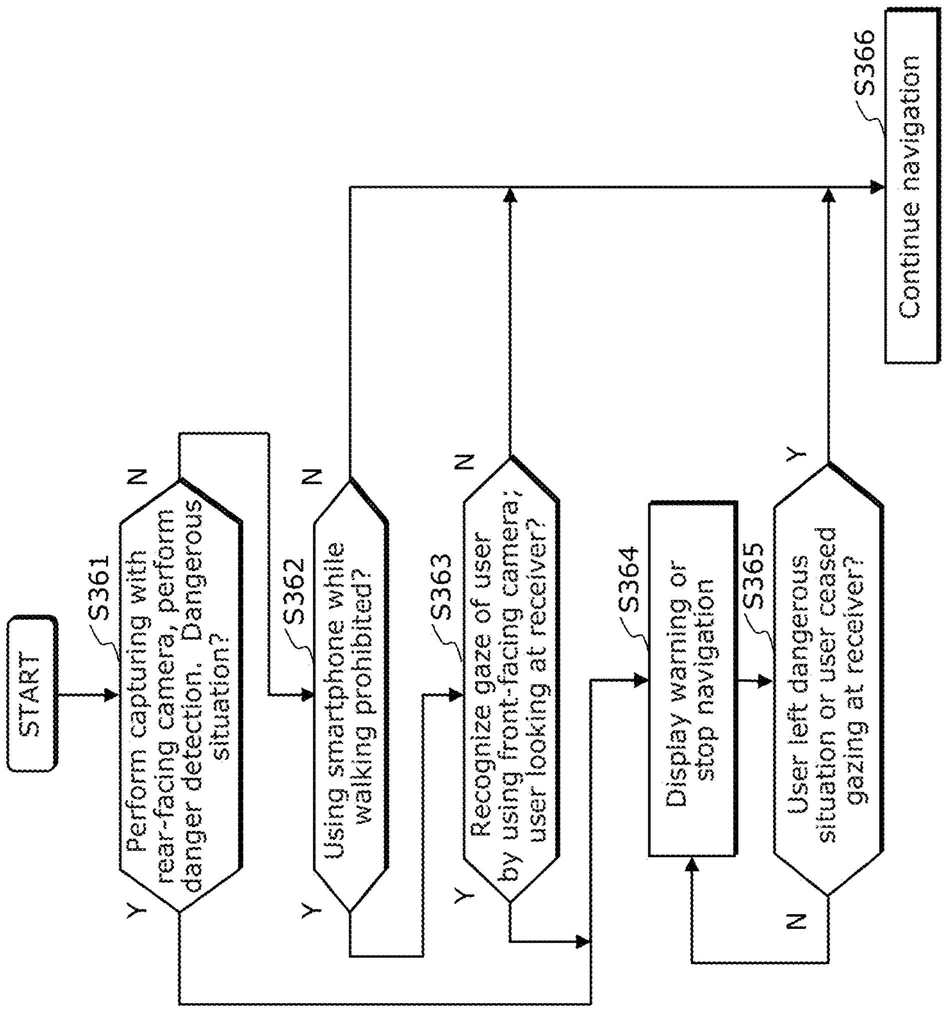

FIG. 217 is a flowchart illustrating an example of navigation performed by a receiver in Embodiment 13.

Figure 218:
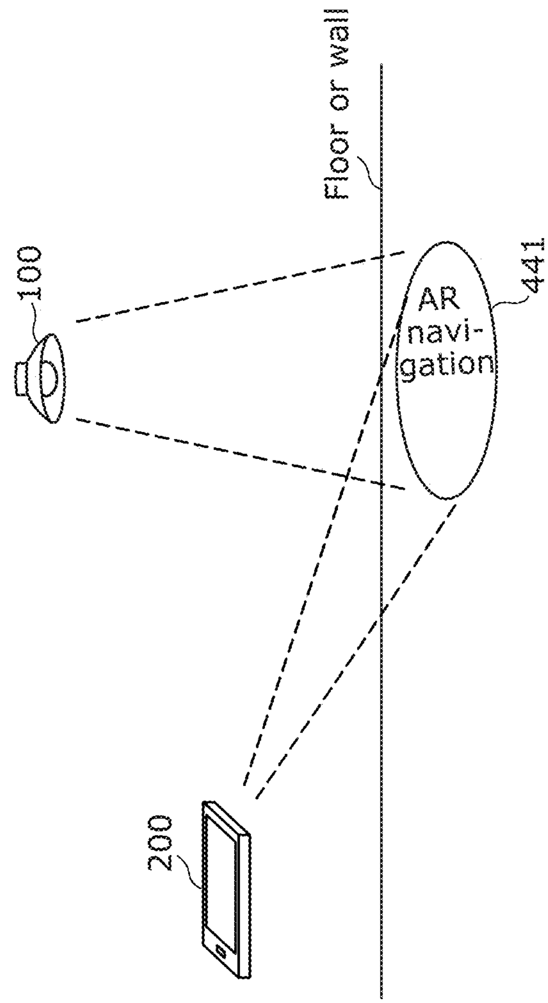

FIG. 218 illustrates an example of a transmitter implemented as a projector in Embodiment 13.

Figure 219:
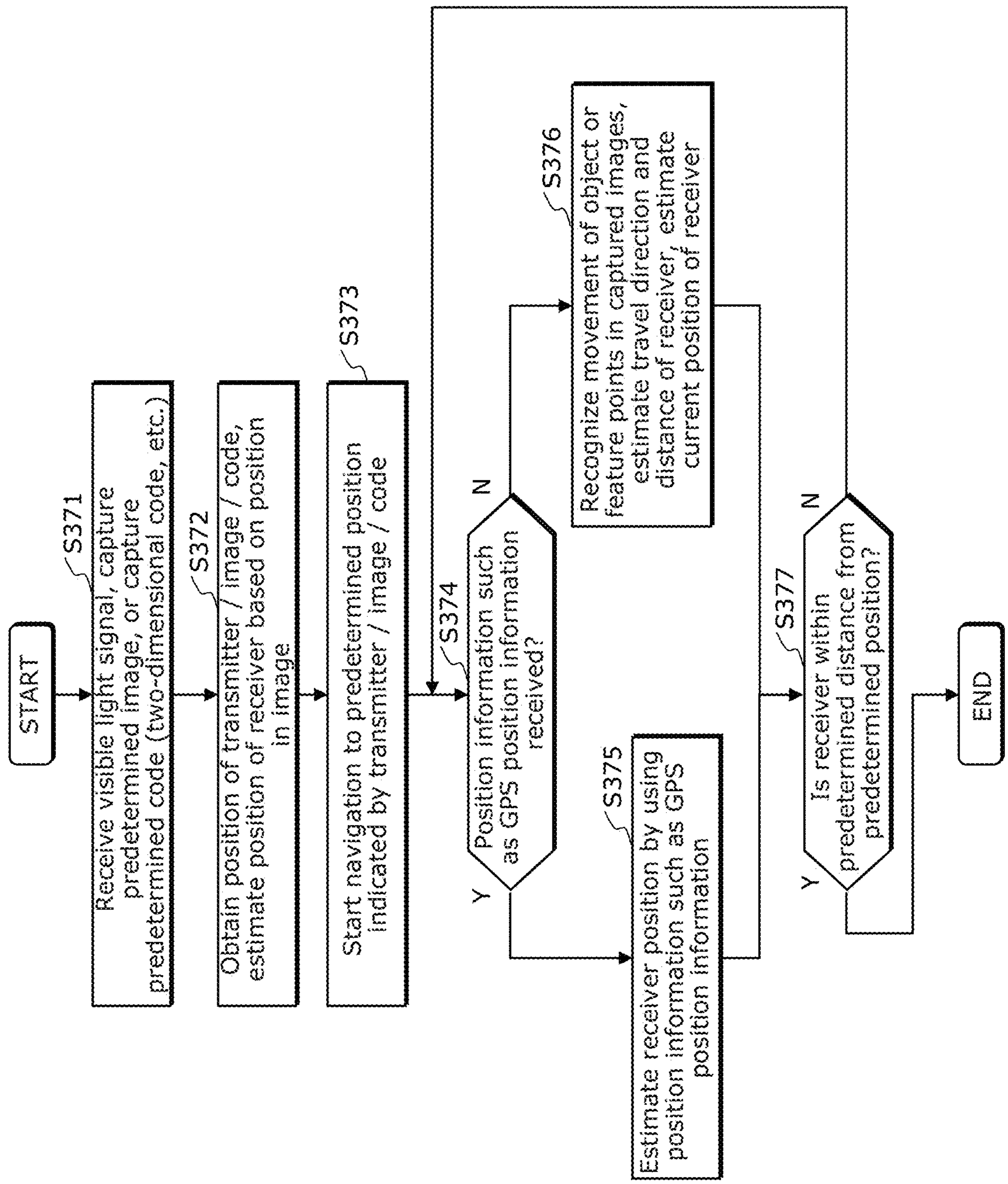

FIG. 219 is a flowchart of another example of self-position estimation processes performed by a receiver in Embodiment 13.

Figure 220:
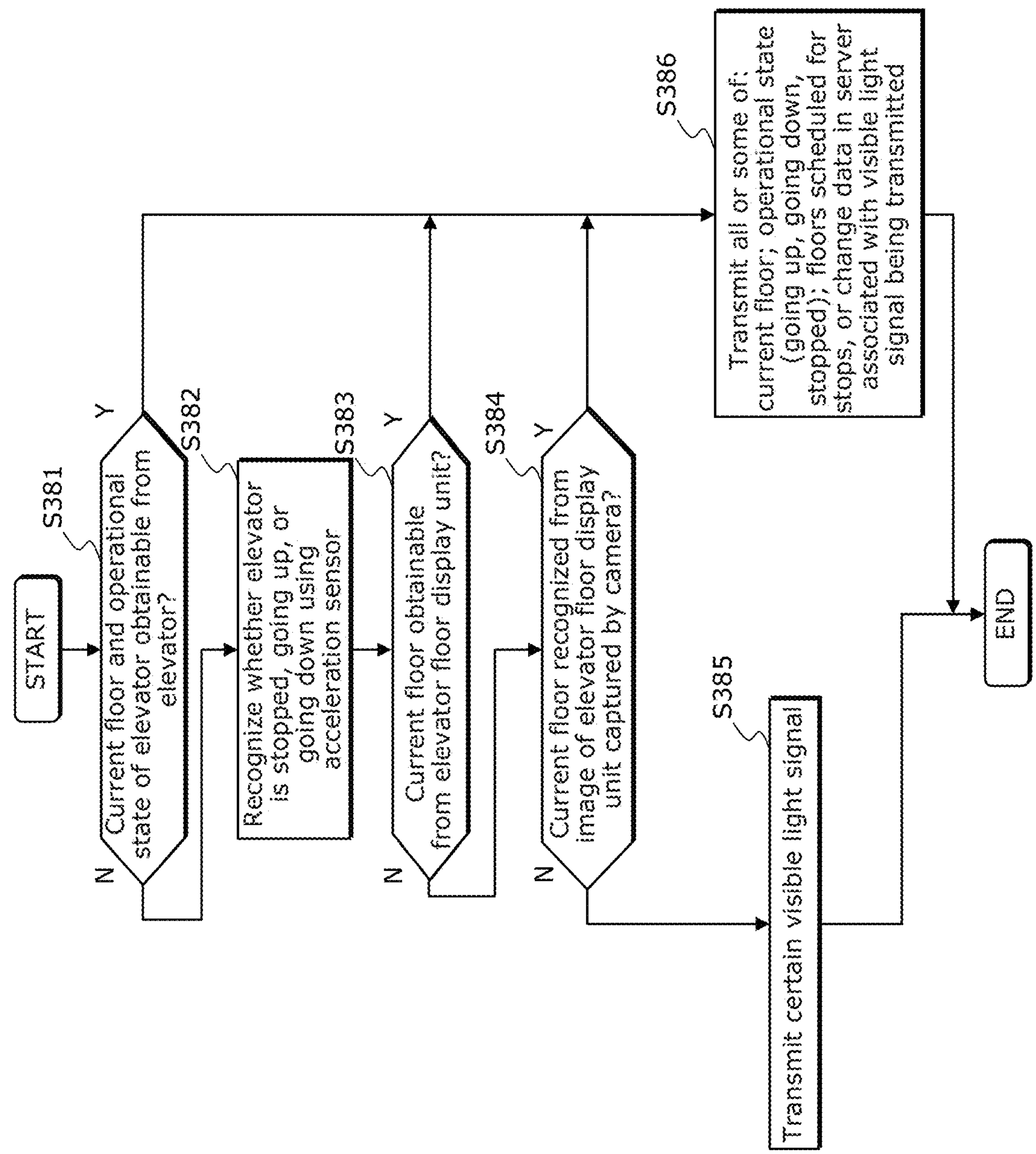

FIG. 220 is a flowchart illustrating one example of processes performed by a transmitter in Embodiment 13.

Figure 221:
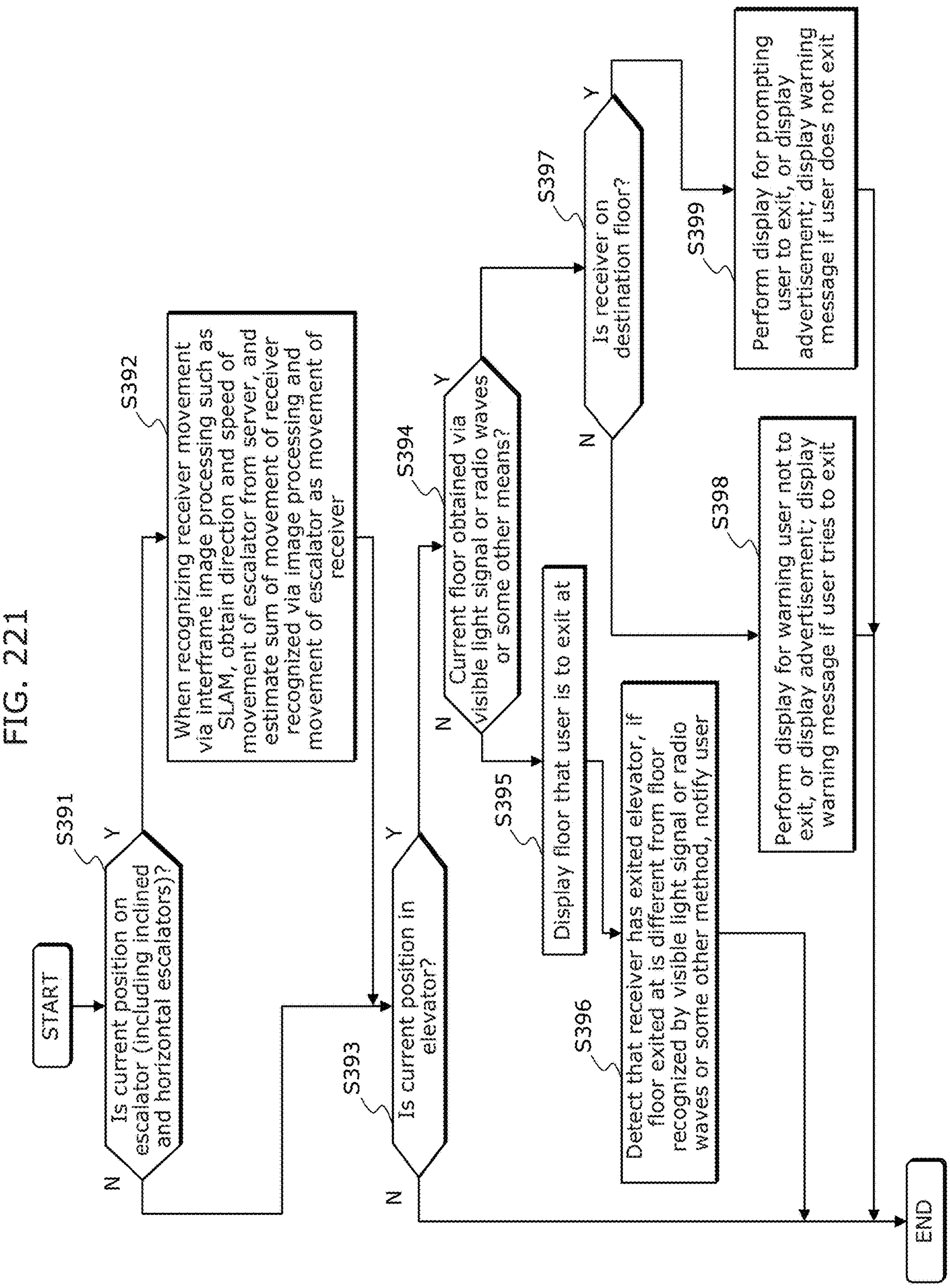

FIG. 221 is a flowchart illustrating another example of navigation performed by a receiver in Embodiment 13.

Figure 222:
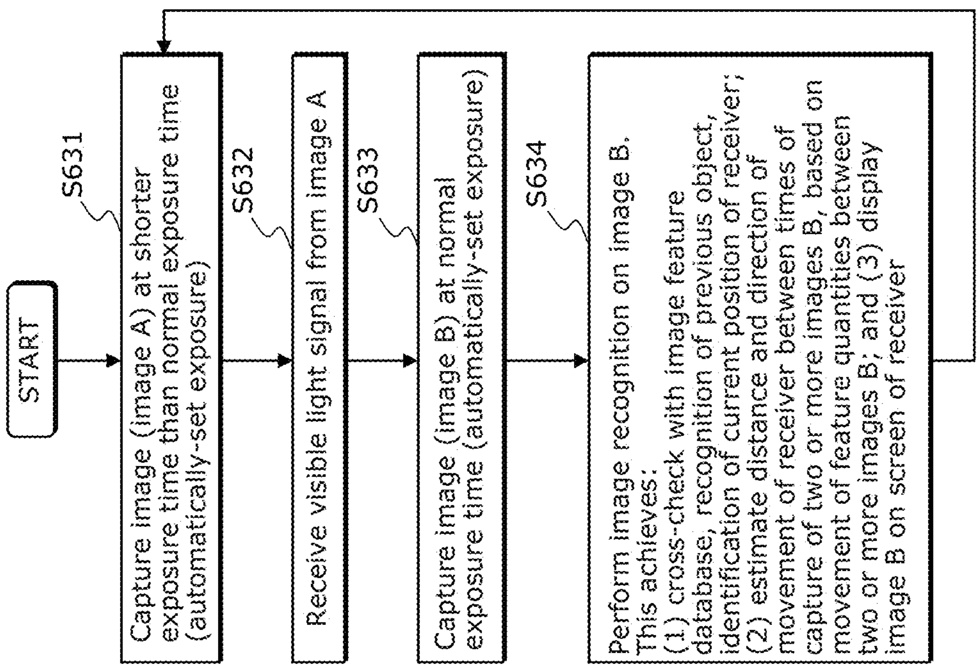

FIG. 222 is a flowchart illustrating one example of processes performed by a receiver in Embodiment 13.

Figure 223:
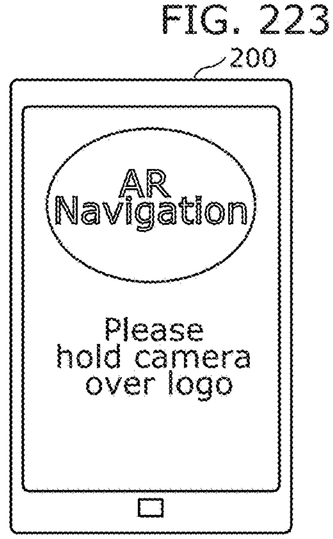

FIG. 223 is a diagram illustrating one example of a screen displayed on a display of a receiver in Embodiment 13.

Figure 224:
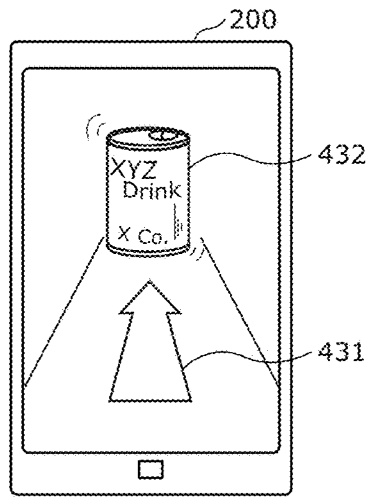

FIG. 224 illustrates one example of a display of a character by a receiver in Embodiment 13.

Figure 225:
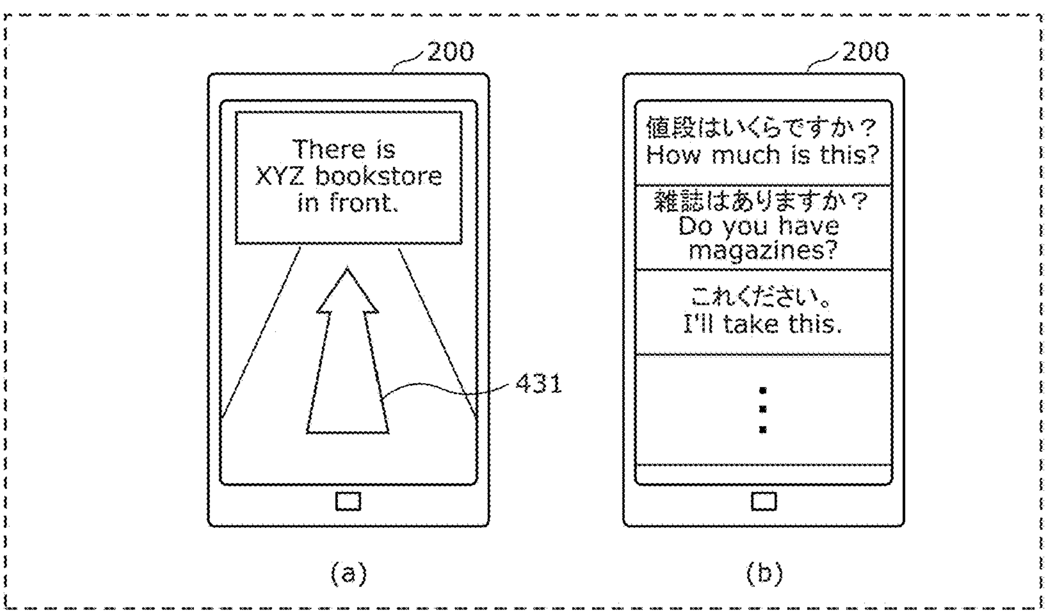

FIG. 225 is a diagram illustrating another example of a screen displayed on a display of a receiver in Embodiment 13.

Figure 226:
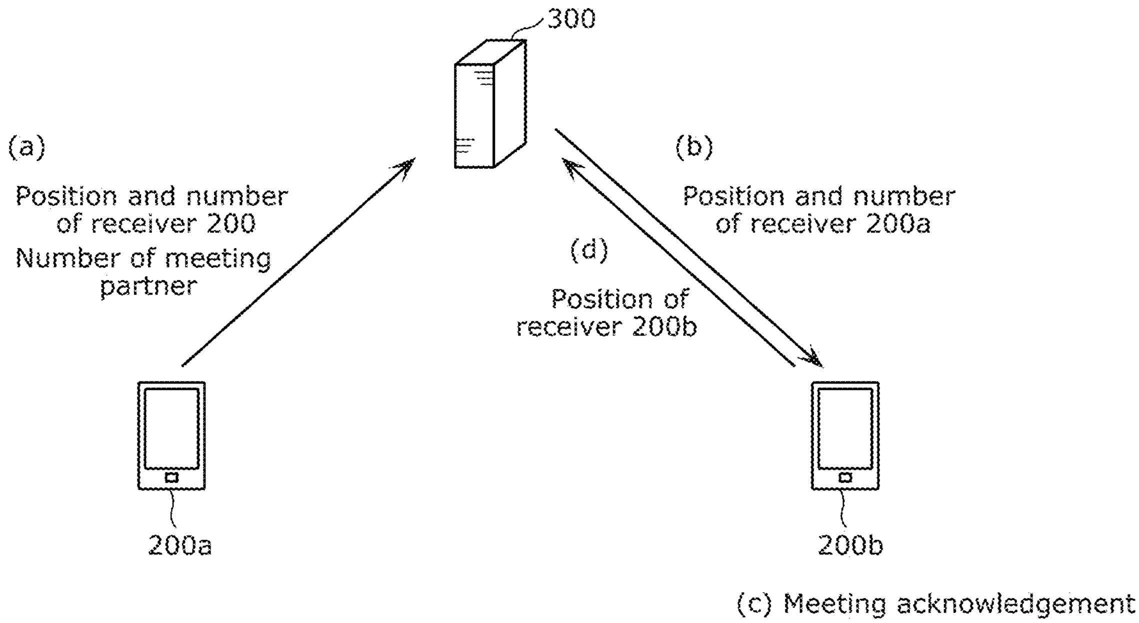

FIG. 226 illustrates a system configuration for performing navigation to a meeting place, in Embodiment 13.

Figure 227:
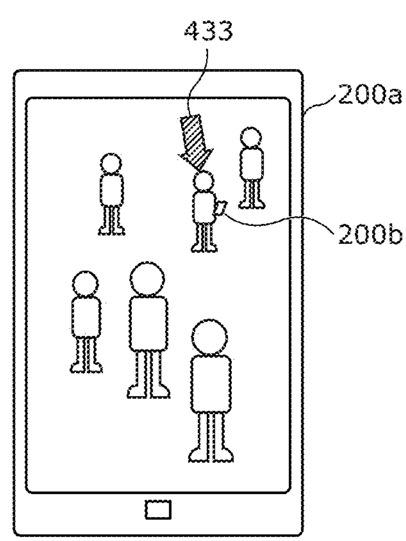

FIG. 227 is a diagram illustrating another example of a screen displayed on a display of a receiver in Embodiment 13.

Figure 228:
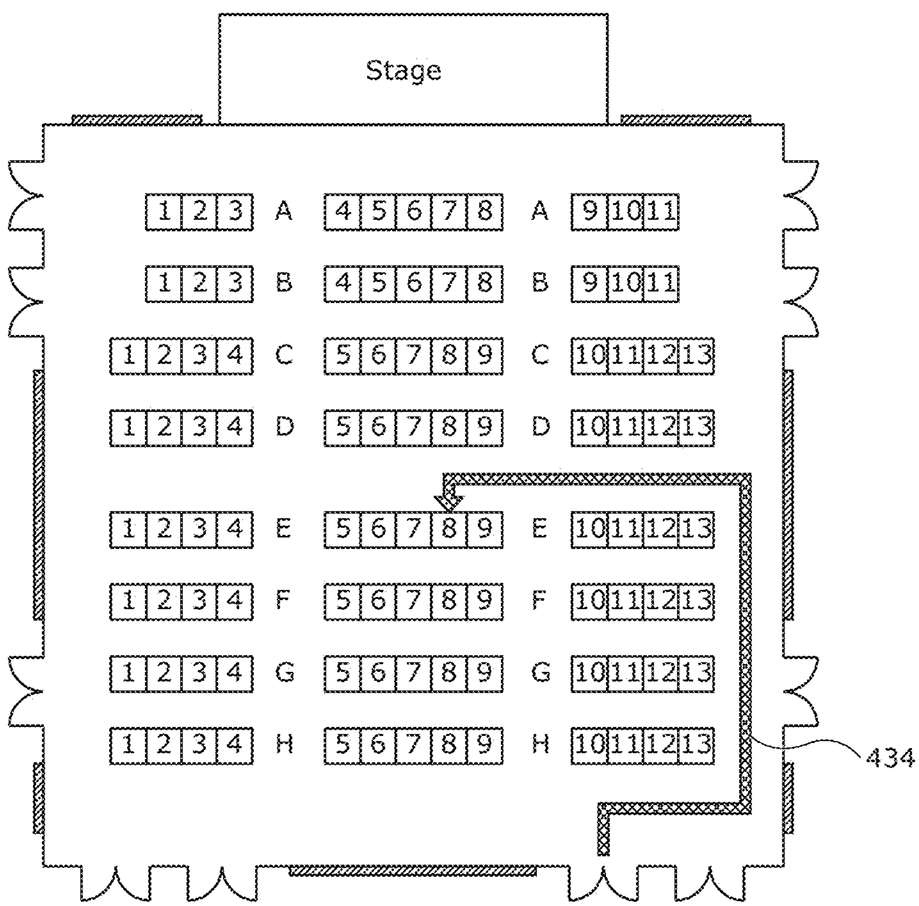

FIG. 228 illustrates the inside of a concert hall.

Figure 229:
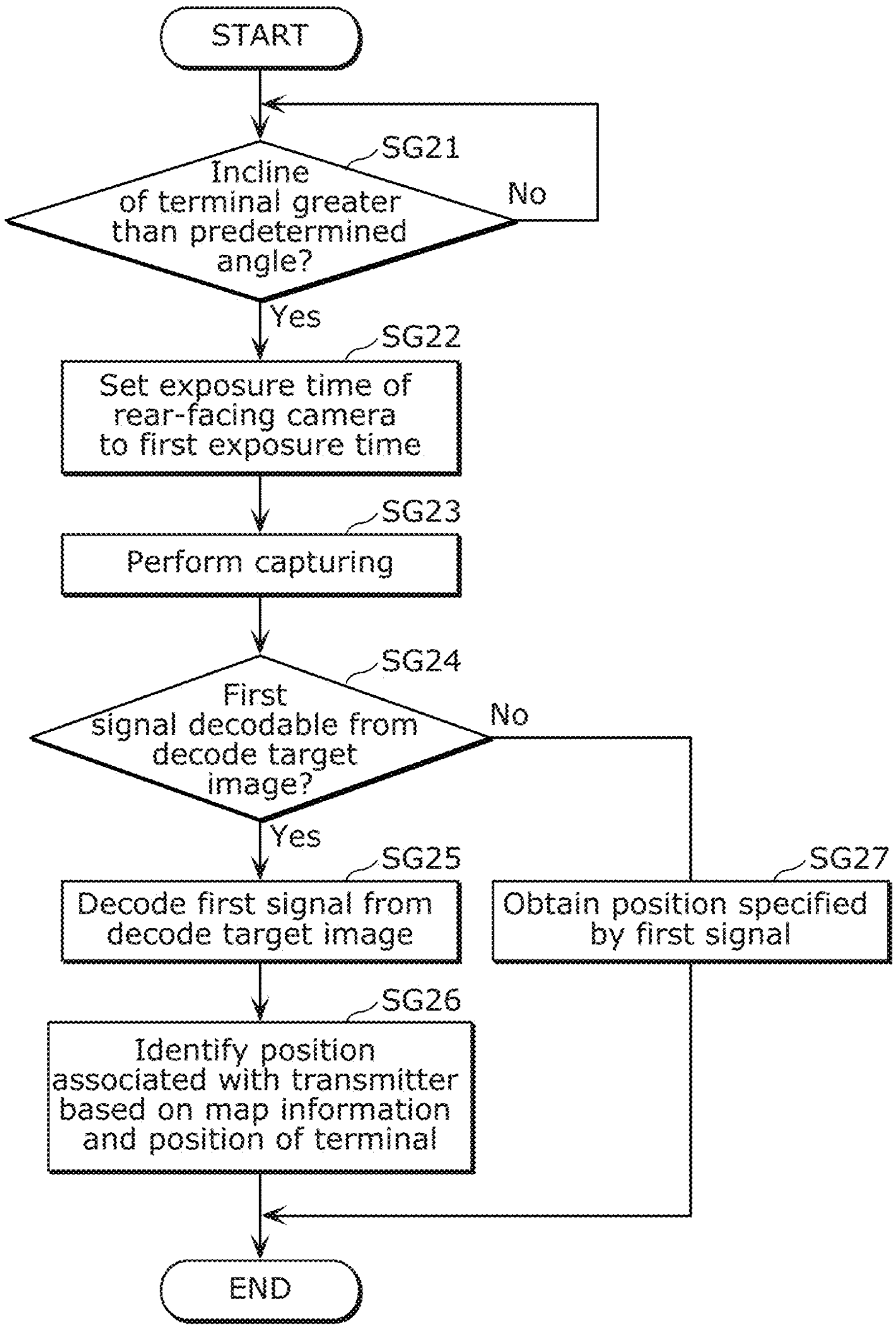

FIG. 229 is a flowchart illustrating one example of a communication method according to a first aspect of the present disclosure.

DESCRIPTION OF EMBODIMENTS

A communication method according to one aspect of the present disclosure uses a terminal including an image sensor, an includes: determining whether the terminal is capable of performing visible light communication; when the terminal is determined to be capable of performing the visible light communication, obtaining a decode target image by the image sensor capturing a subject whose luminance changes, and obtaining, from a striped pattern appearing in the decode target image, first identification information transmitted by the subject; and when the terminal is determined to be incapable of performing the visible light communication in the determining pertaining to the visible light communication, obtaining a captured image by the image sensor capturing the subject, extracting at least one contour by performing edge detection on the captured image, specifying a specific region from among the at least one contour, and obtaining, from a line pattern in the specific region, second identification information transmitted by the subject, the specific region being predetermined.

With this, regardless of whether the terminal, such as a receiver, can perform visible light communication or not, the terminal can obtain the first identification information or the second identification information from the subject, such as the transmitter, as described in, for example, Embodiment 10. In other words, when the terminal can perform visible light communication, the terminal obtains, for example, the light ID as the first identification information from the subject. When the terminal cannot perform visible light communication, the terminal obtains, for example, the image ID or the frame ID as the second identification information from the subject. More specifically, for example, the transmission image illustrated in FIG. 183 and FIG. 188 is captured as a subject, the region including the transmission image is selected as a specific region (i.e., a selected region), and second identification information is obtained from the line pattern in the transmission image. Accordingly, it is possible to properly obtain second identification information, even when visible light communication is not possible. Note that the striped pattern is also referred to as a bright line pattern or bright line pattern region.

Moreover, in the specifying of the specific region, a region including a quadrilateral contour of at least a predetermined size or a region including a rounded quadrilateral contour of at least a predetermined size may be specified as the specific region.

This makes it possible to properly specify a quadrilateral or rounded quadrilateral region as the specific region, as illustrated in, for example, FIG. 179.

Moreover, in the determining pertaining to the visible light communication, the terminal may be determined to be capable of performing the visible light communication when the terminal is identified as a terminal capable of changing an exposure time to or below a predetermined value, and the terminal may be determined to be incapable of performing the visible light communication when the terminal is identified as a terminal incapable of changing the exposure time to or below the predetermined value.

This makes it possible to properly determine whether visible light signal can be performed or not, as illustrated in, for example, FIG. 180.

Moreover, when the terminal is determined to be capable of performing the visible light communication in the determining pertaining to the visible light communication, an exposure time of the image sensor may be set to a first exposure time when capturing the subject, and the decode target image may be obtained by capturing the subject for the first exposure time, when the terminal is determined to be incapable of performing the visible light communication in the determining pertaining to the visible light communication, the exposure time of the image sensor may be set to a second exposure time when capturing the subject, and the captured image may be obtained by capturing the subject for the second exposure time, and the first exposure time may be shorter than the second exposure time.

This makes it possible to obtain a decode target image including a striped pattern region by performing capturing for the first exposure time, and possible to properly obtain first identification information by decoding the striped pattern. This makes it further possible to obtain a normal captured image as a captured image by performing capturing for the second exposure time, and possible to properly obtain second identification information from the line pattern appearing in the normal captured image. With this, the terminal can obtain whichever of the first identification information and the second identification information is appropriate for the terminal, depending on whether the first exposure time or the second exposure time is used.

Moreover, the subject may be rectangular from a viewpoint of the image sensor, the first identification information may be transmitted by a central region of the subject changing in luminance, and a barcode-style line pattern may be disposed at a periphery of the subject, when the terminal is determined to be capable of performing the visible light communication in the determining pertaining to the visible light communication, the decode target image including a bright line pattern of a plurality of bright lines corresponding to a plurality of exposure lines of the image sensor may be obtained when capturing the subject, and the first identification information may be obtained by decoding the bright line pattern, and when the terminal is determined to be incapable of performing the visible light communication in the determining pertaining to the visible light communication, the second identification information may be obtained from the line pattern in the captured image when capturing the subject.

This makes it possible to properly obtain the first identification information and the second identification information from the subject whose central region changes in luminance.

Moreover, the first identification information obtained from the decode target image and the second identification information obtained from the line pattern may be the same information.

This makes it possible to obtain the same information from the subject, regardless of whether the terminal can or cannot perform visible light communication.

Moreover, when the terminal is determined to be capable of performing the visible light communication in the determining pertaining to the visible light communication, a first video associated with the first identification information may be displayed, and upon receipt of a gesture that slides the first video, a second video associated with the first identification information may be displayed after the first video.

For example, the first video is the first AR image P46 illustrated in FIG. 162, and the second video is the second AR image P46*c* illustrated in FIG. 162. Moreover, the first identification information is, for example, a light ID, as described above. With the communication method according to the above aspect, upon receiving an input of a gesture that slides the first video, that is, a swipe gesture, a second video associated with the first identification information is displayed after the first video. This makes it possible to easily display an image that is useful to the user. Moreover, like illustrated in FIG. 194A, since whether or not visible light communication is possible is determined in advance, it is possible to omit futile processes for attempting to obtain the visible light signal, and thus reduce the processing load.

Moreover, in the displaying of the second video, the second video may be displayed upon receipt of a gesture that slides the first video laterally, and a still image associated with the first identification information may be displayed upon receipt of a gesture that slides the first video vertically.

With this, for example, as illustrated in FIG. 162, the second video is displayed by sliding, that is to say, swiping the first video horizontally. Furthermore, for example, as illustrated in FIG. 163 and FIG. 164, a still image associated with the first identification information is displayed by sliding the first video vertically. The still image is, for example, AR image P47 illustrated in FIG. 164. This makes it possible to easily display a myriad of images that are useful to the user.

Moreover, an object may be located in the same position in an initially displayed picture in the first video and in an initially displayed picture in the second video.

With this, for example, as illustrated in FIG. 162, when the second video is displayed after the first video, the initially displayed object in both videos is in the same position, so the user can easily know that the first and second videos are related to each other.

Moreover, when reacquiring the first identification information by capturing by the image sensor, a subsequent video associated with the first identification information may be displayed after a currently displayed video.

With this, for example, as illustrated in FIG. 162, even if a gesture such as a slide or swipe is not made, when the light ID, which is the first identification information, is recaptured, the next video is displayed. This makes it possible to even more easily display a video that is useful to the user.

Moreover, an object may be located in the same position in an initially displayed picture in the currently displayed video and in an initially displayed picture in the subsequent video.

With this, for example, as illustrated in FIG. 162, when the subsequent video is displayed after the current video, the initially displayed object in both videos is in the same position, so the user can easily know that the first and second videos are related to each other.

Moreover, a transparency of a region of at least one of the first video and the second video may increase with proximity to an edge of the video.

Figure 93:
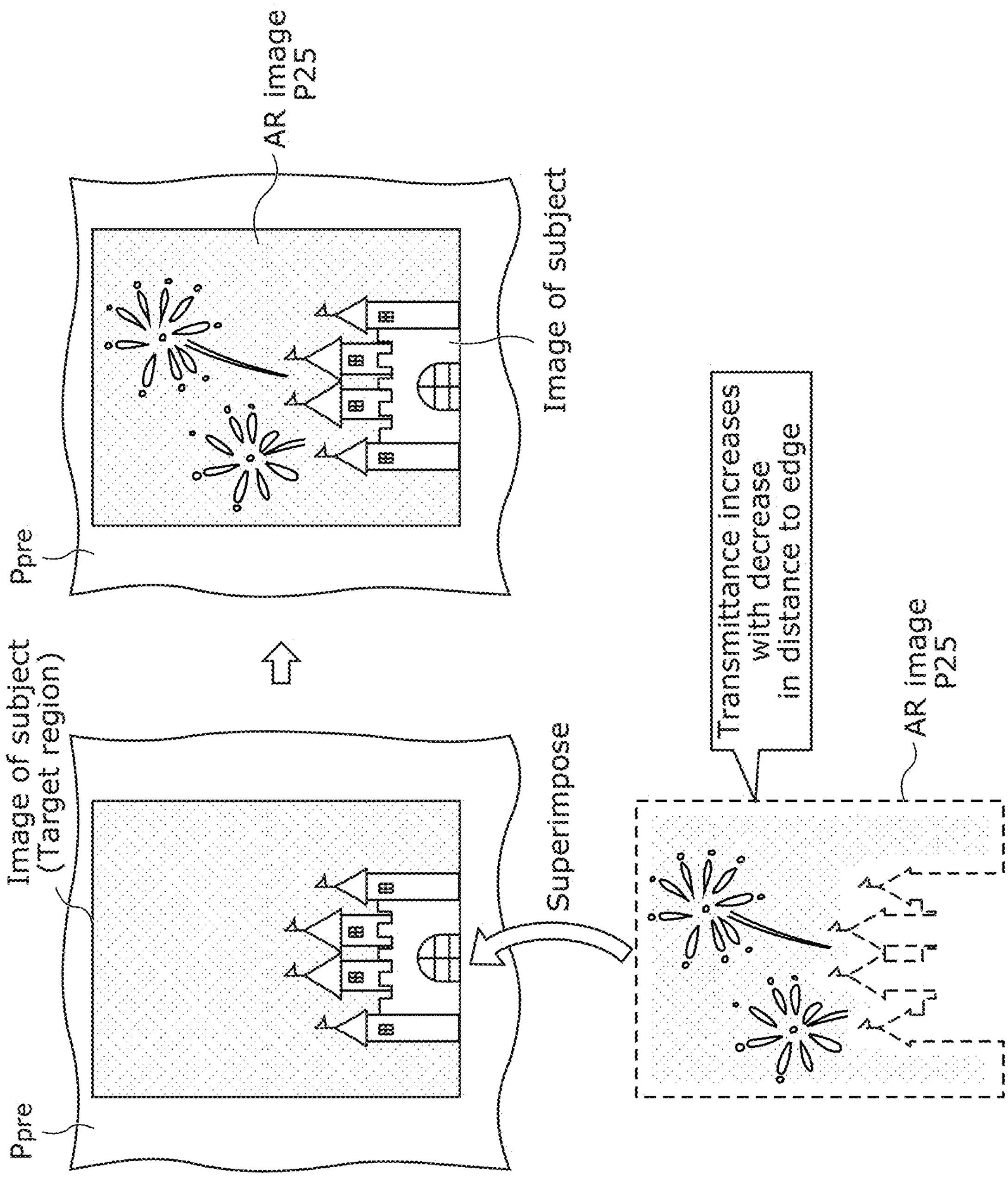
FIG. 93 is a diagram illustrating an example of superimposing of an AR image, according to Variation 3 of Embodiment 4.

With this, for example, as illustrated in FIG. 93 or FIG. 166, when the video is displayed superimposed on the normal captured image, the captured display image can be displayed such that an object having a vague contour is present in the environment displayed in the normal captured image.

Moreover, an image may be displayed outside a region in which at least one of the first video and the second video is displayed.

This makes it possible to more easily display a myriad of images that are useful to the user, since an image is displayed outside the region in which the video is displayed, as illustrated by, for example, sub-image Ps46 in FIG. 161.

Moreover, a normal captured image may be obtained by capturing by the image sensor for a first exposure time, the decode target image including a bright line pattern region may be obtained by capturing by the image sensor for a second exposure time shorter than the first exposure time, and the first identification information may be obtained by decoding the decode target image, the bright line pattern region being a region of a pattern of a plurality of bright lines, in at least one of the displaying of the first video or the displaying of the second video, a reference region located in the same position as the bright line pattern region is located in the decode target image may be identified in the normal captured image, and a region in which the video is to be superimposed may be recognized as a target region in the normal captured image based on the reference region, and the video may be superimposed in the target region. For example, in at least one of the displaying of the first video or the displaying of the second video, a region above, below, left, or right of the reference region may be recognized as the target region in the normal captured image.

With this, as illustrated in, for example, FIG. 50 through FIG. 52 and FIG. 172, the target region is recognized based on the reference region, and since the video is to be superimposed in that target region, it is possible to easily improve the degree of freedom of the region in which the video is to be superimposed.

Moreover, in at least one of the displaying of the first video or the displaying of the second video, a size of the video may be increased with an increase in a size of the bright line pattern region.

With this configuration, as illustrated in FIG. 172, since the size of the video changes in accordance with the size of the bright line pattern region, compared to when the size of the video is fixed, the video can be displayed such that the object displayed by the video appears more realistic.

A transmitter according to one aspect of the present disclosure may include: a light panel; a light source that emits light from a back surface side of the light panel; and a microcontroller that changes a luminance of the light source. The microcontroller may transmit first identification information from the light source via the light panel by changing the luminance of the light source, a barcode-style line pattern may be peripherally disposed on a front surface side of the light panel, and the second identification information may be encoded in the line pattern, and the first identification information and the second identification information may be the same information. For example, the light panel may be rectangular.

This makes it possible to transmit the same information, regardless of whether the terminal is capable or incapable of performing visible light communication.

General or specific aspects of the present disclosure may be realized as an apparatus, a system, a method, an integrated circuit, a computer program, a computer readable recording medium such as a CD-ROM, or any given combination thereof.

Hereinafter, embodiments are specifically described with reference to the drawings.

Each of the embodiments described below shows a general or specific example. The numerical values, shapes, materials, elements, the arrangement and connection of the elements, steps, the processing order of the steps etc., shown in the following embodiments are mere examples, and therefore do not limit the present disclosure. Therefore, among the elements in the following embodiments, those not recited in any one of the independent claims defining the broadest concept are described as optional elements.

Embodiment 1

The following describes Embodiment 1.

(Observation of Luminance of Light Emitting Unit)

Figure 1:
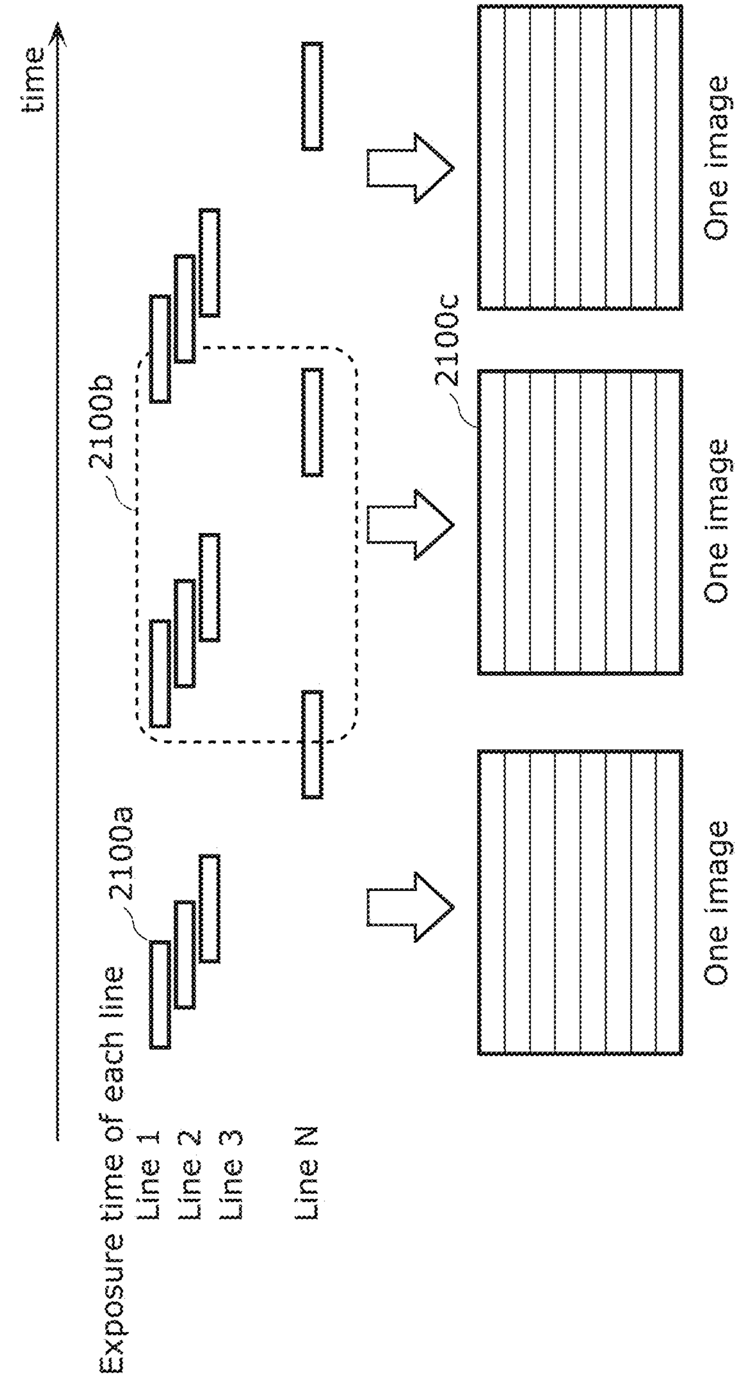
FIG. 1 is a diagram illustrating an example of an observation method of luminance of a light emitting unit in Embodiment 1.

The following proposes an imaging method in which, when capturing one image, all imaging elements are not exposed simultaneously but the times of starting and ending the exposure differ between the imaging elements. FIG. 1 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 2:
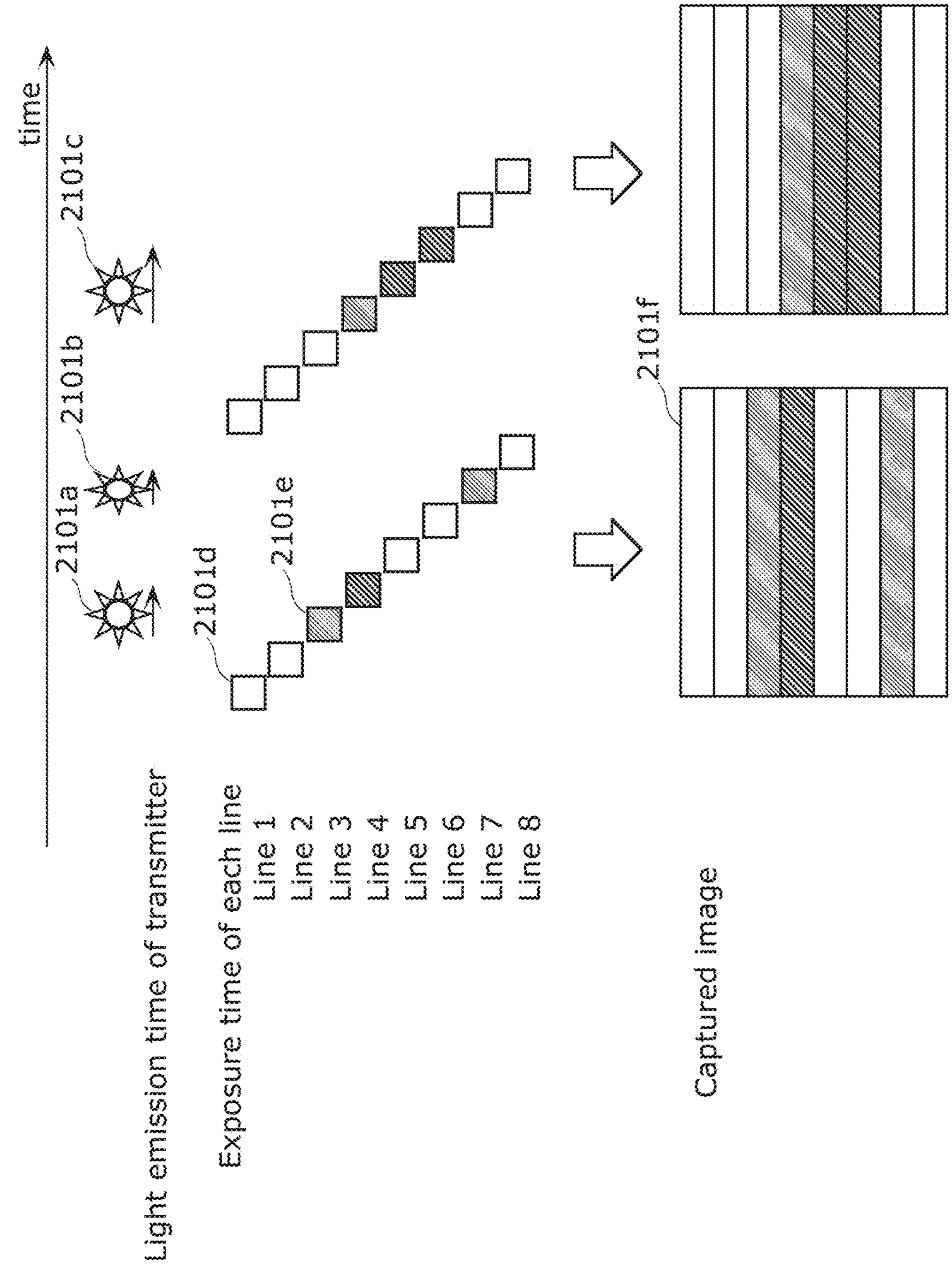
FIG. 2 is a diagram illustrating an example of an observation method of luminance of a light emitting unit in Embodiment 1.

In the case of capturing a blinking light source shown on the entire imaging elements using this imaging method, bright lines (lines of brightness in pixel value) along exposure lines appear in the captured image as illustrated in FIG. 2. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 milliseconds. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 2 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 3:
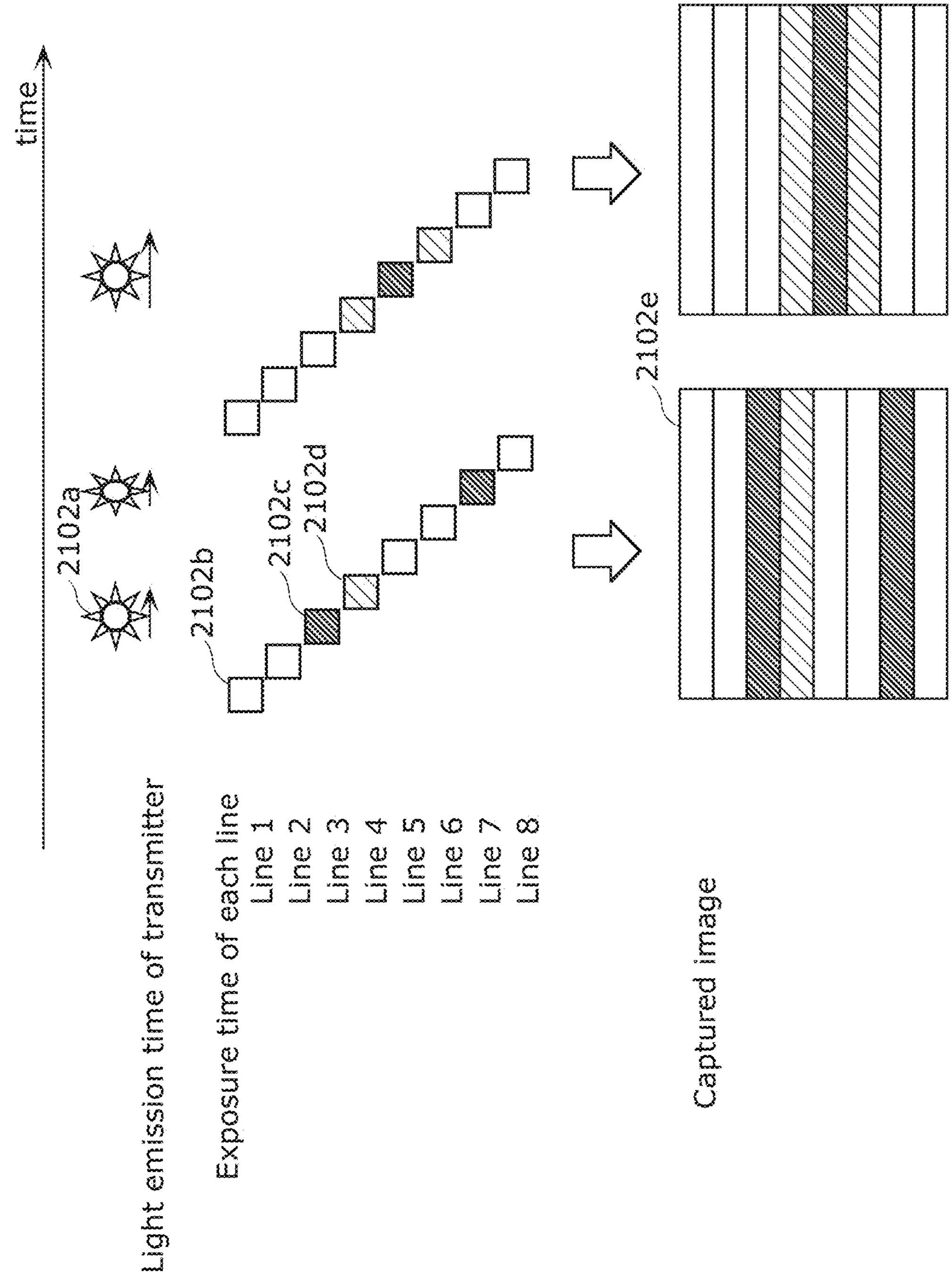
FIG. 3 is a diagram illustrating an example of an observation method of luminance of a light emitting unit in Embodiment 1.

If the exposure state of each exposure line caused by the light emission of the light emitting unit is recognizable in a plurality of levels as illustrated in FIG. 3, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 4:
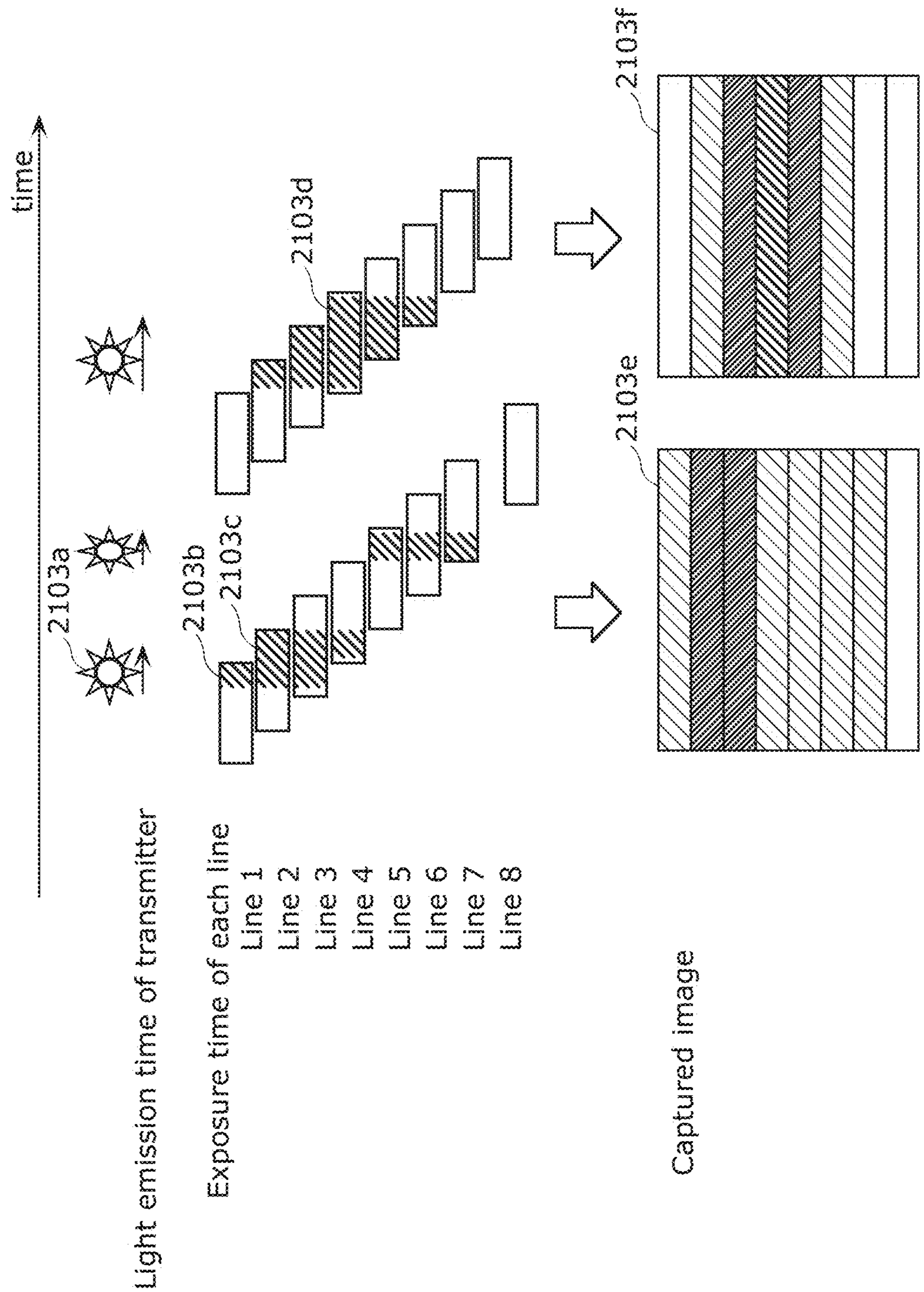
FIG. 4 is a diagram illustrating an example of an observation method of luminance of a light emitting unit in Embodiment 1.

FIG. 4 illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 5A:
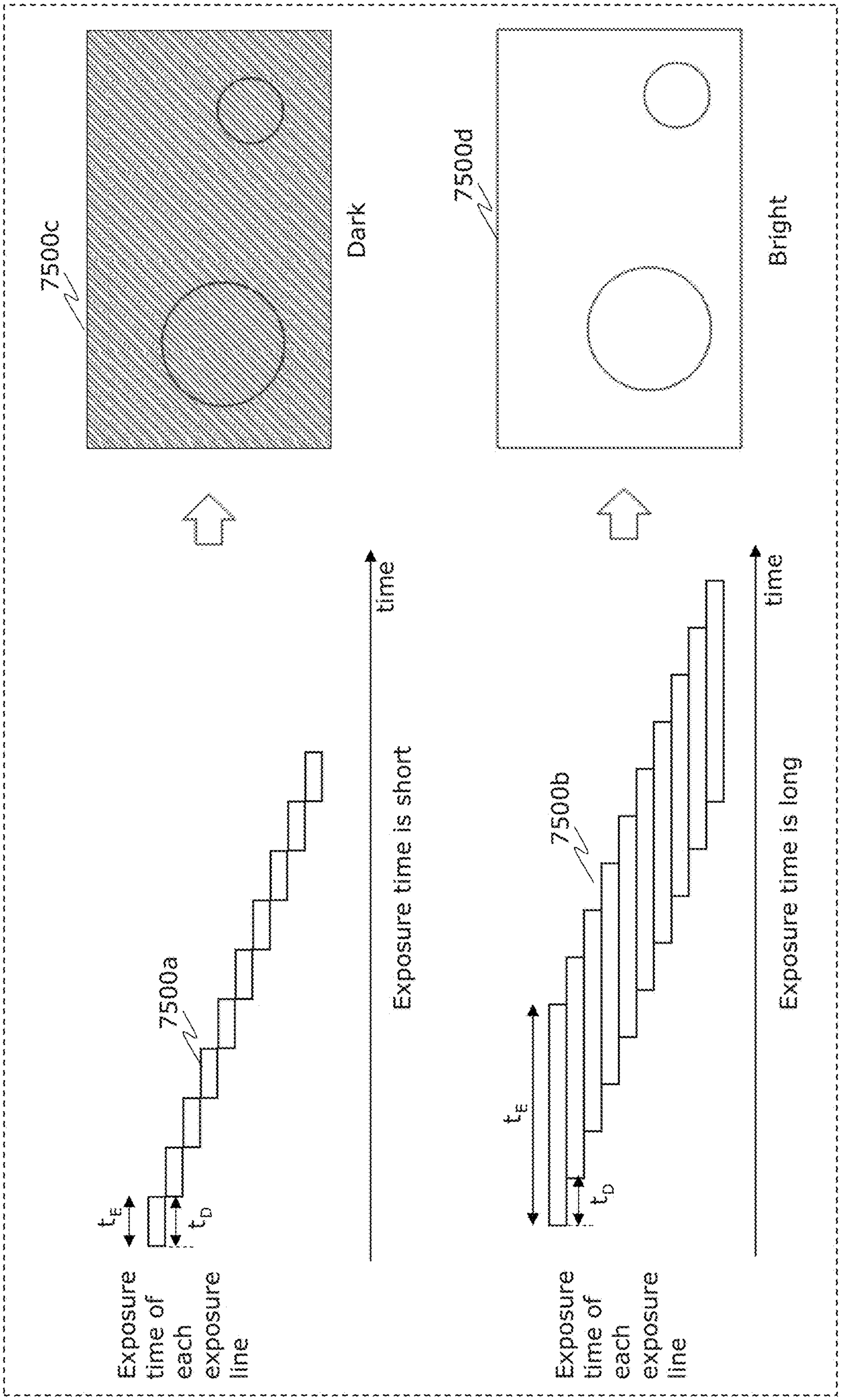
FIG. 5A is a diagram illustrating an example of an observation method of luminance of a light emitting unit in Embodiment 1.

FIG. 5A illustrates the influence of the difference in exposure time in the case where the exposure start time of each exposure line is the same. In 7500*a*, the exposure end time of one exposure line and the exposure start time of the next exposure line are the same. In 7500*b*, the exposure time is longer than that in 7500*a*. The structure in which the exposure times of adjacent exposure lines partially overlap each other as in 7500*b* allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 5B:
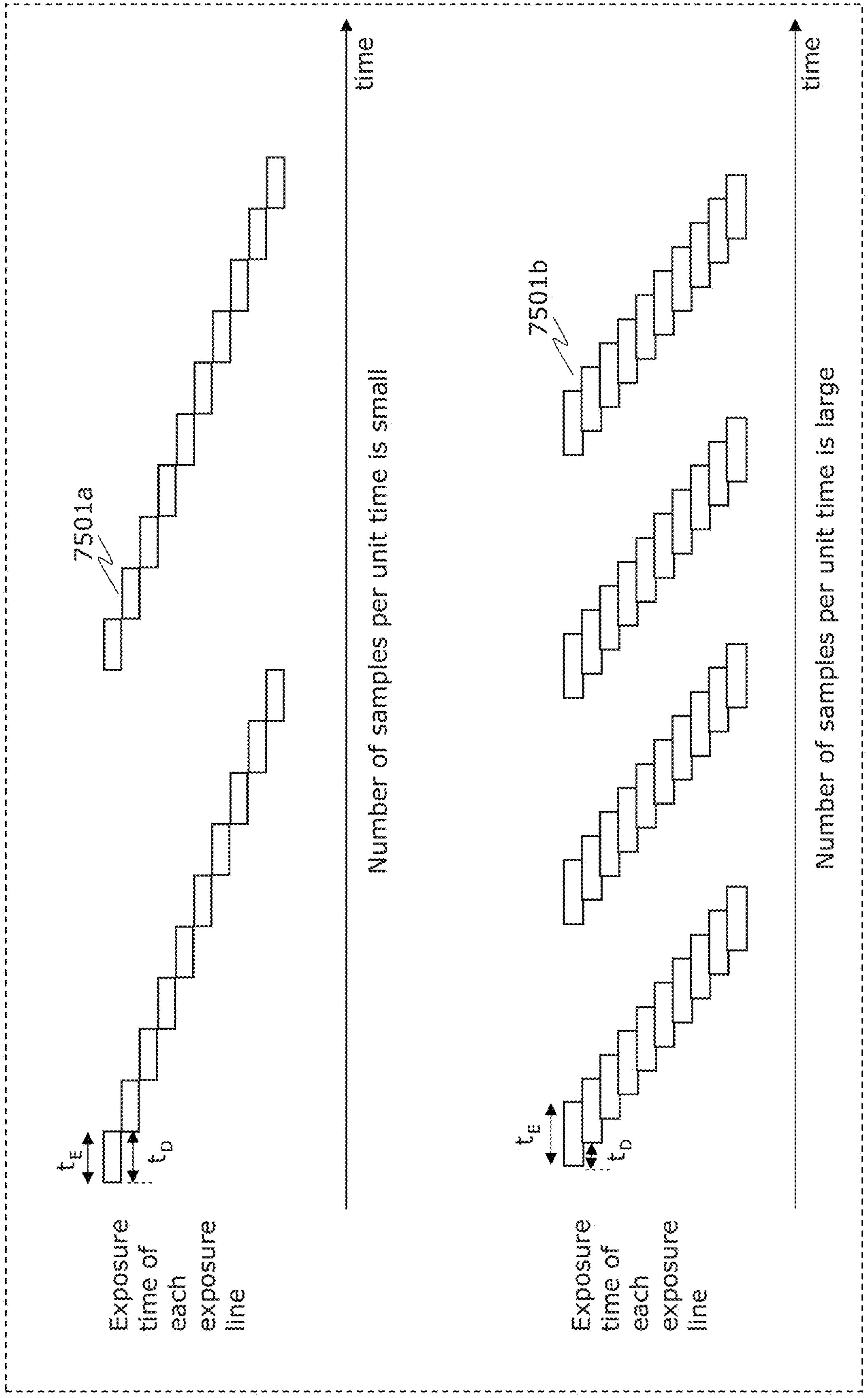
FIG. 5B is a diagram illustrating an example of an observation method of luminance of a light emitting unit in Embodiment 1.

FIG. 5B illustrates the influence of the difference in exposure start time of each exposure line in the case where the exposure time is the same. In 7501*a*, the exposure end time of one exposure line and the exposure start time of the next exposure line are the same. In 7501*b*, the exposure of one exposure line ends after the exposure of the next exposure line starts. The structure in which the exposure times of adjacent exposure lines partially overlap each other as in 7501*b* allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

If the number of samples mentioned above is small, or in other words, the sample interval (the time difference $t_D$ illustrated in FIG. 5B) is long, a possibility that a change in luminance of the light source cannot be accurately detected increases. In this case, such a possibility can be maintained low by shortening the exposure time. In other words, a change in the luminance of the light source can be accurately detected. Furthermore, the exposure time may satisfy the following: the exposure time>(sample interval−pulse width). The pulse width is a pulse width of light in a period when the luminance of the light source is high. The high luminance can be appropriately detected.

As described with reference to FIGS. 5A and 5B, in the structure in which each exposure line is sequentially exposed so that the exposure times of adjacent exposure fines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 5C:
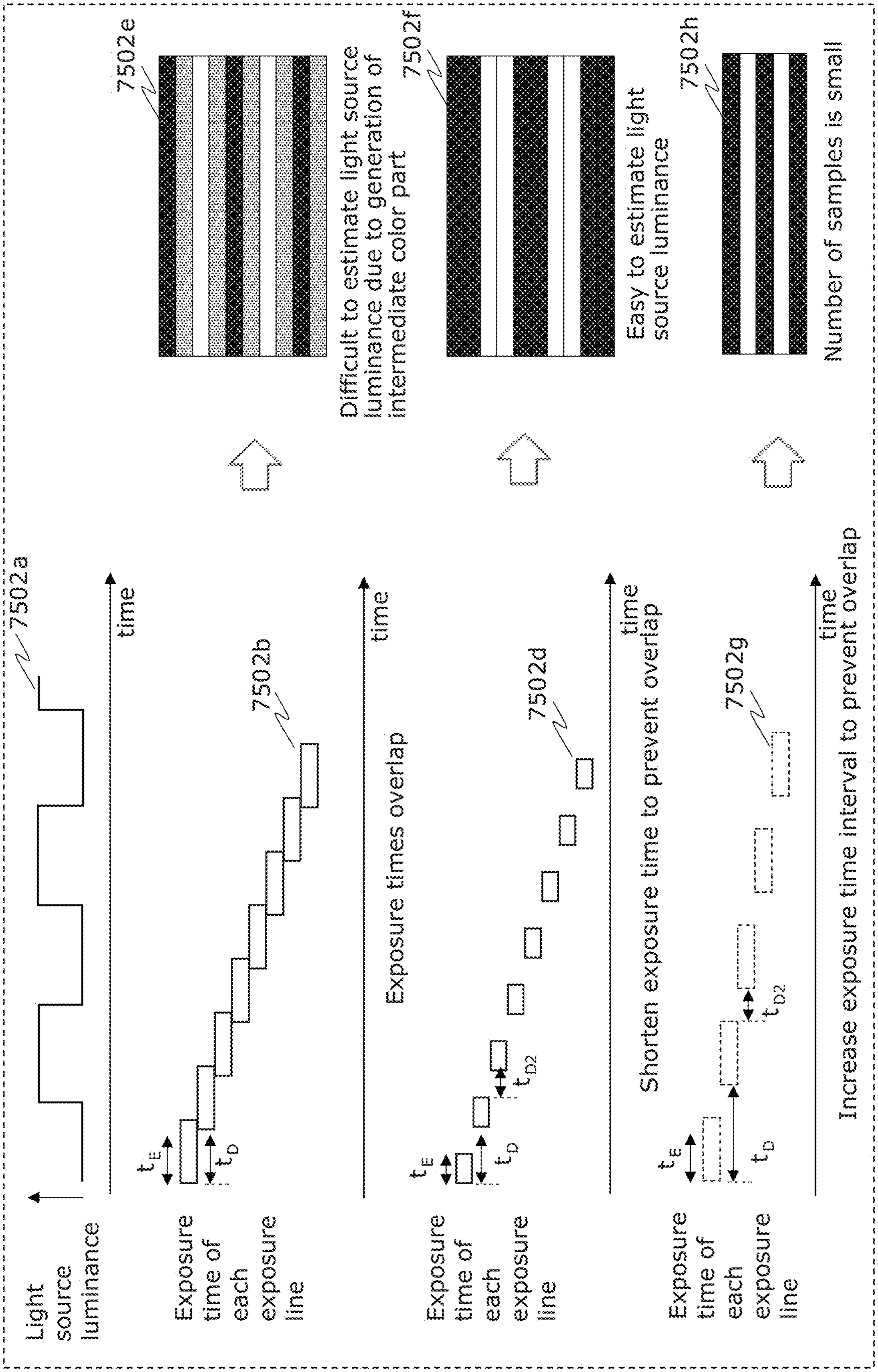
FIG. 5C is a diagram illustrating an example of an observation method of luminance of a light emitting unit in Embodiment 1.

FIG. 5C illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure blank time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure blank time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 5D:
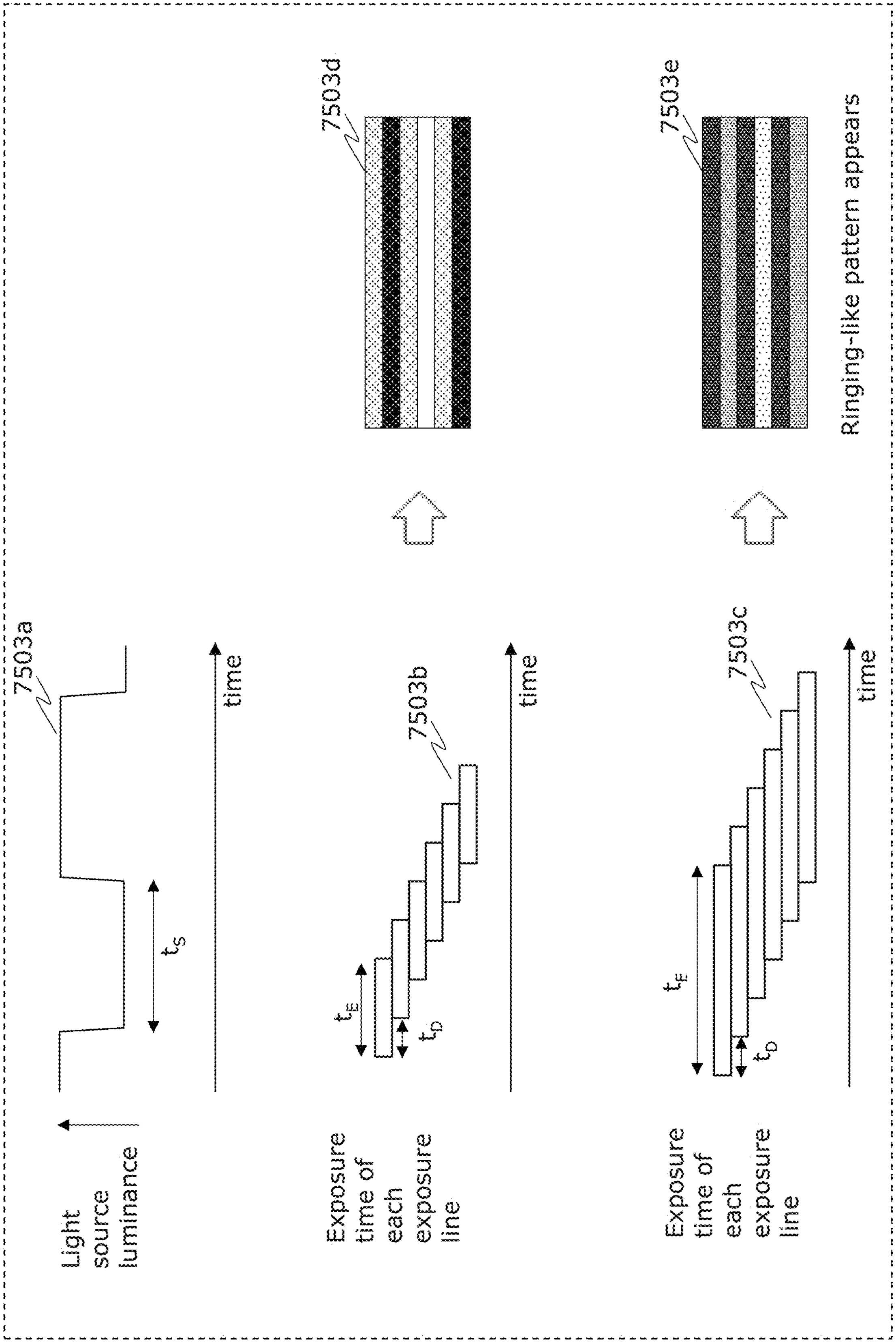
FIG. 5D is a diagram illustrating an example of an observation method of luminance of a light emitting unit in Embodiment 1.

FIG. 5D illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E>t_S$, a bright line pattern different from the luminance change of the light source might be obtained, making it difficult to recognize the luminance change of the light source from the captured image.

Figure 5E:
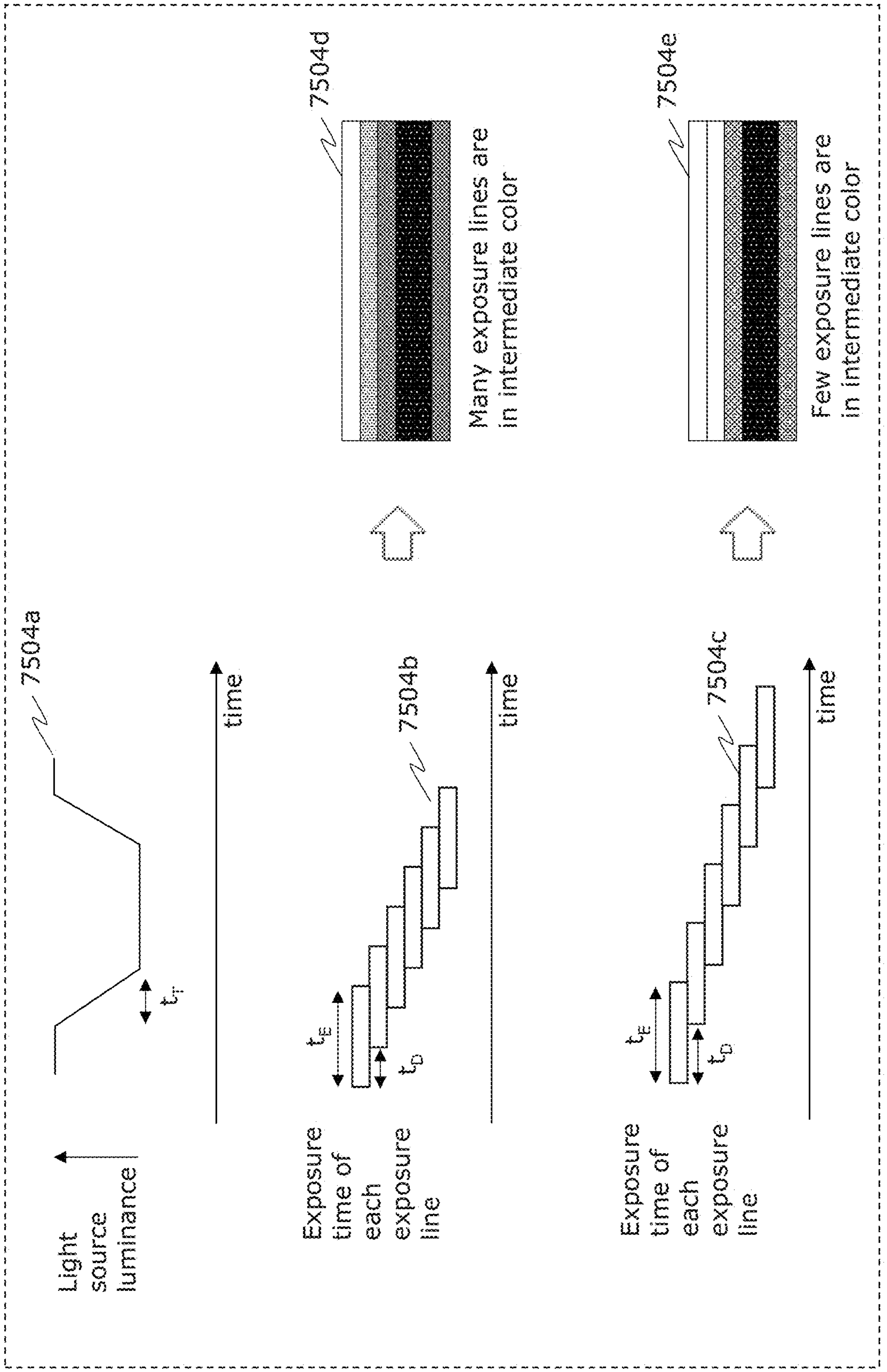
FIG. 5E is a diagram illustrating an example of an observation method of luminance of a light emitting unit in Embodiment 1.

FIG. 5E illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 5F:
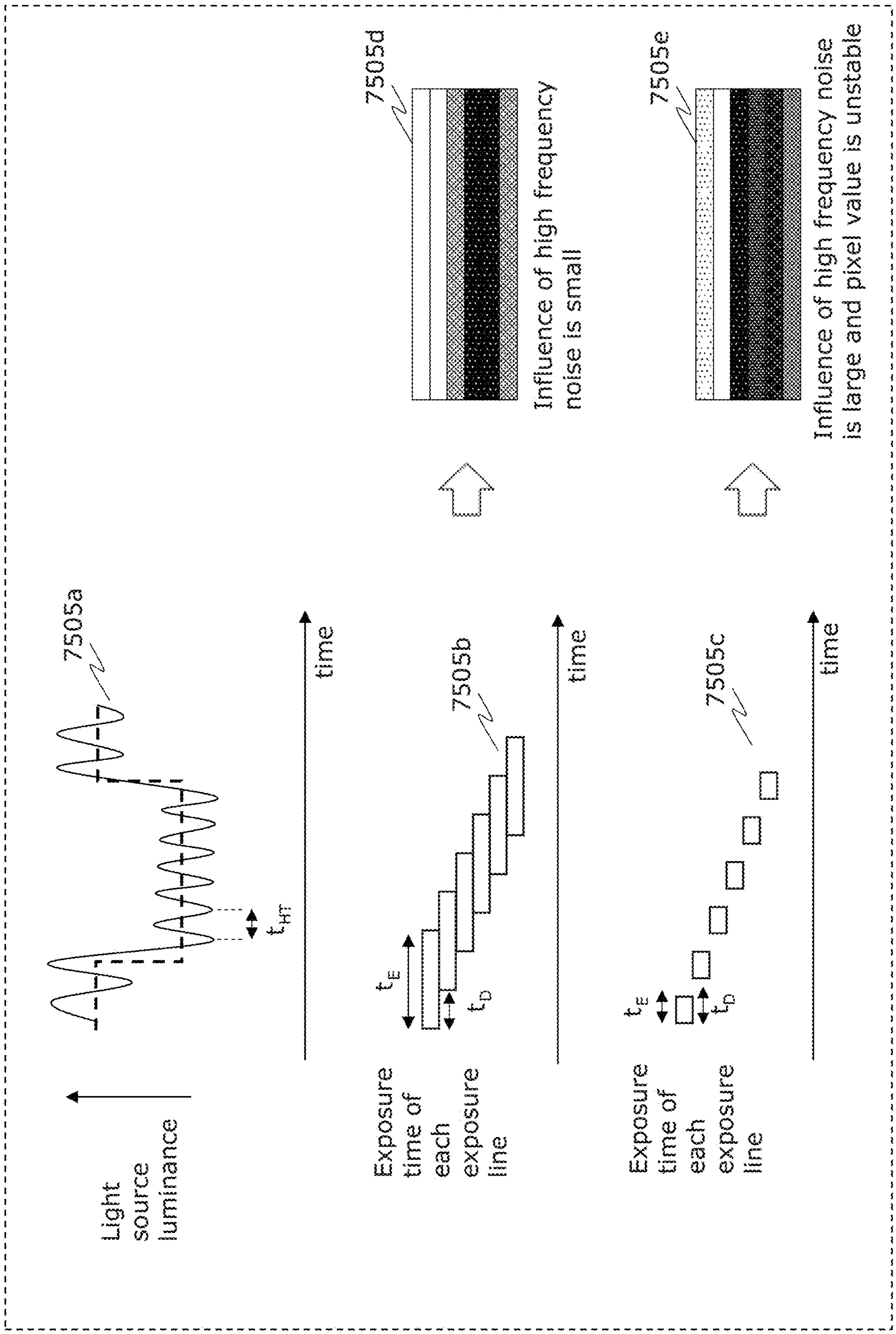
FIG. 5F is a diagram illustrating an example of an observation method of luminance of a light emitting unit in Embodiment 1.

FIG. 5F illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E>t_{HT}$. High frequency noise is mainly caused by a switching power supply circuit. Since $t_H$T is less than or equal to 20 microseconds in many switching power supplies for lightings, setting $t_E$ to greater than or equal to 20 microseconds facilitates estimation of light source luminance.

Figure 5G:
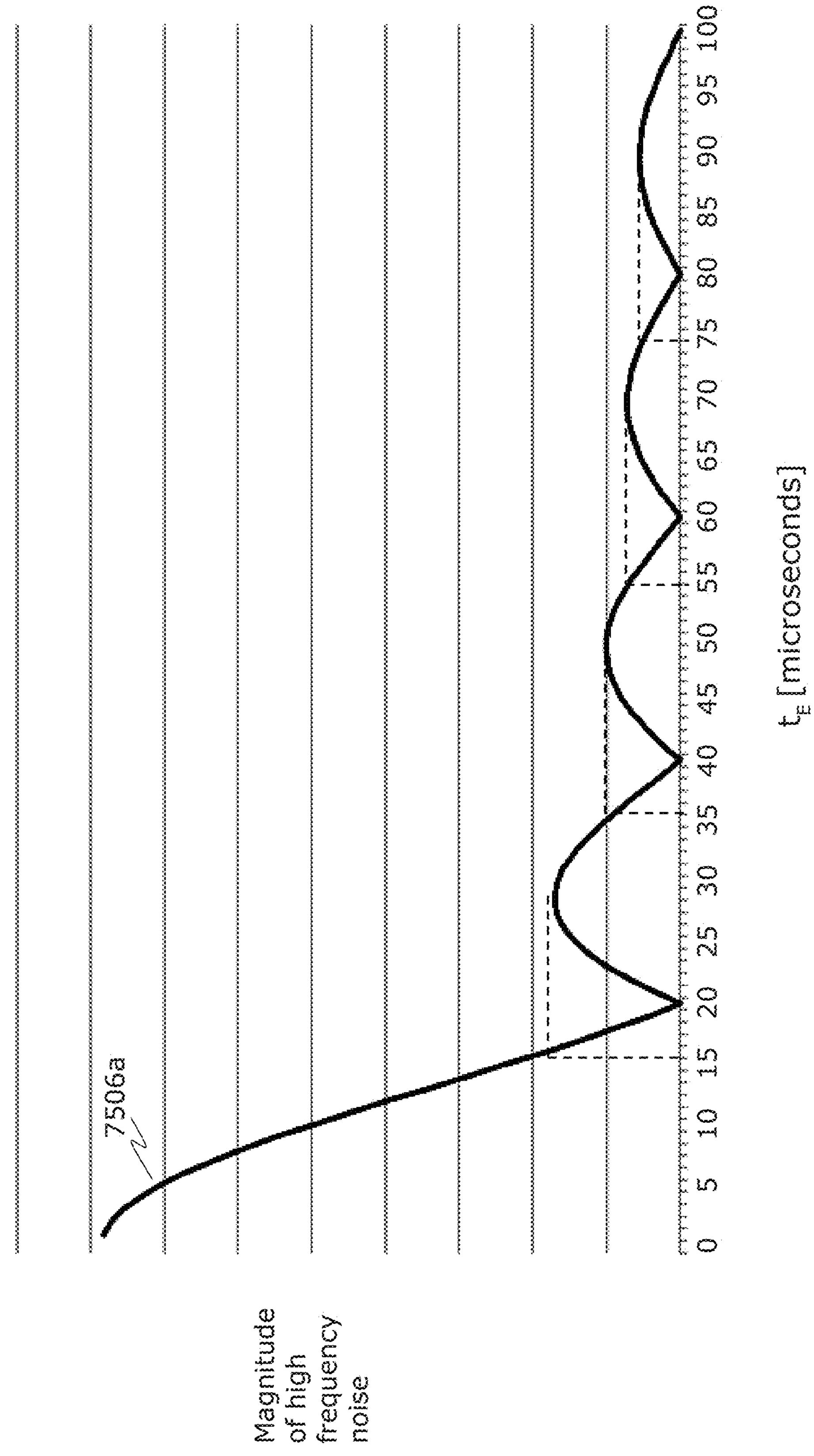
FIG. 5G is a diagram illustrating an example of an observation method of luminance of a light emitting unit in Embodiment 1.

FIG. 5G is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 5H:
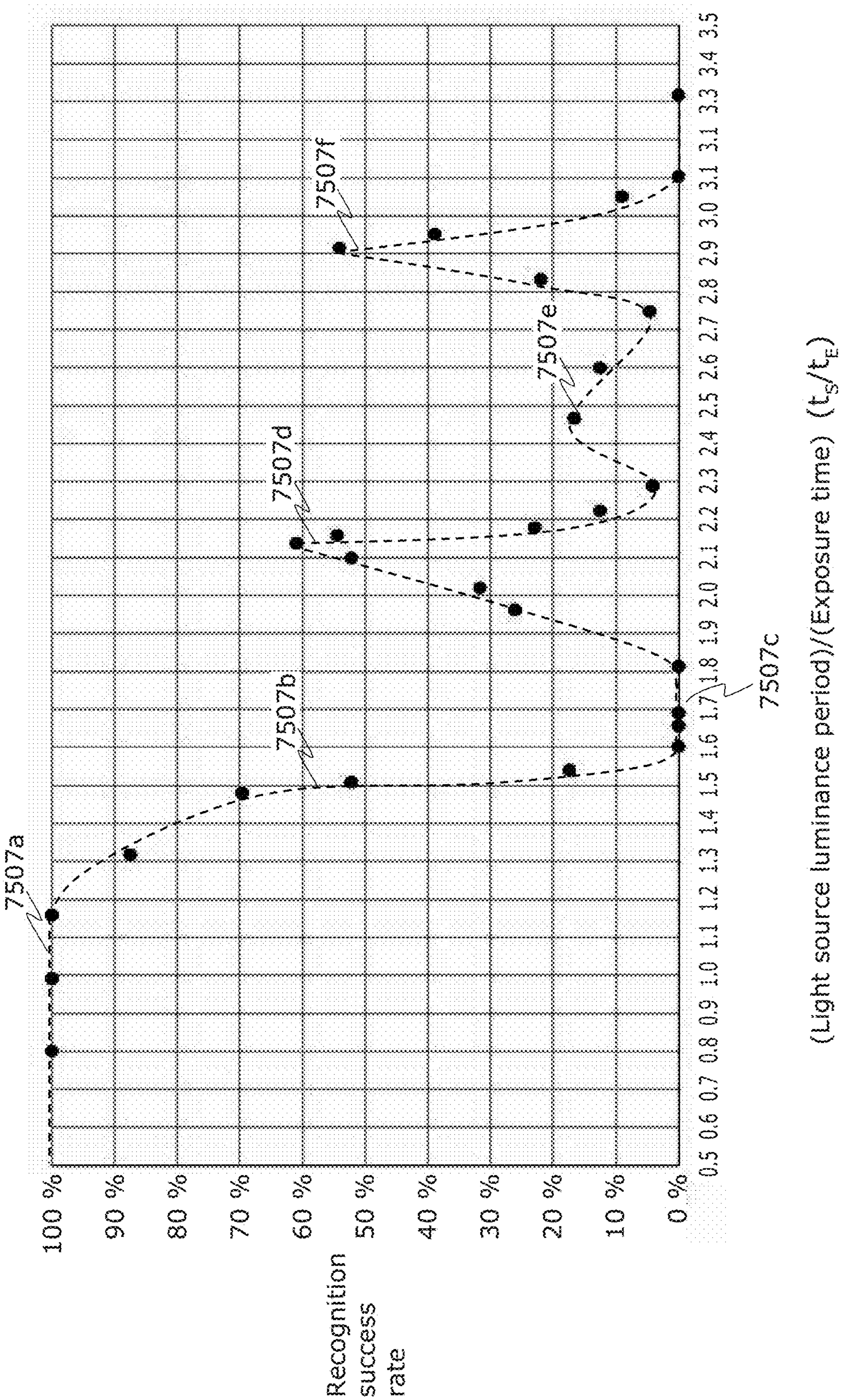
FIG. 5H is a diagram illustrating an example of an observation method of luminance of a light emitting unit in Embodiment 1.

FIG. 5H illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode.

Figure 6B:
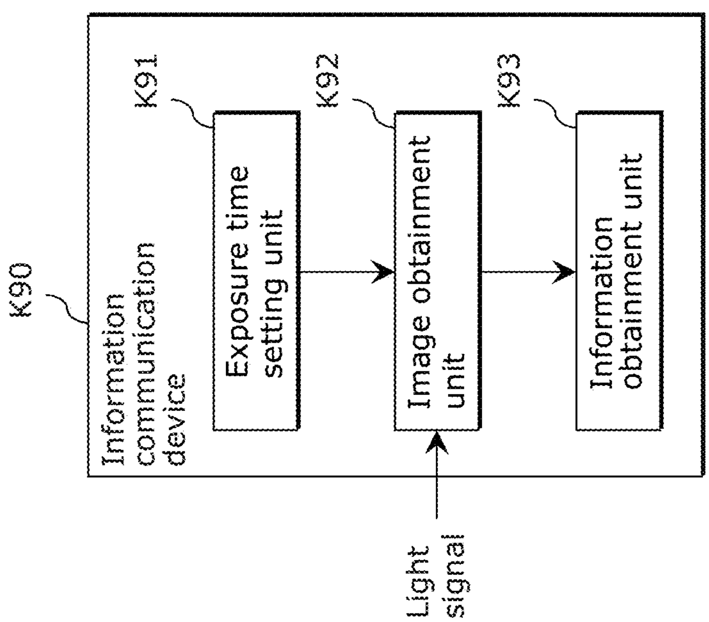
FIG. 6B is a block diagram of an information communication device in Embodiment 1.
Figure 6A:
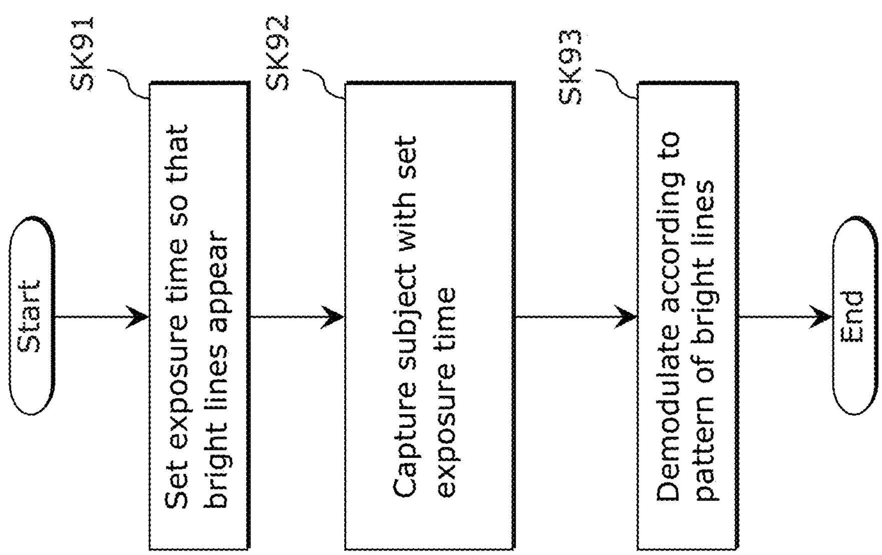
FIG. 6A is a flowchart of an information communication method in Embodiment 1.

FIG. 6A is a flowchart of an information communication method in this embodiment.

The information communication method in this embodiment is an information communication method of obtaining information from a subject, and includes Steps SK91 to SK93.

In detail, the information communication method includes: a first exposure time setting step SK91 of setting a first exposure time of an image sensor so that, in an image obtained by capturing the subject by the image sensor, a plurality of bright lines corresponding to a plurality of exposure lines included in the image sensor appear according to a change in luminance of the subject; a first image obtainment step SK92 of obtaining a bright line image including the plurality of bright lines, by capturing the subject changing in luminance by the image sensor with the set first exposure time; and an information obtainment step SK93 of obtaining the information by demodulating data specified by a pattern of the plurality of bright lines included in the obtained bright line image, wherein in the first image obtainment step SK92, exposure starts sequentially for the plurality of exposure lines each at a different time, and exposure of each of the plurality of exposure lines starts after a predetermined blank time elapses from when exposure of an adjacent exposure line adjacent to the exposure line ends.

FIG. 6B is a block diagram of an information communication device in this embodiment.

An information communication device K90 in this embodiment is an information communication device that obtains information from a subject, and includes structural elements K91 to K93.

In detail, the information communication device K90 includes: an exposure time setting unit K91 that sets an exposure time of an image sensor so that, in an image obtained by capturing the subject by the image sensor, a plurality of bright lines corresponding to a plurality of exposure lines included in the image sensor appear according to a change in luminance of the subject; an image obtainment unit K92 that includes the image sensor, and obtains a bright line image including the plurality of bright lines by capturing the subject changing in luminance with the set exposure time; and an information obtainment unit K93 that obtains the information by demodulating data specified by a pattern of the plurality of bright lines included in the obtained bright line image, wherein exposure starts sequentially for the plurality of exposure lines each at a different time, and exposure of each of the plurality of exposure lines starts after a predetermined blank time elapses from when exposure of an adjacent exposure line adjacent to the exposure line ends.

In the information communication method and the information communication device K90 illustrated in FIGS. 6A and 6B, the exposure of each of the plurality of exposure lines starts a predetermined blank time after the exposure of the adjacent exposure line adjacent to the exposure line ends, for instance as illustrated in FIG. 5C. This eases the recognition of the change in luminance of the subject. As a result, the information can be appropriately obtained from the subject.

It should be noted that in the above embodiment, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. For example, the program causes a computer to execute the information communication method illustrated in the flowchart of FIG. 6A.

Embodiment 2

This embodiment describes each example of application using a receiver such as a smartphone which is the information communication device K90 and a transmitter for transmitting information as a blink pattern of the light source such as an LED or an organic EL device in Embodiment 1 described above.

In the following description, the normal imaging mode or imaging in the normal imaging mode is referred to as "normal imaging", and the visible light communication mode or imaging in the visible light communication mode is referred to as "visible light imaging" (visible light communication). Imaging in the intermediate mode may be used instead of normal imaging and visible light imaging, and the intermediate image may be used instead of the below-mentioned synthetic image.

Figure 7:
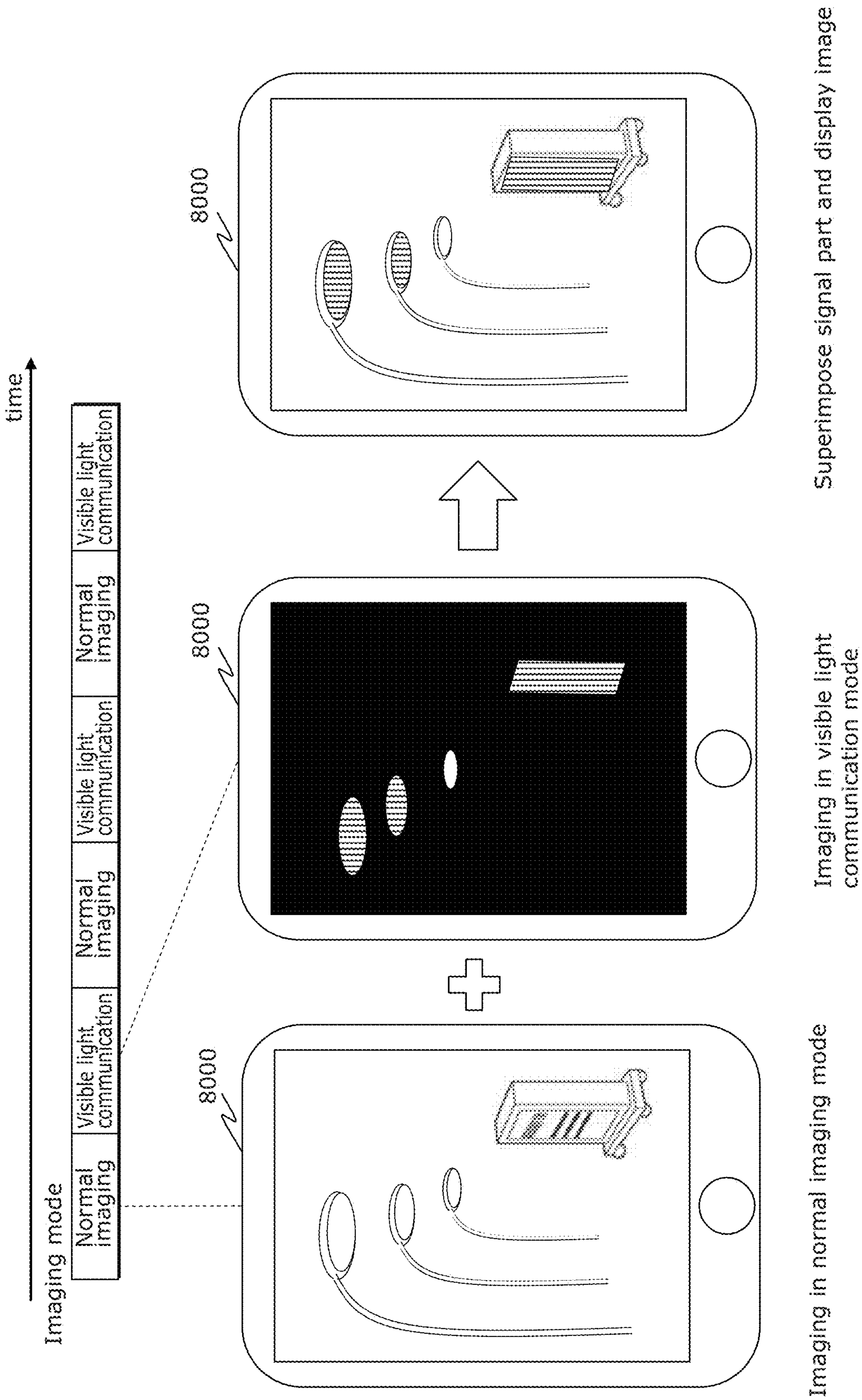
FIG. 7 is a diagram illustrating an example of imaging operation of a receiver in Embodiment 2.

FIG. 7 is a diagram illustrating an example of imaging operation of a receiver in this embodiment.

The receiver 8000 switches the imaging mode in such a manner as normal imaging, visible light communication, normal imaging, . . . . The receiver 8000 synthesizes the normal captured image and the visible light communication image to generate a synthetic image in which the bright line pattern, the subject, and its surroundings are clearly shown, and displays the synthetic image on the display. The synthetic image is an image generated by superimposing the bright line pattern of the visible light communication image on the signal transmission part of the normal captured image. The bright line pattern, the subject, and its surroundings shown in the synthetic image are clear, and have the level of clarity sufficiently recognizable by the user. Displaying such a synthetic image enables the user to more distinctly find out from which position the signal is being transmitted.

Figure 8:
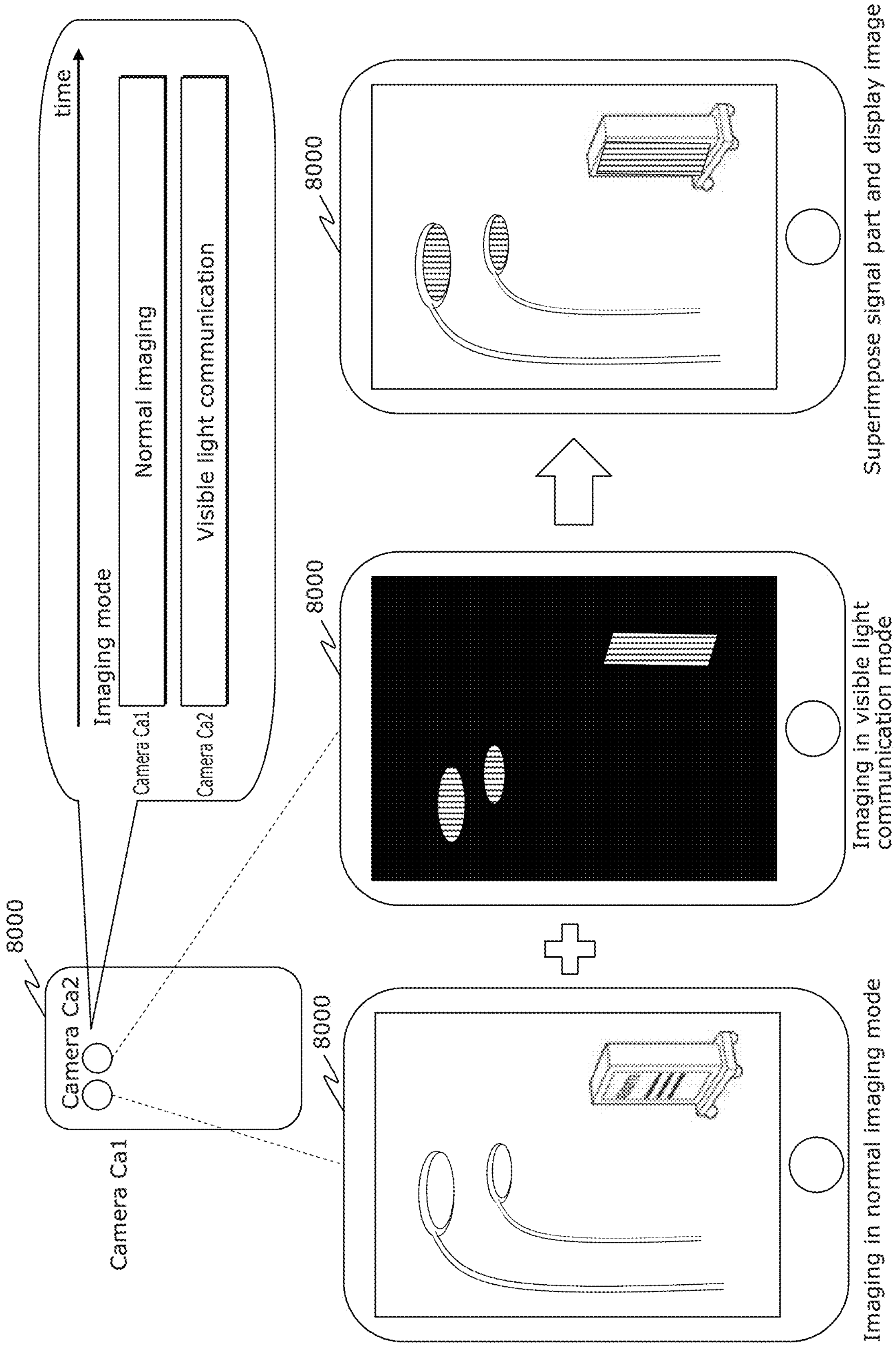
FIG. 8 is a diagram illustrating another example of imaging operation of a receiver in Embodiment 2.

FIG. 8 is a diagram illustrating another example of imaging operation of a receiver in this embodiment.

The receiver 8000 includes a camera Ca1 and a camera Ca2. In the receiver 8000, the camera Ca1 performs normal imaging, and the camera Ca2 performs visible light imaging. Thus, the camera Ca1 obtains the above-mentioned normal captured image, and the camera Ca2 obtains the above-mentioned visible light communication image. The receiver 8000 synthesizes the normal captured image and the visible light communication image to generate the above-mentioned synthetic image, and displays the synthetic image on the display.

Figure 9:
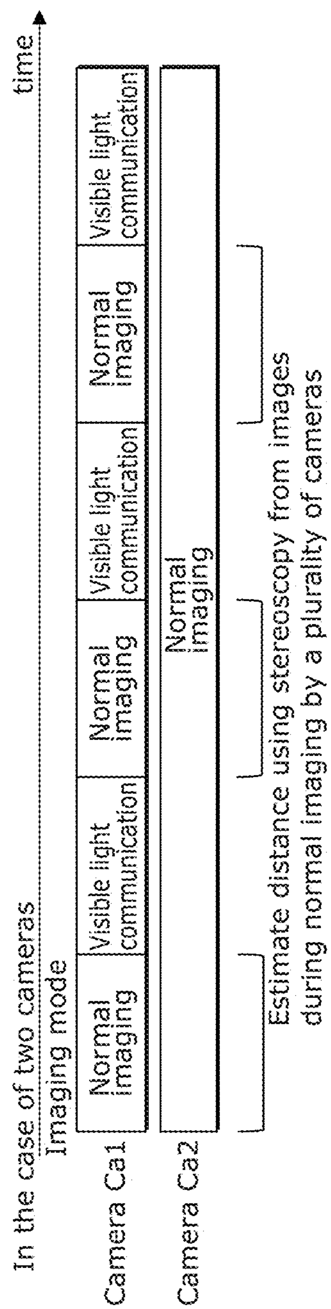
FIG. 9 is a diagram illustrating another example of imaging operation of a receiver in Embodiment 2.

FIG. 9 is a diagram illustrating another example of imaging operation of a receiver in this embodiment.

In the receiver 8000 including two cameras, the camera Ca1 switches the imaging mode in such a manner as normal imaging, visible light communication, normal imaging, . . . . Meanwhile, the camera Ca2 continuously performs normal imaging. When normal imaging is being performed by the cameras Ca1 and Ca2 simultaneously, the receiver 8000 estimates the distance (hereafter referred to as "subject distance") from the receiver 8000 to the subject based on the normal captured images obtained by these cameras, through the use of stereoscopy (triangulation principle). By using such estimated subject distance, the receiver 8000 can superimpose the bright line pattern of the visible light communication image on the normal captured image at the appropriate position. The appropriate synthetic image can be generated in this way.

Figure 10:
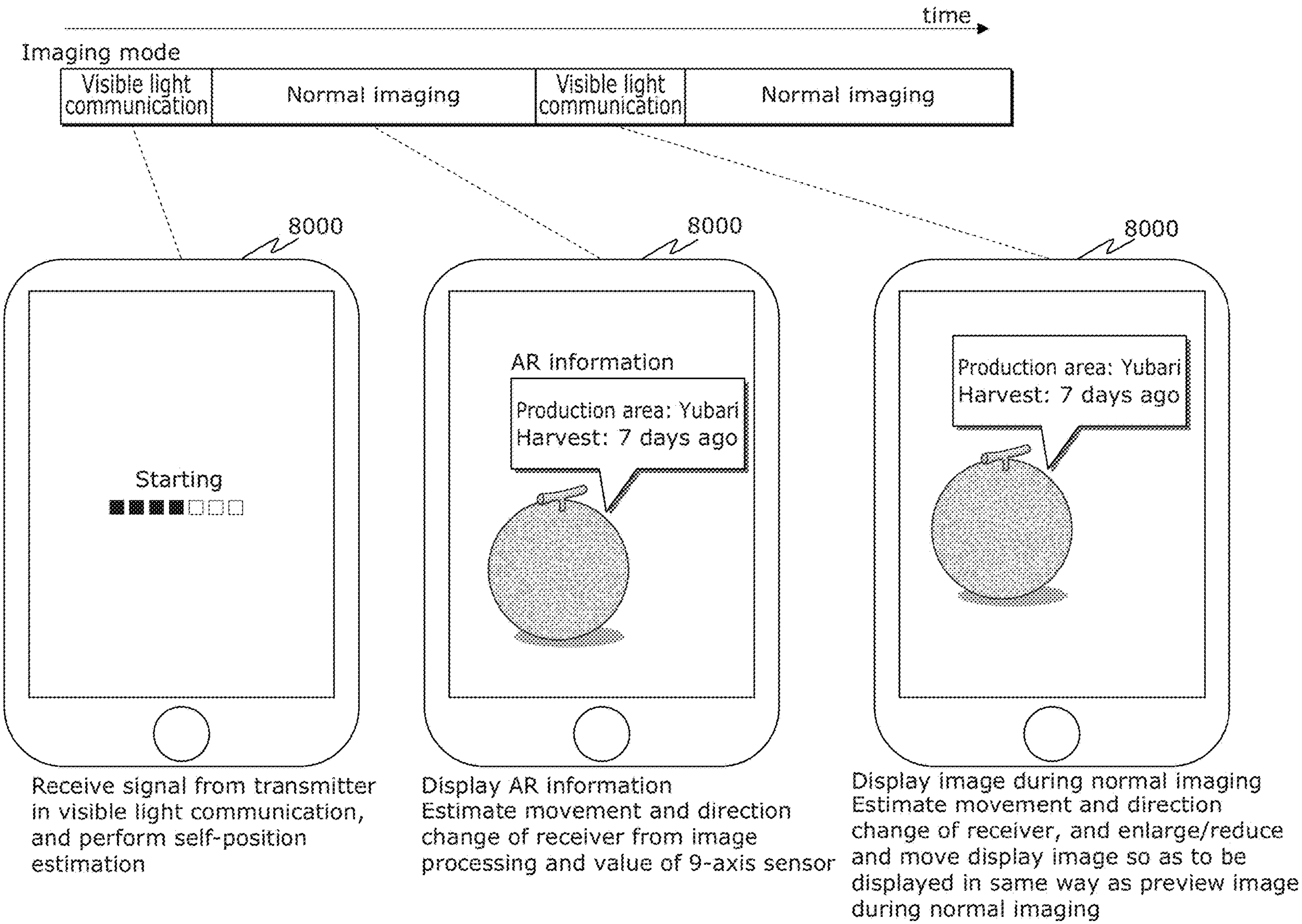
FIG. 10 is a diagram illustrating an example of display operation of a receiver in Embodiment 2.

FIG. 10 is a diagram illustrating an example of display operation of a receiver in this embodiment.

The receiver 8000 switches the imaging mode in such a manner as visible light communication, normal imaging, visible light communication, . . . , as mentioned above. Upon performing visible light communication first, the receiver 8000 starts an application program. The receiver 8000 then estimates its position based on the signal received by visible light communication. Next, when performing normal imaging, the receiver 8000 displays AR (Augmented Reality) information on the normal captured image obtained by normal imaging. The AR information is obtained based on, for example, the position estimated as mentioned above. The receiver 8000 also estimates the change in movement and direction of the receiver 8000 based on the detection result of the 9-axis sensor, the motion detection in the normal captured image, and the like, and moves the display position of the AR information according to the estimated change in movement and direction. This enables the AR information to follow the subject image in the normal captured image.

When switching the imaging mode from normal imaging to visible light communication, in visible light communication the receiver 8000 superimposes the AR information on the latest normal captured image obtained in immediately previous normal imaging. The receiver 8000 then displays the normal captured image on which the AR information is superimposed. The receiver 8000 also estimates the change in movement and direction of the receiver 8000 based on the detection result of the 9-axis sensor, and moves the AR information and the normal captured image according to the estimated change in movement and direction, in the same way as in normal imaging. This enables the AR information to follow the subject image in the normal captured image according to the movement of the receiver 8000 and the like in visible light communication, as in normal imaging. Moreover, the normal image can be enlarged or reduced according to the movement of the receiver 8000 and the like.

Figure 11:
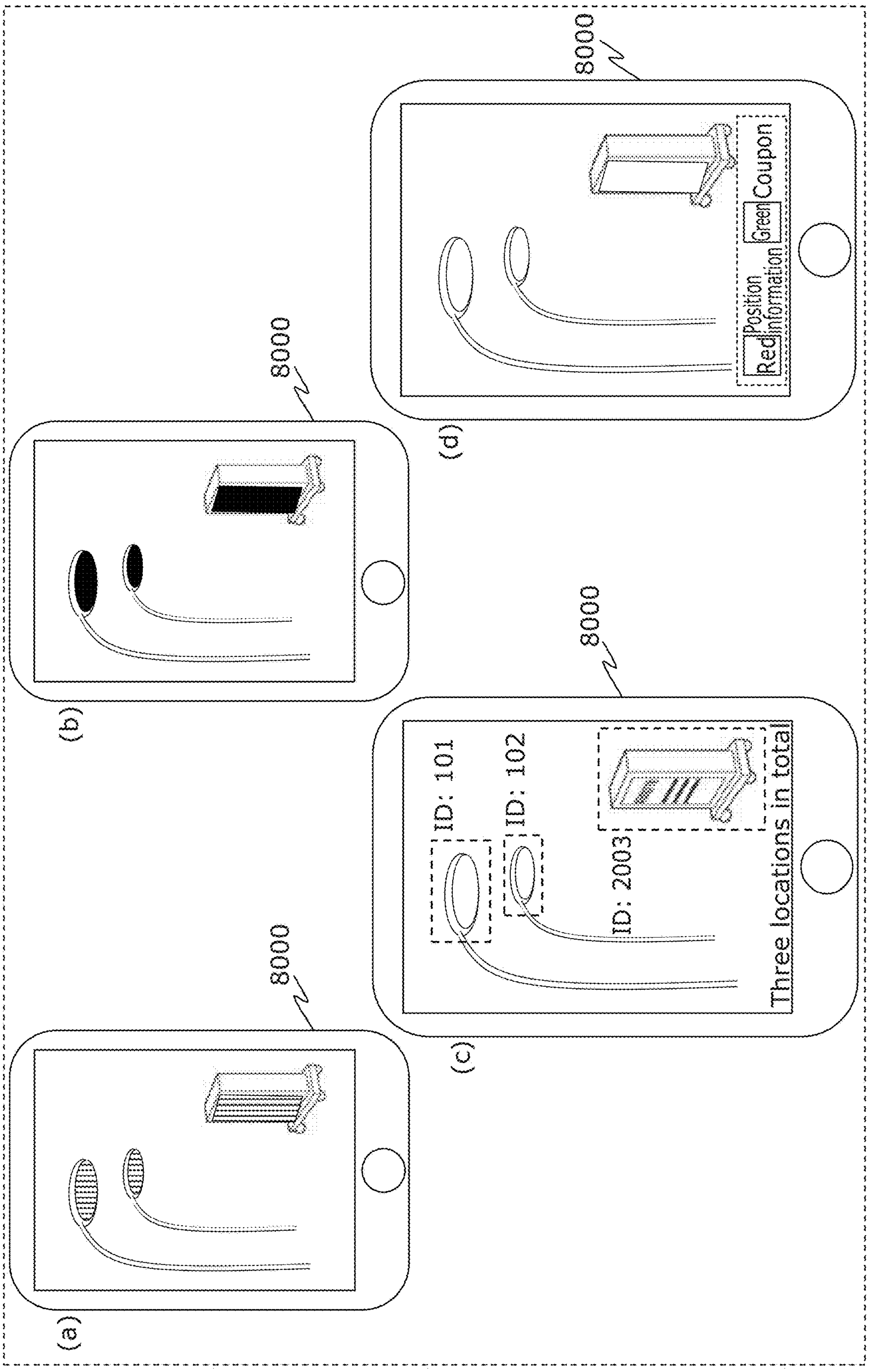
FIG. 11 is a diagram illustrating an example of display operation of a receiver in Embodiment 2.

FIG. 11 is a diagram illustrating an example of display operation of a receiver in this embodiment.

For example, the receiver 8000 may display the synthetic image in which the bright line pattern is shown, as illustrated in (a) in FIG. 11. As an alternative, the receiver 8000 may superimpose, instead of the bright line pattern, a signal specification object which is an image having a predetermined color for notifying signal transmission on the normal captured image to generate the synthetic image, and display the synthetic image, as illustrated in (b) in FIG. 11.

As another alternative, the receiver 8000 may display, as the synthetic image, the normal captured image in which the signal transmission part is indicated by a dotted frame and an identifier (e.g. ID: 101, ID: 102, etc.), as illustrated in (c) in FIG. 11. As another alternative, the receiver 8000 may superimpose, instead of the bright line pattern, a signal identification object which is an image having a predetermined color for notifying transmission of a specific type of signal on the normal captured image to generate the synthetic image, and display the synthetic image, as illustrated in (d) in FIG. 11. In this case, the color of the signal identification object differs depending on the type of signal output from the transmitter. For example, a red signal identification object is superimposed in the case where the signal output from the transmitter is position information, and a green signal identification object is superimposed in the case where the signal output from the transmitter is a coupon.

Figure 12:
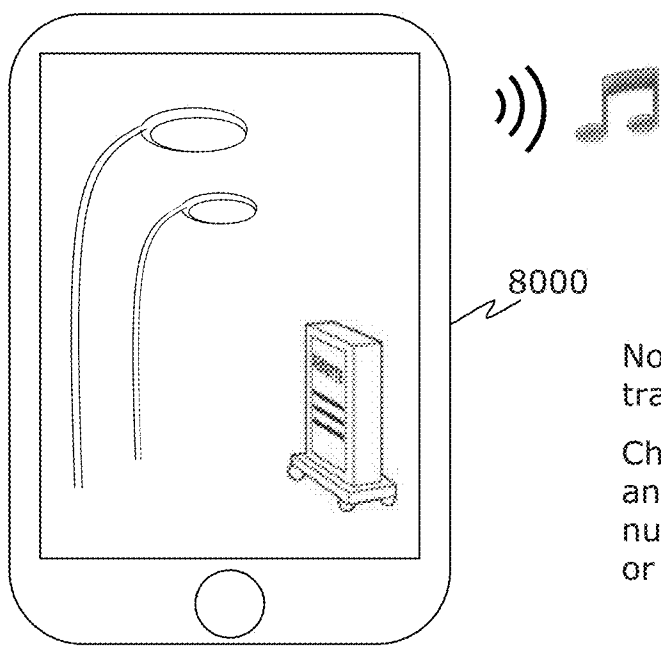
FIG. 12 is a diagram illustrating an example of operation of a receiver in Embodiment 2.

FIG. 12 is a diagram illustrating an example of display operation of a receiver in this embodiment.

For example, in the case of receiving the signal by visible light communication, the receiver 8000 may output a sound for notifying the user that the transmitter has been discovered, while displaying the normal captured image. In this case, the receiver 8000 may change the type of output sound, the number of outputs, or the output time depending on the number of discovered transmitters, the type of received signal, the type of information specified by the signal, or the like.

Figure 13:
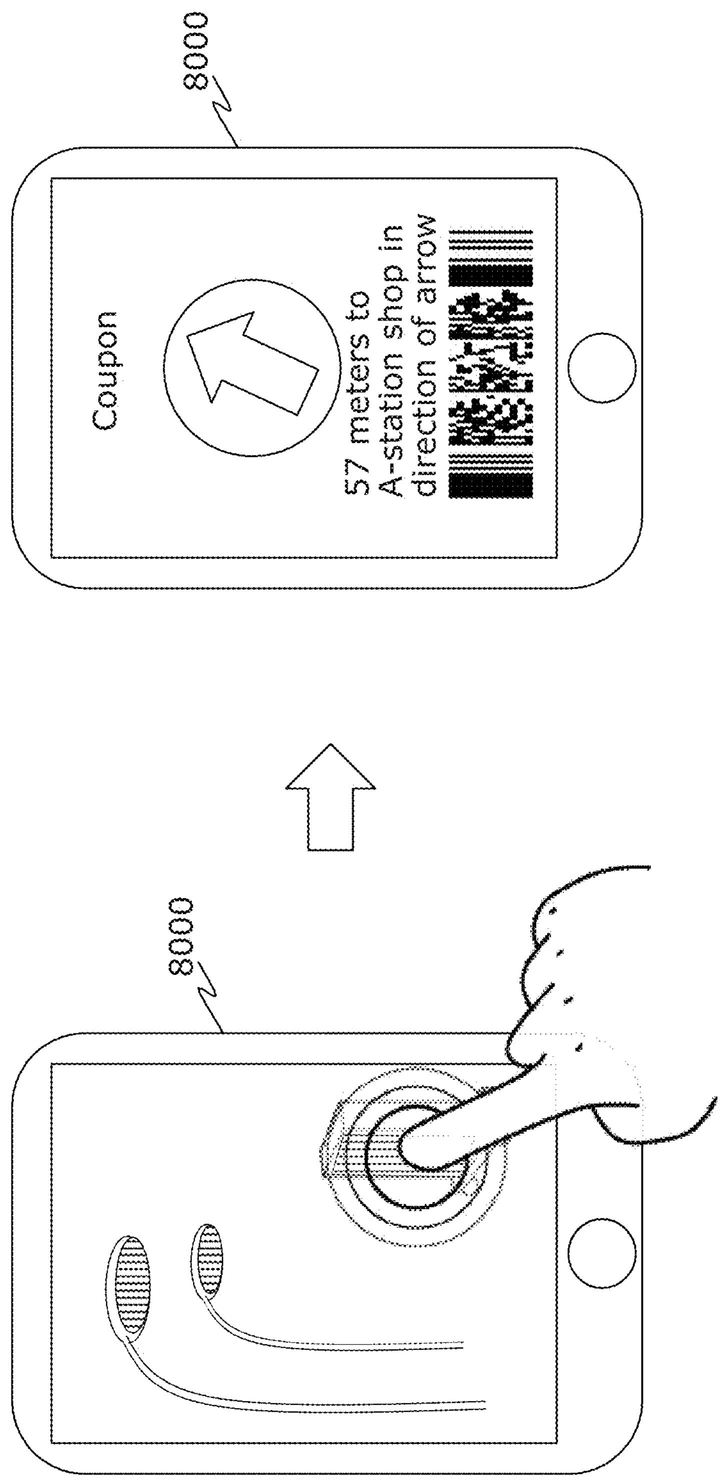
FIG. 13 is a diagram illustrating another example of operation of a receiver in Embodiment 2.

FIG. 13 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, a coupon or a location of a store. The bright line pattern may be the signal specification object, the signal identification object, or the dotted frame illustrated in FIG. 11. The same applies to the below-mentioned bright line pattern.

Figure 14:
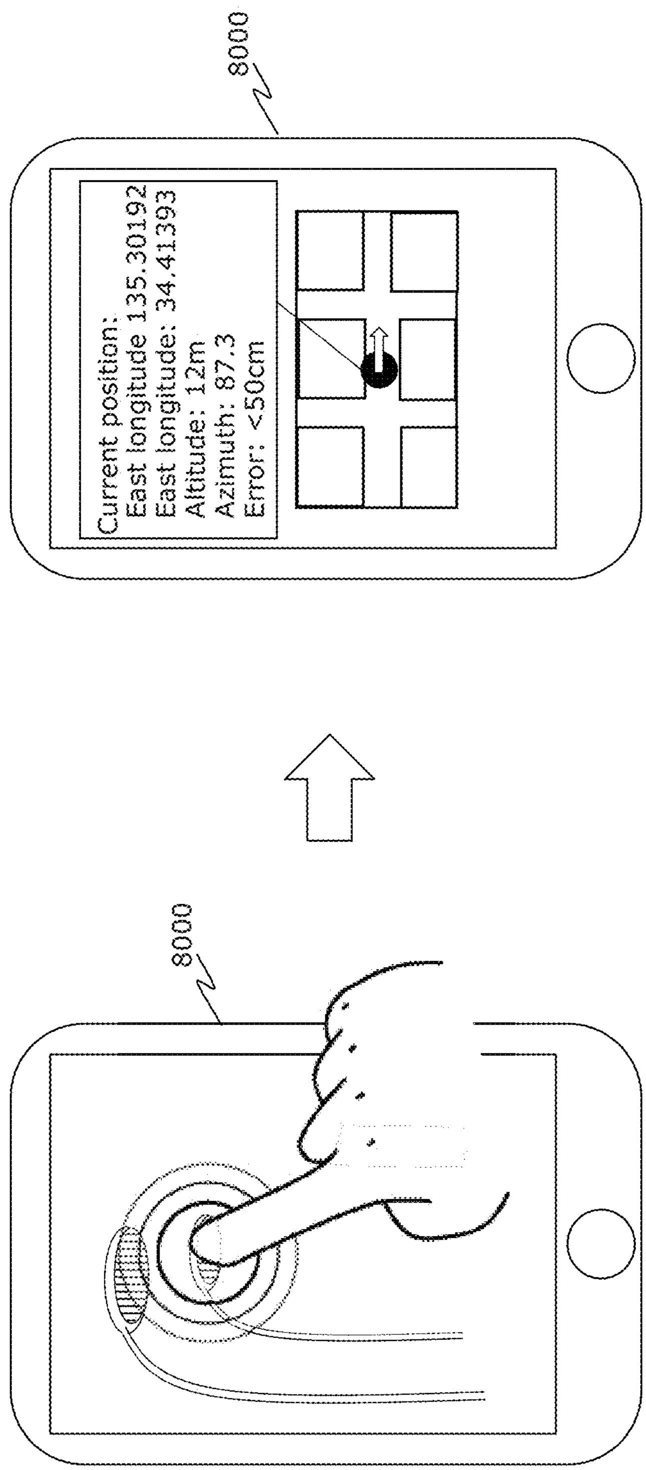
FIG. 14 is a diagram illustrating another example of operation of a receiver in Embodiment 2.

FIG. 14 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, the current position of the receiver 8000 by a map or the like.

Figure 15:
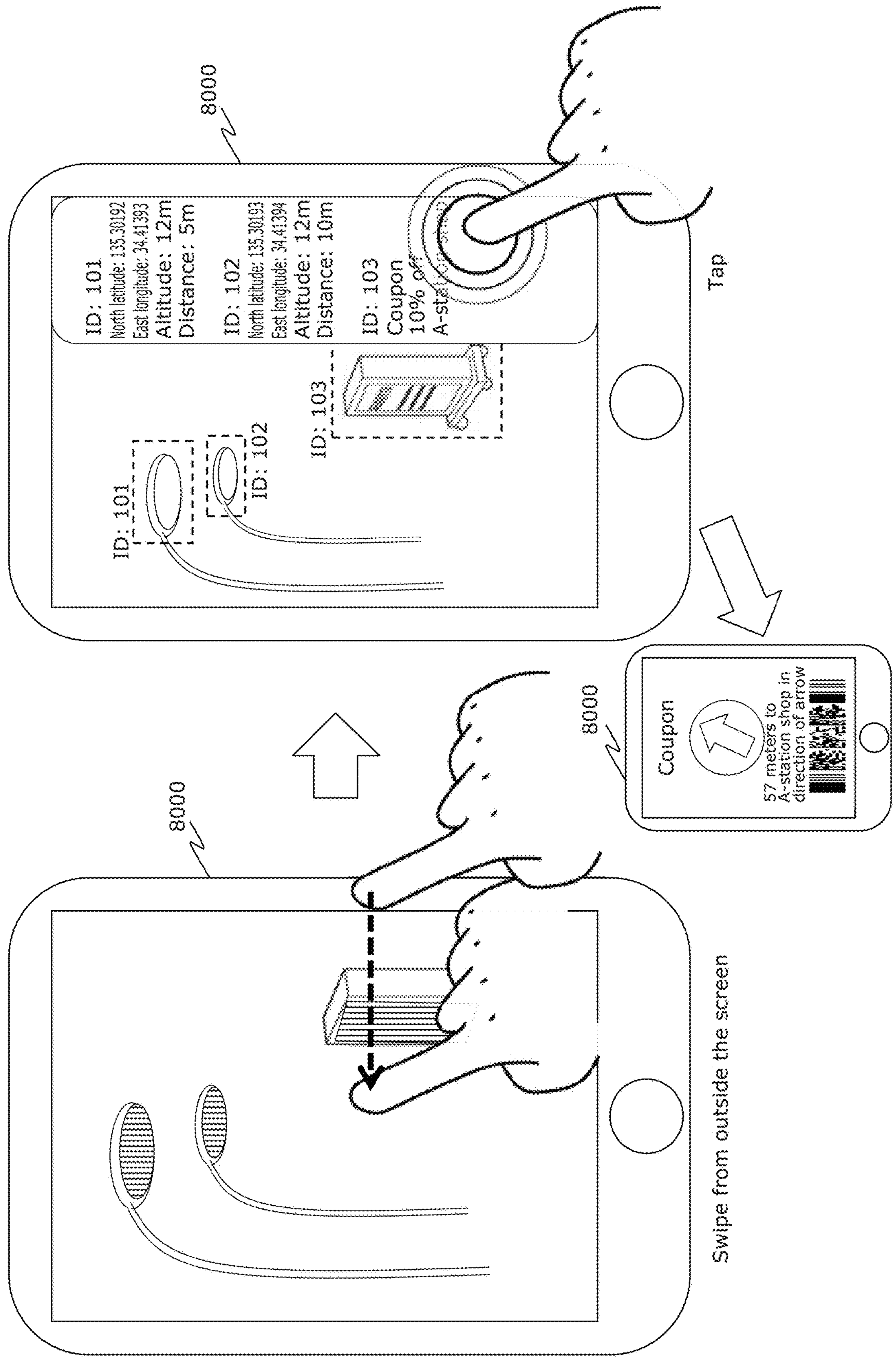
FIG. 15 is a diagram illustrating another example of operation of a receiver in Embodiment 2.

FIG. 15 is a diagram illustrating another example of operation of a receiver in this embodiment.

For example, when the user swipes on the receiver 8000 on which the synthetic image is displayed, the receiver 8000 displays the normal captured image including the dotted frame and the identifier like the normal captured image illustrated in (c) in FIG. 11, and also displays a list of information to follow the swipe operation. The list includes information specified by the signal transmitted from the part (transmitter) identified by each identifier. The swipe may be, for example, an operation of moving the user's finger from outside the display of the receiver 8000 on the right side into the display. The swipe may be an operation of moving the user's finger from the top, bottom, or left side of the display into the display.

When the user taps information included in the list, the receiver 8000 may display an information notification image (e.g. an image showing a coupon) indicating the information in more detail.

Figure 16:
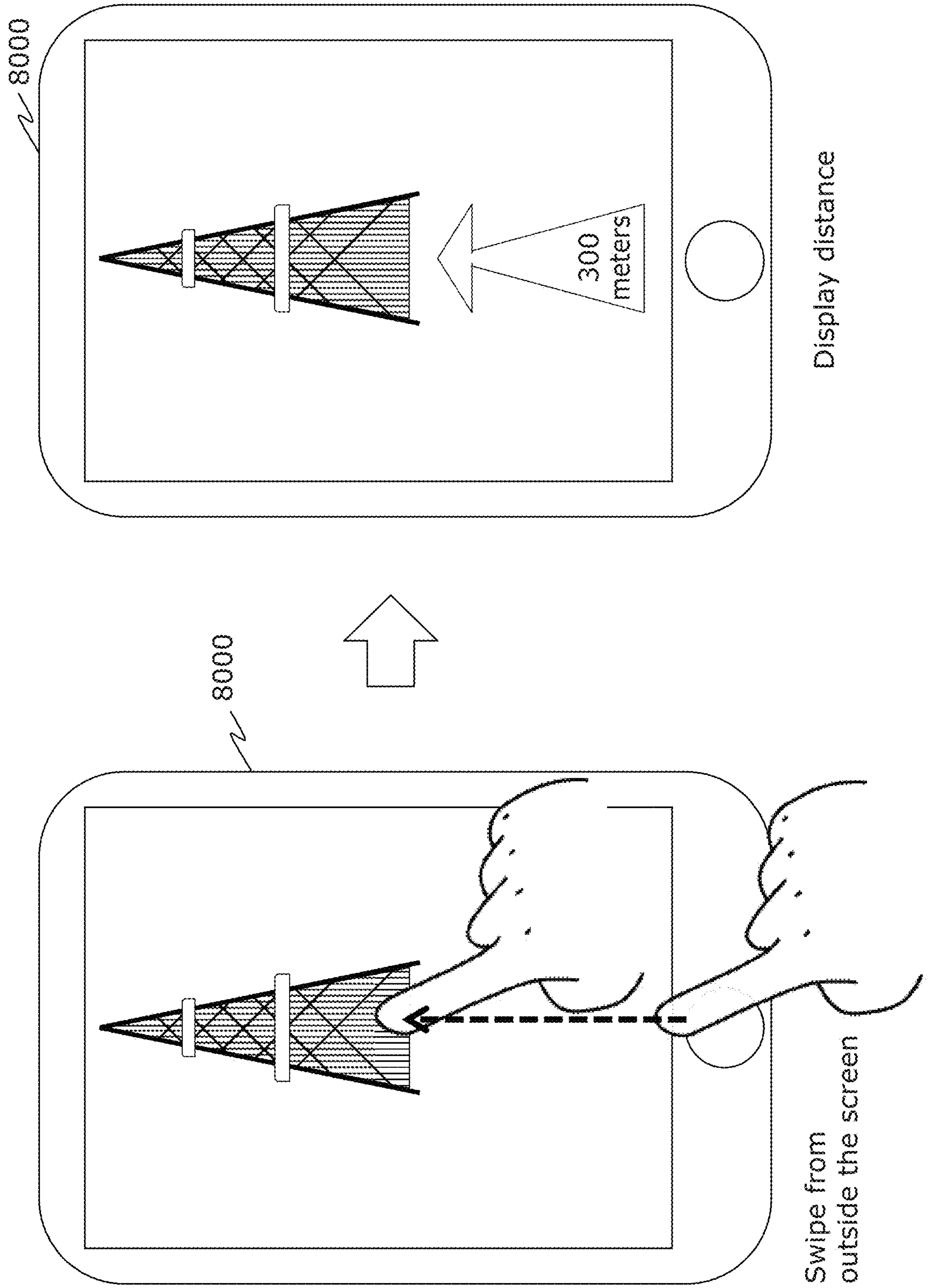
FIG. 16 is a diagram illustrating another example of operation of a receiver in Embodiment 2.

FIG. 16 is a diagram illustrating another example of operation of a receiver in this embodiment.

For example, when the user swipes on the receiver 8000 on which the synthetic image is displayed, the receiver 8000 superimposes an information notification image on the synthetic image, to follow the swipe operation. The information notification image indicates the subject distance with an arrow so as to be easily recognizable by the user. The swipe may be, for example, an operation of moving the user's finger from outside the display of the receiver 8000 on the bottom side into the display. The swipe may be an operation of moving the user's finger from the left, top, or right side of the display into the display.

Figure 17:
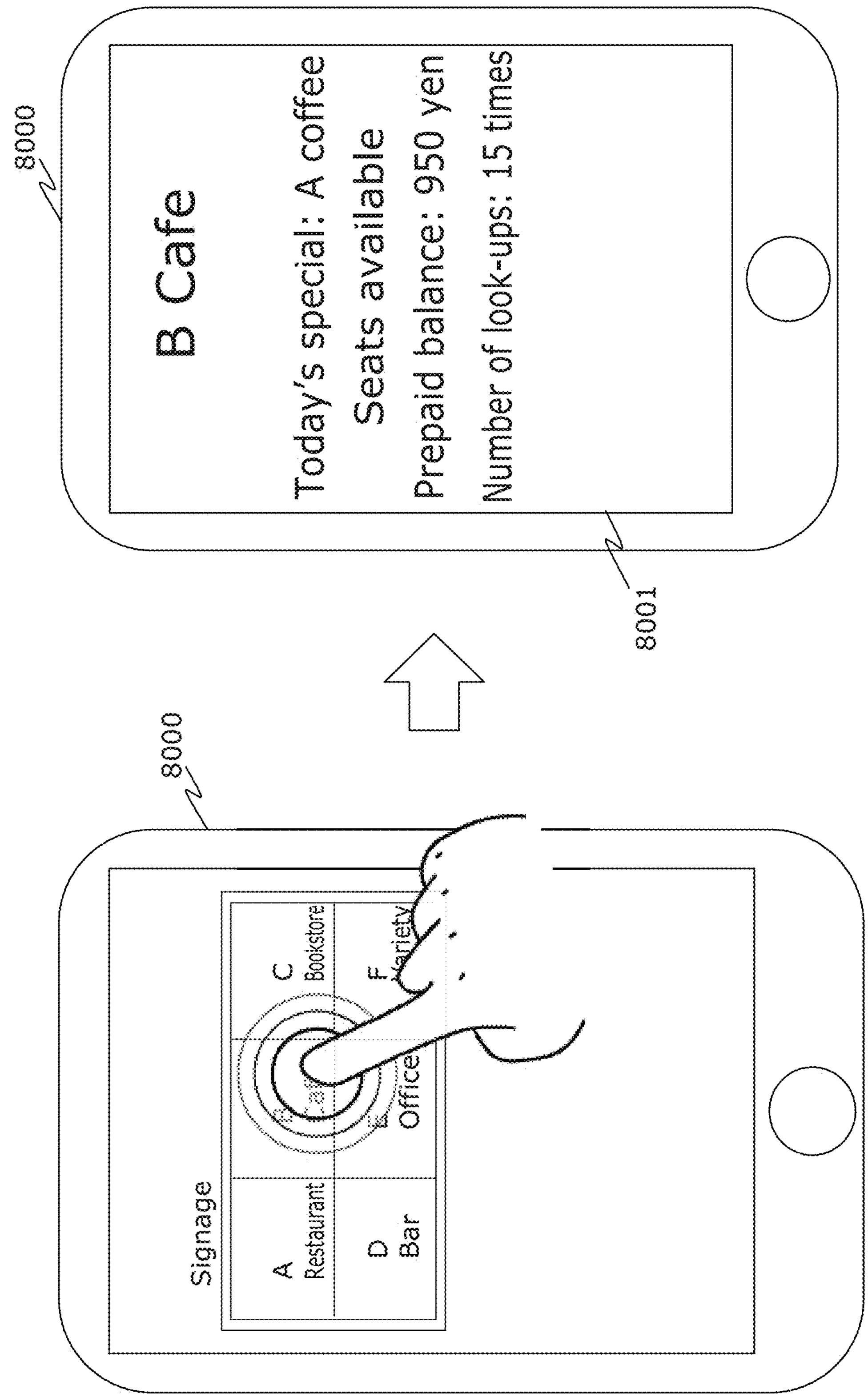
FIG. 17 is a diagram illustrating another example of operation of a receiver in Embodiment 2.

FIG. 17 is a diagram illustrating another example of operation of a receiver in this embodiment.

For example, the receiver 8000 captures, as a subject, a transmitter which is a signage showing a plurality of stores, and displays the normal captured image obtained as a result. When the user taps a signage image of one store included in the subject shown in the normal captured image, the receiver 8000 generates an information notification image based on the signal transmitted from the signage of the store, and displays an information notification image 8001. The information notification image 8001 is, for example, an image showing the availability of the store and the like.

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; displaying, based on the bright line image, a display image in which the subject and surroundings of the subject are shown, in a form that enables identification of a spatial position of a part where the bright line appears; and obtaining transmission information by demodulating data specified by a pattern of the bright line included in the obtained bright line image.

In this way, a synthetic image or an intermediate image illustrated in, for instance, FIGS. 7, 8, and 11 is displayed as the display image. In the display image in which the subject and the surroundings of the subject are shown, the spatial position of the part where the bright line appears is identified by a bright line pattern, a signal specification object, a signal identification object, a dotted frame, or the like. By looking at such a display image, the user can easily find the subject that is transmitting the signal through the change in luminance.

For example, the information communication method may further include: setting a longer exposure time than the exposure time; obtaining a normal captured image by capturing the subject and the surroundings of the subject by the image sensor with the longer exposure time; and generating a synthetic image by specifying, based on the bright line image, the part where the bright line appears in the normal captured image, and superimposing a signal object on the normal captured image, the signal object being an image indicating the part, wherein in the displaying, the synthetic image is displayed as the display image.

In this way, the signal object is, for example, a bright line pattern, a signal specification object, a signal identification object, a dotted frame, or the like, and the synthetic image is displayed as the display image as illustrated in FIGS. 7, 8, and 11. Hence, the user can more easily find the subject that is transmitting the signal through the change in luminance.

For example, in the setting of an exposure time, the exposure time may be set to 1/3000 second, in the obtaining of a bright line image, the bright line image in which the surroundings of the subject are shown may be obtained, and in the displaying, the bright line image may be displayed as the display image.

In this way, the bright line image is obtained and displayed as an intermediate image. This eliminates the need for a process of obtaining a normal captured image and a visible light communication image and synthesizing them, thus contributing to a simpler process.

For example, the image sensor may include a first image sensor and a second image sensor, in the obtaining of the normal captured image, the normal captured image may be obtained by image capture by the first image sensor, and in the obtaining of a bright line image, the bright line image may be obtained by image capture by the second image sensor simultaneously with the first image sensor.

In this way, the normal captured image and the visible light communication image which is the bright line image are obtained by the respective cameras, for instance as illustrated in FIG. 8. As compared with the case of obtaining the normal captured image and the visible light communication image by one camera, the images can be obtained promptly, contributing to a faster process.

For example, the information communication method may further include presenting, in the case where the part where the bright line appears is designated in the display image by an operation by a user, presentation information based on the transmission information obtained from the pattern of the bright line in the designated part. Examples of the operation by the user include: a tap; a swipe; an operation of continuously placing the user's fingertip on the part for a predetermined time or more; an operation of continuously directing the user's gaze to the part for a predetermined time or more; an operation of moving a part of the user's body according to an arrow displayed in association with the part; an operation of placing a pen tip that changes in luminance on the part; and an operation of pointing to the part with a pointer displayed in the display image by touching a touch sensor.

In this way, the presentation information is displayed as an information notification image, for instance as illustrated in FIGS. 13 to 17. Desired information can thus be presented to the user.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image including a plurality of parts where the bright line appears is obtained by capturing a plurality of subjects in a period during which the image sensor is being moved, and in the obtaining of the information, a position of each of the plurality of subjects is obtained by demodulating, for each of the plurality of parts, the data specified by the pattern of the bright line in the part, and the information communication method may further include estimating a position of the image sensor, based on the obtained position of each of the plurality of subjects and a moving state of the image sensor.

In this way, the position of the receiver including the image sensor can be accurately estimated based on the changes in luminance of the plurality of subjects such as lightings.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; obtaining the information by demodulating data specified by a pattern of the bright line included in the obtained bright line image; and presenting the obtained information, wherein in the presenting, an image prompting to make a predetermined gesture is presented to a user of the image sensor as the information.

In this way, user authentication and the like can be conducted according to whether or not the user makes the gesture as prompted. This enhances convenience.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing a plurality of subjects reflected on a reflection surface, and in the obtaining of the information, the information is obtained by separating a bright line corresponding to each of the plurality of subjects from bright lines included in the bright line image according to a strength of the bright line and demodulating, for each of the plurality of subjects, the data specified by the pattern of the bright line corresponding to the subject.

In this way, even in the case where the plurality of subjects such as lightings each change in luminance, appropriate information can be obtained from each subject.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing the subject reflected on a reflection surface, and the information communication method may further include estimating a position of the subject based on a luminance distribution in the bright line image.

In this way, the appropriate position of the subject can be estimated based on the luminance distribution.

For example, in the transmitting, a buffer time may be provided when switching the change in luminance between the change in luminance according to the first pattern and the change in luminance according to the second pattern.

In this way, interference between the first signal and the second signal can be suppressed.

For example, an information communication method of transmitting a signal using a change in luminance may include: determining a pattern of the change in luminance by modulating the signal to be transmitted; and transmitting the signal by a light emitter changing in luminance according to the determined pattern, wherein the signal is made up of a plurality of main blocks, each of the plurality of main blocks includes first data, a preamble for the first data, and a check signal for the first data, the first data is made up of a plurality of sub-blocks, and each of the plurality of sub-blocks includes second data, a preamble for the second data, and a check signal for the second data.

In this way, data can be appropriately obtained regardless of whether or not the receiver needs a blanking interval.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, the signal of a different frequency or protocol is transmitted.

In this way, interference between signals from the plurality of transmitters can be suppressed.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, one of the plurality of transmitters receives a signal transmitted from a remaining one of the plurality of transmitters, and transmits an other signal in a form that does not interfere with the received signal.

In this way, interference between signals from the plurality of transmitters can be suppressed.

(Station Guide)

Figure 18A:
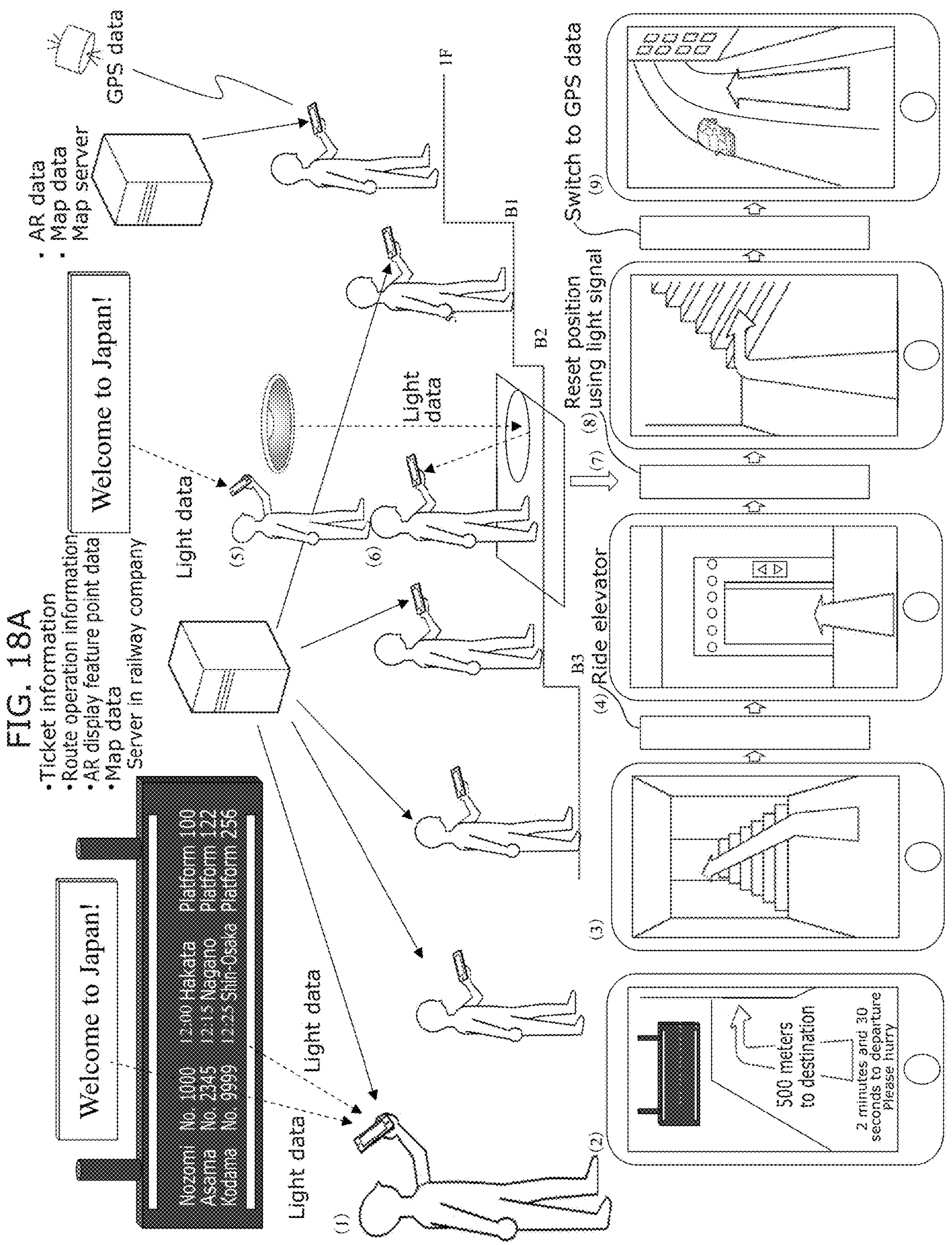
FIG. 18A is a diagram illustrating an example of operation of a transmitter and a receiver in Embodiment 2.

FIG. 18A is a diagram illustrating an example of use according to the present disclosure on a train platform. A user points a mobile terminal at an electronic display board or a lighting, and obtains information displayed on the electronic display board or train information or station information of a station where the electronic display board is installed, by visible light communication. Here, the information displayed on the electronic display board may be directly transmitted to the mobile terminal by visible light communication, or ID information corresponding to the electronic display board may be transmitted to the mobile terminal so that the mobile terminal inquires of a server using the obtained ID information to obtain the information displayed on the electronic display board. In the case where the ID information is transmitted from the mobile terminal, the server transmits the information displayed on the electronic display board to the mobile terminal, based on the ID information. Train ticket information stored in a memory of the mobile terminal is compared with the information displayed on the electronic display board and, in the case where ticket information corresponding to the ticket of the user is displayed on the electronic display board, an arrow indicating the way to the platform at which the train the user is going to ride arrives is displayed on a display of the mobile terminal. An exit or a path to a train car near a transfer route may be displayed when the user gets off a train.

When a seat is reserved, a path to the seat may be displayed. When displaying the arrow, the same color as the train line in a map or train guide information may be used to display the arrow, to facilitate understanding. Reservation information (platform number, car number, departure time, seat number) of the user may be displayed together with the arrow. A recognition error can be prevented by also displaying the reservation information of the user. In the case where the ticket is stored in a server, the mobile terminal inquires of the server to obtain the ticket information and compares it with the information displayed on the electronic display board, or the server compares the ticket information with the information displayed on the electronic display board. Information relating to the ticket information can be obtained in this way. The intended train line may be estimated from a history of transfer search made by the user, to display the route. Not only the information displayed on the electronic display board but also the train information or station information of the station where the electronic display board is installed may be obtained and used for comparison. Information relating to the user in the electronic display board displayed on the display may be highlighted or modified. In the case where the train ride schedule of the user is unknown, a guide arrow to each train line platform may be displayed. When the station information is obtained, a guide arrow to souvenir shops and toilets may be displayed on the display. The behavior characteristics of the user may be managed in the server so that, in the case where the user frequently goes to souvenir shops or toilets in a train station, the guide arrow to souvenir shops and toilets is displayed on the display. By displaying the guide arrow to souvenir shops and toilets only to each user having the behavior characteristics of going to souvenir shops or toilets while not displaying the guide arrow to other users, it is possible to reduce processing. The guide arrow to souvenir shops and toilets may be displayed in a different color from the guide arrow to the platform. When displaying both arrows simultaneously, a recognition error can be prevented by displaying them in different colors. Though a train example is illustrated in FIG. 18A, the same structure is applicable to display for planes, buses, and so on.

Specifically, as illustrated in (1) in FIG. 18A, a mobile terminal such as a smartphone (i.e., a receiver such as the receiver 200 to be described later) receives a visible light signal as a light ID or light data from an electronic display board by capturing the electronic display board. At this time, the mobile terminal performs self-position estimation. In other words, the mobile terminal obtains the position, indicated directly or indirectly via the light data, of the electronic display board on a map. The mobile terminal then calculates a relative position of the mobile terminal relative to the electronic display board based on, for example, the orientation of the mobile terminal obtained from, for example, a 9-axis sensor, and the position, shape, and size of the electronic display board in an image in which the electronic display board is shown as a result of being captured. The mobile terminal estimates a self-position, which is the position of the mobile terminal on the map, based on the position of the electronic display board on the map and the relative position. From this self-position, which is a starting point, the mobile terminal searches for a path to a destination displayed in ticket information, for example, and begins navigation of guiding the user to the destination along the path. Note that the mobile terminal may transmit information indicating the starting point and the destination to a server, and obtain the above-described path searched for by the server, from the server. At this time, the mobile terminal may obtain a map including the path from the server.

While navigating, as illustrated in (2) through (4) in FIG. 18A, the mobile terminal repeatedly captures normal captured images and displays them sequentially in real time superimposed with a directional indicator image, such as an arrow, indicating where the user is to go. The user travels in accordance with the displayed directional indicator image while holding the mobile terminal. Then, the mobile terminal updates the self-position of the mobile terminal based on the movement of objects or feature points captured in the above-described normal captured images. For example, the mobile terminal detects the movement of objects or feature points shown in the above-described normal captured images, and based on the detected movement, estimates a travel direction and travel distance of the mobile terminal. The mobile terminal then updates the current self-position based on the estimated travel direction and travel distance and the self-position estimated in (1) in FIG. 18A. The updating of the self-position may be performed in a cycle defined by the frame period of the normal captured images, and may be performed in a cycle longer than this frame period. In other words, while the mobile terminal is on an underground floor or path, the mobile terminal cannot obtain GPS data. Accordingly, in such cases, the mobile terminal does not use GPS data, but rather estimates or updates the self-position based on movement of, for example, feature points in the above-described normal captured images.

Here, as illustrated in (4) in FIG. 18A, the mobile terminal may guide the user to an elevator along the path to the destination, for example. Moreover, as illustrated in (5) and (6) in FIG. 18A, when the mobile terminal captures the transmitter that is transmitting the light data or reflected light including the light data, the mobile terminal receives the light data and estimates the self-position, just as in the example illustrated in (1) in FIG. 18A. For example, even when the user is riding an elevator, the mobile terminal receives light data transmitted by a transmitter (i.e., a transmitter such as transmitter 100 to be described later) located in, for example, a lighting apparatus inside the cabin of the elevator. For example, this light data directly or indirectly indicates the floor which the elevator cabin is currently on. Accordingly, the mobile terminal can identify the floor which the mobile terminal is currently on by receiving this light data. When the current position of the cabin is not directly indicated in the light data, the mobile terminal transmits information indicating this light data to a server, and receives floor number information associated with that information in the server. This enables the mobile terminal to identify the floor indicated in the floor number information as the floor on which the mobile terminal is currently positioned. In this way, the identified floor is treated as the self-position.

As a result, as illustrated in (7) in FIG. 18A, the terminal device resets the self-position by overwriting the self-position derived from the movement of, for example, feature points in the normal captured images with the self-position derived using this light data.

Then, as illustrated in (8) in FIG. 18A, after the user exits the elevator, if the user has not reached their destination, the mobile terminal performs the same processes as illustrated in (2) through (4) in FIG. 18A while navigating the user. While navigating, the mobile terminal repeatedly checks whether GPS data can be obtained. Thus, when the mobile terminal goes above ground from the underground floor or path, the mobile terminal determines that GPS data can be obtained. The mobile terminal then switches the self-position estimation method from an estimation method based on movement of, for example, feature points, to an estimation method based on GPS data. Then, as illustrated in (9) in FIG. 18A, the mobile terminal estimates self-position based on GPS data while continuing to navigate the user until the user reaches the destination. Note that since the mobile terminal cannot obtain GPS data if the user goes underground once again, for example, the self-position estimation method would be switched from the estimation method based on GPS data to an estimation method based on movement of, for example, feature points.

Hereinafter, the example illustrated in FIG. 18A will be described in detail.

In the example illustrated in FIG. 18A, for example, a receiver implemented as a smartphone or a wearable device, such as smart glasses, receives a visible light signal (light data) transmitted from a transmitter in (1) in FIG. 18A. The transmitter is implemented as, for example, as digital signage, a poster, or a lamp that illuminates a statue. The receiver starts navigation to the destination in accordance with the received light data, information set in advance in the receiver, and user instruction. The receiver transmits light data to a server, and obtains navigation information associated with the data. Navigation information includes first through sixth information described below. First information is information indicating the position and shape of the transmitter. Second information is information indicating the path to the destination. Third information is information about other transmitters on and near the path to the destination. More specifically, information about other transmitters indicates the light data transmitted by those transmitters, the positions and shapes of those transmitters, and the positions and shapes of reflected light. Fourth information is position identification information related to the path and areas near the path. More specifically, position identification information is radio wave information or sound wave information for identifying an image feature quantity or position. Fifth information is information indicating the distance to and estimated time of arrival at the destination. Sixth information is some or all of content information for performing AR display. Navigation information may be stored in advance in the receiver. Note that the aforementioned "shape" may include size.

The receiver estimates the self-position of the receiver from (i) the relative positions of the transmitter and receiver calculated from the state of the transmitter in the captured image and the sensor value from the acceleration sensor and (ii) position information about the transmitter, and sets that self-position as the navigation starting point. Instead of light data, the receiver may estimate the self-position of the receiver and start the navigation using, for example, an image feature quantity, a barcode or two-dimensional code, radio waves, or sound waves.

As illustrated in (2) in FIG. 18A, the receiver displays navigation to the destination. This navigation display may be an AR display that superimposes an image on the normal captured image obtained via capturing by the camera, may be a display of a map, may be an instruction given via voice or vibration, or any combination thereof. The method of display may be selected via a configuration setting in the receiver, light data, or server. One setting may be prioritized over the others. Moreover, if the location of arrival (i.e., the destination) is a boarding point for a means of transportation, the receiver may obtain the schedule for the means of transportation, and may display the time of a reservation made or the time of departure or time of boarding of a means of transportation around the estimated time of arrival. If the location of arrival is a theatre or the like, the receiver may display the start time or entry deadline.

As illustrated in (3) and (4) in FIG. 18A, the receiver continues navigating while the receiver is moving. In situations in which absolute position information cannot be obtained, the receiver may estimate the travel distance and direction of the receiver from the travel distance between images from feature points in a plurality of images, while capturing those images. Moreover, the receiver may estimate the travel distance and direction of the receiver from the acceleration sensor or the rising edge of the radio or sound waves. Moreover, the receiver may estimate the travel distance and direction of the receiver using simultaneous localization and mapping (SLAM) or parallel tracking and mapping (PTAM).

In (5) in FIG. 18A, when the receiver receives light data other than the light data received in (1) in FIG. 18A, for example, outside of the elevator, the receiver may transmit that light data to a server, and may obtain the shape and position of the transmitter associated with that light data. The receiver may then estimate the self-position of the receiver using the same method illustrated in (1) in FIG. 18A. With this, the receiver resolves the error in the self-position estimation of the receiver resulting from the processes performed in (3) and (4) in FIG. 18A, and corrects the current position in the navigation. When the receiver only partially receives a visible light signal and fails to obtain the complete light data, the receiver estimates that the nearest transmitter in the navigation information is the transmitter that transmitted the visible light signal, and thereafter performs self-position estimation of the receiver in the same manner as described above. With this, even transmitters that do not meet the reception conditions, such as smaller transmitters, transmitters located far away, or transmitters that emit low light can be used for the self-position estimation of the receiver.

In (6) in FIG. 18A, the receiver receives light data from reflected light. The receiver identifies that the medium carrying the received light data is reflected light from capture direction, light intensity, or contour clarity. When the medium is reflected light, the receiver identifies the position (i.e., the position on the map) of reflected light from navigation information, and estimates the central area of the region covered by the captured reflected light to be the position of the reflected light. The receiver then estimates the self-position of the receiver and corrects the current position in the navigation just like in (5) in FIG. 18A.

When the receiver receives a signal for identifying a position via, for example, GPS, GLONASS, Galileo, BeiDou Navigation Satellite System, or IRNSS, the receiver identifies the position of the receiver from that signal and corrects the current position in the navigation (i.e., the self-position). If the strength of the signal is sufficient, i.e., if the strength of the signal is stronger than a predetermined strength, the receiver may estimate the self-position solely via the signal, and if the strength of the signal is equal to or weaker than the predetermined strength, may use the method illustrated in (3) and (4) in FIG. 18A in conjunction with the signal.

If the receiver receives a visible light signal, the receiver may transmit to a server, in conjunction with the information indicated by the received visible light signal, [1] a radio wave signal including a predetermined ID received at the same time as the visible light signal, [2] a radio wave signal including the most recently received predetermined ID, or [3] information indicating the most recently estimated position of the receiver. This will identify the transmitter that transmitted the visible light signal. Alternatively, the receiver may receive a visible light signal via an algorithm specified by the above-described radio wave signal or information indicating the position of the receiver, and may transmit information indicated by the visible light signal to a specified server, as described above.

The receiver may estimate the self-position, and display information about a product near the self-position. Moreover, the receiver may navigate the user to a position of a product specified by the user. Moreover, the receiver may present an optimal route for travelling to each of a plurality of products specified by the user. This optimal route is a shortest-distance route, shortest-time route, or the route that is least laborious to travel. Moreover, in addition or a product or location specified by the user, the receiver may navigate the user so as to pass through a predetermined location. This makes it possible to advertise a predetermined location or a store or product at the predetermined location.

Figure 18B:
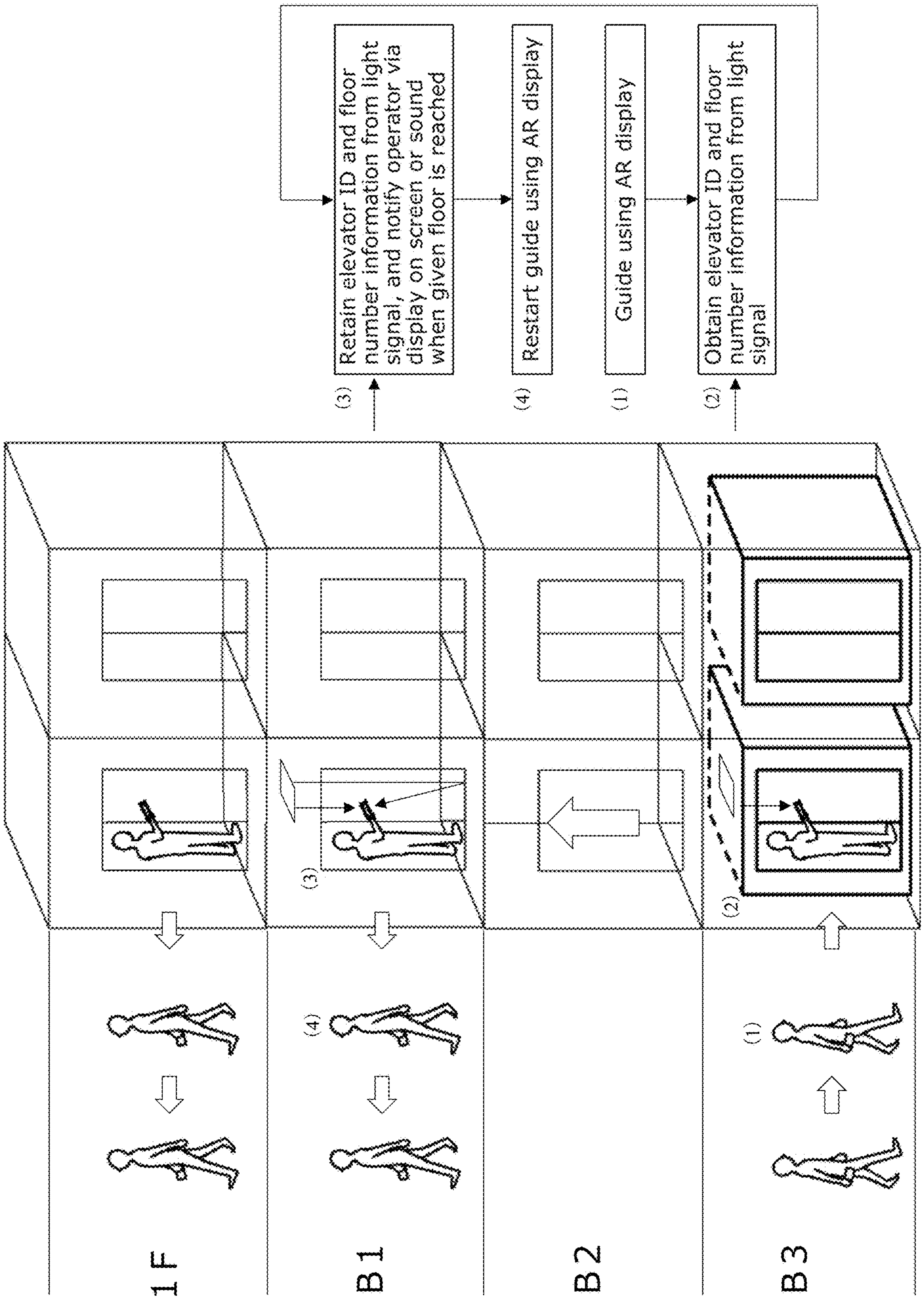
FIG. 18B is a diagram illustrating an example of operation of a transmitter and a receiver in Embodiment 2.

FIG. 18B is a diagram for explaining the navigation performed by receiver 200 pertaining an elevator according to the present embodiment.

For example, when the user is on the 3$^{rd}$ basement floor (B3), a receiver implemented as a smartphone guides the user via AR display, i.e., executes AR navigation, as illustrated in (1) in FIG. 18B, As illustrated in FIG. 18A, AR navigation is a navigational function that guides the user to a destination by superimposing a directional indicator image such as an arrow on a normal captured image. Note that hereinafter, AR navigation may also be referred to simply as navigation.

When the user boards an elevator, as illustrated in (2) FIG. 18B, the receiver receives a light signal (i.e., visible light signal, light data, or light ID) from a transmitter in the cabin of the elevator. This enables the receiver to obtain the elevator ID and the floor number information, based on the light signal. The elevator ID is identification information for identifying the elevator or cabin in which the transmitter is in, and the floor number information is information indicating the floor (or floor number) that the cabin is currently on. For example, the receiver transmits a light signal (or information indicated by the light signal) to a server, and obtains the elevator ID and floor number information associated with that light signal in the server, from the server. The transmitter may always transmit the same light signal regardless of the floor the elevator cabin is on and, alternatively, may transmit different light signals depending on the floor the cabin is on. Moreover, the transmitter may be implemented as, for example, a lighting apparatus. The light emitted by the transmitter brightly illuminates the interior of the elevator cabin. Accordingly, the receiver can directly receive the light signal superimposed on the light from the transmitter, and can indirectly receive the light signal via light reflected off the inner walls or floor of the cabin.

When the cabin in which the receiver is located is going up, the receiver can successively identify the current position of the receiver according to the elevator ID and floor number information obtained based on the light signal transmitted by the transmitter. As illustrated in (3) in FIG. 18B, when the floor at which the receiver is currently positioned is the destination floor, the receiver displays, on the display of the receiver, a message or image prompting the user to exit the elevator. The receiver may output sound that prompts the user to exit the elevator.

When the destination floor is in a location in which GPS data does not reach, such as the 1$^{st}$ basement floor, the receiver employs an estimation method that uses the movement of feature points in normal captured images, such as described above, and restarts the above-described AR navigation while estimating the self-position, as illustrated in (4) in FIG. 18B. On the other hand, when the destination floor is in a location in which GPS data can reach, such as the 1st floor above ground, the receiver employs an estimation method that uses the GPS data, and restarts the above-described AR navigation while estimating the self-position, as illustrated in (4) in FIG. 18B.

Figure 18C:
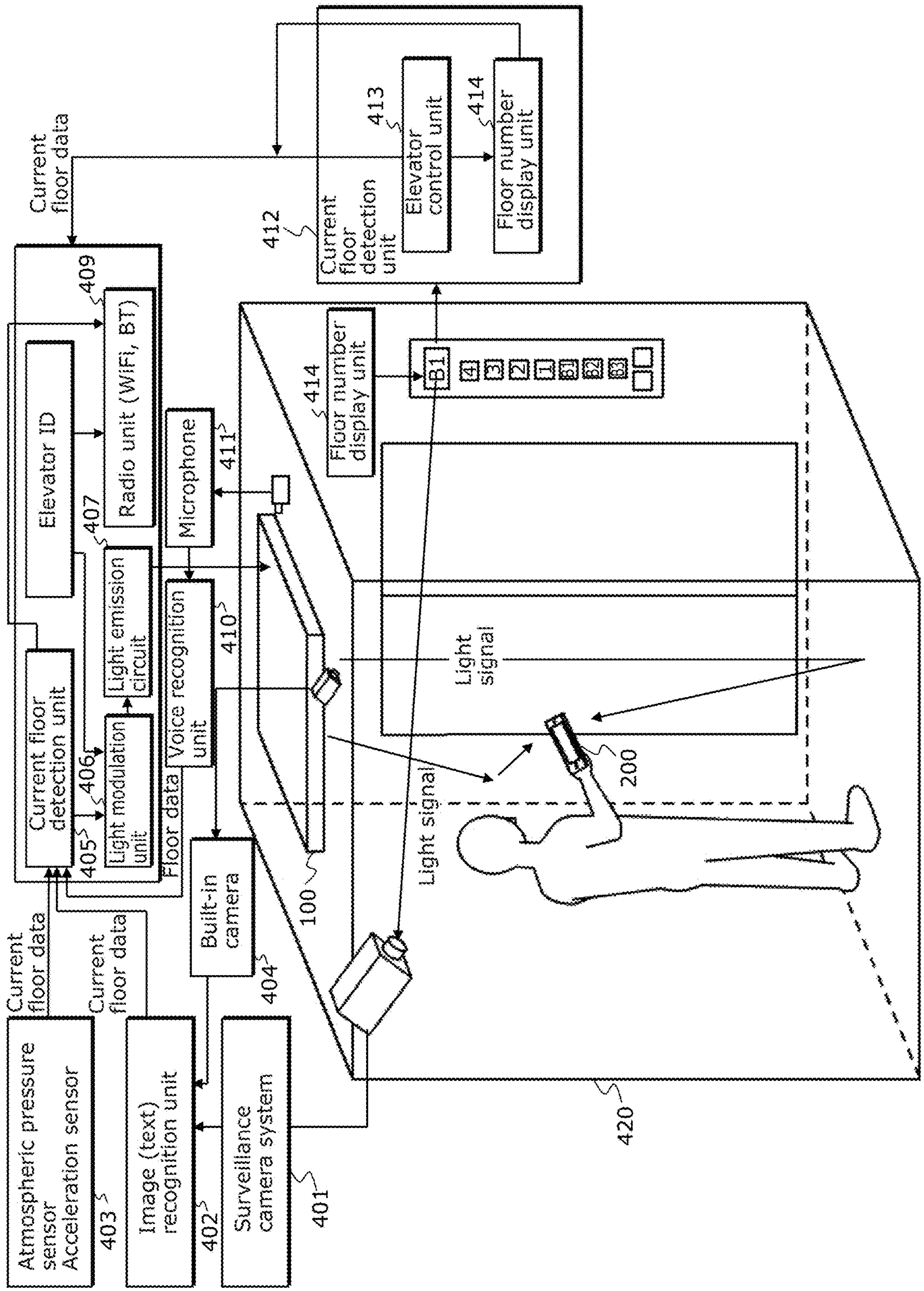
FIG. 18C is a diagram illustrating an example of operation of a transmitter and a receiver in Embodiment 2.

FIG. 18C is a diagram illustrating one example of a system configuration in an elevator according to the present embodiment.

A transmitter 100, which is the transmitter described above, is disposed in the elevator cabin 420. This transmitter 100 is disposed on the ceiling of the elevator cabin 420 as a lighting apparatus of the elevator cabin 420. Moreover, the transmitter 100 includes a built-in camera 404 and a microphone 411. The built-in camera 404 captures the inside of the cabin 420 and the microphone 411 records audio inside the cabin 420.

Moreover, a surveillance camera system 401, a floor number display unit 414, and a sensor 403 are provided in the cabin 420. The surveillance camera system 401 is a system that includes at least one camera that captures the interior of the cabin 420. The floor number display unit 414 displays the floor that the cabin 420 is currently on. The sensor 403 includes, for example, at least one of an atmospheric pressure sensor and an. acceleration sensor.

Moreover, the elevator includes an image recognition unit 402, a current floor detection unit 405, a light modulation unit 406, a light emission circuit 407, a radio unit 409, and a voice recognition unit 410.

The image recognition unit 402 recognizes text (i.e., the floor number) displayed on the floor number display unit 414 from an image captured by the surveillance camera system 401 or the built-in camera 404, and outputs current floor data obtained as a result of the recognition. The current floor data indicates the floor number displayed on the floor number display unit 414.

The voice recognition unit 410 recognizes the floor that the cabin 420 is currently on based on sound data output from the microphone 411, and outputs floor data indicating the recognized floor.

The current floor detection unit 405 detects the floor that the cabin 420 is currently on based on data output by at least one of the sensor 403, the image recognition unit 402, and the voice recognition unit 410. The current floor detection unit 405 then outputs information indicating the detected floor to the light modulation unit 406.

The light modulation unit 406 modulates a signal indicating (i) information indicating the floor output from the current floor detection unit 405 and (ii) the elevator ID, and outputs the modulated signal to the light emission circuit 407. The light emission circuit 407 changes the luminance of the transmitter 100 in accordance with the modulated signal. This results in the transmission of the above-described visible light signal, light signal, light data or light ID indicating the floor that the cabin 420 is currently on and the elevator ID from transmitter 100.

Moreover, similar to the light modulation unit 406, the radio unit 409 modulates a signal indicating (i) information indicating the floor output from the current floor detection unit 405 and (ii) the elevator ID, and outputs the modulated signal over radio. For example, the radio unit 409 transmits signals via Wi-Fi or Bluetooth (registered trademark).

With this, as a result of the receiver 200 receiving at least one of the radio signal or the light signal, the receiver 200 can identify the floor that the receiver 200 is currently on and the elevator ID.

Moreover, the elevator may include a current floor detection unit 412 including the above-described floor number display unit 414. This current floor detection unit 412 is configured of an elevator control unit 413 and the floor number display unit 414. The elevator control unit 413 controls the ascension, descension, and stopping of the cabin 420. Such an elevator control unit 413 knows the floor that the cabin 420 is currently on. Thus, this elevator control unit 413 may output, to the light modulation unit 406 and the radio unit 409, data indicating the known floor as the current floor data.

Such a configuration makes it possible for the receiver 200 to realize the AR navigation illustrated in FIG. 18A and FIG. 18B.

(Example of Application to Route Guidance)

Figure 19:
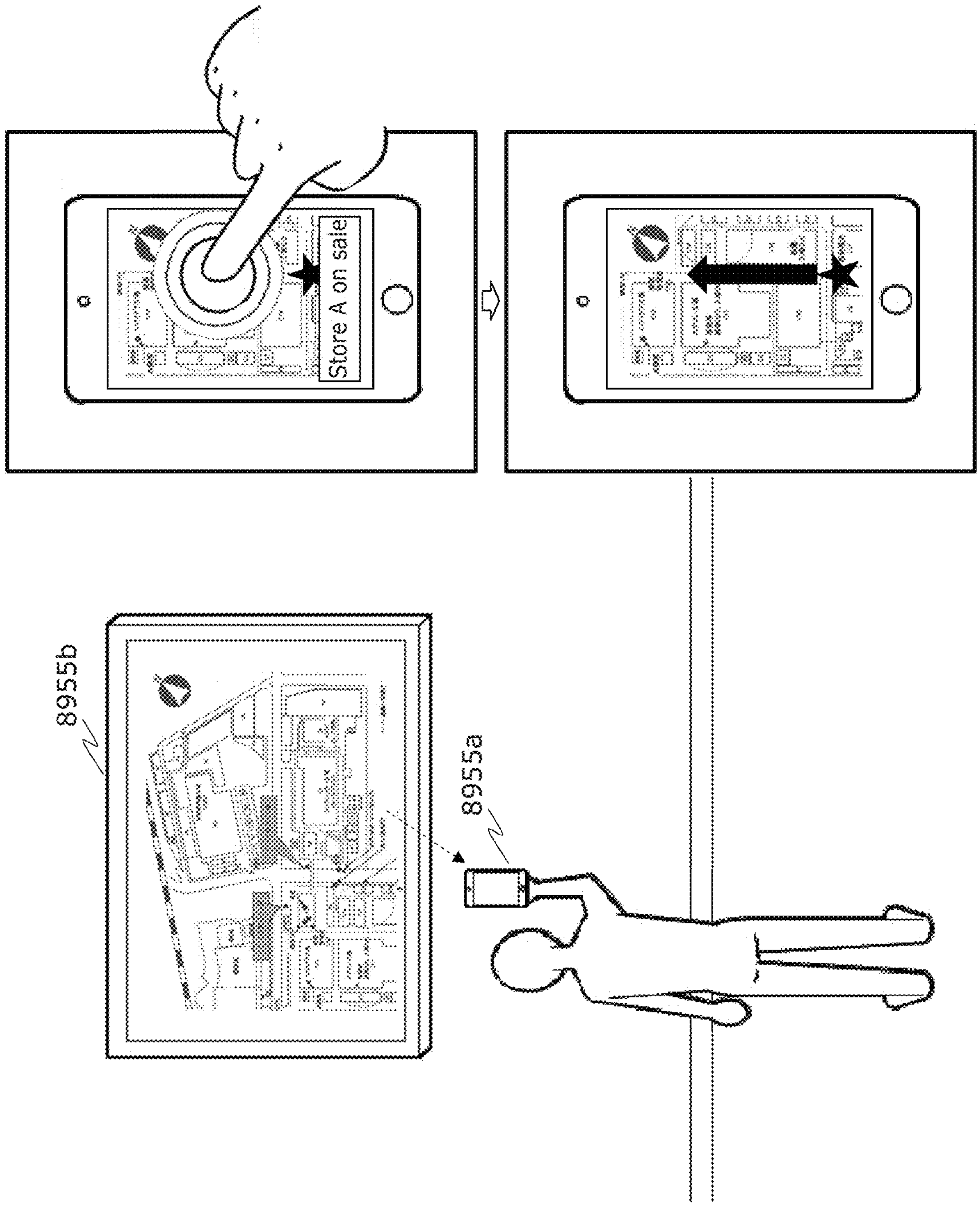
FIG. 19 is a diagram illustrating an example of application of route guidance in Embodiment 2.

FIG. 19 is a diagram illustrating an example of application of a transmission and reception system in Embodiment 2.

A receiver 8955*a* receives a transmission ID of a transmitter 8955*b* such as a guide sign, obtains data of a map displayed on the guide sign from a server, and displays the map data. Here, the server may transmit an advertisement suitable for the user of the receiver 8955*a*, so that the receiver 8955*a* displays the advertisement information, too. The receiver 8955*a* displays the route from the current position to the location designated by the user.

(Example of Application to Use Log Storage and Analysis)

Figure 20:
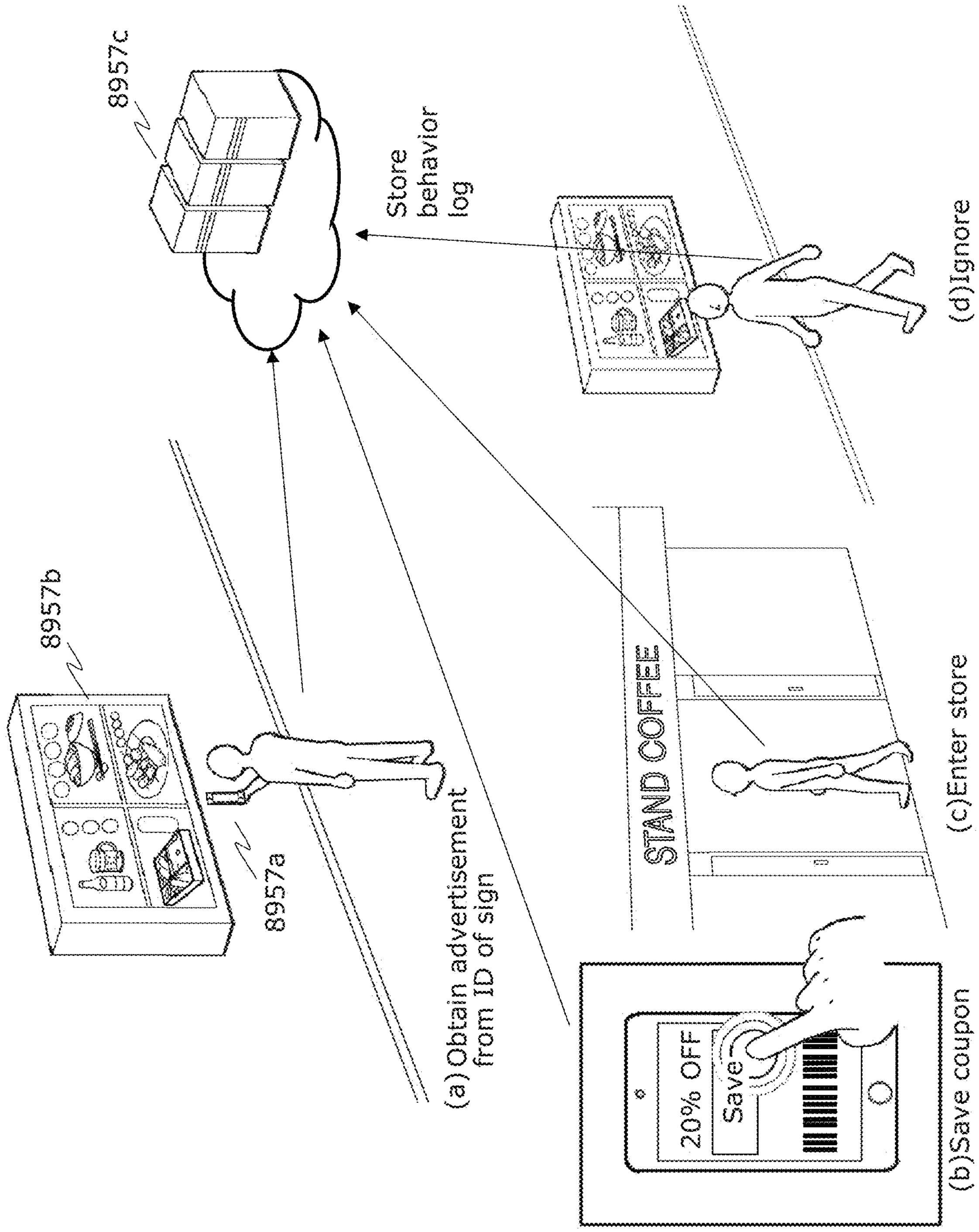
FIG. 20 is a diagram illustrating an example of application of use log storage and analysis in Embodiment 2.

FIG. 20 is a diagram illustrating an example of application of a transmission and reception system in Embodiment 2.

A receiver 8957*a* receives an ID transmitted from a transmitter 8957*b* such as a sign, obtains coupon information from a server, and displays the coupon information. The receiver 8957*a* stores the subsequent behavior of the user such as saving the coupon, moving to a store displayed in the coupon, shopping in the store, or leaving without saving the coupon, in the server 8957*c*. In this way, the subsequent behavior of the user who has obtained information from the sign 8957*b* can be analyzed to estimate the advertisement value of the sign 8957*b*.

An information communication method in this embodiment is an information communication method of obtaining information from a subject, the information communication method including: setting a first exposure time of an image sensor so that, in an image obtained by capturing a first subject by the image sensor, a plurality of bright lines corresponding to exposure lines included in the image sensor appear according to a change in luminance of the first subject, the first subject being the subject; obtaining a first bright line image which is an image including the plurality of bright lines, by capturing the first subject changing in luminance by the image sensor with the set first exposure time; obtaining first transmission information by demodulating data specified by a pattern of the plurality of bright lines included in the obtained first bright line image; and causing an opening and closing drive device of a door to open the door, by transmitting a control signal after the first transmission information is obtained.

In this way, the receiver including the image sensor can be used as a door key, thus eliminating the need for a special electronic lock. This enables communication between various devices including a device with low computational performance.

For example, the information communication method may further include: obtaining a second bright line image which is an image including a plurality of bright lines, by capturing a second subject changing in luminance by the image sensor with the set first exposure time; obtaining second transmission information by demodulating data specified by a pattern of the plurality of bright lines included in the obtained second bright line image; and determining whether or not a reception device including the image sensor is approaching the door, based on the obtained first transmission information and second transmission information, wherein in the causing of an opening and closing drive device, the control signal is transmitted in the case of determining that the reception device is approaching the door.

In this way, the door can be opened at appropriate timing, i.e. only when the reception device (receiver) is approaching the door.

For example, the information communication method may further include: setting a second exposure time longer than the first exposure time; and obtaining a normal image in which a third subject is shown, by capturing the third subject by the image sensor with the set second exposure time, wherein in the obtaining of a normal image, electric charge reading is performed on each of a plurality of exposure lines in an area including optical black in the image sensor, after a predetermined time elapses from when electric charge reading is performed on an exposure line adjacent to the exposure line, and in the obtaining of a first bright line image, electric charge reading is performed on each of a plurality of exposure lines in an area other than the optical black in the image sensor, after a time longer than the predetermined time elapses from when electric charge reading is performed on an exposure line adjacent to the exposure line, the optical black not being used in electric charge reading.

In this way, electric charge reading (exposure) is not performed on the optical black when obtaining the first bright line image, so that the time for electric charge reading (exposure) on an effective pixel area, which is an area in the image sensor other than the optical black, can be increased. As a result, the time for signal reception in the effective pixel area can be increased, with it being possible to obtain more signals.

For example, the information communication method may further include: determining whether or not a length of the pattern of the plurality of bright lines included in the first bright line image is less than a predetermined length, the length being perpendicular to each of the plurality of bright lines; changing a frame rate of the image sensor to a second frame rate lower than a first frame rate used when obtaining the first bright line image, in the case of determining that the length of the pattern is less than the predetermined length; obtaining a third bright line image which is an image including a plurality of bright lines, by capturing the first subject changing in luminance by the image sensor with the set first exposure time at the second frame rate; and obtaining the first transmission information by demodulating data specified by a pattern of the plurality of bright lines included in the obtained third bright line image.

In this way, in the case where the signal length indicated by the bright line pattern (bright line area) included in the first bright line image is less than, for example, one block of the transmission signal, the frame rate is decreased and the bright line image is obtained again as the third bright line image. Since the length of the bright line pattern included in the third bright line image is longer, one block of the transmission signal is successfully obtained.

For example, the information communication method may further include setting an aspect ratio of an image obtained by the image sensor, wherein the obtaining of a first bright line image includes: determining whether or not an edge of the image perpendicular to the exposure lines is clipped in the set aspect ratio; changing the set aspect ratio to a non-clipping aspect ratio in which the edge is not clipped, in the case of determining that the edge is clipped; and obtaining the first bright line image in the non-clipping aspect ratio, by capturing the first subject changing in luminance by the image sensor.

In this way, in the case where the aspect ratio of the effective pixel area in the image sensor is 4:3 but the aspect ratio of the image is set to 16:9 and horizontal bright lines appear, i.e. the exposure lines extend along the horizontal direction, it is determined that top and bottom edges of the image are clipped, i.e. edges of the first bright line image is lost. In such a case, the aspect ratio of the image is changed to an aspect ratio that involves no clipping, for example, 4:3. This prevents edges of the first bright line image from being lost, as a result of which a lot of information can be obtained from the first bright line image.

For example, the information communication method may further include: compressing the first bright line image in a direction parallel to each of the plurality of bright lines included in the first bright line image, to generate a compressed image; and transmitting the compressed image.

In this way, the first bright line image can be appropriately compressed without losing information indicated by the plurality of bright lines.

For example, the information communication method may further include: determining whether or not a reception device including the image sensor is moved in a predetermined manner; and activating the image sensor, in the case of determining that the reception device is moved in the predetermined manner.

In this way, the image sensor can be easily activated only when needed. This contributes to improved power consumption efficiency.

This embodiment describes each example of application using a receiver such as a smartphone and a transmitter for transmitting information as a blink pattern of an LED or an organic EL device described above.

Figure 21:
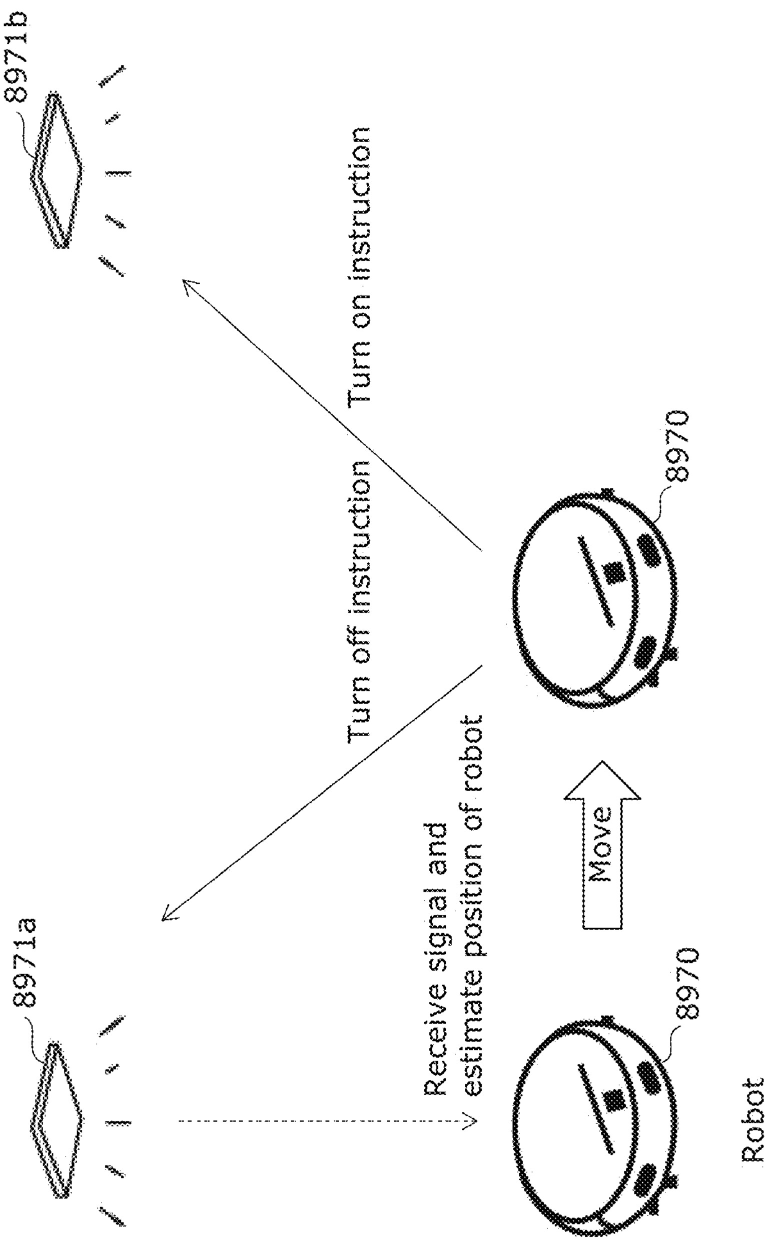
FIG. 21 is a diagram illustrating an example of application of a transmitter and a receiver in Embodiment 2.

FIG. 21 is a diagram illustrating an example of application of a transmitter and a receiver in Embodiment 2.

A robot 8970 has a function as, for example, a self-propelled vacuum cleaner and a function as a receiver in each of the above embodiments. Lighting devices 8971$a$ and 8971$b$ each have a function as a transmitter in each of the above embodiments.

For instance, the robot 8970 cleans a room and also captures the lighting device 8971$a$ illuminating the interior of the room, while moving in the room. The lighting device 8971$a$ transmits the ID of the lighting device 8971$a$ by changing in luminance. The robot 8970 accordingly receives the ID from the lighting device 8971$a$, and estimates the position (self-position) of the robot 8970 based on the ID, as in each of the above embodiments. That is, the robot 8970 estimates the position of the robot 8970 while moving, based on the result of detection by a 9-axis sensor, the relative position of the lighting device 8971$a$ shown in the captured image, and the absolute position of the lighting device 8971$a$ specified by the ID.

When the robot 8970 moves away from the lighting device 8971$a$, the robot 8970 transmits a signal (turn off instruction) instructing to turn off, to the lighting device 8971$a$. For example, when the robot 8970 moves away from the lighting device 8971$a$ by a predetermined distance, the robot 8970 transmits the turn off instruction. Alternatively, when the lighting device 8971$a$ is no longer shown in the captured image or when another lighting device is shown in the image, the robot 8970 transmits the turn off instruction to the lighting device 8971$a$. Upon receiving the turn off instruction from the robot 8970, the lighting device 8971$a$ turns off according to the turn off instruction.

The robot 8970 then detects that the robot 8970 approaches the lighting device 8971$b$ based on the estimated position of the robot 8970, while moving and cleaning the room. In detail, the robot 8970 holds information indicating the position of the lighting device 8971$b$ and, when the distance between the position of the robot 8970 and the position of the lighting device 8971$b$ is less than or equal to a predetermined distance, detects that the robot 8970 approaches the lighting device 8971$b$. The robot 8970 transmits a signal (turn on instruction) instructing to turn on, to the lighting device 8971$b$. Upon receiving the turn on instruction, the lighting device 8971$b$ turns on according to the turn on instruction.

In this way, the robot 8970 can easily perform cleaning while moving, by making only its surroundings illuminated.

Figure 22:
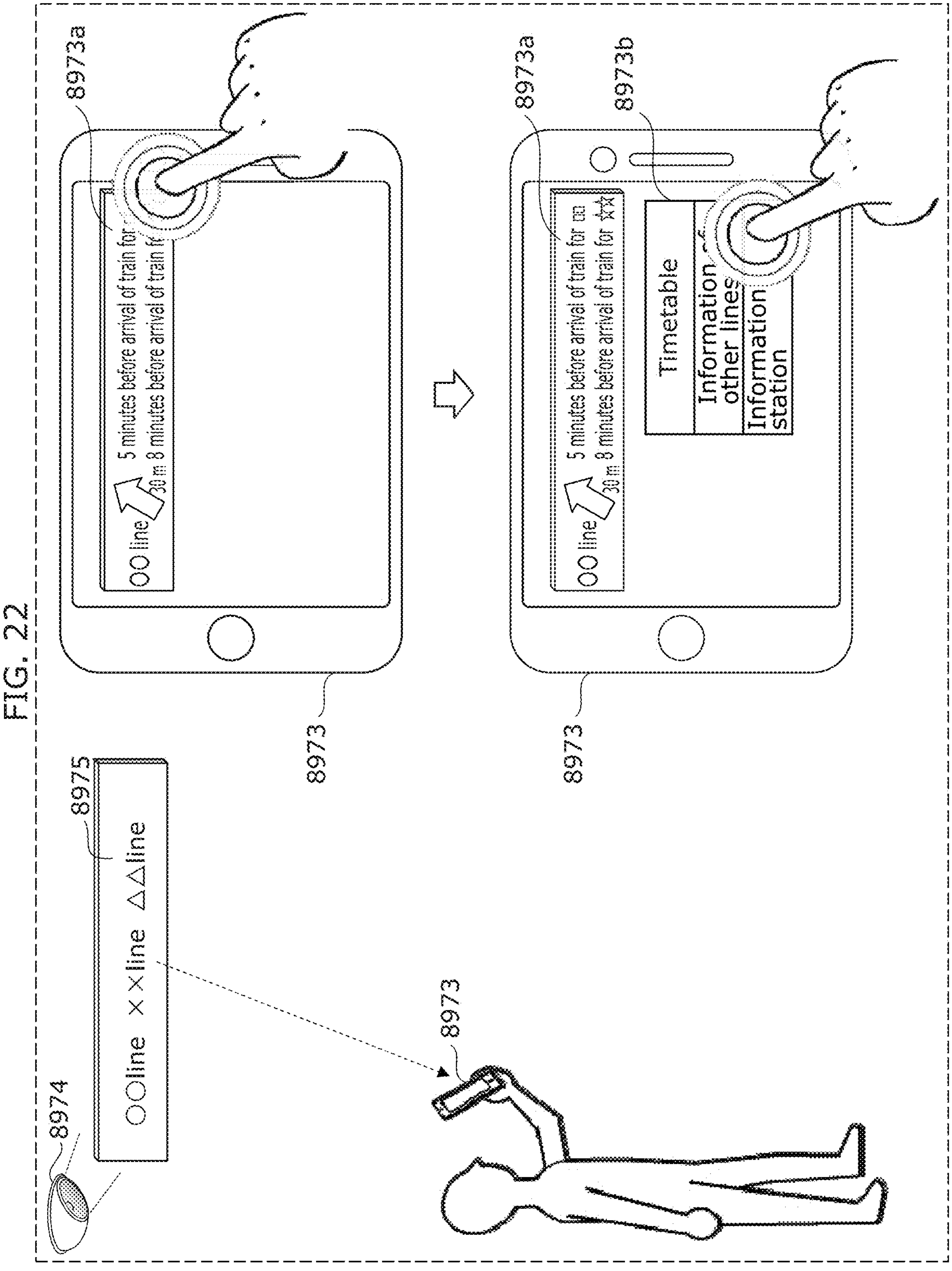
FIG. 22 is a diagram illustrating an example of application of a transmitter and a receiver in Embodiment 2.

FIG. 22 is a diagram illustrating an example of application of a transmitter and a receiver in Embodiment 2.

A lighting device 8974 has a function as a transmitter in each of the above embodiments. The lighting device 8974 illuminates, for example, a line guide sign 8975 in a train station, while changing in luminance. A receiver 8973 pointed at the line guide sign 8975 by the user captures the line guide sign 8975. The receiver 8973 thus obtains the ID of the line guide sign 8975, and obtains information associated with the ID, i.e. detailed information of each line shown in the line guide sign 8975. The receiver 8973 displays a guide image 8973$a$ indicating the detailed information. For example, the guide image 8973$a$ indicates the distance to the line shown in the line guide sign 8975, the direction to the line, and the time of arrival of the next train on the line.

When the user touches the guide image 8973$a$, the receiver 8973 displays a supplementary guide image 8973$b$. For instance, the supplementary guide image 8973$b$ is an image for displaying any of a train timetable, information about lines other than the line shown by the guide image 8973$a$, and detailed information of the station, according to selection by the user.

Embodiment 3

Here, an example of application of audio synchronous reproduction is described below.

Figure 23:
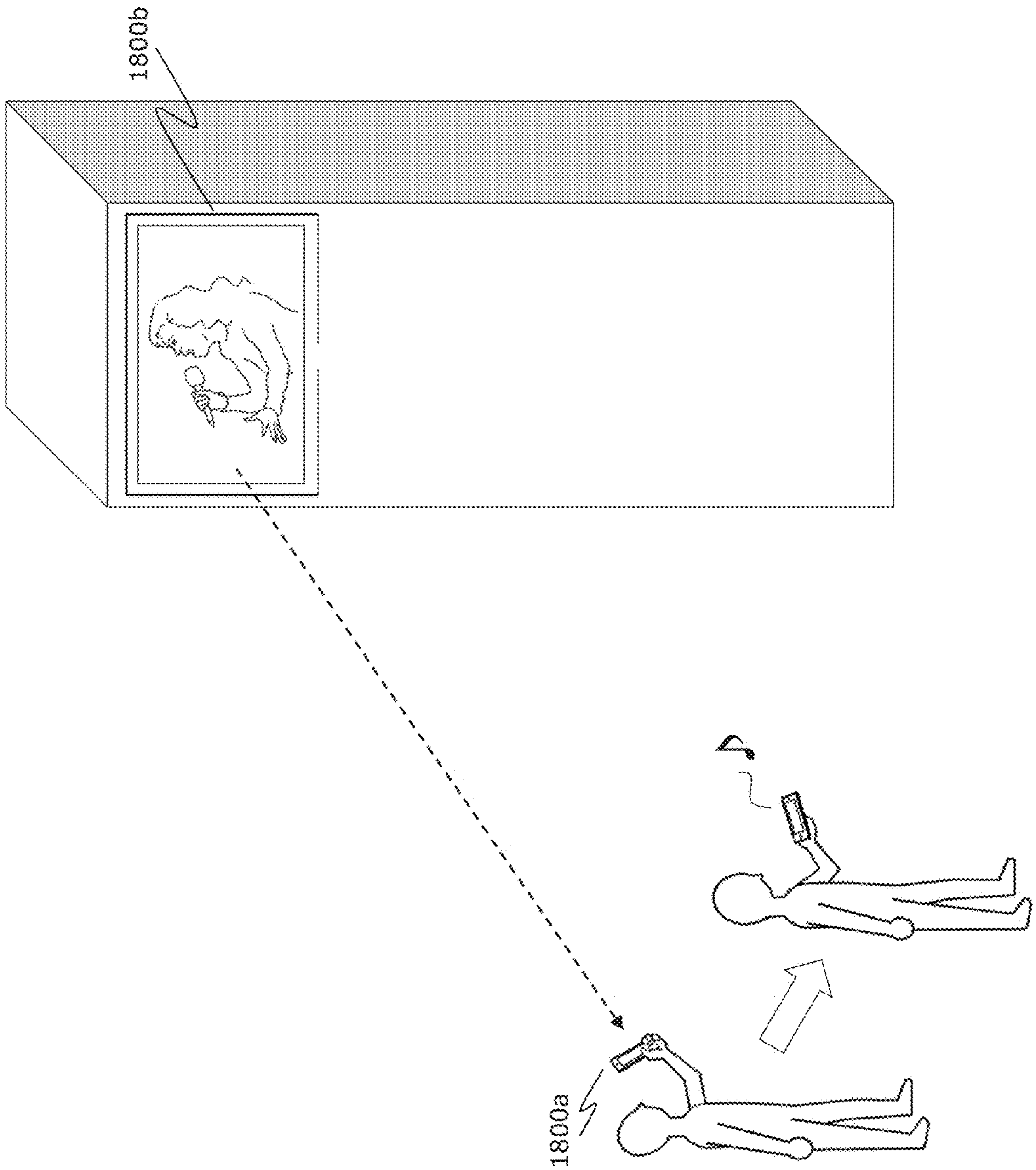
FIG. 23 is a diagram illustrating an example of an application in Embodiment 3.

FIG. 23 is a diagram illustrating an example of an application in Embodiment 3.

A receiver 1800$a$ such as a smartphone receives a signal (a visible light signal) transmitted from a transmitter 1800$b$ such as a street digital signage. This means that the receiver 1800$a$ receives a timing of image reproduction performed by the transmitter 1800$b$. The receiver 1800$a$ reproduces audio at the same timing as the image reproduction. In other words, in order that an image and audio reproduced by the transmitter 1800$b$ are synchronized, the receiver 1800$a$ performs synchronous reproduction of the audio. Note that the receiver 1800$a$ may reproduce, together with the audio, the same image as the image reproduced by the transmitter 1800$b$ (the reproduced image), or a related image that is related to the reproduced image. Furthermore, the receiver 1800$a$ may cause a device connected to the receiver 1800$a$ to reproduce audio, etc. Furthermore, after receiving a visible light signal, the receiver 1800$a$ may download, from the server, content such as the audio or related image associated with the visible light signal. The receiver 1800$a$ performs synchronous reproduction after the downloading.

This allows a user to hear audio that is in line with what is displayed by the transmitter 1800$b$, even when audio from the transmitter 1800$b$ is inaudible or when audio is not reproduced from the transmitter 1800$b$ because audio reproduction on the street is prohibited. Furthermore, audio in line with what is displayed can be heard even in such a distance that time is needed for audio to reach.

Here, multilingualization of audio synchronous reproduction is described below.

Figure 24:
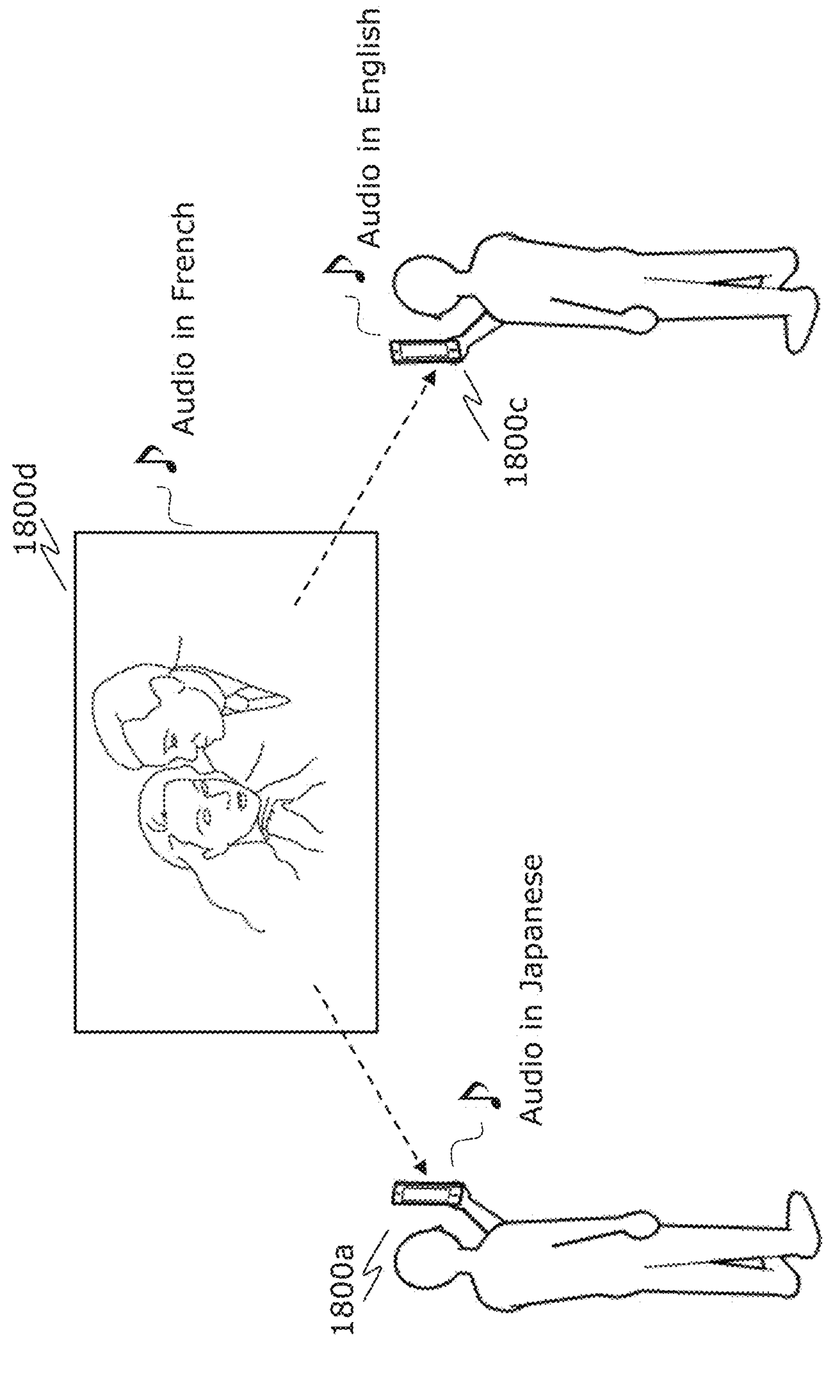
FIG. 24 is a diagram illustrating an example of an application in Embodiment 3.

FIG. 24 is a diagram illustrating an example of an application in Embodiment 3.

Each of the receiver 1800$a$ and a receiver 1800$c$ obtains, from the server, audio that is in the language preset in the receiver itself and corresponds, for example, to images, such as a movie, displayed on the transmitter 1800$d$, and reproduces the audio. Specifically, the transmitter 1800$d$ transmits, to the receiver, a visible light signal indicating an ID for identifying an image that is being displayed. The receiver receives the visible light signal and then transmits, to the server, a request signal including the ID indicated by the visible light signal and a language preset in the receiver itself. The receiver obtains audio corresponding to the request signal from the server, and reproduces the audio. This allows a user to enjoy a piece of work displayed on the transmitter 1800$d$, in the language preset by the user themselves.

Here, an audio synchronization method is described below.

Figure 25:
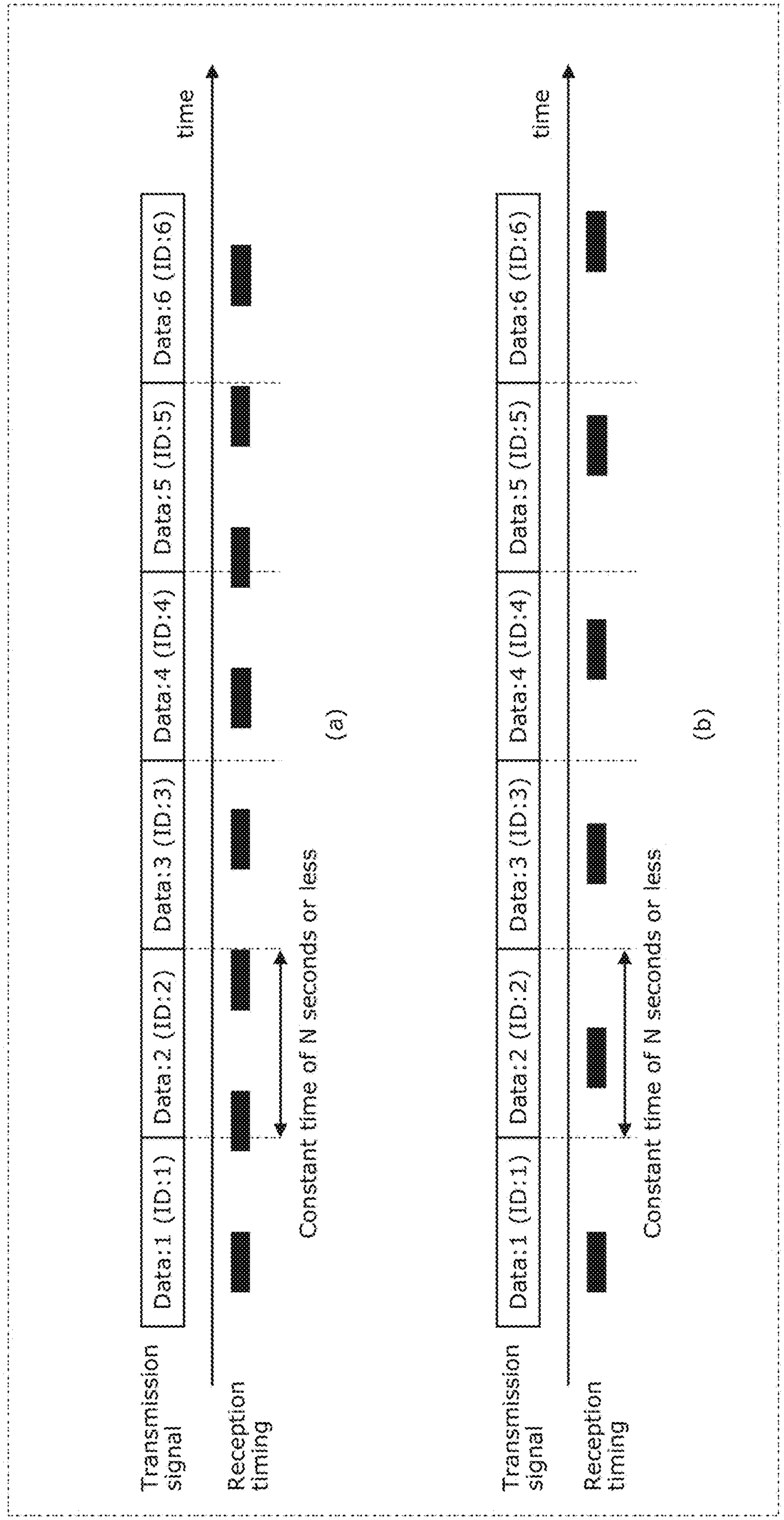
FIG. 25 is a diagram illustrating an example of a transmission signal and an example of an audio synchronization method in Embodiment 3.
Figure 26:
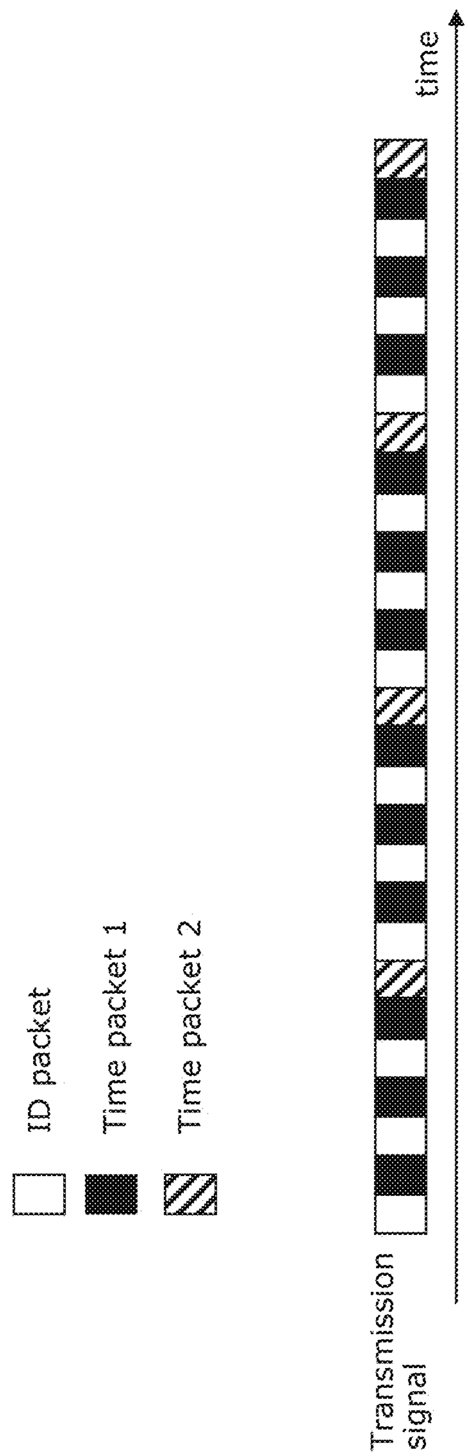
FIG. 26 is a diagram illustrating an example of a transmission signal in Embodiment 3.

FIG. 25 and FIG. 26 are diagrams illustrating an example of a transmission signal and an example of an audio synchronization method in Embodiment 3.

Mutually different data items (for example, data 1 to data 6 in FIG. 25) are associated with time points which are at a regular interval of predetermined time (N seconds). These data items may be an ID for identifying time, or may be time, or may be audio data (for example, data of 64 Kbps), for example. The following description is based on the premise that the data is an ID. Mutually different IDs may be ones accompanied by different additional information parts.

It is desirable that packets including IDs be different. Therefore, IDs are desirably not continuous. Alternatively, in packetizing IDs, it is desirable to adopt a packetizing method in which non-continuous parts are included in one packet. An error correction signal tends to have a different pattern even with continuous IDs, and therefore, error correction signals may be dispersed and included in plural packets, instead of being collectively included in one packet.

The transmitter 1800*d* transmits an ID at a point of time at which an image that is being displayed is reproduced, for example. The receiver is capable of recognizing a reproduction time point (a synchronization time point) of an image displayed on the transmitter 1800*d*, by detecting a timing at which the ID is changed.

In the case of (a), a point of time at which the ID changes from ID:1 to ID:2 is received, with the result that a synchronization time point can be accurately recognized.

When the duration N in which an ID is transmitted is long, such an occasion is rare, and there is a case where an ID is received as in (b). Even in this case, a synchronization time point can be recognized in the following method.

(b1) Assume a midpoint of a reception section in which the ID changes, to be an ID change point. Furthermore, a time point after an integer multiple of the duration N elapses from the ID change point estimated in the past is also estimated as an ID change point, and a midpoint of plural ID change points is estimated as a more accurate ID change point. It is possible to estimate an accurate ID change point gradually by such an algorithm of estimation.

(b2) In addition to the above condition, assume that no ID change point is included in the reception section in which the ID does not change and at a time point after an integer multiple of the duration N elapses from the reception section, gradually reducing sections in which there is a possibility that the ID change point is included, so that an accurate ID change point can be estimated.

When N is set to 0.5 seconds or less, the synchronization can be accurate.

When N is set to 2 seconds or less, the synchronization can be performed without a user feeling a delay.

When N is set to 10 seconds or less, the synchronization can be performed while ID waste is reduced.

FIG. 26 is a diagram illustrating an example of a transmission signal in Embodiment 3.

In FIG. 26, the synchronization is performed using a time packet so that the ID waste can be avoided. The time packet is a packet that holds a point of time at which the signal is transmitted. When a long time section needs to be expressed, the time packet is divided to include a time packet 1 representing a finely divided time section and a time packet 2 representing a roughly divided time section. For example, the time packet 2 indicates the hour and the minute of a time point, and the time packet 1 indicates only the second of the time point. A packet indicating a time point may be divided into three or more time packets. Since a roughly divided time section is not so necessary, a finely divided time packet is transmitted more than a roughly divided time packet, allowing the receiver to recognize a synchronization time point quickly and accurately.

This means that in this embodiment, the visible light signal indicates the time point at which the visible light signal is transmitted from the transmitter 1800*d*, by including second information (the time packet 2) indicating the hour and the minute of the time point, and first information (the time packet 1) indicating the second of the time point. The receiver 1800*a* then receives the second information, and receives the first information a greater number of times than a total number of times the second information is received.

Here, synchronization time point adjustment is described below.

Figure 27:
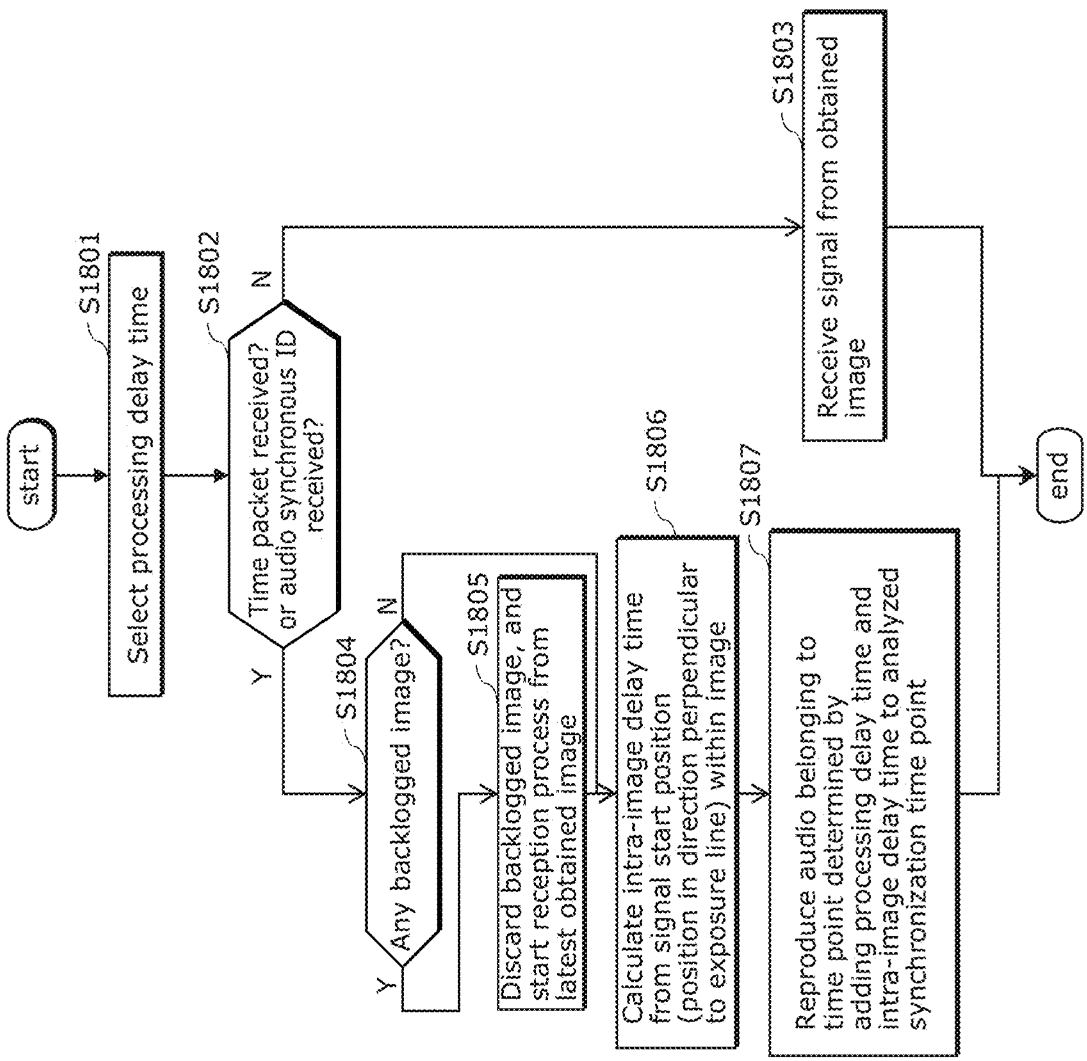
FIG. 27 is a diagram illustrating an example of a process flow of a receiver in Embodiment 3.

FIG. 27 is a diagram illustrating an example of a process flow of the receiver 1800*a* in Embodiment 3.

After a signal is transmitted, a certain amount of time is needed before audio or video is reproduced as a result of processing on the signal in the receiver 1800*a*. Therefore, this processing time is taken into consideration in performing a process of reproducing audio or video so that synchronous reproduction can be accurately performed.

First, processing delay time is selected in the receiver 1800*a* (Step S1801). This may have been held in a processing program or may be selected by a user. When a user makes correction, more accurate synchronization for each receiver can be realized. This processing delay time can be changed for each model of receiver or according to the temperature or CPU usage rate of the receiver so that synchronization is more accurately performed.

The receiver 1800*a* determines whether or not any time packet has been received or whether or not any ID associated for audio synchronization has been received (Step S1802). When the receiver 1800*a* determines that any of these has been received (Step S1802: Y), the receiver 1800*a* further determines whether or not there is any backlogged image (Step S1804). When the receiver 1800*a* determines that there is a backlogged image (Step S1804: Y), the receiver 1800*a* discards the backlogged image, or postpones processing on the backlogged image and starts a reception process from the latest obtained image (Step S1805). With this, unexpected delay due to a backlog can be avoided.

The receiver 1800*a* performs measurement to find out a position of the visible light signal (specifically, a bright line) in an image (Step S1806). More specifically, in relation to the first exposure line in the image sensor, a position where the signal appears in a direction perpendicular to the exposure lines is found by measurement, to calculate a difference in time between a point of time at which image obtainment starts and a point of time at which the signal is received (intra-image delay time).

The receiver 1800*a* is capable of accurately performing synchronous reproduction by reproducing audio or video belonging to a time point determined by adding processing delay time and intra-image delay time to the recognized synchronization time point (Step S1807).

When the receiver 1800*a* determines in Step S1802 that the time packet or audio synchronous ID has not been received, the receiver 1800*a* receives a signal from a captured image (Step S1803).

Figure 28:
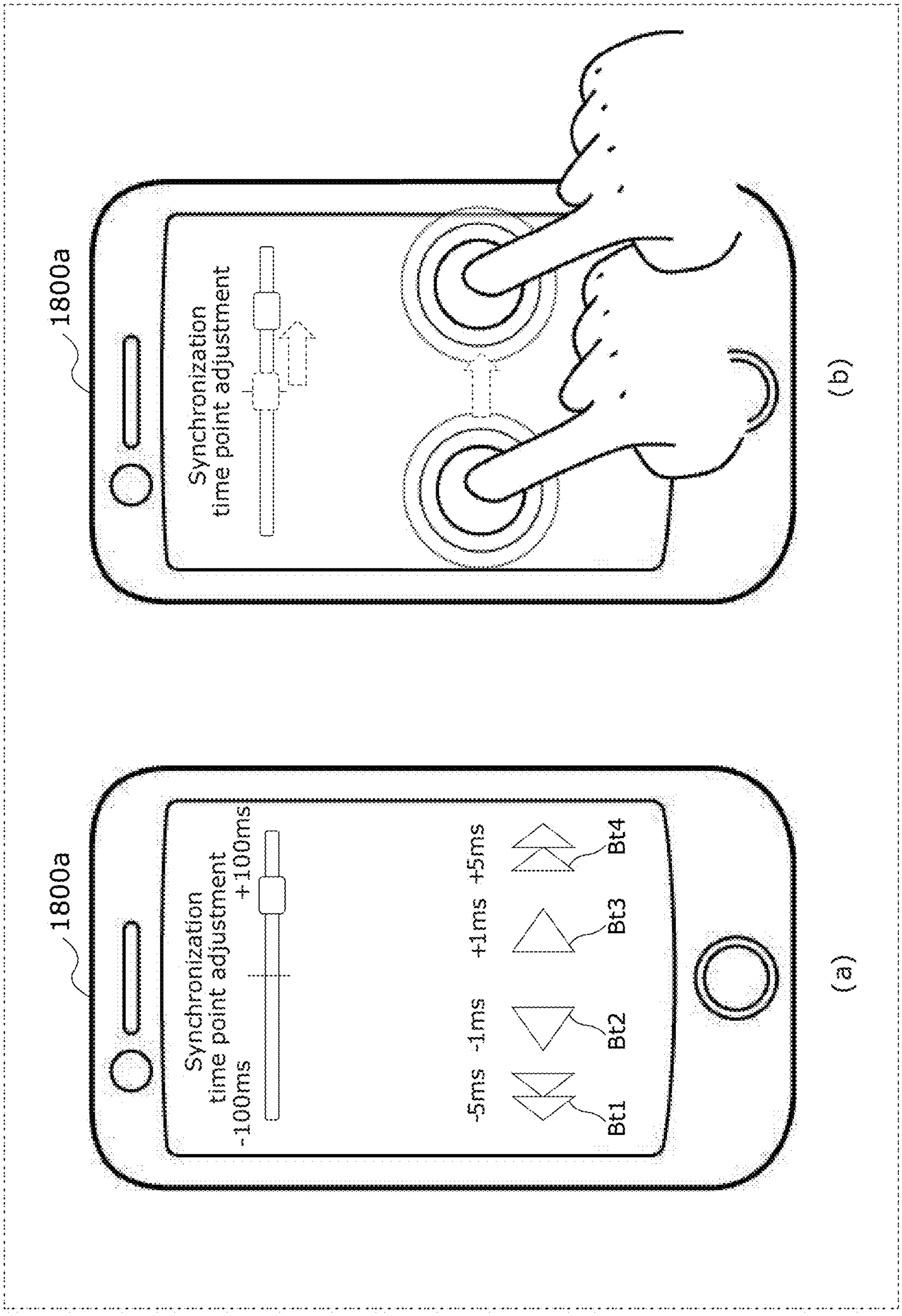
FIG. 28 is a diagram illustrating an example of a user interface of a receiver in Embodiment 3.

FIG. 28 is a diagram illustrating an example of a user interface of the receiver 1800*a* in Embodiment 3.

As illustrated in (a) of FIG. 28, a user can adjust the above-described processing delay time by pressing any of buttons Bt1 to Bt4 displayed on the receiver 1800*a*. Furthermore, the processing delay time may be set with a swipe gesture as in (b) of FIG. 28. With this, the synchronous reproduction can be more accurately performed based on user's sensory feeling.

Next, reproduction by earphone limitation is described below.

Figure 29:
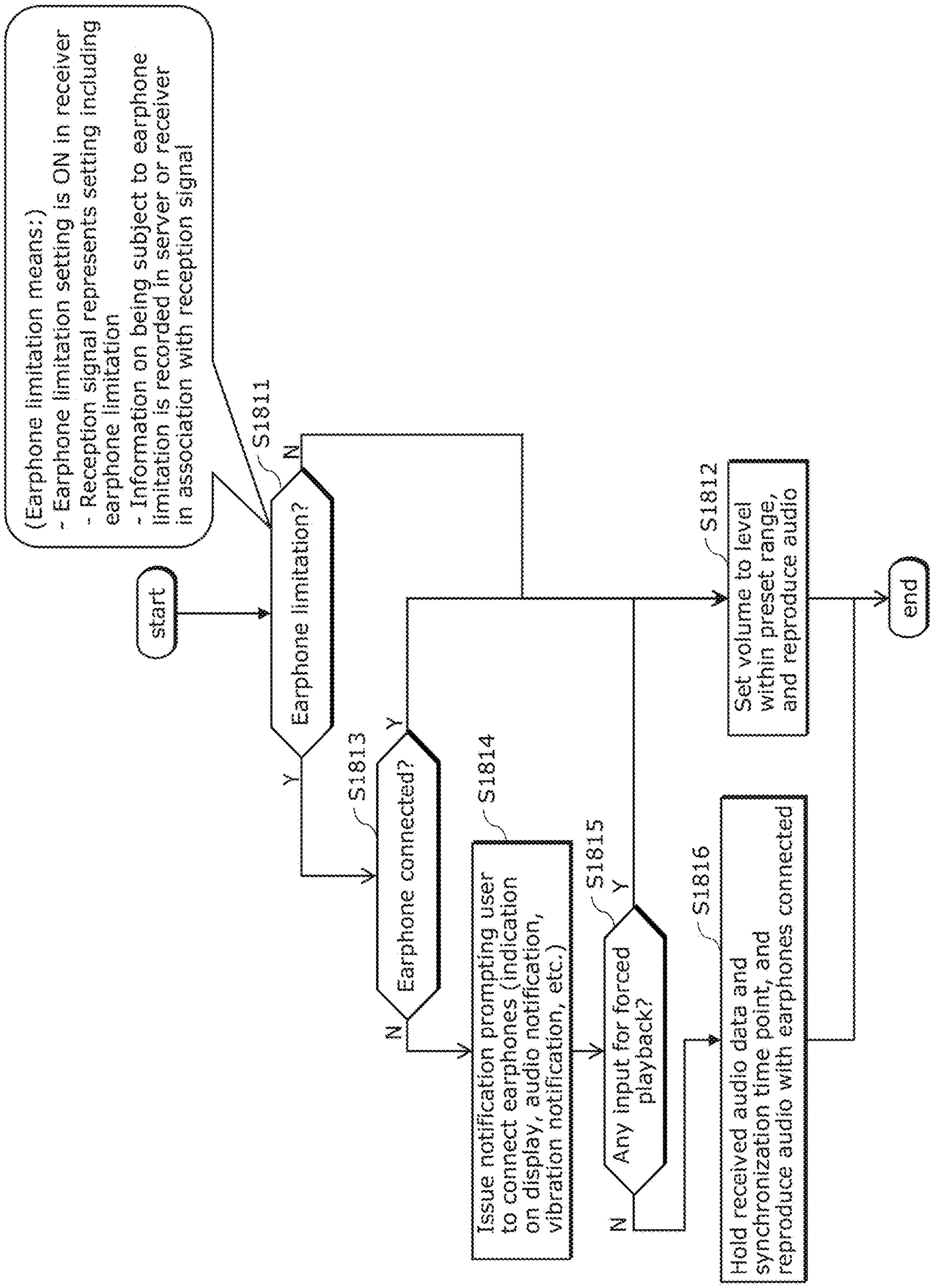
FIG. 29 is a diagram illustrating an example of a process flow of a receiver in Embodiment 3.

FIG. 29 is a diagram illustrating an example of a process flow of the receiver 1800*a* in Embodiment 3.

The reproduction by earphone limitation in this process flow makes it possible to reproduce audio without causing trouble to others in surrounding areas.

The receiver 1800*a* checks whether or not the setting for earphone limitation is ON (Step S1811). In the case where the setting for earphone limitation is ON, the receiver 1800*a* has been set to the earphone limitation, for example. Alternatively, the received signal (visible light signal) includes the setting for earphone limitation. Yet another case is that information indicating that earphone limitation is ON is recorded in the server or the receiver 1800*a* in association with the received signal.

When the receiver 1800*a* confirms that the earphone limitation is ON (Step S1811: Y), the receiver 1800*a* determines whether or not an earphone is connected to the receiver 1800*a* (Step S1813).

When the receiver 1800*a* confirms that the earphone limitation is OFF (Step S1811: N) or determines that an earphone is connected (Step S1813: Y), the receiver 1800*a* reproduces audio (Step S1812). Upon reproducing audio, the receiver 1800*a* adjusts a volume of the audio so that the volume is within a preset range. This preset range is set in the same manner as with the setting for earphone limitation.

When the receiver 1800*a* determines that no earphone is connected (Step S1813: N), the receiver 1800*a* issues notification prompting a user to connect an earphone (Step S1814). This notification is issued in the form of, for example, an indication on the display, audio output, or vibration.

Furthermore, when a setting which prohibits forced audio playback has not been made, the receiver 1800*a* prepares an interface for forced playback, and determines whether or not a user has made an input for forced playback (Step S1815). Here, when the receiver 1800*a* determines that a user has made an input for forced playback (Step S1815: Y), the receiver 1800*a* reproduces audio even when no earphone is connected (Step S1812).

When the receiver 1800*a* determines that a user has not made an input for forced playback (Step S1815: N), the receiver 1800*a* holds previously received audio data and an analyzed synchronization time point, so as to perform synchronous audio reproduction immediately after an earphone is connected thereto.

Figure 30:
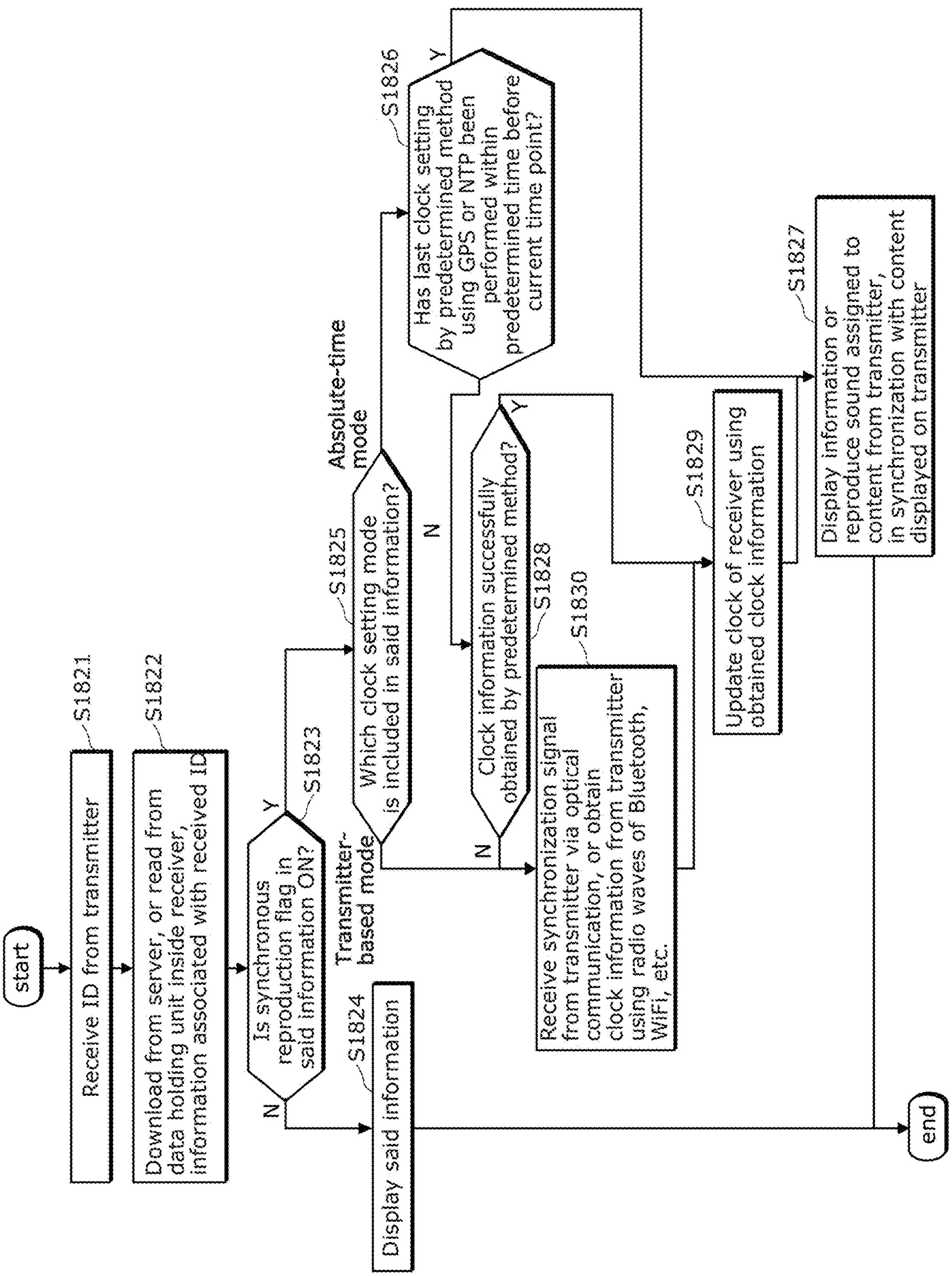
FIG. 30 is a diagram illustrating another example of a process flow of a receiver in Embodiment 3.

FIG. 30 is a diagram illustrating another example of a process flow of the receiver 1800*a* in Embodiment 3.

The receiver 1800*a* first receives an ID from the transmitter 1800*d* (Step S1821). Specifically, the receiver 1800*a* receives a visible light signal indicating an ID of the transmitter 1800*d* or an ID of content that is being displayed on the transmitter 1800*d*.

Next, the receiver 1800*a* downloads, from the server, information (content) associated with the received ID (Step S1822). Alternatively, the receiver 1800*a* reads the information from a data holding unit included in the receiver 1800*a*. Hereinafter, this information is referred to as related information.

Next, the receiver 1800*a* determines whether or not a synchronous reproduction flag included in the related information represents ON (Step S1823). When the receiver 1800*a* determines that the synchronous reproduction flag does not represent ON (Step S1823: N), the receiver 1800*a* outputs content indicated in the related information (Step S1824). Specifically, when the content is an image, the receiver 1800*a* displays the image, and when the content is audio, the receiver 1800*a* outputs the audio.

When the receiver 1800*a* determines that the synchronous reproduction flag represents ON (Step S1823: Y), the receiver 1800*a* further determines whether a clock setting mode included in the related information has been set to a transmitter-based mode or an absolute-time mode (Step S1825). When the receiver 1800*a* determines that the clock setting mode has been set to the absolute-time mode, the receiver 1800*a* determines whether or not the last clock setting has been performed within a predetermined time before the current time point (Step S1826). This clock setting is a process of obtaining clock information by a predetermined method and setting time of a clock included in the receiver 1800*a* to the absolute time of a reference clock using the clock information. The predetermined method is, for example, a method using global positioning system (GPS) radio waves or network time protocol (NTP) radio waves. Note that the above-mentioned current time point may be a point of time at which a terminal device, that is, the receiver 1800*a*, received a visible light signal.

When the receiver 1800*a* determines that the last clock setting has been performed within the predetermined time (Step S1826: Y), the receiver 1800*a* outputs the related information based on time of the clock of the receiver 1800*a*, thereby synchronizing content to be displayed on the transmitter 1800*d* with the related information (Step S1827). When content indicated in the related information is, for example, moving images, the receiver 1800*a* displays the moving images in such a way that they are in synchronization with content that is displayed on the transmitter 1800*d*. When content indicated in the related information is, for example, audio, the receiver 1800*a* outputs the audio in such a way that it is in synchronization with content that is displayed on the transmitter 1800*d*. For example, when the related information indicates audio, the related information includes frames that constitute the audio, and each of these frames is assigned with a time stamp. The receiver 1800*a* outputs audio in synchronization with content from the transmitter 1800*d* by reproducing a frame assigned with a time stamp corresponding to time of the own clock.

When the receiver 1800*a* determines that the last clock setting has not been performed within the predetermined time (Step S1826: N), the receiver 1800*a* attempts to obtain clock information by a predetermined method, and determines whether or not the clock information has been successfully obtained (Step S1828). When the receiver 1800*a* determines that the clock information has been successfully obtained (Step S1828: Y), the receiver 1800*a* updates time of the clock of the receiver 1800*a* using the clock information (Step S1829). The receiver 1800*a* then performs the above-described process in Step S1827.

Furthermore, when the receiver 1800*a* determines in Step S1825 that the clock setting mode is the transmitter-based mode or when the receiver 1800*a* determines in Step S1828 that the clock information has not been successfully obtained (Step S1828: N), the receiver 1800*a* obtains clock information from the transmitter 1800*d* (Step S1830), Specifically, the receiver 1800*a* obtains a synchronization signal, that is, clock information, from the transmitter 1800*d* by visible light communication. For example, the synchronization signal is the time packet 1 and the time packet 2 illustrated in FIG. 26. Alternatively, the receiver 1800*a* receives clock information from the transmitter 1800*d* via radio waves of Bluetooth®, Wi-Fi, or the like. The receiver 1800*a* then performs the above-described processes in Step S1829 and Step S1827.

In this embodiment, as in Step S1829 and Step S1830, when a point of time at which the process for synchronizing the clock of the terminal device, i.e., the receiver 1800*a*, with the reference clock (the clock setting) is performed using GPS radio waves or NTP radio waves is at least a predetermined time before a point of time at which the terminal device receives a visible light signal, the clock of the terminal device is synchronized with the clock of the transmitter using a time point indicated in the visible light signal transmitted from the transmitter 1800*d*. With this, the terminal device is capable of reproducing content (video or audio) at a timing of synchronization with transmitter-side content that is reproduced on the transmitter 1800*d*.

FIG. 31A is a diagram for describing a specific method of synchronous reproduction in Embodiment 3. As a method of the synchronous reproduction, there are methods a toe illustrated in FIG. 31A.

(Method a)

In the method a, the transmitter 1800*d* outputs a visible light signal indicating a content ID and an ongoing content reproduction time point, by changing luminance of the display as in the case of the above embodiments. The ongoing content reproduction time point is a reproduction time point for data that is part of the content and is being reproduced by the transmitter 1800*d* when the content ID is transmitted from the transmitter 1800*d*. When the content is video, the data is a picture, a sequence, or the like included in the video. When the content is audio, the data is a frame or the like included in the audio. The reproduction time point indicates, for example, time of reproduction from the beginning of the content as a time point. When the content is video, the reproduction time point is included in the content as a presentation time stamp (PTS). This means that content includes, for each data included in the content, a reproduction time point (a display time point) of the data.

The receiver 1800*a* receives the visible light signal by capturing an image of the transmitter 1800*d* as in the case of the above embodiments. The receiver 1800*a* then transmits to a server 1800*f* a request signal including the content ID indicated in the visible light signal. The server 1800*f* receives the request signal and transmits, to the receiver 1800*a*, content that is associated with the content ID included in the request signal.

The receiver 1800*a* receives the content and reproduces the content from a point of time of (the ongoing content reproduction time point+elapsed time since ID reception). The elapsed time since ID reception is time elapsed since the content ID is received by the receiver 1800*a*.

(Method b)

In the method b, the transmitter 1800*d* outputs a visible light signal indicating a content ID and an ongoing content reproduction time point, by changing luminance of the display as in the case of the above embodiments. The receiver 1800*a* receives the visible light signal by capturing an image of the transmitter 1800*d* as in the case of the above embodiments. The receiver 1800*a* then transmits to the server 1800*f* a request signal including the content ID and the ongoing content reproduction time point indicated in the visible light signal. The server 1800*f* receives the request signal and transmits, to the receiver 1800*a*, only partial content belonging to a time point on and after the ongoing content reproduction time point, among content that is associated with the content ID included in the request signal.

The receiver 1800*a* receives the partial content and reproduces the partial content from a point of time of (elapsed time since ID reception).

(Method c)

In the method c, the transmitter 1800*d* outputs a visible light signal indicating a transmitter ID and an ongoing content reproduction time point, by changing luminance of the display as in the case of the above embodiments. The transmitter ID is information for identifying a transmitter.

The receiver 1800*a* receives the visible light signal by capturing an image of the transmitter 1800*d* as in the case of the above embodiments. The receiver 1800*a* then transmits to the server 1800*f* a request signal including the transmitter ID indicated in the visible light signal.

The server 1800*f* holds, for each transmitter ID, a reproduction schedule which is a time table of content to be reproduced by a transmitter having the transmitter ID. Furthermore, the server 1800*f* includes a clock. The server 1800*f* receives the request signal and refers to the reproduction schedule to identify, as content that is being reproduced, content that is associated with the transmitter ID included in the request signal and time of the clock of the server 1800*f* (a server time point). The server 1800*f* then transmits the content to the receiver 1800*a*.

The receiver 1800*a* receives the content and reproduces the content from a point of time of (the ongoing content reproduction time point+elapsed time since ID reception).

(Method d)

In the method d, the transmitter 1800*d* outputs a visible light signal indicating a transmitter ID and a transmitter time point, by changing luminance of the display as in the case of the above embodiments. The transmitter time point is time indicated by the clock included in the transmitter 1800*d*.

The receiver 1800*a* receives the visible light signal by capturing an image of the transmitter 1800*d* as in the case of the above embodiments. The receiver 1800*a* then transmits to the server 1800*f* a request signal including the transmitter ID and the transmitter time point indicated in the visible light signal.

The server 1800*f* holds the above-described reproduction schedule. The server 1800*f* receives the request signal and refers to the reproduction schedule to identify, as content that is being reproduced, content that is associated with the transmitter ID and the transmitter time point included in the request signal. Furthermore, the server 1800*f* identifies an ongoing content reproduction time point based on the transmitter time point. Specifically, the server 1800*f* finds a reproduction start time point of the identified content from the reproduction schedule, and identifies, as an ongoing content reproduction time point, time between the transmitter time point and the reproduction start time point. The server 1800*f* then transmits the content and the ongoing content reproduction time point to the receiver 1800*a*.

The receiver 1800*a* receives the content and the ongoing content reproduction time point, and reproduces the content from a point of time of (the ongoing content reproduction time point+elapsed time since ID reception).

Thus, in this embodiment, the visible light signal indicates a time point at which the visible light signal is transmitted from the transmitter 1800*d*. Therefore, the terminal device, i.e., the receiver 1800*a*, is capable of receiving content associated with a time point at which the visible light signal is transmitted from the transmitter 1800*d* (the transmitter time point). For example, when the transmitter time point is 5:43, content that is reproduced at 5:43 can be received.

Furthermore, in this embodiment, the server 1800*f* has a plurality of content items associated with respective time points. However, there is a case where the content associated with the time point indicated in the visible light signal is not present. In this case, the terminal device, i.e., the receiver 1800*a*, may receive, among the plurality of content items, content associated with a time point that is closest to the time point indicated in the visible light signal and after the time point indicated in the visible light signal. This makes it possible to receive appropriate content among the plurality of content items in the server 1800*f* even when content associated with a time point indicated in the visible light signal is not present.

Furthermore, a reproduction method in this embodiment includes: receiving a visible light signal by a sensor of a receiver 1800*a* (the terminal device) from the transmitter

1800*d* which transmits the visible light signal by a light source changing in luminance; transmitting a request signal for requesting content associated with the visible light signal, from the receiver 1800*a* to the server 1800*f*; receiving, by the receiver 1800*a*, the content from the server 1800*f*; and reproducing the content. The visible light signal indicates a transmitter ID and a transmitter time point. The transmitter ID is ID information. The transmitter time point is time indicated by the clock of the transmitter 1800*d* and is a point of time at which the visible light signal is transmitted from the transmitter 1800*d*. In the receiving of content, the receiver 1800*a* receives content associated with the transmitter ID and the transmitter time point indicated in the visible light signal. This allows the receiver 1800*a* to reproduce appropriate content for the transmitter ID and the transmitter time point.

(Method e)

In the method e, the transmitter 1800*d* outputs a visible light signal indicating a transmitter ID, by changing luminance of the display as in the case of the above embodiments.

The receiver 1800*a* receives the visible light signal by capturing an image of the transmitter 1800*d* as in the case of the above embodiments. The receiver 1800*a* then transmits to the server 1800*f* a request signal including the transmitter ID indicated in the visible light signal.

The server 1800*f* holds the above-described reproduction schedule, and further includes a clock. The server 1800*f* receives the request signal and refers to the reproduction schedule to identify, as content that is being reproduced, content that is associated with the transmitter ID included in the request signal and a server time point. Note that the server time point is time indicated by the clock of the server 1800*f*. Furthermore, the server 1800*f* finds a reproduction start time point of the identified content from the reproduction schedule as well. The server 1800*f* then transmits the content and the content reproduction start time point to the receiver 1800*a*.

The receiver 1800*a* receives the content and the content reproduction start time point, and reproduces the content from a point of time of (a receiver time point−the content reproduction start time point). Note that the receiver time point is time indicated by a clock included in the receiver 1800*a*.

Thus, a reproduction method in this embodiment includes: receiving a visible light signal by a sensor of the receiver 1800*a* (the terminal device) from the transmitter 1800*d* which transmits the visible light signal by a light source changing in luminance; transmitting a request signal for requesting content associated with the visible light signal, from the receiver 1800*a* to the server 1800*f*; receiving, by the receiver 1800*a*, content including time points and data to be reproduced at the time points, from the server 1800*f*; and reproducing data included in the content and corresponding to time of a clock included in the receiver 1800*a*. Therefore, the receiver 1800*a* avoids reproducing data included in the content, at an incorrect point of time, and is capable of appropriately reproducing the data at a correct point of time indicated in the content. Furthermore, when content related to the above content (the transmitter-side content) is also reproduced on the transmitter 1800*d*, the receiver 1800*a* is capable of appropriately reproducing the content in synchronization with the transmitter-side content.

Note that even in the above methods c to e, the server 1800*f* may transmit, among the content, only partial content belonging to a time point on and after the ongoing content reproduction time point to the receiver 1800*a* as in method b.

Furthermore, in the above methods a to e, the receiver 1800*a* transmits the request signal to the server 1800*f* and receives necessary data from the server 1800*f*, but may skip such transmission and reception by holding the data in the server 1800*f* in advance.

Figure 31C:
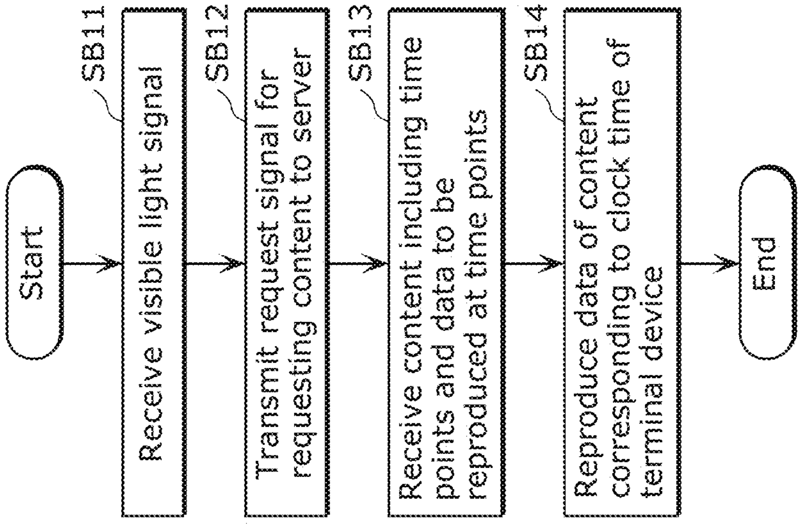
FIG. 31C is a flowchart illustrating processing operation of a reproduction apparatus (a receiver) which performs synchronous reproduction in Embodiment 3.
Figure 31B:
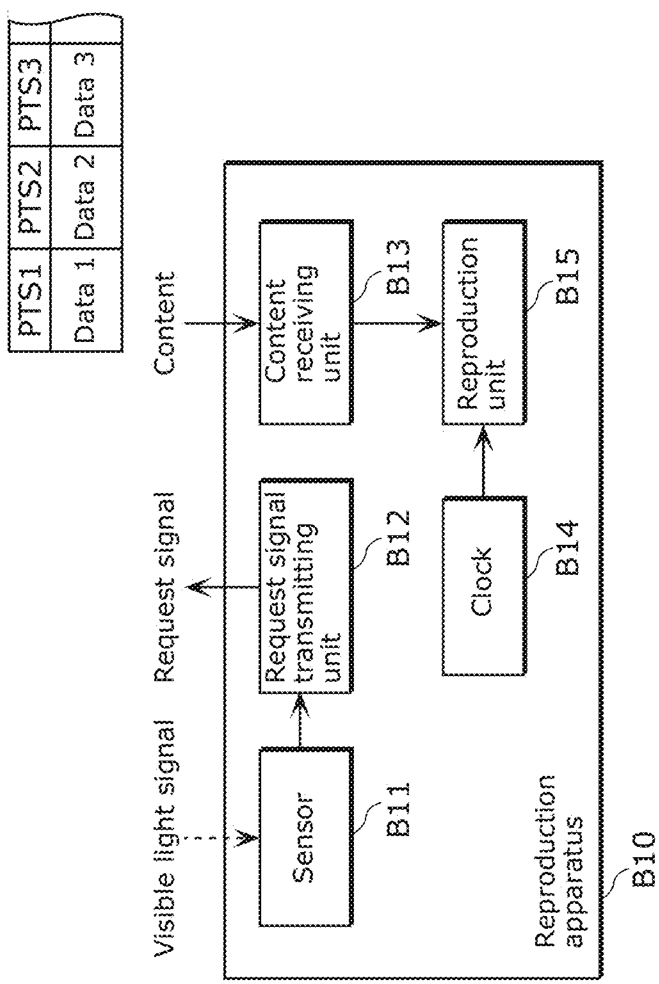
FIG. 31B is a block diagram illustrating a configuration of a reproduction apparatus (a receiver) which performs synchronous reproduction in Embodiment 3.

FIG. 31B is a block diagram illustrating a configuration of a reproduction apparatus which performs synchronous reproduction in the above-described method e.

A reproduction apparatus B10 is the receiver 1800*a* or the terminal device which performs synchronous reproduction in the above-described method e, and includes a sensor B11, a request signal transmitting unit B12, a content receiving unit B13, a clock B14, and a reproduction unit B15.

The sensor B11 is, for example, an image sensor, and receives a visible light signal from the transmitter 1800*d* which transmits the visible light signal by the light source changing in luminance. The request signal transmitting unit B12 transmits to the server 1800*f* a request signal for requesting content associated with the visible light signal. The content receiving unit B13 receives from the server 1800*f* content including time points and data to be reproduced at the time points. The reproduction unit B15 reproduces data included in the content and corresponding to time of the clock B14.

FIG. 31C is flowchart illustrating processing operation of the terminal device which performs synchronous reproduction in the above-described method e.

The reproduction apparatus B10 is the receiver 1800*a* or the terminal device which performs synchronous reproduction in the above-described method e, and performs processes in Step SB11 to Step SB15.

In Step SB11, a visible light signal is received from the transmitter 1800*d* which transmits the visible light signal by the light source changing in luminance. In Step SB12, a request signal for requesting content associated with the visible light signal is transmitted to the server 1800*f*. In Step SB13, content including time points and data to be reproduced at the time points is received from the server 1800*f*. In Step SB15, data included in the content and corresponding to time of the clock B14 is reproduced.

Thus, in the reproduction apparatus B10 and the reproduction method in this embodiment, data in the content is not reproduced at an incorrect time point and is able to be appropriately reproduced at a correct time point indicated in the content.

Note that in this embodiment, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. A software which implements the reproduction apparatus B10, etc., in this embodiment is a program which causes a computer to execute steps included in the flowchart illustrated in FIG. 31C.

Figure 32:
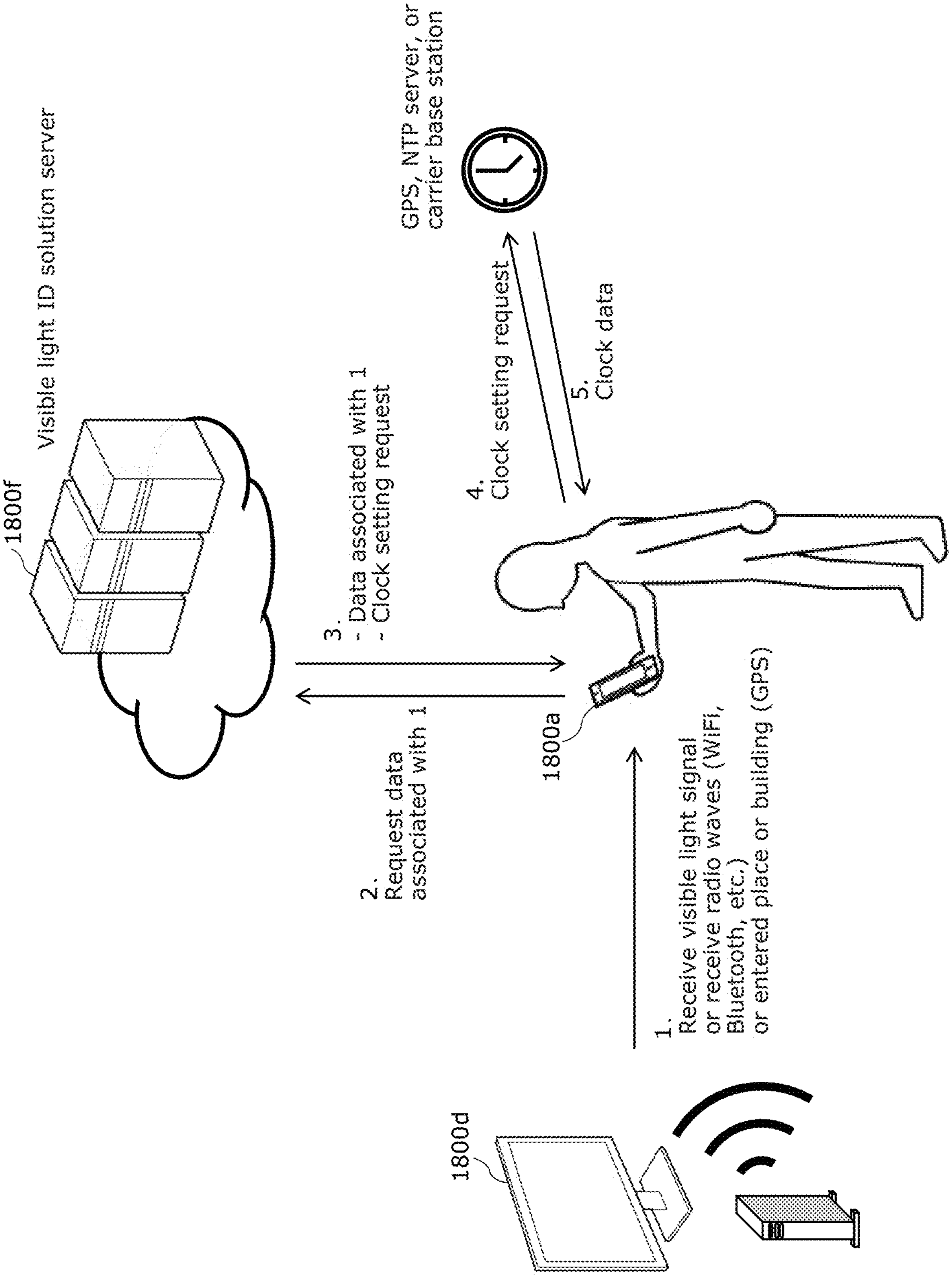
FIG. 32 is a diagram for describing advance preparation of synchronous reproduction in Embodiment 3.

FIG. 32 is a diagram for describing advance preparation of synchronous reproduction in Embodiment 3.

The receiver 1800*a* performs, in order for synchronous reproduction, clock setting for setting a clock included in the receiver 1800*a* to time of the reference clock. The receiver 1800*a* performs the following processes (1) to (5) for this clock setting.

(1) The receiver 1800*a* receives a signal. This signal may be a visible light signal transmitted by the display of the transmitter 1800*d* changing in luminance or may be a radio signal from a wireless device via Wi-Fi or Bluetooth®. Alternatively, instead of receiving such a signal, the receiver 1800*a* obtains position information indicating a position of the receiver 1800*a*, for example, by GPS or the like. Using the position information, the receiver 1800*a* then recognizes that the receiver 1800*a* entered a predetermined place or building.

(2) When the receiver 1800*a* receives the above signal or recognizes that the receiver 1800*a* entered the predetermined place, the receiver 1800*a* transmits to the server (visible light ID solution server) 1800*f* a request signal for requesting data related to the received signal, place or the like (related information).

(3) The server 1800*f* transmits to the receiver 1800*a* the above-described data and a clock setting request for causing the receiver 1800*a* to perform the clock setting.

(4) The receiver 1800*a* receives the data and the clock setting request and transmits the clock setting request to a GPS time server, an NTP server, or a base station of a telecommunication corporation (carrier).

(5) The above server or base station receives the clock setting request and transmits to the receiver 1800*a* clock data (clock information) indicating a current time point (time of the reference clock or absolute time). The receiver 1800*a* performs the clock setting by setting time of a clock included in the receiver 1800*a* itself to the current time point indicated in the clock data.

Thus, in this embodiment, the clock included in the receiver 1800*a* (the terminal device) is synchronized with the reference clock by global positioning system (GPS) radio waves or network time protocol (NTP) radio waves. Therefore, the receiver 1800*a* is capable of reproducing, at an appropriate time point according to the reference clock, data corresponding to the time point.

Figure 33:
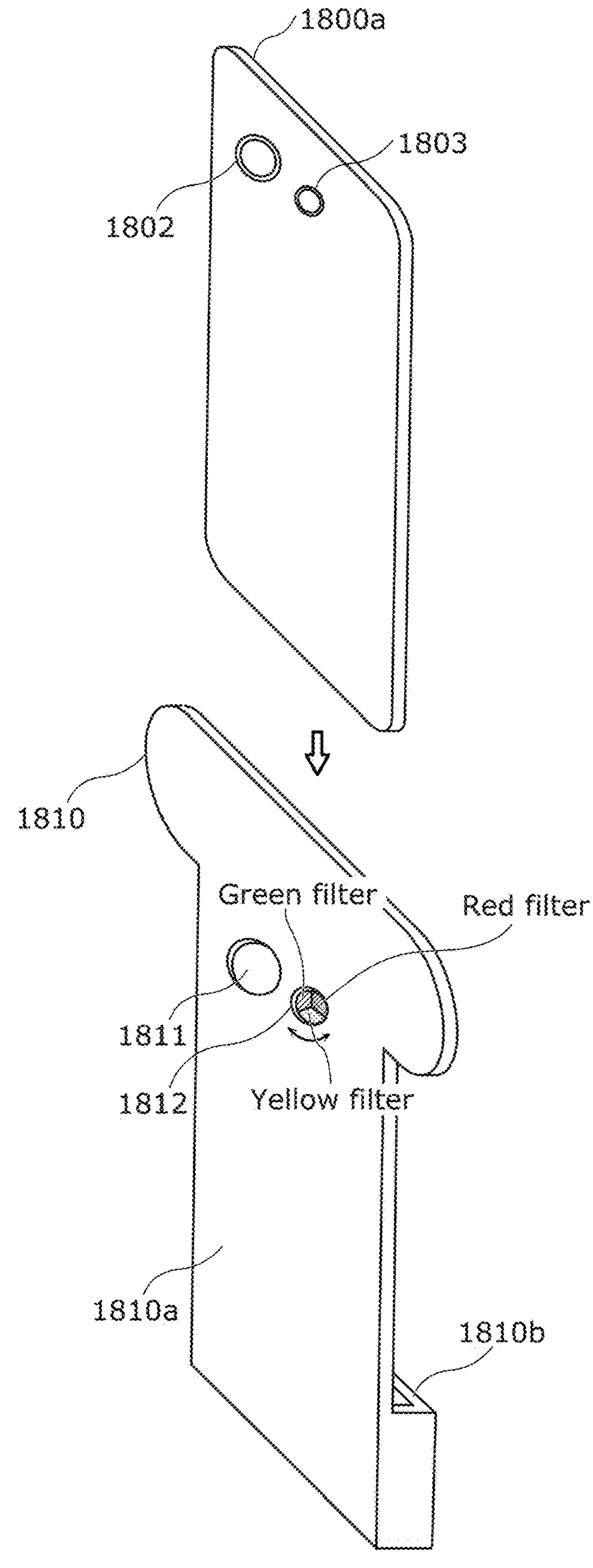
FIG. 33 is a diagram illustrating an example of application of a receiver in Embodiment 3.

FIG. 33 is a diagram illustrating an example of application of the receiver 1800*a* in Embodiment 3.

The receiver 1800*a* is configured as a smartphone as described above, and is used, for example, by being held by a holder 1810 formed of a translucent material such as resin or glass. This holder 1810 includes a back board 1810*a* and an engagement portion 1810*b* standing on the back board 1810*a*. The receiver 1800*a* is inserted into a gap between the back board 1810*a* and the engagement portion 1810*b* in such a way as to be placed along the back board 1810*a*.

Figure 34A:
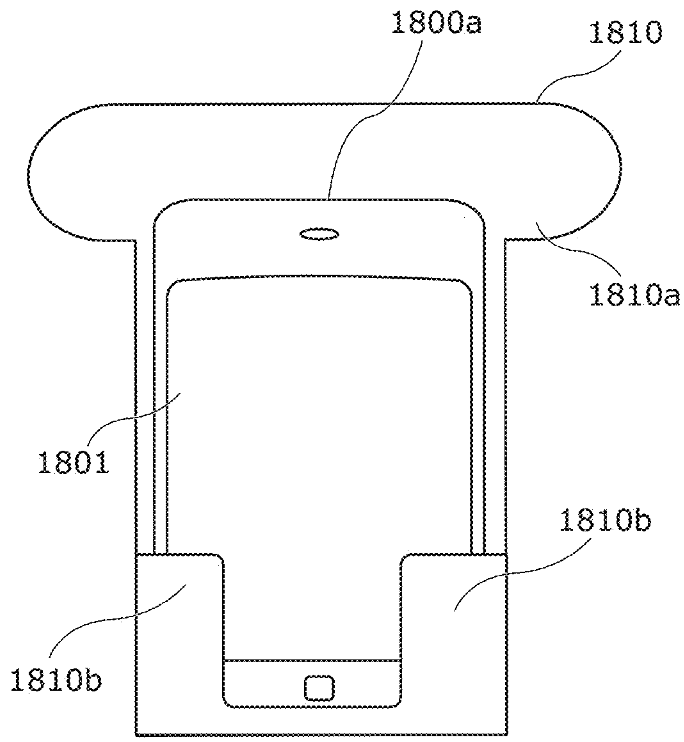
FIG. 34A is a front view of a receiver held by a holder in Embodiment 3.

FIG. 34A is a front view of the receiver 1800*a* held by the holder 1810 in Embodiment 3.

The receiver 1800*a* is inserted as described above and held by the holder 1810. At this time, the engagement portion 1810*b* engages with a lower portion of the receiver 1800*a*, and the lower portion is sandwiched between the engagement portion 1810*b* and the back board 1810*a*. The back surface of the receiver 18000*a* faces the back board 1810*a*, and a display 1801 of the receiver 1800*a* is exposed.

Figure 34B:
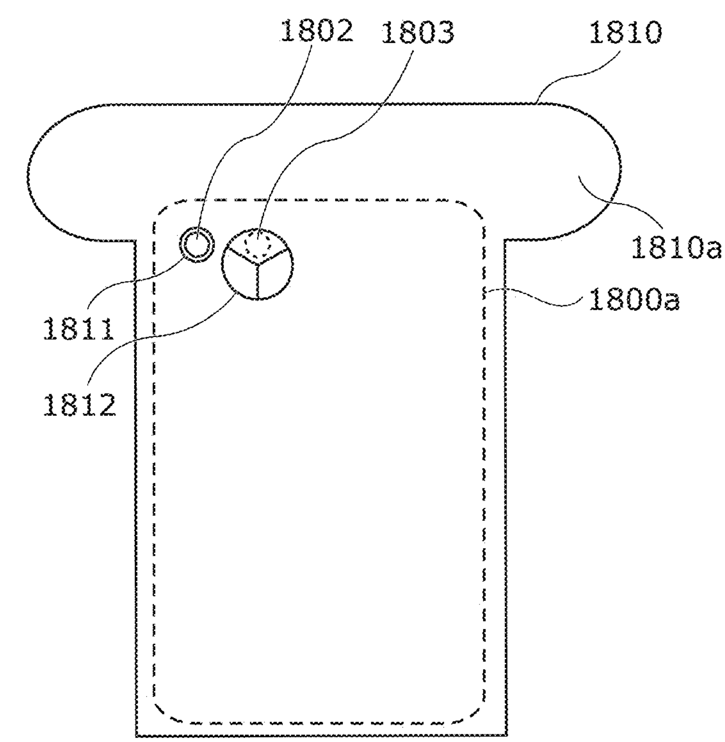
FIG. 34B is a rear view of a receiver held by a holder in Embodiment 3.

FIG. 34B is a rear view of the receiver 1800*a* held by the holder 1810 in Embodiment 3.

The back board 1810*a* has a through-hole 1811, and a variable filter 1812 is attached to the back board 1810, at a position close to the through-hole 1811. A camera 1802 of the receiver 1800*a* which is being held by the holder 1810 is exposed on the back board 1810*a* through the through-hole 1811. A flash light 1803 of the receiver 1800*a* faces the variable filter 1812.

The variable filter 1812 is, for example, in the shape of a disc, and includes three color filters (a red filter, a yellow filter, and a green filter) each having the shape of a circular sector of the same size. The variable filter 1812 is attached to the back board 1810*a* in such a way as to be rotatable about the center of the variable filter 1812. The red filter is a translucent filter of a red color, the yellow filter is a translucent filter of a yellow color, and the green filter is a translucent filter of a green color.

Therefore, the variable filter 1812 is rotated, for example, until the red filter is at a position facing the flash light 1803*a*. In this case, light radiated from the flash light 1803*a* passes through the red filter, thereby being spread as red light inside the holder 1810. As a result, roughly the entire holder 1810 glows red.

Likewise, the variable filter 1812 is rotated, for example, until the yellow filter is at a position facing the flash light 1803*a*. In this case, light radiated from the flash light 1803*a* passes through the yellow filter, thereby being spread as yellow light inside the holder 1810. As a result, roughly the entire holder 1810 glows yellow.

Likewise, the variable filter 1812 is rotated, for example, until the green filter is at a position facing the flash light 1803*a*. In this case, light radiated from the flash light 1803*a* passes through the green filter, thereby being spread as green light inside the holder 1810. As a result, roughly the entire holder 1810 glows green.

This means that the holder 1810 lights up in red, yellow, or green just like a penlight.

Figure 35:
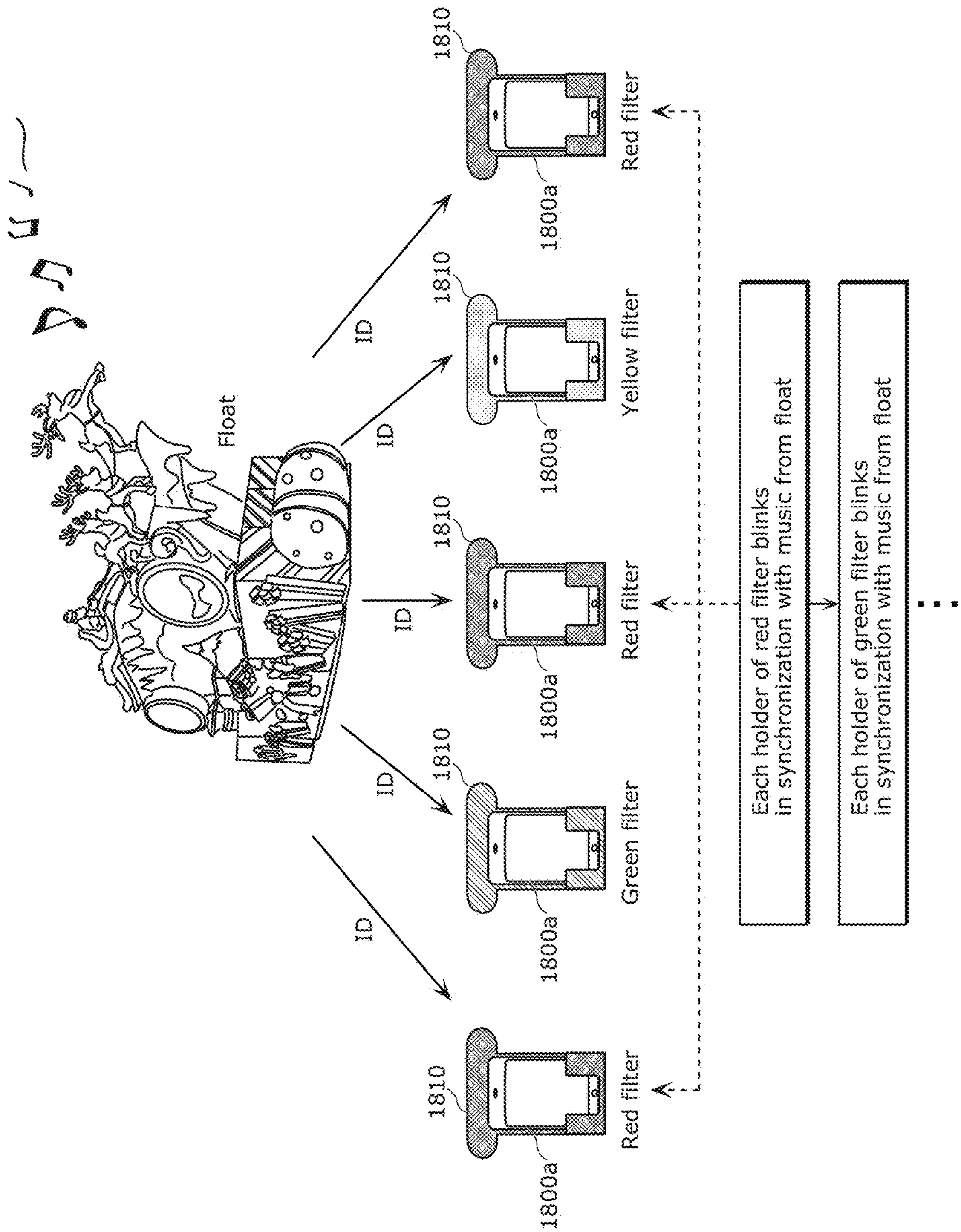
FIG. 35 is a diagram for describing a use case of a receiver held by a holder in Embodiment 3.

FIG. 35 is a diagram for describing a use case of the receiver 1800*a* held by the holder 1810 in Embodiment 3.

For example, the receiver 1800*a* held by the holder 1810, namely, a holder-attached receiver, can be used in amusement parks and so on. Specifically, a plurality of holder-attached receivers directed to a float moving in an amusement park blink to music from the float in synchronization. This means that the float is configured as the transmitter in the above embodiments and transmits a visible light signal by the light source attached to the float changing in luminance. For example, the float transmits a visible light signal indicating the ID of the float. The holder-attached receiver then receives the visible light signal, that is, the ID, by capturing an image by the camera 1802 of the receiver 1800*a* as in the case of the above embodiments. The receiver 1800*a* which received the ID obtains, for example, from the server, a program associated with the ID. This program includes an instruction to turn ON the flash light 1803 of the receiver 1800*a* at predetermined time points. These predetermined time points are set according to music from the float (so as to be in synchronization therewith). The receiver 1800*a* then causes the flash light 1803*a* to blink according to the program.

With this, the holder 1810 for each receiver 1800*a* which received the ID repeatedly lights up at the same timing according to music from the float having the ID.

Each receiver 1800*a* causes the flash light 1803 to blink according to a preset color filter (hereinafter referred to as a preset filter). The preset filter is a color filter that faces the flash light 1803 of the receiver 1800*a*. Furthermore, each receiver 1800*a* recognizes the current preset filter based on an input by a user. Alternatively, each receiver 1800*a* recognizes the current preset filter based on, for example, the color of an image captured by the camera 1802.

Specifically, at a predetermined time point, only the holders 1810 for the receivers 1800*a* which have recognized that the preset filter is a red filter among the receivers 1800*a* which received the ID light up at the same time. At the next time point, only the holders 1810 for the receivers 1800*a* which have recognized that the preset filter is a green filter light up at the same time. Further, at the next time point, only the holders 1810 for the receivers 1800*a* which have recognized that the preset filter is a yellow filter light up at the same time.

Thus, the receiver 1800*a* held by the holder 1810 causes the flash light 1803, that is, the holder 1810, to blink in synchronization with music from the float and the receiver 1800*a* held by another holder 1810, as in the above-described case of synchronous reproduction illustrated in FIG. 23 to FIG. 29.

Figure 36:
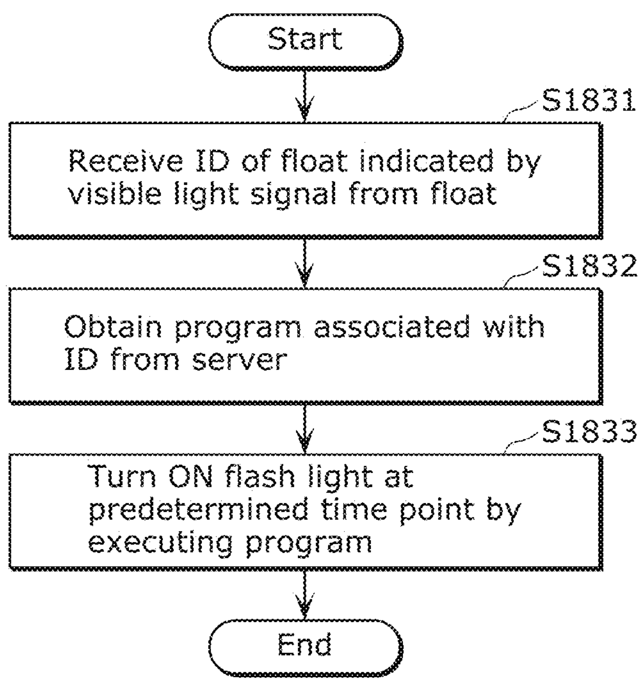
FIG. 36 is a flowchart illustrating processing operation of a receiver held by a holder in Embodiment 3.

FIG. 36 is a flowchart illustrating processing operation of the receiver 1800*a* held by the holder 1810 in Embodiment 3.

The receiver 1800*a* receives an ID of a float indicated by a visible light signal from the float (Step S1831). Next, the receiver 1800*a* obtains a program associated with the ID from the server (Step S1832). Next, the receiver 1800*a* causes the flash light 1803 to be turned ON at predetermined time points according to the preset filter by executing the program (Step S1833).

At this time, the receiver 1800*a* may display, on the display 1801, an image according to the received ID or the obtained program.

Figure 37:
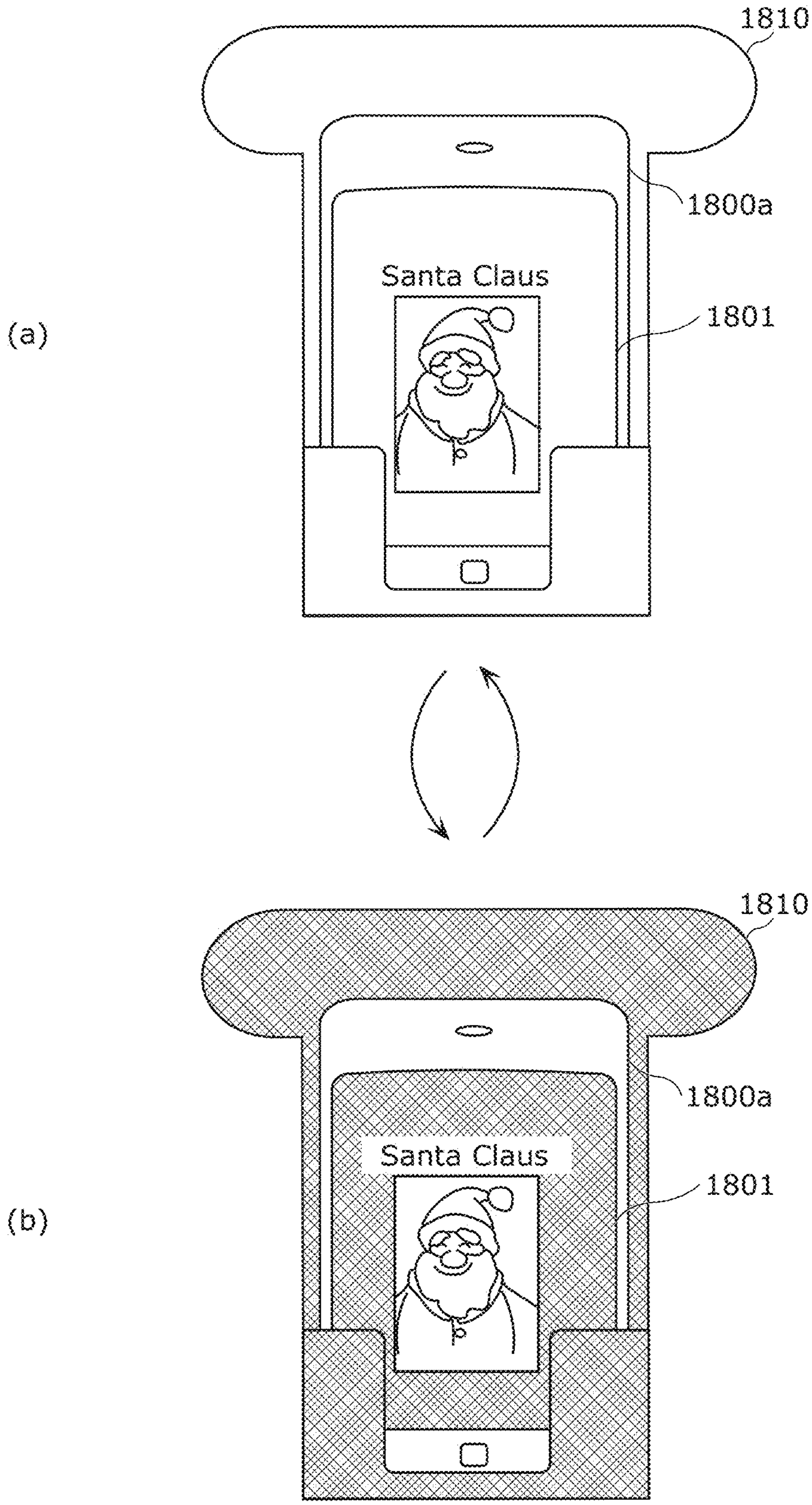
FIG. 37 is a diagram illustrating an example of an image displayed by a receiver in Embodiment 3.

FIG. 37 is a diagram illustrating an example of an image displayed by the receiver 1800*a* in Embodiment 3.

The receiver 1800*a* receives an ID, for example, from a Santa Clause float, and displays an image of Santa Clause as illustrated in (a) of FIG. 37. Furthermore, the receiver 1800*a* may change the color of the background of the image of Santa Clause to the color of the preset filter at the same time when the flash light 1803 is turned ON as illustrated in (b) of FIG. 37. For example, in the case where the color of the preset filter is red, when the flash light 1803 is turned ON, the holder 1810 glows red and at the same time, an image of Santa Clause with a red background is displayed on the display 1801. In short, blinking of the holder 1810 and what is displayed on the display 1801 are synchronized.

Figure 38:
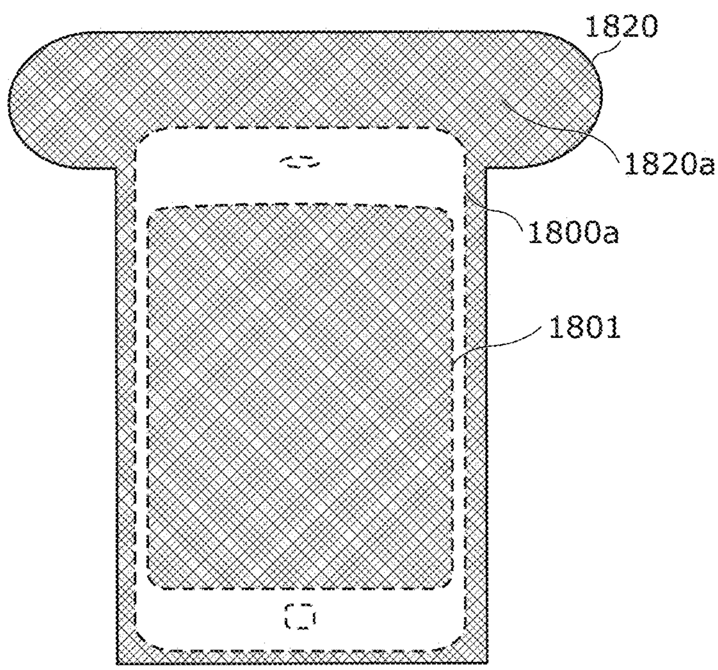
FIG. 38 is a diagram illustrating another example of a holder in Embodiment 3.

FIG. 38 is a diagram illustrating another example of a holder in Embodiment 3.

A holder 1820 is configured in the same manner as the above-described holder 1810 except for the absence of the through-hole 1811 and the variable filter 1812. The holder 1820 holds the receiver 1800*a* with a back board 1820*a* facing the display 1801 of the receiver 1800*a*. In this case, the receiver 1800*a* causes the display 1801 to emit light instead of the flash light 1803. With this, light from the display 1801 spreads across roughly the entire holder 1820. Therefore, when the receiver 1800*a* causes the display 1801 to emit red light according to the above-described program, the holder 1820 glows red. Likewise, when the receiver 1800*a* causes the display 1801 to emit yellow light according to the above-described program, the holder 1820 glows yellow. When the receiver 1800*a* causes the display 1801 to emit green light according to the above-described program, the holder 1820 glows green. With the use of the holder 1820 such as that just described, it is possible to omit the settings for the variable filter 1812.

(Visible Light Signal)

FIG. 39A to FIG. 39D are diagrams each illustrating an example of a visible light signal in Embodiment 3.

Figure 39A:
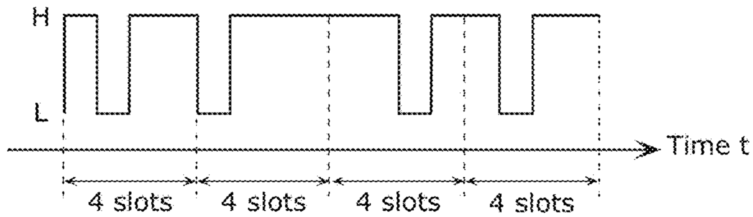
FIG. 39A is a diagram illustrating an example of a visible light signal in Embodiment 3.

The transmitter generates a 4 PPM visible light signal and changes in luminance according to this visible light signal, for example, as illustrated in FIG. 39A as in the above-described case. Specifically, the transmitter allocates four slots to one signal unit and generates a visible light signal including a plurality of signal units. The signal unit indicates High (H) or Low (L) in each slot. The transmitter then emits bright light in the H slot and emits dark light or is turned OFF in the L slot. For example, one slot is a period of 1/9,600 seconds.

Figure 39B:
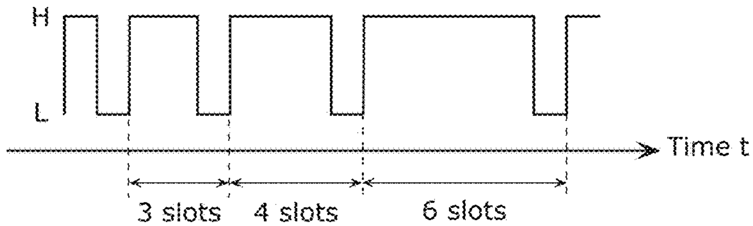
FIG. 39B is a diagram illustrating an example of a visible light signal in Embodiment 3.

Furthermore, the transmitter may generate a visible light signal in which the number of slots allocated to one signal unit is variable as illustrated in FIG. 39B, for example. In this case, the signal unit includes a signal indicating H in one or more continuous slots and a signal indicating L in one slot subsequent to the H signal. The number of H slots is variable, and therefore a total number of slots in the signal unit is variable. For example, as illustrated in FIG. 39B, the transmitter generates a visible light signal including a 3-slot signal unit, a 4-slot signal unit, and a 6-slot signal unit in this order. The transmitter then emits bright light in the H slot and emits dark light or is turned OFF in the L slot in this case as well.

Figure 39C:
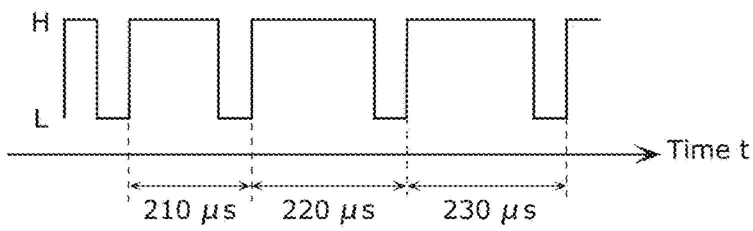
FIG. 39C is a diagram illustrating an example of a visible light signal in Embodiment 3.

The transmitter may allocate an arbitrary period (signal unit period) to one signal unit without allocating a plurality of slots to one signal unit as illustrated in FIG. 39C, for example. This signal unit period includes an H period and an L period subsequent to the H period. The H period is adjusted according to a signal which has not yet been modulated. The L period is fixed and may be a period corresponding to the above slot. The H period and the L period are each a period of 100 μs or more, for example. For example, as illustrated in FIG. 39C, the transmitter transmits a visible light signal including a signal unit having a signal unit period of 210 μs, a signal unit having a signal unit period of 220 μs, and a signal unit having a signal unit period of 230 μs. The transmitter then emits bright light in the H period and emits dark light or is turned OFF in the L period in this case as well.

Figure 39D:
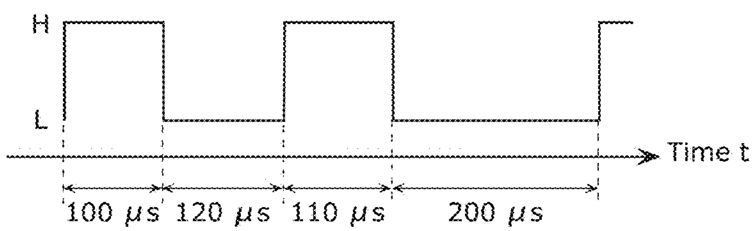
FIG. 39D is a diagram illustrating an example of a visible light signal in Embodiment 3.

The transmitter may generate, as a visible light signal, a signal indicating L and H alternately as illustrated in FIG. 39D, for example. In this case, each of the L period and the H period in the visible light signal is adjusted according to a signal which has not yet been modulated. For example, as illustrated in FIG. 39D, the transmitter transmits a visible light signal indicating H in a 100-μs period, then L in a 120-μs period, then H in a 110-μs period, and then L in a 200-μs period. The transmitter then emits bright light in the H period and emits dark light or is turned OFF in the L period in this case as well.

Figure 40:
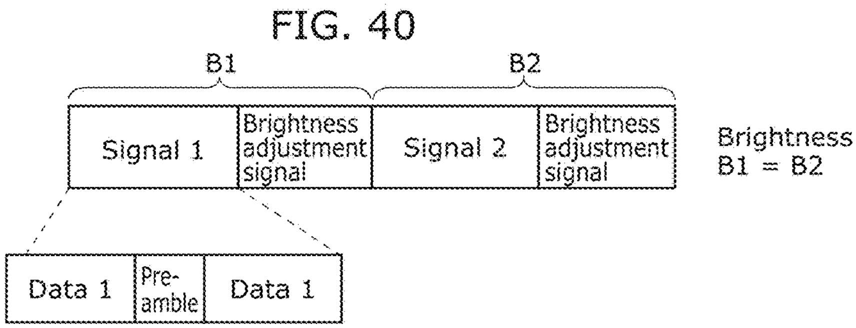
FIG. 40 is a diagram illustrating an example of a visible light signal in Embodiment 3.

FIG. 40 is a diagram illustrating a structure of a visible light signal in Embodiment 3.

The visible light signal includes, for example, a signal 1, a brightness adjustment signal corresponding to the signal 1, a signal 2, and a brightness adjustment signal corresponding to the signal 2. The transmitter generates the signal 1 and the signal 2 by modulating the signal which has not yet been modulated, and generates the brightness adjustment signals corresponding to these signals, thereby generating the above-described visible light signal.

The brightness adjustment signal corresponding to the signal is a signal which compensates for brightness increased or decreased due to a change in luminance according to the signal 1. The brightness adjustment signal corresponding to the signal 2 is a signal which compensates for brightness increased or decreased due to a change in luminance according to the signal 2. A change in luminance according to the signal 1 and the brightness adjustment signal corresponding to the signal 1 represents brightness B1, and a change in luminance according to the signal 2 and the brightness adjustment signal corresponding to the signal 2 represents brightness B2. The transmitter in this embodiment generates the brightness adjustment signal corresponding to each of the signal 1 and the signal 2 as a part of the visible light signal in such a way that the brightness B1 and the brightness 2 are equal. With this, brightness is kept at a constant level so that flicker can be reduced.

When generating the above-described signal 1, the transmitter generates a signal 1 including data 1, a preamble (header) subsequent to the data 1, and data 1 subsequent to the preamble. The preamble is a signal corresponding to the data 1 located before and after the preamble. For example, this preamble is a signal serving as an identifier for reading the data 1. Thus, since the signal 1 includes two data items 1 and the preamble located between the two data items, the receiver is capable of properly demodulating the data 1 (that is, the signal 1) even when the receiver starts reading the visible light signal at the midway point in the first data item 1.

A reproduction method according to an aspect of the present disclosure includes: receiving a visible light signal by a sensor of a terminal device from a transmitter which transmits the visible light signal by a light source changing in luminance; transmitting a request signal for requesting content associated with the visible light signal, from the terminal device to a server; receiving, by the terminal device, content including time points and data to be reproduced at the time points, from the server; and reproducing data included in the content and corresponding to time of a clock included in the terminal device.

With this, as illustrated in FIG. 31C, content including time points and data to be reproduced at the time points is received by a terminal device, and data corresponding to time of a clock included in the terminal device is reproduced. Therefore, the terminal device avoids reproducing data included in the content, at an incorrect point of time, and is capable of appropriately reproducing the data at a correct point of time indicated in the content. Specifically, as in the method e in FIG. 31A, the terminal device, i.e., the receiver, reproduces the content from a point of time of (the receiver time point−the content reproduction start time point). The above-mentioned data corresponding to time of the clock included in the terminal device is data included in the content and which is at a point of time of (the receiver time point−the content reproduction start time point). Furthermore, when content related to the above content (the transmitter-side content) is also reproduced on the transmitter, the terminal device is capable of appropriately reproducing the content in synchronization with the transmitter-side content. Note that the content is audio or an image.

Furthermore, the clock included in the terminal device may be synchronized with a reference clock by global positioning system (GPS) radio waves or network time protocol (NTP) radio waves.

In this case, since the clock of the terminal device (the receiver) is synchronized with the reference clock, at an appropriate time point according to the reference clock, data corresponding to the time point can be reproduced as illustrated in FIG. 30 and FIG. 32.

Furthermore, the visible light signal may indicate a time point at which the visible light signal is transmitted from the transmitter.

With this, the terminal device (the receiver) is capable of receiving content associated with a time point at which the visible light signal is transmitted from the transmitter (the transmitter time point) as indicated in the method d in FIG. 31A. For example, when the transmitter time point is 5:43, content that is reproduced at 5:43 can be received.

Furthermore, in the above reproduction method, when the process for synchronizing the clock of the terminal device with the reference clock is performed using the GPS radio waves or the NTP radio waves is at least a predetermined time before a point of time at which the terminal device receives the visible light signal, the clock of the terminal device may be synchronized with a clock of the transmitter using a time point indicated in the visible light signal transmitted from the transmitter.

For example, when the predetermined time has elapsed after the process for synchronizing the clock of the terminal device with the reference clock, there are cases where the synchronization is not appropriately maintained. In this case, there is a risk that the terminal device cannot reproduce content at a point of time which is in synchronization with the transmitter-side content reproduced by the transmitter. Thus, in the reproduction method according to an aspect of the present disclosure described above, when the predetermined time has elapsed, the clock of the terminal device (the receiver) and the clock of the transmitter are synchronized with each other as in Step S1829 and Step S1830 of FIG. 30. Consequently, the terminal device is capable of reproducing content at a point of time which is in synchronization with the transmitter-side content reproduced by the transmitter.

Furthermore, the server may hold a plurality of content items associated with time points, and in the receiving of content, when content associated with the time point indicated in the visible light signal is not present in the server, among the plurality of content items, content associated with a time point that is closest to the time point indicated in the visible light signal and after the time point indicated in the visible light signal may be received.

With this, as illustrated in the method d in FIG. 31A, it is possible to receive appropriate content among the plurality of content items in the server even when the server does not have content associated with a time point indicated in the visible light signal.

Furthermore, the reproduction method may include: receiving a visible light signal by a sensor of a terminal device from a transmitter which transmits the visible light signal by a light source changing in luminance; transmitting a request signal for requesting content associated with the visible light signal, from the terminal device to a server; receiving, by the terminal device, content from the server; and reproducing the content, and the visible light signal may indicate ID information and a time point at which the visible light signal is transmitted from the transmitter, and in the receiving of content, the content that is associated with the ID information and the time point indicated in the visible light signal may be received.

With this, as in the method d in FIG. 31A, among the plurality of content items associated with the ID information (the transmitter ID), content associated with a time point at which the visible light signal is transmitted from the transmitter (the transmitter time point) is received and reproduced. Thus, it is possible to reproduce appropriate content for the transmitter ID and the transmitter time point.

Furthermore, the visible light signal may indicate the time point at which the visible light signal is transmitted from the transmitter, by including second information indicating an hour and a minute of the time point and first information indicating a second of the time point, and the receiving of a visible light signal may include receiving the second information and receiving the first information a greater number of times than a total number of times the second information is received.

With this, for example, when a time point at which each packet included in the visible light signal is transmitted is sent to the terminal device at a second rate, it is possible to reduce the burden of transmitting, every time one second passes, a packet indicating a current time point represented using all the hour, the minute, and the second. Specifically, as illustrated in FIG. 26, when the hour and the minute of a time point at which a packet is transmitted have not been updated from the hour and the minute indicated in the previously transmitted packet, it is sufficient that only the first information which is a packet indicating only the second (the time packet 1) is transmitted. Therefore, when an amount of the second information to be transmitted by the transmitter, which is a packet indicating the hour and the minute (the time packet 2), is set to less than an amount of the first information to be transmitted by the transmitter, which is a packet indicating the second (the time packet 1), it is possible to avoid transmission of a packet including redundant content.

Embodiment 4

The present embodiment describes, for instance, a display method which achieves augmented reality (AR) using light IDs.

Figure 41:
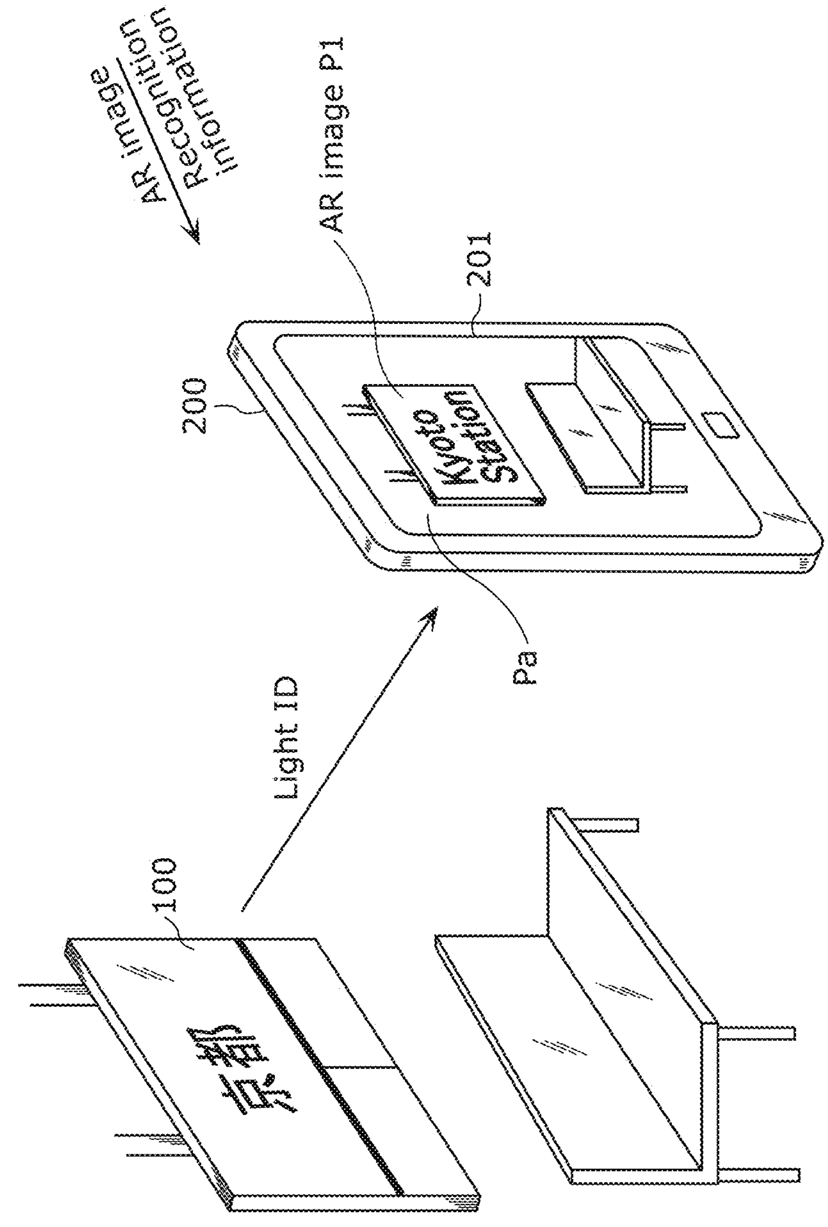
FIG. 41 is a diagram illustrating an example of a visible light signal in Embodiment 4.

FIG. 41 is a diagram illustrating an example in which a receiver according to the present embodiment displays an AR image.

A receiver 200 according to the present embodiment is the receiver according to any of Embodiments 1 to 3 described above which includes an image sensor and a display 201, and is configured as a smartphone, for example. The receiver 200 obtains a captured display image Pa which is a normal captured image described above and a decode target image which is a visible light communication image or a bright line image described above, by an image sensor included in the receiver 200 capturing an image of a subject.

Specifically, the image sensor of the receiver 200 captures an image of a transmitter 100 configured as a station sign. The transmitter 100 is the transmitter according to any of Embodiments 1 to 3 above, and includes one or more light emitting elements (for example, LEDs). The transmitter 100 changes luminance by causing the one or more light emitting elements to blink, and transmits a light ID (light identification information) through the luminance change. The light ID is a visible light signal described above.

The receiver 200 obtains a captured display image Pa in which the transmitter 100 is shown by capturing an image of the transmitter 100 for a normal exposure time, and also obtains a decode target image by capturing an image of the transmitter 100 for a communication exposure time shorter than the normal exposure time. Note that the normal exposure time is a time for exposure in the normal imaging mode described above, and the communication exposure time is a time for exposure in the visible light communication mode described above.

The receiver 200 obtains a light ID by decoding the decode target image. In other words, the receiver 200 receives a light ID from the transmitter 100. The receiver 200 transmits the light ID to a server. Then, the receiver 200 obtains an AR image P1 and recognition information associated with the light ID from the server. The receiver 200 recognizes a region according to the recognition information as a target region, from the captured display image Pa. For example, the receiver 200 recognizes, as a target region, a region in which a station sign which is the transmitter 100 is shown. The receiver 200 superimposes the AR image P1 on the target region, and displays, on the display 201, the captured display image Pa on which the AR image P1 is superimposed. For example, if the station sign which is the transmitter 100 shows "Kyoto Eki" in Japanese which is the name of the station, the receiver 200 obtains the AR image P1 showing the name of the station in English, that is, "Kyoto Station". In this case, the AR image P1 is superimposed on the target region of the captured display image Pa, and thus the captured display image Pa can be displayed as if a station sign showing the English name of the station were actually present. As a result, by looking at the captured display image Pa, a user who knows English can readily know the name of the station shown by the station sign which is the transmitter 100, even if the user cannot read Japanese.

For example, recognition information may be an image to be recognized (for example, an image of the above station sign) or may indicate feature points and a feature quantity of the image. Feature points and a feature quantity can be obtained by image processing such as scale-invariant feature transform (SIFT), speeded-up robust feature (SURF), oriented-BRIEF (ORB), and accelerated KAZE (AKAZE), for example. Alternatively, recognition information may be a white quadrilateral image similar to the image to be recognized, and may further indicate an aspect ratio of the quadrilateral. Alternatively, identification information may include random dots which appear in the image to be recognized. Furthermore, recognition information may indicate orientation of the white quadrilateral or random dots mentioned above relative to a predetermined direction. The predetermined direction is a gravity direction, for example.

The receiver 200 recognizes, as a target region, a region according to such recognition information from the captured display image Pa. Specifically, if recognition information indicates an image, the receiver 200 recognizes a region similar to the image shown by the recognition information, as a target region. If the recognition information indicates feature points and a feature quantity obtained by image processing, the receiver 200 detects feature points and extracts a feature quantity by performing the image processing on the captured display image Pa. The receiver 200 recognizes, as a target region, a region which has feature points and a feature quantity similar to the feature points and the feature quantity indicated by the recognition information. If recognition information indicates a white quadrilateral and the orientation of the image, the receiver 200 first detects the gravity direction using an acceleration sensor included in the receiver 200. The receiver 200 recognizes, as a target region, a region similar to the white quadrilateral arranged in the orientation indicated by the recognition information, from the captured display image Pa disposed based on the gravity direction.

Here, the recognition information may include reference information for locating a reference region of the captured display image Pa, and target information indicating a relative position of the target region with respect to the reference region. Examples of the reference information include an image to be recognized, feature points and a feature quantity, a white quadrilateral image, and random dots, as mentioned above. In this case, the receiver 200 first locates a reference region from the captured display image Pa, based on reference information, when the receiver 200 is to recognize a target region. Then, the receiver 200 recognizes, as a target region, a region in a relative position indicated by target information based on the position of the reference region, from the captured display image Pa. Note that the target information may indicate that a target region is in the same position as the reference region. Accordingly, the recognition information includes reference information and target information, and thus a target region can be recognized from various aspects. The server can set freely a spot where an AR image is superimposed, and inform the receiver 200 of the spot.

Reference information may indicate that the reference region in the captured display image Pa is a region in which a display is shown in the captured display image. In this case, if the transmitter 100 is configured as, for example, a display of a TV, a target region can be recognized based on a region in which the display is shown.

In other words, the receiver 200 according to the present embodiment identifies a reference image and an image recognition method, based on a light ID. The image recognition method is a method for recognizing a captured display image Pa, and examples of the method include, for instance, geometric feature quantity extraction, spectrum feature quantity extraction, and texture feature quantity extraction. The reference image is data which indicates a feature quantity used as the basis. The feature quantity may be a feature quantity of a white outer frame of an image, for example, or specifically, data showing features of the image represented in vector form. The receiver 200 extracts a feature quantity from the captured display image Pa in accordance with the image recognition method, and detects an above-mentioned reference region or target region from the captured display image Pa, by comparing the extracted feature quantity and a feature quantity of a reference image.

Examples of the image recognition method may include a location utilizing method, a marker utilizing method, and a marker free method. The location utilizing method is a method in which positional information provided by the global positioning system (GPS) (namely, the position of the receiver 200) is utilized, and a target region is recognized from the captured display image Pa, based on the positional information. The marker utilizing method is a method in which a marker which includes a white and black pattern such as a two-dimensional barcode is used as a mark for target identification. In other words, a target region is recognized based on a marker shown in the captured display image P, according to the marker utilizing method. According to the marker free method, feature points or a feature quantity are/is extracted from the captured display image Pa, through image analysis on the captured display image Pa, and the position of a target region and the target region are located, based on the extracted feature points or feature quantity. In other words, if the image recognition method is the marker free method, the image recognition method is, for instance, geometric feature quantity extraction, spectrum feature quantity extraction, or texture feature quantity extraction mentioned above.

The receiver 200 may identify a reference image and an image recognition method, by receiving a light ID from the transmitter 100, and obtaining, from the server, a reference image and an image recognition method associated with the light ID (hereinafter, received light ID). In other words, a plurality of sets each including a reference image and an image recognition method are stored in the server, and associated with different light IDs. This allows identifying one set associated with the received light ID, from among the plurality of sets stored in the server. Accordingly, the speed of image processing for superimposing an AR image can be improved. Furthermore, the receiver 200 may obtain a reference image associated with a received light ID by making an inquiry to the server, or may obtain a reference image associated with the received light ID, from among a plurality of reference images prestored in the receiver 200.

The server may store, for each light ID, relative positional information associated with the light ID, together with a reference image, an image recognition method, and an AR image. The relative positional information indicates a relative positional relationship of the above reference region and a target region, for example. In this manner, when the receiver 200 transmits the received light ID to the server to make an inquiry, the receiver 200 obtains the reference image, the image recognition method, the AR image, and the relative positional information associated with the received light ID. In this case, the receiver 200 locates the above reference region from the captured display image Pa, based on the reference image and the image recognition method. The receiver 200 recognizes, as a target region mentioned above, a region in the direction and at the distance indicated by the above relative positional information from the position of the reference region, and superimposes an AR image on the target region. Alternatively, if the receiver 200 does not have relative positional information, the receiver 200 may recognize, as a target region, a reference region as mentioned above, and superimpose an AR image on the reference region. In other words, the receiver 200 may prestore a program for displaying an AR image, based on a reference image, instead of obtaining relative positional information, and may display an AR image within the white frame which is a reference region, for example. In this case, relative positional information is unnecessary.

There are the following four variations (1) to (4) of storing and obtaining a reference image, relative positional information, an AR image, and an image recognition method.

(1) The server stores a plurality of sets each including a reference image, relative positional information, an AR image, and an image recognition method. The receiver 200 obtains one set associated with a received light ID from among the plurality of sets.

(2) The server stores a plurality of sets each including a reference image and an AR image. The receiver 200 obtains one set associated with a received light ID from among the plurality of sets, using predetermined relative positional information and a predetermined image recognition method. Alternatively, the receiver 200 prestores a plurality of sets each including relative positional information and an image recognition method, and may select one set associated with a received light ID, from among the plurality of sets. In this case, the receiver 200 may transmit a received light ID to the server to make an inquiry, and obtain information for identifying relative positional information and an image recognition method associated with the received light ID, from the server. The receiver 200 selects one set, based on information obtained from the server, from among the prestored plurality of sets each including relative positional information and an image recognition method. Alternatively, the receiver 200 may select one set associated with a received light ID, from among the prestored plurality of sets each including relative positional information and an image recognition method, without making an inquiry to the server.

(3) The receiver 200 stores a plurality of sets each including a reference image, relative positional information, an AR image, and an image recognition method, and selects one set from among the plurality of sets. The receiver 200 may select one set by making an inquiry to the server or may select one set associated with a received light ID, similarly to (2) above.

(4) The receiver 200 stores a plurality of sets each including a reference image and an AR image, and selects one set associated with a received light ID. The receiver 200 uses a predetermined image recognition method and predetermined relative positional information.

Figure 42:
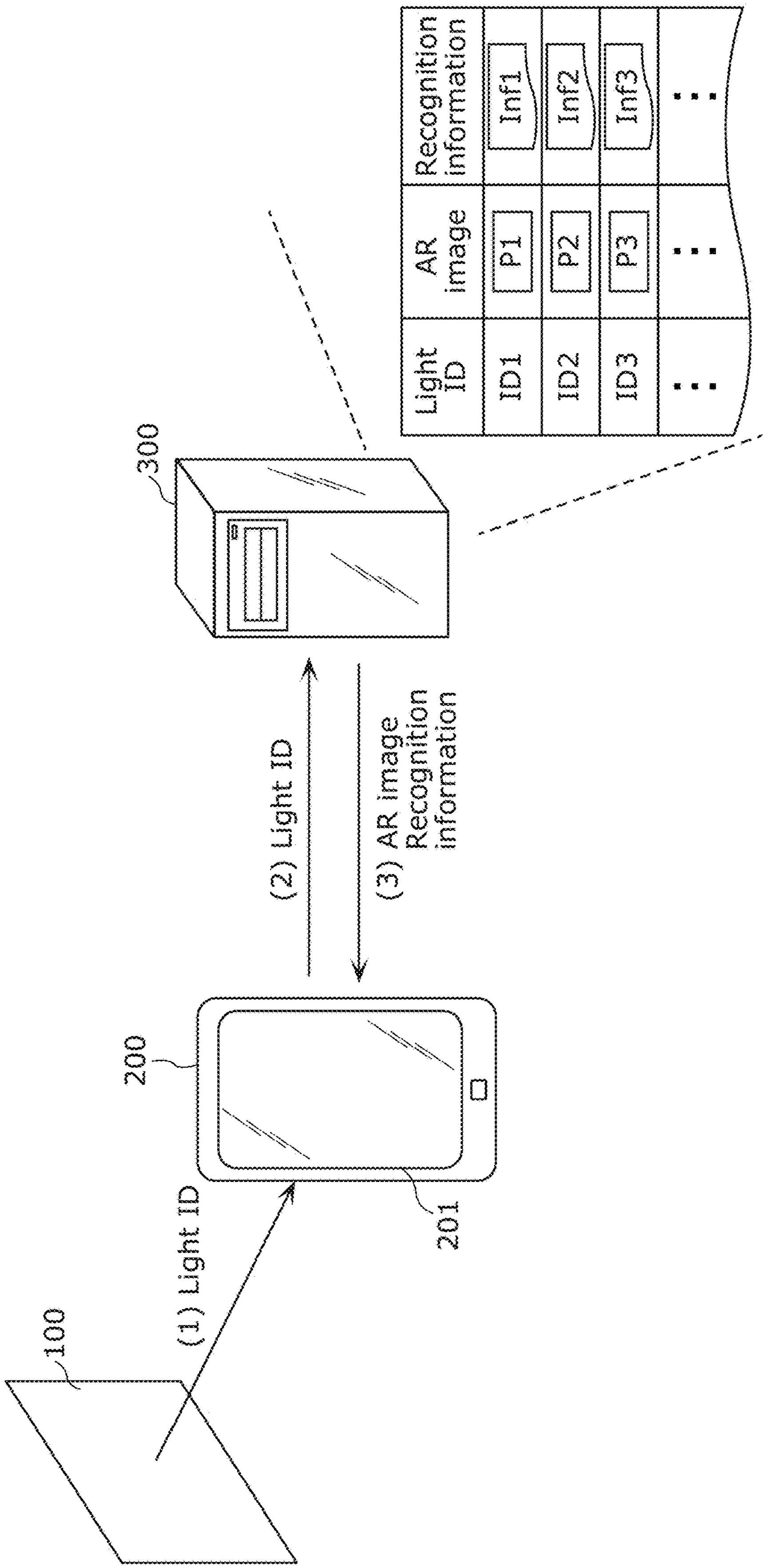
FIG. 42 is a diagram illustrating an example of display system in Embodiment 4.

FIG. 42 is a diagram illustrating an example of a display system according to the present embodiment.

The display system according to the present embodiment includes the transmitter 100 which is a station sign as mentioned above, the receiver 200, and a server 300, for example.

The receiver 200 first receives a light ID from the transmitter 100 in order to display the captured display image on which an AR image is superimposed as described above. Next, the receiver 200 transmits the light ID to the server 300.

The server 300 stores, for each light ID, an AR image and recognition information associated with the light ID. Upon reception of a light ID from the receiver 200, the server 300 selects an AR image and recognition information associated with the received light ID, and transmits the AR image and the recognition information that are selected to the receiver 200. Accordingly, the receiver 200 receives the AR image and the recognition information transmitted from the server 300, and displays a captured display image on which the AR image is superimposed.

Figure 43:
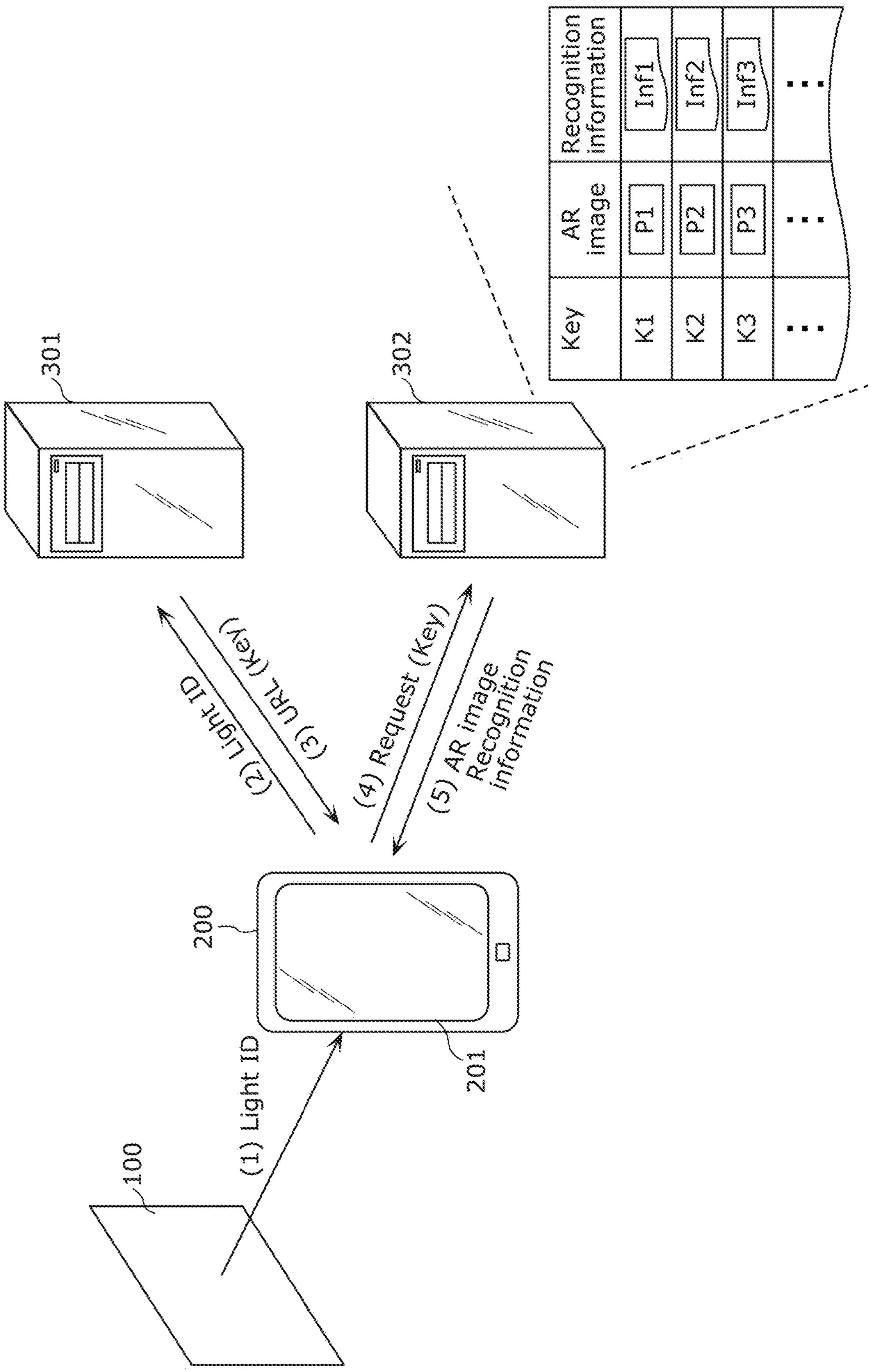
FIG. 43 is a diagram illustrating another example of display system in Embodiment 4.

FIG. 43 is a diagram illustrating another example of the display system according to the present embodiment.

The display system according to the present embodiment includes, for example, the transmitter 100 which is a station sign mentioned above, the receiver 200, a first server 301, and a second server 302.

The receiver 200 first receives a light ID from the transmitter 100, in order to display a captured display image on which an AR image is superimposed as described above. Next, the receiver 200 transmits the light ID to the first server 301.

Upon reception of the light ID from the receiver 200, the first server 301 notifies the receiver 200 of a uniform resource locator (URL) and a key which are associated with the received light ID. The receiver 200 which has received such a notification accesses the second server 302 based on the URL, and delivers the key to the second server 302.

The second server 302 stores, for each key, an AR image and recognition information associated with the key. Upon reception of the key from the receiver 200, the second server 302 selects an AR image and recognition information associated with the key, and transmits the selected AR image and recognition information to the receiver 200. Accordingly, the receiver 200 receives the AR image and the recognition information transmitted from the second server 302, and displays a captured display image on which the AR image is superimposed.

Figure 44:
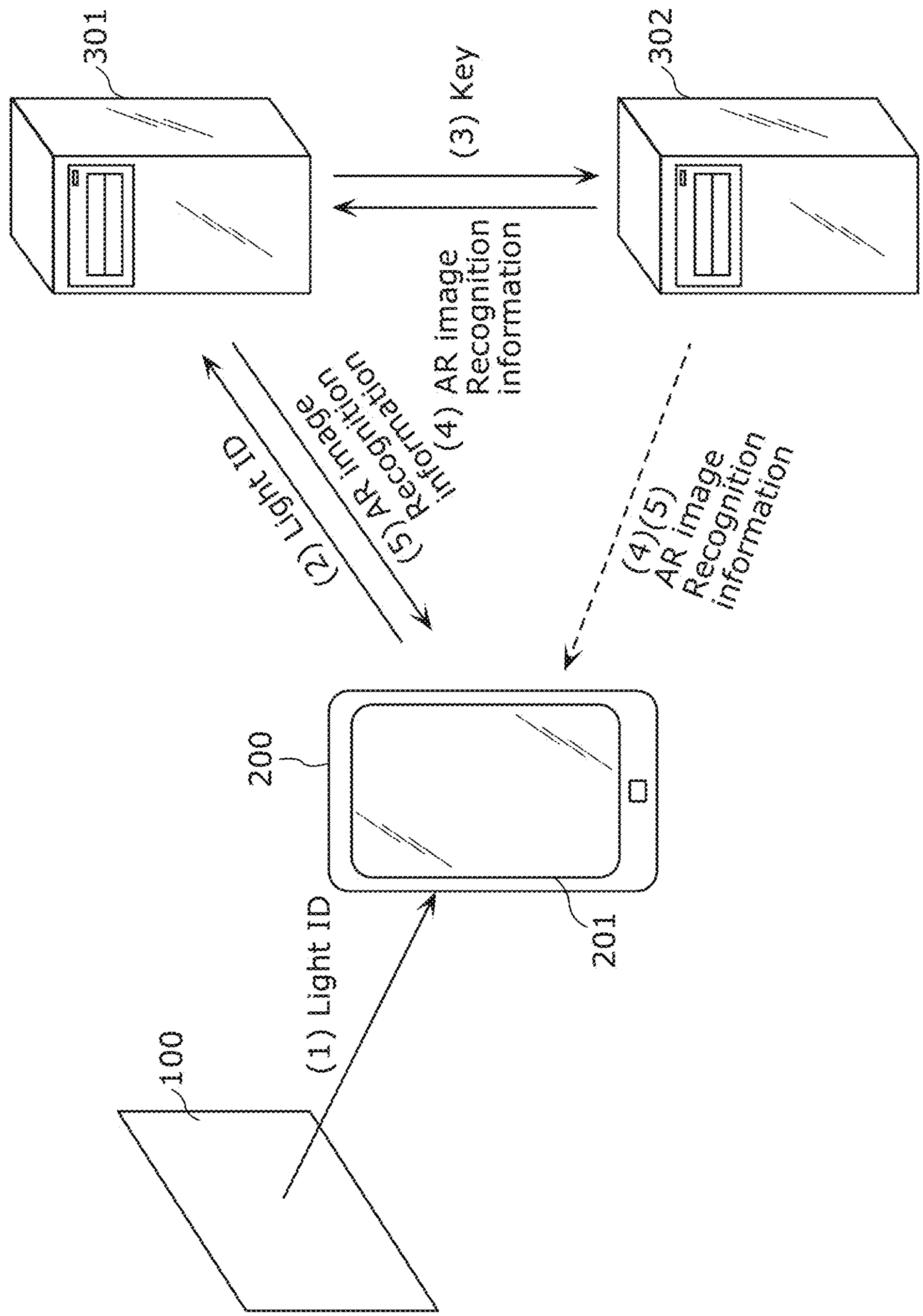
FIG. 44 is a diagram illustrating another example of display system in Embodiment 4.

FIG. 44 is a diagram illustrating another example of the display system according to the present embodiment.

The display system according to the present embodiment includes the transmitter 100 which is a station sign mentioned above, the receiver 200, the first server 301, and the second server 302, for example.

The receiver 200 first receives a light ID from the transmitter 100, in order to display a captured display image on which an AR image is superimposed as described above. Next, the receiver 200 transmits the light ID to the first server 301.

Upon reception of the light ID from the receiver 200, the first server 301 notifies the second server 302 of a key associated with the received light ID.

The second server 302 stores, for each key, an AR image and recognition information associated with the key. Upon reception of the key from the first server 301, the second server 302 selects an AR image and recognition information which are associated with the key, and transmits the selected AR image and the selected recognition information to the first server 301. Upon reception of the AR image and the recognition information from the second server 302, the first server 301 transmits the AR image and the recognition information to the receiver 200. Accordingly, the receiver 200 receives the AR image and the recognition information transmitted from the first server 301, and displays a captured display image on which the AR image is superimposed.

Note that the second server 302 transmits an AR image and recognition information to the first server 301 in the above example, but may transmit an AR image and recognition information to the receiver 200, without transmitting to the first server 301.

Figure 45:
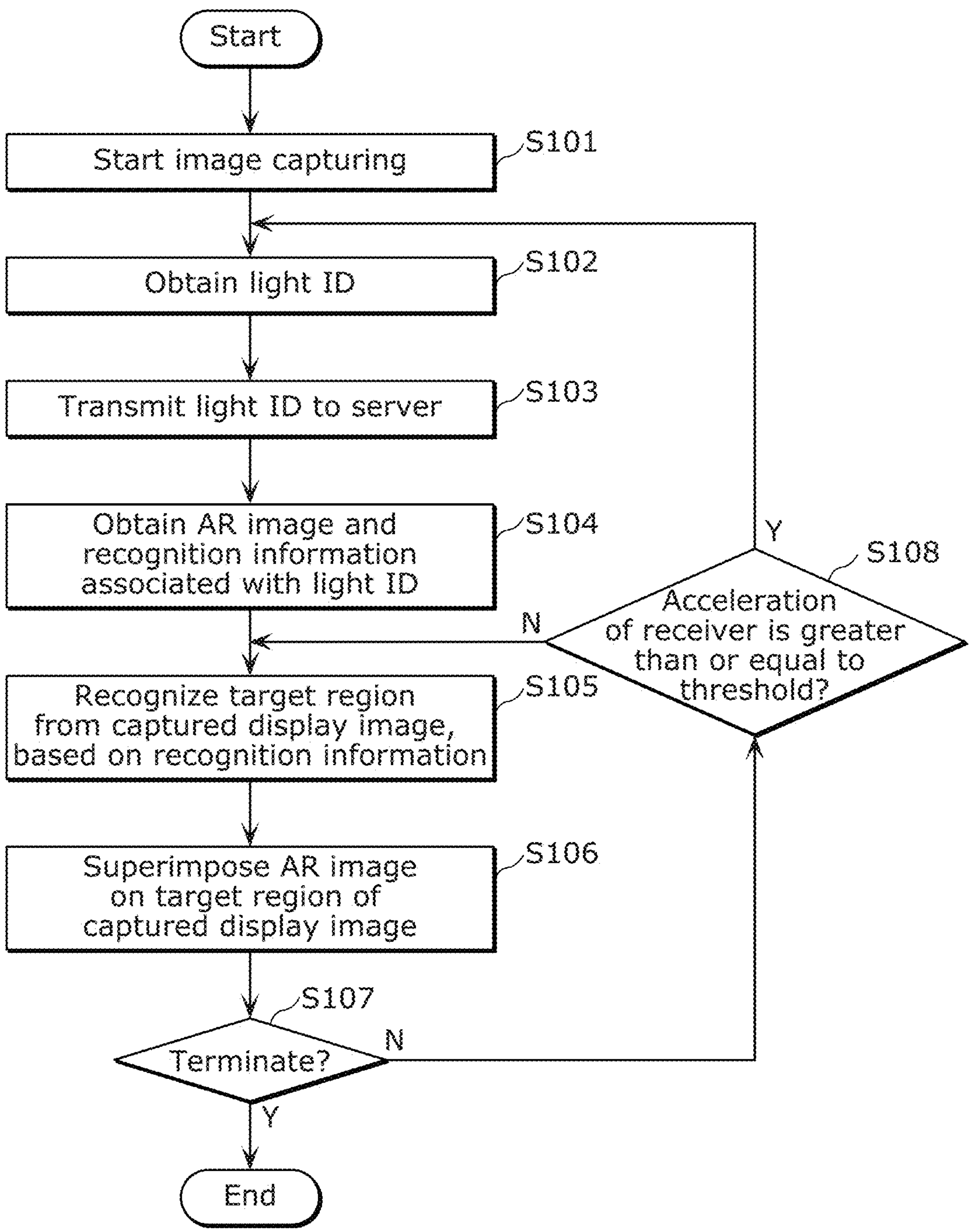
FIG. 45 is a flowchart illustrating an example of processing operations performed by a receiver in Embodiment 4.

FIG. 45 is a flowchart illustrating an example of processing operation by the receiver 200 according to the present embodiment.

First, the receiver 200 starts image capturing for the normal exposure time and the communication exposure time described above (step S101). Then, the receiver 200 obtains a light ID by decoding a decode target image obtained by image capturing for the communication exposure time (step S102). Next, the receiver 200 transmits the light ID to the server (step S103).

The receiver 200 obtains an AR image and recognition information associated with the transmitted light ID from the server (step S104). Next, the receiver 200 recognizes, as a target region, a region according to the recognition information, from a captured display image obtained by image capturing for the normal exposure time (step S105). The receiver 200 superimposes the AR image on the target region, and displays the captured display image on which the AR image is superimposed (step S106).

Next, the receiver 200 determines whether to terminate image capturing and displaying the captured display image (step S107). Here, if the receiver 200 determines that image capturing and displaying the captured display image are not to be terminated (N in step S107), the receiver 200 further determines whether the acceleration of the receiver 200 is greater than or equal to a threshold (step S108). An acceleration sensor included in the receiver 200 measures the acceleration. If the receiver 200 determines that the acceleration is less than the threshold (N in step S108), the receiver 200 executes processing from step S105. Accordingly, even if the captured display image displayed on the display 201 of the receiver 200 is displaced, the AR image can be caused to follow the target region of the captured display image. If the receiver 200 determines that the acceleration is greater than or equal to the threshold (Y in step S108), the receiver 200 executes processing from step S102. Accordingly, if the captured display image stops showing the transmitter 100, the receiver 200 can be prevented from incorrectly recognizing, as a target region, a region in which a subject different from the transmitter 100 is shown.

As described above, in the present embodiment, an AR image is displayed, being superimposed on a captured display image, and thus an image useful to a user can be displayed. Furthermore, an AR image can be superimposed on an appropriate target region, while maintaining a processing load light.

Specifically, in typical augmented reality (namely, AR), a captured display image is compared with a huge number of prestored recognition target images, to determine whether the captured display image includes any of the recognition target images. Then, if the captured display image is determined to include a recognition target image, an AR image associated with the recognition target image is superimposed on the captured display image. At this time, the AR image is positioned based on the recognition target image. Accordingly, in such typical augmented reality, a captured display image is compared with a huge number of recognition target images, and also the position of a recognition target image in the captured display image needs to be detected when an AR image is positioned. Thus, a large amount of calculation is involved and a processing load is heavy, which is a problem.

However, with the display method according to the present embodiment, a light ID is obtained by decoding a decode target image which is obtained by capturing an image of a subject. Specifically, a light ID transmitted from a transmitter which is a subject is received. Furthermore, an AR image and recognition information associated with the light ID are obtained from a server. Accordingly, the server does not need to compare a captured display image with a huge number of recognition target images, and can select an AR image associated in advance with the light ID, and transmit the AR image to a display apparatus. In this manner, a processing load can be greatly reduced by decreasing the amount of calculation. Processing of displaying an AR image can be performed at high speed.

In the present embodiment, recognition information associated with the light ID is obtained from the server. Recognition information is for recognizing, from a captured display image, a target region on which an AR image is to be superimposed. This recognition information may indicate that a white quadrilateral, for example, is a target region. In this case, a target region can be readily recognized and a processing load can be further reduced. Specifically, a processing load can be further reduced depending on the content of recognition information. The server can arbitrarily set the content of the recognition information according to a light ID, and thus the balance of a processing load and recognition precision can be maintained appropriate.

Note that in the present embodiment, the receiver 200 transmits a light ID to the server, and thereafter the receiver 200 obtains an AR image and recognition information associated with the light ID from the server. Yet, at least one of an AR image and recognition information may be obtained in advance. Specifically, the receiver 200 obtains, at a time, from the server and stores a plurality of AR images and a plurality of pieces of recognition information associated with a plurality of light IDs which may be received. Thereafter, upon reception of a light ID, the receiver 200 selects an AR image and recognition information associated with the light ID, from among the plurality of AR images and the plurality of pieces of recognition information stored in the receiver 200. Accordingly, processing of displaying an AR image can be performed at higher speed.

Figure 46:
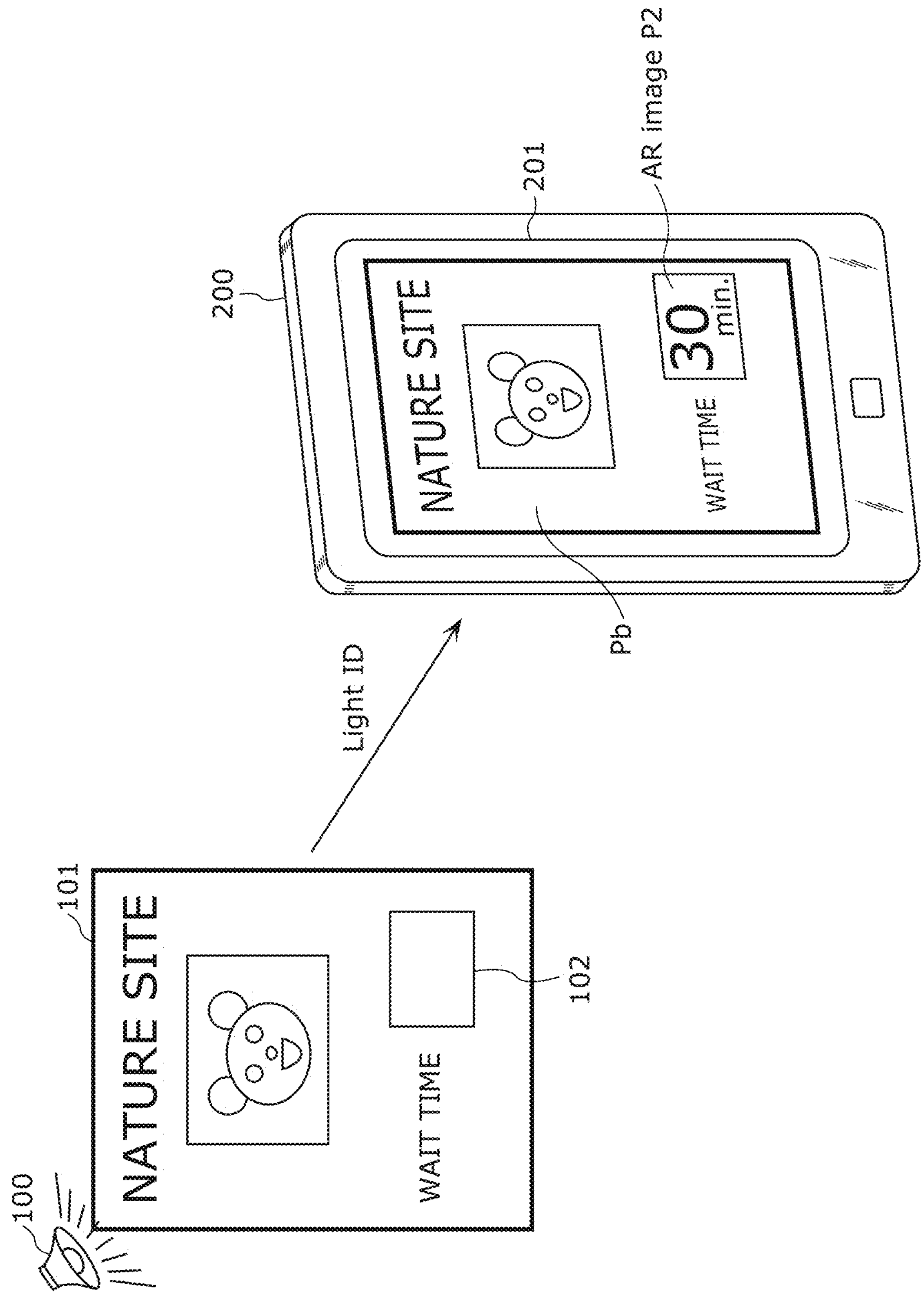
FIG. 46 is a diagram illustrating another example in which a receiver according to Embodiment 4 displays an AR image.

FIG. 46 is a diagram illustrating another example in which the receiver 200 according to the present embodiment displays an AR image.

The transmitter 100 is configured as, for example, a lighting apparatus as illustrated in FIG. 46, and transmits a light ID by changing luminance while illuminating a guideboard 101 of a facility. The guideboard 101 is illuminated with light from the transmitter 100, and thus changes luminance in the same manner as the transmitter 100 and transmits a light ID.

The receiver 200 obtains a captured display image Pb and a decode target image by capturing an image of the guideboard 101 illuminated by the transmitter 100, similarly to the above. The receiver 200 obtains a light ID by decoding the decode target image. In other words, the receiver 200 receives a light ID from the guideboard 101. The receiver 200 transmits the light ID to a server. The receiver 200 obtains an AR image P2 and recognition information associated with the light ID from the server. The receiver 200 recognizes a region according to the recognition information as a target region from the captured display image Pb. For example, the receiver 200 recognizes a region in which a frame 102 in the guideboard 101 is shown as a target region. The frame 102 is for showing the waiting time of the facility. The receiver 200 superimposes the AR image P2 on the target region, and displays, on the display 201, the captured display image Pb on which the AR image P2 is superimposed. For example, the AR image P2 is an image which includes a character string "30 min.". In this case, the AR image P2 is superimposed on the target region of the captured display image Pb, and thus the receiver 200 can display the captured display image Pb as if the guideboard 101 showing the waiting time "30 min." were actually present. In this manner, the user of the receiver 200 can be readily and concisely informed of a waiting time without providing the guideboard 101 with a special display apparatus.

Figure 47:
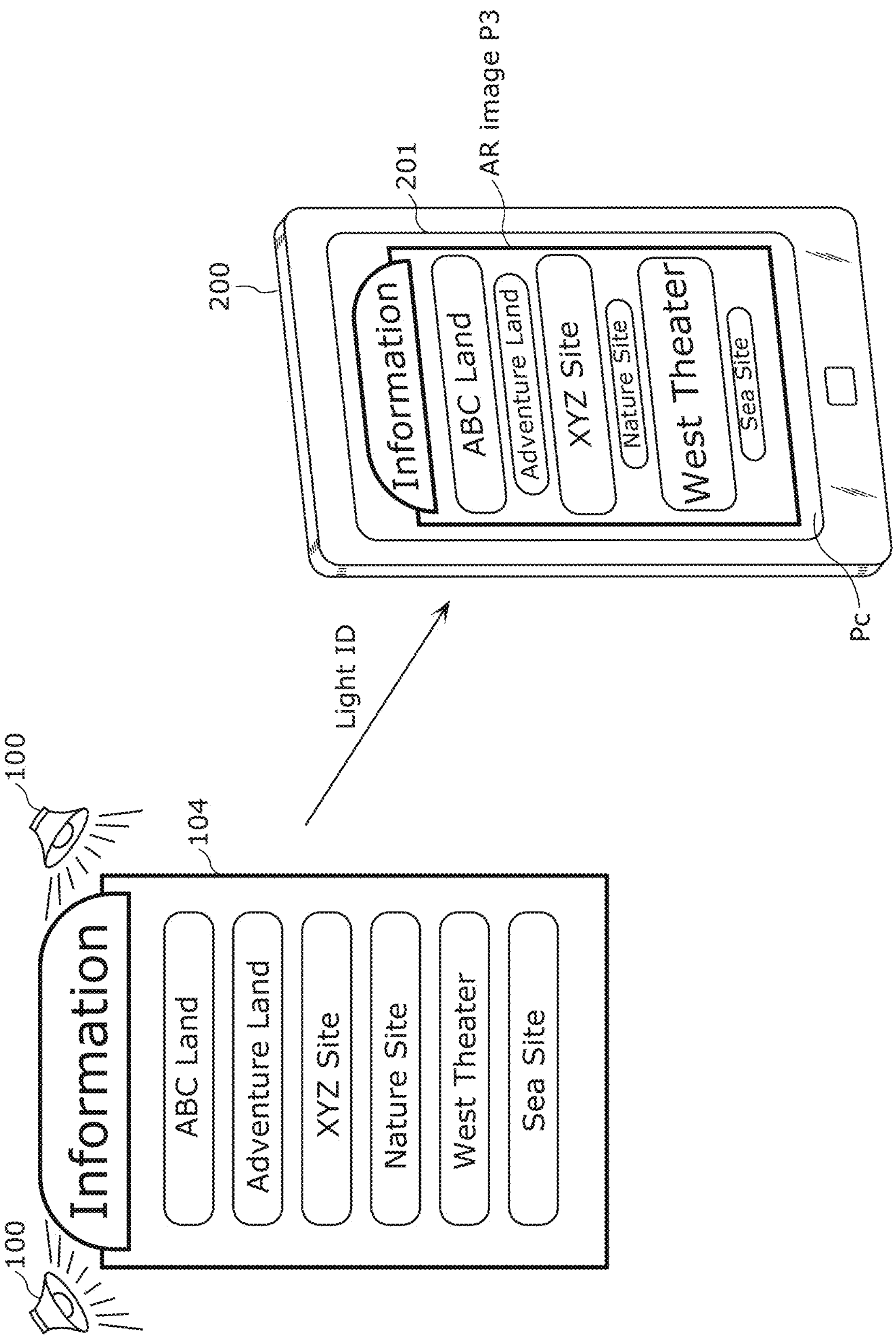
FIG. 47 is a diagram illustrating another example in which a receiver according to Embodiment 4 displays an AR image.

FIG. 47 is a diagram illustrating another example in which the receiver 200 according to the present embodiment displays an AR image.

The transmitters 100 are achieved by two lighting apparatuses, as illustrated in FIG. 47, for example. The transmitters 100 each transmit a light ID by changing luminance, while illuminating a guideboard 104 of a facility. Since the guideboard 104 is illuminated with light from the transmitters 100, the guideboard 104 changes luminance in the same manner as the transmitters 100, and transmits a light ID. The guideboard 104 shows the names of a plurality of facilities, such as "ABC Land" and "Adventure Land", for example.

The receiver 200 obtains a captured display image Pc and a decode target image by capturing an image of the guideboard 104 illuminated by the transmitters 100. The receiver 200 obtains a light ID by decoding the decode target image. In other words, the receiver 200 receives a light ID from the guideboard 104. The receiver 200 transmits the light ID to a server. Then, the receiver 200 obtains, from the server, an AR image P3 and recognition information associated with the light ID. The receiver 200 recognizes, as a target region, a region according to the recognition information from the captured display image Pc. For example, the receiver 200 recognizes a region in which the guideboard 104 is shown as a target region. Then, the receiver 200 superimposes the AR image P3 on the target region, and displays, on the display 201, the captured display image Pc on which the AR image P3 is superimposed. For example, the AR image P3 shows the names of a plurality of facilities. On the AR image P3, the longer the waiting time of a facility is, the smaller the name of the facility is displayed. Conversely, the shorter the waiting time of a facility is, the larger the name of the facility is displayed. In this case, the AR image P3 is superimposed on the target region of the captured display image Pc, and thus the receiver 200 can display the captured display image Pc as if the guideboard 104 showing the names of the facilities in sizes according to waiting time were actually present. Accordingly, the user of the receiver 200 can be readily and concisely informed of the waiting time of the facilities without providing the guideboard 104 with a special display apparatus.

Figure 48:
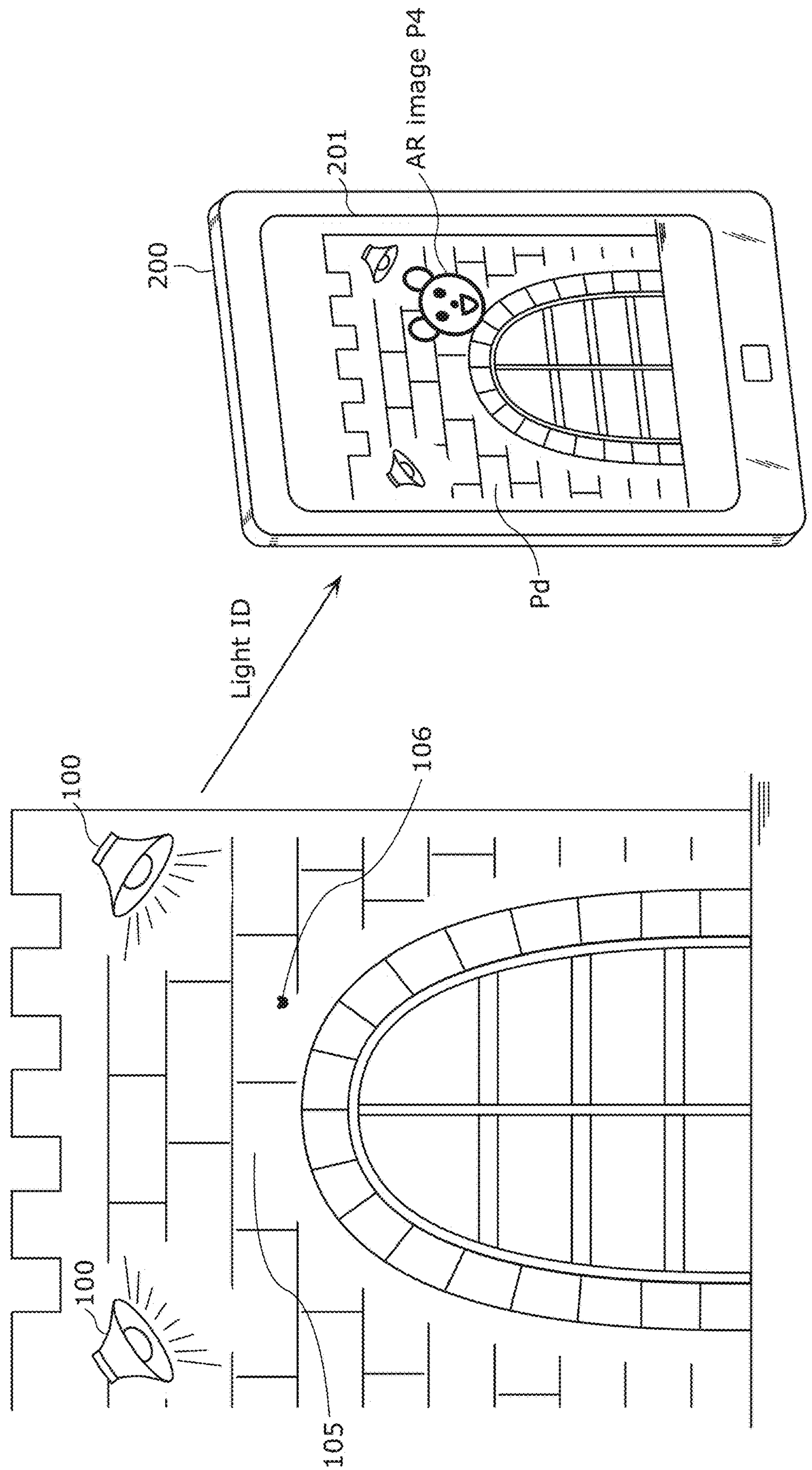
FIG. 48 is a diagram illustrating another example in which a receiver according to Embodiment 4 displays an AR image.

FIG. 48 is a diagram illustrating another example in which the receiver 200 according to the present embodiment displays an AR image.

The transmitters 100 are achieved by two lighting apparatuses, as illustrated in FIG. 48, for example. The transmitters 100 each transmit a light ID by changing luminance, while illuminating a rampart 105. Since the rampart 105 is illuminated with light from the transmitters 100, the rampart 105 changes luminance in the same manner as the transmitters 100, and transmits a light ID. For example, a small mark imitating the face of a character as a hidden character 106 is carved in the rampart 105.

The receiver 200 obtains a captured display image Pd and a decode target image by capturing an image of the rampart 105 illuminated by the transmitters 100, similarly to the above. The receiver 200 obtains a light ID by decoding the decode target image. In other words, the receiver 200 receives a light ID from the rampart 105. The receiver 200 transmits the light ID to a server. Then, the receiver 200 obtains an AR image P4 and recognition information associated with the light ID from the server. The receiver 200 recognizes a region according to the recognition information as a target region from the captured display image Pd. For example, the receiver 200 recognizes, as a target region, a region of the rampart 105 in which an area that includes the hidden character 106 is shown. The receiver 200 superimposes the AR image P4 on the target region, and displays, on the display 201, the captured display image Pd on which the AR image P4 is superimposed. For example, the AR image P4 is an imitation of the face of a character. The AR image P4 is sufficiently larger than the hidden character 106 shown on the captured display image Pd. In this case, the AR image P4 is superimposed on the target region of the captured display image Pd, and thus the receiver 200 can display the captured display image Pd as if the rampart 105 in which a large mark which is an imitation of a face of the character is carved were actually present. Accordingly, the user of the receiver 200 can be readily informed of the position of the hidden character 106.

Figure 49:
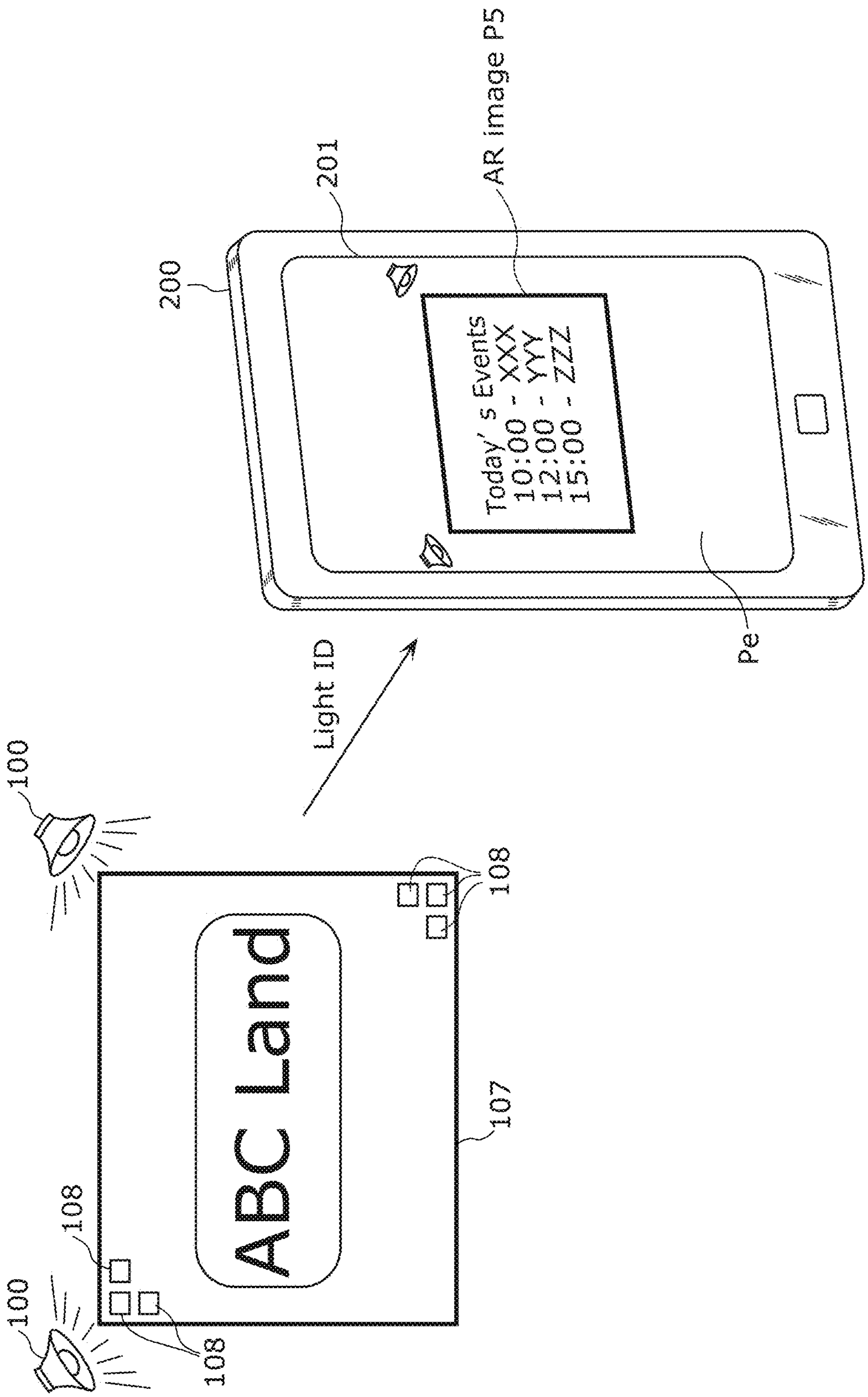
FIG. 49 is a diagram illustrating another example in which a receiver according to Embodiment 4 displays an AR image.

FIG. 49 is a diagram illustrating another example in which the receiver 200 according to the present embodiment displays an AR image.

The transmitters 100 are achieved by two lighting apparatuses as illustrated in FIG. 49, for example. The transmitters 100 each transmit a light ID by changing luminance while illuminating a guideboard 107 of a facility. Since the guideboard 107 is illuminated with light from the transmitters 100, the guideboard 107 changes luminance in the same manner as the transmitters 100, and transmits a light ID. Infrared barrier coating 108 is applied at a plurality of spots on the corners of the guideboard 107.

The receiver 200 obtains a captured display image Pe and a decode target image, by capturing an image of the guideboard 107 illuminated by the transmitters 100, similarly to the above. The receiver 200 obtains a light ID by decoding the decode target image. In other words, the receiver 200 receives a light ID from the guideboard 107. The receiver 200 transmits the light ID to a server. Then, the receiver 200 obtains an AR image P5 and recognition information associated with the light ID from the server. The receiver 200 recognizes a region according to the recognition information as a target region from the captured display image Pe. For example, the receiver 200 recognizes, as a target region, a region in which the guideboard 107 is shown.

Specifically, the recognition information indicates that a quadrilateral circumscribing the plurality spots to which the infrared barrier coating 108 is applied is a target region. Furthermore, the infrared barrier coating 108 blocks infrared radiation included in the light emitted from the transmitters 100. Accordingly, the image sensor of the receiver 200 recognizes the spots to which the infrared barrier coating 108 is applied as images darker than the peripheries of the images. The receiver 200 recognizes, as a target region, a quadrilateral circumscribing the plurality of spots to which the infrared barrier coating 108 is applied and which appear as dark images.

The receiver 200 superimposes the AR image P5 on the target region, and displays, on the display 201, the captured display image Pe on which the AR image P5 is superimposed. For example, the AR image P5 shows a schedule of events which take place at the facility indicated by the guideboard 107. In this case, the AR image P5 is superimposed on the target region of the captured display image Pe, and thus the receiver 200 can display the captured display image Pe as if the guideboard 107 showing the schedule of events were actually present. Accordingly, the user of the receiver 200 can be concisely informed of the schedule of events at the facility, without providing the guideboard 107 with a special display apparatus.

Note that infrared reflective paint may be applied to the guideboard 107, instead of the infrared barrier coating 108. The infrared reflective paint reflects infrared radiation included in light emitted from the transmitters 100. Thus, the image sensor of the receiver 200 recognizes the spots to which the infrared reflective paint is applied as images brighter than the peripheries of the images. Specifically, in this case, the receiver 200 recognizes, as a target region, a quadrilateral circumscribing the spots to which the infrared reflective paint is applied and which appear as bright images.

Figure 50:
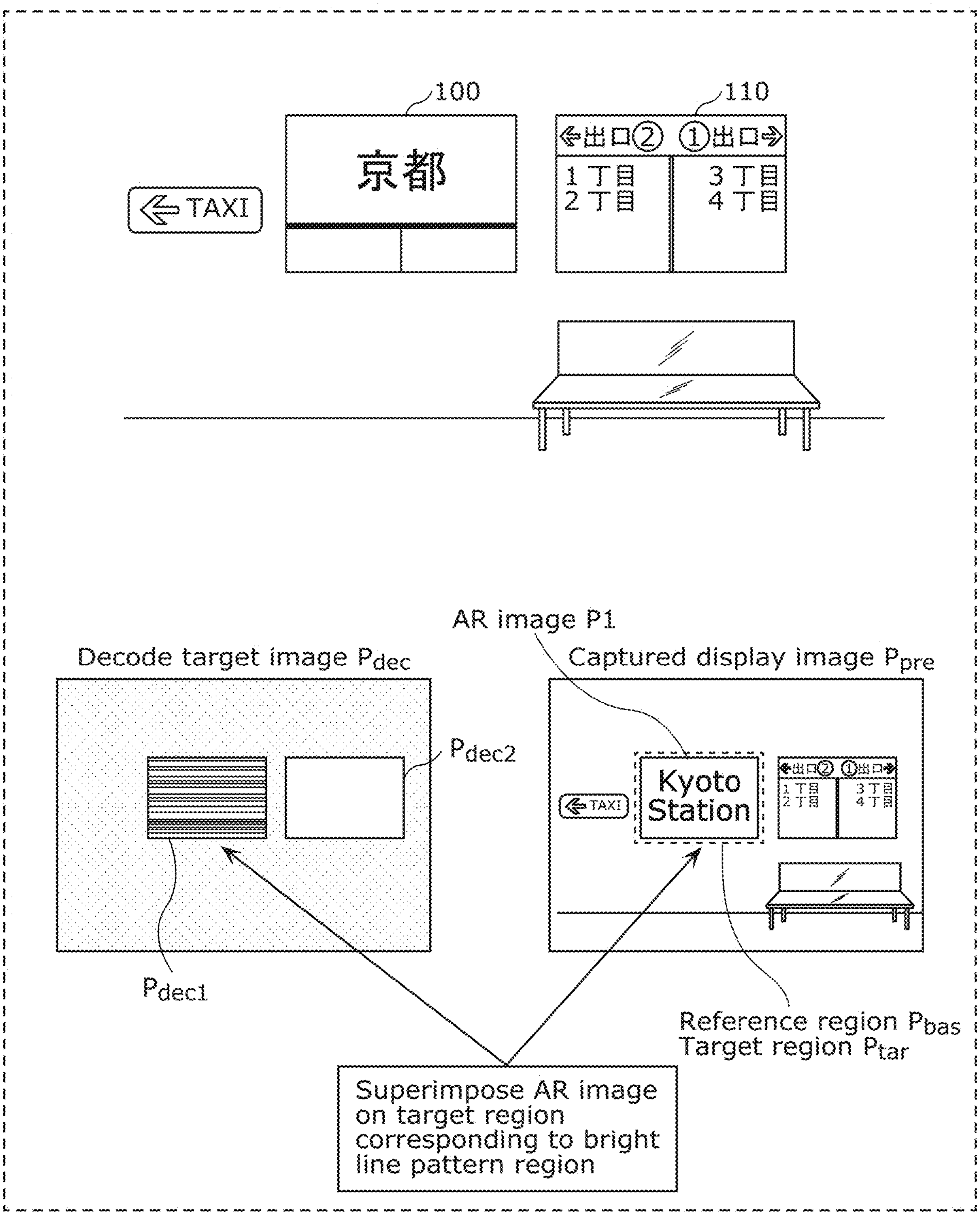
FIG. 50 is a diagram illustrating another example in which a receiver according to Embodiment 4 displays an AR image.

FIG. 50 is a diagram illustrating another example in which the receiver 200 according to the present embodiment displays an AR image.

The transmitter 100 is configured as a station sign, and is disposed near a station exit guide 110. The station exit guide 110 includes a light source and emits light, but does not transmit a light ID, unlike the transmitter 100.

The receiver 200 obtains a captured display image Ppre and a decode target image Pdec, by capturing an image which includes the transmitter 100 and the station exit guide 110. The transmitter 100 changes luminance, and the station exit guide 110 is emitting light, and thus a bright line pattern region Pdec1 corresponding to the transmitter 100 and a bright region Pdec2 corresponding to the station exit guide 110 appear in the decode target image Pdec. The bright line pattern region Pdec1 includes a pattern formed by a plurality of bright lines which appear due to a plurality of exposure lines included in the image sensor of the receiver 200 being exposed for the communication exposure time.

Here, identification information includes, as described above, reference information for locating a reference region Pbas of the captured display image Ppre, and target information which indicates a relative position of a target region Ptar with reference to the reference region Pbas. For example, the reference information indicates that the position of the reference region Pbas in the captured display image Ppre matches the position of the bright line pattern region Pdec1 in the decode target image Pdec. Furthermore, the target information indicates that the position of a target region is the position of the reference region.

Thus, the receiver 200 locates the reference region Pbas from the captured display image Ppre, based on the reference information. Specifically, the receiver 200 locates, as the reference region Pbas, a region of the captured display image Ppre which is in the same position as the position of the bright line pattern region Pdec1 in the decode target image Pdec. Furthermore, the receiver 200 recognizes, as the target region Ptar, a region of the captured display images Ppre which is in the relative position indicated by the target information with respect to the position of the reference region Pbas. In the above example, the target information indicates that the position of the target region Ptar is the position of the reference region Pbas. Thus, the receiver 200 recognizes the reference region Pbas of the captured display images Ppre as the target region Ptar.

The receiver 200 superimposes the AR image P1 on the target region Ptar in the captured display image Ppre.

Accordingly, in the above example, the receiver 200 uses the bright line pattern region Pdec1 to recognize the target region Ptar. On the other hand, if a region in which the transmitter 100 is shown is to be recognized as the target region Ptar only from the captured display image Ppre, without using the bright line pattern region Pdec1, the receiver 200 may incorrectly recognize the region. Specifically, in the captured display images Ppre, the receiver 200 may incorrectly recognize a region in which the station exit guide 110 is shown, as the target region Ptar, rather than a region in which the transmitter 100 is shown. This is because the image of the transmitter 100 and the image of the station exit guide 110 in the captured display image Ppre are similar to each other. However, if the bright line pattern region Pdec1 is used as in the above example, the receiver 200 can accurately recognize the target region Ptar while preventing incorrect recognition.

Figure 51:
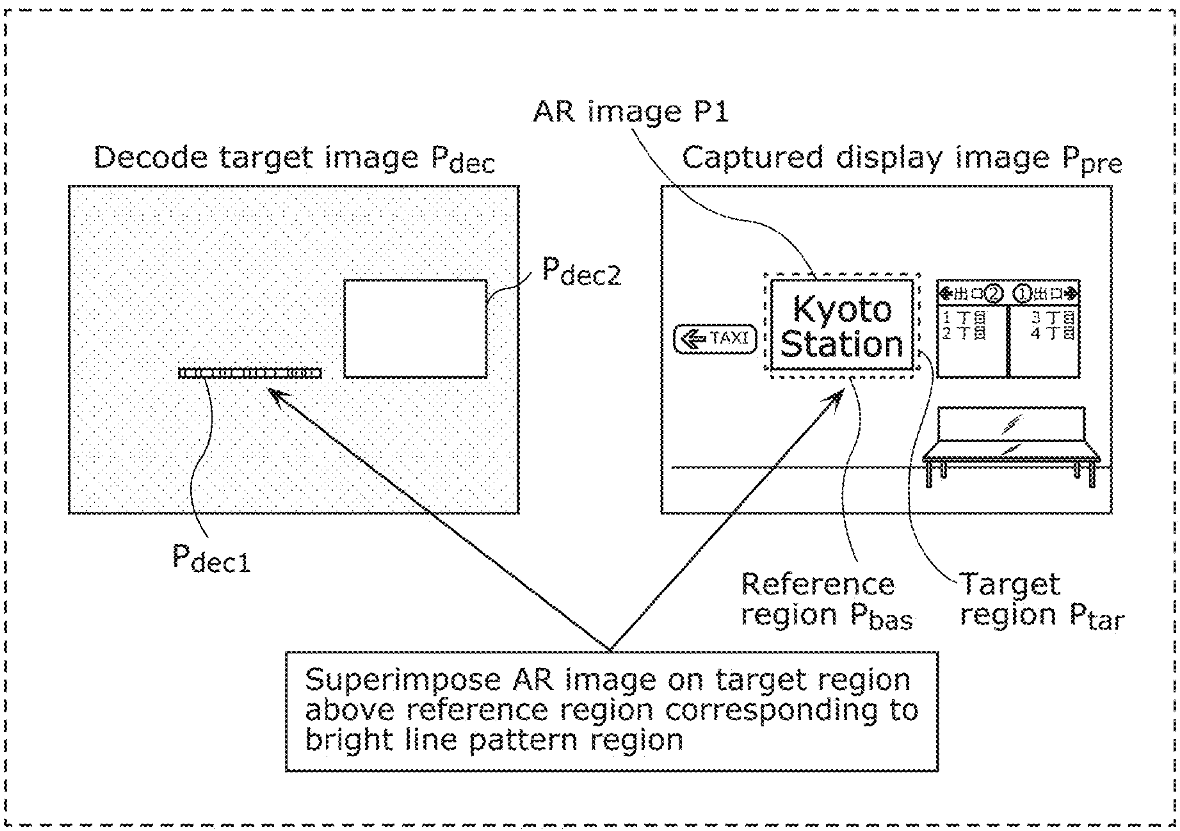
FIG. 51 is a diagram illustrating another example in which a receiver according to Embodiment 4 displays an AR image.

FIG. 51 is a diagram illustrating another example in which the receiver 200 according to the present embodiment displays an AR image.

In the example illustrated in FIG. 50, the transmitter 100 transmits a light ID by changing luminance of the entire station sign, and target information indicates that the position of the target region is the position of the reference region. However, in the present embodiment, the transmitter 100 may transmit a light ID by changing luminance of light emitting elements disposed on a portion of the outer frame of the station sign, without changing luminance of the entire station sign. Target information may indicate the relative position of the target region Ptar with respect to the reference region Pbas, and for example, the position of the target region Ptar is above the reference region Pbas (specifically, above in the vertical direction).

In the example illustrated in FIG. 51, the transmitter 100 transmits a light ID by changing luminance of light emitting elements horizontally disposed along a lower portion of the outer frame of the station sign. Target information indicates that the position of the target region Ptar is above the reference region Pbas.

In such a case, the receiver 200 locates the reference region Pbas from the captured display image Ppre, based on reference information. Specifically, the receiver 200 locates, as the reference region Pbas, a region of the captured display image Ppre which is in the same position as the position of the bright line pattern region Pdec1 in the decode target image Pdec. Specifically, the receiver 200 locates the reference region Pbas in a quadrilateral shape which is horizontally long and vertically short. Furthermore, the receiver 200 recognizes, as the target region Ptar, a region of the captured display image Ppre which is in a relative position indicated by the target information, based on the position of the reference region Pbas. Specifically, the receiver 200 recognizes a region of the captured display image Ppre which is above the reference region Pbas, as the target region Ptar. Note that at this time, the receiver 200 determines an upward direction from the reference region Pbas, based on the gravity direction measured by the acceleration sensor included in the receiver 200.

Note that the target information may indicate the size, the shape, and the aspect ratio of the target region Ptar, rather than just the relative position of the target region Ptar. In this case, the receiver 200 recognizes the target region Ptar having the size, the shape, and the aspect ratio indicated by the target information. The receiver 200 may determine the size of the target region Ptar, based on the size of the reference region Pbas.

Figure 52:
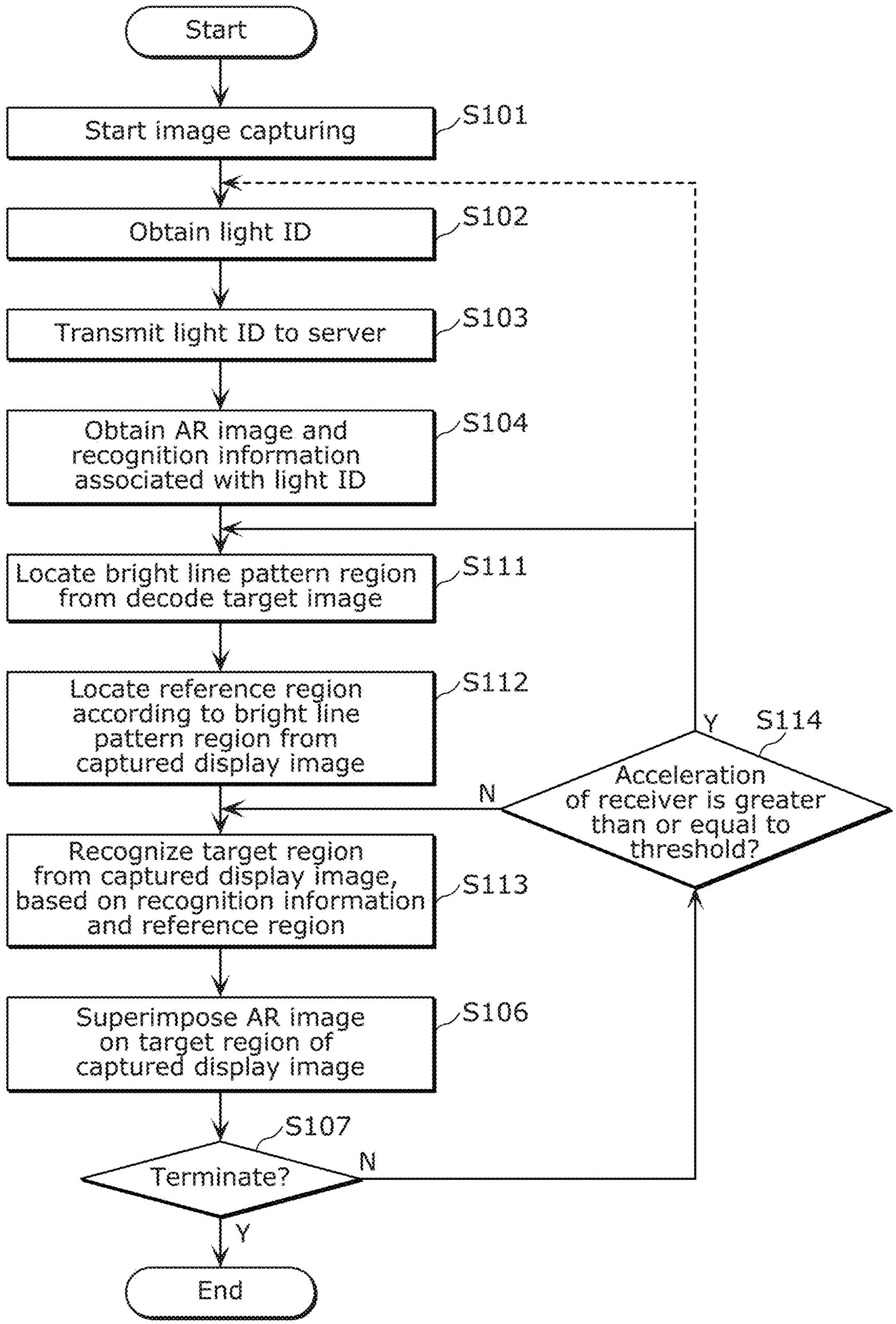
FIG. 52 is a flowchart illustrating another example of processing operation by a receiver according to Embodiment 4.

FIG. 52 is a flowchart illustrating another example of processing operation by the receiver 200 according to the present embodiment.

The receiver 200 executes processing of steps S101 to S104, similarly to the example illustrated in FIG. 45.

Next, the receiver 200 locates the bright line pattern region Pdec1 from the decode target image Pdec (step S111). Next, the receiver 200 locates the reference region Pbas corresponding to the bright line pattern region Pdec1 from the captured display image Ppre (step S112). Then, the receiver 200 recognizes the target region Ptar from the captured display image Ppre, based on recognition information (specifically, target information) and the reference region Pbas (step S113).

Next, the receiver 200 superimposes an AR image on the target region Ptar of the captured display image Ppre, and displays the captured display image Ppre on which the AR image is superimposed, similarly to the example illustrated in FIG. 45 (step S106). Then, the receiver 200 determines whether image capturing and the display of the captured display image Ppre are to be terminated (step S107). Here, if the receiver 200 determines that image capturing and the display are not to be terminated (N in step S107), the receiver 200 further determines whether the acceleration of the receiver 200 is greater than or equal to a threshold (step S114). The acceleration is measured by the acceleration sensor included in the receiver 200. If the receiver 200 determines that the acceleration is less than the threshold (N in step S114), the receiver 200 executes processing from step S113. Accordingly, even if the captured display image Ppre displayed on the display 201 of the receiver 200 is displaced, the AR image can be caused to follow the target region Ptar of the captured display image Ppre. If the receiver 200 determines that the acceleration is greater than or equal to the threshold (Y in step S114), the receiver 200 executes processing from step S111 or S102. In this manner, the receiver 200 can be prevented from incorrectly recognizing, as the target region Ptar, a region in which a subject (for example, the station exit guide 110) different from the transmitter 100 is shown.

Figure 53:
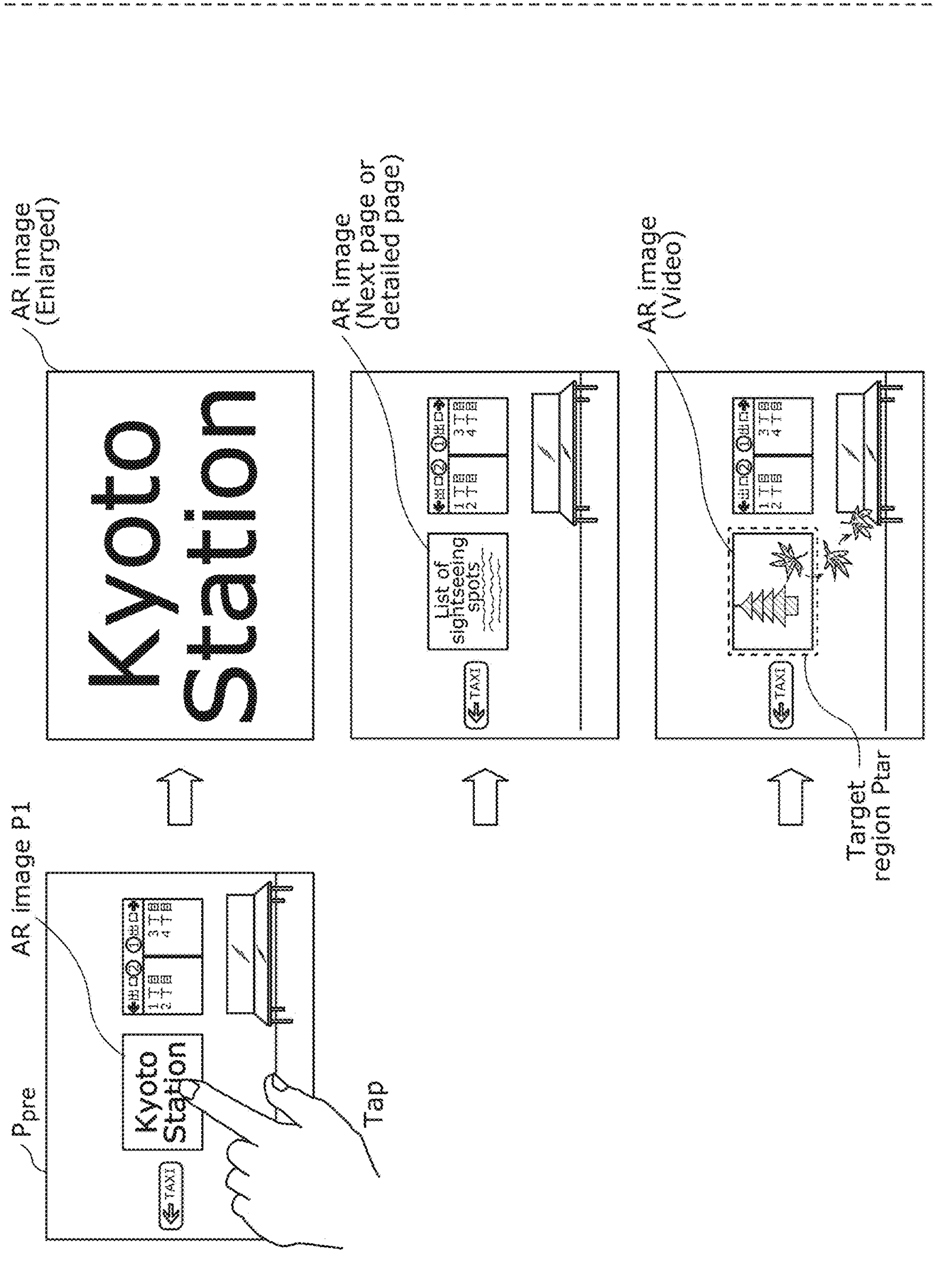
FIG. 53 is a diagram illustrating another example in which a receiver according to Embodiment 4 displays an AR image.

FIG. 53 is a diagram illustrating another example in which the receiver 200 according to the present embodiment displays an AR image.

The receiver 200 enlarges and displays an AR image P1, if the user taps the AR image P1 in a captured display image Ppre displayed. Furthermore, if the user taps the AR image P1, the receiver 200 may display a new AR image showing a more detailed content than the content shown by the AR image P1, instead of the AR image P1. If the AR image P1 shows one-page worth information of a guide magazine which includes a plurality of pages, the receiver 200 may display a new AR image showing information of the next page of the page shown by the AR image P1, instead of the AR image P1. Alternatively, when the user taps the AR image P1, the receiver 200 may display, as a new AR image, a video relevant to the AR image P1, instead of the AR image P1. At this time, the receiver 200 may display a video showing that, for instance, an object (autumn leaves in the example of FIG. 53) moves out of the target region Ptar, as an AR image.

Figure 54:
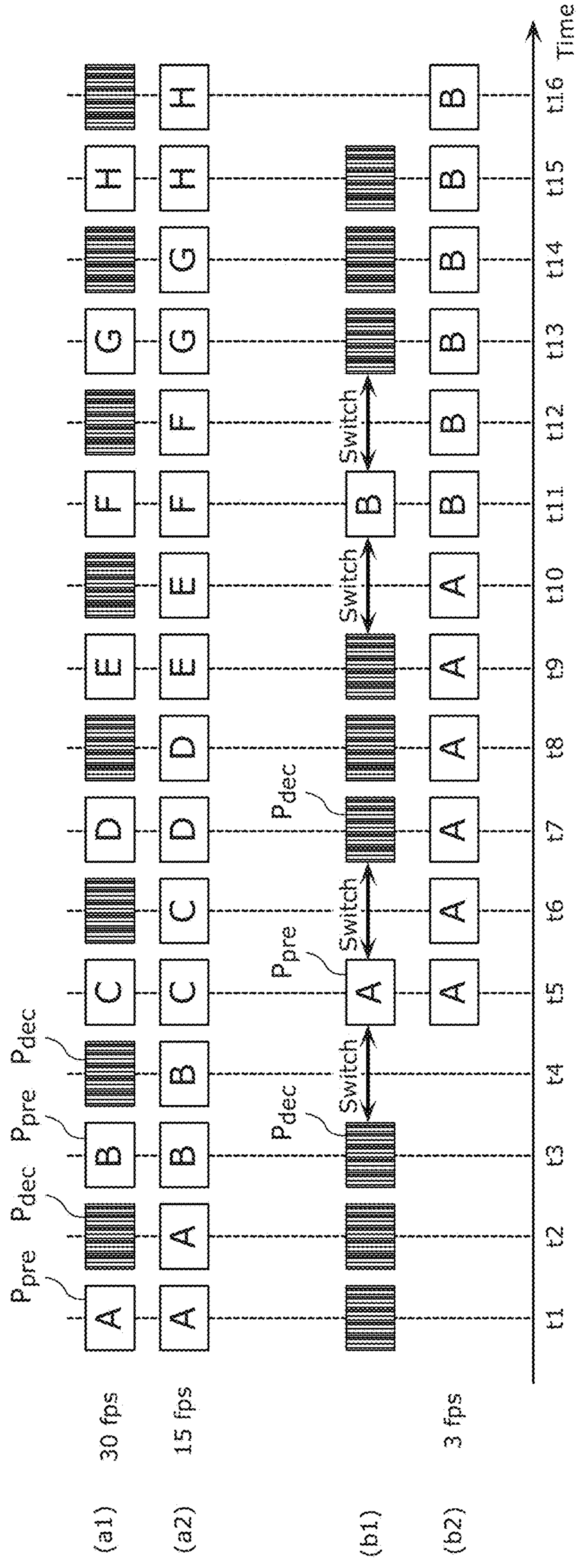
FIG. 54 is a diagram illustrating captured display images Ppre and decode target images Pdec obtained by a receiver according to Embodiment 4 capturing images.

FIG. 54 is a diagram illustrating captured display images Ppre and decode target images Pdec obtained by the receiver 200 according to the present embodiment capturing images.

While capturing images, the receiver 200 obtains captured images such as captured display images Ppre and decode target images Pdec at a frame rate of 30 fps, as illustrated in (a1) in FIG. 54, for example. Specifically, the receiver 200 obtains the captured display images Ppre and the decode target images Pdec alternately, so as to obtain a captured display image Ppre "A" at time t1, obtain a decode target image Pdec at time t2, and obtain a captured display image Ppre "B" at time t3.

When displaying captured images, the receiver 200 displays only the captured display images Ppre among the captured images, and does not display the decode target images Pdec. Specifically, when the receiver 200 is to obtain a decode target image Pdec, the receiver 200 displays a captured display image Ppre obtained immediately before the decode target image Pdec, as illustrated in (a2) of FIG. 54, instead of the decode target image Pdec. Specifically, the receiver 200 displays the obtained captured display image Ppre "A" at time t1, and again displays, at time t2, the captured display image Ppre "A" obtained at time t1. In this manner, the receiver 200 displays the captured display images Ppre at a frame rate of 15 fps.

Here, in the example illustrated in (a1) of FIG. 54, the receiver 200 alternately obtains the captured display images Ppre and the decode target images Pdec, yet in the present embodiment, the way of obtaining images is not limited to the above. Specifically, the receiver 200 may continuously obtain N decode target images Pdec (N is an integer of 1 or more), and thereafter may repeatedly and continuously obtain M captured display images Ppre (M is an integer of 1 or more).

Further, the receiver 200 needs to switch a captured image to be obtained between the captured display image Ppre and the decode target image Pdec, and the switching may take time. In view of this, as illustrated in (b1) of FIG. 54, the receiver 200 may provide a switching period for when switching between obtaining the captured display image Ppre and obtaining the decode target image Pdec. Specifically, if the receiver 200 obtains a decode target image Pdec at time t3, in a switching period between time t3 and time t5, the receiver 200 executes processing for switching between captured images, and obtains the captured display image Ppre "A" at time t5. After that, in a switching period between time t5 and time t7, the receiver 200 executes processing for switching between captured images, and obtains the decode target image Pdec at time t7.

If switching periods are provided in such a manner, the receiver 200 displays, in a switching period, a captured display image Ppre obtained immediately before, as illustrated in (b2) of FIG. 54. Accordingly, in this case, the frame rate at which the captured display images Ppre are displayed is low in the receiver 200, and is 3 fps, for example. Accordingly, when the frame rate is low, even if the user moves the receiver 200, the displayed captured display image Ppre may not move according to the movement of the receiver 200. Specifically, the captured display image Ppre is not displayed in live view. Then, the receiver 200 may move the captured display image Ppre according to the movement of the receiver 200.

Figure 55:
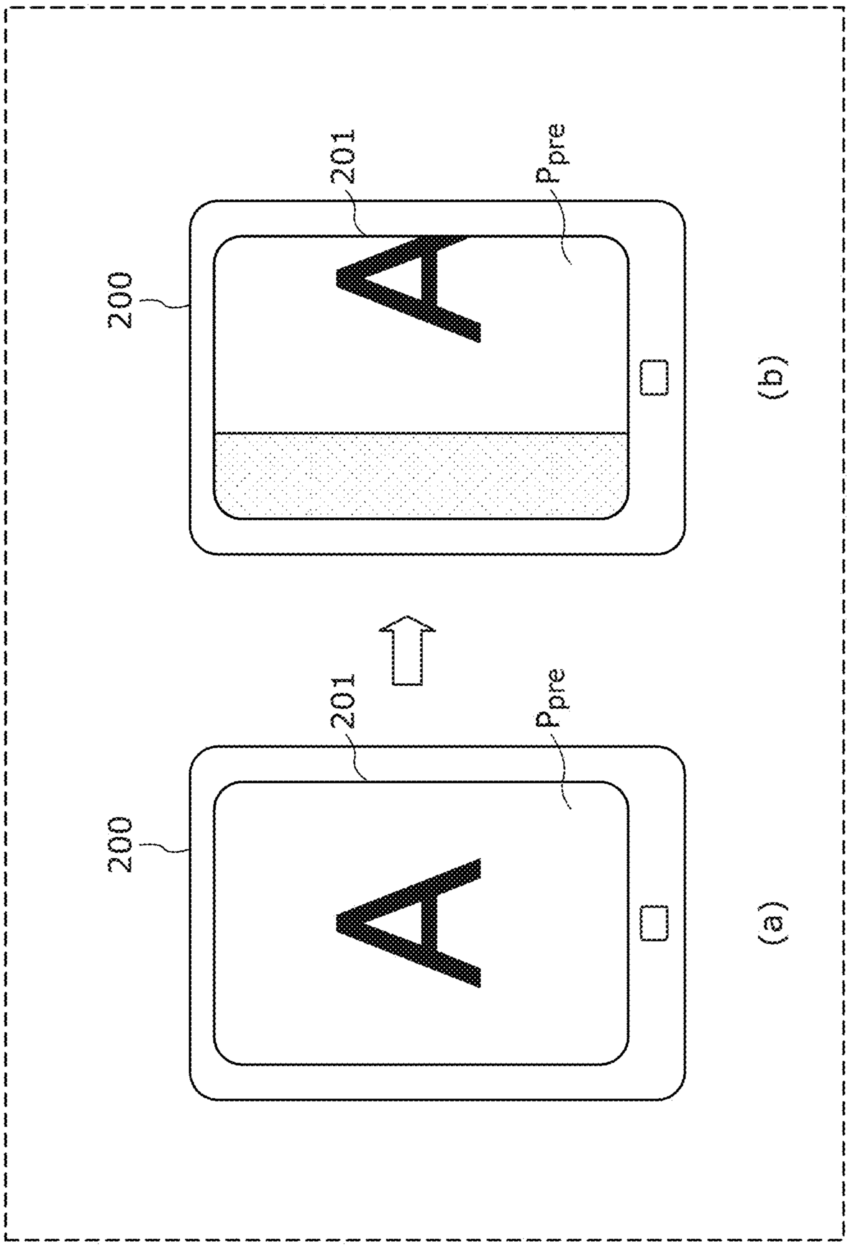
FIG. 55 is a diagram illustrating an example of a captured display image Ppre displayed on a receiver according to Embodiment 4.

FIG. 55 is a diagram illustrating an example of the captured display image Ppre displayed on the receiver 200 according to the present embodiment.

The receiver 200 displays, on the display 201, a captured display image Ppre obtained by image capturing, as illustrated in (a) of FIG. 55, for example. Here, a user moves the receiver 200 to the left. At this time, if a new captured display image Ppre is not obtained by the receiver 200 capturing an image, the receiver 200 moves the displayed captured display image Ppre to the right, as illustrated in (b) of FIG. 55. Specifically, the receiver 200 includes an acceleration sensor, and according to the acceleration measured by the acceleration sensor, moves the displayed captured display image Ppre in conformity with the movement of the receiver 200. In this manner, the receiver 200 can display the captured display image Ppre as a pseudo live view.

Figure 56:
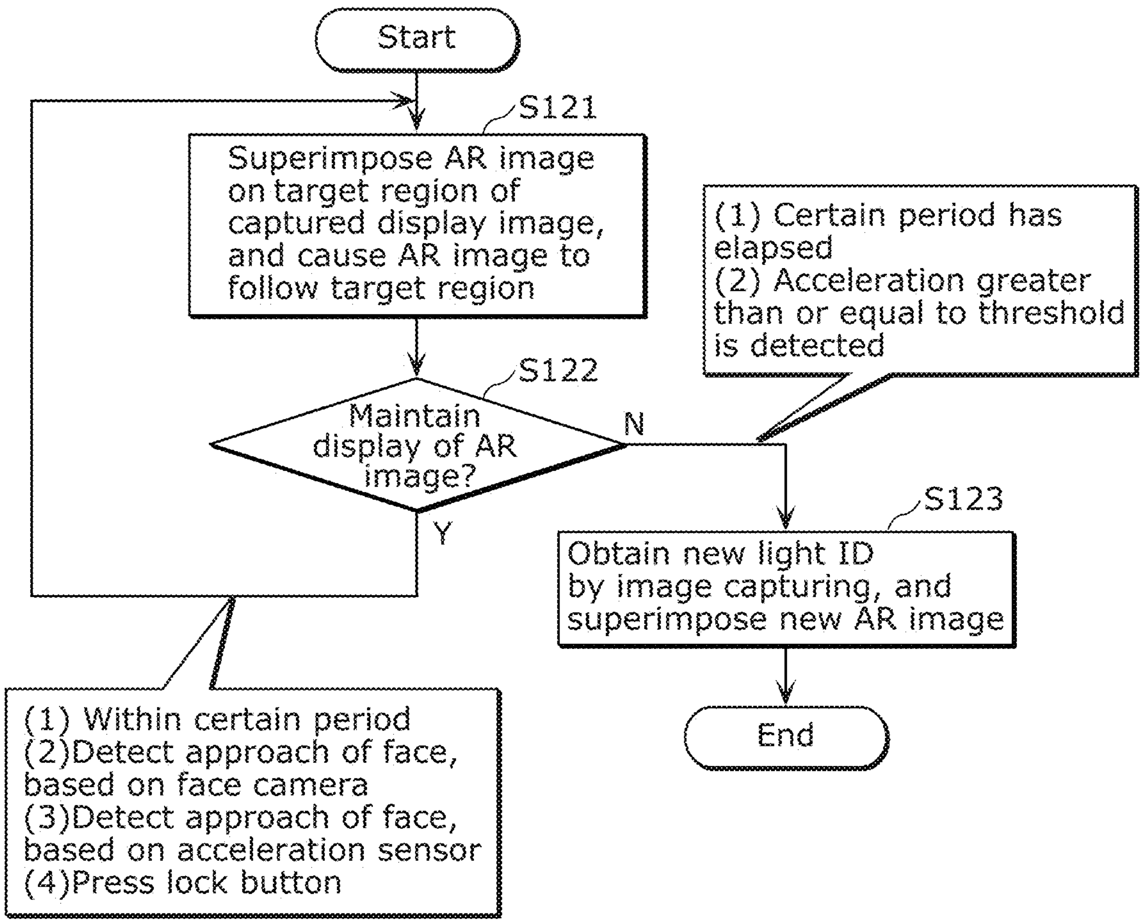
FIG. 56 is a flowchart illustrating another example of processing operation by a receiver according to Embodiment 4.

FIG. 56 is a flowchart illustrating another example of a processing operation by the receiver 200 according to the present embodiment.

The receiver 200 first superimposes an AR image on a target region Ptar of a captured display image Ppre, and causes the AR image to follow the target region Ptar similarly to the above (step S122). Specifically, the receiver 200 displays an AR image which moves together with the target region Ptar of the captured display image Ppre. Then, the receiver 200 determines whether to maintain the display of the AR image (step S122). Here, if the receiver 200 determines that the display of the AR image is not to be maintained (N in step S122), and if the receiver 200 obtains a new light ID by image capturing, the receiver 200 displays the captured display image Ppre on which a new AR image associated with the new light ID is superimposed (step S123).

On the other hand, if the receiver 200 determines to maintain the display of the AR image (Y in step S122), the receiver 200 repeatedly executes processing from step S121. At this time, even if the receiver 200 has obtained another AR image, the receiver 200 does not display the other AR image. Alternatively, even if the receiver 200 has obtained a new decode target image Pdec, the receiver 200 does not obtain a light ID by decoding the decode target image Pdec. At this time, power consumption involving decoding can be reduced.

Accordingly, maintaining the display of an AR image prevents the displayed AR image from disappearing or being not to be readily viewed due to the display of another AR image. In other words, the displayed AR image can be readily viewed by the user.

For example, in step S122, the receiver 200 determines to maintain the display of an AR image until a predetermined period (certain period) elapses after the AR image is displayed. Specifically, when the receiver 200 displays the captured display image Ppre, while preventing a second AR image different from a first AR image superimposed in step S121 from being displayed, the receiver 200 displays the first AR image for a predetermined display period. The receiver 200 may prohibit decoding a decode target image Pdec newly obtained, during the display period.

Accordingly, when the user is looking at the first AR image once displayed, the first AR image is prevented from being immediately replaced with the second AR image different from the first AR image. Furthermore, decoding a newly obtained decode target image Pdec is wasteful processing when the display of the second AR image is prevented, and thus prohibiting such decoding can reduce power consumption.

Alternatively, in step S122, if the receiver 200 includes a face camera, and detects that the face of a user is approaching, based on the result of image capturing by the face camera, the receiver 200 may determine to maintain the display of the AR image. Specifically, when the receiver 200 displays the captured display image Ppre, the receiver 200 further determines whether the face of the user is approaching the receiver 200, based on image capturing by the face camera included in the receiver 200. Then, when the receiver 200 determines that the face is approaching, the receiver 200 displays the first AR image superimposed in step S121 while preventing the display of the second AR image different from the first AR image.

Alternatively, in step S122, if the receiver 200 includes an acceleration sensor, and detects that the face of the user is approaching, based on the result of measurement by the acceleration sensor, the receiver 200 may determine to maintain the display of the AR image. Specifically, when the receiver 200 is to display the captured display image Ppre, the receiver 200 further determines whether the face of the user is approaching the receiver 200, based on the acceleration of the receiver 200 measured by the acceleration sensor. For example, if the acceleration of the receiver 200 measured by the acceleration sensor indicates a positive value in a direction outward and perpendicular to the display 201 of the receiver 200, the receiver 200 determines that the face of the user is approaching. If the receiver 200 determines that the face of the user is approaching, while preventing the display of a second AR image different from a first AR image that is an AR image superimposed in step S121, the receiver 200 displays the first AR image.

In this manner, when the user brings his/her face closer to the receiver 200 to look at the first AR image, the first AR image can be prevented from being replaced with the second AR image different from the first AR image.

Alternatively, in step S122, the receiver 200 may determine that display of the AR image is to be maintained if a lock button included in the receiver 200 is pressed.

In step S122, the receiver 200 may determine that display of the AR image is not to be maintained after the above-mentioned certain period (namely, display period) elapses. Even before the above-mentioned certain period has elapsed, the receiver 200 may determine that display of the AR image is not to be maintained if the acceleration sensor measures an acceleration greater than or equal to the threshold. Specifically, when the receiver 200 is to display the captured display image Ppre, the receiver 200 further measures the acceleration of the receiver 200 using the acceleration sensor in the above-mentioned display period, and determines whether the measured acceleration is greater than or equal to the threshold. When the receiver 200 determines that the acceleration is greater than or equal to the threshold, the receiver 200 displays, in step S123, the second AR image instead of the first AR image, by no longer preventing display of the second AR image.

Accordingly, when the acceleration of the display apparatus greater than or equal to the threshold is measured, the display of the second AR image is no longer prevented. Thus, for example, when the user greatly moves the receiver 200 to direct the image sensor to another subject, the receiver 200 can immediately display the second AR image.

Figure 57:
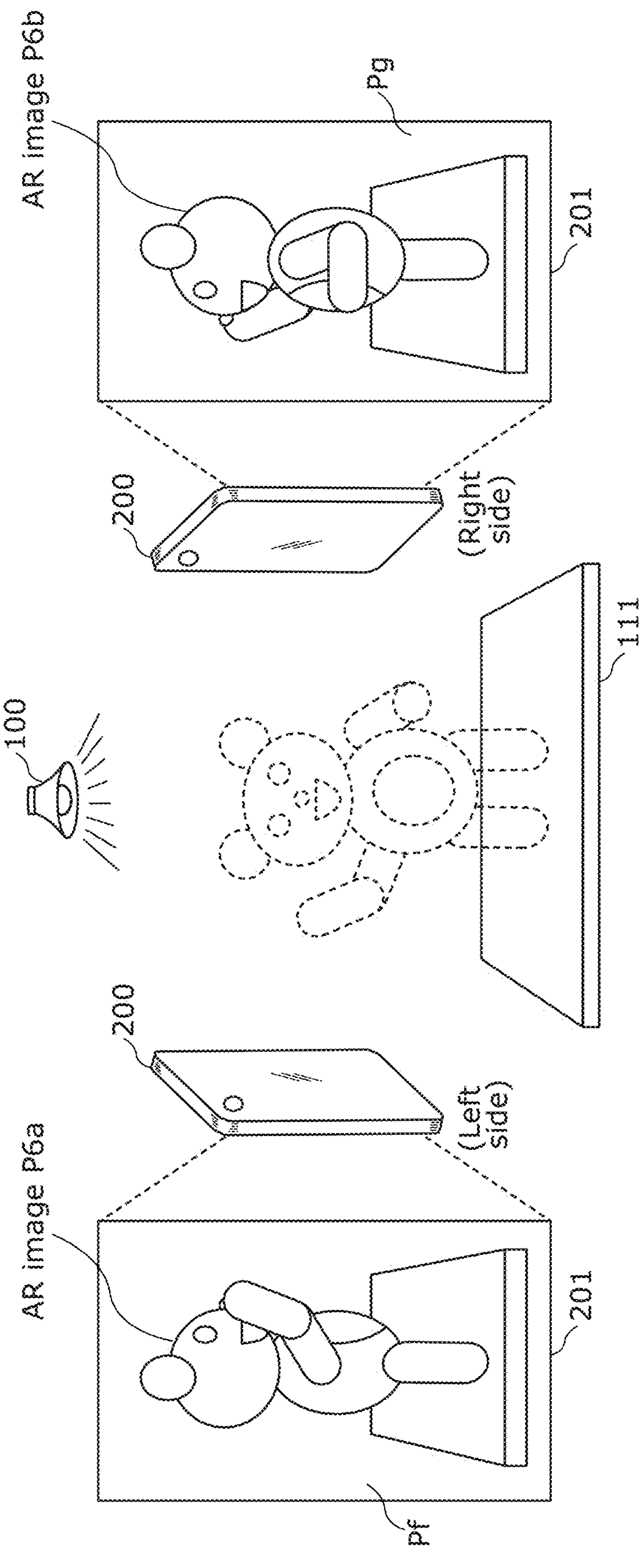
FIG. 57 is a diagram illustrating another example in which a receiver according to Embodiment 4 displays an AR image.

FIG. 57 is a diagram illustrating another example in which the receiver 200 according to the present embodiment displays an AR image.

As illustrated in FIG. 57, the transmitter 100 is, for example, configured as a lighting apparatus, and transmits a light ID by changing luminance while illuminating a stage 111 for a small doll. The stage 111 is illuminated with light from the transmitter 100, and thus changes luminance in the same manner as the transmitter 100, and transmits a light ID.

The two receivers 200 capture images of the stage 111 illuminated by the transmitter 100 from lateral sides.

The receiver 200 on the left among the two receivers 200 obtains a captured display image Pf and a decode target image similarly to the above, by capturing an image of the stage 111 illuminated by the transmitter 100 from the left. The left receiver 200 obtains a light ID by decoding the decode target image. In other words, the left receiver 200 receives a light ID from the stage 111. The left receiver 200 transmits the light ID to the server. Then, the left receiver 200 obtains a three-dimensional AR image and recognition information associated with the light ID from the server. The three-dimensional AR image is for displaying a doll three-dimensionally, for example. The left receiver 200 recognizes a region according to the recognition information as a target region, from the captured display images Pf. For example, the left receiver 200 recognizes a region above the center of the stage 111 as a target region.

Next, based on the orientation of the stage 111 shown in the captured display image Pf, the left receiver 200 generates a two-dimensional AR image P6*a* according to the orientation from the three-dimensional AR image. The left receiver 200 superimposes the two-dimensional AR image P6*a* on the target region, and displays, on the display 201, the captured display image Pf on which the AR image P6*a* is superimposed. In this case, the two-dimensional AR image P6*a* is superimposed on the target region of the captured display image Pf, and thus the left receiver 200 can display the captured display image Pf as if a doll were actually present on the stage 111.

Similarly, the receiver 200 on the right among the two receivers 200 obtains a captured display image Pg and a decode target image similarly to the above, by capturing an image of the stage 111 illuminated by the transmitter 100 from the right side. The right receiver 200 obtains a light ID by decoding the decode target image. In other words, the right receiver 200 receives a light ID from the stage 111. The right receiver 200 transmits the light ID to the server. The right receiver 200 obtains a three-dimensional AR image and recognition information associated with the light ID from the server. The right receiver 200 recognizes a region according to the recognition information as a target region from the captured display image Pg. For example, the right receiver 200 recognizes a region above the center of the stage 111 as a target region.

Next, based on an orientation of the stage 111 shown in the captured display image Pg, the right receiver 200 generates a two-dimensional AR image P6*b* according to the orientation from the three-dimensional AR image. The right receiver 200 superimposes the two-dimensional AR image P6*b* on the target region, and displays, on the display 201, the captured display image Pg on which the AR image P6*b* is superimposed. In this case, the two-dimensional AR image P6*b* is superimposed on the target region of the captured display image Pg, and thus the right receiver 200 can display the captured display image Pg as if a doll were actually present on the stage 111.

Accordingly, the two receivers 200 display the AR images P6*a* and P6*b* at the same position on the stage 111. The AR images P6*a* and P6*b* are generated according to the orientation of the receiver 200, as if a virtual doll were actually facing in a predetermined direction. Accordingly, no matter what direction an image of the stage 111 is captured from, a captured display image can be displayed as if a doll were actually present on the stage 111.

Note that in the above example, the receiver 200 generates a two-dimensional AR image according to the positional relationship between the receiver 200 and the stage 111, from a three-dimensional AR image, but may obtain the two-dimensional AR image from the server. Specifically, the receiver 200 transmits information indicating the positional relationship to a server together with a light ID, and obtains the two-dimensional AR image from the server, instead of the three-dimensional AR image. Accordingly, the burden on the receiver 200 is decreased.

Figure 58:
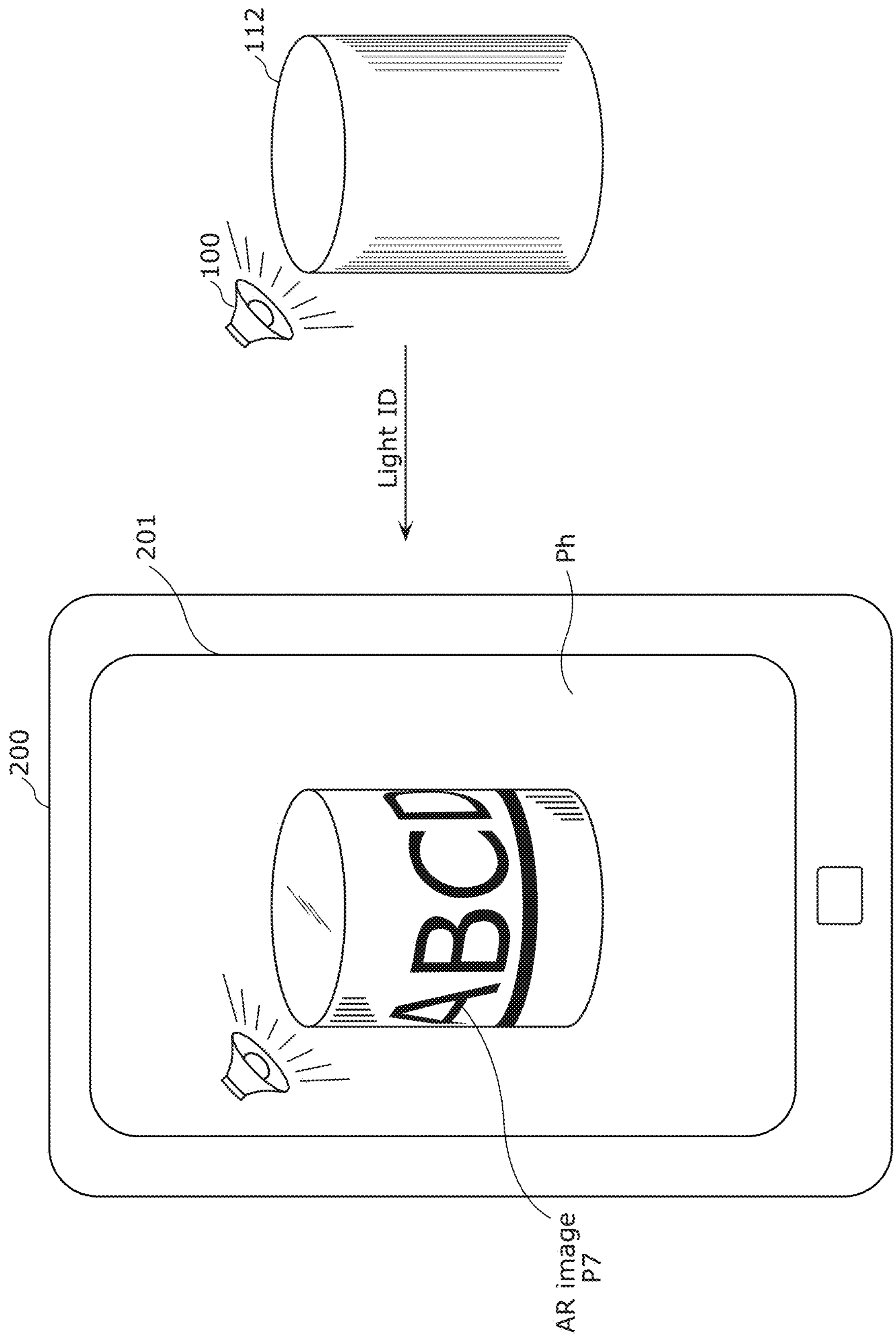
FIG. 58 is a diagram illustrating another example in which a receiver according to Embodiment 4 displays an AR image.

FIG. 58 is a diagram illustrating another example in which the receiver 200 according to the present embodiment displays an AR image.

The transmitter 100 is configured as a lighting apparatus, and transmits a light ID by changing luminance while illuminating a cylindrical structure 112 as illustrated in FIG. 58, for example. The structure 112 is illuminated with light from the transmitter 100, and thus changes luminance in the same manner as the transmitter 100, and transmits a light ID.

The receiver 200 obtains a captured display image Ph and a decode target image, by capturing an image of the structure 112 illuminated by the transmitter 100, similarly to the above. The receiver 200 obtains a light ID by decoding the decode target image. Specifically, the receiver 200 receives a light ID from the structure 112. The receiver 200 transmits the light ID to a server. Then, the receiver 200 obtains an AR image P7 and recognition information associated with the light ID from the server. The receiver 200 recognizes a region according to the recognition information as a target region, from the captured display images Ph. For example, the receiver 200 recognizes a region in which the center portion of the structure 112 is shown, as a target region. The receiver 200 superimposes an AR image P7 on the target region, and displays, on the display 201, the captured display image Ph on which the AR image P7 is superimposed. For example, the AR image P7 is an image which includes a character string "ABCD", and the character string is warped according to the curved surface of the center portion of the structure 112. In this case, the AR image P2 which includes the warped character string is superimposed on the target region of the captured display image Ph, and thus the receiver 200 can display the captured display image Ph as if the character string drawn on the structure 112 were actually present.

Figure 59:
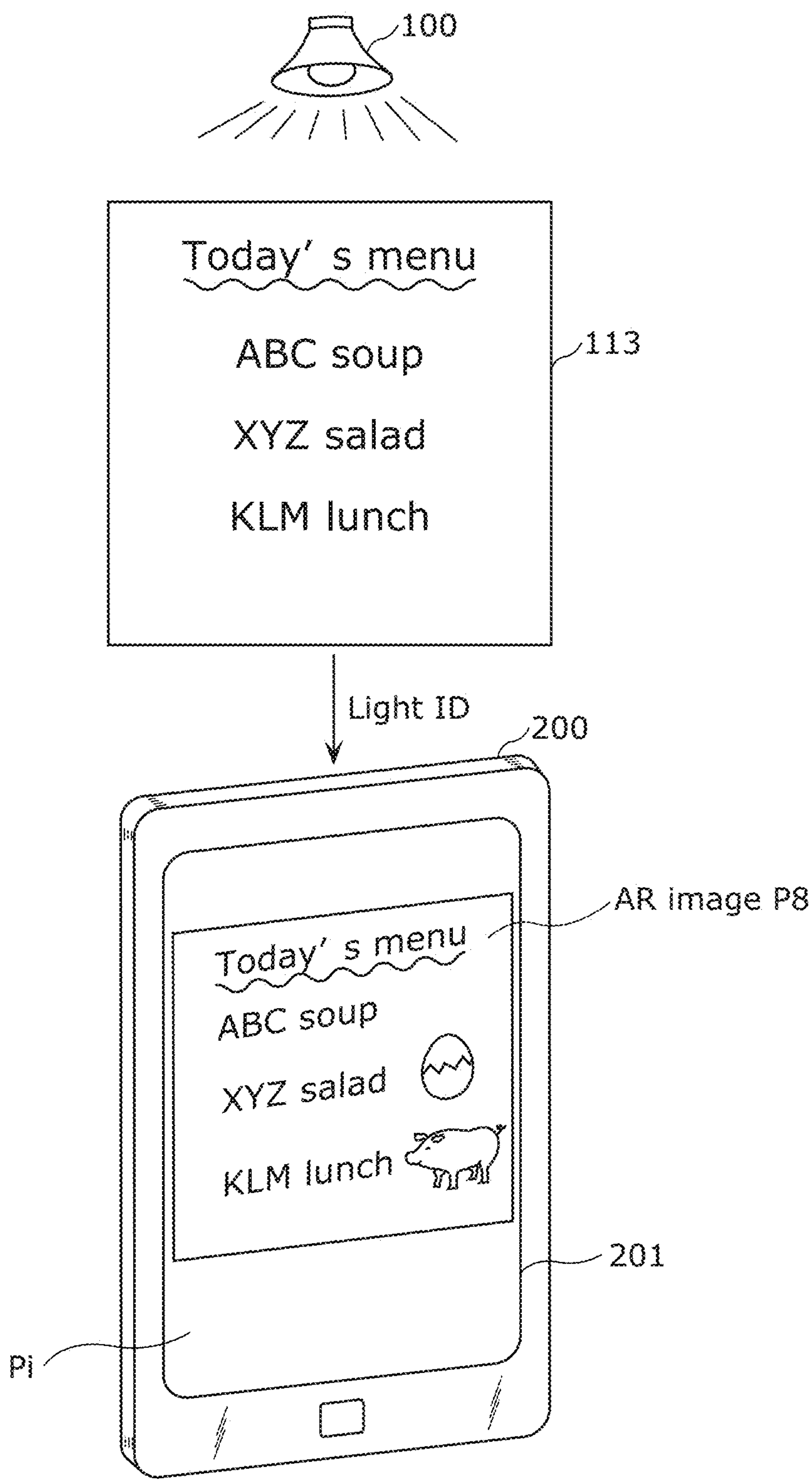
FIG. 59 is a diagram illustrating another example in which a receiver according to Embodiment 4 displays an AR image.

FIG. 59 is a diagram illustrating another example in which the receiver 200 according to the present embodiment displays an AR image.

The transmitter 100 transmits a light ID by changing luminance while illuminating a menu 113 of a restaurant, as illustrated in FIG. 59, for example. The menu 113 is illuminated with light from the transmitter 100, and changes luminance in the same manner as the transmitter 100, thus transmitting a light ID. The menu 113 shows, for example, the names of dishes such as "ABC soup", "XYZ salad", and "KLM lunch".

The receiver 200 obtains a captured display image Pi and a decode target image, by capturing an image of the menu 113 illuminated by the transmitter 100, similarly to the above. The receiver 200 obtains a light ID by decoding the decode target image. In other words, the receiver 200 receives a light ID from the menu 113. The receiver 200 transmits the light ID to a server. Then, the receiver 200 obtains an AR image P8 and recognition information associated with the light ID from the server. The receiver 200 recognizes a region according to the recognition information as a target region, from the captured display image Pi. For example, the receiver 200 recognizes a region in which the menu 113 is shown as a target region. Then, the receiver 200 superimposes the AR image P8 on the target region, and displays, on the display 201, the captured display image Pi on which the AR image P8 is superimposed. For example, the AR image P8 shows food ingredients used for the dishes, using marks. For example, the AR image P8 shows a mark imitating an egg for the dish "XYZ salad" in which eggs are used, and shows a mark imitating a pig for the dish "KLM lunch" in which pork is used. In this case, the AR image P8 is superimposed on the target region in the captured display image Pi, and thus the receiver 200 can display the captured display image Pi as if the menu 113 having marks showing food ingredients were actually present. Accordingly, the user of the receiver 200 can be readily and concisely informed of food ingredients of the dishes, without providing the menu 113 with a special display apparatus.

The receiver 200 may obtain a plurality of AR images, select an AR image suitable for the user from among the AR images, based on user information set by the user, and superimpose the selected AR image. For example, if user information indicates that the user is allergic to eggs, the receiver 200 selects an AR image having an egg mark given to the dish in which eggs are used. Furthermore, if user information indicates that eating pork is prohibited, the receiver 200 selects an AR image having a pig mark given to the dish in which pork is used. Furthermore, the receiver 200 may transmit the user information to the server together with the light ID, and may obtain an AR image according to the light ID and the user information from the server. In this manner, for each user, a menu which prompts the user to pay attention can be displayed.

Figure 60:
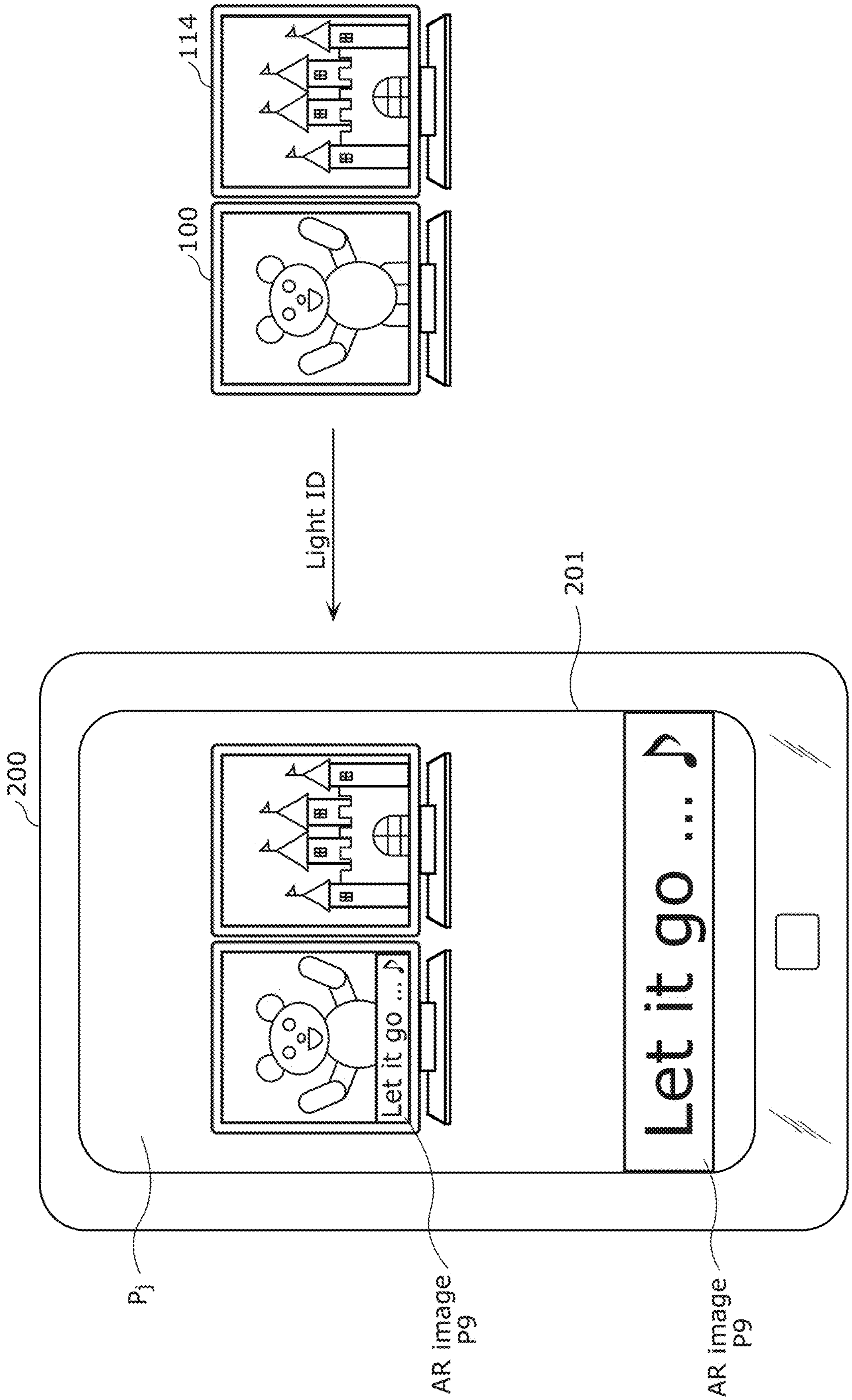
FIG. 60 is a diagram illustrating another example in which a receiver according to Embodiment 4 displays an AR image.

FIG. 60 is a diagram illustrating another example in which the receiver 200 according to the present embodiment displays an AR imag.

The transmitter 100 is configured as a TV, as illustrated in FIG. 60, for example, and transmits a light ID by changing luminance while displaying a video on the display. Furthermore, a typical TV 114 is disposed near the transmitter 100. The TV 114 shows a video on the display, but does not transmit a light ID.

The receiver 200 obtains a captured display image Pj and a decode target image by, for example, capturing an image which includes the transmitter 100 and also the TV 114, similarly to the above. The receiver 200 obtains a light ID by decoding the decode target image. In other words, the receiver 200 receives a light ID from the transmitter 100. The receiver 200 transmits the light ID to a server. Then, the receiver 200 obtains an AR image P9 and recognition information associated with the light ID from the server. The receiver 200 recognizes a region according to the recognition information as a target region, from the captured display image Pj.

For example, the receiver 200 recognizes, as a first target region, a lower portion of a region of the captured display image Pj in which the transmitter 100 transmitting a light ID is shown, using a bright line pattern region of the decode target image. Note that at this time, reference information included in the recognition information indicates that the position of the reference region in the captured display image Pj matches the position of the bright line pattern region in the decode target image. Furthermore, target information included in the recognition information indicates that a target region is below the reference region. The receiver 200 recognizes the first target region mentioned above, using such recognition information.

Furthermore, the receiver 200 recognizes, as a second target region, a region whose position is fixed in advance in a lower portion of the captured display image Pj. The second target region is larger than the first target region. Note that target information included in the recognition information further indicates not only the position of the first target region, but also the position and size of the second target region. The receiver 200 recognizes the second target region mentioned above, using such recognition information.

The receiver 200 superimposes the AR image P9 on each of the first target region and the second target region, and displays, on the display 201, the captured display image Pj on which on the AR images P9 are superimposed. When the AR images P9 are to be superimposed, the receiver 200 adjusts the size of the AR image P9 to the size of the first target region, and superimposes the AR image P9 whose size has been adjusted on the first target region. Furthermore, the receiver 200 adjusts the size of the AR image P9 to the size of the second target region, and superimposes the AR image P9 whose size has been adjusted on the second target region.

For example, the AR images P9 each indicate subtitles of the video on the transmitter 100. Furthermore, the language of the subtitles shown by the AR images P9 depends on user information set and registered in the receiver 200. Specifically, when the receiver 200 transmits a light ID to the server, the receiver 200 also transmits to the server the user information (for example, information indicating, for instance, nationality of the user or the language that the user uses). Then, the receiver 200 obtains the AR image P9 showing subtitles in the language according to the user information. Alternatively, the receiver 200 may obtain a plurality of AR images P9 showing subtitles in different languages, and select, according to the user information set and registered, an AR image P9 to be used and superimposed, from among the AR images P9.

In other words, in the example illustrated in FIG. 60, the receiver 200 obtains the captured display image Pj and the decode target image by capturing an image that includes, as subjects, a plurality of displays each showing an image. When the receiver 200 is to recognize a target region, the receiver 200 recognizes, as a target region, a region of the captured display image Pj in which a transmission display which is transmitting a light ID (that is, the transmitter 100) among the plurality of displays is shown. Next, the receiver 200 superimposes, on the target region, first subtitles for the image displayed on the transmission display, as an AR image. Furthermore, the receiver 200 superimposes second subtitles obtained by enlarging the first subtitles, on a region larger than the target region of the captured display images Pj.

Accordingly, the receiver 200 can display the captured display image Pj as if subtitles were actually present in the video on the transmitter 100. Furthermore, the receiver 200 superimposes large subtitles on the lower portion of the captured display image Pj, and thus the subtitles can be made legible even if the subtitles given to the video on the transmitter 100 are small. Note that if no subtitles are given to the video on the transmitter 100 and only enlarged subtitles are superimposed on the lower portion of the captured display image Pj, it is difficult to determine whether the superimposed subtitles are for a video on the transmitter 100 or for a video on the TV 114. However, in the present embodiment, subtitles are given also to the video on the transmitter 100 which transmits a light ID, and thus the user can readily determine whether the superimposed subtitles are for either a video on the transmitter 100 or a video on the TV 114.

The receiver 200 may determine whether information obtained from the server includes sound information, when the captured display image Pj is to be displayed. When the receiver 200 determines that sound information is included, the receiver 200 preferentially outputs the sound indicated by the sound information over the first and second subtitles. In this manner, since sound is output preferentially, a burden on the user to read subtitles is reduced.

In the above example, according to user information (namely, the attribute of the user), the language of the subtitles has been changed to a different language, yet a video displayed on the transmitter 100 (that is, content) itself may be changed. For example, if a video displayed on the transmitter 100 is news, and if user information indicates that the user is a Japanese, the receiver 200 obtains news broadcast in Japan as an AR image. The receiver 200 superimposes the news on a region (namely, target region) where the display of the transmitter 100 is shown. On the other hand, if user information indicates that the user is an American, the receiver 200 obtains a news broadcast in the U.S. as an AR image. Then, the receiver 200 superimposes the news video on a region (namely, target region) where the display of the transmitter 100 is shown. Accordingly, a video suitable for the user can be displayed. Note that user information indicates, for example, nationality or the language that the user uses as the attribute of the user, and the receiver 200 obtains an AR image as mentioned above, based on the attribute.

Figure 61:
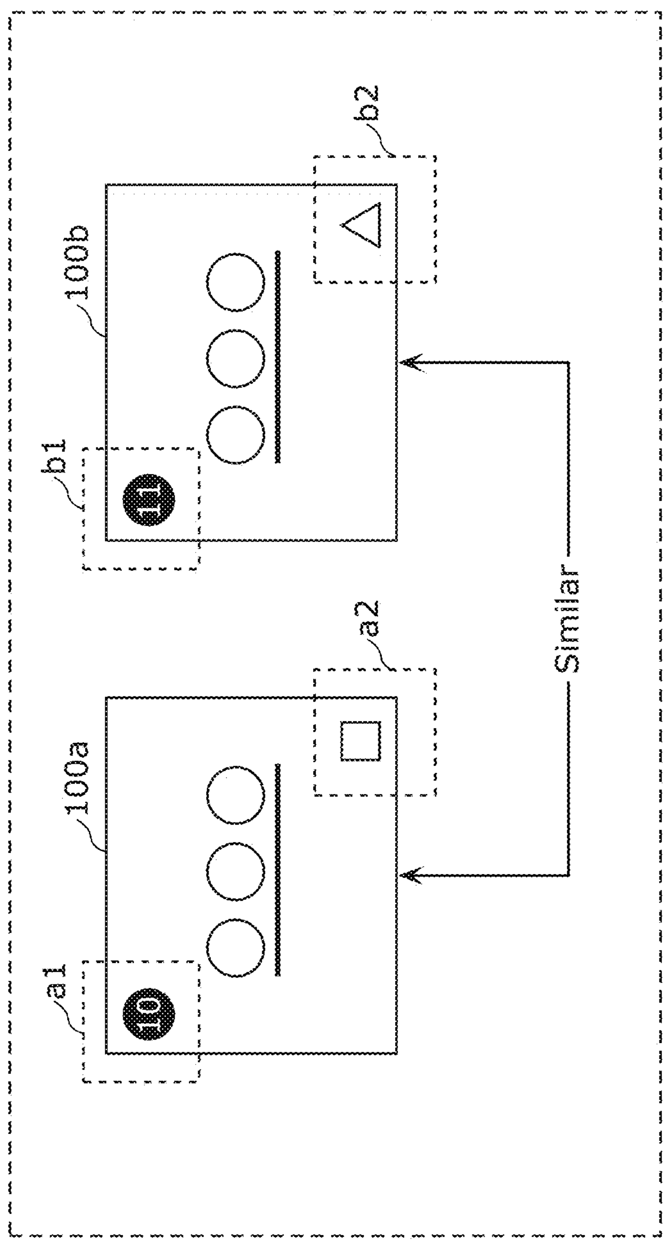
FIG. 61 is a diagram illustrating an example of recognition information according to Embodiment 4.

FIG. 61 is a diagram illustrating an example of recognition information according to the present embodiment.

Even if recognition information is, for example, feature points or a feature quantity as describes above, incorrect recognition may be made. For example, transmitters 100*a* and 100*b* are configured as station signs as with the transmitter 100. If the transmitters 100*a* and 100*b* are in near positions although the transmitters 100*a* and 100*b* are different station signs, the transmitters 100*a* and 100*b* may be incorrectly recognized due to the similarities.

For each of the transmitters 100*a* and 100*b*, recognition information of the transmitter may indicate a distinctive portion of an image of the transmitter, rather than feature points and a feature quantity of the entire image.

For example, a portion a1 of the transmitter 100*a* and a portion b1 of the transmitter 100*b* are greatly different, and a portion a2 of the transmitter 100*a* and a portion b2 of the transmitter 100*b* are greatly different. The server stores feature points and feature quantities of images of the portions a1 and a2, as recognition information associated with the transmitter 100*a*, if the transmitters 100*a* and 100*b* are installed within a predetermined range (namely, short distance). Similarly, the server stores feature points and feature quantities of images of portions b1 and b2 as identification information associated with the transmitter 100*b*.

Accordingly, the receiver 200 can appropriately recognize target regions using identification information associated with the transmitters 100*a* and 100*b*, even if the transmitters 100*a* and 100*b* similar to each other are close to each other (within a predetermined range as mentioned above).

Figure 62:
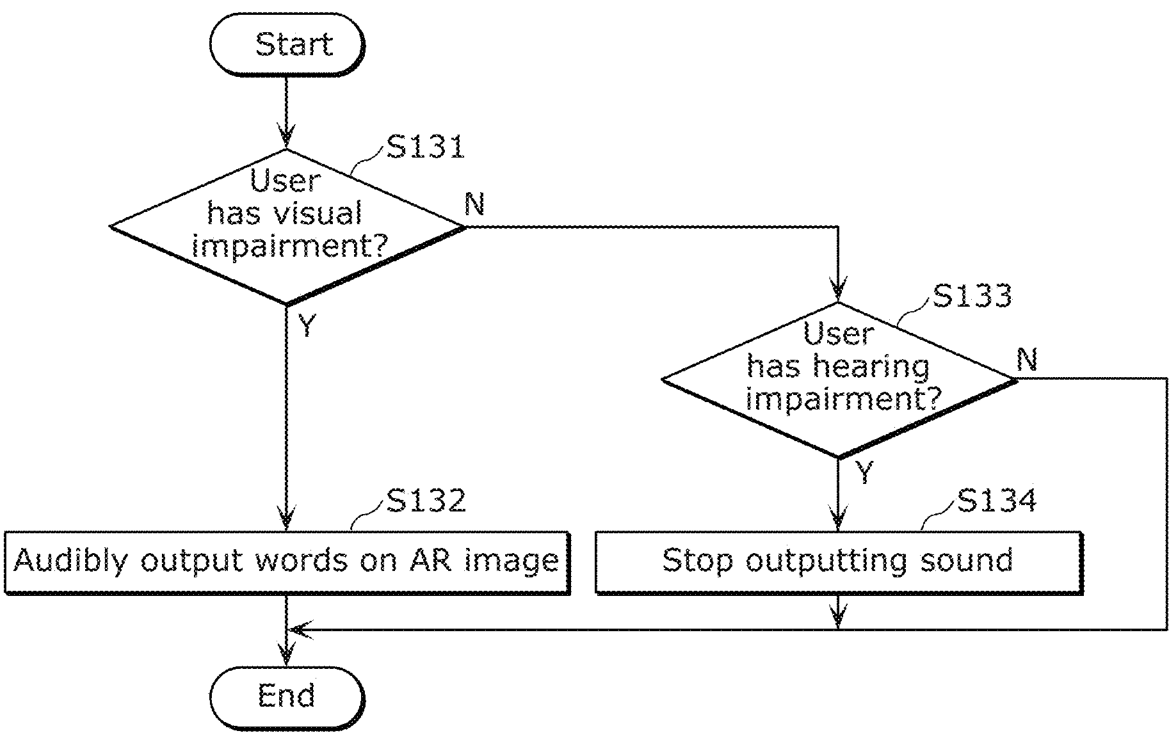
FIG. 62 is a flow chart illustrating another example of processing operation of a receiver according to Embodiment 4.

FIG. 62 is a flow chart illustrating another example of processing operation of the receiver 200 according to the present embodiment.

The receiver 200 first determines whether the user has visual impairment, based on user information set and registered in the receiver 200 (step S131). Here, if the receiver 200 determines that the user has visual impairment (Y in step S131), the receiver 200 audibly outputs the words on an AR image superimposed and displayed (step S132), On the other hand, if the receiver 200 determines that the user has no visual impairment (N in step S131), the receiver 200 further determines whether the user has hearing impairment, based on the user information (step S133). Here, if the receiver 200 determines that the user has hearing impairment (Y in step S133), the receiver 200 stops outputting sound (step S134). At this time, the receiver 200 stops output of sound achieved by all functions.

Note that when the receiver 200 determines in step S131 that the user has visual impairment (Y in step S131), the receiver 200 may perform processing in step S133. Specifically, when the receiver 200 determines that the user has visual impairment, but has no hearing impairment, the receiver 200 may audibly output the words on the AR image superimposed and displayed.

FIG. 63 is a diagram illustrating an example in which the receiver 200 according to the present embodiment locates a bright line pattern region.

The receiver 200 first obtains a decode target image by capturing an image which includes two transmitters each transmitting a light ID, and obtains light IDs by decoding a decode target image, as illustrated in (e) of FIG. 63. At this time, the decode target image includes two bright line pattern regions X and Y, and thus the receiver 200 obtains a light ID from a transmitter corresponding to the bright line pattern region X, and a light ID from a transmitter corresponding to the bright line pattern region Y. The light ID from the transmitter corresponding to the bright line pattern region X consists of, for example, numerical values (namely, data) corresponding to the addresses 0 to 9, and indicates "5, 2, 8, 4, 3, 6, 1, 9, 4, 3". The light ID from the transmitter corresponding to the bright line pattern region X also consists of, for example, numerical values corresponding to the addresses 0 to 9, and indicates "5, 2, 7, 7, 1, 5, 3, 2, 7, 4".

Even if the receiver 200 has once obtained the light IDs, or in other words, the receiver 200 has already known the light IDs, the receiver 200 may confront, during image capturing, a situation in which the receiver 200 does not know from which of the bright line pattern regions the light IDs are obtained. In such a case, the receiver 200 can readily determine, for each of the known light IDs, from which of the bright line pattern regions the light ID has been obtained, by performing processing illustrated in (a) to (d) of FIG. 63.

Specifically, the receiver 200 first obtains a decode target image Pdec11, and obtains the numerical values for the address 0 of the light IDs of the bright line pattern regions X and Y, by decoding the decode target image Pdec11, as illustrated in (a) of FIG. 63. For example, the numerical value for the address 0 of the light ID of the bright line pattern region X is "5", and the numerical value for the address 0 of the light ID of the bright line pattern region Y is also "5". Since the numerical values for the address 0 of the light IDs are both "5", the receiver 200 cannot determine at this time from which of the bright line pattern regions the known light IDs are obtained.

In view of this, the receiver 200 obtains a decode target image Pdec12 as illustrated in (b) of FIG. 63, by decoding the decode target image Pdec12, and obtains the numerical values for the address 1 of the light IDs of the bright line pattern regions X and Y. For example, the numerical value for the address 1 of the light ID of the bright line pattern region X is "2", and the numerical value for the address 1 of the light ID of the bright line pattern region Y is also "2". Since the numerical values for the address 1 of the light IDs are both "2", the receiver 200 cannot determine also at this time from which of the bright line pattern regions the known light IDs are obtained.

Accordingly, the receiver 200 further obtains a decode target image Pdec13 as illustrated in (c) of FIG. 63, and obtains the numerical values for the address 2 of the light IDs of the bright line pattern regions X and Y, by decoding the decode target image Pdec13. For example, the numerical value for the address 2 of the light ID of the bright line pattern region X is "8", whereas the numerical value for the address 2 of the light ID of the bright line pattern region Y is "7". At this time, the receiver 200 can determine that the known light ID "5, 2, 8, 4, 3, 6, 1, 9, 4, 3" is obtained from the bright line pattern region X, and can determine that the known light ID "5, 2, 7, 7, 1, 5, 3, 2, 7, 4" is obtained from the bright line pattern region Y.

However, in order to increase reliability, as illustrated in (d) of FIG. 63, the receiver 200 may further obtain the numerical values for the address 3 of the light IDs. Specifically, the receiver 200 obtains a decode target image Pdec14, and by decoding the decode target image Pdec14, obtains the numerical values for the address 3 of the light IDs of the bright line pattern regions X and Y. For example, the numerical value for the address 3 of the light ID of the bright line pattern region X is "4", whereas the numerical value for the address 3 of the light ID of the bright line pattern region Y is "7". At this time, the receiver 200 can determine that the known light ID "5, 2, 8, 4, 3, 6, 1, 9, 4, 3" is obtained from the bright line pattern region X, and can determine that the known light ID "5, 2, 7, 7, 1, 5, 3, 2, 7, 4" is obtained from the bright line pattern region Y. Specifically, the receiver 200 can identify the light IDs for the bright line pattern regions X and Y also based on the address 3 in addition to the address 2, and thus reliability can be increased.

As described above, in the present embodiment, the numerical values for at least one address are re-obtained rather than again obtaining the numerical values (namely, data) for all the addresses of the light IDs. Accordingly, the receiver 200 can readily determine from which of the bright line pattern regions the known light IDs are obtained.

Note that in the above examples illustrated in (c) and (d) of FIG. 63, the numerical values obtained for a given address match the numerical values of the known light IDs, yet may not be the same. For example, in the case of the example illustrated in (d) of FIG. 63, the receiver 200 obtains "6" as a numerical value for the address 3 of the light ID of the bright line pattern region Y. The numerical value "6" for the address 3 is different from the numerical value "7" for the address 3 of the known light ID "5, 2, 7, 7, 1, 5, 3, 2, 7, 4". However, the numerical value "6" is close to the numerical value "7", and thus the receiver 200 may determine that the known light ID "5, 2, 7, 7, 1, 5, 3, 2, 7, 4" is obtained from the bright line pattern region Y. Note that the receiver may determine whether the numerical value "6" is close to the numerical value "7", according to whether the numerical value "6" is within a range of the numerical "7"±n (n is a number of 1 or more, for example).

Figure 64:
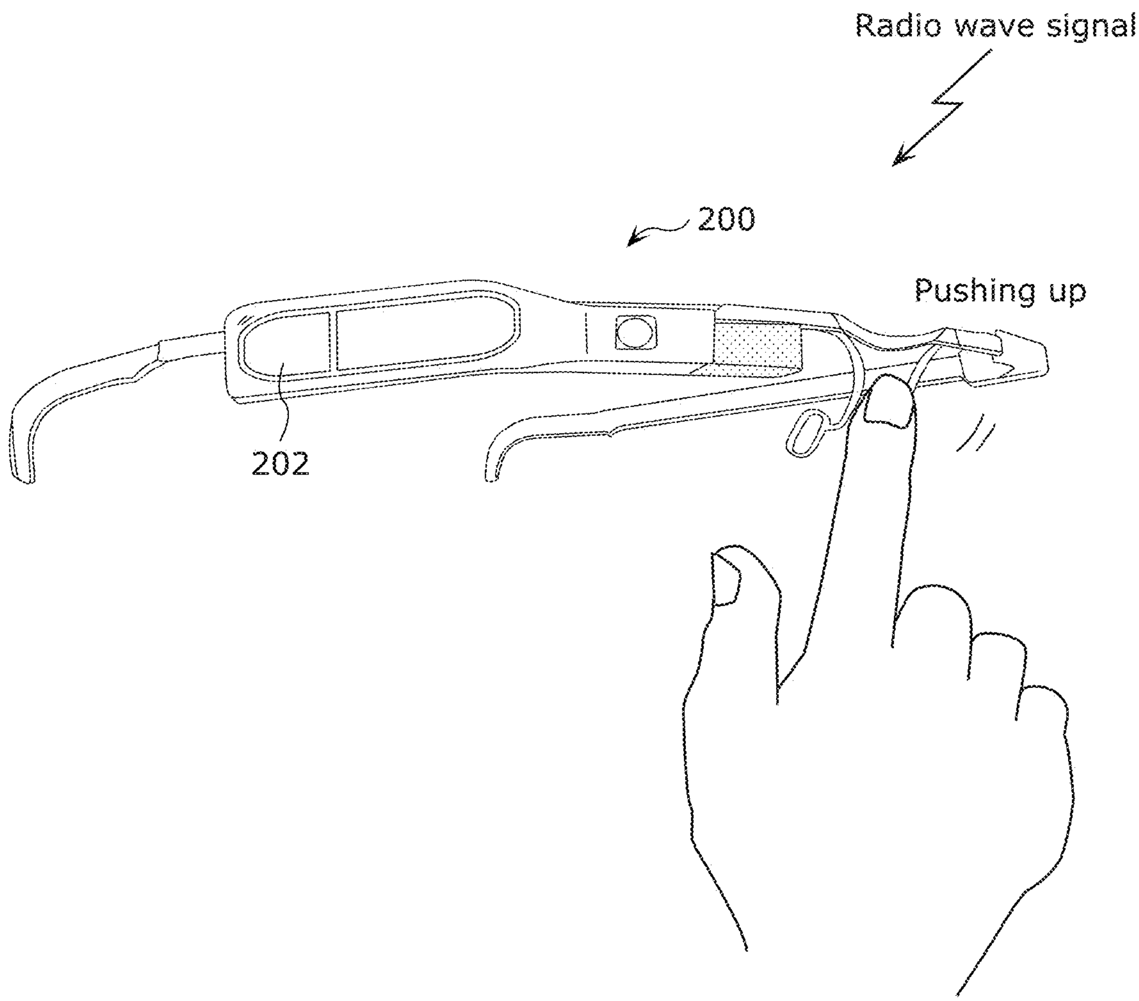
FIG. 64 is a diagram illustrating another example of a receiver according to Embodiment 4.

FIG. 64 is a diagram illustrating another example of the receiver 200 according to the present embodiment.

The receiver 200 is configured as a smartphone in the above examples, yet may be configured as a head mount display (also referred to as glasses) which includes the image sensor.

Power consumption increases if a processing circuit for displaying AR images as described above (hereinafter, referred to as AR processing circuit) is kept running at all times, and thus the receiver 200 may start the AR processing circuit when a predetermined signal is detected.

For example, the receiver 200 includes a touch sensor 202. If a user's finger, for instance, touches the touch sensor 202, the touch sensor 202 outputs a touch signal. The receiver 200 starts the AR processing circuit when the touch signal is detected.

Furthermore, the receiver 200 may start the AR processing circuit when a radio wave signal transmitted via, for instance, Bluetooth (registered trademark) or Wi-Fi (registered trademark) is detected.

Furthermore, the receiver 200 may include an acceleration sensor, and start the AR processing circuit when the acceleration sensor measures acceleration greater than or equal to a threshold in a direction opposite the direction of gravity. Specifically, the receiver 200 starts the AR processing circuit when a signal indicating the above acceleration is detected. For example, if the user pushes up a nose-pad portion of the receiver 200 configured as glasses with a fingertip from below, the receiver 200 detects a signal indicating the above acceleration, and starts the AR processing circuit.

Furthermore, the receiver 200 may start the AR processing circuit when the receiver 200 detects that the image sensor is directed to the transmitter 100, according to the GPS or a 9-axis sensor, for instance. Specifically, the receiver 200 starts the AR processing circuit, when a signal indicating that the receiver 200 is directed to a given direction is detected. In this case, if the transmitter 100 is, for instance, a Japanese station sign described above, the receiver 200 superimposes an AR image showing the name of the station in English on the station sign, and displays the image.

Figure 65:
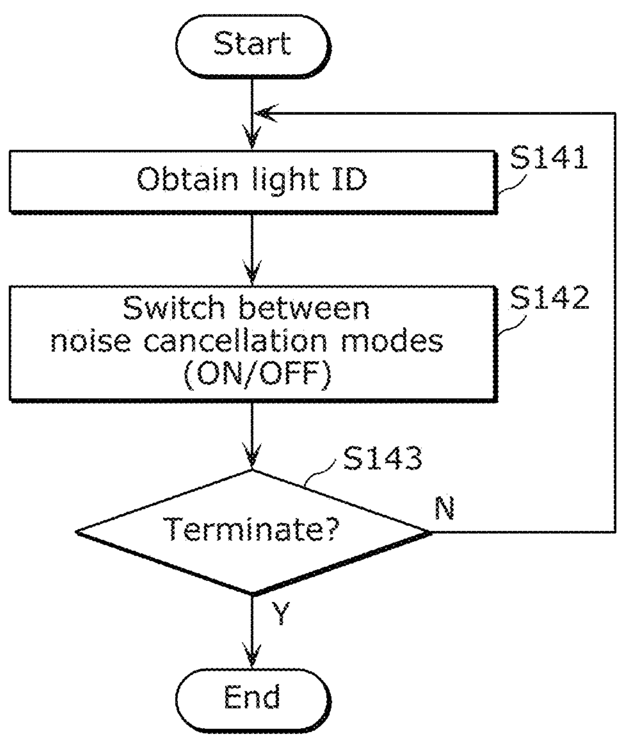
FIG. 65 is a flowchart illustrating another example of processing operation of a receiver according to Embodiment 4.

FIG. 65 is a flowchart illustrating another example of processing operation of the receiver 200 according to the present embodiment.

If the receiver 200 obtains a light ID from the transmitter 100 (step S141), the receiver 200 switches between noise cancellation modes (step S142). The receiver 200 determines whether to terminate such processing of switching between modes (step S143), and if the receiver 200 determines not to terminate the processing (N in step S143), the receiver 200 repeatedly executes the processing from step S141. The noise cancellation modes are switched between, for example, a mode (ON) for cancelling noise from, for instance, the engine when the user is on an airplane and a mode (OFF) for not cancelling such noise. Specifically, the user carrying the receiver 200 is listening to sound such as music output from the receiver 200 while the user is wearing earphones connected to the receiver 200 over his/her ears. If such a user gets on an airplane, the receiver 200 obtains a light ID. As a result, the receiver 200 switches between the noise cancellation modes from OFF to ON. In this manner, even if the user is on the plane, he/she can listen to sound which does not include noise such as engine noise. Also when the user gets out of the airplane, the receiver 200 obtains a light ID. The receiver 200 which has obtained the light ID switches between the noise cancellation modes from ON to OFF. Note that the noise which is to be cancelled may be any sound such as human voice, not only engine noise.

Figure 66:
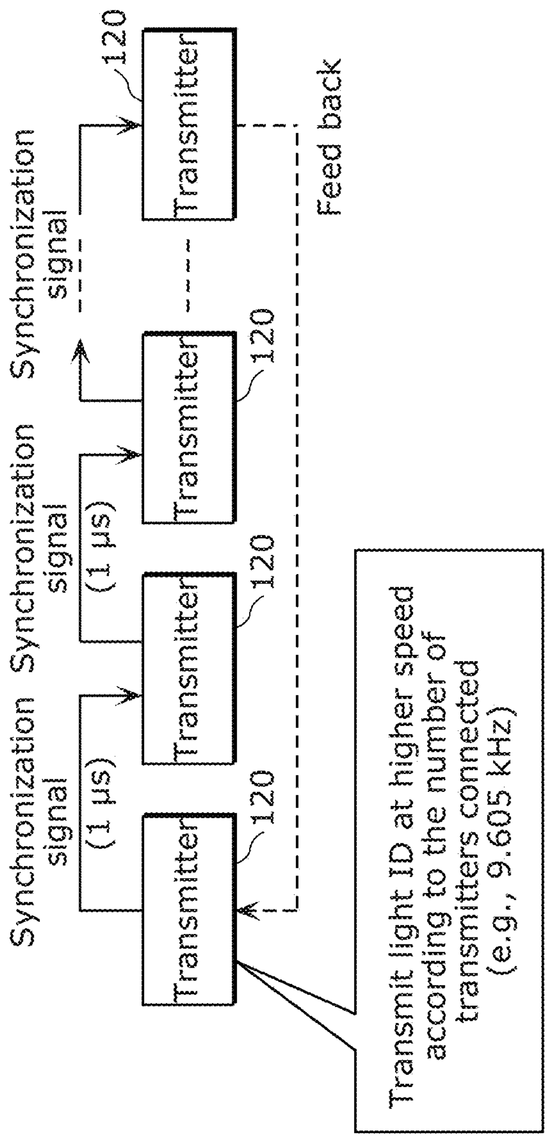
FIG. 66 is a diagram illustrating an example of a transmission system which includes a plurality of transmitters according to Embodiment 4.

FIG. 66 is a diagram illustrating an example of a transmission system which includes a plurality of transmitters according to the present embodiment.

This transmission system includes a plurality of transmitters 120 arranged in a predetermined order. The transmitters 120 are each one of the transmitters according to any of Embodiments 1 to 3 above like the transmitter 100, and each include one or more light emitting elements (for example, LEDs). The leading transmitter 120 transmits a light ID by changing luminance of one or more light emitting elements according to a predetermined frequency (carrier frequency). Furthermore, the leading transmitter 120 outputs a signal indicating a change in luminance to the succeeding transmitter 120, as a synchronization signal. Upon receipt of the synchronization signal, the succeeding transmitter 120 changes the luminance of one or more light emitting elements according to the synchronization signal, to transmit a light ID. Furthermore, the succeeding transmitter 120 outputs a signal indicating the change in luminance as a synchronization signal to the next succeeding transmitter 120, In this manner, all the transmitters 120 included in the transmission system transmit the light ID in synchronization.

Here, the synchronization signal is delivered from the leading transmitter 120 to the succeeding transmitter 120, and further from the succeeding transmitter 120 to the next succeeding the transmitter 120, and reaches the last transmitter 120. It takes about, for example, 1 μs to deliver the synchronization signal. Accordingly, if the transmission system includes N transmitters 120 (N is an integer of 2 or more), it will take 1×N μs for the synchronization signal to reach the last transmitter 120 from the leading transmitter 120. As a result, the timing of transmitting the light ID will be delayed for a maximum of N μs. For example, even if N transmitters 120 transmit a light ID according to a frequency of 9.6 kHz, and the receiver 200 is to receive the light ID at a frequency of 9.6 kHz, the receiver 200 receives a light ID delayed for N μs, and thus may not properly receive the light ID.

In view of this, in the present embodiment, the leading transmitter 120 transmits a light ID at a higher speed depending on the number of transmitters 120 included in the transmission system. For example, the leading transmitter 120 transmits a light ID according to a frequency of 9.605 kHz. On the other hand, the receiver 200 receives the light ID at a frequency of 9.6 kHz. At this time, even if the receiver 200 receives the light ID delayed for N μs, the frequency at which the leading transmitter 120 has transmitted the light ID is higher than the frequency at which the receiver 200 has received the light ID by 0.005 kHz, and thus the occurrence of an error in reception due to the delay of the light ID can be prevented.

The leading transmitter 120 may control the amount of adjusting the frequency, by having the last transmitter 120 to feed back the synchronization signal. For example, the leading transmitter 120 measures a time from when the leading transmitter 120 outputs the synchronization signal until when the leading transmitter 120 receives the synchronization signal fed back from the last transmitter 120. Then, the leading transmitter 120 transmits a light ID according to a frequency higher than a reference frequency (for example, 9.6 kHz) as the measured time is longer.

Figure 67:
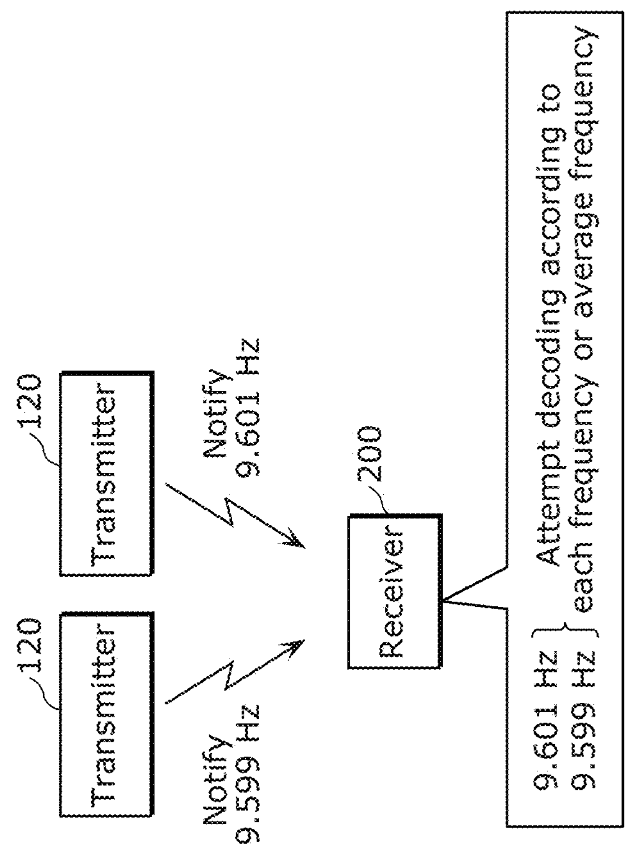
FIG. 67 is a diagram illustrating an example of a transmission system which includes a plurality of transmitters and a receiver according to Embodiment 4.

FIG. 67 is a diagram illustrating an example of a transmission system which includes a plurality of transmitters and the receiver according to the present embodiment.

The transmission system includes two transmitters 120 and the receiver 200, for example. One of the two transmitters 120 transmits a light ID according to a frequency of 9.599 kHz, whereas the other transmitter 120 transmits a light ID according to a frequency of 9.601 kHz. In such a case, the two transmitters 120 each notify the receiver 200 of a frequency at which the light ID is transmitted, by means of a radio wave signal.

Upon receipt of the notification of the frequencies, the receiver 200 attempts decoding according to each of the notified frequencies. Specifically, the receiver 200 attempts decoding a decode target image according to a frequency of 9.599 kHz, and if the receiver 200 cannot receive a light ID by the decoding, the receiver 200 attempts decoding the decode target image according to a frequency of 9.601 kHz. Accordingly, the receiver 200 attempts decoding a decode target image according to each of all the notified frequencies. In other words, the receiver 200 performs decoding according to each of the notified frequencies. The receiver 200 may attempt decoding according to an average frequency of all the notified frequencies. Specifically, the receiver 200 attempts decoding according to 9.6 kHz which is an average frequency of 9.599 kHz and 9.601 kHz.

In this manner, the rate of occurrence of an error in reception caused by a difference in frequency between the receiver 200 and the transmitter 120 can be reduced.

Figure 68B:
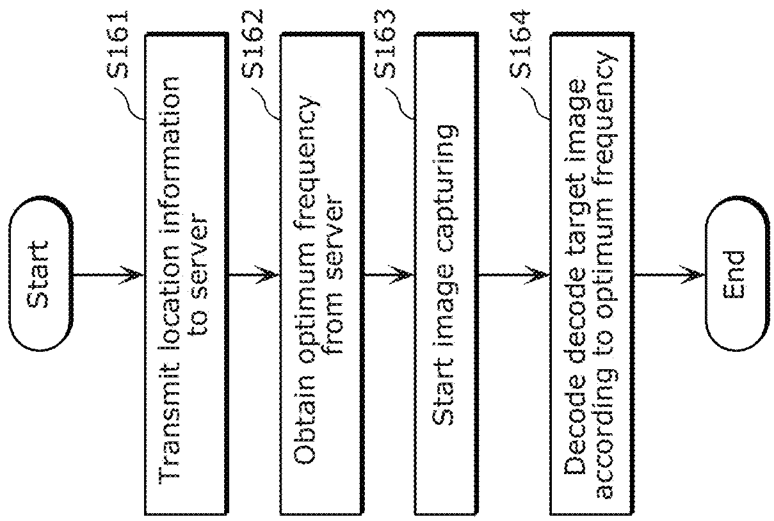
FIG. 68B is a flowchart illustrating an example of processing operation of a receiver according to Embodiment 4.
Figure 68A:
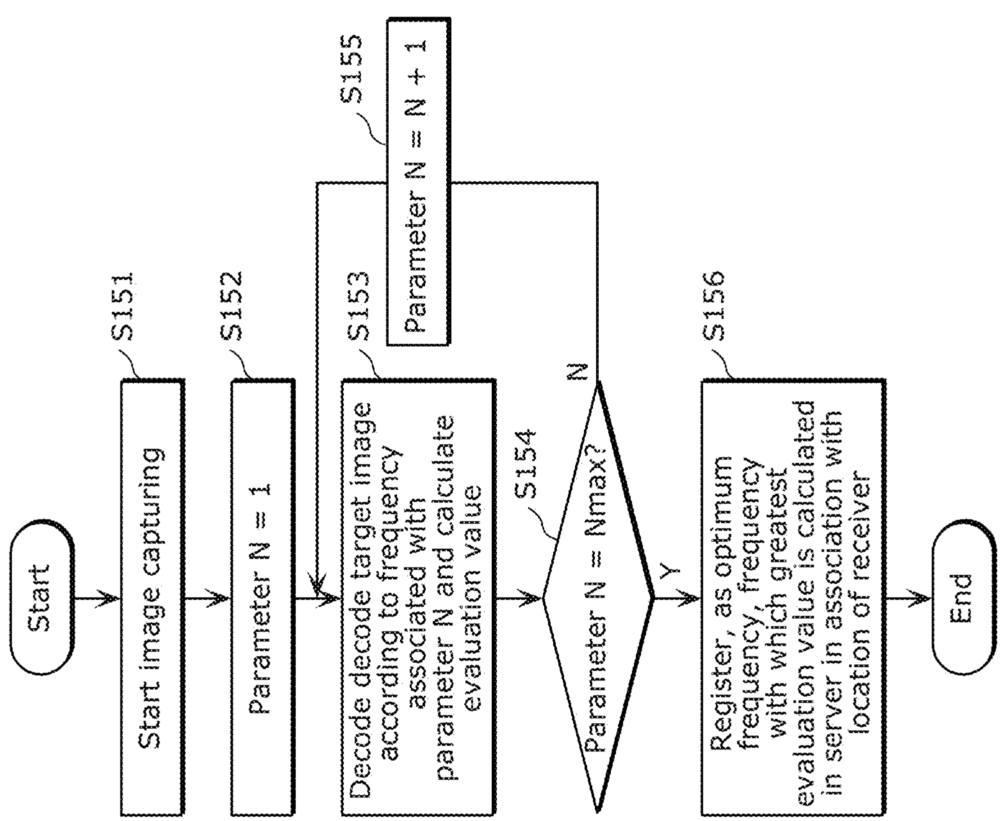
FIG. 68A is a flowchart illustrating an example of processing operation of a receiver according to Embodiment 4.

FIG. 68A is a flowchart illustrating an example of processing operation of the receiver 200 according to the present embodiment.

First, the receiver 200 starts image capturing (step S151), and initializes the parameter N to 1 (step S152). Next, the receiver 200 decodes a decode target image obtained by the image capturing, according to a frequency associated with the parameter N, and calculates an evaluation value for the decoding result (step S153). For example, 1, 2, 3, 4, and 5 which are parameters N are associated in advance with frequencies such as 9.6 kHz, 9.601 kHz, 9.599 kHz, and 9.602 kHz. The evaluation value has a higher numerical value as the decoding result is similar to a correct light ID.

Next, the receiver 200 determines whether the numerical value of the parameter N is equal to Nmax which is a predetermined integer of 1 or more (step S154). Here, if the receiver 200 determines that the numerical value of the parameter N is not equal to Nmax (N in step S154), the receiver 200 increments the parameter N (step S155), and repeatedly executes processing from step S153. On the other hand, if the receiver 200 determines that the numerical value of the parameter N is equal to Nmax (Y in step S154), the receiver 200 registers, as an optimum frequency, a frequency with which the greatest evaluation value is calculated in the server in association with location information indicating the location of the receiver 200. After being registered, the optimum frequency and location information which are registered in the above manner are used to receive a light ID by the receiver 200 which has moved to the location indicated by the location information. Further, the location information may indicate the position measured by the GPS, for example, or may be identification information of an access point in a wireless local area network (LAN) (for example, service set identifier: SSID).

The receiver 200 which has registered such a frequency in a server displays the above AR images, for example, according to a light ID obtained by decoding according to the optimum frequency.

FIG. 68B is a flowchart illustrating an example of processing operation of the receiver 200 according to the present embodiment.

After the optimum frequency has been registered in the server illustrated in FIG. 68A, the receiver 200 transmits location information indicating the location where the receiver 200 is present to the server (step S161), Next, the receiver 200 obtains the optimum frequency registered in association with the location information from the server (step S162).

Next, the receiver 200 starts image capturing (step S163), and decodes a decode target image obtained by the image capturing, according to the optimum frequency obtained in step S162 (step S164). The receiver 200 displays an AR image as mentioned above, according to a light ID obtained by the decoding, for example.

In this way, after the optimum frequency has been registered in the server, the receiver 200 obtains the optimum frequency and receives a light ID, without executing processing illustrated in FIG. 68A. Note that when the receiver 200 does not obtain the optimum frequency in step S162, the receiver 200 may obtain the optimum frequency by executing processing illustrated in FIG. 68A.

[Summary of Embodiment 4]

Figure 69A:
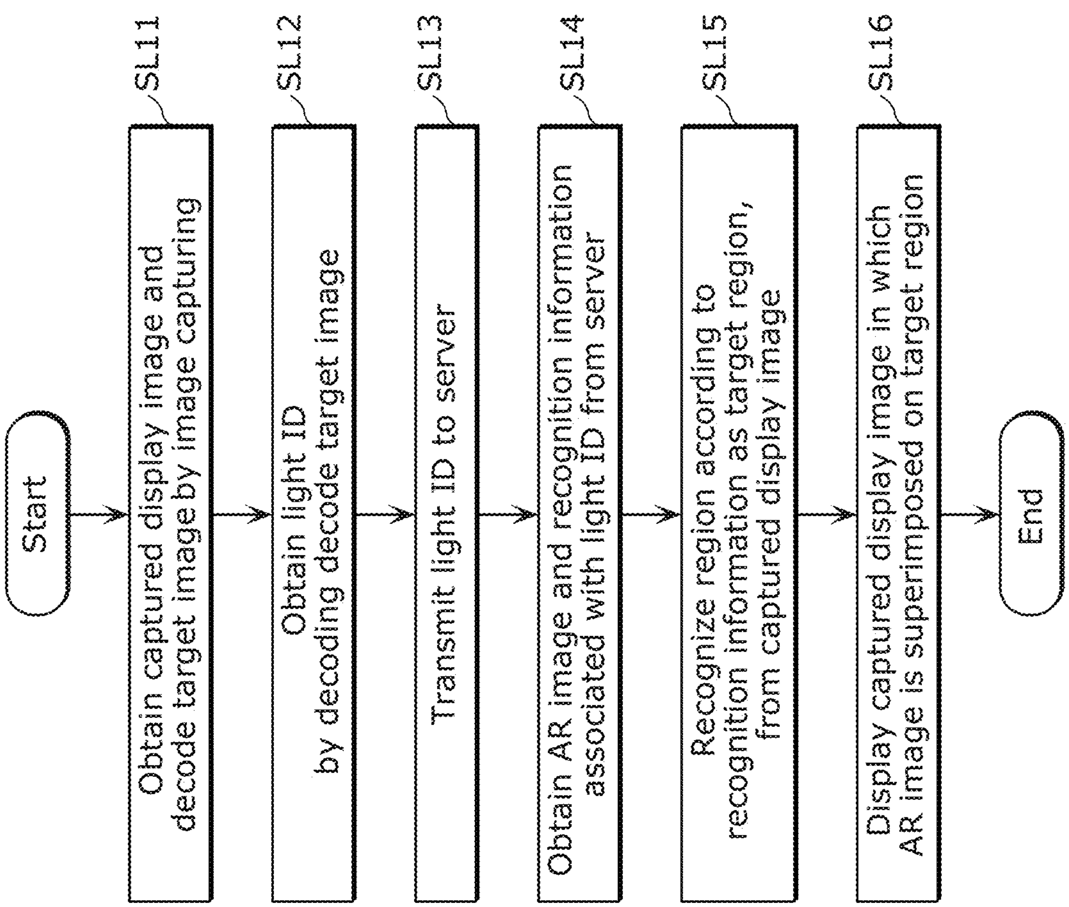
FIG. 69A is a flowchart illustrating a display method according to Embodiment 4.

FIG. 69A is a flowchart illustrating the display method according to the present embodiment.

The display method according to the present embodiment is a display method for a display apparatus which is the receiver 200 described above to display an image, and includes steps SL11 to SL16.

In step SL11, the display apparatus obtains a captured display image and a decode target image by the image sensor capturing an image of a subject. In step SL12, the display apparatus obtains a light ID by decoding the decode target image. In step SL13, the display apparatus transmits the light ID to the server. In step SL14, the display apparatus obtains an AR image and recognition information associated with the light ID from the server. In step SL15, the display apparatus recognizes a region according to the recognition information as a target region, from the captured display image. In step SL16, the display apparatus displays the captured display image in which an AR image is superimposed on the target region.

Accordingly, the AR image is superimposed on the captured display image and displayed, and thus an image useful to a user can be displayed. Furthermore, the AR image can be superimposed on an appropriate target region, while preventing an increase in processing load.

Specifically, according to typical augmented reality (namely, AR), it is determined, by comparing a captured display image with a huge number of prestored recognition target images, whether the captured display image includes any of the recognition target images. If it is determined that the captured display image includes a recognition target image, an AR image corresponding to the recognition target image is superimposed on the captured display image. At this time, the AR image is aligned based on the recognition target image. In this manner, according to such typical AR, a huge number of recognition target images and a captured display image are compared, and furthermore, the position of a recognition target image needs to be detected from the captured display image also when an AR image is aligned, and thus a large amount of calculation involves and processing load is high, which is a problem.

However, with the display method according to the present embodiment, a light ID is obtained by decoding a decode target image obtained by capturing an image of a subject, as illustrated also in FIGS. 41 to 68B. Specifically, a light ID transmitted from a transmitter which is the subject is received. An AR image and recognition information associated with the light ID are obtained from the server. Thus, the server does not need to compare a captured display image with a huge number of recognition target images, and can select an AR image associated with the light ID in advance and transmit the AR image to the display apparatus. In this manner, the amount of calculation can be decreased and processing load can be greatly reduced.

Furthermore, with the display method according to the present embodiment, recognition information associated with the light ID is obtained from the server. Recognition information is for recognizing, from a captured display image, a target region on which an AR image is superimposed. The recognition information may indicate that a white quadrilateral is a target region, for example. In this case, the target region can be recognized easily, and processing load can be further reduced. Specifically, processing load can be further reduced according to the content of recognition information. In the server, the content of the recognition information can be arbitrarily determined according to a light ID, and thus balance between processing load and recognition accuracy can be maintained appropriately.

Here, the recognition information may be reference information for locating a reference region of the captured display image, and in (e), the reference region may be located from the captured display image, based on the reference information, and the target region may be recognized from the captured display image, based on a position of the reference region.

The recognition information may include reference information for locating a reference region of the captured display image, and target information indicating a relative position of the target region with respect to the reference region. In this case, in (e), the reference region is located from the captured display image, based on the reference information, and a region in the relative position indicated by the target information is recognized as the target region from the captured display image, based on a position of the reference region.

In this manner, as illustrated in FIGS. 50 and 51, the flexibility of the position of a target region recognized in a captured display image can be increased.

The reference information may indicate that the position of the reference region in the captured display image matches a position of a bright line pattern region in the decode target image, the bright line pattern region including a pattern formed by bright lines which appear due to exposure lines included in the image sensor being exposed.

In this manner, as illustrated in FIGS. 50 and 51, a target region can be recognized based on a region corresponding to a bright line pattern region in a captured display image.

The reference information may indicate that the reference region in the captured display image is a region in which a display is shown in the captured display image.

In this manner, if a station sign is a display, a target region can be recognized based on a region in which the display is shown, as illustrated in FIG. 41.

In (f), a first AR image which is the AR image may be displayed for a predetermined display period, while preventing display of a second AR image different from the first AR image.

In this manner, when the user is looking at a first AR image displayed once, the first AR image can be prevented from being immediately replaced with a second AR image different from the first AR image, as illustrated in FIG. 56.

In (f), decoding a decode target image newly obtained may be prohibited during the predetermined display period.

Accordingly, as illustrated in FIG. 56, decoding a decode target image newly obtained is wasteful processing when the display of the second AR image is prohibited, and thus power consumption can be reduced by prohibiting decoding such an image.

Moreover, (f) may further include: measuring an acceleration of the display apparatus using an acceleration sensor during the display period; determining whether the measured acceleration is greater than or equal to a threshold; and displaying the second AR image instead of the first AR image by no longer preventing the display of the second AR image, if the measured acceleration is determined to be greater than or equal to the threshold.

In this manner, as illustrated in FIG. 56, when the acceleration of the display apparatus greater than or equal to a threshold is measured, the display of the second AR image is no longer prohibited. Accordingly, for example, when a user greatly moves the display apparatus in order to direct an image sensor to another subject, the second AR image can be displayed immediately.

Moreover, (f) may further include: determining whether a face of a user is approaching the display apparatus, based on image capturing by a face camera included in the display apparatus; and displaying a first AR image while preventing display of a second AR image different from the first AR image, if the face is determined to be approaching. Alternatively, (f) may further include: determining whether a face of a user is approaching the display apparatus, based on an acceleration of the display apparatus measured by an acceleration sensor; and displaying a first AR image while preventing display of a second AR image different from the first AR image, if the face is determined to be approaching.

In this manner, the first AR image can be prevented from being replaced with the second AR image different from the first AR image when the user is bringing his/her face close to the display apparatus to look at the first AR image, as illustrated in FIG. 56.

Furthermore, as illustrated in FIG. 60, in (a), the captured display image and the decode target image may be obtained by the image sensor capturing an image which includes a plurality of displays each showing an image and being the subject. At this time, in (e), a region in which, among the plurality of displays, a transmission display that is transmitting a light ID information is shown is recognized as the target region from the captured display image. In (f), first subtitles for an image displayed on the transmission display are superimposed on the target region, as the AR image, and second subtitles obtained by enlarging the first subtitles are further superimposed on a region larger than the target region of the captured display image.

In this manner, the first subtitles are superimposed on the image of the transmission display, and thus a user can be readily informed of which of a plurality of displays the first subtitles are for the image of. The second subtitles obtained by enlarging the first subtitles are also displayed, and thus even if the first subtitles are small and hard to read, the subtitles can be readily read by displaying the second subtitles.

Moreover, (f) may further include: determining whether information obtained from the server includes sound information; and preferentially outputting sound indicated by the sound information over the first subtitles and the second subtitles, if the sound information is determined to be included.

Accordingly, sound is preferentially output, and thus burden on a user to read subtitles is reduced.

Figure 69B:
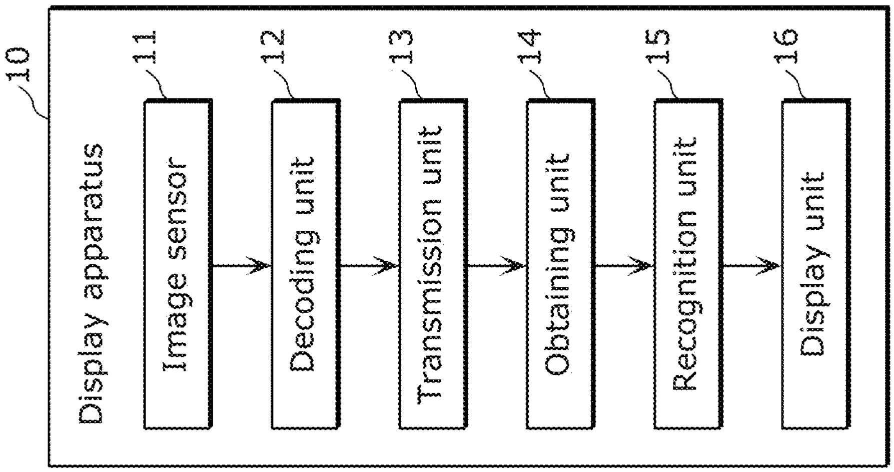
FIG. 69B is a block diagram illustrating a configuration of a display apparatus according to Embodiment 4.

FIG. 69B is a block diagram illustrating a configuration of a display apparatus according to the present embodiment.

A display apparatus 10 according to the present embodiment is a display apparatus which displays an image, an image sensor 11, a decoding unit 12, a transmission unit 13, an obtaining unit 14, a recognition unit 15, and a display unit 16. Note that the display apparatus 10 corresponds to the receiver 200 described above.

The image sensor 11 obtains a captured display image and a decode target image by capturing an image of a subject. The decoding unit 12 obtains a light ID by decoding the decode target image. The transmission unit 13 transmits the light ID to a server. The obtaining unit 14 obtains an AR image and recognition information associated with the light ID from the server. The recognition unit 15 recognizes a region according to the recognition information as a target region, from the captured display image. The display unit 16 displays a captured display image in which the AR image is superimposed on the target region.

Accordingly, the AR image is superimposed on the captured display image and displayed, and thus an image useful to a user can be displayed. Furthermore, processing load can be reduced and the AR image can be superimposed on an appropriate target region.

Note that in the present embodiment, each of the elements may be constituted by dedicated hardware, or may be obtained by executing a software program suitable for the element. Each element may be obtained by a program execution unit such as a CPU or a processor reading and executing a software program stored in a hard disk or a recording medium such as semiconductor memory. Here, software which achieves the receiver 200 or the display apparatus 10 according to the present embodiment is a program which causes a computer to execute the steps included in the flowcharts illustrated in FIGS. 45, 52, 56, 62, 65, and 68A to 69A.

[Variation 1 of Embodiment 4]

The following describes Variation 1 of Embodiment 4, that is, Variation 1 of the display method which achieves AR using a light ID.

Figure 70:
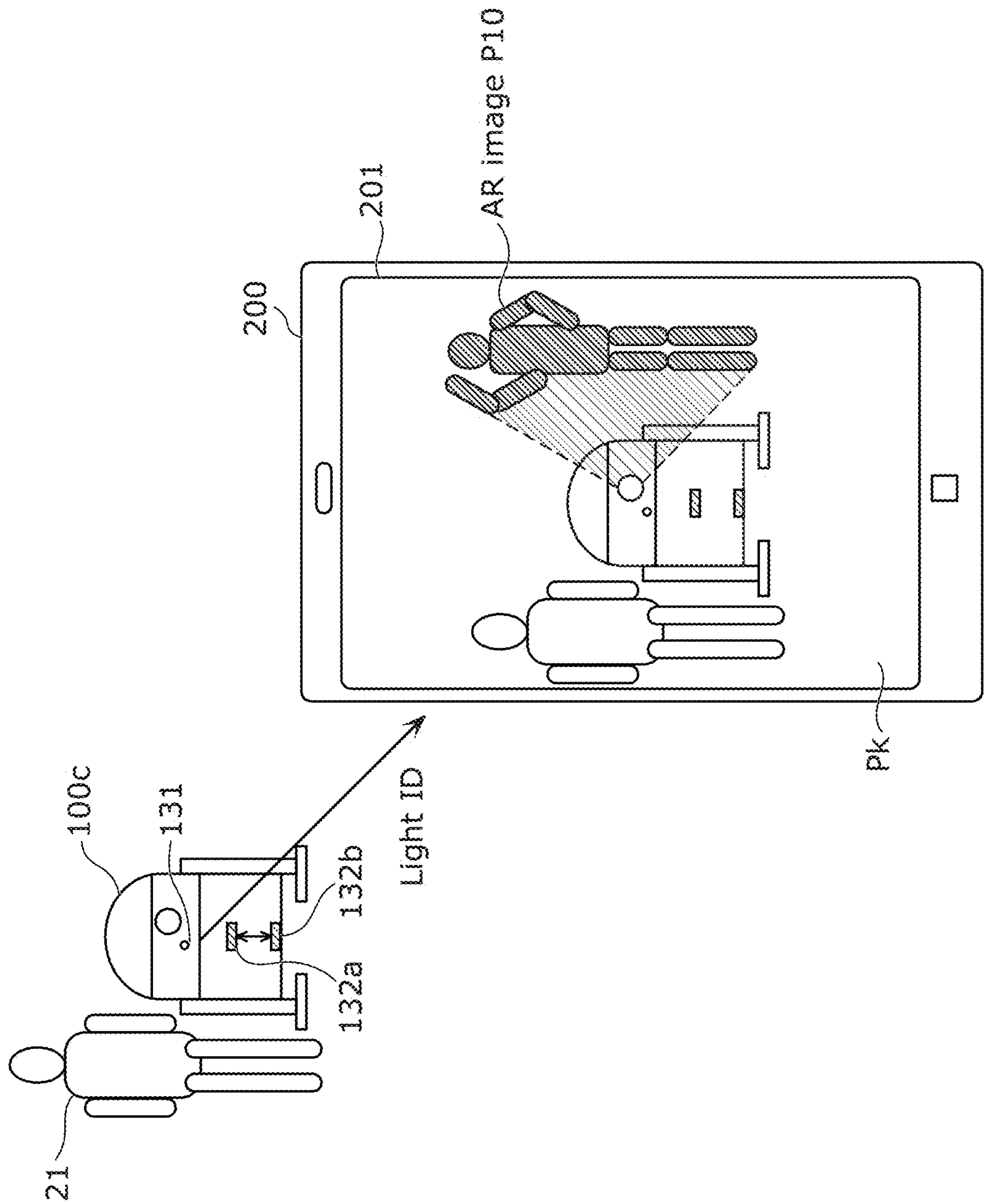
FIG. 70 is a diagram illustrating an example in which a receiver according to Variation 1 of Embodiment 4 displays an AR image.

FIG. 70 is a diagram illustrating an example in which a receiver according to Variation 1 of Embodiment 4 displays an AR image.

The receiver 200 obtains, by the image sensor capturing an image of a subject, a captured display image Pk which is a normal captured image described above and a decode target image which is a visible light communication image or bright line image described above.

Specifically, the image sensor of the receiver 200 captures an image that includes a transmitter 100*c* configured as a robot and a person 21 next to the transmitter 100*c*. The transmitter 100*c* is any of the transmitters according to Embodiments 1 to 3 above, and includes one or more light emitting elements (for example, LEDs) 131. The transmitter 100*c* changes luminance by causing one or more of the light emitting elements 131 to blink, and transmits a light ID (light identification information) by the luminance change. The light ID is the above-described visible light signal.

The receiver 200 obtains the captured display image Pk in which the transmitter 100*c* and the person 21 are shown, by capturing an image that includes the transmitter 100*c* and the person 21 for a normal exposure time. Furthermore, the receiver 200 obtains a decode target image by capturing an image that includes the transmitter 100*c* and the person 21, for a communication exposure time shorter than the normal exposure time.

The receiver 200 obtains a light ID by decoding the decode target image. Specifically, the receiver 200 receives a light ID from the transmitter 100*c*. The receiver 200 transmits the light ID to a server. Then, the receiver 200 obtains an AR image P10 and recognition information associated with the light ID from the server. The receiver 200 recognizes a region according to the recognition information as a target region from the captured display image Pk. For example, the receiver 200 recognizes, as a target region, a region on the right of the region in which the robot which is the transmitter 100*c* is shown. Specifically, the receiver 200 identifies the distance between two markers 132*a* and 132*b* of the transmitter 100*c* shown in the captured display image Pk. Then, the receiver 200 recognizes, as a target region, a region having the width and the height according to the distance. Specifically, recognition information indicates the shapes of the markers 132*a* and 132*b* and the location and the size of a target region based on the markers 132*a* and 132*b*.

The receiver 200 superimposes the AR image P10 on the target region, and displays, on the display 201, the captured display image Pk on which the AR image P10 is superimposed. For example, the receiver 200 obtains the AR image P10 showing another robot different from the transmitter 100*c*. In this case, the AR image P10 is superimposed on the target region of the captured display image Pk, and thus the captured display image Pk can be displayed as if the other robot is actually present next to the transmitter 100*c*. As a result, the person 21 can have his/her picture taken together with the other robot, as well as the transmitter 100*c*, even if the other robot does not really exist.

Figure 71:
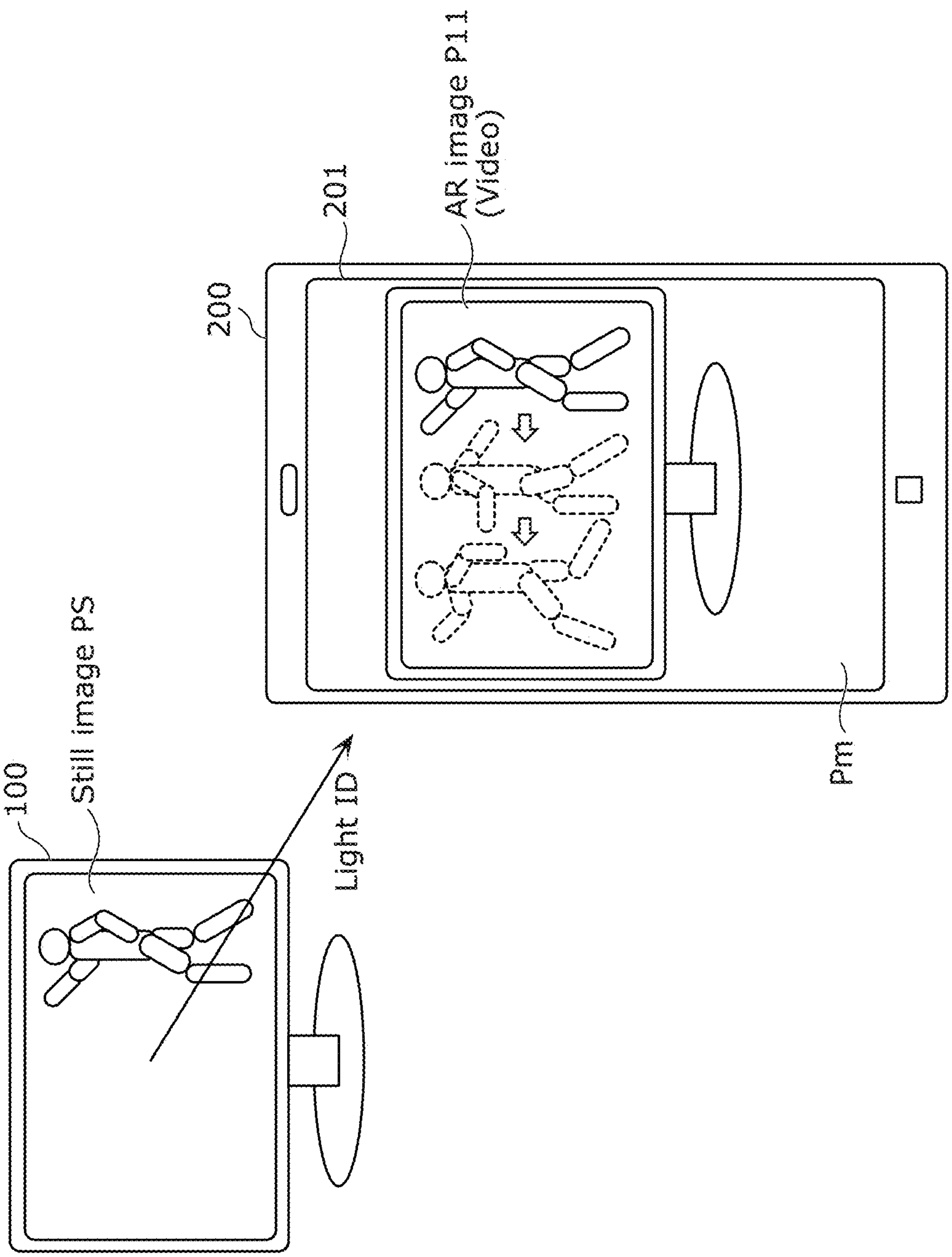
FIG. 71 is a diagram illustrating another example in which a receiver according to Variation 1 of Embodiment 4 displays an AR image.

FIG. 71 is a diagram illustrating another example in which the receiver 200 according to Variation 1 of Embodiment 4 displays an AR image.

The transmitter 100 is configured as an image display apparatus which includes a display panel, as illustrated in, for example, FIG. 71, and transmits a light ID by changing luminance while displaying a still picture PS on the display panel. Note that the display panel is a liquid crystal display or an organic electroluminescent (EL) display, for example.

The receiver 200 obtains a captured display image Pm and a decode target image by capturing an image of the transmitter 100, in the same manner as the above. The receiver 200 obtains a light ID by decoding the decode target image. Specifically, the receiver 200 receives a light ID from the transmitter 100. The receiver 200 transmits the light ID to a server. Then, the receiver 200 obtains an AR image P11 and recognition information associated with the light ID from the server. The receiver 200 recognizes a region according to the recognition information as a target region, from the captured display image Pm. For example, the receiver 200 recognizes a region in which the display panel of the transmitter 100 is shown as a target region. The receiver 200 superimposes the AR image P11 on the target region, and displays, on the display 201, the captured display image Pm on which the AR image P11 is superimposed. For example, the AR image P11 is a video having a picture which is the same or substantially the same as the still picture PS displayed on the display panel of the transmitter 100, as a leading picture in the display order. Specifically, the AR image P11 is a video which starts moving from the still picture PS.

In this case, the AR image P11 is superimposed on a target region of the captured display image Pm, and thus the receiver 200 can display the captured display image Pm, as if an image display apparatus which displays the video is actually present.

Figure 72:
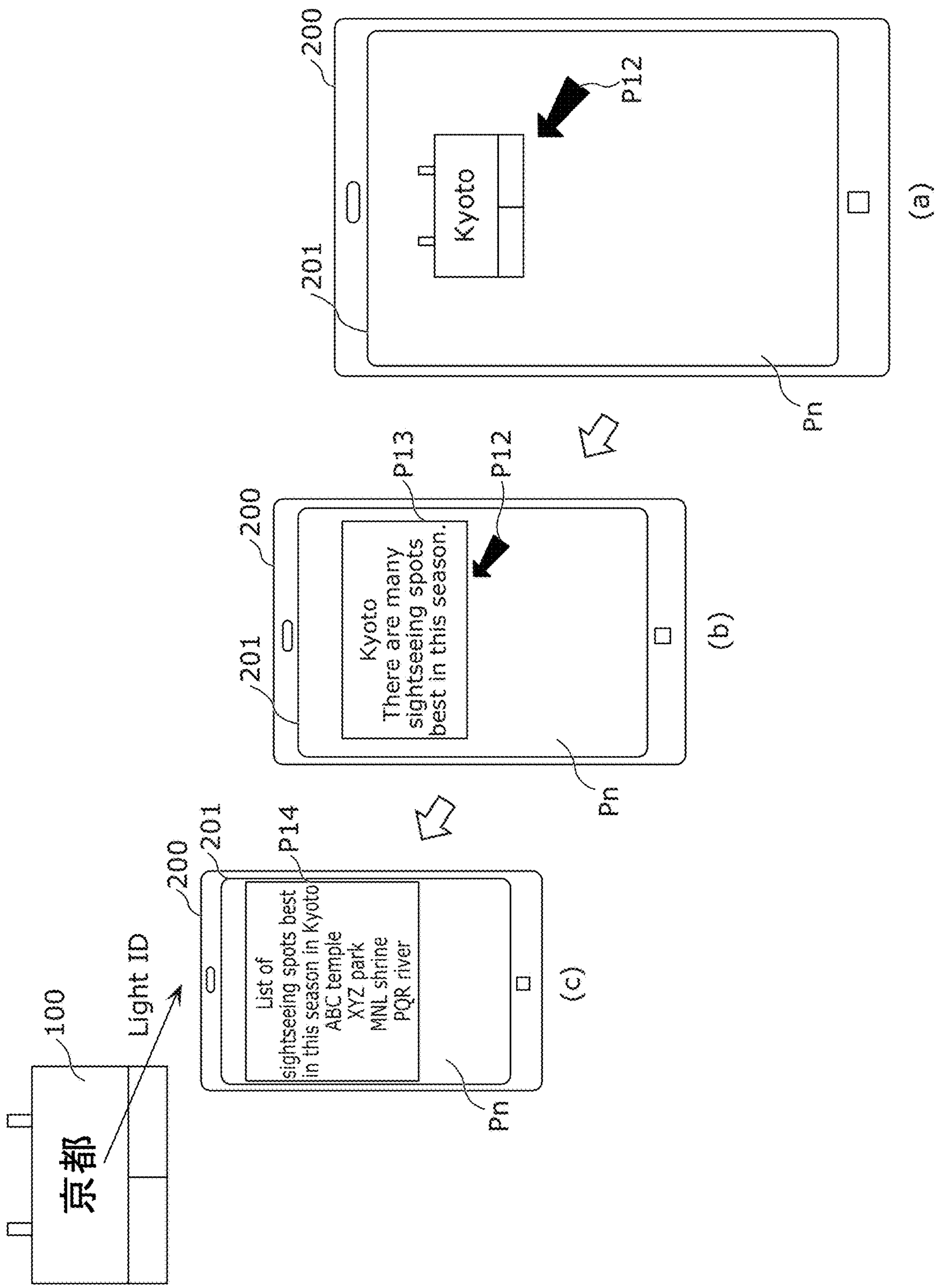
FIG. 72 is a diagram illustrating another example in which a receiver according to Variation 1 of Embodiment 4 displays an AR image.

FIG. 72 is a diagram illustrating another example in which the receiver 200 according to Variation 1 of Embodiment 4 displays an AR image.

The transmitter 100 is configured as a station sign, as illustrated in, for example, FIG. 72, and transmits a light ID by changing luminance.

The receiver 200 captures an image of the transmitter 100 from a location away from the transmitter 100, as illustrated in (a) of FIG. 72. Accordingly, the receiver 200 obtains a captured display image Pn and a decode target image, similarly to the above. The receiver 200 obtains a light ID by decoding the decode target image. Specifically, the receiver 200 receives a light ID from the transmitter 100. The receiver 200 transmits the light ID to a server. Then, the receiver 200 obtains AR images P12 to P14 and recognition information associated with the light ID from the server. The receiver 200 recognizes two regions according to the recognition information, as first and second target regions, from the captured display image Pn. For example, the receiver 200 recognizes a region around the transmitter 100 as the first target region. Then, the receiver 200 superimposes the AR image P12 on the first target region, and displays, on the display 201, the captured display image Pn on which the AR image P12 is superimposed. For example, the AR image P12 is an arrow to facilitate the user of the receiver 200 to bring the receiver 200 closer to the transmitter 100.

In this case, the AR image P12 is superimposed on the first target region of the captured display image Pn and displayed, and thus the user approaches the transmitter 100 with the receiver 200 facing the transmitter 100. Such approach of the receiver 200 to the transmitter 100 increases a region of the captured display image Pn in which the transmitter 100 is shown (corresponding to the reference region as described above). If the size of the region is greater than or equal to a first threshold, the receiver 200 further superimposes the AR image P13 on a second target region that is a region in which the transmitter 100 is shown, as illustrated in, for example, (b) of FIG. 72. Specifically, the receiver 200 displays, on the display 201, the captured display image Pn on which the AR images P12 and P13 are superimposed. For example, the AR image P13 is a message which informs a user of brief information on the vicinity of the station shown by the station sign. Furthermore, the AR image P13 has the same size as a region of the captured display image Pn in which the transmitter 100 is shown.

Also in this case, the AR image P12 which is an arrow is superimposed on the first target region of the captured display image Pn and displayed, and thus the user approaches the transmitter 100 with the receiver 200 facing the transmitter 100. Such approach of the receiver 200 to the transmitter 100 further increases a region of the captured display image Pn in which the transmitter 100 is shown (corresponding to the reference region as described above). If the size of the region is greater than or equal to a second threshold, the receiver 200 changes the AR image P13 superimposed on the second target region to the AR image P14, as illustrated in, for example, (c) of FIG. 72. Furthermore, the receiver 200 eliminates the AR image P12 superimposed on the first target region.

Specifically, the receiver 200 displays, on the display 201, the captured display image Pn on which the AR image P14 is superimposed. For example, the AR image P14 is a message informing a user of detailed information on the vicinity of the station shown on the station sign. The AR image P14 has the same size as a region of the captured display image Pn in which the transmitter 100 is shown. The closer the receiver 200 is to the transmitter 100, the larger the region in which the transmitter 100 is shown. Accordingly, the AR image P14 is larger than the AR image P13.

Accordingly, the receiver 200 increases the AR image as the transmitter 100 approaches, and displays more information. The arrow, like the AR image P12, which facilitates the user to bring the receiver 200 closer is displayed, and thus the user can be readily informed that the closer the user brings the receiver 200, the more information is displayed.

Figure 73:
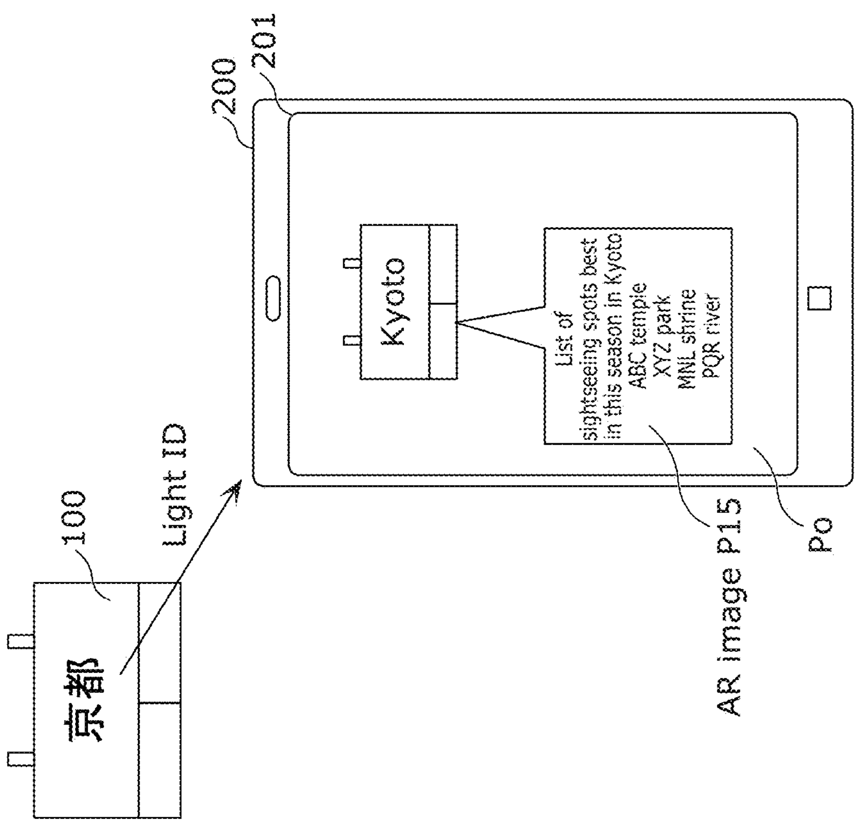
FIG. 73 is a diagram illustrating another example in which a receiver according to Variation 1 of Embodiment 4 displays an AR image.

FIG. 73 is a diagram illustrating another example in which the receiver 200 according to Variation 1 of Embodiment 4 displays an AR image.

The receiver 200 displays more information if the receiver 200 approaches the transmitter 100 in the example illustrated in FIG. 72, yet the receiver 200 may display a lot of information in a balloon irrespective of the distance between the transmitter 100 and the receiver 200.

Specifically, the receiver 200 obtains a captured display image Po and a decode target image, by capturing an image of the transmitter 100 as illustrated in FIG. 73, similarly to the above. The receiver 200 obtains a light ID by decoding the decode target image. Specifically, the receiver 200 receives a light ID from the transmitter 100. The receiver 200 transmits the light ID to a server. The receiver 200 obtains an AR image P15 and recognition information associated with the light ID from the server. The receiver 200 recognizes a region according to the recognition information as a target region, from the captured display image Po. For example, the receiver 200 recognizes a region around the transmitter 100 as a target region. Then, the receiver 200 superimposes the AR image P15 on the target region, and displays, on the display 201, the captured display image Po on which the AR image P15 is superimposed. For example, the AR image P15 is a message in a balloon informing a user of detailed information on the periphery of the station shown on the station sign.

In this case, the AR image P15 is superimposed on the target region of the captured display image Po, and thus the user of the receiver 200 can display a lot of information on the receiver 200, without approaching the transmitter 100.

Figure 74:
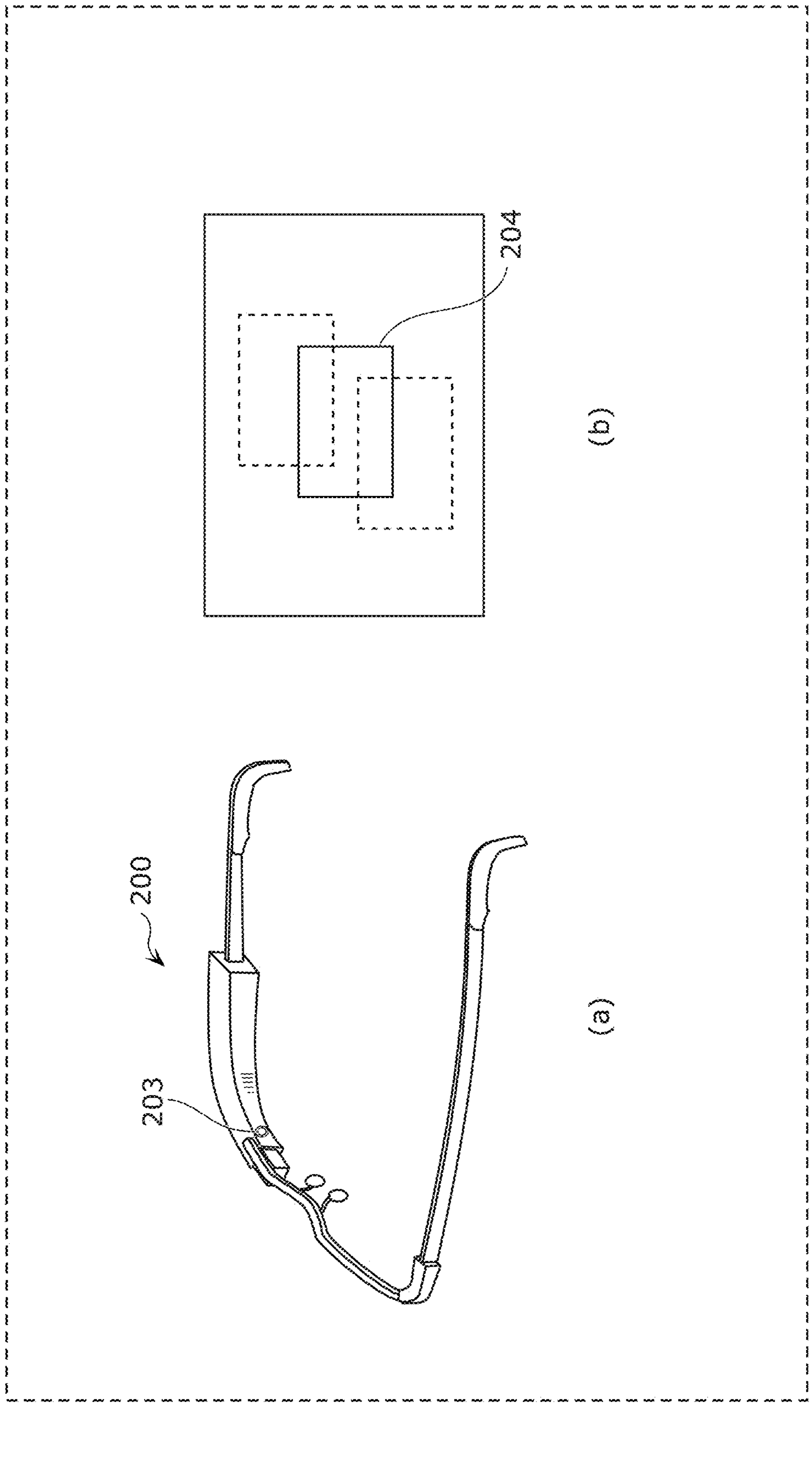
FIG. 74 is a diagram illustrating another example of a receiver 200 according to Variation 1 of Embodiment 4.

FIG. 74 is a diagram illustrating another example of the receiver 200 according to Variation 1 of Embodiment 4.

The receiver 200 is configured as a smartphone in the above example, yet may be configured as a head mount display (also referred to as glasses) which includes an image sensor, as with the examples illustrated in FIG. 64.

Such a receiver 200 obtains a light ID by decoding only a partial decoding target region of a decode target image. For example, the receiver 200 includes an eye gaze detection camera 203 as illustrated in (a) of FIG. 74. The eye gaze detection camera 203 captures an image of the eyes of a user wearing the head mount display which is the receiver 200. The receiver 200 detects the gaze of the user based on the image of the eyes obtained by image capturing with the eye gaze detection camera 203.

The receiver 200 displays a gaze frame 204 in such a manner that, for example, the gaze frame 204 appears in a region to which the detected gaze is directed in the user's view, as illustrated in (b) of FIG. 74. Accordingly, the gaze frame 204 moves according to the movement of the user's gaze. The receiver 200 handles a region corresponding to a portion of the decode target image surrounded by the gaze frame 204, as a decoding target region. Specifically, even if the decode target image has a bright line pattern region outside the decoding target region, the receiver 200 does not decode the bright line pattern region, but decodes only a bright line pattern region within the decoding target region. In this manner, even if the decode target image has a plurality of bright line pattern regions, the receiver 200 does not decode all the bright line pattern regions. Thus, a processing load can be reduced, and also unnecessary display of AR images can be suppressed.

If the decode target image includes a plurality of bright line pattern regions each for outputting sound, the receiver 200 may decode only a bright line pattern region within a decoding target region, and output only sound for the bright line pattern region.

Alternatively, the receiver 200 may decode the plurality of bright line pattern regions included in the decode target image, output sound for the bright line pattern region within the decoding target region at high volume, and output sound for a bright line pattern region outside the decoding target region at low volume. Further, if the plurality of bright line pattern regions are outside the decoding target region, the receiver 200 may output sound for a bright line pattern region at higher volume as the bright line pattern region is closer to the decoding target region.

Figure 75:
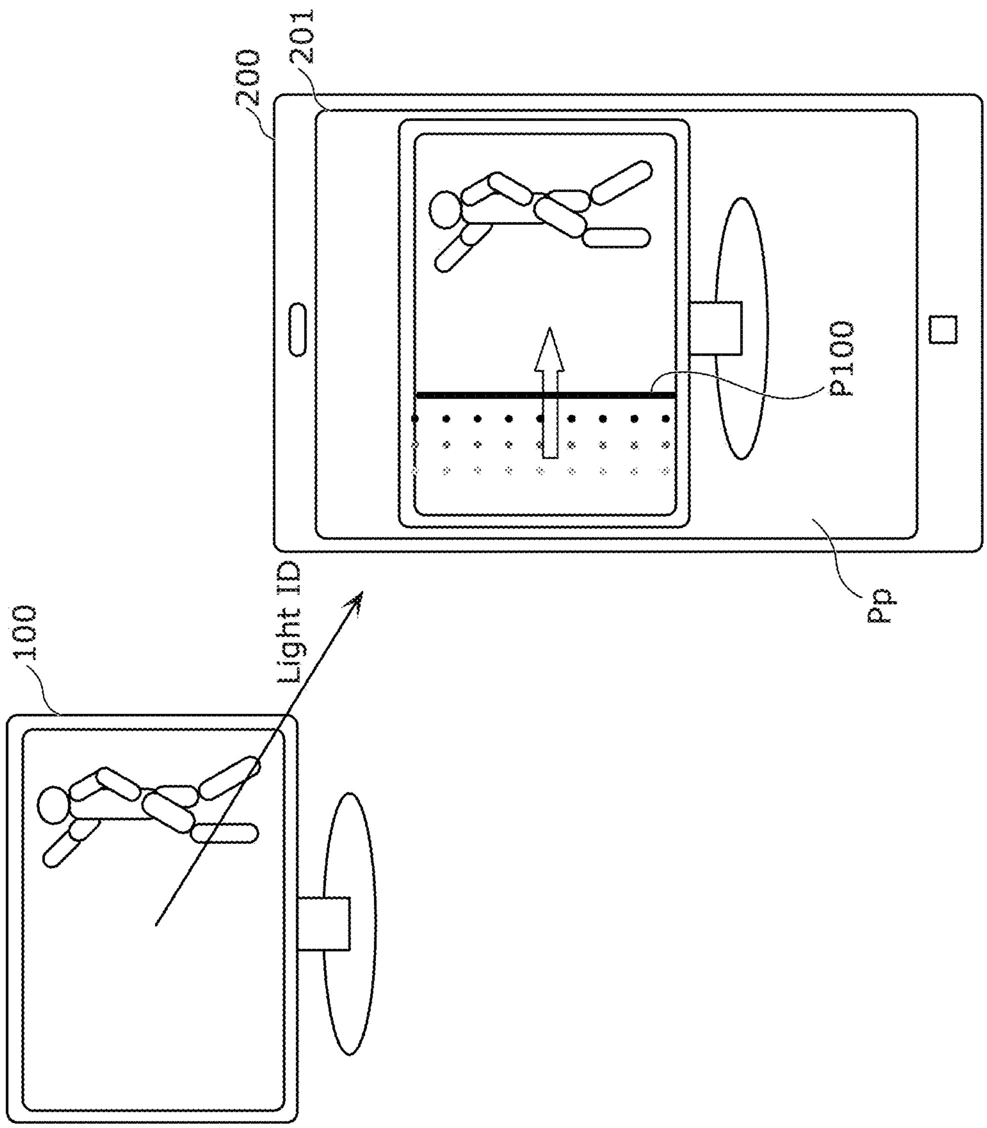
FIG. 75 is a diagram illustrating another example in which a receiver according to Variation 1 of Embodiment 4 displays an AR image.

FIG. 75 is a diagram illustrating another example in which the receiver 200 according to Variation 1 of Embodiment 4 displays an AR image.

The transmitter 100 is configured as an image display apparatus which includes a display panel as illustrated in, for example, FIG. 75, and transmits a light ID by changing luminance while displaying an image on the display panel.

The receiver 200 obtains a captured display image Pp and a decode target image by capturing an image of the transmitter 100, similarly to the above.

At this time, the receiver 200 locates, from the captured display image Pp, a region which is in the same position as the bright line pattern region in a decode target image, and has the same size as the bright line pattern region. Then, the receiver 200 may display a scanning line P100 which repeatedly moves from one edge of the region toward the other edge.

While displaying the scanning line P100, the receiver 200 obtains a light ID by decoding a decode target image, and transmits the light ID to a server. The receiver 200 obtains an AR image and recognition information associated with the light ID from the server. The receiver 200 recognizes a region according to the recognition information as a target region, from the captured display image Pp.

If the receiver 200 recognizes such a target region, the receiver 200 terminates the display of the scanning line P100, superimposes an AR image on the target region, and displays, on the display 201, the captured display image Pp on which the AR image is superimposed.

Accordingly, after the receiver 200 has captured an image of the transmitter 100, the receiver 200 displays the scanning line P100 which moves until the AR image is displayed. Thus, a user can be informed that processing of, for instance, reading a light ID and an AR image is being performed.

Figure 76:
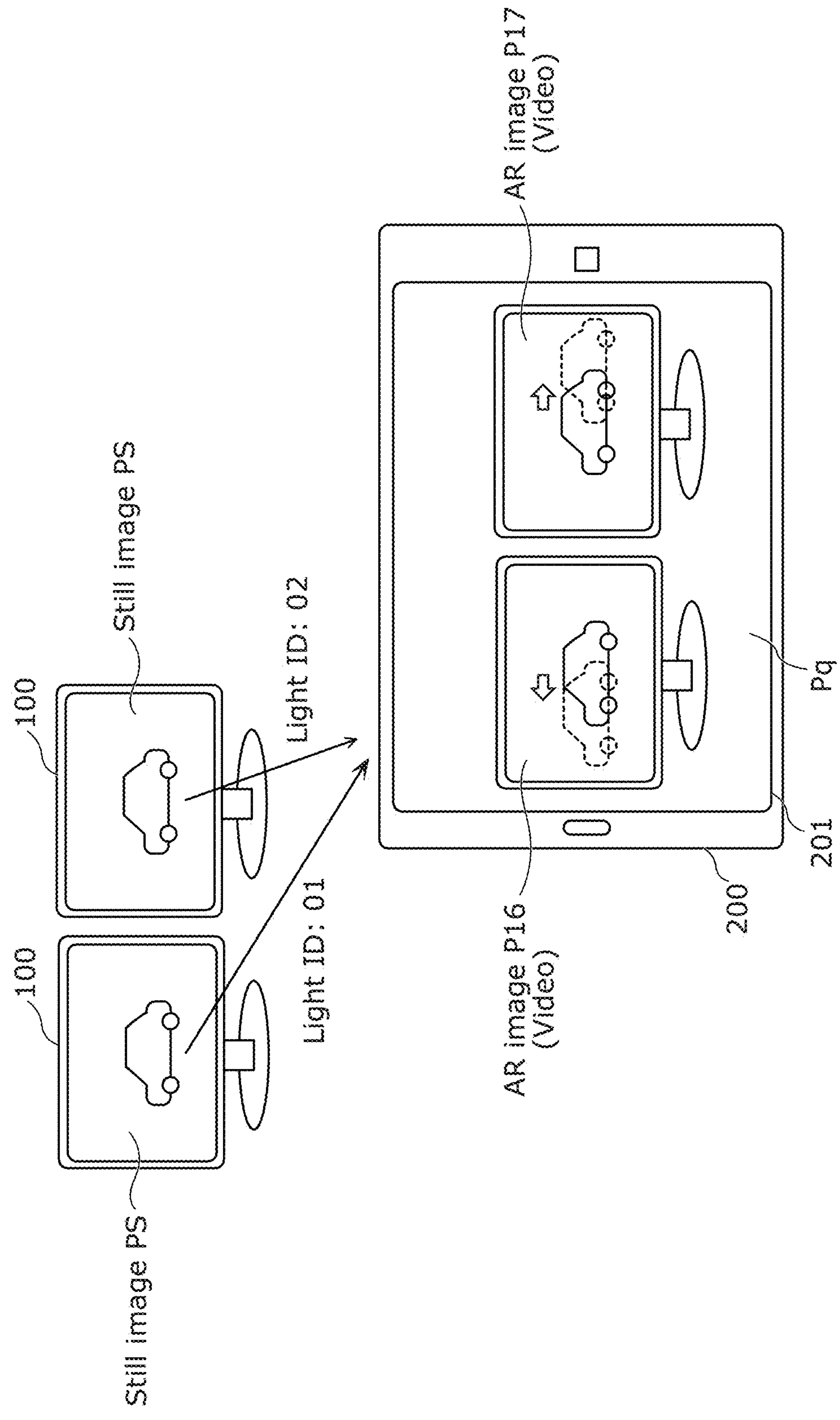
FIG. 76 is a diagram illustrating another example in which a receiver according to Variation 1 of Embodiment 4 displays an AR image.

FIG. 76 is a diagram illustrating another example in which the receiver 200 according to Variation 1 of Embodiment 4 displays an AR image.

Two transmitters 100 are each configured as an image display apparatus which includes a display panel, as illustrated in, for example, FIG. 76, and each transmit a light ID by changing luminance while displaying the same still picture PS on the display panel. Here, the two transmitters 100 transmit different lights ID (for example, light IDs "01" and "02") by changing luminance in different manners.

The receiver 200 obtains a captured display image Pq and a decode target image by capturing an image that includes the two transmitters 100, similarly to the example illustrated in FIG. 71. The receiver 200 obtains light IDs "01" and "02" by decoding the decode target image. Specifically, the receiver 200 receives the light ID "01" from one of the two transmitters 100, and receives the light ID "02" from the other. The receiver 200 transmits the light IDs to the server. Then, the receiver 200 obtains, from the server, an AR image P16 and recognition information associated with the light ID "01". Furthermore, the receiver 200 obtains an AR image P17 and recognition information associated with the light ID "02" from the server.

The receiver 200 recognizes regions according to those pieces of recognition information as target regions from the captured display image Pq. For example, the receiver 200 recognizes the regions in which the display panels of the two transmitters 100 are shown as target regions. The receiver 200 superimposes the AR image P16 on the target region corresponding to the light ID "01" and superimposes the AR image P17 on the target region corresponding to the light ID "02". Then, the receiver 200 displays a captured display image Pq on which the AR images P16 and P17 are superimposed, on the display 201. For example, the AR image P16 is a video having, as a leading picture in the display order, a picture which is the same or substantially the same as a still picture PS displayed on the display panel of the transmitter 100 corresponding to the light ID "01". The AR image P17 is a video having, as the leading picture in the display order, a picture which is the same or substantially the same as a still picture PS displayed on the display panel of the transmitter 100 corresponding to the light ID "02". Specifically, the leading pictures of the AR images P16 and P17 which are videos are the same. However, the AR images P16 and P17 are different videos, and have different pictures except the leading pictures.

Accordingly, such AR images P16 and P17 are superimposed on the captured display image Pq, and thus the receiver 200 can display the captured display image Pq as if the image display apparatuses which display different videos whose playback starts from the same picture were actually present.

Figure 77:
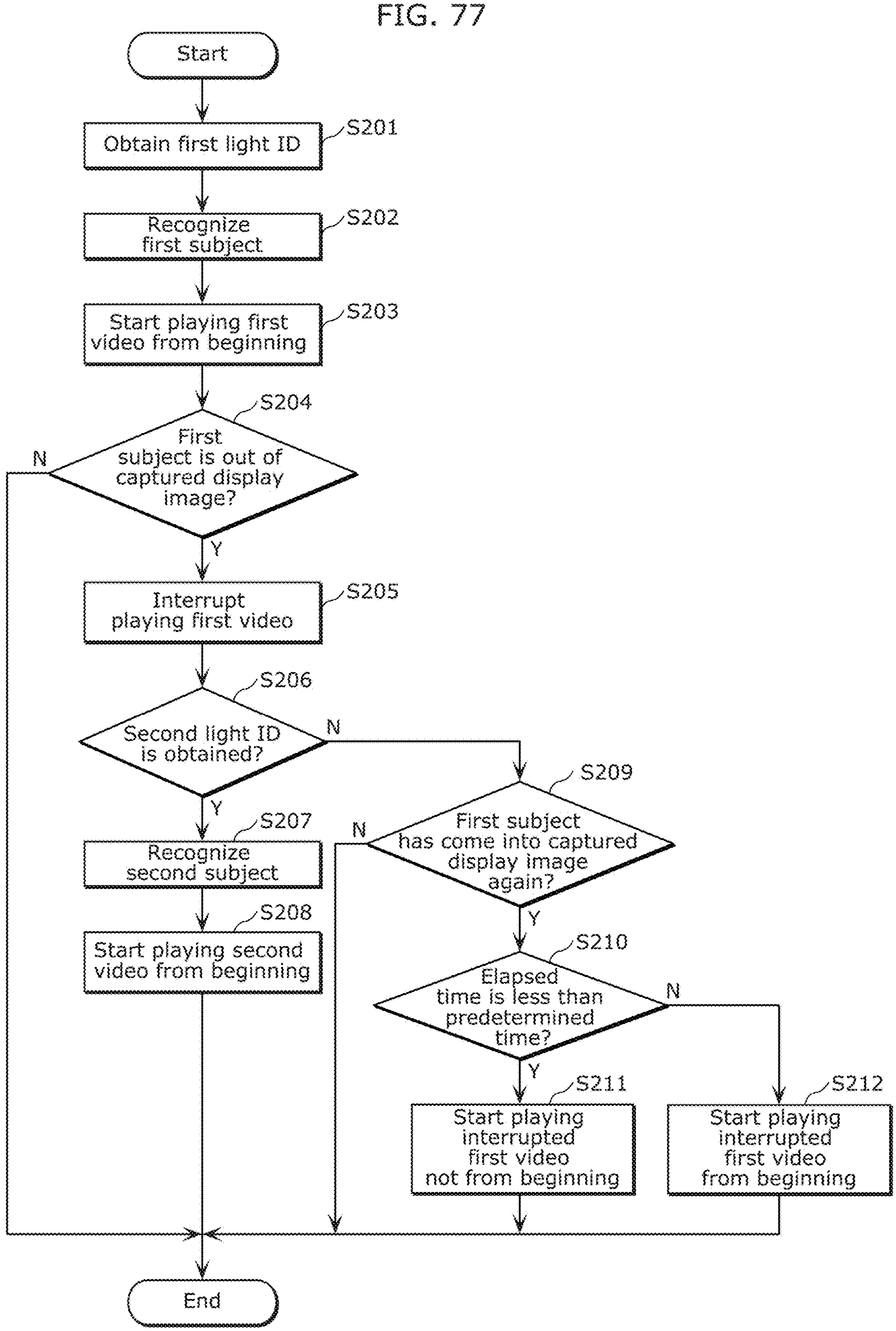
FIG. 77 is a flowchart illustrating an example of processing operation of a receiver according to Variation 1 of Embodiment 4.

FIG. 77 is a flowchart illustrating an example of processing operation of the receiver 200 according to Variation 1 of Embodiment 4. Specifically, the processing operation illustrated in the flowchart in FIG. 77 is an example of processing operation of the receiver 200 which captures images of the transmitters 100 separately, if there are two transmitters 100 illustrated in FIG. 71.

First, the receiver 200 obtains a first light ID by capturing an image of a first transmitter 100 as a first subject (step S201). Next, the receiver 200 recognizes the first subject from the captured display image (step S202). Specifically, the receiver 200 obtains a first AR image and first recognition information associated with the first light ID from a server, and recognizes the first subject, based on the first recognition information. Then, the receiver 200 starts playing a first video which is the first AR image from the beginning (step S203). Specifically, the receiver 200 starts the playback from the leading picture of the first video.

Here, the receiver 200 determines whether the first subject has gone out of the captured display image (step S204). Specifically, the receiver 200 determines whether the receiver 200 is unable to recognize the first subject from the captured display image. Here, if the receiver 200 determines that the first subject has gone out of the captured display image (Y in step S204), the receiver 200 interrupts playback of the first video which is the first AR image (step S205).

Next, by capturing an image of a second transmitter 100 different from the first transmitter 100 as a second subject, the receiver 200 determines whether the receiver 200 has obtained a second light ID different from the first light ID obtained in step S201 (step S206). Here, if the receiver 200 determines that the receiver 200 has obtained the second light ID (Y in step S206), the receiver 200 performs processing similar to the processing in steps S202 to S203 performed after the first light ID is obtained. Specifically, the receiver 200 recognizes the second subject from the captured display image (step S207). Then, the receiver 200 starts playing the second video which is the second AR image corresponding to the second light ID from the beginning (step S208). Specifically, the receiver 200 starts the playback from the leading picture of the second video.

On the other hand, if the receiver 200 determines that the receiver 200 has not obtained the second light ID in step S206 (N in step S206), the receiver 200 determines whether the first subject has come into the captured display image again (step S209). Specifically, the receiver 200 determines whether the receiver 200 again recognizes the first subject from the captured display image. Here, if the receiver 200 determines that the first subject has come into the captured display image (Y in step S209), the receiver 200 further determines whether the elapsed time is less than a time period previously determined (namely, a predetermined time period) (step S210). In other words, the receiver 200 determines whether the predetermined time period has elapsed since the first subject has gone out of the captured display image until the first subject has come into the until the first again. Here, if the receiver 200 determines that the elapsed time is less than the predetermined time period (Y in step S210), the receiver 200 starts the playback of the interrupted first video not from the beginning (step S211). Note that a playback resumption leading picture which is a picture of the first video first displayed when the playback starts not from the beginning may be the next picture in the display order following the picture displayed the last when playback of the first video is interrupted. Alternatively, the playback resumption leading picture may be a picture previous by n pictures (n is an integer of 1 or more) in the display order than the picture displayed the last.

On the other hand, if the receiver 200 determines that the predetermined time period has elapsed (N in step S210), the receiver 200 starts playing the interrupted first video from the beginning (step S212).

The receiver 200 superimposes an AR image on a target region of a captured display image in the above example, yet may adjust the brightness of the AR image at this time, Specifically, the receiver 200 determines whether the brightness of an AR image obtained from the server matches the brightness of a target region of a captured display image. Then, if the receiver 200 determines that the brightness does not match, the receiver 200 causes the brightness of the AR image to match the brightness of the target region by adjusting the brightness of the AR image. Then, the receiver 200 superimposes the AR image whose brightness has been adjusted onto the target region of the captured display image. This brings the AR image which is to be superimposed further close to an image of an object that is actually present, and odd feeling that the user feels from the AR image can be reduced. Note that the brightness of an AR image is the average spatial brightness of the AR image, and also the brightness of the target region is the average spatial brightness of the target region.

The receiver 200 may enlarge an AR image by tapping the AR image and display the enlarged AR image on the entire display 201, as illustrated in FIG. 53. In the example illustrated in FIG. 53, the receiver 200 switches an AR image that is tapped to another AR image, nevertheless the receiver 200 may automatically switch the AR image independently of such tapping. For example, if a time period during which an AR image is displayed exceeds a predetermined time period, the receiver 200 switches from the AR image to another AR image and displays the other AR image. Furthermore, when the current time becomes a predetermined time, the receiver 200 switches an AR image displayed by then to another AR image and displays the other AR image. Accordingly, the user can readily look at a new AR image without operating the receiver 200.

[Variation 2 of Embodiment 4]

The following describes Variation 2 of Embodiment 4, specifically, Variation 2 of the display method which achieves AR using a light ID.

Figure 78:
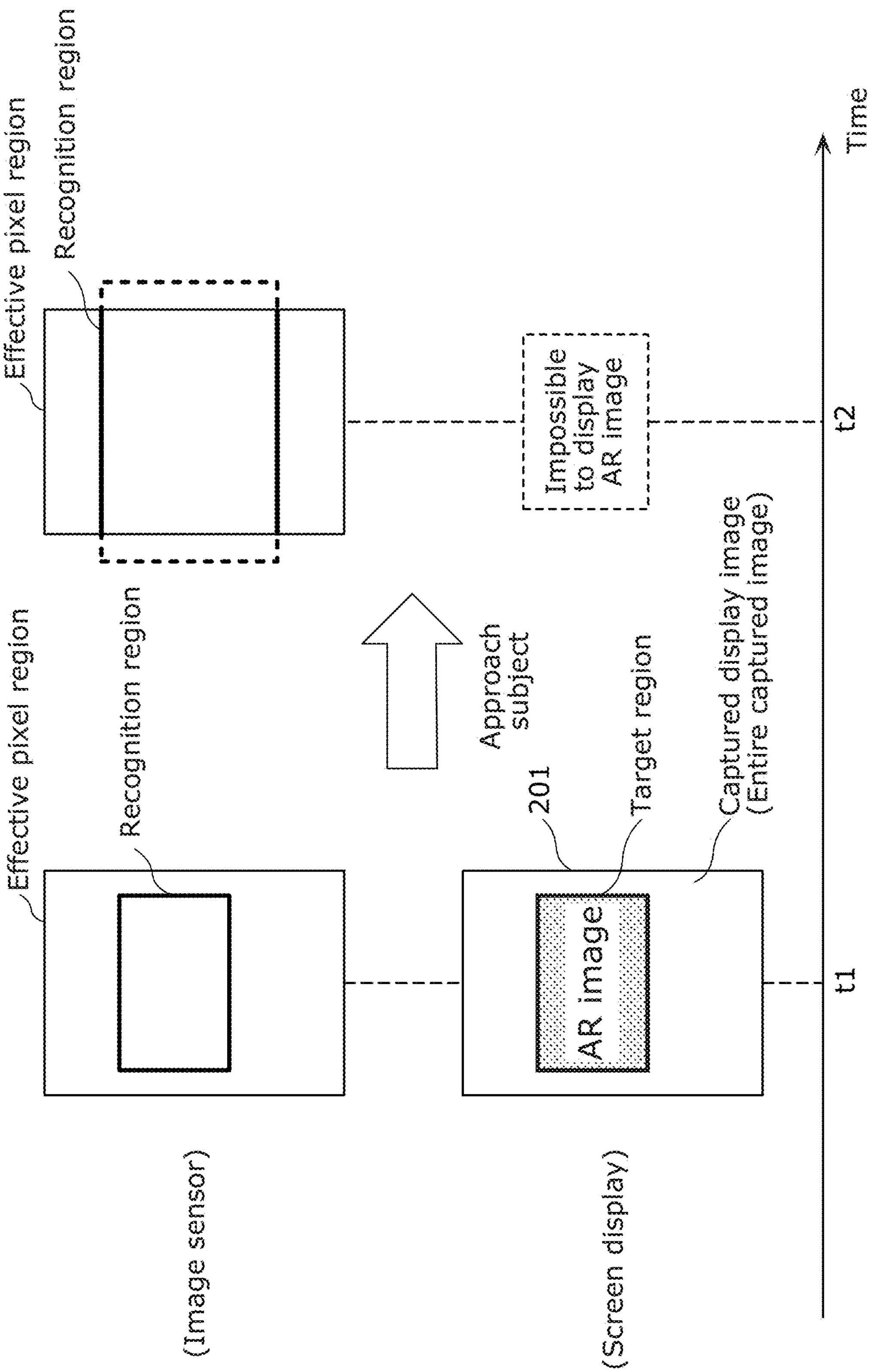
FIG. 78 is a diagram illustrating an example of an issue assumed to arise with a receiver according to Embodiment 4 or Variation 1 of Embodiment 4 when an AR image is displayed.

FIG. 78 is a diagram illustrating an example of an issue assumed to arise with the receiver 200 according to Embodiment 4 or Variation 1 of Embodiment 4 when an AR image is displayed.

For example, the receiver 200 according to Embodiment 4 or Variation 1 of Embodiment 4 captures an image of a subject at time t1. Note that the above subject is a transmitter such as a TV which transmits a light ID by changing luminance, a poster illuminated with light from the transmitter, a guideboard, or a signboard, for instance. As a result, the receiver 200 displays, as a captured display image, the entire image obtained through an effective pixel region of an image sensor (hereinafter, referred to as entire captured image) on the display 201. At this time, the receiver 200 recognizes, as a target region on which an AR image is to be superimposed, a region according to recognition information obtained based on the light ID, from the captured display image. The target region is a region in which an image of a transmitter such as a TV or an image of a poster, for example. The receiver 200 superimposes the AR image on the target region of the captured display image, and displays, on the display 201, the captured display image on which the AR image is superimposed. Note that the AR image may be a still image or a video, or may be a character string which includes one or more characters or symbols.

Here, if the user of the receiver 200 approaches a subject in order to display the AR image in a larger size, a region (hereinafter, referred to as a recognition region) on an image sensor corresponding to the target region protrudes off the effective pixel region at time t2. Note that the recognition region is a region where an image shown in the target region of the captured display image is projected in the effective pixel region of the image sensor. Specifically, the effective pixel region and the recognition region of the image sensor correspond to the captured display image and the target region of the display 201, respectively.

Due to the recognition region protruding off the effective pixel region, the receiver 200 cannot recognize the target region from the captured display image, and cannot display an AR image.

In view of this, the receiver 200 according to this variation obtains, as an entire captured image, an image corresponding to a wider angle of view than that for a captured display image displayed on the entire display 201.

Figure 79:
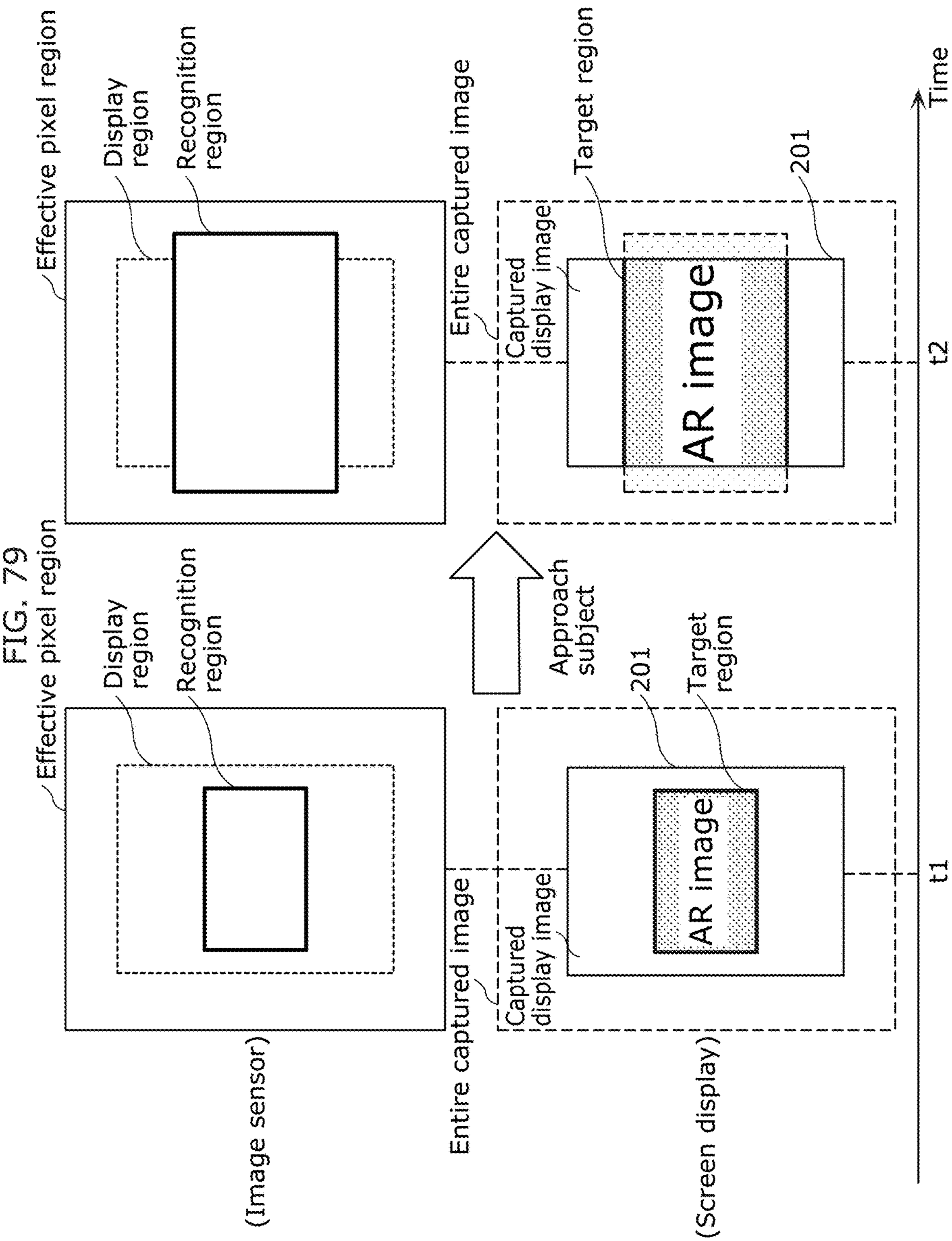
FIG. 79 is a diagram illustrating an example in which a receiver according to Variation 2 of Embodiment 4 displays an AR image.

FIG. 79 is a diagram illustrating an example in which the receiver 200 according to Variation 2 of Embodiment 4 displays an AR image.

The angle of view for the entire captured image obtained by the receiver 200 according to this variation, that is, the angle of view for the effective pixel region of the image sensor is wider than the angle of view for the captured display image displayed on the entire display 201. Note that in an image sensor, a region corresponding to an image area displayed on the display 201 is hereinafter referred to as a display region.

For example, the receiver 200 captures an image of a subject at time t1. As a result, the receiver 200 displays, on the display 201 as a captured display image, only an image obtained through the display region that is smaller than the effective pixel region of the image sensor, out of the entire captured image obtained through the effective pixel region. At this time, the receiver 200 recognizes, as a target region on which an AR image is to be superimposed, a region according to the recognition information obtained based on the light ID, from the entire captured image, similarly to the above. Then, the receiver 200 superimposes the AR image on the target region of the captured display image, and displays, on the display 201, the captured display image on which the AR image is superimposed.

Here, if the user of the receiver 200 approaches a subject in order to display the AR image in a larger size, the recognition region on the image sensor expands. Then, at time t2, the recognition region protrudes off the display region on the image sensor. Specifically, an image shown in the target region (for example, an image of a poster) protrudes off the captured display image displayed on the display 201. However, the recognition region on the image sensor is not protruding off the effective pixel region. Specifically, the receiver 200 has obtained the entire captured image which includes a target region also at time t2. As a result, the receiver 200 can recognize the target region from the entire captured image. The receiver 200 superimposes, only on a partial region within the target region in the captured display image, a portion of the AR image corresponding to the region, and displays the images on the display 201.

Accordingly, even if the user approaches the subject in order to display the AR image in a greater size and the target region protrudes off the captured display image, the display of the AR image can be continued.

Figure 80:
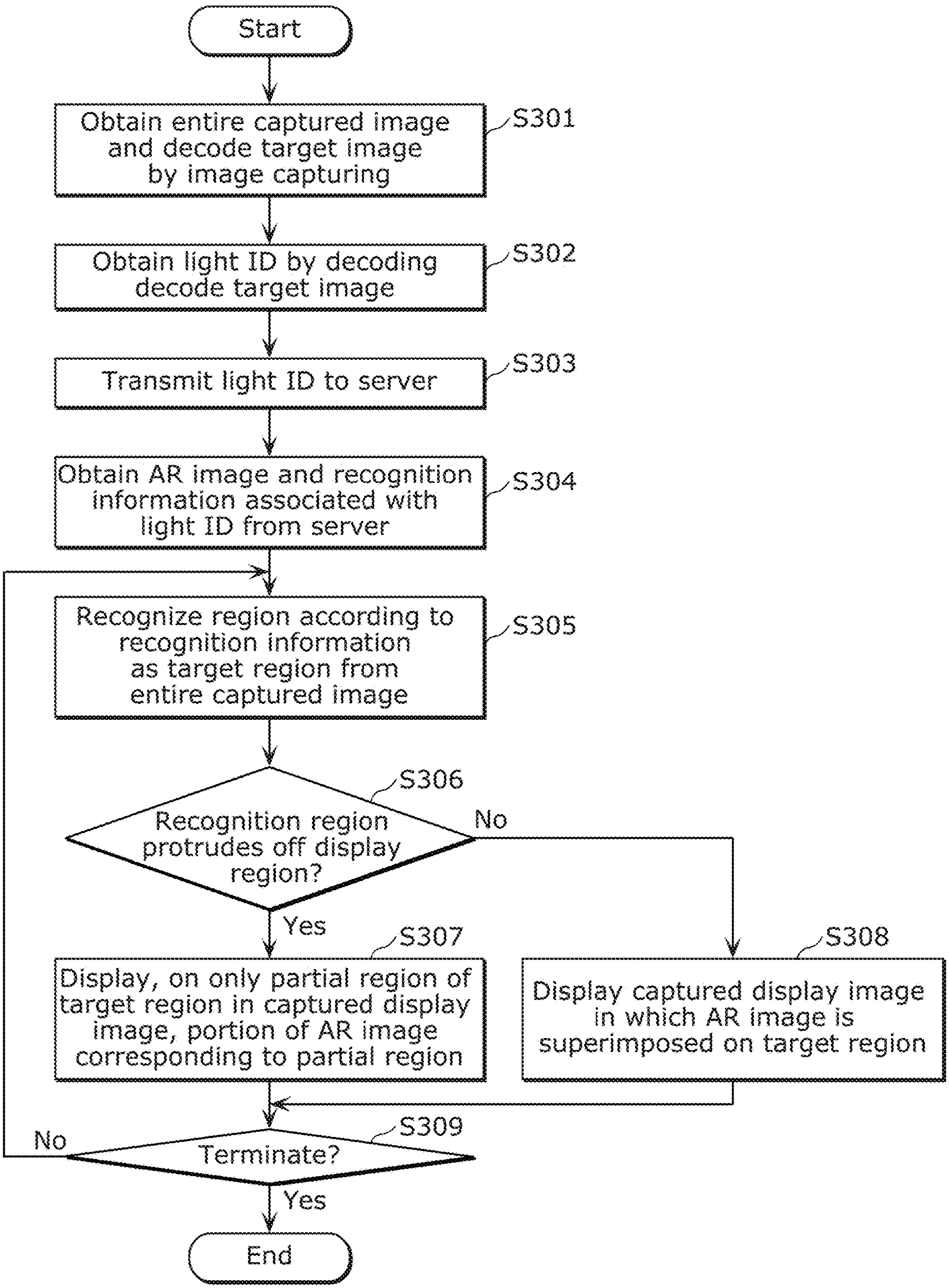
FIG. 80 is a flowchart illustrating an example of processing operation of a receiver according to Variation 2 of Embodiment 4.

FIG. 80 is a flowchart illustrating an example of processing operation of the receiver 200 according to Variation 2 of Embodiment 4.

The receiver 200 obtains an entire captured image and a decode target image by the image sensor capturing an image of a subject (step S301). Next, the receiver 200 obtains a light ID by decoding the decode target image (step S302). Next, the receiver 200 transmits the light ID to the server (step S303). Next, the receiver 200 obtains an AR image and recognition information associated with the light ID from the server (step S304). Next, the receiver 200 recognizes a region according to the recognition information as a target region, from the entire captured image (step S305).

Here, the receiver 200 determines whether a recognition region, in the effective pixel region of the image sensor, corresponding to an image shown in the target region protrudes off the display region (step S306). Here, if the receiver 200 determines that the recognition region is protruding off (Yes in step S306), the receiver 200 displays, on only a partial region of the target region in the captured display image, a portion of the AR image corresponding to the partial region (step S307). On the other hand, if the receiver 200 determines that the recognition region is not protruding off (No in step S306), the receiver 200 superimposes the AR image on the target region of the captured display image, and displays the captured display image on which the AR image is superimposed (step S308).

Then, the receiver 200 determines whether processing of displaying the AR image is to be terminated (step S309), and if the receiver 200 determines that the processing is not to be terminated (No in step S309), the receiver 200 repeatedly executes the processing from step S305.

Figure 81:
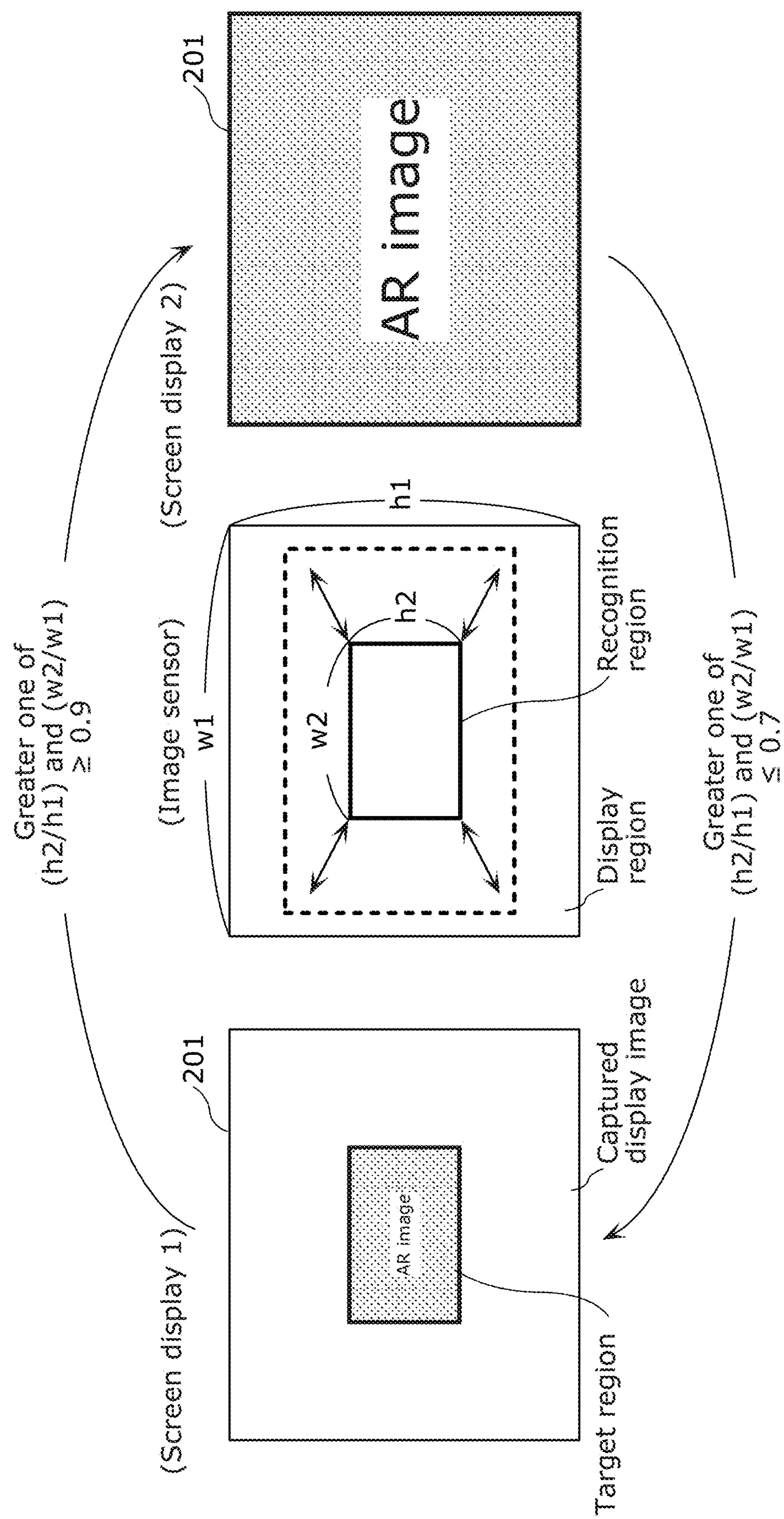
FIG. 81 is a diagram illustrating another example in which a receiver according to Variation 2 of Embodiment 4 displays an AR image.

FIG. 81 is a diagram illustrating another example in which the receiver 200 according to Variation 2 of Embodiment 4 displays an AR image.

The receiver 200 may switch between screen displays of AR images according to the ratio of the size of the recognition region relative to the display region stated above.

When the horizontal width of the display region of the image sensor is w1, the vertical width is h1, the horizontal width of the recognition region is w2, and the vertical width is h2, the receiver compares a greater one of the ratios (h2/h1) and (w2/w1) with a threshold.

For example, the receiver 200 compares the ratio of the greater one with a first threshold (for example, 0.9) when a captured display image in which an AR image is superimposed on a target region is displayed as shown by (Screen Display 1) in FIG. 81. When the ratio of the greater one is 0.9 or more, the receiver 200 enlarges the AR image and displays the enlarged AR image over the entire display 201, as shown by (Screen Display 2) in FIG. 81. Note that also when the recognition region becomes greater than the display region and further becomes greater than the effective pixel region, the receiver 200 enlarges the AR image and displays the enlarged AR image over the entire display 201.

The receiver 200 compares the greater one of the ratios with a second threshold (for example, 0.7) when, for example, the receiver 200 enlarges the AR image and displays the enlarged AR image over the entire display 201, as shown by (Screen Display 2) in FIG. 81. The second threshold is smaller than the first threshold. When the greater ratio becomes 0.7 or less, the receiver 200 displays the captured display image in which the AR image is superimposed on the target region, as shown by (Screen Display 1) in FIG. 81.

Figure 82:
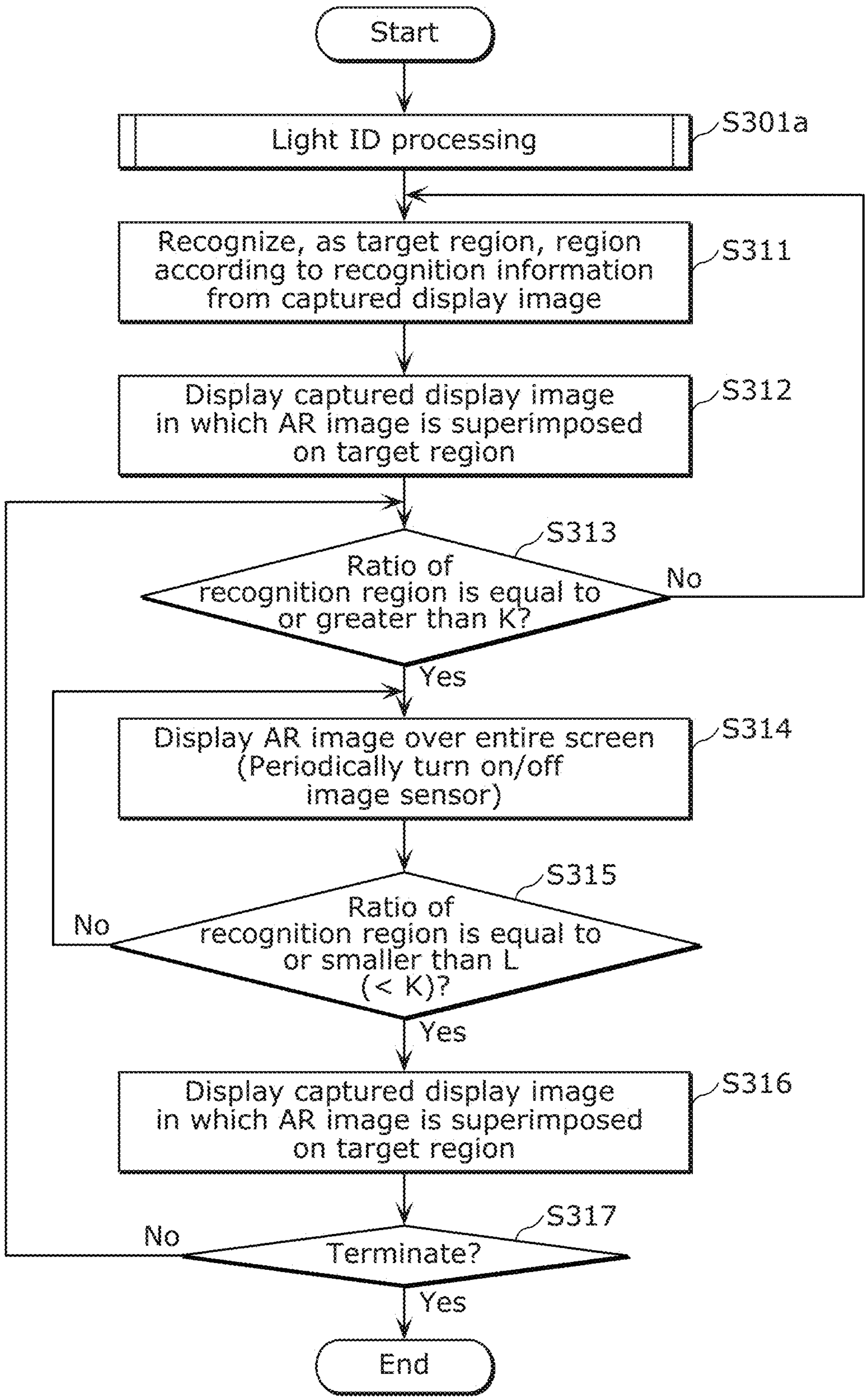
FIG. 82 is a flowchart illustrating another example of processing operation of a receiver according to Variation 2 of Embodiment 4.

FIG. 82 is a flowchart illustrating another example of processing operation of the receiver 200 according to Variation 2 of Embodiment 4.

The receiver 200 first performs light ID processing (step S301*a*). The light ID processing includes steps S301 to S304 illustrated in FIG. 80. Next, the receiver 200 recognizes, as a target region, a region according to recognition information from a captured display image (step S311). Then, the receiver 200 superimposes an AR image on a target region of the captured display image, and displays the captured display image on which the AR image is superimposed (step S312).

Next, the receiver 200 determines whether a greater one of the ratios of a recognition region, namely, the ratios (h2/h1) and (w2/w1) is greater than or equal to a first threshold K (for example, K=0.9) (step S313). Here, if the receiver 200 determines that the greater one is not greater than or equal to the first threshold K (No in step S313), the receiver 200 repeatedly executes processing from step S311. On the other hand, if the receiver 200 determines that the greater one is greater than or equal to the first threshold K (Yes in step S313), the receiver 200 enlarges the AR image and displays the enlarged AR image over the entire display 201 (step S314), At this time, the receiver 200 periodically switches between on and off of the power of the image sensor. Power consumption of the receiver 200 can be reduced by turning off the power of the image sensor periodically.

Next, the receiver 200 determines whether the greater one of the ratios of the recognition region is equal to or smaller than the second threshold L (for example, L=0.7) when the power of the image sensor is periodically turned on. Here, if the receiver 200 determines that the greater one of the ratios of the recognition region is not equal to or smaller than the second threshold L (No in step S315), the receiver 200 repeatedly executes the processing from step S314. On the other hand, if the receiver 200 determines that the ratio of the recognition region is equal to or smaller than the second threshold L (Yes in step S315), the receiver 200 superimposes the AR image on the target region of the captured display image, and displays the captured display image on which the AR image is superimposed (step S316).

Then, the receiver 200 determines whether processing of displaying an AR image is to be terminated (step S317), and if the receiver 200 determines that the processing is not to be terminated (No in step S317), the receiver 200 repeatedly executes the processing from step S313.

Accordingly, by setting the second threshold L to a value smaller than the first threshold K, the screen display of the receiver 200 is prevented from being frequently switched between (Screen Display 1) and (Screen Display 2), and the state of the screen display can be stabilized.

Note that the display region and the effective pixel region may be the same or may be different in the example illustrated in FIGS. 81 and 82. Furthermore, although the ratio of the size of the recognition region relative to the display region is used in the example, if the display region is different from the effective pixel region, the ratio of the size of the recognition region relative to the effective pixel region may be used instead of the display region.

Figure 83:
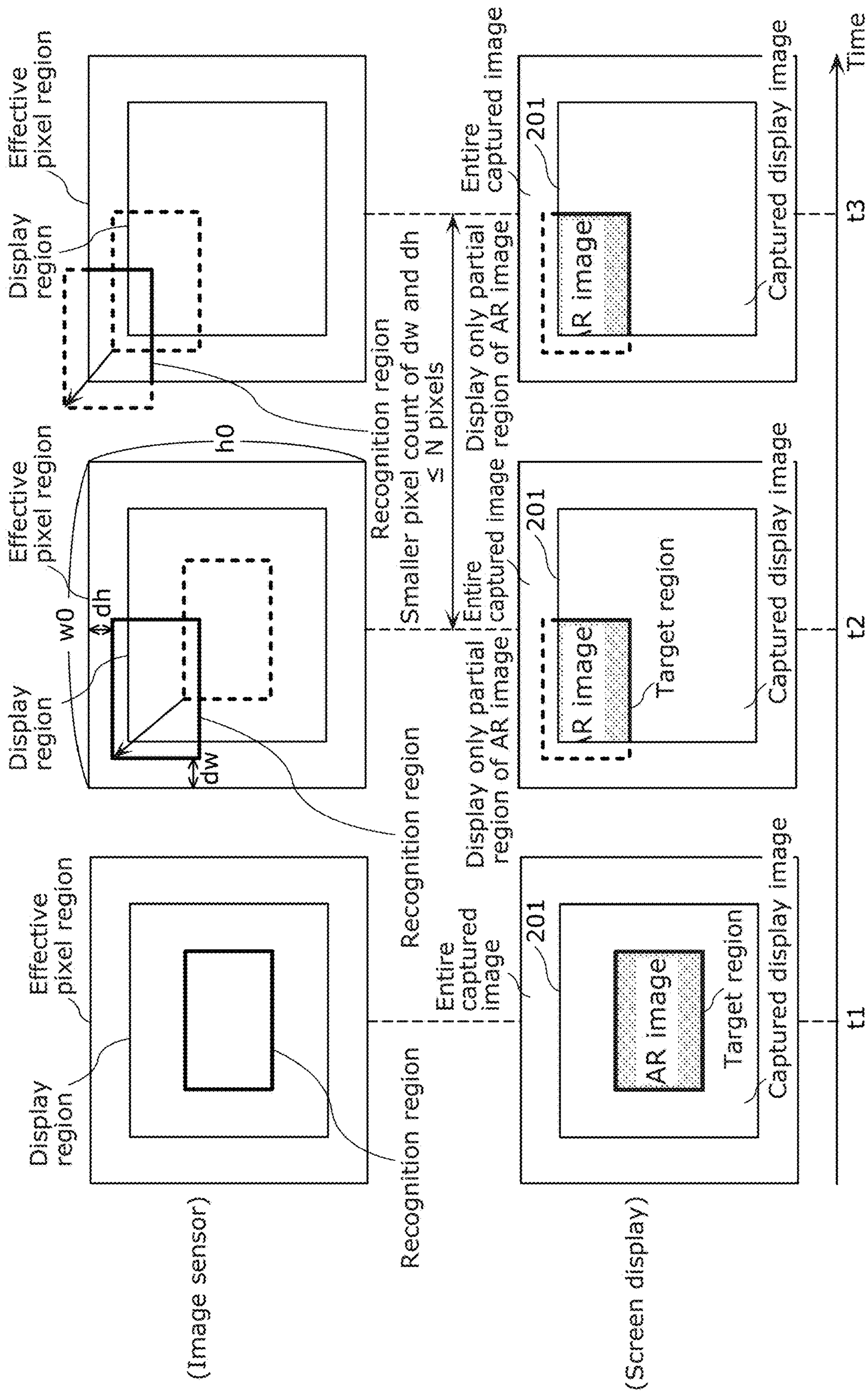
FIG. 83 is a diagram illustrating another example in which a receiver according to Variation 2 of Embodiment 4 displays an AR image.

FIG. 83 is a diagram illustrating another example in which the receiver 200 according to Variation 2 of Embodiment 4 displays an AR image.

In the example illustrated in FIG. 83, similarly to the example illustrated in FIG. 79, the image sensor of the receiver 200 includes an effective pixel region larger than the display region.

For example, the receiver 200 captures an image of a subject at time t1. As a result, the receiver 200 displays, on the display 201 as a captured display image, only an image obtained through the display region smaller than the effective pixel region, out of the entire captured image obtained through the effective pixel region of the image sensor. At this time, the receiver 200 recognizes, as a target region on which an AR image is to be superimposed, a region according to recognition information obtained based on a light ID, from the entire captured image, similarly to the above. Then, the receiver 200 superimposes the AR image on the target region of the captured display image, and displays, on the display 201, the captured display image on which the AR image is superimposed.

Here, if the user changes the orientation of the receiver 200 (specifically, the image sensor), the recognition region of the image sensor moves to, for example, the upper left in FIG. 83, and protrudes off the display region at time t2. Specifically, an image (for example, an image of a poster) in a target region will protrude off the captured display image displayed on the display 201. However, the recognition region of the image sensor is not protruding off the effective pixel region. Specifically, the receiver 200 obtains an entire captured image which includes a target region also at time t2. As a result, the receiver 200 can recognize a target region from the entire captured image, and superimposes a portion of the AR image corresponding to the partial region on only a partial region of the target region in the captured display image, thus displaying the images on the display 201. Furthermore, the receiver 200 changes the size and the position of a portion of an AR image to be displayed, according to the movement of the recognition region of the image sensor, that is, the movement of the target region in the entire captured image.

When the recognition region protrudes off the display region as described above, the receiver 200 compares, with a threshold, the pixel count for a distance between the edge of the effective pixel region and the edge of the display region (hereinafter, referred to as an interregional distance).

For example, dh denotes the pixel count for a shorter one (hereinafter referred to as a first distance) of a distance between the upper sides of the effective pixel region and the display region and a distance between the lower sides of the effective pixel region and the display region. Furthermore, dw denotes the pixel count for a shorter one (hereinafter, referred to as a second distance) of a distance between the left sides of the effective pixel region and the display region and a distance between the right sides of the effective pixel region and the display region. At this time, the above interregional distance is a shorter one of the first and second distances.

Specifically, the receiver 200 compares a smaller one of the pixel counts dw and dh with a threshold N. If the smaller pixel count is below the threshold N at, for example, time t2, the receiver 200 fixes the size and the position of a portion of an AR image, according to the position of the recognition region of the image sensor. Accordingly, the receiver 200 switches between screen displays of the AR image. For example, the receiver 200 fixes the size and the location of a portion of the AR image to be displayed to the size and the position of a portion of the AR image displayed on the display 201 when the smaller one of the pixel counts becomes the threshold N.

Accordingly, even if the recognition region further moves and protrudes off the effective pixel region at time t3, the receiver 200 continues displaying a portion of the AR image in the same manner as at time t2. Specifically, as long as a smaller one of the pixel counts dw and dh is equal to or less than the threshold N, the receiver 200 superimposes a portion of the AR image whose size and position are fixed on the captured display image in the same manner as at time t2, and continues displaying the images.

In the example illustrated in FIG. 83, the receiver 200 has changed the size and the position of a portion of the AR image to be displayed according to the movement of the recognition region of the image sensor, but may change the display magnification and the position of the entire AR image.

Figure 84:
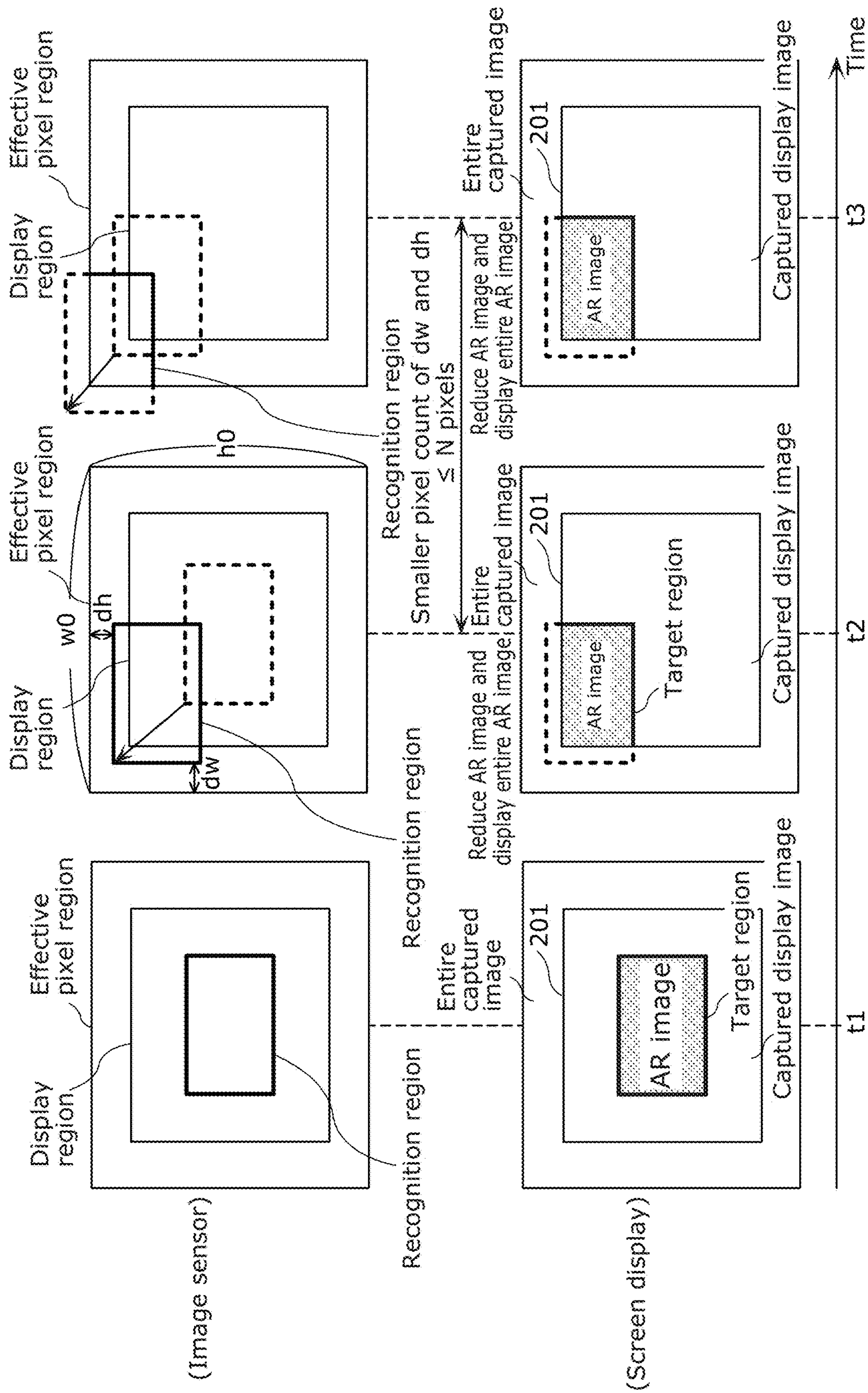
FIG. 84 is a diagram illustrating another example in which a receiver according to Variation 2 of Embodiment 4 displays an AR image.

FIG. 84 is a diagram illustrating another example in which the receiver 200 according to Variation 2 of Embodiment 4 displays an AR image. Specifically, FIG. 84 illustrates an example in which the display magnification of the AR image is changed.

For example, similarly to the example illustrated in FIG. 83, if the user changes the orientation of the receiver 200 (specifically, the image sensor) from the state at time ti, the recognition region of the image sensor moves to, for example, the upper left in FIG. 84, and protrudes off the display region at time t2. Specifically an image (for example, an image of a poster) shown in the target region will protrude off the captured display image displayed on the display 201. However, the recognition region of the image sensor is not off the effective pixel region. Specifically, the receiver 200 obtains the entire captured image which includes a target region also at time t2. As a result, the receiver 200 recognizes the target region from the entire captured image.

In view of this, in the example illustrated in FIG. 84, the receiver 200 changes the display magnification of the AR image such that the size of the entire AR image matches the size of a partial region of the target region in the captured display image. Specifically, the receiver 200 reduces the size of the AR image. Then, the receiver 200 superimposes, on the region, the AR image whose display magnification has been changed (that is, reduced in size), and displays the images on the display 201. Furthermore, the receiver 200 changes the display magnification and the location of AR image which are displayed, according to the movement of the recognition region of the image sensor, namely the movement of the target region in the entire captured image.

As described above, when the recognition region protrudes off the display region, the receiver 200 compares a smaller one of the pixel counts dw and dh with the threshold N. Then, the receiver 200 fixes the display magnification and the position of the AR image without changing the display magnification and the position according to the position of the recognition region of the image sensor, if the smaller pixel count becomes below the threshold N at time t2, for example. Specifically, the receiver 200 switches between screen displays of the AR image. For example, the receiver 200 fixes the display magnification and the position of a displayed AR image to the display magnification and the position of the AR image displayed on the display 201 when the smaller pixel count becomes the threshold N.

Accordingly, the recognition region further moves and protrudes off the effective pixel region at time t3, the receiver 200 continues displaying the AR image in the same manner as at time t2. In other words, as long as the smaller one of the pixel counts dw and dh is equal to or smaller than the threshold N, the receiver 200 superimposes, on the captured display image, the AR image whose display magnification and position are fixed and continues displaying the images, in the same manner as at time t2.

Note that in the above example, a smaller one of the pixel counts dw and dh is compared with the threshold, yet the ratio of the smaller pixel count may be compared with the threshold. The ratio of the pixel count dw is, for example, a ratio (dw/w0) of the pixel count dw relative to the horizontal pixel count w0 of the effective pixel region. Similarly, the ratio of the pixel count dh is, for example, a ratio (dh/h0) of the pixel count dh relative to the vertical pixel count h0 of the effective pixel region. Alternatively, instead of the horizontal or vertical pixel count of the effective pixel region, the ratios of the pixel counts dw and dh may be represented using he horizontal or vertical pixel count of the display region. The threshold compared with the ratios of the pixel counts dw and dh is 0.05, for example.

The angle of view corresponding to a smaller one of the pixel counts dw and dh may be compared with the threshold. If the pixel count along the diagonal line of the effective pixel region is m, and the angle of view corresponding to the diagonal line is θ (for example, 55 degrees), the angle of view corresponding to the pixel count dw is θ×dw/m, and the angle of view corresponding to the pixel count dh is θ×dh/m.

In the example illustrated in FIGS. 83 and 84, the receiver 200 switches between screen displays of an AR image based on the interregional distance between the effective pixel region and the recognition region, yet may switch the screen displays of an AR image, based on a relation between the display region and the recognition region.

Figure 85:
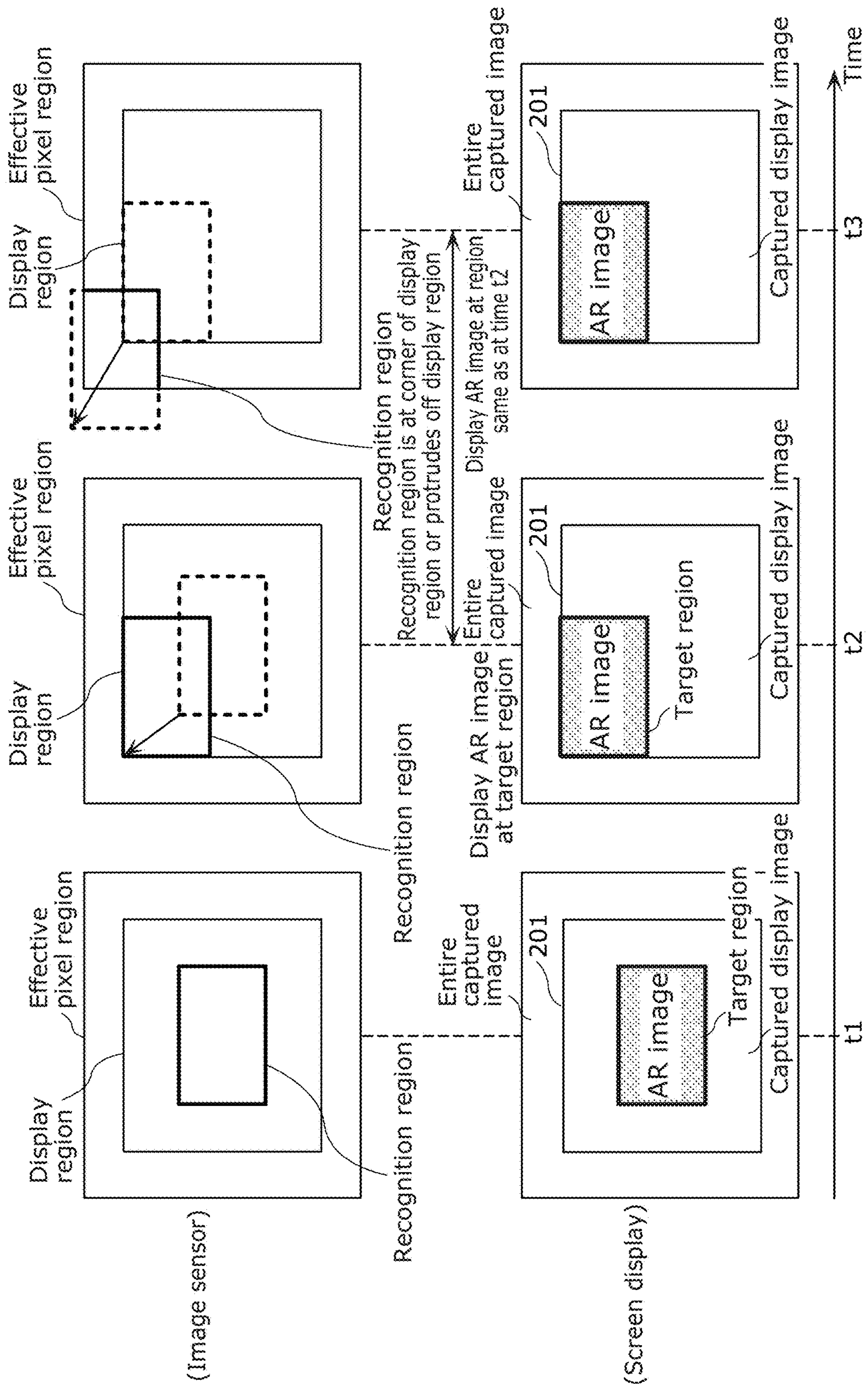
FIG. 85 is a diagram illustrating another example in which a receiver according to Variation 2 of Embodiment 4 displays an AR image.

FIG. 85 is a diagram illustrating another example in which the receiver 200 according to Variation 2 of Embodiment 4 displays an AR image. Specifically, FIG. 85 illustrates an example of switching between screen displays of an AR image, based on a relation between the display region and the recognition region. In the example illustrated in FIG. 85, similarly to the example illustrated in FIG. 79, the image sensor of the receiver 200 has an effective pixel region larger than the display region.

For example, the receiver 200 captures an image of a subject at time t1. As a result, the receiver 200 displays, on the display 201 as a captured display image, only an image obtained through the display region smaller than the effective pixel region, out of the entire captured image obtained through the effective pixel region of the image sensor. At this time, the receiver 200 recognizes, as a target region on which an AR image is to be superimposed, a region according to the recognition information obtained based on a light ID, from the entire captured image, similarly to the above. The receiver 200 superimposes an AR image on the target region of the captured display image, and displays, on the display 201, the captured display image on which the AR image is superimposed.

Here, if the user changes the orientation of the receiver 200, the receiver 200 changes the position of the AR image to be displayed, according to the movement of the recognition region of the image sensor. For example, the recognition region of the image sensor moves, for example, to the upper left in FIG. 85, and at time t2, a portion of the edge of the recognition region and a portion of the edge of the display region match. Specifically, an image shown in the target region (for example, an image of a poster) is disposed at the corner of the captured display image displayed on the display 201. As a result, the receiver 200 superimposes an AR image on the target region at the corner of the captured display image, and displays the images on the display 201.

When the recognition region further moves and protrudes off the display region, the receiver 200 fixes the size and the position of the AR image displayed at time t2, without changing the size and the position. Specifically, the receiver 200 switches between the screen displays of the AR image.

Thus, even if the recognition region further moves, and protrudes off the effective pixel region at time t3, the receiver 200 continues displaying the AR image in the same manner as at time t2. Specifically, as long as the recognition region is off the display region, the receiver 200 superimposes the AR image on the captured display image in the same size as at time t2 and in the same position as at time t2, and continues displaying the images.

Accordingly, in the example illustrated in FIG. 85, the receiver 200 switches between the screen displays of the AR image, according to whether the recognition region protrudes off the display region.

Instead of the display region, the receiver 200 may use a determination region which includes the display region, and is larger than the display region, but smaller than the effective pixel region. In this case, the receiver 200 switches between the screen displays of the AR image, according to whether the recognition region protrudes off the determination region.

Although the above is a description of the screen display of the AR image with reference to FIGS. 79 to 85, when the receiver 200 cannot recognize a target region from the entire captured image, the receiver 200 may superimpose, on the captured display image, an AR image having the same size as the target region recognized immediately before, and displays the images.

Figure 86:
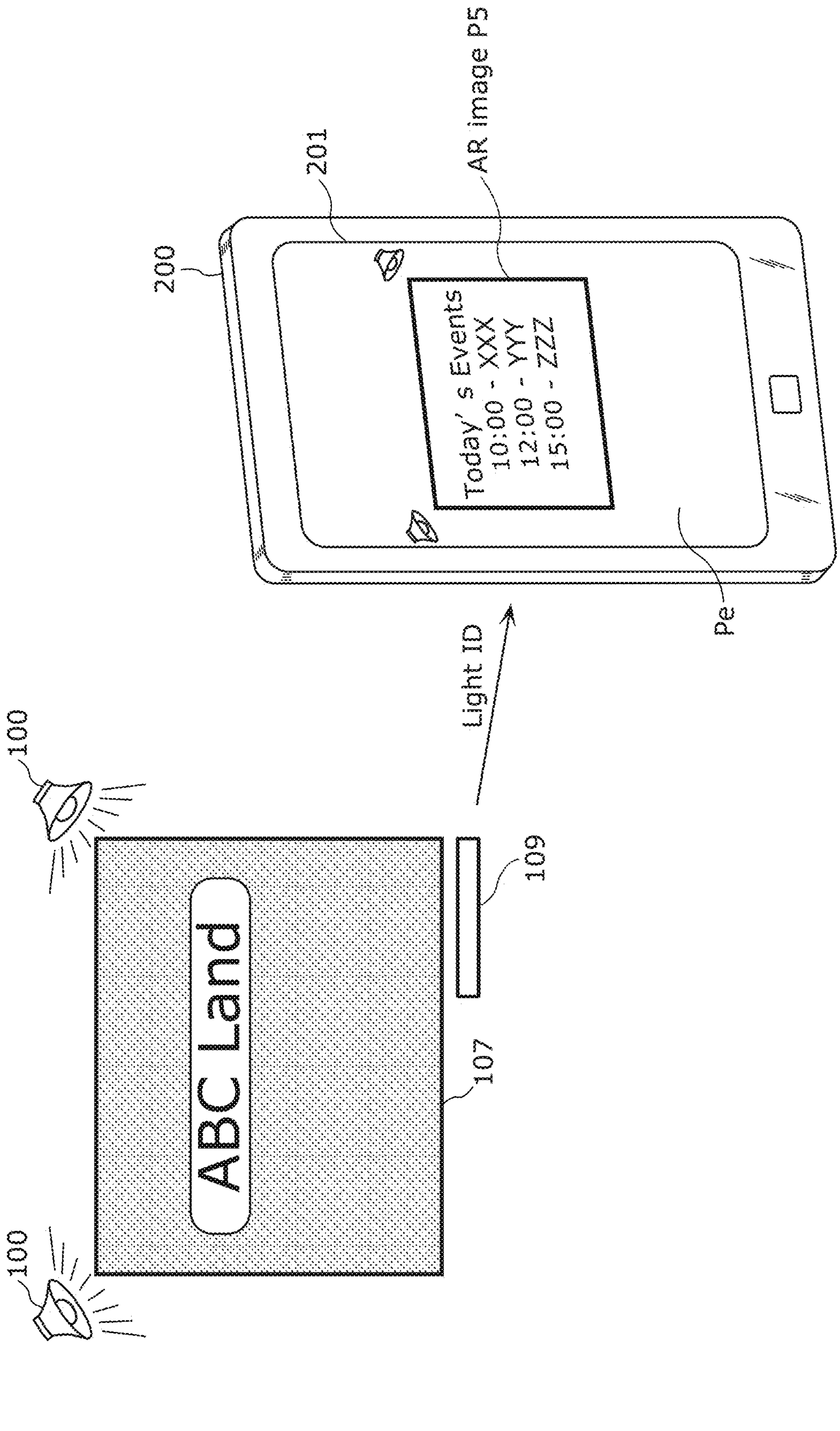
FIG. 86 is a diagram illustrating another example in which a receiver according to Variation 2 of Embodiment 4 displays an AR image.

FIG. 86 is a diagram illustrating another example in which the receiver 200 according to Variation 2 of Embodiment 4 displays an AR image.

Note that in the example illustrated in FIG. 49, the receiver 200 obtains the captured display image Pe and the decode target image, by capturing an image of the guideboard 107 illuminated by the transmitter 100, similarly to the above. The receiver 200 obtains a light ID by decoding the decode target image. Specifically, the receiver 200 receives a light ID from the guideboard 107. However, if the entire surface of the guideboard 107 has a color which absorbs light (for example, dark color), the surface is dark even if the surface is illuminated by the transmitter 100, and thus the receiver 200 may not be able to receive a light ID appropriately. Furthermore, also when the entire surface of the guideboard 107 has a striped pattern like a decode target image (namely, bright line image), the receiver 200 may not be able to receive a light ID appropriately.

In view of this, as illustrated in FIG. 86, a reflecting plate 109 may be disposed near the guideboard 107. This allows the receiver 200 to receive, from the transmitters 100, light reflected off the reflecting plate 109, or specifically, visible light transmitted from the transmitters 100 (specifically, a light ID). As a result, the receiver 200 can receive a light ID appropriately, and display the AR image PS.

[Summary of Variations 1 and 2 of Embodiment 4]

Figure 87B:
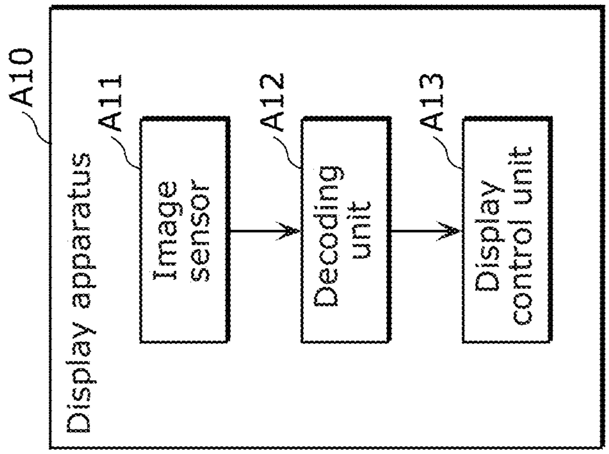
FIG. 87B is a block diagram illustrating a configuration of a display apparatus according to an aspect of the present disclosure.
Figure 87A:
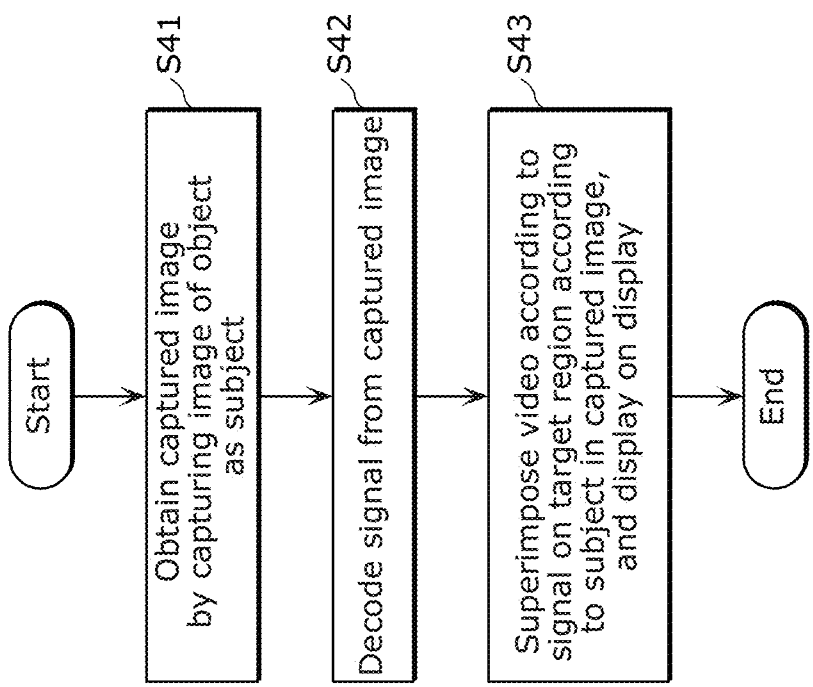
FIG. 87A is a flowchart illustrating a display method according to an aspect of the present disclosure.

FIG. 87A is a flowchart illustrating a display method according to an aspect of the present disclosure.

The display method according to an aspect of the present disclosure includes steps S41 to S43.

In step S41, a captured image is obtained by an image sensor capturing an image of, as a subject, an object illuminated by a transmitter which transmits a signal by changing luminance. In step S42, the signal is decoded from the captured image. In step S43, a video corresponding to the decoded signal is read from a memory, the video is superimposed on a target region corresponding to the subject in the captured image, and the captured image in which the video is superimposed on the target region is displayed on a display. Here, in step S43, the video is displayed, starting with one of, among images included in the video, an image which includes the object and a predetermined number of images which are to be displayed around a time at which the image which includes the object is to be displayed. The predetermined number of images are, for example, ten frames. Alternatively, the object is a still image, and in step S43, the video is displayed, starting with an image same as the still image. Note that an image with which the display of a video starts is not limited to the same image as a still image, and may be an image located before or after the same image as the still image, that is, an image which includes an object, by a predetermined number of frames in the display order. The object may not be limited to a still image, and may be a doll, for instance.

Note that the image sensor and the captured image are the image sensor and the entire captured image in Embodiment 4, for example. Furthermore, an illuminated still image may be a still image displayed on the display panel of the image display apparatus, and may also be a poster, a guideboard, or a signboard illuminated with light from a transmitter.

Such a display method may further include a transmission step of transmitting a signal to a server, and a receiving step of receiving a video corresponding to the signal from the server.

In this manner, as illustrated in, for example, FIG. 71, a video can be displayed in virtual reality as if the still image started moving, and thus an image useful to the user can be displayed.

The still image may include an outer frame having a predetermined color, and the display method according to an aspect of the present disclosure may include recognizing the target region from the captured image, based on the predetermined color. In this case, in step S43, the video may be resized to a size of the recognized target region, the resized video may be superimposed on the target region in the captured image, and the captured image in which the resized video is superimposed on the target region may be displayed on the display. For example, the outer frame having a predetermined color is a white or black quadrilateral frame surrounding a still image, and is indicated by recognition information in Embodiment 4. Then, the AR image in Embodiment 4 is resized as a video and superimposed.

Accordingly, a video can be displayed more realistically as if the video were actually present as a subject.

Out of an imaging region of the image sensor, only an image to be projected in the display region smaller than the imaging region is displayed on a display. In this case, in step S43, if a projection region in which a subject is projected in the imaging region is larger than the display region, an image obtained through a portion of the projection region beyond the display region may not be displayed on the display. Here, for example, as illustrated in FIG. 79, the imaging region and the projection region are the effective pixel region and the recognition region of the image sensor, respectively.

In this manner, for example, as illustrated in FIG. 79, by the image sensor approaching the still image which is a subject, even if a portion of an image obtained through the projection region (recognition region in FIG. 79) is not displayed on the display, the entire still image which is a subject may be projected on the imaging region. Accordingly, in this case, a still image which is a subject can be recognized appropriately, and a video can be superimposed appropriately on a target region corresponding to a subject in a captured image.

For example, the horizontal and vertical widths of the display region are w1 and hi, and the horizontal and vertical widths of the projection region are w2 and h2. In this case, in step S43, if a greater value of h2/h1 and w2/w1 is greater than or equal to a predetermined value, a video is displayed on the entire screen of the display, and if a greater value of h2/h1 and w2/w1 is smaller than the predetermined value, a video may be superimposed on the target region of the captured image, and displayed on the display.

Accordingly, as illustrated in, for example, FIG. 81, if the image sensor approaches a still image which is a subject, a video is displayed on the entire screen. Thus, the user does not need to cause a video to be displayed in a larger size by bringing the image sensor further close to the still image. Accordingly, it can be prevented that a signal cannot be decoded due to protrusion of a projection region (recognition region in FIG. 81) off the imaging region (effective pixel region) because the image sensor is brought too close to a still image.

The display method according to an aspect of the present disclosure may further include a control step of turning off the operation of the image sensor if a video is displayed on the entire screen of the display.

Accordingly, for example, as illustrated in step S314 in FIG. 82, power consumption of the image sensor can be reduced by turning off the operation of the image sensor.

In step S43, if a target region cannot be recognized from a captured image due to the movement of the image sensor, a video may be displayed in the same size as the size of the target region recognized immediately before the target region is unable to be recognized. Note that the case in which the target region cannot be recognized from a captured image is a state in which, for example, at least a portion of a target region corresponding to a still image which is a subject is not included in a captured image. If a target region cannot be thus recognized, a video having the same size as the size of the target region recognized immediately before is displayed, as with the case at time t3 in FIG. 85, for example. Thus, it can be prevented that at least a portion of a video is not displayed since the image sensor has been moved.

In step S43, if the movement of the image sensor brings only a portion of the target region into a region of the captured image which is to be displayed on the display, a portion of a spatial region of a video corresponding to the portion of the target region may be superimposed on the portion of the target region and displayed on the display. Note that the portion of the spatial region of the video is a portion of each of the pictures which constitute the video.

Accordingly, for example, as at time t2 in FIG. 83, only a portion of the spatial region of a video (AR image in FIG. 83) is displayed on the display. As a result, a user can be informed that the image sensor is not appropriately directed to a still image which is a subject.

In step S43, if the movement of the image sensor makes the target region unable to be recognized from the captured image, a portion of a spatial region of a video corresponding to a portion of the target region which has been displayed immediately before the target region becomes unable to be recognized may be continuously displayed In this manner, for example, as at time t3 in FIG. 83, also when the user directs the image sensor in a different direction than the still image which is the subject, a portion of the spatial region of a video (AR image in FIG. 83) is continuously displayed. As a result, the user can be readily informed of the direction in which the image sensor should be facing in order to display the entire video.

Furthermore, in step S43, if the horizontal and vertical widths of the imaging region of the image sensor are w0 and h0 and the distances in the horizontal and vertical directions between the imaging region and a projection region of the imaging region, in which the subject is projected, are dh and dw, it may be determined that the target region cannot be recognized when a smaller value of dw/w0 and dh/h0 is equal to or less than a predetermined value. Note that the projection region is the recognition region illustrated in FIG. 83, for example. Furthermore, in step S43, it may be determined that the target region cannot be recognized if a angle of view corresponding to a shorter one of the distances in the horizontal and vertical directions between the imaging region and the projection region in which the subject is projected in the imaging region of the image sensor is equal to or less than a predetermined value.

Accordingly, whether the target region can be recognized can be appropriately determined.

FIG. 87B is a block diagram illustrating a configuration of a display apparatus according to an aspect of the present disclosure.

A display apparatus A10 according to an aspect of the present disclosure includes an image sensor A11, a decoding unit A12, and a display control unit A13.

The image sensor A11 obtains a captured image by capturing, as a subject, an image of a still image illuminated by a transmitter which transmits a signal by changing luminance.

The decoding unit A12 decodes a signal from the captured image.

The display control unit A13 reads a video corresponding to the decoded signal from a memory, superimposes the video on a target region corresponding to the subject in the captured image, and displays the images on the display. Here, the display control unit A13 displays a plurality of images in order, starting from a leading image which is the same image as a still image among a plurality of images included in the video.

Accordingly, advantageous effects as those obtained by the display method describe above can be produced.

The image sensor A11 may include a plurality of micro mirrors and a photosensor, and the display apparatus A10 may further include an imaging controller which controls the image sensor. In this case, the imaging controller locates a region which includes a signal as a signal region, from the captured image, and controls the angle of a micro mirror corresponding to the located signal region, among the plurality of micro mirrors. The imaging controller causes the photosensor to receive only light reflected off the micro mirror whose angle has been controlled, among the plurality of micro mirrors.

In this manner, even if a high frequency component is included in a visible light signal expressed by luminance change, the high frequency component can be decoded appropriately.

It should be noted that in the embodiments and the variations described above, each of the elements may be constituted by dedicated hardware or may be obtained by executing a software program suitable for the element. Each element may be obtained by a program execution unit such as a CPU or a processor reading and executing a software program recorded on a recording medium such as a hard disk or semiconductor memory. For example, the program causes a computer to execute the display method shown by the flowcharts in FIGS. 77, 80, 82, and 87A.

The above is a description of the display method according to one or more aspects, based on the embodiments and the variations, yet the present disclosure is not limited to such embodiments. The present disclosure may also include embodiments as a result of adding, to the embodiments, various modifications that may be conceived by those skilled in the art, and embodiments obtained by combining constituent elements in the embodiments without departing from the spirit of the present disclosure.

[Variation 3 of Embodiment 4]

The following describes Variation 3 of Embodiment 4, that is, Variation 3 of the display method which achieves AR using a light ID.

Figure 88:
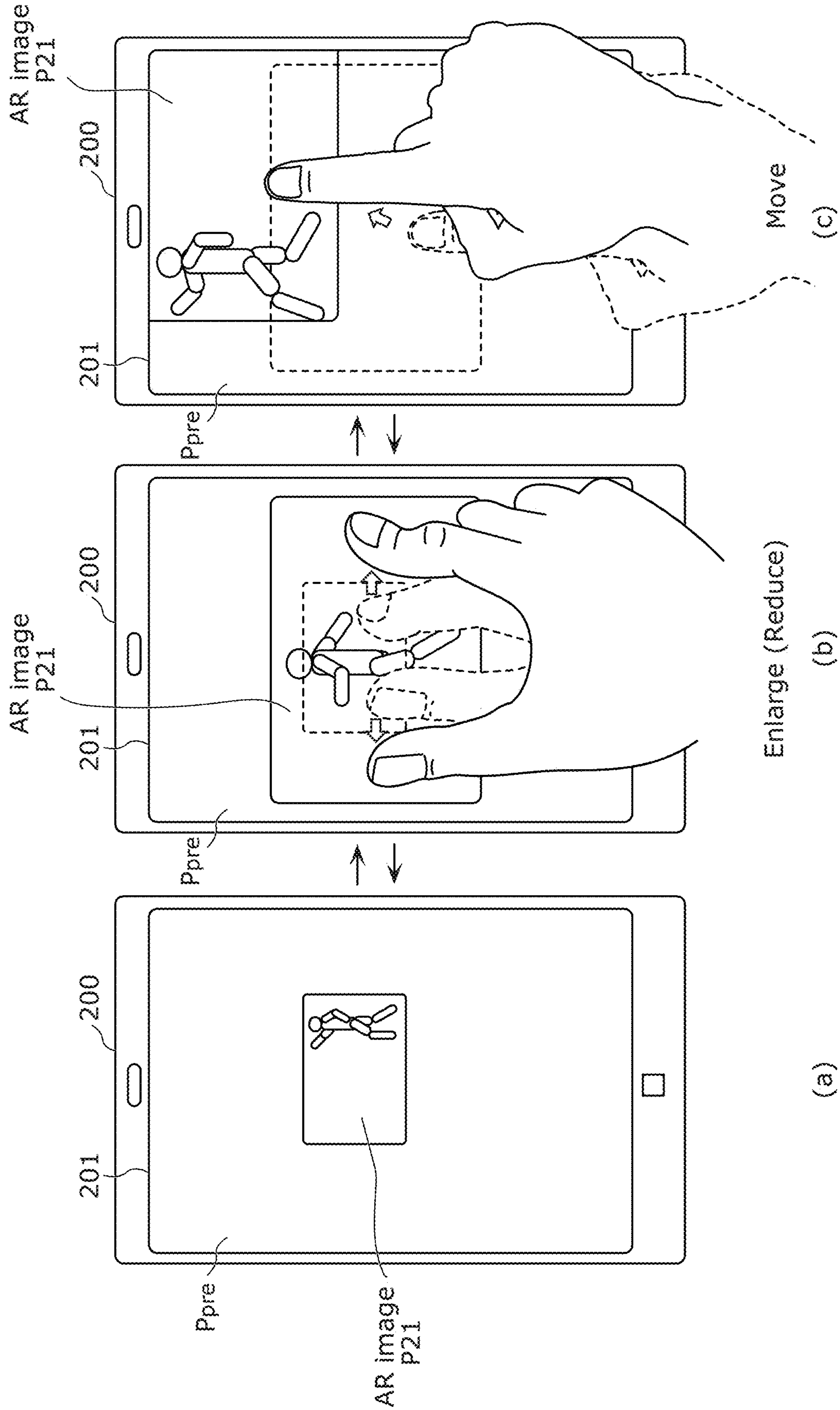
FIG. 88 is a diagram illustrating an example of enlarging and moving an AR image according to Variation 3 of Embodiment 4.

FIG. 88 is a diagram illustrating an example of enlarging and moving an AR image.

The receiver 200 superimposes an AR image P21 on a target region of a captured display image Ppre as illustrated in (a) of FIG. 88, similarly to Embodiment 4 and Variations 1 and 2 above. Then, the receiver 200 displays, on the display 201, the captured display image Ppre on which the AR image P21 is superimposed. For example, the AR image P21 is a video.

Here, upon reception of a resizing instruction, the receiver 200 resizes the AR image P21 according to the instruction, as illustrated in (b) of FIG. 88. For example, upon reception of an enlargement instruction, the receiver 200 enlarges the AR image P21 according to the instruction. The resizing instruction is given by a user performing, for example, pinch operation, double tap, or long press on the AR image P21. Specifically, upon reception of an enlargement instruction given by pinching out, the receiver 200 enlarges the AR image P21 according to the instruction. In contrast, upon reception of a reduction instruction given by pinching in, the receiver 200 reduces the AR image P21 according to the instruction.

Furthermore, upon reception of a position change instruction as illustrated in (c) of FIG. 88, the receiver 200 changes the position of the AR image P21 according to the instruction. The position change instruction is given by, for example, the user swiping the AR image. Specifically, upon reception of a position change instruction given by swiping, the receiver 200 changes the position of the AR image P21 according to the instruction. Accordingly, the AR image P21 moves.

Thus, enlarging an AR image which is a video can make the AR image readily viewed, and also reducing or moving an AR image which is a video can allow a region of the captured display image Ppre covered by the AR image to be displayed to the user.

Figure 89:
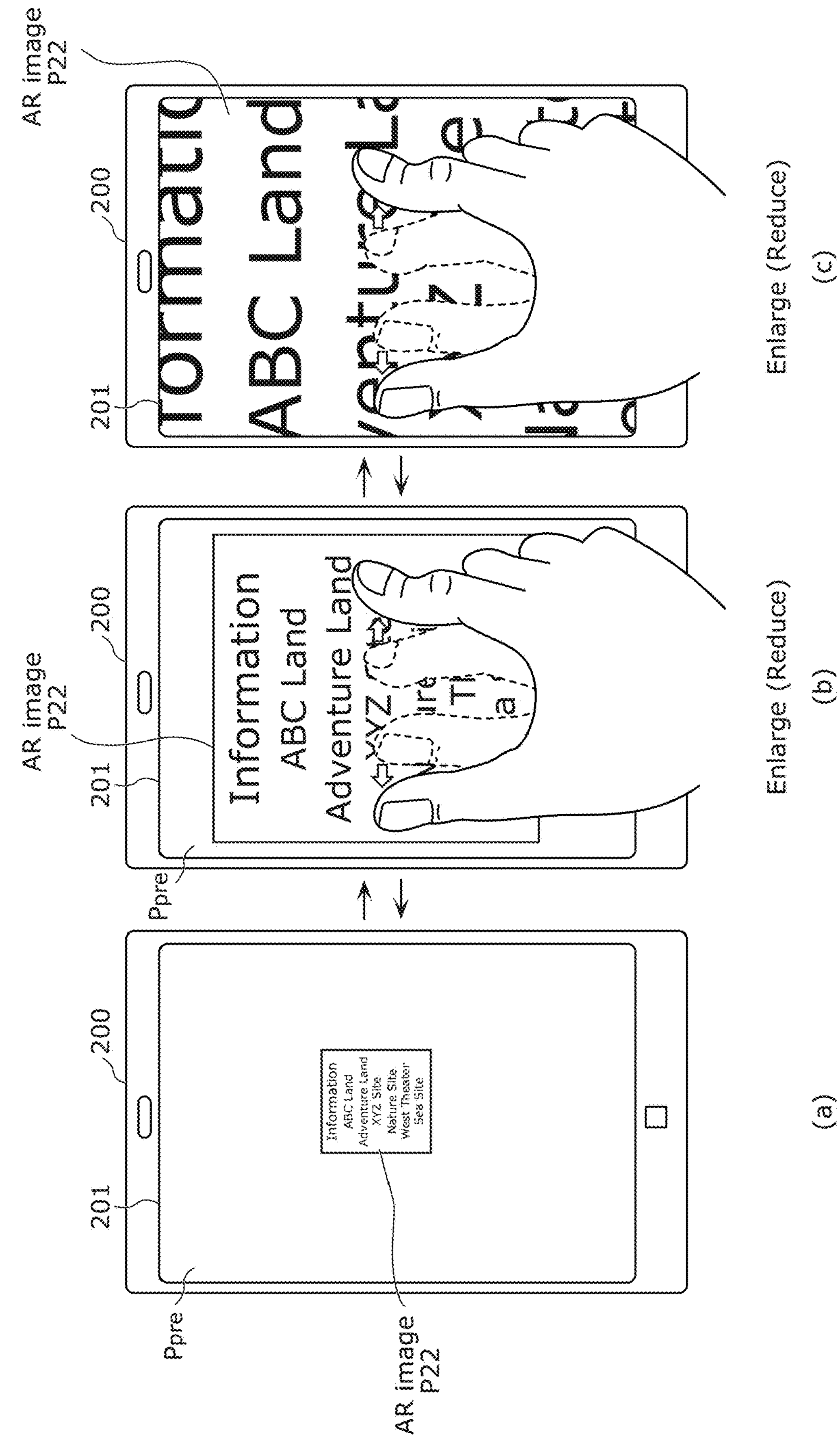
FIG. 89 is a diagram illustrating an example of enlarging an AR image, according to Variation 3 of Embodiment 4.

FIG. 89 is a diagram illustrating an example of enlarging an AR image.

The receiver 200 superimposes an AR image P22 on the target region of a captured display image Ppre as illustrated in (a) in FIG. 89, similarly to Embodiment 4 and Variations 1 and 2 of Embodiment 4. The receiver 200 displays, on the display 201, the captured display image Ppre on which the AR image P22 is superimposed. For example, the AR image P22 is a still image showing character strings.

Here, upon reception of a resizing instruction, the receiver 200 resizes the AR image P22 according to the instruction, as illustrated in (b) of FIG. 89. For example, upon reception of an enlargement instruction, the receiver 200 enlarges the AR image P22 according to the instruction. The resizing instruction is given by a user performing, for example, pinch operation, double tap, or long press on the AR image P22, similarly to the above. Specifically, upon reception of an enlargement instruction given by pinching out, the receiver 200 enlarges the AR image P22 according to the instruction. Such enlargement of the AR image P22 allows a user to readily read the character strings shown by the AR image P22.

Upon further reception of a resizing instruction, the receiver 200 resizes the AR image P22 according to the instruction as illustrated in (c) of FIG. 89. For example, upon reception of an instruction to further enlarge the image, the receiver 200 further enlarges the AR image P22 according to the instruction. Such enlargement of the AR image P22 allows a user to more readily read the character strings shown by the AR image P22.

Note that when the enlargement instruction is received, if the enlargement ratio of the AR image according to the instruction will be greater than or equal to the threshold, the receiver 200 may obtain a high-resolution AR image. In this case, instead of the original AR image already displayed, the receiver 200 may enlarge and display the high-resolution AR image to such an enlargement ratio. For example, the receiver 200 displays an AR image having 1920×1080 pixels, instead of an AR image having 640×480 pixels. In this manner, the AR image can be enlarged as if the AR image is actually captured as a subject, and also a high-resolution image which cannot be obtained by optical zoom can be displayed.

Figure 90:
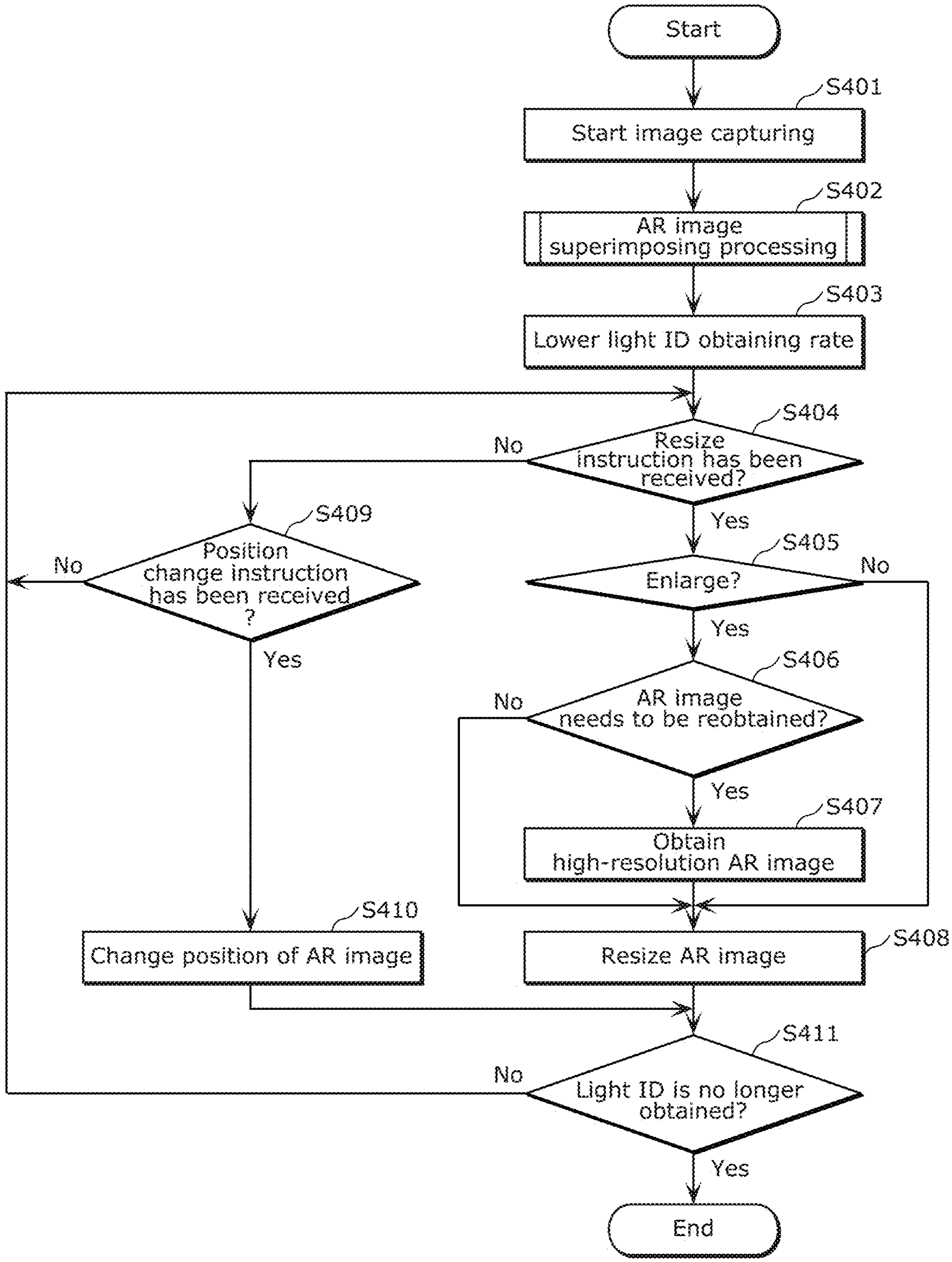
FIG. 90 is a flowchart illustrating an example of processing operation by a receiver according to Variation 3 of Embodiment 4 with regard to the enlargement and movement of an AR image.

FIG. 90 is a flowchart illustrating an example of processing operation by the receiver 200 with regard to the enlargement and movement of an AR image.

First, the receiver 200 starts image capturing for a normal exposure time and a communication exposure time similarly to step S101 illustrated in the flowchart in FIG. 45 (step S401). Once the image capturing starts, a captured display image Ppre obtained by image capturing for the normal exposure time and a decode target image (namely, bright line image) Pdec obtained by image capturing for the communication exposure time are each obtained periodically. Then, the receiver 200 obtains a light ID by decoding the decode target image Pdec.

Next, the receiver 200 performs AR image superimposing processing which includes processing in steps S102 to S106 illustrated in the flowchart in FIG. 45 (step S402). If the AR image superimposing processing is performed, an AR image is superimposed on the captured display image Ppre and displayed. At this time, the receiver 200 lowers a light ID obtaining rate (step S403). The light ID obtaining rate is a proportion in number of decode target images (namely, bright line images) Pdec, out of the number of captured images per unit time obtained by image capturing that starts in step S401. For example, lowering the light ID obtaining rate makes the number of decode target images Pdec obtained per unit time smaller than the number of captured display images Ppre obtained per unit time.

Next, the receiver 200 determines whether a resizing instruction has been received (step S404). Here, the receiver 200 determines that a resizing instruction has been received (Yes in step S404), the receiver 200 further determines whether the resizing instruction is an enlargement instruction (step S405). If the receiver 200 determines that the resizing instruction is an enlargement instruction (Yes in step S405), the receiver 200 determines whether an AR image needs to be reobtained (step S406). For example, if the receiver 200 determines that the enlargement ratio of the AR image according to the enlargement instruction will be greater than or equal to a threshold, the receiver 200 determines that an AR image needs to be reobtained. Here, if the receiver 200 determines that an AR image needs to be reobtained (Yes in step S406), the receiver 200 obtains a high-resolution AR image from a server, and replaces the AR image superimposed and displayed, with the high-resolution AR image (step S407).

Then, the receiver 200 resizes the AR image according to the received resizing instruction (step S408). Specifically, if a high-resolution AR image is obtained in step S407, the receiver 200 enlarges the high-resolution AR image. If the receiver 200 determines in step S406 that an AR image does not need to be reobtained (No in step S406), the receiver 200 enlarges the AR image superimposed. If the receiver 200 determines in step S405 that the resizing instruction is a reduction instruction (No in step S405), the receiver 200 reduces the AR image superimposed and displayed, according to the received resizing instruction, namely, the reduction instruction.

On the other hand, if the receiver 200 determines in step S404 that the resizing instruction has not been received (No in step S404), the receiver 200 determines whether a position change instruction has been received (step S409). Here, if the receiver 200 determines that a position change instruction has been received (Yes in step S409), the receiver 200 changes the position of the AR image superimposed and displayed, according to the position change instruction (step S410). Specifically, the receiver 200 moves the AR image. Furthermore, if the receiver 200 determines that the position change instruction has not been received (No in step S409), the receiver 200 repeatedly executes processing from step S404.

If the receiver 200 has changed the size of the AR image in step S408 or has changed the position of the AR image in step S410, the receiver 200 determines whether a light ID periodically obtained from step S401 is no longer obtained (step S411). Here, if the receiver 200 determines that a light ID is no longer obtained (Yes in step S411), the receiver 200 terminates the processing operation with regard to enlargement and movement of the AR image. On the other hand, if the receiver 200 determines that a light ID is currently being obtained (No in step S411), the receiver 200 repeatedly executes the processing from step S404.

Figure 91:
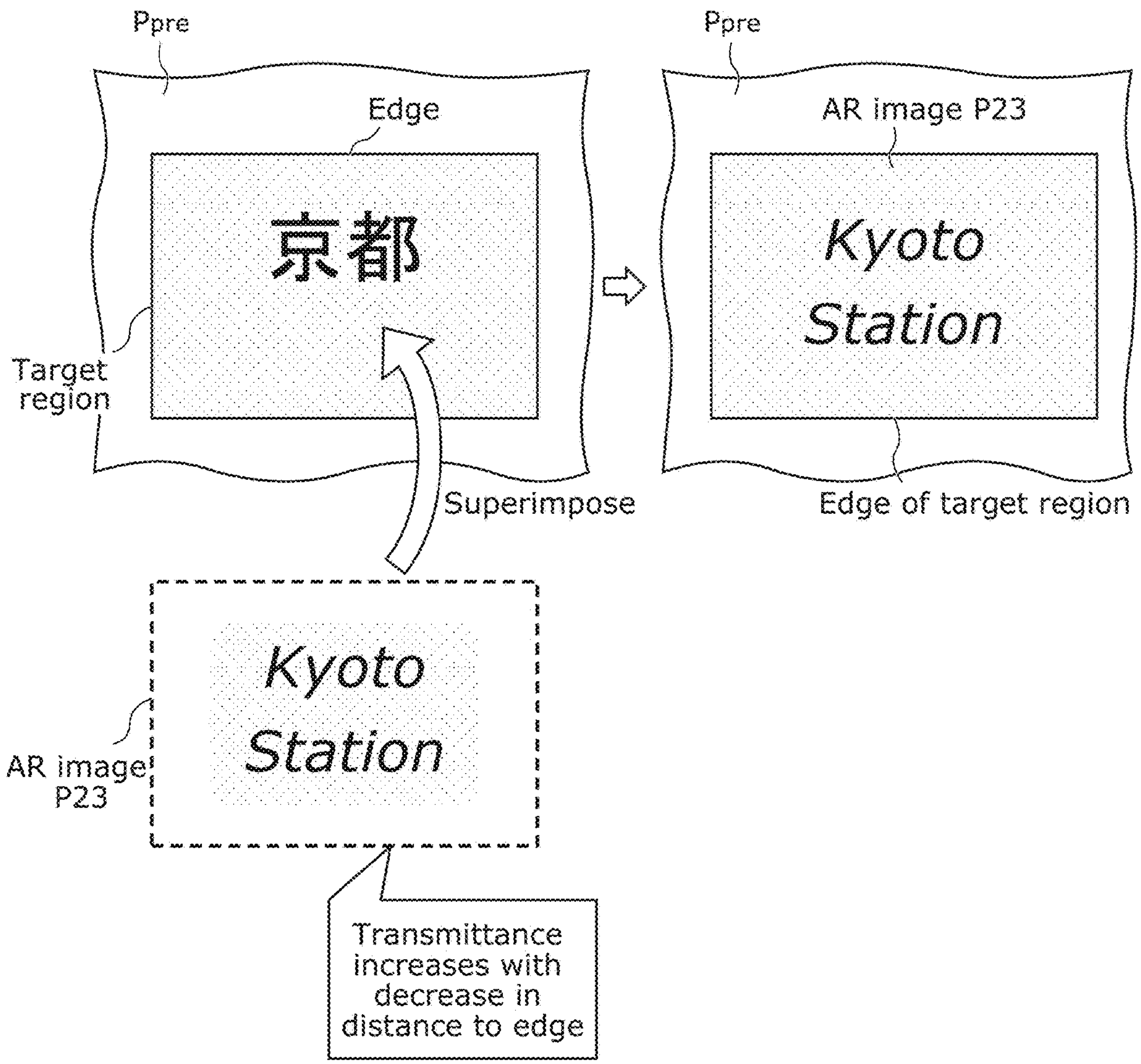
FIG. 91 is a diagram illustrating an example of superimposing an AR image, according to Variation 3 of Embodiment 4.

FIG. 91 is a diagram illustrating an example in which the receiver 200 superimposes an AR image.

The receiver 200 superimposes an AR image P23 on a target region of a captured display image Ppre, as described above. Here, as illustrated in FIG. 91, the AR image P23 is obtained such that the closer portions of the AR image P23 are to the edges of the AR image P23, the higher the transmittance of the portions are. Transmittance is a degree indicating transparency of an image to be superimposed and displayed. For example, when the transmittance of the entire AR image is 100%, even if an AR image is superimposed on a target region of a captured display image, only a target region is displayed, without the AR image being displayed on the display 201. Conversely, when the transmittance of the entire AR image is 0%, a target region of the captured display image is not displayed on the display 201, and only an AR image superimposed on the target region is displayed.

For example, if the AR image P23 has a quadrilateral shape, the closer a portion of the AR image P23 is to an upper edge, a lower edge, a left edge, or a right edge of the quadrilateral, the higher the transmittance of the portion is. More specifically, the transmittance of the portions at the edges is 100%. Furthermore, the AR image P23 includes, in the center portion, a quadrilateral area which has a transmittance of 0% and is smaller than the AR image P23. The quadrilateral area shows, for example, "Kyoto Station" in English. Specifically, the transmittance changes gradually from 0% to 100% like gradations at the edge portions of the AR image P23.

The receiver 200 superimposes the AR image P23 on the target region of the captured display image Ppre, as illustrated in FIG. 91. At this time, the receiver 200 adjusts the size of the AR image P23 to the size of the target region, and superimposes the resized AR image P23 on the target region. For example, an image of a station sign having the same background color as the quadrilateral area in the center portion of the AR image P23 is shown in the target region. Note that the station sign reads "Kyoto" in Japanese.

Here, as described above, the closer portions of the AR image P23 are to the edges of the AR image P23, the higher the transmittance of the portions is. Accordingly, when the AR image P23 is superimposed on the target region, even if a quadrilateral area in the center portion of the AR image P23 is displayed, the edges of the AR image P23 are not displayed, and the edges of the target region, namely, the edges of the image of the station sign are displayed.

This makes misalignment between the AR image P23 and the target region less noticeable. Specifically, even when the AR image P23 is superimposed on a target region, the movement of the receiver 200, for instance, may cause misalignment between the AR image P23 and the target region. In this case, if the transmittance of the entire AR image P23 is 0%, the edges of the AR image P23 and the edges of the target region are displayed and thus the misalignment will be noticeable. However, with regard to the AR image P23 according to the variation, the closer a portion is to an edge, the higher the transmittance of the portion is, and thus the edges of the AR image P23 are less likely to appear, and as a result, misalignment between the AR image P23 and the target region can be made less noticeable. Furthermore, the transmittance of the AR image P23 changes like gradations at the edge portions of the AR image P23, and thus superimposition of the AR image P23 on the target region can be made less noticeable.

Figure 92:
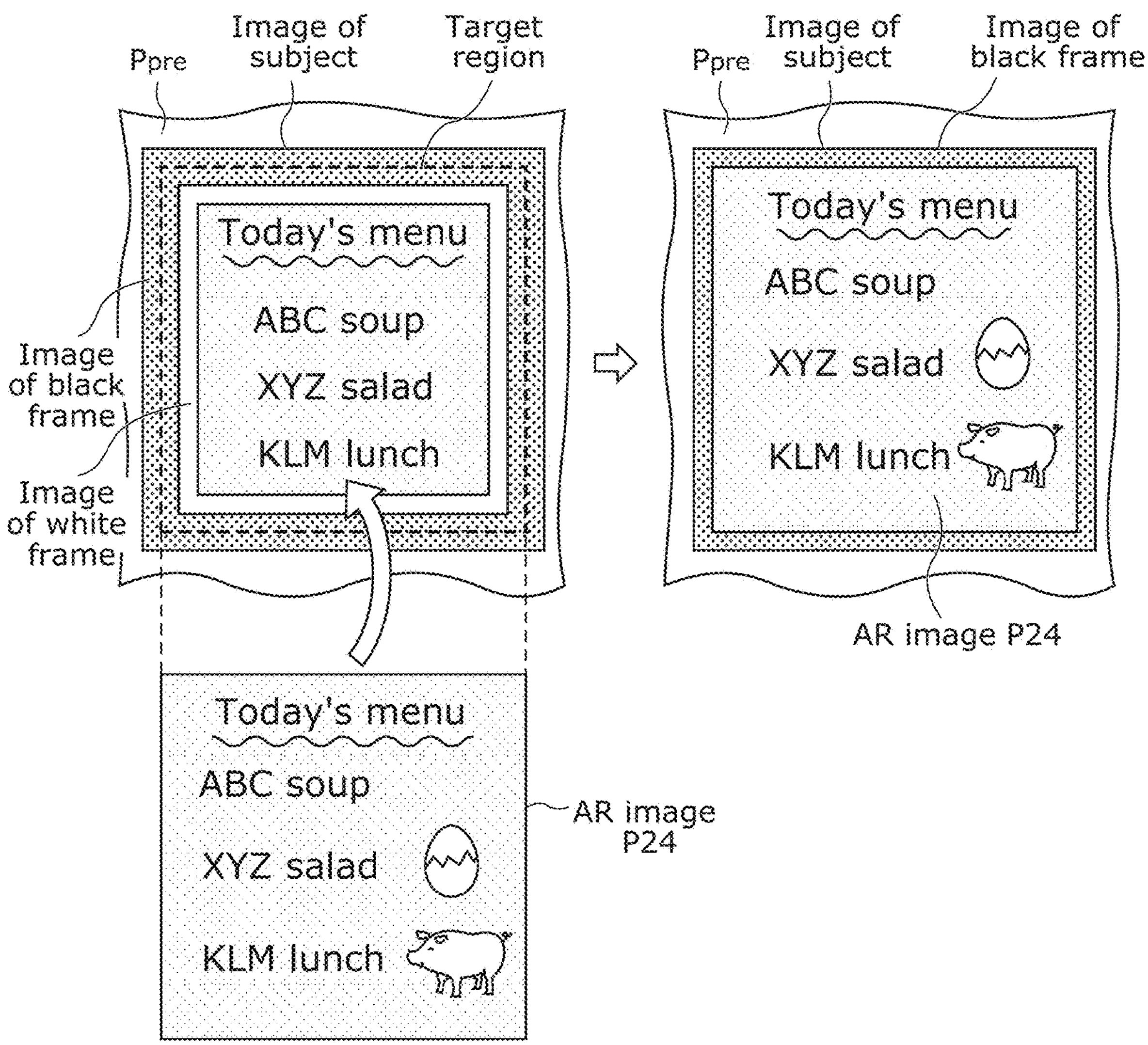
FIG. 92 is a diagram illustrating an example of superimposing an AR image, according to Variation 3 of Embodiment 4.

FIG. 92 is a diagram illustrating an example of superimposing an AR image by the receiver 200.

The receiver 200 superimposes an AR image P24 on a target region of a captured display image Ppre as described above. Here, as illustrated in FIG. 92, a subject to be captured is a menu of a restaurant, for example. This menu is surrounded by a white frame, and furthermore the white frame is surrounded by a black frame. Specifically, the subject includes a menu, a white frame surrounding the menu, and a black frame surrounding the white frame.

The receiver 200 recognizes, as a target region, a region larger than the white-framed image and smaller than the black-framed image, within the captured display images Ppre. Then, the receiver 200 adjusts the size of the AR image P24 to the size of the target region and superimposes the resized AR image P24 on the target region.

In this manner, even if the superimposed AR image P24 is misaligned from the target region due to, for instance, the movement of the receiver 200, the AR image P24 can be continuously displayed being surrounded by the black frame. Accordingly, the misalignment between the AR image P24 and the target region can be made less noticeable.

Note that the colors of the frames are black and white in the example illustrated in FIG. 92, yet the colors may not be limited to black and white, and may be any color.

FIG. 93 is a diagram illustrating an example of superimposing an AR image by the receiver 200.

For example, the receiver 200 captures, as a subject, an image of a poster in which a castle illuminated in the night sky is drawn. For example, the poster is illuminated by the above-described transmitter 100 achieved as a backlight device, and transmits a visible light signal (namely, a light ID) using backlight. The receiver 200 obtains, by the image capturing, a captured display image Ppre which includes an image of the subject which is the poster, and an AR image P25 associated with the light ID. Here, the AR image P25 has the same shape as the shape of an image of the poster obtained by extracting a region in which the above-mentioned castle is drawn. Stated differently, a region corresponding to the castle in the image of the poster in the AR image P25 is masked. Furthermore, the AR image P25 is obtained such that the closer a portion is to an edge, the higher the transmittance of the portion is, as with the case of the AR image P23 described above. In the center portion whose transmittance is 0% of the AR image P25, fireworks set off in the night sky are displayed as a video.

The receiver 200 adjusts the size of the AR image P25 to the size of the target region which is the image of the subject, and superimposes the resized AR image P25 on the target region. As a result, the castle drawn on the poster is displayed not as an AR image, but as an image of the subject, and a video of the fireworks is displayed as an AR image.

Accordingly, the captured display image Ppre can be displayed as if the fireworks were actually set off in the poster. The closer portions of the AR image P25 to edges, the higher transmittance of the portions of the AR image P25 is. Accordingly, when the AR image P25 is superimposed on the target region, the center portion of the AR image P25 is displayed, but the edges of the AR image P25 are not displayed, and the edges of the target region are displayed. As a result, misalignment between the AR image P25 and the target region can be made less noticeable. Furthermore, at the edge portions of the AR image P25, the transmittance changes like gradations, and thus superimposition of the AR image P25 on the target region can be made less noticeable.

Figure 94:
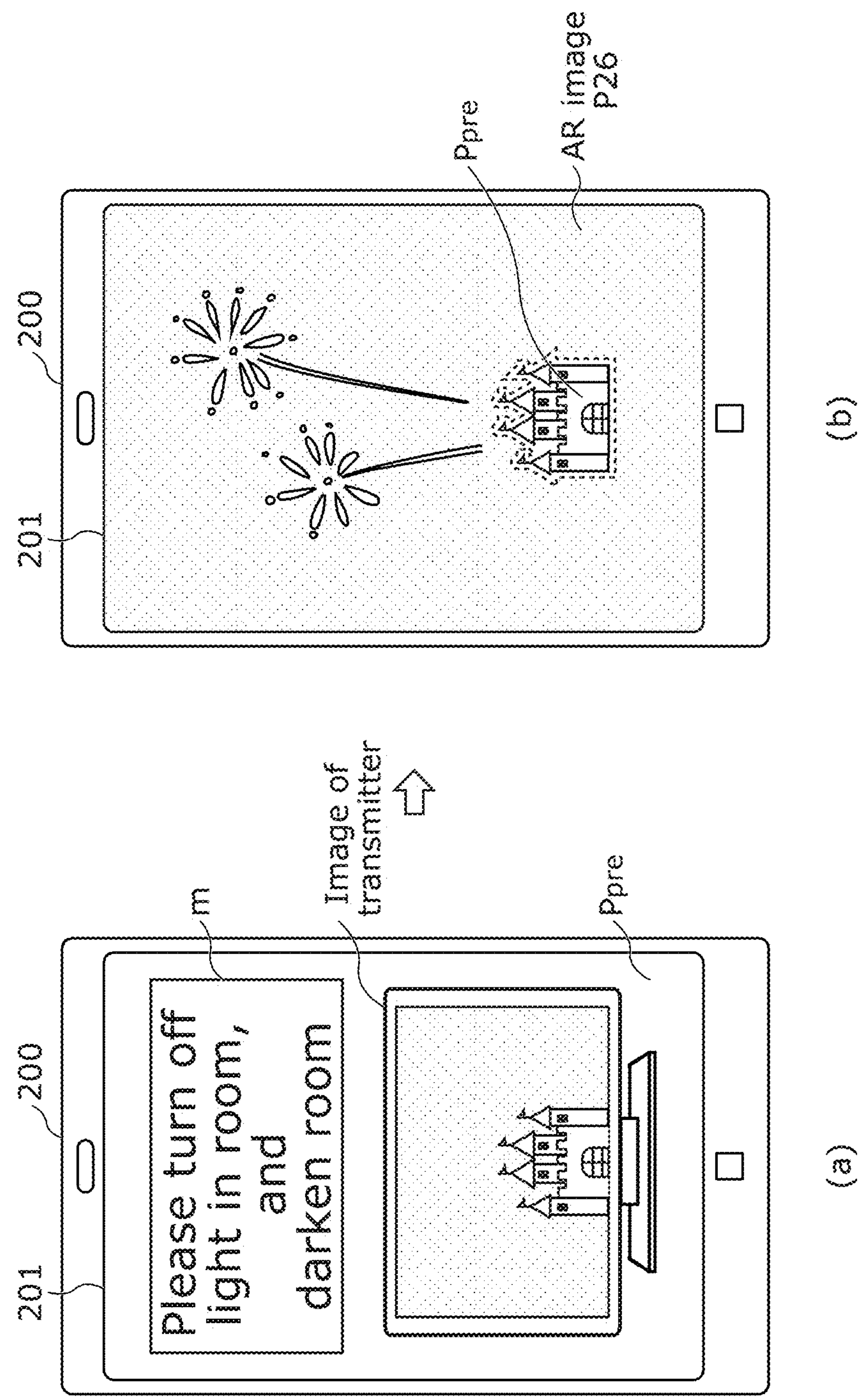
FIG. 94 is a diagram illustrating an example of superimposing an AR image, according to Variation 3 of Embodiment 4.

FIG. 94 is a diagram illustrating an example of superimposing an AR image by the receiver 200.

For example, the receiver 200 captures, as a subject, an image of the transmitter 100 achieved as a TV. Specifically, the transmitter 100 displays a castle illuminated in the night sky on the display, and also transmits a visible light signal (namely, light ID). The receiver 200 obtains a captured display image Ppre in which the transmitter 100 is shown and an AR image P26 associated with the light ID, by image capturing, Here, the receiver 200 first displays the captured display image Ppre on the display 201. At this time, the receiver 200 displays, on the display 201, a message m which prompts a user to turn off the light. Specifically, the message m indicates "Please turn off light in room and darkens room", for example.

The display of the message m prompts the user to turn off the light so that the room in which the transmitter 100 is placed becomes dark, and the receiver 200 superimposes an AR image P26 on the captured display image Ppre, and displays the images. Here, the AR image P26 has the same size as the captured display image Ppre, and a region of the AR image P26 corresponding to the castle in the captured display image Ppre is extracted from the AR image P26. Stated differently, the region of the AR image P26 corresponding to the castle of the captured display image Ppre is masked. Accordingly, the castle of the captured display image Ppre can be shown to the user through the region. At the edge portions of the region of the AR image P26, transmittance may gradually change from 0% to 100% like gradations, similarly to the above. In this case, misalignment between the captured display image Ppre and the AR image P26 can be made less noticeable.

In the above-mentioned example, an AR image having high transmittance at the edge portions is superimposed on the target region of the captured display image Ppre, and thus the misalignment between the AR image and the target region is made less noticeable. However, an AR image which has the same size as the captured display image Ppre, and the entirety of which is semi-transparent (that is, transmittance is 50%) may be superimposed on the captured display image Ppre, instead of such an AR image. Even in such a case, misalignment between the AR image and the target region can be made less noticeable. If the entire captured display image Ppre is bright, an AR image uniformly having low transparency may be superimposed on the captured display image Ppre, whereas if the entire captured display image Ppre is dark, an AR image uniformly having high transparency may be superimposed on the captured display image Ppre.

Note that objects such as fireworks in the AR image P25 and the AR image P26 may be represented using computer graphics (CG). In this case, masking will be unnecessary. In the example illustrated in FIG. 94, the receiver 200 displays the message m which prompts the user to turning off the light, yet such display may not be provided, and the light may be automatically turned off. For example, the receiver 200 outputs a turn-off signal using Bluetooth (registered trademark), ZigBee, a specified low power radio station, or the like, to the lighting apparatus having the setting of the transmitter 100 which is a TV. Accordingly, the lighting apparatus is automatically turned off.

Figure 95A:
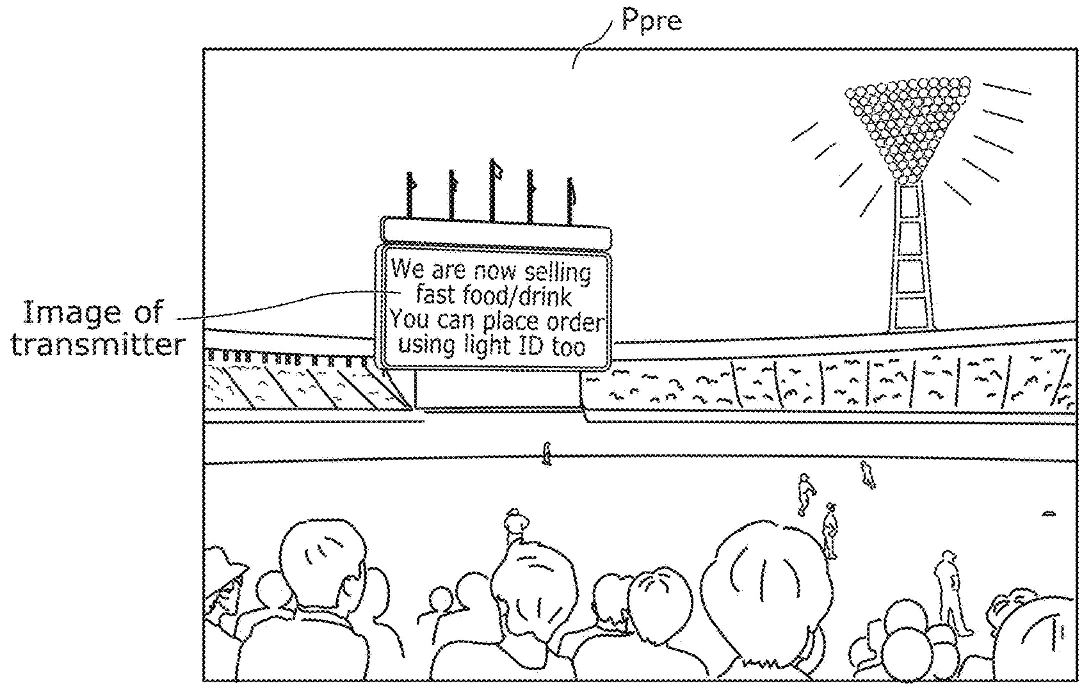
FIG. 95A is a diagram illustrating an example of a captured display image obtained by image capturing by a receiver according to Variation 3 of Embodiment 4.

FIG. 95A is a diagram illustrating an example of a captured display image Ppre obtained by image capturing by the receiver 200.

For example, the transmitter 100 is configured as a large display installed in a stadium. The transmitter 100 displays a message indicating that, for example, fast food and drinks can be ordered using a light ID, and furthermore transmits a visible light signal (namely, a light ID). If such a message is displayed, a user directs the receiver 200 to the transmitter 100 and captures an image of the transmitter 100. Specifically, the receiver 200 captures, as a subject, an image of the transmitter 100 configured as a large display installed in the stadium.

The receiver 200 obtains a captured display image Ppre and a decode target image Pdec through the image capturing. Then, the receiver 200 obtains a light ID by decoding the decode target image Pdec, and transmits the light ID and the captured display image Ppre to a server.

The server identifies installation information of the large display an image of which has been captured and which is associated with the light ID transmitted from the receiver 200, from among pieces of installation information associated with light IDs. For example, the installation information indicates the position and orientation in which the large display is installed, and the size of the large display, for instance. Furthermore, the server determines the seat number in the stadium where the captured display image Ppre has been captured, based on the installation information and the size and orientation of the large display which is shown in the captured display image Ppre. Then, the server displays, on the receiver 200, a menu screen which includes the seat number.

Figure 95B:
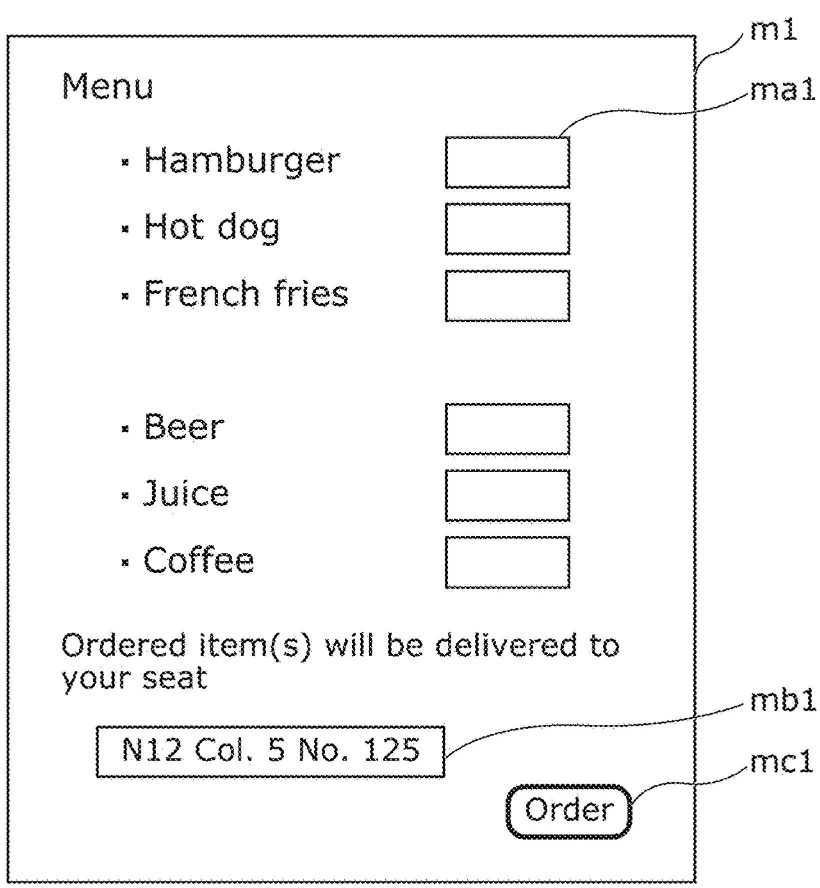
FIG. 95B is a diagram illustrating an example of a menu screen displayed on a display of a receiver according to Variation 3 of Embodiment 4.

FIG. 95B is a diagram illustrating an example of a menu screen displayed on the display 201 of the receiver 200.

A menu screen m1 includes, for example, for each item, an input column ma1 into which the number of the items to be ordered is input, a seat column mb1 indicating the seat number of the stadium determined by the server, and an order button mc1. The user inputs the number of the items to be ordered in the input column mal for a desired item by operating the receiver 200, and selects the order button mc1. Accordingly, the order is fixed, and the receiver 200 transmits, to the server, the detailed order according to the input result.

Upon reception of the detailed order, the server gives an instruction to the staff of the stadium to deliver the ordered item(s), the number of which is based on the detailed order, to the seat having the number determined as described above.

Figure 96:
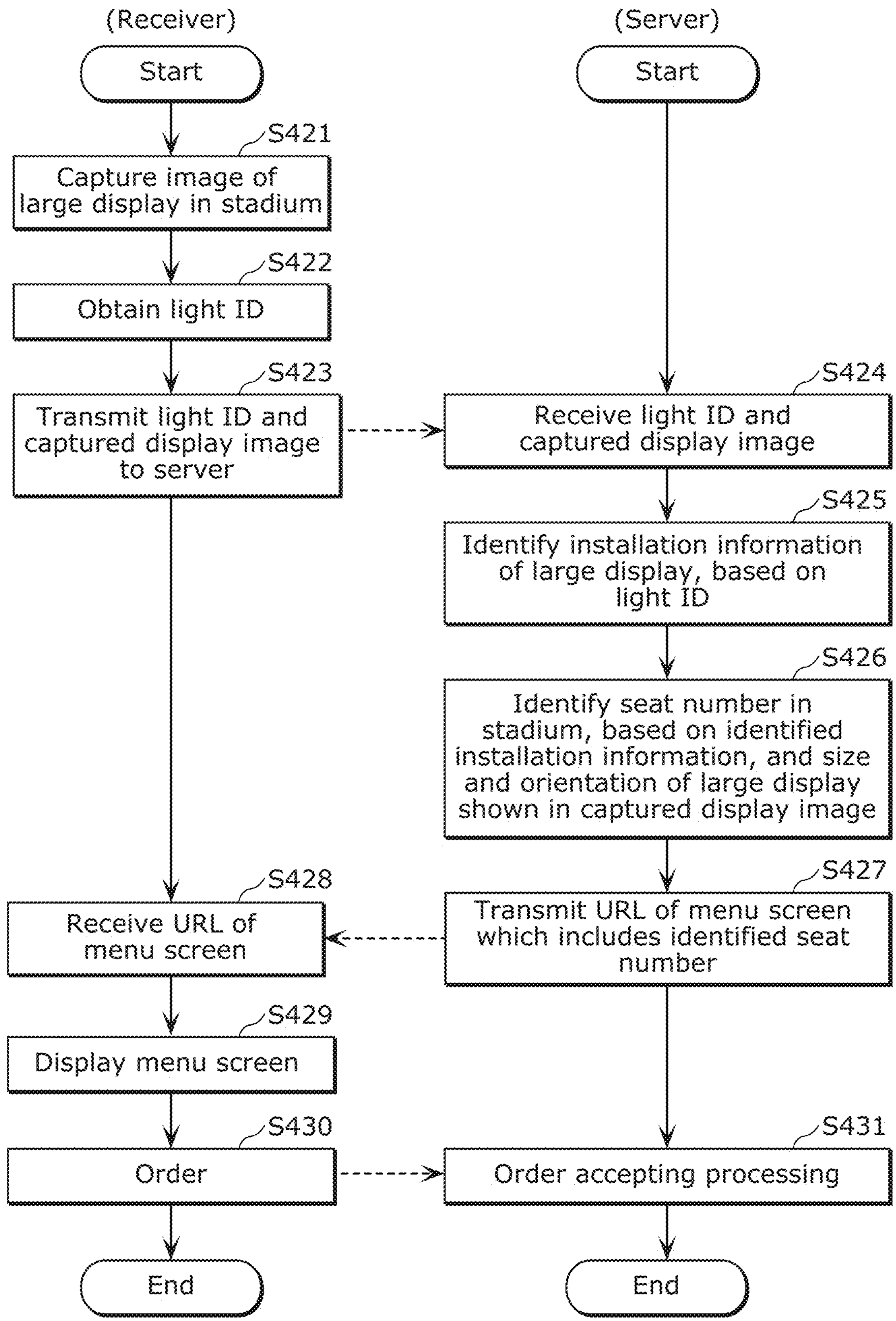
FIG. 96 is a flowchart illustrating an example of processing operation of a receiver according to Variation 3 of Embodiment 4 and a server.

FIG. 96 is a flowchart illustrating an example of processing operation of the receiver 200 and the server.

The receiver 200 first captures an image of the transmitter 100 configured as a large display of the stadium (step S421). The receiver 200 obtains a light ID transmitted from the transmitter 100, by decoding a decode target image Pdec obtained by the image capturing (step S422). The receiver 200 transmits, to a server, the light ID obtained in step S422 and the captured display image Ppre obtained by the image capturing in step S421 (step S423).

Upon reception of the light ID and the captured display image Ppre (step S424), the server identifies, based on the light ID, installation information of the large display installed at the stadium (step S425). For example, the server holds a table indicating, for each light ID, installation information of a large display associated with the light ID, and identifies installation information by retrieving, from the table, installation information associated with the light ID transmitted from the receiver 200.

Next, based on the identified installation information and the size and the orientation of the large display shown in the captured display image Ppre, the server identifies the seat number in the stadium at which the captured display image Ppre is obtained (namely, captured) (step S426). Then, the server transmits, to the receiver 200, the uniform resource locator (URL) of the menu screen m1 which includes the number of the identified seat (step S427).

Upon reception of the URL of the menu screen m1 transmitted from the server (step S428), the receiver 200 accesses the URL and displays the menu screen m1 (step S429). Here, the user inputs the details of the order to the menu screen m1 by operating the receiver 200, and settles the order by selecting the order button mc1. Accordingly, the receiver 200 transmits the details of the order to the server (step S430).

Upon reception of the detailed order transmitted from the receiver 200, the server performs processing of accepting the order according to the details of the order (step S431). At this time, for example, the server instructs the staff of the stadium to deliver one or more items according to the number indicated in the details of the order to the seat number identified in step S426.

Accordingly, based on the captured display image Ppre obtained by image capturing by the receiver 200, the seat number is identified, and thus the user of the receiver 200 does not need to specially input his/her seat number when placing an order for items. Accordingly, the user can skip the input of the seat number and order items easily.

Note that although the server identifies the seat number in the above example, the receiver 200 may identify the seat number. In this case, the receiver 200 obtains installation information from the server, and identifies the seat number, based on the installation information and the size and the orientation of the large display shown in the captured display image Ppre.

Figure 97:
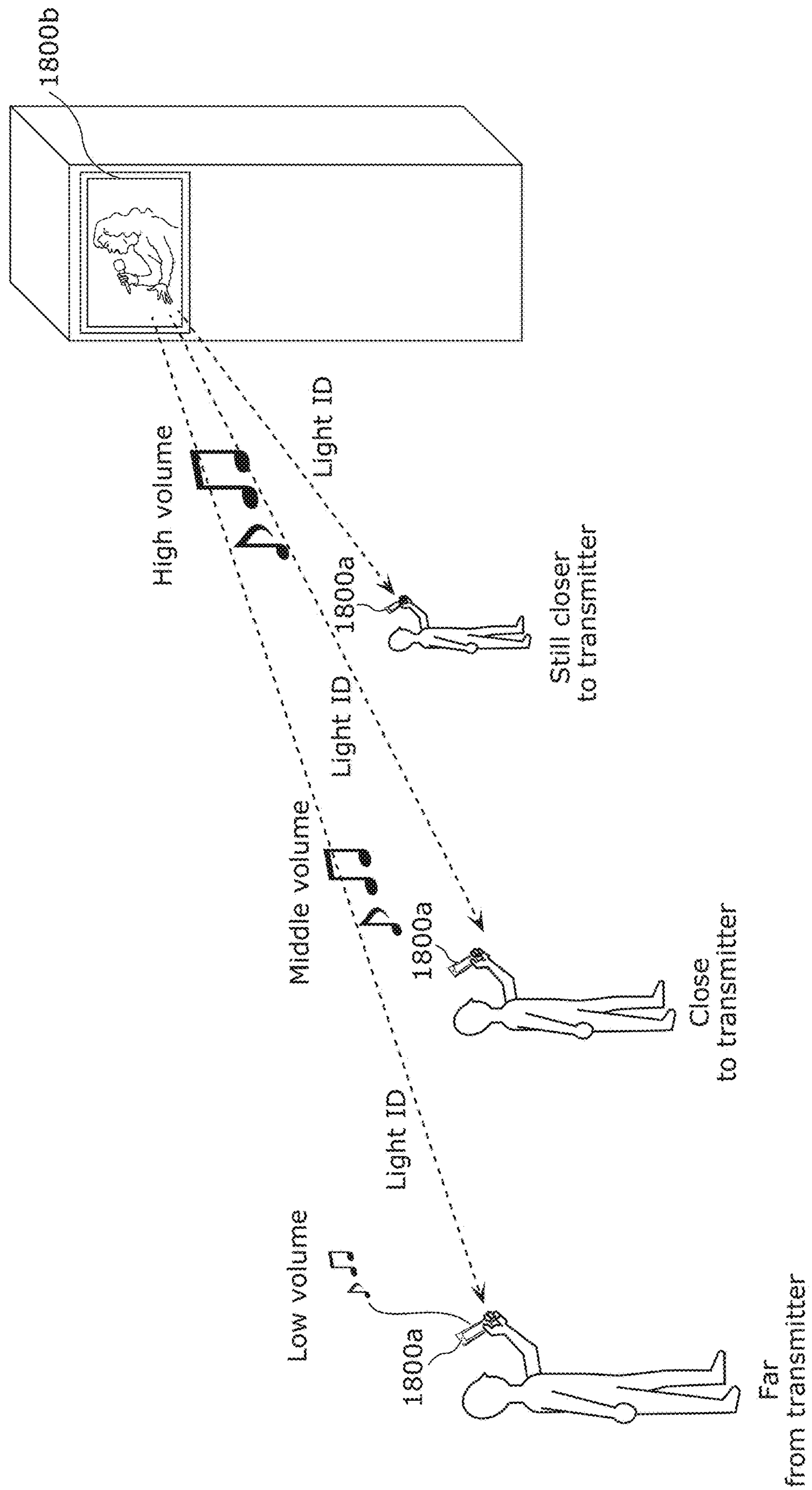
FIG. 97 is a diagram for describing the volume of sound played by a receiver according to Variation 3 of Embodiment 4.

FIG. 97 is a diagram for describing the volume of sound played by a receiver 1800*a*.

The receiver 1800*a* receives a light ID (visible light signal) transmitted from a transmitter 1800*b* configured as, for example, street digital signage, similarly to the example indicated in FIG. 23, Then, the receiver 1800*a* plays sound at the same timing as image reproduction by the transmitter 1800*b*. Specifically, the receiver 1800*a* plays sound in synchronization with an image reproduced by the transmitter 1800*b*. Note that the receiver 1800*a* may reproduce, with sound, the same image as an image reproduced by the transmitter 1800*b* (reproduced image) or an AR image (AR video) relevant to the reproduced image.

Here, when playing sound as described above, the receiver 1800*a* adjusts the volume of the sound according to the distance to the transmitter 1800*b*. Specifically, the receiver 1800*a* adjusts and decreases the volume with an increase in the distance to the transmitter 1800*b*, and on the contrary, the receiver 1800*a* adjusts and increases the volume with a decrease in the distance to the transmitter 1800*b*.

The receiver 1800*a* may determine the distance to the transmitter 1800*b* using the global positioning system (GPS), for instance. Specifically, the receiver 1800*a* obtains positional information of the transmitter 1800*b* associated with a light ID from the server, for instance, and further locates the position of the receiver 1800*a* by the GPS. Then, the receiver 1800*a* determines a distance between the position of the transmitter 1800*b* indicated by the positional information obtained from the server and the determined position of the receiver 1800*a* to be the distance to the transmitter 1800*b* described above. Note that the receiver 1800*a* may determine the distance to the transmitter 1800*b*, using, for instance, Bluetooth (registered trademark), instead of the GPS.

The receiver 1800*a* may determine the distance to the transmitter 1800*b*, based on the size of a bright line pattern region of the above-described decode target image Pdec obtained by image capturing. The bright line pattern region is a region which includes a pattern formed by a plurality of bright lines which appear due to a plurality of exposure lines included in the image sensor of the receiver 1800*a* being exposed for the communication exposure time, similarly to the example shown in FIGS. 51 and 52. The bright line pattern region corresponds to a region of the display of the transmitter 1800*b* shown in the captured display image Ppre. Specifically, the receiver 1800*a* determines a shorter distance to be the distance to the transmitter 1800*b* as the bright line pattern region is larger, and whereas the receiver 1800*a* determines a longer distance to be the distance to the transmitter 1800*b* as the bright line pattern region is smaller. The receiver 1800*a* may use distance data indicating the relation between the size of the bright line pattern region and the distance to the transmitter 1800*b*, and determine a distance associated in the distance data with the size of the bright line pattern region in the captured display image Ppre to be the distance to the transmitter 1800*b*. Note that the receiver 1800*a* may transmit a light ID received as described above to the server, and may obtain, from the server, distance data associated with the light ID.

Accordingly, the volume is adjusted according to the distance to the transmitter 1800*b*, and thus the user of the receiver 1800*a* can catch the sound played by the receiver 1800*a*, as if the sound were actually played by the transmitter 1800*b*.

Figure 98:
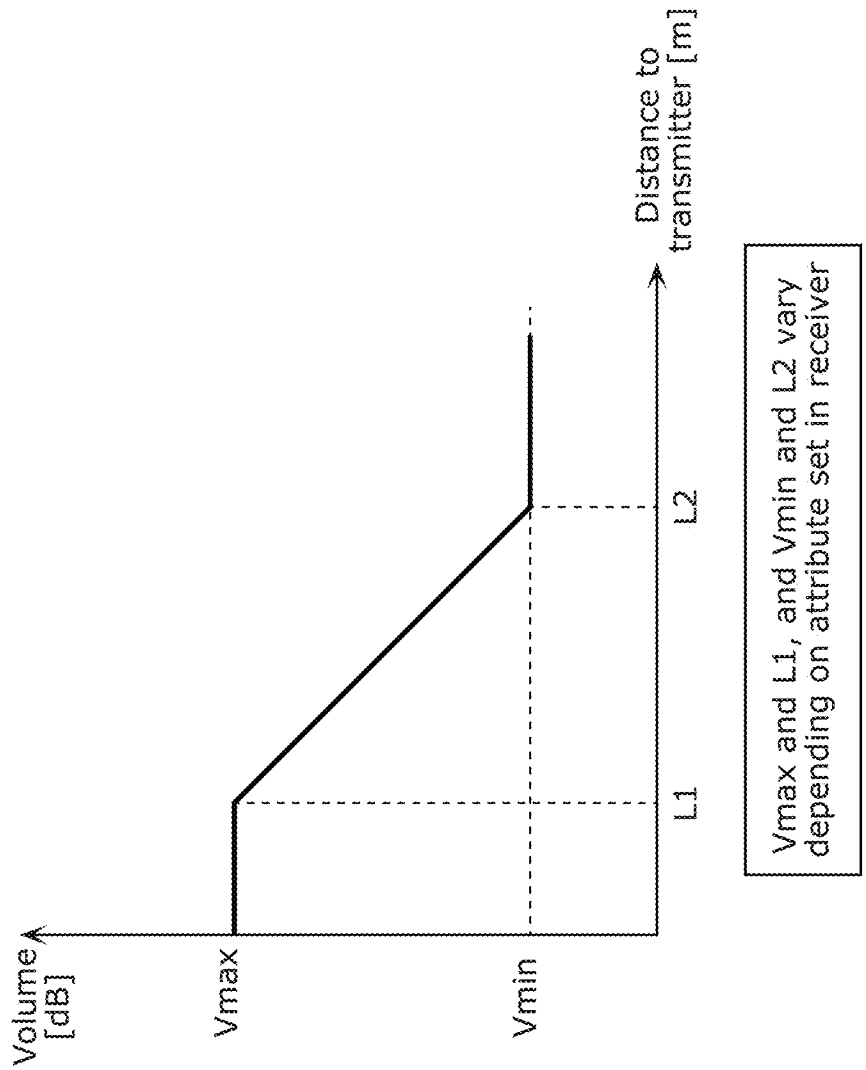
FIG. 98 is a diagram illustrating a relation between volume and the distance from a receiver according to Variation 3 of Embodiment 4 to a transmitter.

FIG. 98 is a diagram illustrating a relation between volume and the distance from the receiver 1800*a* to the transmitter 1800*b*.

For example, if the distance to the transmitter 1800*b* is between L1 and L2 [m], the volume increases or decreases in a range of Vmin to Vmax [dB] in proportion to the distance. Specifically, the receiver 1800*a* linearly decreases the volume from Vmax [dB] to Vmin [dB] if the distance to the transmitter 1800*b* is increased from L1 [m] to L2 [m]. Furthermore, although the distance to the transmitter 1800*b* is shorter than L1 [m], the receiver 1800*a* maintains the volume at Vmax [dB], and furthermore although the distance to the transmitter 1800*b* is longer than L2 [m], the receiver 1800*a* maintains the volume at Vmin [dB].

Accordingly, the receiver 1800*a* stores the maximum volume Vmax, the longest distance L1 at which the sound of the maximum volume Vmax is output, the minimum sound volume Vmin, and the shortest distance L2 at which the sound of the minimum sound volume Vmin is output. The receiver 1800*a* may change the maximum volume Vmax, the minimum sound volume Vmin, the longest distance L1, and the shortest distance L2, according to the attribute set in the receiver 1800*a*. For example, if the attribute is the age of the user and the age indicates that the user is an old person, the receiver 1800*a* sets the maximum volume Vmax to a higher volume than a reference maximum volume, and may set the minimum sound volume Vmin to a higher volume than a reference minimum sound volume. Furthermore, the attribute may be information indicating whether sound is output from a speaker or from an earphone.

As described above, the minimum sound volume Vmin is set in the receiver 1800*a*, and thus it can be prevented that sound cannot be heard because the receiver 1800*a* is too far from the transmitter 1800*b*. Furthermore, the maximum volume Vmax is set in the receiver 1800*a*, and thus it can be prevented that unnecessarily high volume sound is output because the receiver 1800*a* is quite near the transmitter 1800*b*.

Figure 99:
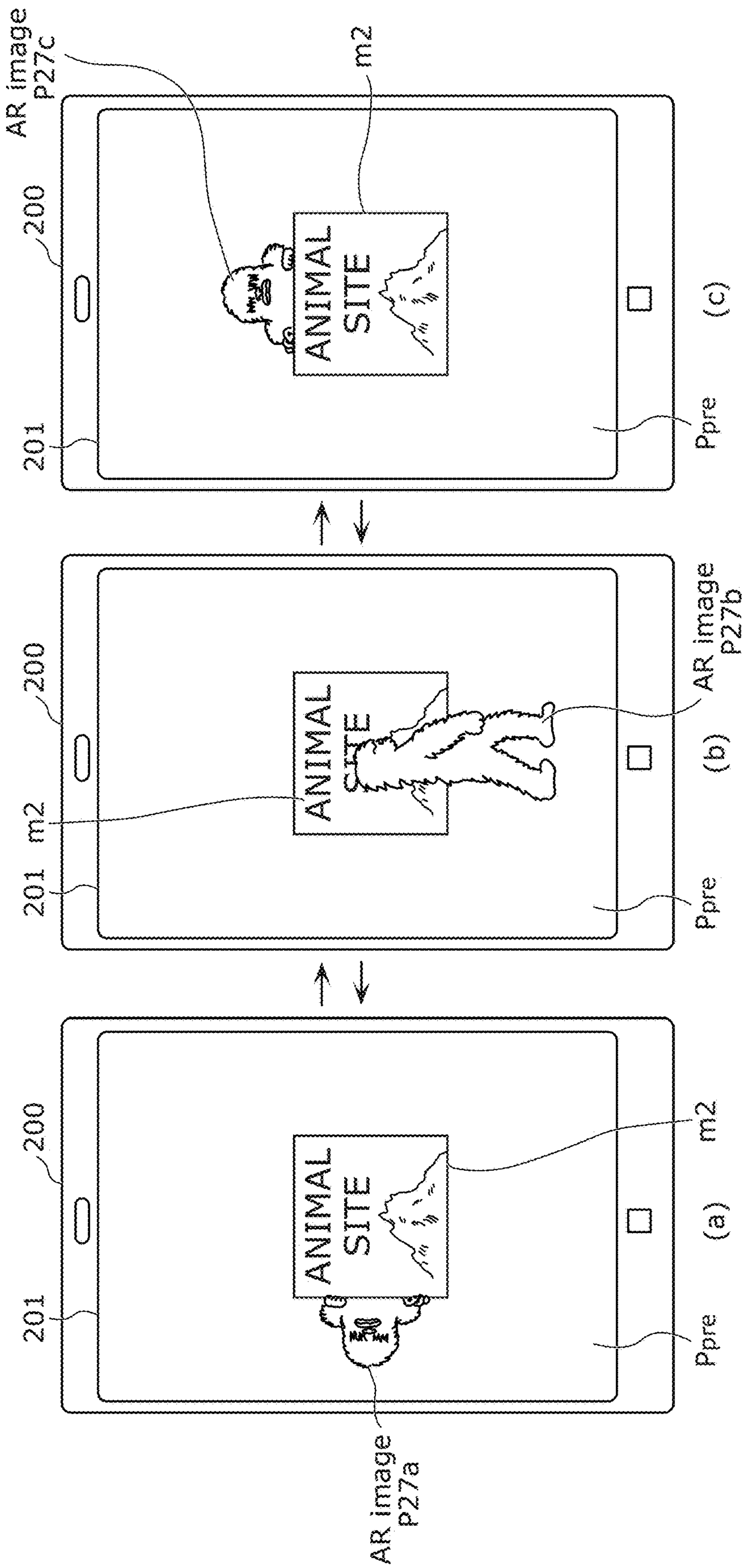

FIG. 99 is a diagram illustrating an example of superimposing an AR image by the receiver 200.

The receiver 200 captures an image of an illuminated signboard. Here, the signboard is illuminated by a lighting apparatus which is the above-described transmitter 100 which transmits a light ID. Accordingly, the receiver 200 obtains a captured display image Ppre and a decode target image Pdec by the image capturing. Then, the receiver 200 obtains a light ID by decoding the decode target image Pdec, and obtains, from a server, AR images P27*a* to P27*c* and recognition information which are associated with the light ID. The receiver 200 recognizes, as a target region, a peripheral of a region m2 in which the signboard is shown in the captured display image Ppre, based on recognition information.

Specifically, the receiver 200 recognizes a region in contact with the left portion of the region m2 as a first target region, and superimposes an AR image P27*a* on the first target region, as illustrated in (a) of FIG. 99.

Next, the receiver 200 recognizes a region which includes a lower portion of the region m2 as a second target region, and superimposes an AR image P27*b* on the second target region, as illustrated in (b) of FIG. 99.

Next, the receiver 200 recognizes a region in contact with the upper portion of the region m2 as a third target region, and superimposes an AR image P27*c* on the third target region, as illustrated in (c) of FIG. 99.

Here, the AR images P27*a* to P27*c* may each be a video showing an image of a character of an abominable snowman, for example.

While continuously and repeatedly obtaining a light ID, the receiver 200 may switch the target region to be recognized to one of the first to third target regions in a predetermined order and at predetermined timings. Specifically, the receiver 200 may switch a target region to be recognized in the order of the first target region, the second target region, and the third target region. Alternatively, the receiver 200 may switch the target region to be recognized to one of the first to third target regions in a predetermined order, each time the receiver 200 obtains a light ID as described above. Specifically, while the receiver 200 continuously and repeatedly obtains a light ID after the receiver 200 first obtains the light ID, the receiver 200 recognizes the first target region and superimposes the AR image P27*a* on the first target region, as illustrated in (a) of FIG. 99. Then, when the receiver 200 no longer obtains the light ID, the receiver 200 hides the AR image P27*a*. Next, if the receiver 200 obtains a light ID again, while continuously and repeatedly obtaining the light ID, the receiver 200 recognizes the second target region and superimposes the AR image P27*b* on the second target region, as illustrated in (b) of FIG. 99. Then, when the receiver 200 again no longer obtains the light ID, the receiver 200 hides the AR image P27*b*. Next, when the receiver 200 obtains the light ID again, while continuously and repeatedly obtaining the light ID, the receiver 200 recognizes the third target region and superimposes the AR image P27*c* on the third target region, as illustrated in (c) of FIG. 99.

If the receiver 200 switches between target regions to be recognized each time the receiver 200 obtains a light ID as described above, the receiver 200 may change the color of an AR image to be displayed, at a frequency of once in N times (N is an integer of 2 or more). N times may be the number of times an AR image is displayed, and 200 times, for example. Specifically, the AR images P27*a* to P27*c* are all images of the same white character, but an AR image showing a pink character, for example, is displayed at a frequency of once in 200 times. The receiver 200 may give points to the user if user operation directed to the AR image is received while such an AR image showing the pink character is displayed.

Accordingly, switching between target regions on which an AR image is superimposed and changing the color of an AR image at a predetermined frequency can attract the user to capturing an image of a signboard illuminated by the transmitter 100, thus promoting the user to repeatedly obtain a light ID.

Figure 100:
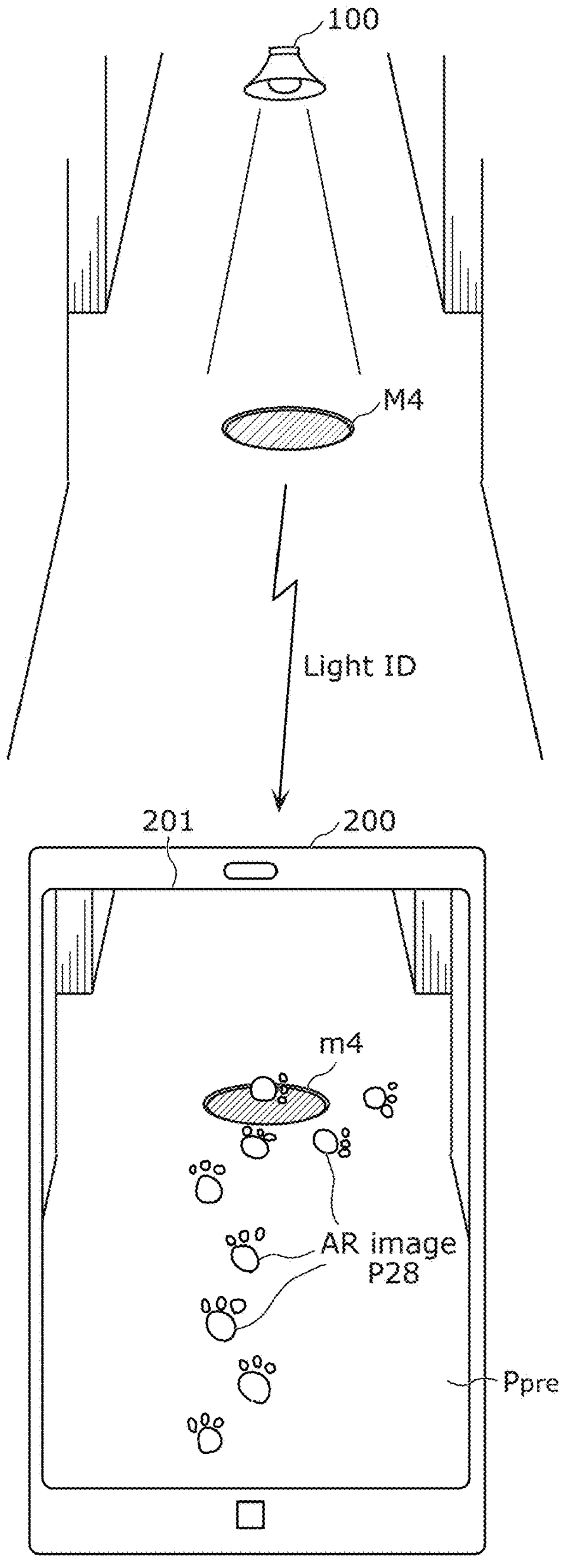

FIG. 100 is a diagram illustrating an example of superimposing an AR image by the receiver 200.

The receiver 200 has a function, that is, so-called way finder of presenting the route for a user to take, by capturing an image of a mark M4 drawn on the floor at a position where, for example, a plurality of passages cross in a building. The building is, for example, a hotel, and the presented route is for the user who has checked in to get to his/her room.

The mark M4 is illuminated by a lighting apparatus which is the above-described transmitter 100 which transmits a light ID by changing luminance. Accordingly, the receiver 200 obtains a captured display image Ppre and a decode target image Pdec by capturing an image of the mark M4. The receiver 200 obtains a light ID by decoding the decode target image Pdec, and transmits the light ID and terminal information of the receiver 200 to a server. The receiver 200 obtains, from the server, a plurality of AR images P28 and recognition information associated with the light ID and terminal information. Note that the light ID and the terminal information are stored in the server, in association with the AR images P28 and the recognition information when the user has checked in.

The receiver 200 recognizes, based on recognition information, a plurality of target regions from a region m4 in which the mark M4 is shown and a periphery of the region m4 in the captured display image Ppre. Then, as illustrated in FIG. 100, the receiver 200 superimposes the AR images P28 like, for example, footprints of an animal on the plurality of target regions, and displays the images.

Specifically, recognition information indicates the route showing that the user is to turn right at the position of the mark M4. The receiver 200 determines a path on the captured display image Ppre, based on such recognition information, and recognizes a plurality of target regions arranged along the path. This path extends from the lower portion of the display 201 to the region m4, and turns right at the region m4. The receiver 200 disposes the AR images P28 at the plurality of recognized target regions as if an animal walked along the path.

Here, the receiver 200 may use the earth's magnetic field detected by a 9-axis sensor included in the receiver 200, when the path on the captured display image Ppre is to be determined. In this case, recognition information indicates the direction to which the user is to proceed from the position of the mark M4, based on the direction of the earth's magnetic field. For example, recognition information indicates west as a direction in which the user is to proceed at the position of the mark M4. Based on such recognition information, the receiver 200 determines a path that extends from the lower portion of the display 201 to the region m4 and extends to the west at the region m4, in the captured display image Ppre. Then, the receiver 200 recognizes a plurality of target regions arranged along the path. Note that the receiver 200 determines the lower side of the display 201 by the 9-axis sensor detecting the gravitational acceleration.

Accordingly, the receiver 200 presents the user's route, and thus the user can readily arrive at the destination by proceeding along the route. Furthermore, the route is displayed as an AR image on the captured display image Ppre, and thus the route can be clearly presented to the user.

Note that the lighting apparatus which is the transmitter 100 illuminates the mark M4 with short pulse light, thus appropriately transmitting a light ID while maintaining the brightness not too high. Although the receiver 200 has captured an image of the mark M4, the receiver 200 may capture an image of the lighting apparatus, using a camera disposed on the display 201 side (a so-called front camera). The receiver 200 may capture images of both the mark M4 and the lighting apparatus.

Figure 101:
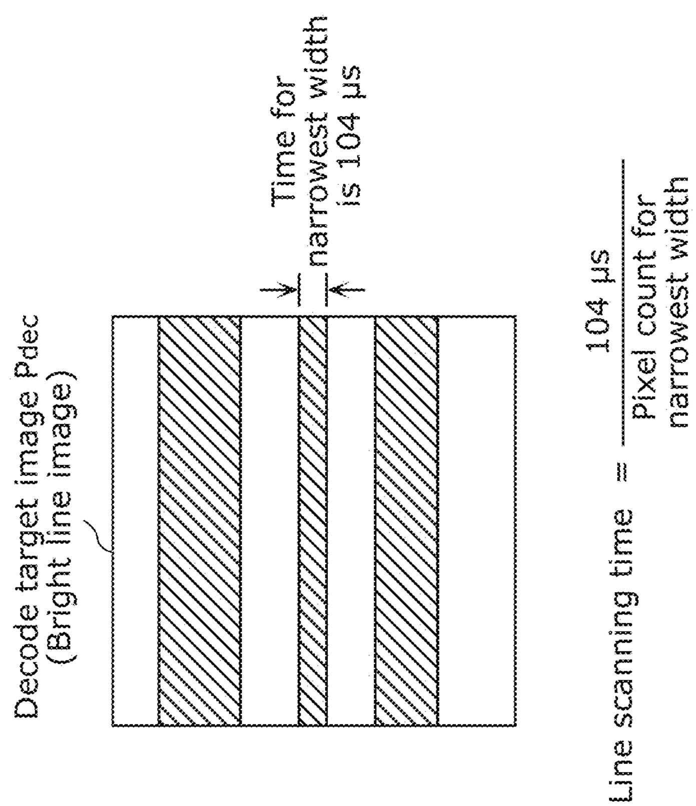

FIG. 101 is a diagram for describing an example of how the receiver 200 obtains a line-scan time.

The receiver 200 decodes a decode target image Pdec using a line-scan time. The line-scan time is from when exposure of one exposure line included in the image sensor is started until when exposure of the next exposure line is started. If the line-scan time is known, the receiver 200 decodes the decode target image Pdec using the known line-scan time. However, if the line-scan time is not known, the receiver 200 calculates the line-scan time from the decode target image Pdec.

For example, the receiver 200 detects a line having the narrowest width as illustrated in FIG. 101 from among a plurality of bright lines and a plurality of dark lines which constitute a bright line pattern in the decode target image Pdec. Note that a bright line is a line on the decode target image Pdec, which appears due to one or more successive exposure lines each being exposed when the luminance of the transmitter 100 is high. A dark line is a line on the decode target image Pdec, which appears due to one or more successive exposure lines each being exposed when the luminance of the transmitter 100 is low.

Once the receiver 200 finds the line having the narrowest width, the receiver 200 determines the number of exposure lines corresponding to the line having the narrowest width, or in other words, the pixel count. If a carrier frequency at which the transmitter 100 changes luminance in order to transmit a light ID is 9.6 kHz, the shortest time when luminance of the transmitter 100 is high or low is 104 μs. Accordingly, the receiver 200 calculates a line scanning time by dividing 104 μs by the pixel count for the determined narrowest width.

Figure 102:
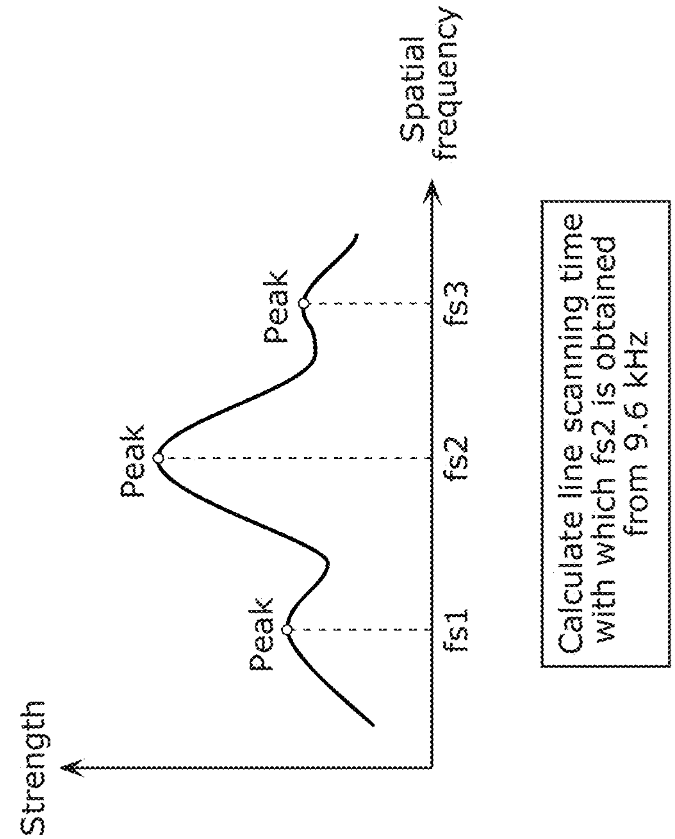

FIG. 102 is a diagram for describing an example of how the receiver 200 obtains a line scanning time.

The receiver 200 may Fourier-transform the bright line pattern of the decode target image Pdec, and calculate the line scanning time, based on a spatial frequency obtained by the Fourier transform.

For example, as illustrated in FIG. 102, the receiver 200 derives a spectrum showing a relation between spatial frequency and strength of a component of the spatial frequency in the decode target image Pdec, by the above-mentioned Fourier transform. Next, the receiver 200 sequentially selects a plurality of peaks shown by the spectrum one by one. Each time the receiver 200 selects a peak, the receiver 200 calculates, as a line scanning time candidate, a line scanning time with which the spatial frequency at the selected peak (for example, the spatial frequency fs2 in FIG. 102) is obtained from a temporal frequency of 9.6 kHz. 9.6 kHz is a carrier frequency of the luminance change of the transmitter 100 as described above. Accordingly, a plurality of line scanning time candidates are calculated. The receiver 200 selects a maximum likelihood candidate as a line scanning time, from among the plurality of line scanning time candidates.

In order to select a maximum likelihood candidate, the receiver 200 calculates an acceptable range of a line scanning time, based on the imaging frame rate and the number of exposure lines included in the image sensor. Specifically, the receiver 200 calculates the largest value of the line scanning times from $1\times10^6$ [μs]/{(frame rate)×(the number of exposure lines)}. Then, the receiver 200 determines the largest value×constant K (K<1) to the largest value to be the acceptable range of the line scanning time. The constant K is, for example, 0.9 or 0.8.

From among the plurality of line scanning time candidates, the receiver 200 selects a candidate within the acceptable range as a maximum likelihood candidate, namely, a line scanning time.

Note that the receiver 200 may evaluate the reliability of the calculated line scanning time, based on whether the line scanning time calculated in the example shown in FIG. 101 is within the above acceptable range.

Figure 103:
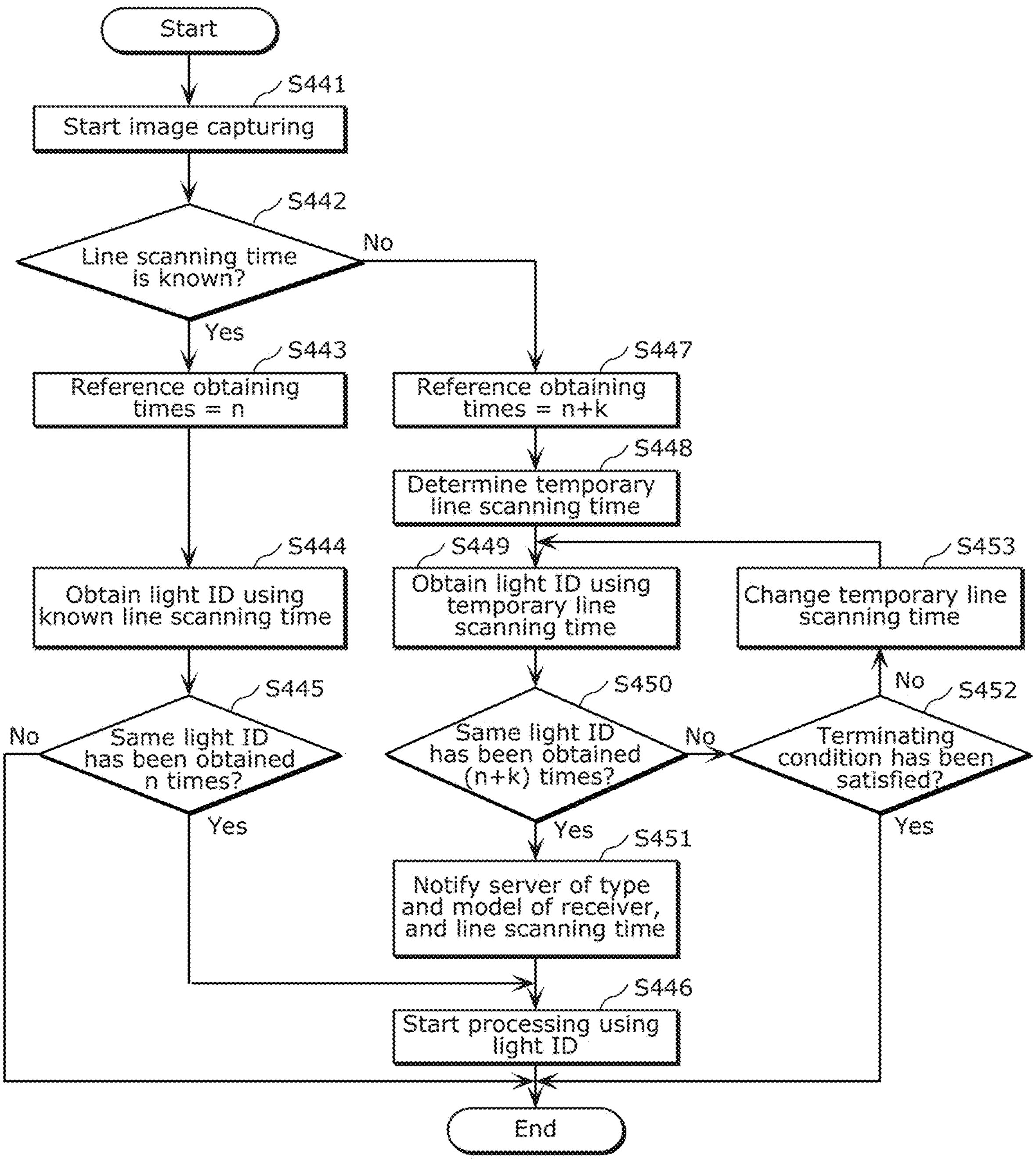

FIG. 103 is a flowchart illustrating an example of how the receiver 200 obtains a line scanning time.

The receiver 200 may obtain a line scanning time by attempting to decode a decode target image Pdec. Specifically, the receiver 200 first starts image capturing (step S441). Next, the receiver 200 determines whether a line scanning time is known (step S442). For example, the receiver 200 may notify the server of the type and the model of the receiver 200, and inquires a line scanning time for the type and model, thus determining whether the line scanning time is known. Here, if the receiver 200 determines that the line scanning time is known (Yes in step S442), the receiver 200 sets reference acquisition times for a light ID to n (n is an integer of 2 or more, and is, for example, 4) (step S443). Next, the receiver 200 obtains a light ID by decoding the decode target image Pdec using the known line scanning time (step S444). At this time, the receiver 200 obtains a plurality of light IDs, by decoding each of a plurality of decode target images Pdec sequentially obtained through image capturing started in step S441. Here, the receiver 200 determines whether the same light ID is obtained for the reference acquisition times (namely, n times) (step S445). If the receiver 200 determines that the light ID has been obtained for n times (Yes in step S445), the receiver 200 trusts the light ID, and starts processing (for example, superimposing an AR image) using the light ID (step S446). On the other hand, if the receiver 200 determines that the light ID has not been obtained for n times (No in step S445), the receiver 200 does not trust the light ID, and terminates the processing.

In step S442, if the receiver 200 determines that the line scanning time is not known (No in step S442), the receiver 200 sets the reference acquisition time for a light ID to n+k (k is an integer of 1 or more) (step S447). Specifically, if the line scanning time is not known, the receiver 200 sets more reference acquisition times than the times when the line scanning time is known. Next, the receiver 200 determines a temporary line scanning time (step S448). Then, the receiver 200 obtains a light ID by decoding the decode target image Pdec using the temporary line scanning time determined (step S449). At this time, the receiver 200 obtains a plurality of light IDs, by decoding each of a plurality of decode target images Pdec sequentially obtained through image capturing started in step S441 similarly to the above. Here, the receiver 200 determines whether the same light ID has been obtained for the reference acquisition times (that is, (n+k) times) (step S450).

If the receiver 200 determines that the same light ID has been obtained for (n+k) times (Yes in step S450), the receiver 200 determines that the temporary line scanning time determined is the right line scanning time. Then, the receiver 200 notifies the server of the type and the model of the receiver 200, and the line scanning time (step S451). Accordingly, the server stores, for each receiver, the type and the model of the receiver and a line scanning time suitable for the receiver in association. Thus, once another receiver of the same type and the model starts image capturing, the other receiver can determine the line scanning time for the other receiver by making an inquiry to the server. Specifically, the other receiver can determine that the line scanning time is known in the determination of step S442.

Then, the receiver 200 trusts the light ID obtained for the (n+k) times, and starts processing (for example, superimposing an AR image) using the light ID (step S446).

In step S450, if the receiver 200 determines that the same light ID has not been obtained for the (n+k) times (No in step S450), the receiver 200 further determines whether a terminating condition has been satisfied (step S452). The terminating condition is that, for example, a predetermined time has elapsed since image capturing starts or a light ID has been obtained for more than the maximum acquisition times. If the receiver 200 determines that such a terminating condition has been satisfied (Yes in step S452), the receiver 200 terminates the processing. On the other hand, if the receiver 200 determines that such a terminating condition has not been satisfied (No in step S452), the receiver 200 changes the temporary line scanning time (step S453). Then, the receiver 200 repeatedly executes the processing from step S449, using the changed temporary line scanning time.

Accordingly, the receiver 200 can obtain the line scanning time even if the line scanning time is not known, as in the examples shown in FIGS. 101 to 103. In this manner, even if the type and the model of the receiver 200 are any type and any model, the receiver 200 can decode the decode target image Pdec appropriately, and obtain a light ID.

Figure 104:
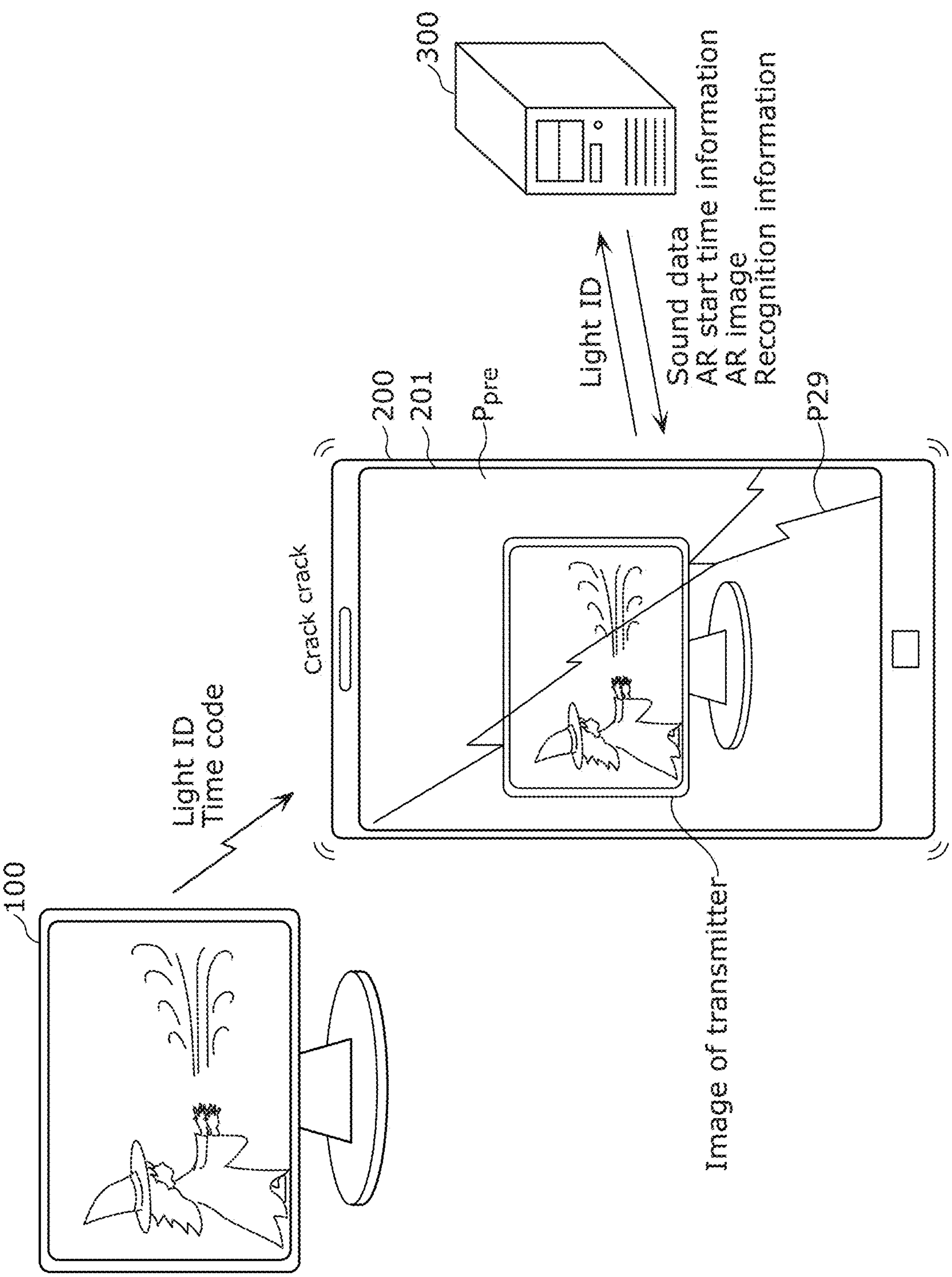

FIG. 104 is a diagram illustrating an example of superimposing an AR image by the receiver 200.

The receiver 200 captures an image of the transmitter 100 configured as a TV. The transmitter 100 transmits a light ID and a time code periodically, by changing luminance while displaying a TV program, for example. The time code may be information indicating, whenever transmitted, a time at which the time code is transmitted, and may be a time packet shown in FIG. 26, for example.

The receiver 200 periodically obtains a captured display image Ppre and a decode target image Pdec by image capturing described above. The receiver 200 obtains a light ID and a time code as described above, by decoding a decode target image Pdec while displaying, on the display 201, the captured display image Ppre periodically obtained. Next, the receiver 200 transmits the light ID to the server 300. Upon reception of the light ID, the server 300 transmits sound data, AR start time information, an AR image P29, and recognition information associated with the light ID to the receiver 200.

On obtaining the sound data, the receiver 200 plays the sound data, in synchronization with a video of a TV program shown by the transmitter 100. Specifically, sound data includes pieces of sound unit data each including a time code. The receiver 200 starts playback of the pieces of sound unit data from a piece of sound unit data in the sound data which includes a time code showing the same time as the time code obtained from the transmitter 100 together with the light ID. Accordingly, the playback of sound data is in synchronization with a video of a TV program. Note that such synchronization of sound with a video may be achieved by the same method as or a similar method to the audio synchronous reproduction shown in FIG. 23 and the drawings following FIG. 23.

On obtaining the AR image P29 and the recognition information, the receiver 200 recognizes, from the captured display images Ppre, a region according to the recognition information as a target region, and superimposes the AR image P29 on the target region. For example, the AR image P29 shows cracks in the display 201 of the receiver 200, and the target region is a region of the captured display image Ppre, which lies across the image of the transmitter 100.

Here, the receiver 200 displays the captured display image Ppre on which the AR image P29 as mentioned above is superimposed, at the timing according to the AR start time information. The AR start time information indicates the time when the AR image P29 is displayed. Specifically, the receiver 200 displays the captured display image Ppre on which the above AR image P29 is superimposed, at a timing when a time code indicating the same time as the AR start time information is received, among time codes occasionally transmitted from the transmitter 100. For example, the time indicated by the AR start time information is when a TV program comes to a scene in which a witch girl uses ice magic. At this time, the receiver 200 may output sound of the cracks of the AR image P29 being generated, through the speaker of the receiver 200, by playback of the sound data.

Accordingly, the user can view the scene of the TV program, as if the user were actually in the scene.

Furthermore, at the time indicated by the AR start time information, the receiver 200 may vibrate a vibrator included in the receiver 200, cause the light source to emit light like a flash, make the display 201 bright momentarily, or cause the display 201 to blink. Furthermore, the AR image P29 may include not only an image showing cracks, but also a state in which dew condensation on the display 201 has frozen.

Figure 105:
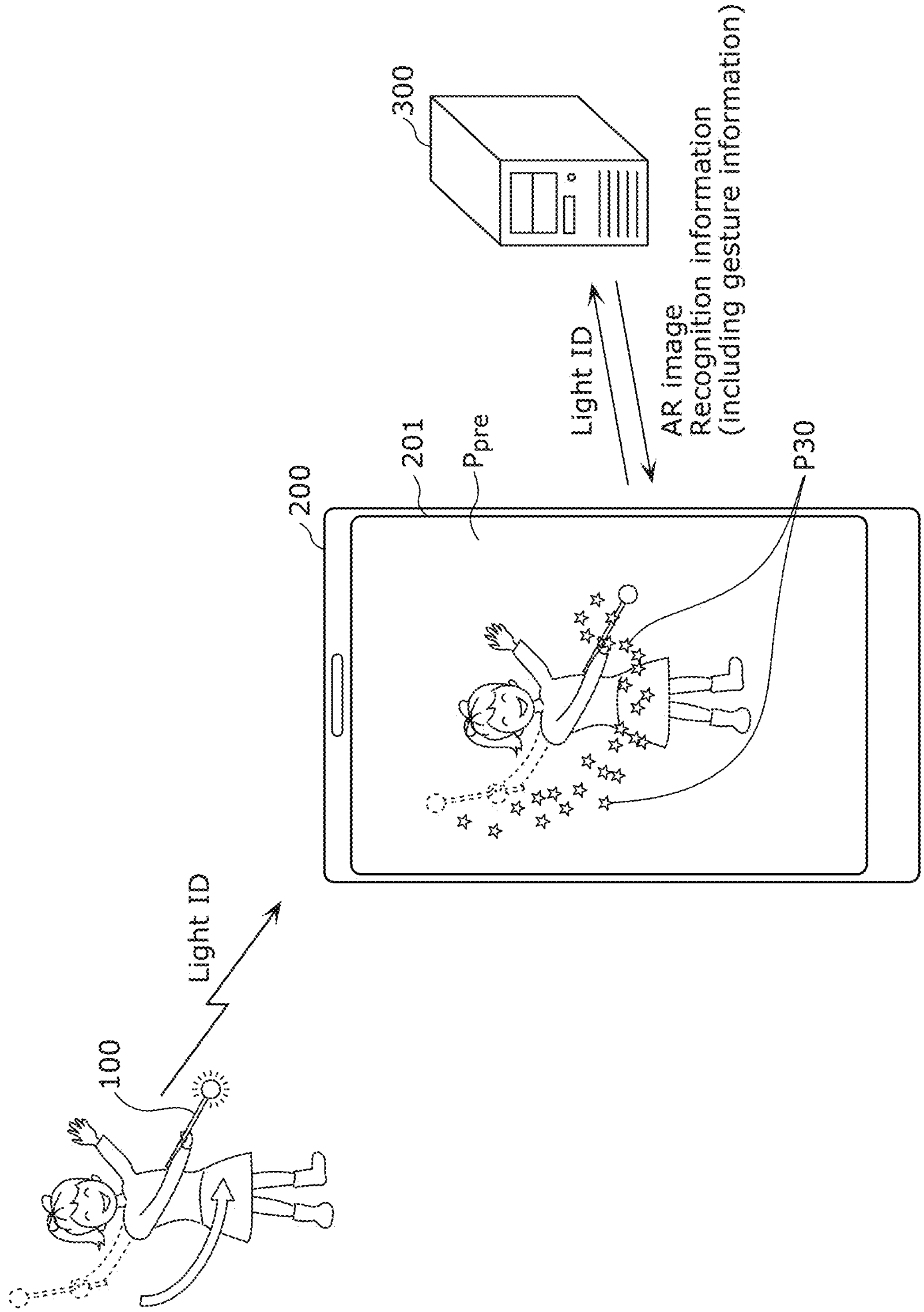

FIG. 105 is a diagram illustrating an example of superimposing an AR image by the receiver 200.

The receiver 200 captures an image of the transmitter 100 configured as, for example, a toy cane. The transmitter 100 includes a light source, and transmits a light ID by the light source changing luminance.

The receiver 200 periodically obtains a captured display image Ppre and a decode target image Pdec by the image capturing described above. The receiver 200 obtains a light ID as described above, by decoding a decode target image Pdec while displaying the captured display image Ppre obtained periodically on the display 201. Next, the receiver 200 transmits the light ID to the server 300. Upon reception of the light ID, the server 300 transmits an AR image P30 and recognition information which are associated with the light ID to the receiver 200.

Here, recognition information further includes gesture information indicating a gesture (namely, movement) of a person holding the transmitter 100. The gesture information indicates a gesture of the person moving the transmitter 100 from the right to the left, for example. The receiver 200 compares a gesture of the person holding the transmitter 100 shown in the captured display image Ppre with a gesture indicated by the gesture information. If the gestures match, the receiver 200 superimposes AR images P30 each having a star shape on the captured display image Ppre such that, for example, many of the AR images P30 are arranged along the trajectory of the transmitter 100 moved according to the gesture.

Figure 106:
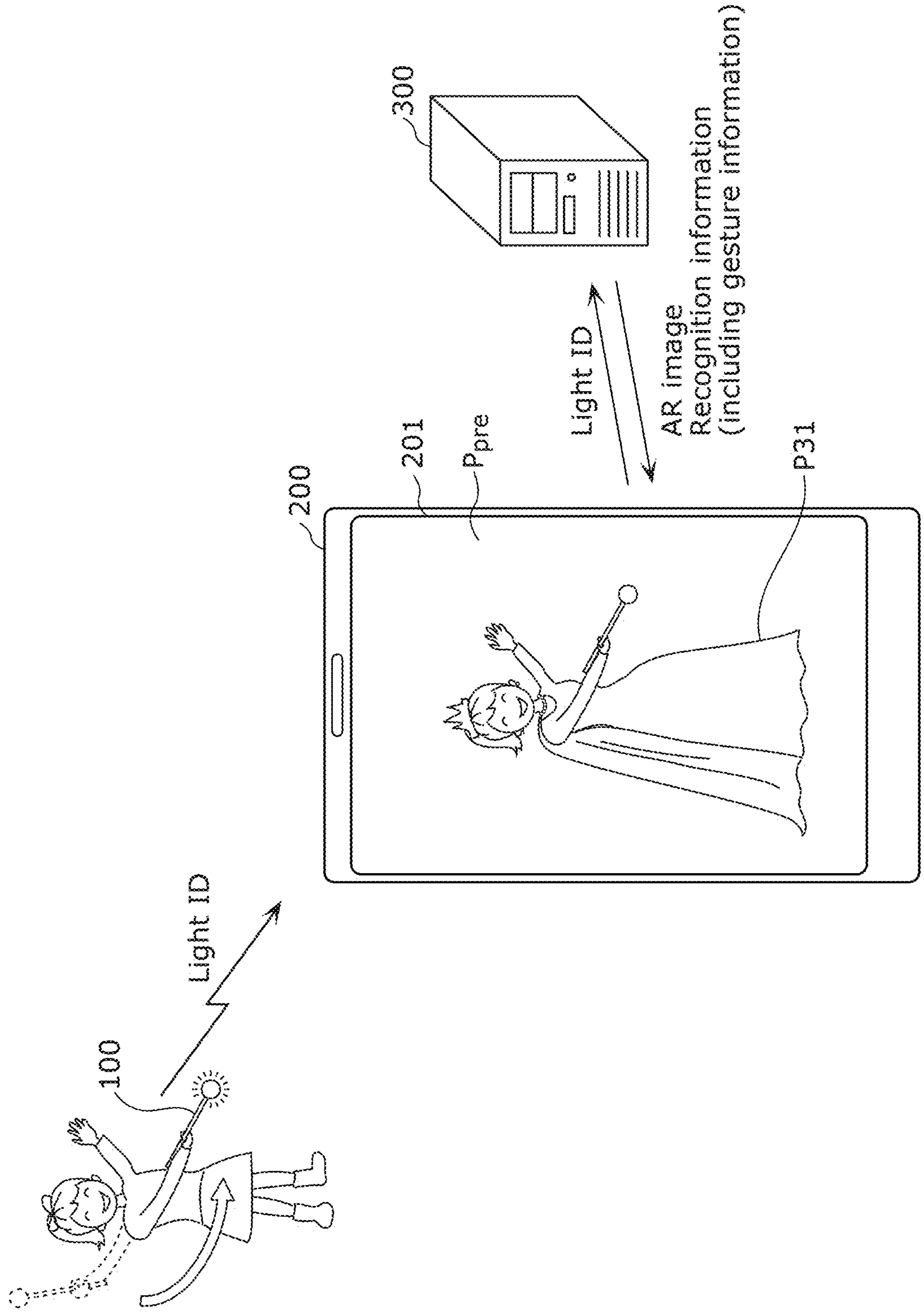

FIG. 106 is a diagram illustrating an example of superimposing an AR image by the receiver 200.

The receiver 200 captures an image of the transmitter 100 configured as, for example, a toy cane, similarly to the above description.

The receiver 200 periodically obtains a captured display image Ppre and a decode target image Pdec by the image capturing. The receiver 200 obtains a light ID as described above, by decoding a decode target image Pdec while displaying the captured display image Ppre obtained periodically on the display 201. Next, the receiver 200 transmits the light ID to the server 300. Upon reception of the light ID, the server 300 transmits an AR image P31 and recognition information which are associated with the light ID to the receiver 200.

Here, the recognition information includes gesture information indicating a gesture of a person holding the transmitter 100, as with the above description. The gesture information indicates a gesture of a person moving the transmitter 100 from the right to the left, for example. The receiver 200 compares a gesture of the person holding the transmitter 100 shown in the captured display image Ppre with a gesture indicated by the gesture information. If the gestures match, the receiver 200 superimposes, on a target region of the captured display image Ppre in which the person holding the transmitter 100 is shown, the AR image P31 showing a dress costume, for example.

Accordingly, with the display method according to the variation, gesture information associated with a light ID is obtained from the server. Next, it is determined whether a movement of a subject shown by captured display images periodically obtained matches a movement indicated by gesture information obtained from the server. Then, when it is determined that the movements match, a captured display image Ppre on which an AR image is superimposed is displayed.

Accordingly, an AR image can be displayed according to, for example, the movement of a subject such as a person. Specifically, an AR image can be displayed at an appropriate timing.

Figure 107:
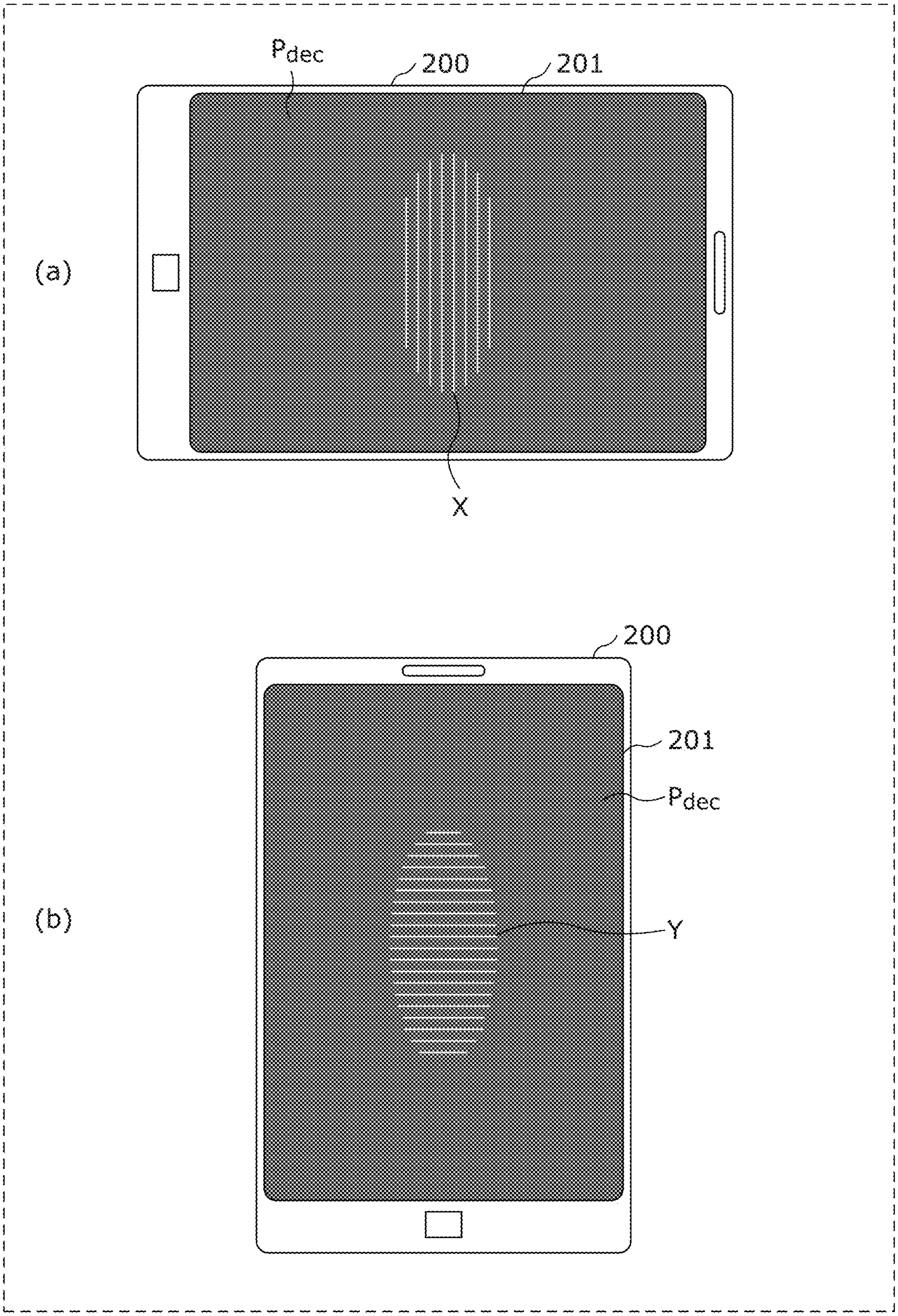

FIG. 107 is a diagram illustrating an example of an obtained decode target image Pdec depending on the orientation of the receiver 200.

For example, as illustrated in (a) of FIG. 107, the receiver 200 captures an image of the transmitter 100 which transmits a light ID by changing luminance, in a lateral orientation. Note that the lateral orientation is achieved when the longer sides of the display 201 of the receiver 200 are horizontally disposed. Furthermore, the exposure lines of the image sensor included in the receiver 200 are orthogonal to the longer sides of the display 201. A decode target image Pdec which includes a bright line pattern region X having few bright lines is obtained by image capturing as described above. There are few bright lines in the bright line pattern region X of the decode target image Pdec. Specifically, there are few portions where luminance changes to High or Low. Accordingly, the receiver 200 may not be able to appropriately obtain a light ID by decoding the decode target image Pdec.

For example, the user changes the orientation of the receiver 200 from the lateral orientation to the longitudinal orientation, as illustrated in (b) of FIG. 107. Note that the longitudinal orientation is achieved when the longer sides of the display 201 of the receiver 200 are vertically disposed. The receiver 200 in such an orientation can obtain a decode target image Pdec which includes a bright line pattern region Y having many bright lines, by capturing an image of the transmitter 100 which transmits a light ID.

Accordingly, a light ID may not be appropriately obtained depending on the orientation of the receiver 200, and thus when the receiver 200 is caused to obtain a light ID, the orientation of the receiver 200, an image of which is being captured, may be changed as appropriate. When the orientation is being changed, the receiver 200 can appropriately obtain a light ID, at a timing when the receiver 200 is in an orientation in which the receiver 200 readily obtains a light ID.

Figure 108:
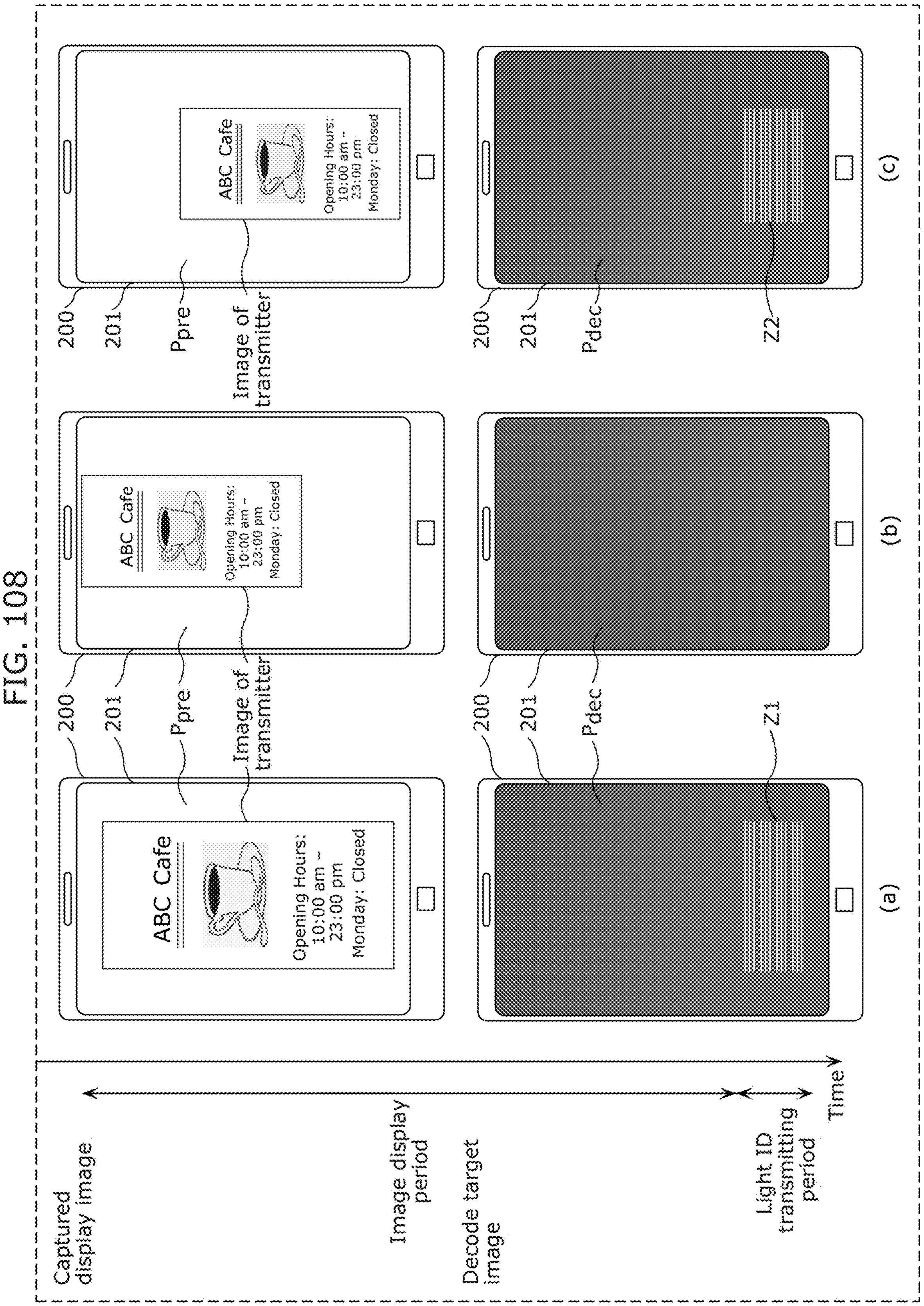

FIG. 108 is a diagram illustrating other examples of an obtained decode target image Pdec depending on the orientation of the receiver 200.

For example, the transmitter 100 is configured as digital signage of a coffee shop, displays an image showing an advertisement of the coffee shop during an image display period, and transmits a light ID by changing luminance during a light ID transmission period. Specifically, the transmitter 100 alternately and repeatedly executes display of the image during the image display period and transmission of the light ID during the light ID transmission period.

The receiver 200 periodically obtains a captured display image Ppre and a decode target image Pdec by capturing an image of the transmitter 100. At this time, a decode target image Pdec which includes a bright line pattern region may not be obtained due to synchronization of a repeating cycle of the image display period and the light ID transmission period of the transmitter 100 and a repeating cycle of obtaining a captured display image Ppre and a decode target image Pdec by the receiver 200. Furthermore, a decode target image Pdec which includes a bright line pattern region may not be obtained depending on the orientation of the receiver 200.

For example, the receiver 200 captures an image of the transmitter 100 in the orientation as illustrated in (a) of FIG. 108. Specifically, the receiver 200 approaches the transmitter 100, and captures an image of the transmitter 100 such that an image of the transmitter 100 is projected on the entire image sensor of the receiver 200.

Here, if a timing at which the receiver 200 obtains the captured display image Ppre is in the image display period of the transmitter 100, the receiver 200 appropriately obtains the captured display image Ppre in which the transmitter 100 is shown.

Even if the timing at which the receiver 200 obtains the decode target image Pdec overlaps both the image display period and the light ID transmission period of the transmitter 100, the receiver 200 can obtain the decode target image Pdec which includes a bright line pattern region Z1.

Specifically, exposure of the exposure lines included in the image sensor starts from the vertically top exposure line to the vertically bottom exposure line. Accordingly, the receiver 200 cannot obtain a bright line pattern region even if the receiver 200 starts exposing the image sensor in the image display period, in order to obtain a decode target image Pdec. However, when the image display period switches to the light ID transmission period, the receiver 200 can obtain a bright line pattern region corresponding to the exposure lines to be exposed during the light ID transmission period.

Here, the receiver 200 captures an image of the transmitter 100 in the orientation as illustrated in (b) of FIG. 108. Specifically, the receiver 200 moves away from the transmitter 100, and captures an image of the transmitter 100 such that the image of the transmitter 100 is projected only on an upper region of the image sensor of the receiver 200. At this time, if the timing at which the receiver 200 obtains a captured display image Ppre is in the image display period of the transmitter 100, the receiver 200 appropriately obtains the captured display image Ppre in which the transmitter 100 is shown, as with the above description. However, if the timing at which the receiver 200 obtains a decode target image Pdec overlaps both the image display period and the light ID transmission period of the transmitter 100, the receiver 200 may not obtain a decode target image Pdec which includes a bright line pattern region. Specifically, even if the image display period of the transmitter 100 switches to the light ID transmission period, the image of the transmitter 100 which changes luminance may not be projected on exposure lines on the lower side of the image sensor which are exposed during the light ID transmission period. Accordingly, the receiver 200 cannot obtain a decode target image Pdec having a bright line pattern region.

On the other hand, the receiver 200 captures an image of the transmitter 100 while being away from the transmitter 100, such that the image of the transmitter 100 is projected only on a lower region of the image sensor of the receiver 200, as illustrated in (c) of FIG. 108. At this time, if the timing at which the receiver 200 obtains the captured display image Ppre is within the image display period of the transmitter 100, the receiver 200 appropriately obtains the captured display image Ppre in which the transmitter 100 is shown, similarly to the above. Furthermore, even if the timing at which the receiver 200 obtains a decode target image Pdec overlaps the image display period and the light ID transmission period of the transmitter 100, the receiver 200 can possibly obtain a decode target image Pdec which includes a bright line pattern region. Specifically, if the image display period of the transmitter 100 switches to the light ID transmission period, an image of the transmitter 100 which changes luminance is projected on exposure lines on the lower region of the image sensor of the receiver 200, which are exposed during the light ID transmission period. Accordingly, a decode target image Pdec which has a bright line pattern region Z2 can be obtained.

As described above, a light ID may not be appropriately obtained depending on the orientation of the receiver 200, and thus when the receiver 200 obtains a light ID, the receiver 200 may prompt a user to change the orientation of the receiver 200. Specifically, when the receiver 200 starts image capturing, the receiver 200 displays or audibly outputs a message such as, for example, "Please move" or "Please shake" so that the orientation of the receiver 200 is to be changed. In this manner, the receiver 200 captures images while changing the orientation, and thus can obtain a light ID appropriately.

Figure 109:
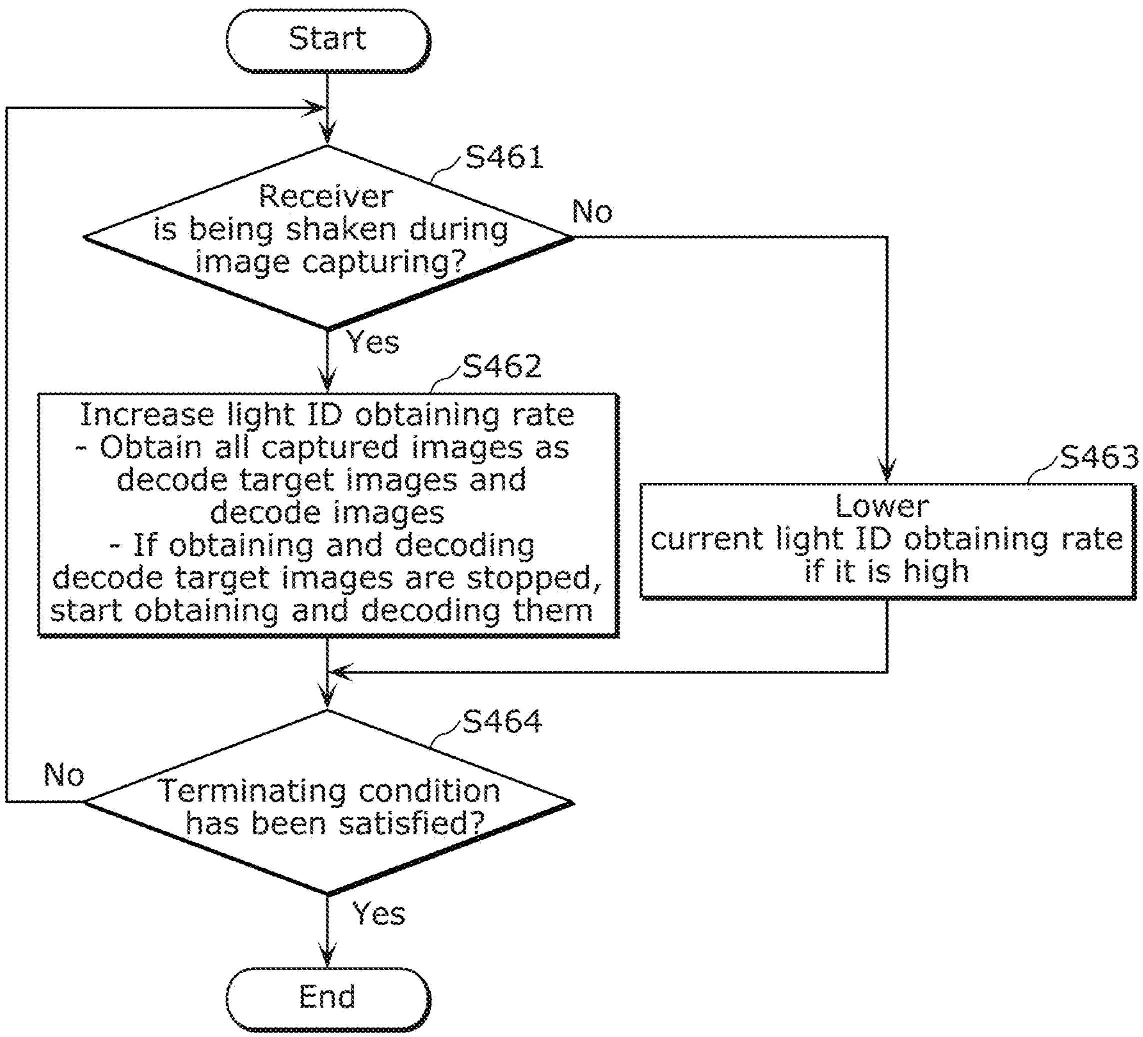

FIG. 109 is a flowchart illustrating an example of processing operation of the receiver 200.

For example, the receiver 200 determines whether the receiver 200 is being shaken, while capturing an image (step S461). Specifically, the receiver 200 determines whether the receiver 200 is being shaken, based on the output of the 9-axis sensor included in the receiver 200. Here, if the receiver 200 determines that the receiver 200 is being shaken while capturing an image (Yes in step S461), the receiver 200 increases the rate at which a light ID is obtained (step S462). Specifically, the receiver 200 obtains, as decode target images (that is, bright line images) Pdec, all the captured images obtained per unit time during image capturing, and decodes each of all the obtained decode target images. Furthermore, when all the captured images are obtained as the captured display images Ppre, specifically, when obtaining and decoding decode target images Pdec are stopped, the receiver 200 starts obtaining and decoding decode target images Pdec.

On the other hand, if the receiver 200 determines that the receiver 200 is not being shaken while image capturing (No in step S461), the receiver 200 obtains decode target images Pdec at a low rate at which a light ID is obtained (step S463). Specifically, if the rate at which a light ID is obtained is increased in step S462 and is still high, the receiver 200 decreases the rate at which a light ID is obtained because the current rate is high. This lowers a frequency at which the receiver 200 performs decoding processing on a decode target image Pdec, and thus power consumption can be maintained low.

Then, the receiver 200 determines whether a terminating condition for terminating processing for adjusting a rate at which a light ID is obtained is satisfied (step S464), and if the receiver 200 determines that the terminating condition is not satisfied (No in step S464), the receiver 200 repeatedly executes processing from step S461. On the other hand, if the receiver 200 determines that the terminating condition is satisfied (Yes in step S464), the receiver 200 terminates the processing of adjusting the rate at which a light ID is obtained.

FIG. 110 is a diagram illustrating an example of processing of switching between camera lenses by the receiver 200.

The receiver 200 may include a wide-angle lens 211 and a telephoto lens 212 as camera lenses. A captured image obtained by the image capturing using the wide-angle lens 211 is an image corresponding to a wide angle of view, and shows a small subject in the image. On the other hand, a captured image obtained by the image capturing using the telephoto lens 212 is an image corresponding to a narrow angle of view, and shows a large subject in the image.

The receiver 200 as described above may switch between camera lenses used for image capturing, according to one of the uses A to E illustrated in FIG. 110 when capturing an image.

According to the use A, when the receiver 200 is to capture an image, the receiver 200 uses the telephoto lens 212 at all times, for both normal imaging and receiving a light ID. Here, normal imaging is the case where all captured images are obtained as captured display images Ppre by image capturing. Also, receiving a light ID is the case where a captured display image Ppre and a decode target image Pdec are periodically obtained by image capturing.

According to the use B, the receiver 200 uses the wide-angle lens 211 for normal imaging. On the other hand, when the receiver 200 is to receive a light ID, the receiver 200 first uses the wide-angle lens 211. The receiver 200 switches the camera lens from the wide-angle lens 211 to the telephoto lens 212, if a bright line pattern region is included in a decode target image Pdec obtained when the wide-angle lens 211 is used. After such switching, the receiver 200 can obtain a decode target image Pdec corresponding to a narrow angle of view and thus showing a large bright line pattern.

According to the use C, the receiver 200 uses the wide-angle lens 211 for normal imaging. On the other hand, when the receiver 200 is to receive a light ID, the receiver 200 switches the camera lens between the wide-angle lens 211 and the telephoto lens 212. Specifically, the receiver 200 obtains a captured display image Ppre using the wide-angle lens 211, and obtains a decode target image Pdec using the telephoto lens 212.

According to the use D, the receiver 200 switches the camera lens between the wide-angle lens 211 and the telephoto lens 212 for both normal imaging and receiving a light ID, according to user operation.

According to the use E, the receiver 200 decodes a decode target image Pdec obtained using the wide-angle lens 211, when the receiver 200 is to receive a light ID. If the receiver 200 cannot appropriately decode the decode target image Pdec, the receiver 200 switches the camera lens from the wide-angle lens 211 to the telephoto lens 212. Furthermore, the receiver 200 decodes a decode target image Pdec obtained using the telephoto lens 212, and if the receiver 200 cannot appropriately decode the decode target image Pdec, the receiver 200 switches the camera lens from the telephoto lens 212 to the wide-angle lens 211. Note that when the receiver 200 determines whether the receiver 200 has appropriately decoded a decode target image Pdec, the receiver 200 first transmits, to a server, a light ID obtained by decoding the decode target image Pdec. If the light ID matches a light ID registered in the server, the server notifies the receiver 200 of matching information indicating that the light ID matches a registered light ID, and if the light ID does not match a registered light ID, notifies the receiver 200 of non-matching information indicating that the light ID does not match a registered light ID. The receiver 200 determines that the decode target image Pdec has been appropriately decoded if the information notified from the server is matching information, whereas if the information notified from the server is non-matching information, the receiver 200 determines that the decode target image Pdec has not been appropriately decoded. The receiver 200 determines that the decode target image Pdec has been appropriately decoded if a light ID obtained by decoding the decode target image Pdec satisfies a predetermined condition. On the other hand, if the light ID obtained by decoding the decode target image Pdec does not satisfy the predetermined condition, the receiver 200 determines that the receiver 200 has failed to appropriately decode the decode target image Pdec.

Such switching between the camera lenses allows an appropriate decode target image Pdec to be obtained.

FIG. 111 is a diagram illustrating an example of camera switching processing by the receiver 200.

For example, the receiver 200 includes an in-camera 213 and an out-camera (not illustrated in FIG. 111) as cameras. The in-camera 213 is also referred to as a face camera or a front camera, and is disposed on the same side as the display 201 of the receiver 200. The out-camera is disposed on the opposite side to the display 201 of the receiver 200.

Such a receiver 200 captures an image of the transmitter 100 configured as a lighting apparatus by the in-camera 213 while the in-camera 213 is facing up. The receiver 200 obtains a decode target image Pdec by the image capturing, and obtains a light ID transmitted from the transmitter 100 by decoding the decode target image Pdec.

Next, the receiver 200 obtains, from a server, an AR image and recognition information associated with the light ID, by transmitting the obtained light ID to the server. The receiver 200 starts processing of recognizing a target region according to the recognition information, from captured display images Ppre obtained by the out-camera and the in-camera 213. Here, if the receiver 200 does not recognize a target region from any of the captured display images Ppre obtained by the out-camera and the in-camera 213, the receiver 200 prompts a user to move the receiver 200. The user prompted by the receiver 200 moves the receiver 200. Specifically, the user moves the receiver 200 so that the in-camera 213 and the out-camera face backward and forward of the user, respectively. As a result, the receiver 200 recognizes a target region from a captured display image Ppre obtained by the out-camera. Specifically, the receiver 200 recognizes a region in which a person is projected as a target region, superimposes an AR image on the target region of the captured display images Ppre, and displays the captured display image Ppre on which the AR image is superimposed.

FIG. 112 is a flowchart illustrating an example of processing operation of the receiver 200 and the server.

The receiver 200 obtains a light ID transmitted from the transmitter 100 by the in-camera 213 capturing an image of the transmitter 100 which is a lighting apparatus, and transmits the light ID to the server (step S471). The server receives the light ID from the receiver 200 (step S472), and estimates the position of the receiver 200, based on the light ID (step S473). For example, the server has stored a table indicating, for each light ID, a room, a building, or a space in which the transmitter 100 which transmits the light ID is disposed. The server estimates, as the position of the receiver 200, a room or the like associated with the light ID transmitted from the receiver 200, from the table. Furthermore, the server transmits an AR image and recognition information associated with the estimated position to the receiver 200 (step S474).

The receiver 200 obtains the AR image and the recognition information transmitted from the server (step S475). Here, the receiver 200 starts processing of recognizing a target region according to the recognition information, from captured display images Ppre obtained by the out-camera and the in-camera 213. The receiver 200 recognizes a target region from, for example, a captured display image Ppre obtained by the out-camera (step S476). The receiver 200 superimposes an AR image on a target region of the captured display image Ppre, and displays the captured display image Ppre on which the AR image is superimposed (step S477).

Note that in the above example, if the receiver 200 obtains an AR image and recognition information transmitted from the server, the receiver 200 starts processing of recognizing a target region from captured display images Ppre obtained by the out-camera and the in-camera 213 in step S476. However, the receiver 200 may start processing of recognizing a target region from a captured display image Ppre obtained by the out-camera only, in step S476. Specifically, a camera for obtaining a light ID (the in-camera 213 in the above example) and a camera for obtaining a captured display image Ppre on which an AR image is to be superimposed (the out-camera in the above example) may play different roles at all times.

In an above example, the receiver 200 captures an image of the transmitter 100 which is a lighting apparatus using the in-camera 213, yet may capture an image of the floor illuminated by the transmitter 100 using the out-camera. The receiver 200 can obtain a light ID transmitted from the transmitter 100 even by such image capturing using the out-camera.

FIG. 113 is a diagram illustrating an example of superimposing an AR image by the receiver 200.

The receiver 200 captures an image of the transmitter 100 configured as a microwave provided in, for example, a store such as a convenience store. The transmitter 100 includes a camera for capturing an image of the inside of the microwave and a lighting apparatus which illuminates the inside of the microwave. The transmitter 100 recognizes food/drink (namely, object to be heated) in the microwave by image capturing using a camera. When heating the food/drink, the transmitter 100 causes the above lighting apparatus to emit light and also to change luminance, whereby the transmitter 100 transmits a light ID indicating the recognized food/drink. Note that the lighting apparatus illuminates the inside of the microwave, yet light from the lighting apparatus exits from the microwave through a light-transmissive window portion of the microwave. Accordingly, a light ID is transmitted to the outside of the microwave through the window portion of the microwave from the lighting apparatus.

Here, a user purchases food/drink at a convenience store, and puts the food/drink in the transmitter 100 which is a microwave to heat the food/drink. At this time, the transmitter 100 recognizes the food/drink using the camera, and starts heating the food/drink while transmitting a light ID indicating the recognized food/drink.

The receiver 200 obtains a light ID transmitted from the transmitter 100, by capturing an image of the transmitter 100 which has started heating, and transmits the light ID to a server. Next, the receiver 200 obtains, from the server, AR images, sound data, and recognition information associated with the light ID.

The AR images include an AR image P32*a* which is a video showing a virtual state inside the transmitter 100, an AR image P32*b* showing in detail the food/drink in the microwave, an AR image P32*c* which is a video showing a state in which steam rises from the transmitter 100, and an AR image P32*d* which is a video showing a remaining time until the food/drink is heated.

For example, if the food in the microwave is a pizza, the AR image P32*a* is a video showing that a turntable on which the pizza is placed is rotating, and a plurality of dwarves are dancing around the pizza. For example, if the food in the microwave is a pizza, the AR image P32*b* is an image showing the name of the item "pizza" and the ingredients of the pizza.

The receiver 200 recognizes, as a target region of the AR image P32*a*, a region showing the window portion of the transmitter 100 in the captured display image Ppre, based on the recognition information, and superimposes the AR image P32*a* on the target region. Furthermore, the receiver 200 recognizes, as a target region of the AR image P32*b*, a region above the region in which the transmitter 100 is shown in the captured display image Ppre, based on the recognition information, and superimposes the AR image P32*b* on the target region. Furthermore, the receiver 200 recognizes, as a target region of the AR image P32*c*, a region between the target region of the AR image P32*a* and the target region of the AR image P32*b*, in the captured display image Ppre, based on the recognition information, and superimposes the AR image P32*c* on the target region. Furthermore, the receiver 200 recognizes, as a target region of the AR image P32*d*, a region under the region in which the transmitter 100 is shown in the captured display image Ppre, based on the recognition information, and superimposes the AR image P32*d* on the target region.

Furthermore, the receiver 200 outputs sound generated when the food is heated, by playing sound data.

Since the receiver 200 displays the AR images P32*a* to P32*d* and further outputs sound as described above, the user's interest can be attracted to the receiver 200 until heating the food is completed. As a result, a burden on the user waiting for the completion of heating can be reduced. Furthermore, the AR image P32*c* showing steam or the like is displayed, and sound generated when food/drink is heated is output, thus giving an appetite stimulus to the user. The display of the AR image P32*d* can readily inform the user of the remaining time until heating the food/drink is completed. Accordingly, the user can take a look at, for instance, a book in the store away from the transmitter 100 which is a microwave. Furthermore, the receiver 200 can inform the user of the completion of heating when the remaining time is 0.

Note that in the above example, the AR image P32*a* is a video showing that a turntable on which a pizza is placed is rotating, and a plurality of dwarves are dancing around the pizza, yet may be an image, for example, virtually showing a temperature distribution inside the microwave. Furthermore, the AR image P32*b* shows the name of the item and ingredients of the food/drink in the microwave, yet may show nutritional information or calories. Alternatively, the AR image P32*b* may show a discount coupon.

As described above, with the display method according to this variation, a subject is a microwave which includes the lighting apparatus, and the lighting apparatus illuminates the inside of the microwave and transmits a light ID to the outside of the microwave by changing luminance. To obtain a captured display image Ppre and a decode target image Pdec, a captured display image Ppre and a decode target image Pdec are obtained by capturing an image of the microwave transmitting a light ID. When recognizing a target region, a window portion of the microwave shown in the captured display image Ppre is recognized as a target region. When displaying the captured display image Ppre, a captured display image Ppre on which an AR image showing a change in the state of the inside of the microwave is superimposed is displayed.

In this manner, the change in the state of the inside of the microwave is displayed as an AR image, and thus the user of the microwave can be readily informed of the state of the inside of the microwave.

FIG. 114 is a sequence diagram illustrating processing operation of a system which includes the receiver 200, a microwave, a relay server, and an electronic payment server. Note that the microwave includes a camera and a lighting apparatus similarly to the above, and transmits a light ID by changing luminance of the lighting apparatus. In other words, the microwave has a function as the transmitter 100.

First, the microwave recognizes food/drink inside the microwave, using a camera (step S481). Next, the microwave transmits a light ID indicating the recognized food/drink to the receiver 200 by changing luminance of the lighting apparatus.

The receiver 200 receives a light ID transmitted from the microwave by capturing an image of the microwave (step S483), and transmits the light ID and card information to the relay server. The card information is, for instance, credit card information stored in advance in the receiver 200, and necessary for electronic payment.

The relay server stores a table indicating, for each light ID, an AR image, recognition information, and item information associated with the light ID. The item information indicates, for instance, the price of food/drink indicated by the light ID. Upon receipt of the light ID and the card information transmitted from the receiver 200 (step S486), such a relay server finds item information associated with the light ID from the above table. The relay server transmits the item information and the card information to the electronic payment server (step S486). Upon receipt of the item information and the card information transmitted from the relay server (step S487), the electronic payment server processes an electronic payment, based on the item information and the card information (step S488). Upon completion of the processing of the electronic payment, the electronic payment server notifies the relay server of the completion (step S489).

When the relay server checks the notification of the completion of the payment from the electronic payment server (step S490), the relay server instructs a microwave to start heating food/drink (step S491). Furthermore, the relay server transmits, to the receiver 200, an AR image and recognition information associated with the light ID received in step S485 in the above-mentioned table (step S493).

Upon receipt of the instruction to start heating from the relay server, the microwave starts heating the food/drink in the microwave (step S492). Upon receipt of the AR image and the recognition information transmitted from the relay server, the receiver 200 recognizes a target region according to the recognition information from captured display images Ppre periodically obtained by image capturing started in step S483. The receiver 200 superimposes the AR image on the target region (step S494).

Accordingly, by putting food/drink in the microwave and capturing an image of the food/drink, the user of the receiver 200 can readily make the payment and start heating the food/drink. If the payments cannot be made, it is possible to prohibit the user from heating the food/drink. Furthermore, when heating is started, the AR image P32*a* and others illustrated in FIG. 113 can be displayed, thus notifying the user of the state of the inside of the microwave.

FIG. 115 is a sequence diagram illustrating processing operation of a system which includes a point-of-sale (POS) terminal, a server, the receiver 200, and a microwave. Note that the microwave includes a camera and a lighting apparatus, similarly to the above, and transmits a light ID by changing luminance of the lighting apparatus. In other words, the microwave has a function as the transmitter 100. The POS terminal is provided in a store such as a convenience store in which the microwave is also provided.

First, the user of the receiver 200 selects, at a store, food/drink which is an item, and goes to a spot where the POS terminal is provided to purchase the food/drink. A salesclerk of the store operates the POS terminal and receives money for the food/drink from the user. The POS terminal obtains operation input data and sales information through the operation of the POS terminal by the salesclerk (step S501). The sales information indicates the name and the price of the item, the number of item(s) sold, and when and where the item(s) is sold, for example. The operation input data indicates, for example, the user's gender and age, for instance, input by the salesclerk. The POS terminal transmits the operation input data and sales information to the server (step S502). The server receives the operation input data and the sales information transmitted from the POS terminal (step S503).

On the other hand, if the user of the receiver 200 pays the salesclerk for the food/drink, the user puts the food/drink in the microwave, in order to heat the food/drink. The microwave recognizes the food/drink inside the microwave, using the camera (step S504). Next, the microwave transmits a light ID indicating the recognized food/drink to the receiver 200 by changing luminance of the lighting apparatus (step S505). Then, the microwave starts heating the food/drink (step S507).

The receiver 200 receives a light ID transmitted from the microwave by capturing an image of the microwave (step S508), and transmits the light ID and terminal information to the server (step S509). The terminal information is stored in advance in the receiver 200, and indicates, for example, the type of a language (for example, English, Japanese, or the like) to be displayed on the display 201 of the receiver 200.

If the server accesses from the receiver 200, and receives the light ID and the terminal information transmitted from the receiver 200, the server determines whether the access from the receiver 200 is the initial access (step S510). The initial access is the access first made within a predetermined period since the processing of step S503 is performed. Here, if the server determines that the access from the receiver 200 is the initial access (Yes in step S510), the server stores the operation input data and the terminal information in association (step S511).

Note that although the server determines whether the access from the receiver 200 is the initial access, the server may determine whether the item indicated by the sales information matches food/drink indicated by the light ID. Furthermore, not only the server associates operation input data and terminal information, but also the server may store sales information also in association with the operation input data and the terminal information in step S511.

(Indoor Utilization)

FIG. 116 is a diagram illustrating a state of utilization of inside a building such as an underground shopping center.

The receiver 200 receives a light ID transmitted by the transmitter 100 configured as a lighting apparatus, and estimates the current position of the receiver 200. Furthermore, the receiver 200 guides the user by displaying the current position on a map, or displays information of neighboring stores.

By transmitting disaster information and refuge information from the transmitter 100 in case of the emergency, even if a communication line is busy, a communication base station has a trouble, or the receiver is at a spot where a radio wave from the communication base station cannot reach, the user can obtain such information. This is effective when the user fails to catch emergency broadcast, or is effective for a hearing-impaired person who cannot hear emergency broadcast.

The receiver 200 obtains a light ID transmitted from the transmitter 100 by image capturing, and further obtains, from the server, an AR image P33 and recognition information associated with the light ID. The receiver 200 recognizes a target region according to the recognition information from a captured display image Ppre obtained by the above image capturing, and superimposes an AR image P33 having the arrow shape on the target region. Accordingly, the receiver 200 can be used as the way finder described above (see FIG. 100).

(Display of Augmented Reality Object)

FIG. 117 is a diagram illustrating a state in which an augmented reality object is displayed.

A stage 2718*e* for augmented reality display is configured as the transmitter 100 described above, and transmits, through a light emission pattern and a position pattern of light emitting units 2718*a*, 2718*b*, 2718*c*, and 2718*d*, information on an augmented reality object, and a reference position at which an augmented reality object is to be displayed.

Based on the received information, the receiver 200 superimposes an augmented reality object 2718*f* which is an AR image on a captured image, and displays the image.

It should be noted that these general and specific aspects may be implemented using an apparatus, a system, a method, an integrated circuit, a computer program, a computer-readable recording medium such as a CD-ROM, or any combination of apparatuses, systems, methods, integrated circuits, computer programs, or recording media. A computer program for executing the method according to an embodiment may be stored in a recording medium of the server, and the method may be achieved in such a manner that the server delivers the program to a terminal in response to a request from the terminal.

[Variation 4 of Embodiment 4]

FIG. 118 is a diagram illustrating a configuration of a display system according to Variation 4 of Embodiment 4.

The display system 500 performs object recognition and augmented reality (mixed reality) display using a visible light signal.

A receiver 200 performs image capturing, receives a visible light signal, and extracts a feature quantity for object recognition or spatial recognition. To extract the feature quantity is to extract an image feature quantity from a captured image obtained by the image capturing. It is to be noted that the visible light signal may be a visible light neighbouring carrier signal such as infrared rays and ultraviolet rays. In addition, in this variation, the receiver 200 is configured as a recognition apparatus which recognizes an object for which an augmented reality image (namely, an AR image) is displayed. It should be noted that, in the example indicated in FIG. 118, the object is, for example, an AR object 501, or the like.

A transmitter 100 transmits information such as an ID etc. for identifying the transmitter 100 itself or the AR object 501 as a visible light signal or an electric wave signal. It should be noted that the ID is, for example, identification information such as the light ID described above, and that the AR object 501 is the target region described above. The visible light signal is a signal to be transmitted by changing the luminance of a light source included in the transmitter 100.

One of the receiver 200 and the server 300 stores the identification information which is transmitted by the transmitter 100 and the AR recognition information and AR display information in association with each other. Such association may be a one-to-one association or a one-to-many association. The AR recognition information is the recognition information as described above, and is for recognizing the AR object 501 for AR display. More specifically, the AR recognition information includes: an image feature quantity (a SIFT feature quantity, a SURF feature quantity, an ORB feature quantity, or the like) of the AR object 501, a color, a shape, a magnitude, a reflectance, a transmittance, a three-dimensional model, or the like. In addition, the AR recognition information may include identification information or a recognition algorithm for indicating what recognition method is used to perform recognition. The AR display information is for performing AR display, and includes: an image (namely, the AR image described above), a video, a sound, a three-dimensional model, motion data, display coordinates, a display size, a transmittance, etc. In addition, the AR display information may be the absolute values or modification rates of a color phase, a chrominance, and a brightness.

The transmitter 100 may also function as the server 300. In other words, the transmitter 100 may store the AR recognition information and the AR display information, and transmits the information by wired or wireless communication.

The receiver 200 captures an image using a camera (specifically, an image sensor). In addition, the receiver 200 receives a visible light signal, or an electric wave signal carried, for example, through WiFi or Bluetooth (registered trademark). In addition, the receiver may obtain position information obtainable by a GPS etc., information obtainable by a gyro sensor or an acceleration sensor, and sound information etc. from a microphone, and may recognize the AR object present nearby by integrating all or part of these pieces of information. Alternatively, the receiver 200 may recognize the AR object based on any one of the pieces of information without integrating these pieces of information.

FIG. 119 is a flowchart indicating processing operations performed by a display system according to Variation 4 of Embodiment 4.

The receiver 200 firstly determines whether or not any visible light signal has been already received (Step S521). In other words, the receiver 200 determines whether or not the visible light signal which indicates identification information has been obtained by capturing an image of the transmitter 100 which transmits the visible light signal by changing the luminance of the light source. At this time, the captured image of the transmitter 100 is obtained through the image capturing.

Here, in the case where the receiver 200 has determined that the visible light signal has been received (Y in Step S521), the receiver 200 identifies the AR object (the object, a reference point, spatial coordinates, or the position and the orientation of the receiver 200 in a space) based on the received information. Furthermore, the receiver 200 recognizes the relative position of the AR object. The relative position is represented by the distance from the receiver 200 to the AR object and the direction in which the receiver 200 and the AR object are present. For example, the receiver 200 identifies the AR object (namely, a target region which is a bright line pattern region) based on the magnitude and position of the bright line pattern region illustrated in FIG. 50, and recognizes the relative position of the AR object.

Subsequently, the receiver 200 transmits the information such as the ID etc. included in the visible light signal and the relative position to the server 300, and obtains the AR recognition information and the AR display information registered in the server 300 by using the information and the relative position as keys (Step S522). At this time, the receiver 200 may obtain not only the information of the recognized AR object but also information (namely, the AR recognition information and AR display information) of another AR object present near the AR object. In this way, when an image of the other AR object present near the AR object is captured by the receiver 200, the receiver 200 can recognize the nearby AR object quickly and precisely. For example, the other AR object that is the nearby AR object is different from the AR object which has been recognized first.

It should be noted that the receiver 200 may obtain these pieces of information from a database included in the receiver 200 instead of accessing the serve 300. The receiver 200 may discard each of these pieces of information after a certain time is elapsed from when the piece of information was obtained or after particular processing (such as an OFF of a display screen, a press of a button, an end or a stop of an application, display of an AR image, recognition of another AR object, or the like). Alternatively, the receiver 200 may lower the reliability of each of the pieces of information obtained every time a certain time is elapsed from when the piece of information was obtained, and use one or more pieces of information having a high reliability out of the pieces of information.

Here, based on the relative positions with respect to the respective AR objects, the receiver 200 may prioritize and obtain the AR recognition information of an effective AR object in the relation of the relative positions. For example, in Step S521, the receiver 200 captures images of the plurality of transmitters 100 to obtain a plurality of visible light signals (namely, pieces of identification information), and in Step S522, obtains a plurality of pieces of AR recognition information (namely, image feature quantities) respectively corresponding to the plurality of visible light signals. At this time, in Step S522, the receiver 200 selects the image feature quantity of the AR object which is closest from the receiver 200 which captures images of the transmitters 100 out of the plurality of AR objects. In other words, the selected image feature quantity is used to identify the single AR object (namely, a first object) identified based on the visible light signal. In this way, even when the plurality of image feature quantities are obtained, the appropriate image feature quantity can be used to identify the first object.

In the opposite case where the receiver 200 has determined that no visible light signal has been received (N in Step S521), the receiver 200 determines whether or not AR recognition information has already been obtained (Step S523). When the receiver 200 has determined that no AR recognition information has been obtained (N in Step S523), the receiver 200 recognizes an AR object candidate, by performing image processing without based on identification information such as an ID etc. indicated by a visible light signal, or based on other information such as position information and electric wave information (Step S524). This processing may be performed only by the receiver 200. Alternatively, the receiver 200 may transmit a captured image, or information of the captured image such as an image feature quantity of the image to the server 300, and the server 300 may recognize the AR object candidate. As a result, the receiver 200 obtains the AR recognition information and the AR display information corresponding to the recognized candidate from the server 300 or a database of the receiver 200 itself.

After Step S522, the receiver 200 determines whether or not the AR object has been detected using another method in which no identification information such as an ID etc. indicated by a visible light signal is used, for example, using image recognition (Step S525). In short, the receiver 200 determines whether or not the AR object has been recognized using such a plurality of methods. More specifically, the receiver 200 identifies the AR object (namely, the first object) from the captured image, using the image feature quantity obtained based on the identification information indicated by the visible light signal. Subsequently, the receiver 200 determines whether or not the AR object (namely, the second object) has been identified in the captured image by performing image processing without using such identification information.

Here, when the receiver 200 has determined that the AR object has been recognized using the plurality of methods (Y in Step S525), the receiver 200 prioritizes the recognition result by the visible light signal. In other words, the receiver 200 checks whether or not the AR objects recognized using the respective methods match with each other. When the AR objects do not match with each other, the receiver 200 determines the single AR object on which an AR image is superimposed in the captured image to be the AR object recognized by the visible light signal out of the AR objects (Step S526). In other words, when the first object is different from the second object, the receiver 200 recognizes the first object as the object on which the AR image is displayed by prioritizing the first object. It should be noted that the object on which the AR image is displayed is an object on which the AR image is superimposed.

Alternatively, the receiver 200 may prioritize the method having a higher rank of priority, based on the priority order of the respective methods. In other words, the receiver 200 determines the single AR object on which the AR image is superimposed in the captured image to be the AR object recognized using, for example, the method having the highest rank of priority out of the AR objects recognized using the respective methods. Alternatively, the receiver 200 may determine the single AR object on which the AR image is superimposed in the captured image based on a decision by a majority or a decision by a majority with priority. When the processing reverses the previous recognition result, the receiver 200 performs error processing.

Next, based on the obtained AR recognition information, the receiver 200 recognizes the states of the AR object in the captured image (specifically, an absolute position, a relative position from the receiver 200, a magnitude, an angle, a lighting state, occlusion, etc.) (Step S527). Subsequently, the receiver 200 displays the captured image on which the AR display information (namely, the AR image) is superimposed according to the recognition result (Step S528). In short, the receiver 200 superimposes the AR display information onto the AR object recognized in the captured image. Alternatively, the receiver 200 displays only the AR display information.

In this way, it is possible to perform recognition or detection which is difficult only by performing image processing. The difficult recognition or detection is, for example, recognition of an AR object whose images are similar (because, for example, only text is different), detection of an AR object having less pattern, detection of an AR object having a high reflectance or transmittance, detection of an AR object (for example, an animal) having a changeable shape or pattern, or detection of an AR object at a wide angle (in various directions). In short, according to this variation, it is possible to perform these kinds of recognition and display of the AR objects. Image processing without using any visible light signal takes longer time to perform neighborhood search of image feature quantities as the number of AR objects desired to be recognized increases, which increases time required for recognition processing, and decreases a recognition rate. However, this variation is not or is extremely less affected by such increase in recognition time and decrease in recognition rate due to increase in the number of objects to be recognized, and thus makes it possible to perform efficient recognition of the AR objects. In addition, the use of the relative positions of the AR objects makes it possible to perform efficient recognition of the AR objects. For example, it is possible to omit processing to obtain independency from the magnitude of an AR object, or to use a feature that depends on the magnitude of the AR object when calculating an image feature quantity of the AR object by using an approximate distance to the AR object. Although there has conventionally been a need to evaluate image feature quantities of an image of an AR object at a number of angles, it is only necessary to store and calculate the image feature quantity corresponding to an angle of the AR object, which makes it possible to increase a calculation speed or a memory efficiency.

[Summary of Variation 4 of Embodiment 4]

FIG. 120 is a flowchart illustrating a recognition method according to an aspect of the present disclosure.

The display method according to the aspect of the present disclosure is a recognition method for recognizing an object on which an augmented reality image (an AR image) is displayed. The recognition method includes Steps S531 to S535.

In Step S531, a receiver 200 captures an image of a transmitter 100 which transmits a visible light signal by changing the luminance of a light source to obtain identification information. Identification information is, for example, a light ID. In Step S532, the receiver 200 transmits the identification information to a server 300, and obtains an image feature quantity corresponding to the identification information from the server 300. The image feature quantity is represented as AR recognition information or recognition information.

In Step S533, the receiver 200 identifies a first object in a captured image of the transmitter 100, using the image feature quantity. In Step S534, the receiver 200 identifies a second object in the captured image of the transmitter 100 by performing image processing without using identification information (namely, a light ID).

In Step S535, when the first object identified in Step S533 is different from the second object identified in Step S534, the receiver 200 recognizes the first object as an object for which an augmented reality image is displayed by prioritizing the first object.

For example, the augmented reality image, the captured image, and the object correspond to the AR image, the captured display image, and the target region in Embodiment 4 and the respective variations thereof.

In this way, as illustrated in FIG. 119, the first object identified based on the identification information indicated by the visible light signal and the second object identified by performing image processing without using the identification information are different from each other, the first object is recognized as the object for which the augmented reality image is displayed by prioritizing the first object. Accordingly, it is possible to appropriately recognize, in the captured image, the target for which the augmented reality image is displayed.

In addition, the image feature quantity may include an image feature quantity of a third object which is located near the first target, in addition to the image feature quantity of the first object.

In this way, as indicated in Step S522 of FIG. 119, since not only the image feature quantity of the first target but also the image feature quantity of the third object is obtained, it is possible to identify or recognize the third object quickly when the third object appears in the captured image.

In addition, the receiver 200 may obtain a plurality of pieces of identification information by capturing images of a plurality of transmitters in Step S531, and may obtain a plurality of image feature quantities corresponding to the plurality of pieces of identification information in Step S532. In this case, in Step S533, the receiver 200 may identify the first object using the image feature quantity of the object which is closest from the receiver 200 which captures the images of the plurality of transmitters out of the plurality of objects.

In this way, as indicated in Steps S522 of FIG. 119, even when the plurality of image feature quantities are obtained, the appropriate image feature quantity can be used to identify the first object.

It should be noted that the recognition apparatus according to this variation is, for example, an apparatus included in the receiver 200 as described above, and includes a processor and a recording medium. The recording medium has a program stored thereon for causing the processor to execute the recognition method indicated in FIG. 120. In addition, the program according to this variation is a program for causing the computer to execute the recognition method indicated in FIG. 120.

Embodiment 5

FIG. 121 is a diagram indicating examples of operation modes of visible light signals according to the present embodiment.

As indicated in FIG. 121, there are two operation modes in a physical layer (PHY) for a visible light signal. A first operation mode is a mode in which packet pulse width modulation (PWM) is performed, and a second operation mode is a mode in which packet pulse-Position Modulation (PPM) is performed. The transmitter according to any of the above embodiments and variations thereof modulates a transmission target signal (a signal to be transmitted) according to any one of the operation modes, thereby generating and transmitting a visible light signal.

In the operation mode for the packet PWM, Run-Length Limited (RLL) encoding is not performed, an optical clock rate is 100 kHz, forward error correction (FEC) data is repeatedly encoded, and a typical data rate is 5.5 kbps.

In the packet PWM, a pulse width is modulated, and a pulse is represented by two brightness states. The two brightness states are a bright state (Bright or High) and a dark state (Dark or Low), and are typically ON and OFF of light. A chunk of a signal in the physical layer called a packet (also referred to as a PHY packet) corresponds to a medium access control (MAC) frame. The transmitter is capable of transmitting a PHY packet repeatedly and transmitting a plurality of sets of PHY packets without according to any particular order.

It is to be noted that the packet PWM is used to generate a visible light signal to be transmitted from a normal transmitter.

In the operation mode for the packet PPM, RLL encoding is not performed, an optical clock rate is 100 kHz, forward error correction (FEC) data is repeatedly encoded, and a typical data rate is 8 kbps.

In the packet PPM, the position of a pulse having a short time length is modulated. In other words, this pulse is the bright pulse out of the bright pulse (High) and the dark pulse (Low), and the position of the pulse is modulated. In addition, the position of the pulse is indicated by intervals between a pulse and a next pulse.

The packet PPM enables deep dimming. The format, waveform, and characteristics in the packet PPM which have not been explained in any of the embodiments and the variations thereof are the same as in the packet PWM. It is to be noted that the packet PPM is used to generate a visible light signal to be transmitted from the transmitter having a light source which emits extremely bright light.

In addition, in each of the packet PWM and the packet PPM, dimming in the physical layer of the visible light signal is controlled by an average luminance of an optional field.

FIG. 122A is a flowchart indicating a method for generating a visible light signal according to Embodiment 5. The method for generating a visible light signal is a method for generating a visible light signal transmitted by changing the luminance of the light source included in the transmitter, and includes Steps SE1 to SE3.

In Step SE1, a preamble which is data in which first and second luminance values that are different values alternately appear along the time axis is generated.

In Step SE2, a first payload is generated by determining, in accordance with the method according to the transmission target signal, an interval between when a first luminance value appears and when a next first luminance value appears in data in which first and second luminance values appear alternately along a time axis.

In Step SE3, a visible light signal is generated by combining the preamble and the first payload.

FIG. 122B is a block diagram illustrating a configuration of a signal generating apparatus according to Embodiment 5. The signal generating apparatus E10 is a signal generating apparatus which generates a visible light signal to be transmitted by changing the luminance of a light source included in the transmitter, and includes a preamble generation unit E11, a payload generation unit E12, and a combining unit E13. In addition, the signal generating apparatus E10 executes processing in a flowchart indicated in FIG. 122A.

In other words, the preamble generation unit E11 generates a preamble which is data in which first and second luminance values that are different values appear alternately along a time axis.

The payload generation unit E12 generates a first payload by determining, in accordance with the method according to the transmission target signal, an interval between when a first luminance value appears and when a next first luminance value appears in data in which first and second luminance values appear alternately along the time axis.

A combining unit E13 generates a visible light signal by combining the preamble and the first payload.

For example, the first and second luminance values are Bright (High) and Dark (Low) and the first payload is a PHY payload. By transmitting the visible light signal thus generated, the number of received packets can be increased, and also reliability can be increased. As a result, various kinds of apparatuses can communicate with one another.

For example, the time length of the first luminance value in each of the preamble and the first payload is less than or equal to 10μ seconds.

In this way, it is possible to reduce an average luminance of the light source while performing visible light communication.

In addition, the preamble is a header for the first payload, and the time length of the header includes three intervals between when a first luminance value appears and when a next first luminance value appears. Here, each of the three intervals is 160μ seconds. In other words, a pattern of intervals between the pulses included in the header (SHR) in the packet PPM mode 1 is defined. It is to be noted that each of the pulses is, for example, a pulse having a first luminance value.

In addition, the preamble is a header for the first payload, and the time length of the header includes three intervals between when a first luminance value appears and when a next first luminance value appears. Here, the first interval among the three intervals is 160μ seconds, the second interval is 180μ seconds, and the third interval is 160μ seconds. In other words, a pattern of intervals between the pulses included in the header (SHR) in the packet PPM mode 2 is defined.

In addition, the preamble is a header for the first payload, and the time length of the header includes three intervals between when a first luminance value appears and when a next first luminance value appears. Here, the first interval among the three intervals is 80μ seconds, the second interval is 90μ seconds, and the third interval is 80μ seconds. In other words, a pattern of intervals between the pulses included in the header (SHR) in the packet PPM mode 3 is defined.

In this way, since the header patterns in the respective packet PPM modes 1, 2, and 3 are defined, the receiver can properly receive the first payload in the visible light signal.

In addition, the transmission target signal includes 6 bits from a first bit $x_0$ to a sixth bit $x_5$, and the time interval in the first payload includes two intervals between when a first luminance value appears and when a next first luminance value appears. Here, when a parameter $y_k$ (k is one of 0 and 1) is represented according to $y_k=x_{3k}+X_{3k+1}\times2+x_{3k+2}\times4$, in the generation of the first payload, each of the two intervals in the first payload is determined according to, as the above-described expression according the method, interval $P_k=180+30\times y_k$ [μ seconds]. In other words, in the packet PPM mode 1, the transmission target signal is modulated as the interval between the pulses included in the first payload (PHY payload).

In addition, the transmission target signal includes 12 bits from a first bit $x_0$ to a twelfth bit $x_{11}$, and the time interval in the first payload includes four intervals between when a first luminance value appears and when a next first luminance value appears. Here, when a parameter $y_k$ (k is one of 0, 1, 2 and 3) is represented according to $y_k=x_{3k}+x_{3k+1}\times2+x_{3k+2}\times4$, in the generation of the first payload, each of the four intervals in the first payload is determined according to, as the above-described method, interval $P_k=180+30\times y_k$ [μ seconds]. In other words, in the packet PPM mode 2, the transmission target signal is modulated as the interval between the pulses included in the first payload (PHY payload).

In addition, the transmission target signal includes 3n (n is an integer greater than or equal to 2) bits from a first bit $x_0$ to a 3n-th bit $x_{3n-1}$, and the time length of the first payload includes n intervals between when a first luminance value appears and when a next first luminance value appears. Here, when a parameter $y_k$ (k is an integer in a range from 0 to (n−1)) is represented according to $y_k=x_{3k}+x_{3k+1}\times2+x_{3k+2}\times4$, in the generation of the first payload, each of the n intervals in the first payload is determined according to, as the above-described method, interval $P_k=100+20\times y_k$ [μ seconds]. In other words, in the packet PWM mode 3, the transmission target signal is modulated as the interval between the pulses included in the first payload (PHY payload).

In this way, since the transmission target signal is modulated as intervals between the pulses in each of the packet PPM modes 1, 2, and 3, the receiver can properly demodulate the visible light signal to the transmission target signal, based on the intervals.

In addition, the method for generating a visible light signal may further involve generating a footer for the first payload, and combine the footer next to the first payload in the generation of the visible light signal. In other words, the footer (SFT) is transmitted next to the first payload (PHY payload) in each of the packet PWM mode 3 and the packet PPM mode 3. In this way, it is possible to clearly identify the end of the first payload based on the footer, which makes it possible to perform visible light communication efficiently.

When no footer is transmitted in the generation of a visible light signal, a header for a signal next to the transmission target signal may be combined instead of a footer. In other words, in each of the packet PWM mode 3 and the packet PPM mode 3, a header (SHR) for the next first payload is transmitted next to the first payload (PHY payload) instead of the footer (SFT). In this way, it is possible to clearly identify the end of the first payload based on the header for the next first payload, and also to perform visible light communication more efficiently since no footer is transmitted.

It should be noted that in the embodiments and the variations described above, each of the elements may be constituted by dedicated hardware or may be obtained by executing a software program suitable for the element. Each element may be obtained by a program execution unit such as a CPU or a processor reading and executing a software program recorded on a recording medium such as a hard disk or a semiconductor memory. For example, the program causes a computer to execute the method for generating a visible light signal indicated by a flowchart in FIG. 122A.

The above is a description of the method for generating a visible light signal according to one or more aspects, based on the embodiments and the variations, yet the present disclosure is not limited to such embodiments. The present disclosure may also include embodiments as a result of adding, to the embodiments, various modifications that may be conceived by those skilled in the art, and embodiments obtained by combining constituent elements in the embodiments without departing from the spirit of the present disclosure.

Embodiment 6

This embodiment describes a decoding method and an encoding method for a visible light signal, etc.

FIG. 123 is a diagram indicating formats of MAC frames in MPM.

The format of a medium access control (MAC) frame in mirror pulse modulation (MPM) includes a medium access control header (MHR) and a medium access control service-data unit (MSDU). An MHR field includes a sequence number sub-field. An MSDU includes a frame payload, and has a variable length. The bit length of the medium access control protocol-data unit (MPDU) including the MHR and the MSDU is set as macMpmMpduLength.

It is to be noted that, the MPM is a modulation method according to Embodiment 5, and is for example, a method for modulating information or a signal to be transmitted as illustrated in FIG. 121.

FIG. 124 is a flowchart indicating processing operations performed by an encoding apparatus which generates MAC frames in MPM. More specifically, FIG. 124 is a diagram indicating how to determine the bit length of a sequence number sub-field. It is to be noted that the encoding apparatus is included in, for example, the above-described transmitter or transmitting apparatus which transmits a visible light signal.

The sequence number sub-field includes a frame sequence number (also referred to as a sequence number). The bit length of the sequence number sub-field is set as macMpmSnLength. When the bit length of a sequence number sub-field is set to be variable, the leading bit in the sequence number sub-field is used as a last frame flag. In other words, in this case, the sequence number sub-field includes the last frame flag and a bit string indicating the sequence number. The last frame flag is set to 1 for the last flag, and is set to 0 for the other flags. In other words, the last frame flag indicates whether or not a current frame to be processed is a last frame. It is to be noted that the last frame flag corresponds to a stop bit as described above. In addition, the sequence number corresponds to the address as described above.

First, an encoding apparatus determines whether or not an SN has been set to be variable (Step S101*a*). It is to be noted that the SN is the bit length of the sequence number sub-field. In other words, the encoding apparatus determines whether or not macMpmSnLength indicates 0xf. An SN has a variable length when macMpmSnLength indicates 0xf, and an SN has a fixed length when macMpmSnLength indicates something other than 0xf. When determining that an SN has not set to be variable, that is, the SN has set to be fixed (N in Step S101*a*), the encoding apparatus determines the SN to be a value indicated by macMpmSnLength (Step S102*a*). At this time, the encoding apparatus does not use the last frame flag (that is, LFF).

In the opposite case, when determining that the SN is set to be variable (Y in Step S101*a*), the encoding apparatus determines whether or not a current frame to be processed is a last frame (Step S103*a*). Here, when determining that the current frame to be processed is the last frame (Y in Step S103*a*), the encoding apparatus determines the SN to be five bits (Step S104*a*). At this time, the encoding apparatus determines the last frame flag indicating 1 as the leading bit in the sequence number sub-field.

In addition, when determining that the current frame to be processed is not the last frame (N in Step S103*a*), the encoding apparatus determines which one out of 1 to 15 is the value of the sequence number of the last frame (Step S105*a*). It is to be noted that the sequence number is an integer assigned to each frame in an ascending order starting with 0. In addition, when the answer is N in Step S103*a*, the number of frames is 2 or greater. Accordingly, in this case, the value of the sequence number of the last frame can be any one of 1 to 15 excluding 0.

When determining that the value of the sequence number of the last frame is 1 in Step S105*a*, the encoding apparatus determines the SN to be one bit (Step S106*a*). At this time, the encoding apparatus determines, to be 0, the value of the last frame flag that is the leading bit in the sequence number sub-field.

For example, when the value of the sequence number of the last frame is 1, the sequence number sub-field of the last frame is represented as (1, 1) including the last frame flag (1) and a sequence number value (1). At this time, the encoding apparatus determines the bit length of the sequence number sub-field of the current frame to be processed to be one bit. In other words, the encoding apparatus determines the sequence number sub-field including only the last frame flag (0).

When determining that the value of the sequence number of the last frame is 2 in Step S105*a*, the encoding apparatus determines the SN to be two bits (Step S107*a*). Also at this time, the encoding apparatus determines the value of the last frame flag to be 0.

For example, when the value of the sequence number of the last frame is 2, the sequence number sub-field of the last frame is represented as (1, 0, 1) including the last frame flag (1) and a sequence number value (2). It is to be noted that the sequence number is indicated as a bit string in which the leftmost bit is the least significant bit (LSB) and the rightmost bit is the most significant bit (MSB). Accordingly, the sequence number value (2) is denoted as a bit string (0, 1). In this way, when the value of the sequence number of the last frame is 2, the encoding apparatus determines, to be two bits, the bit length of the sequence number sub-field of the current frame to be processed. In other words, the encoding apparatus determines the sequence number sub-field including the last frame flag (0), and one of a bit (0) and (1) indicating the sequence number.

When determining that the value of the sequence number of the last frame is 3 or 4 in Step S105*a*, the encoding apparatus determines the SN to be three bits (Step S108*a*). At this time, the encoding apparatus determines the value of the last frame flag to be 0.

When determining that the value of the sequence number of the last frame is an integer in a range from 5 to 8 in Step S105*a*, the encoding apparatus determines the SN to be four bits (Step S109*a*). At this time, the encoding apparatus determines the value of the last frame flag to be 0.

When determining that the value of the sequence number of the last frame is an integer in a range from 9 to 15 in Step S105*a*, the encoding apparatus determines the SN to be 5 bits (Step S110*a*). At this time, the encoding apparatus determines the value of the last frame flag to be 0.

FIG. 125 is a flowchart indicating processing operations performed by a decoding apparatus which decodes MAC frames in MPM. More specifically, FIG. 125 is a diagram indicating how to determine the bit length of a sequence number sub-field. It is to be noted that the decoding apparatus is included in, for example, the above-described receiver or receiving apparatus which receives a visible light signal.

Here, the decoding apparatus determines whether or not an SN is set to be variable (Step S201*a*). In other words, the decoding apparatus determines whether or not macMpmSnLength indicates 0xf. When determining that an SN is not set to be variable, that is, the SN is set to be fixed (N in Step S201*a*), the decoding apparatus determines the SN to be a value indicated by macMpmSnLength (Step S202*a*). At this time, the decoding apparatus does not use the last frame flag (that is, LFF).

In the opposite case, when determining that the SN is set to be variable (Y in Step S201*a*), the decoding apparatus determines whether the value of the last frame flag of a frame to be decoded is 1 or 0 (Step S203*a*). In other words, the decoding apparatus determines whether or not the current frame to be decoded is the last frame. Here, when determining that the value of the last frame flag is 1 (1 in Step S203*a*), the decoding apparatus determines the SN to be five bits (Step S204*a*).

In the opposite case, when determining that the value of the last frame flag is 0 (0 in Step S203*a*), the decoding apparatus determines whether which one of 1 to 15 is the value indicated by a bit string which lasts from the second bit to the fifth bit in the sequence number sub-field of the last frame (Step S205*a*). The last frame is a frame which includes the last frame flag indicating 1, and was generated from the same source as the source of the current frame to be decoded. In addition, each source is identified based on a position in a captured image. It is to be noted that the source is divided into, for example, a plurality of frames (corresponding to packets). In other words, the last frame is the last frame in the plurality of frames generated by dividing the single source. In addition, the value indicated as a bit string that lasts from the second bit to the fifth bit in the sequence number sub-field is the value of a sequence number.

When determining that the value indicated by the bit string is 1 in Step S205*a*, the decoding apparatus determines the SN to be 1 bit (Step S206*a*). For example, when the sequence number sub-field of the last frame is two bits of (1, 1), the last frame flag is 1, and the sequence number of the last frame, that is, the value indicated by the bit string is 1. At this time, the decoding apparatus determines the bit length of the sequence number sub-field of the current frame to be decoded to be one bit. In other words, the decoding apparatus determines the sequence number sub-field of the current frame to be decoded to be (0).

When determining that the value indicated by the bit string is 2 in Step S205*a*, the decoding apparatus determines the SN to be two bits (Step S207*a*). For example, when the sequence number sub-field of the last frame is three bits of (1, 0, 1), the last frame flag is 1, and the sequence number of the last frame, that is, the value indicated by the bit string (0, 1) is 2. It is to be noted that, in the bit string, the leftmost bit is the least significant bit (LSB) and the rightmost bit is the most significant bit (MSB). At this time, the decoding apparatus determines the bit length of the sequence number sub-field of the current frame to be decoded to be two bits. In other words, the decoding apparatus determines the sequence number sub-field of the current frame to be decoded to be one of (0, 0) and (0, 1).

When determining that the value indicated by the bit string is 3 or 4 in Step S205*a*, the decoding apparatus determines the SN to be three bits (Step S208*a*).

When determining that the value indicated by the bit string is an integer in a range from 5 to 8 in Step S205*a*, the decoding apparatus determines the SN to be four bits (Step S209*a*).

When determining that the value indicated by the bit string is an integer in a range from 9 to 15 in Step S205*a*, the decoding apparatus determines the SN to be five bits (Step S210*a*).

FIG. 126 is a diagram indicating PIB attributes in MAC.

Examples of physical-layer personal-area-network information base (PIB) attributes in the MAC include macMpmSnLength and macMpmMpduLength. The attribute macMpmSnLength is an integer in a range from 0x0 to 0xf and indicates the bit length of a sequence number sub-field. More specifically, macMpmSnLength, when it is an integer in a range from 0x0 to 0xe, indicates the integer value as a fixed bit length of the sequence number sub-field. In addition, macMpmSnLength, when it is 0xf, indicates that the bit length of the sequence number sub-field is variable.

In addition, macMpmMpduLength is an integer in a range from 0x00 to 0xff and indicates the bit length of an MPDU.

FIG. 127 is a diagram for explaining a dimming method in MPM.

MPM provides dimming functions. Examples of MPM dimming methods include (a) an analogue dimming method, (b) a PWM dimming method, (c) a VPPM dimming method, and (d) a field insertion dimming method as illustrated in FIG. 127.

In the analogue dimming method, a visible light signal is transmitted by changing the luminance of the light source as indicated in (a2) for example. Here, when the visible light signal is darken, the luminance of the entire visible light signal is decreased as indicated in (a1) for example. In the opposite case where the visible light signal is lighten, the luminance of the entire visible light signal is increased as indicated in (a3) for example.

In the PWM dimming method, a visible light signal is transmitted by changing the luminance of the light source as indicated in (b2) for example. Here, when the visible light signal is darken, the luminance is decreased only during extremely short time in a period in which light having a high luminance indicated in (b2) is output as indicated by (b1) for example. In the opposite case where the visible light signal is lighten, the luminance is increased only during extremely short time in a period in which light having a low luminance indicated in (b2) is output as indicated by (b3) for example. It is to be noted that the above-described extremely short time must be below one-third of the original pulse width and 50μ seconds.

In the VPPM dimming method, a visible light signal is transmitted by changing the luminance of the light source as indicated in (c2) for example. Here, when the visible light signal is darken, a timing for a luminance rise is moved up as indicated in (c1). In the opposite case, when the visible light signal is lighten, a timing for a luminance fall is delayed as indicated in (c3). It is to be noted that the VPPM dimming method can be used only for the PPM mode of a PHY in MPM.

In the field insertion dimming method, a visible light signal including a plurality of physical-layer data units (PPDUs) is transmitted as indicated in (d2). Here, when the visible light signal is darken, a dimming field whose luminance is lower than the luminance of the PPDUs is inserted between the PPDUs as indicated in (d1) for example. In the opposite case where the visible light signal is lighten, a dimming field whose luminance is higher than the luminance of the PPDUs is inserted between the PPDUs as indicated in (d3) for example.

FIG. 128 is a diagram indicating PIB attributes in a PHY.

Examples of PIB attributes in the PHY includes phyMpmMode, phyMpmPlcpHeaderMode, phyMpmPlcpCenterMode, phyMpmSymbolSize, phyMpmOddSymbolBit, phyMpmEvenSymbolBit, phyMpmSymbolOffset, and phyMpmSymbolUnit.

The attribute phyMpmMode is one of 0 and 1, and indicates a PHY mode in MPM. More specifically, phyMpmMode having a value of 0 indicates that the PHY mode is a PWM mode, and phyMpmMode having a value of 1 indicates that the PHY mode is a PPM mode.

The attribute phyMpmPlcpHeaderMode is an integer value in a range from 0x0 to 0xf, and indicates a physical layer conversion protocol (PLCP) header sub-field mode and a PLCP footer sub-field mode.

The attribute phyMpmPlcpCenterMode is an integer value in a range from 0x0 to 0xf, and indicates a PLCP center sub-field mode.

The attribute phyMpmSymbolSize is an integer value in a range from 0x0 to 0xf, and indicates the number of symbols in a payload sub-field. More specifically, phyMpmSymbolSize having a value of 0x0 indicates that the number of symbols is variable, and is referred to as N.

The attribute phyMpmOddSymbolBit is an integer value in a range from 0x0 to 0xf, indicates the bit length included in each of odd symbols in the payload sub-field, and referred to as $M_{odd}$.

The attribute phyMpmEvenSymbolBit is an integer value in a range from 0x0 to 0xf, indicates the bit length included in each of even symbols in the payload sub-field, and referred to as $M_{even}$.

The attribute phyMpmSymbolOffset is an integer value in a range from 0x00 to 0xff, indicates an offset value of a symbol in the payload sub-field, and referred to as $W_1$.

The attribute phyMpmSymbolUnit is an integer value in a range from 0x00 to 0xff, indicates a unit value of a symbol in the payload sub-field, and referred to as $W_2$.

FIG. 129 is a diagram for explaining MPM. MPM is composed only of a PHY service data unit (PSDU) field. In addition, the PSDU field includes an MPDU which is converted according to a PLCP in MPM.

As illustrated in FIG. 129, the PLCP of MPM converts the MPDU into five sub-fields. The five sub-fields are a PLCP header sub-field, a front payload sub-field, a PLCP center sub-field, a back payload sub-field, and a PLCP footer sub-field. The PHY mode in MPM is set as phyMpmMode.

As illustrated in FIG. 129, the PLCP in MPM includes a bit re-arrangement unit 301*a*, a copying unit 302*a*, a front converting unit 303*a*, and a back converting unit 304*a*.

Here, $(x_0, x_1, x_2, \ldots)$ denote respective bits included in the MPDU; $L_{SN}$ denotes a bit length of a sequence number sub-field, and N denotes the number of symbols in each payload sub-field. The bit re-arrangement unit 301*a* re-arranges $(x_0, x_1, x_2, \ldots)$ into $(y_0, y_1, y_2, \ldots)$ according to the following Expression 1.

[Math. 1]

$$y_i = \begin{cases} x_{i+L_{SN}} & (i < N) \\ x_{i-N} & (N \le i < N + L_{SN}) \\ x_i & (N + L_{SN} \le i) \end{cases} \quad \text{(Expression 1)}$$

This re-arrangement moves each bit included in the leading sequence number sub-field in the MPDU backward by $L_{SN}$. The copying unit 302*a* copies the MPDU after the bit re-arrangement.

Each of the front payload sub-field and the back payload sub-field includes N symbols. Here, $M_{odd}$ denotes a bit length included in an odd-order symbol, $M_{even}$ denotes a bit length included in an even-order symbol, $W_1$ denotes a symbol value offset (above-described offset value), and $W_2$ is a symbol value unit (above-described unit value). It is to be note that N, $M_{odd}$, $M_{even}$, $W_1$, and $W_2$ are set by PIBs in a PHY indicated in FIG. 128.

The front converting unit 303*a* and the back converting unit 304*a* convert the payload bits $(y_0, y_1, y_2, \ldots)$ of the re-arranged MPDU to $Z_i$ according to the following Expressions 2 to 5.

[Math. 2]

$$z_i = \sum_{m=0}^{M^- -1} y_{Nm+i} \times 2^m + \sum_{m=M^- -1}^{M_i -1} y_k \times 2^m \quad \text{(Expression 2)}$$

[Math. 3]

$$M^- = \min(M_{odd}, M_{even}) \quad \text{(Expression 3)}$$

$$M_i = \begin{cases} M_{odd} & (i \in \text{odd number}) \\ M_{even} & (i \in \text{even number}) \end{cases} \quad \text{(Expression 4)}$$

$$k = (M^- - 1)N + \left\lfloor \frac{(m - M^-)N + i}{2} \right\rfloor \quad \text{(Expression 5)}$$

The front converting unit 303*a* calculates i-th symbol (that is a symbol value) of the front payload sub-field using $z_i$ according to the following Expression 6.

[Math. 4]

$$W_1 + W_2 \times (2^m - 1 - z_i) \quad \text{(Expression 6)}$$

The back converting unit 304*a* calculates i-th symbol (that is a symbol value) of the back payload sub-field using $z_i$ according to the following Expression 7.

[Math. 5]

$$W_1 + W_2 \times z_i \quad \text{(Expression 7)}$$

FIG. 130 is a diagram indicating a PLCP header sub-field.

As indicated in FIG. 130, the PLCP header sub-field includes four symbols in a PWM mode, and includes three symbols in a PPM mode.

FIG. 131 is a diagram illustrating a PLCP center sub-field.

As indicated in FIG. 131, the PLCP center sub-field includes four symbols in a PWM mode, and includes three symbols in a PPM mode.

FIG. 132 is a diagram indicating a PLCP footer sub-field.

As indicated in FIG. 132, the PLCP footer sub-field includes four symbols in a PWM mode, and includes three symbols in a PPM mode.

FIG. 133 is a diagram illustrating a waveform in a PWM mode in a PHY in MPM.

In the PWM mode, the symbol needs to be transmitted in any of the two light intensity states, that is, one of a bright state and a dark state. In the PWM mode in the PHY in the MPM, the symbol value corresponds to continuous time based on microsecond units. For example, as illustrated in FIG. 133, the first symbol value corresponds to continuous time of a first bright state, and the second symbol value corresponds to continuous time of a dark state next to the first bright state. Although the initial state of each sub-field is a bright state in the example illustrated in FIG. 133, it is to be noted that the initial state of each sub-field may be a dark state.

FIG. 134 is a diagram illustrating a waveform in a PPM mode in a PHY in MPM.

In the PPM mode, as illustrated in FIG. 134, the symbol value indicates, as a microsecond unit, time from the start of a bright state to the start of the next bright state. Each bright state time needs to be shorter than 90% of a symbol value.

In any of the both modes, the transmitter can transmit only part of a plurality of symbols. It is to be noted that the transmitter must transmit all of the symbols in a PLCP center sub-field and at least N symbols. Each of the at least N symbols is a symbol included in any of the front payload sub-field and the back payload sub-field.

[Summary of Embodiment 6]

FIG. 135 is a flowchart indicating an example of a decoding method according to Embodiment 6. It is to be noted that a flowchart indicated in FIG. 135 corresponds to the flowchart indicated in FIG. 125.

This decoding method is a method for decoding a visible light signal including a plurality of frames, and includes Steps S310*b*, S320*b*, and S330*b* as indicated in FIG. 135. In addition, each of the plurality of frames includes a sequence number and a frame payload.

In Step S310*b*, variable length determination processing for determining whether the bit length of a sub-field for which a sequence number is stored in a decode target frame is variable or not is performed based on macSnLength which is information for determining the bit length of the sub-field.

In Step S320*b*, the bit length of the sub-field is determined based on the result of the variable length determination processing. In Step S330*b*, the decode target frame is decoded based on the determined bit length of the sub-field.

Here, the determination of the bit length of the sub-field in Step S320*b* includes Steps S321*b* to S324*b*.

In other words, in the case where the bit length of the sub-field has been determined not to be variable in the variable length determination processing in Step S310*b*, the bit length of the sub-field is determined to be a value indicated by the above-described macSnLength (Step S321*b*).

In the opposite case where the bit length of the sub-field has been determined to be variable in the variable length determination processing in Step S310*b*, final determination processing for determining whether the decode target frame is the last frame in the plurality of frames or not is performed (Step S322*b*). In the case where the decode target frame has been determined to be the last frame (Y in Step S322*b*), the bit length of the sub-field is determined to be a predetermined value (Step S323*b*). In the opposite case where the decode target frame has been determined not to be the last frame (N in Step S322*b*), the bit length of the sub-field is determined based on the value of a sequence number of the last frame (Step S324*b*).

In this way, as indicated in FIG. 135, it is possible to properly determine the bit length of the sub-field (specifically, the sequence number sub-field) for which the sequence number is stored, irrespective of whether the bit length of the sub-field is fixed or variable.

Here, in the final determination processing in Step S322*b*, whether the decode target frame is the last frame or not may be determined based on the last frame flag indicating whether the decode target frame is the last frame or not. Specifically, in the final determination processing in Step S322*b*, the decode target frame may be determined to be the last frame when the last frame flag indicates 1, and the decode target frame may be determined not to be the last frame when the last frame flag indicates 0. For example, the last frame flag may be included in the first bit of the sub-field.

In this way, as illustrated in Step S203*a* in FIG. 125, it is possible to properly determine whether the decode target frame is the last frame or not.

More specifically, in the determination of the bit length of the sub-field in Step S320*b*, the bit length of the sub-field may be determined to be five bits which is the above-described predetermined value when the decode target frame has determined to be the last frame in the final determination processing in Step S322*b*. In short, the bit length SN of the sub-field is determined to be five bits as indicated in Step S204*a* in FIG. 125.

In addition, in the determination of the bit length of the sub-field in Step S320*b*, the bit length of the sub-field may be determined to be one bit in the case where the sequence number value of the last frame is 1 when the decode target frame has been determined not to be the last frame. Alternatively, the bit length of the sub-field may be determined to be two bits when the sequence number value of the last frame is 2. Alternatively, the bit length of the sub-field may be determined to be three bits when the sequence number value of the last frame is one of 3 and 4. Alternatively, the bit length of the sub-field may be determined to be four bits when the sequence number value of the last frame is any one of 5 to 8. Alternatively, the bit length of the sub-field may be determined to be five bits when the sequence number value of the last frame is any one of 9 to 15. In short, the bit length SN of the sub-field is determined to be any one of one bit to five bits as indicated in Steps S206*a* to S210*a* in FIG. 125.

FIG. 136 is a flowchart indicating an example of an encoding method according to Embodiment 6. It is to be noted that a flowchart indicated in FIG. 136 corresponds to the flowchart indicated in FIG. 124.

The encoding method is a method for encoding information to be encoded (encode target information) to generate a visible light signal including a plurality of frames, and as illustrated in FIG. 136, includes Steps S410*a*, S420*a*, and S430*a*. In addition, each of the plurality of frames includes a sequence number and a frame payload.

In Step S410*a*, variable length determination processing for determining whether the bit length of a sub-field for which a sequence number is stored in a processing target frame is variable or not is performed based on macSnLength which is information for determining the bit length of the sub-field.

In Step S420*a*, the bit length of the sub-field is determined based on the result of the variable length determination processing. In Step S430*a*, part of the encode target information is encoded to generate a processing target frame, based on the determined bit length of the sub-field.

Here, the above-described determination of the bit length of the sub-field in Step S420*a* includes Steps S421*a* to S424*a*.

In other words, in the case where the bit length of the sub-field has been determined not to be variable in the variable length determination processing in Step S410*a*, the bit length of the sub-field is determined to be a value indicated by the above-described macSnLength (Step S421*a*).

In the opposite case where the bit length of the sub-field has been determined to be variable in the variable length determination processing in Step S410*a*, final determination processing for determining whether the processing target frame is the last frame in the plurality of frames or not is performed (Step S422*a*). Here, in the case where the processing target frame has been determined to be the last frame (Y in Step S422*a*), the bit length of the sub-field is determined to be a predetermined value (Step S423*a*). In the opposite case where the processing target frame has been determined not to be the last frame (N in Step S422*a*), the bit length of the sub-field is determined based on the sequence number value of the last frame (Step S424*a*).

In this way, as indicated in FIG. 136, it is possible to properly determine the bit length of the sub-field (specifically, the sequence number sub-field) for which the sequence number is stored), irrespective of whether the bit length of the sub-field is fixed or variable.

It is to be noted that the decoding apparatus according to this embodiment includes a processor and a memory, and the memory stores thereon a program for causing the processor to execute the decoding method indicated in FIG. 135. The encoding apparatus according to this embodiment includes a processor and a memory, and the memory stores thereon a program for causing the processor to execute the encoding method indicated in FIG. 136. Furthermore, the program according to this embodiment is a program for causing the computers to execute one of the decoding method indicated in FIG. 135 and the encoding method indicated in FIG. 136.

Embodiment 7

This embodiment describes a transmitting method for transmitting a light ID in the form of a visible light signal. It is to be noted that a transmitter and a receiver according to this embodiment may be configured to have the same functions and configurations as those of the transmitter (or the transmitting apparatus) and the receiver (or the receiving apparatus) in any of the above-described embodiments.

FIG. 137 is a diagram illustrating an example in which the receiver according to this embodiment displays an AR image.

The receiver 200 according to this embodiment is a receiver including an image sensor and a display 201, and is configured as, for example, a smartphone. The receiver 200 obtains a captured display image Pa which is a normal captured image described above and a decode target image which is a visible light communication image or a bright line image described above, by the image sensor included in the receiver 200 capturing an image of a subject.

Specifically, the image sensor of the receiver 200 captures an image of the transmitter 100. The transmitter 100 has a shape of an electric bulb for example, and includes a glass bulb 141 and a light emitting unit 142 which emits light that flickers like flame inside the glass bulb 141. The light emitting unit 142 emits light by means of one or more light emitting elements (for example, LEDs) included in the transmitter 100 being turned on. The transmitter 100 causes the light emitting unit 142 to blink to change luminance thereof, thereby transmitting the light ID (light identification information) by the luminance change. The light ID is the above-described visible light signal.

The receiver 200 captures an image of the transmitter 100 in a normal exposure time to obtain a captured display image Pa in which the transmitter 100 is shown, and captures an image of the transmitter 100 in a communication exposure time shorter than the normal exposure time to obtain a decode target image. It is to be noted that the normal exposure time is time for exposure in the normal imaging mode described above, and the communication exposure time is time for exposure in the visible light communication mode described above.

The receiver 200 obtains a light ID by decoding the decode target image. Specifically, the receiver 200 receives a light ID from the transmitter 100. The receiver 200 transmits the light ID to a server. The receiver 200 obtains an AR image P42 and recognition information associated with the light ID from the server. The receiver 200 recognizes a region according to the recognition information as a target region, from the captured display image Pa. The receiver 200 superimposes the AR image P42 onto the target region, and displays the captured display image Pa on which the AR image P42 is superimposed onto the display 201.

For example, the receiver 200 recognizes the region located at the upper left of the region in which the transmitter 100 is shown as a target region according to the recognition information in the same manner as in the example illustrated in FIG. 51. As a result, the AR image P42 presenting a fairy for example is displayed as if the fairy is flying around the transmitter 100 in the captured display image Pa.

FIG. 138 is a diagram illustrating another example of a captured display image Pa on which an AR image P42 has been superimposed.

The receiver 200 displays the captured display image Pa on which the AR image P42 has been superimposed onto the display 201 as illustrated in FIG. 138.

Here, the above-described recognition information indicates that a range having luminance greater than or equal to a threshold in the captured display image Pa is a reference region. The recognition information further indicates that a target region is present in a predetermined direction with respect to the reference region, and that the target region is apart from the center (or center of gravity) of the reference region by a predetermined distance.

Accordingly, when the light emitting unit 142 of the transmitter 100 whose image is being captured by the receiver 200 flickers, the AR image P42 to be superimposed onto the target region of the captured display image Pa also moves in synchronization with the movement of the light emitting unit 142 as illustrated in FIG. 138. In short, when the light emitting unit 142 flickers, an image 142*a* of the light emitting unit 142 shown in the captured display image Pa also flickers. This image 142*a* is of the reference region which is the above-described region having the luminance greater than or equal to the threshold. In other words, since the reference region moves, the receiver 200 moves the target region so that the distance between the reference region and the target region is maintained to be the predetermined distance, and superimpose the AR image P42 onto the moving target region. As a result, when the light emitting unit 142 flickers, the AR image P42 to be superimposed onto the target region of the captured display image Pa also moves in synchronization with the movement of the light emitting unit 142. It is to be noted that the center position of the reference region may move due to change in the shape of the light emitting unit 142. Accordingly, also when the shape of the light emitting unit 142 changes, the AR image P42 may move so that the distance with the center position of the moving reference region is maintained to be the predetermined distance.

In addition, in the above example, when the receiver 200 recognizes the target region based on the recognition information, and superimposes the AR image P42 onto the target region, the receiver 200 may vibrate the AR image P42 centering the target region. In other words, the receiver 200 vibrates the AR image P42 in the perpendicular direction for example, according to a function indicating change in amplitude with respect to time. The function is, for example, a trigonometric function such as a sine wave.

In addition, the receiver 200 may change the magnitude of the AR image P42 according to the magnitude of the above-described region having the luminance greater than or equal to the threshold. More specifically, the receiver 200 increases the size of the AR image P42 with increase in the area of a bright region in the captured display image Pa, and decreases the size of the AR image P42 with decrease in the area of the bright region.

Alternatively, the receiver 200 may increase the size of the AR image P42 with increase in average luminance of the above-described region having the luminance greater than or equal to the threshold, and decreases the size of the AR image P42 with decrease in the average luminance of the same. It is to be noted that the transparency of the AR image P42 instead of the size of the AR image P42 may be changed according to the average luminance.

In addition, although any of the pixels in the image 142*a* of the light emitting unit 142 has luminance greater than or equal to the threshold in the example illustrated in FIG. 138, any of the pixels may have luminance less than the threshold. Stated differently, the range that has the luminance greater than or equal to the threshold and corresponds to the image 142*a* may be circular. Also in this case, the range having the luminance greater than or equal to the threshold is identified as a reference region, and an AR image P42 is superimposed on a target region which is apart from the center (or center of gravity) of the reference region by a predetermined distance.

FIG. 139 is a diagram illustrating an example in which a receiver 200 according to this embodiment displays an AR image.

The transmitter 100 is configured as a lighting device as illustrated in FIG. 139 for example, and transmits a light ID by changing luminance of a light source while illuminating a graphic symbol 143 composed of three circles drawn on a wall for example. Since graphic symbol 143 is illuminated with light from the receiver 100, the luminance of graphic symbol 143 changes in the same manner as the transmitter 100 and transmits the light ID.

The receiver 200 captures an image of the graphic symbol 143 illuminated by the transmitter 100, thereby obtaining a captured display image Pa and a decode target image in the same manner as described above. The receiver 200 obtains a light ID by decoding the decode target image. Specifically, the receiver 200 receives the light ID from the graphic symbol 143. The receiver 200 transmits the light ID to a server. The receiver 200 obtains an AR image P43 and recognition information associated with the light ID from the server. The receiver 200 recognizes a region according to the recognition information as a target region, from the captured display image Pa. For example, the receiver 200 recognizes, as a target region, a region in which graphic symbol 143 is shown. The receiver 200 superimposes the AR image P43 onto the target region, and displays the captured display image Pa on which the AR image P43 is superimposed onto the display 201. For example, the AR image P43 is an image of the face of a character.

Here, the graphic symbol 143 is composed of the three circles as described above, and does not have any geometrical feature. Accordingly, it is difficult to properly select and obtain an AR image according to the graphic symbol 143 from among a large number of images accumulated in the server, based only on the captured image obtained by capturing the image of the graphic symbol 143. However, in this embodiment, the receiver 200 obtains the light ID, and obtains the AR image P43 associated with the light ID from the server. Accordingly, even when a large number of images are accumulated in the server, it is possible to properly select and obtain the AR image P43 associated with the light ID as the AR image according to the graphic symbol 143 from the large number of images.

FIG. 140 is a flowchart illustrating operations performed by the receiver 200 according to this embodiment.

The receiver 200 according to this embodiment firstly obtains a plurality of AR image candidates (Step S541). For example, the receiver 200 obtains the plurality of AR image candidates from a server through wireless communication (BTLE, Wi-Fi, or the like) different from visible light communication. Next, the receiver 200 captures an image of a subject (Step S542). The receiver 200 obtains a captured display image Pa and a decode target image by the image capturing as described above. However, when the subject is a photograph of the transmitter 100, no light ID is transmitted from the subject. Thus, the receiver 200 cannot obtain any light ID by decoding the decode target image.

In view of this, the receiver 200 determines whether or not the receiver 200 was able to obtain a light ID, that is, whether or not the receiver 200 has received the light ID from the subject (Step S543).

Here, when determining that the receiver 200 has not received the light ID (No in Step S543), the receiver 200 determines whether an AR display flag set to itself is 1 or not (Step S544). The AR display flag is a flag indicating whether an AR image may be displayed based only on the captured display image Pa even when no light ID has been obtained. When the AR display flag is 1, the AR display flag indicates that the AR image may be displayed based only on the captured display image Pa. When the AR display flag is 0, the AR display flag indicates that the AR image should not be displayed based only on the captured display image Pa.

When determining that the AR display flag is 1 (Yes in Step S544), the receiver 200 selects, as an AR image, a candidate corresponding to the captured display image Pa from among the plurality of AR image candidates obtained in Step S541 (Step S545). In other words, the receiver 200 extracts a feature quantity included in the captured display image Pa, and selects, as an AR image, a candidate associated with the extracted feature quantity.

Subsequently, the receiver 200 superimposes the AR image which is the selected candidate onto the captured display image Pa and displays the captured display image Pa (Step S546).

In contrast, when determining that the AR display flag is 0 (No in Step S544), the receiver 200 does not display the AR image.

In addition, when determining that the light ID has been received in Step S543 (Yes in Step S543), the receiver 200 selects, as an AR image, a candidate associated with the light ID from among the plurality of AR image candidates obtained in Step S541 (Step S547). Subsequently, the receiver 200 superimposes the AR image which is the selected candidate onto the captured display image Pa and displays the captured display image Pa (Step S546).

Although the AR display flag has been set to the receiver 200 in the above-described example, it is to be noted that the AR display flag may be set to the server. In this case, the receiver 200 asks the server whether the AR display flag is 1 or 0 in Step S544.

In this way, even when the receiver 200 has not received any light ID in the capturing of the image, it is possible to cause the receiver 200 to display or not to display the AR image according to the AR display flag.

FIG. 141 is a diagram for illustrating operations performed by the transmitter 100 according to this embodiment.

For example, the transmitter 100 is configured as a projector. Here, the intensity of light emitted from the projector and reflected on a screen changes due to factors such as aging of a light source of the projector, the distance from the light source to the screen, etc. When the intensity of the light is small, a light ID transmitted from the transmitter 100 is difficult to be received by the receiver 200.

In view of this, the transmitter 100 according to this embodiment adjusts a parameter for causing the light source to emit light in order to reduce change in the intensity of the light according to each factor. This parameter is at least one of a value of a current input to the light source to cause the light source to emit light and light emission time (specifically, light emission time per unit time) during which the light is emitted. For example, the intensity of the light source increases with increase in the value of a current and with increase in the light emission time.

In other words, the transmitter 100 adjusts the parameter so that the intensity of light to be emitted by the light source is increased as the light source ages. More specifically, the transmitter 100 includes a timer, and adjusts the parameter so that the intensity of the light to be emitted by the light source is increased with increase in use time of the light source measured by the timer. In other words, the transmitter 100 increases a current value and light emission time of the light source with increase in use time. Alternatively, the transmitter 100 detects the intensity of light to be emitted from the light source, and adjusts the parameter so that the intensity of the detected light does not decrease. In other words, the transmitter 100 adjusts the parameter so that the intensity of the light is increased with decrease in the intensity of the detected light.

In addition, the transmitter 100 adjusts the parameter so that the intensity of the light source is increased with increase in irradiation distance from the light source to the screen. More specifically, the transmitter 100 detects the intensity of the light emitted to and reflected on the screen, and adjusts the parameter so that the light emitted by the light source is increased with decrease in the intensity of the detected light. In other words, the transmitter 100 increases a current value and light emission time of the light source with decrease in the intensity of the detected light. In this way, the parameter is adjusted so that the intensity of the reflected light is constant irrespective of the irradiation distance. Alternatively, the transmitter 100 detects the irradiation distance from the light source to the screen using a distance measuring sensor, and adjusts the parameter so that the intensity of the light source is increased with increase in the detected irradiation distance.

In addition, the transmitter 100 adjusts the parameter so that the intensity of the light source is increased more when the color of the screen is closer to black. More specifically, the transmitter 100 detects the color of the screen by capturing an image of the screen, and adjusts the parameter so that the intensity of the light source is increased more when the detected color of the screen is closer to black. In other words, the transmitter 100 increases a current value and light emission time of the light source more when the detected color of the screen is closer to black. In this way, the parameter is adjusted so that the intensity of the reflected light is constant irrespective of the color of the screen.

In addition, the transmitter 100 adjusts the parameter so that the intensity of the light source is increased when increase in natural light. More specifically, the transmitter 100 detects the difference between the brightness of the screen when the light source is turned ON and light is emitted to the screen and the brightness of the screen when the light source is turned OFF and no light is emitted to the screen. The transmitter 100 then adjusts the parameter so that the intensity of the light to be emitted from the light source with decrease in the difference in brightness. In other words, the transmitter 100 increases a current value and light emission time of the light source with decrease in the difference in brightness. In this way, the parameter is adjusted so that the S/N ratio of the light ID is constant irrespective of natural light. Alternatively, when the transmitter 100 is configured as an LED display for example, the transmitter 100 may detect the intensity of solar light and adjust the parameter so that the intensity of the light to be emitted by the light source is increased with increase in the intensity of the solar light.

It is to be noted that the above-described adjustment of the parameter may be performed when a user operation is made. For example, the transmitter 100 includes a calibration button, and performs the above-described adjustment of the parameter when the calibration button is pressed by the user. Alternatively, the transmitter 100 may periodically perform the above-described adjustment of the parameter.

FIG. 142 is a diagram for explaining other operations performed by the transmitter 100 according to this embodiment.

For example, the transmitter 100 is configured as a projector, and emits light from the light source onto a screen via a preparatory member. The preparatory member is a liquid crystal panel when the projector is a liquid crystal projector, and the preparatory member is a digital mirror device (DMD) when the projector is a DLP (registered trademark) projector. In other words, the preparatory member is a member for adjusting luminance of a video on a per pixel basis. The light source emits light to the preparatory member while switching the intensity of light between High and Low. In addition, the light source adjusts time-average brightness by adjusting High time per unit time.

Here, when the transmittance of the preparatory member is 100%, the light source becomes dark so that the video to be projected from the projector to the screen is not too bright. In short, the light source shortens the High time per unit time.

At this time, the light source widens the pulse width of the light ID when transmitting the light ID by changing the luminance thereof.

When the transmittance of the preparatory member is 20%, the light source becomes bright so that the video to be projected from the projector to the screen is not too dark. In short, the light source lengthens the High time per unit time.

At this time, the light source narrows the pulse width of the light ID when transmitting the light ID by changing the luminance thereof.

In this way, the pulse width of the light ID is increased when the light source is dark, and the pulse width of the light ID is decreased when the light source is bright. Thus, it is possible to prevent the intensity of light to be emitted by the light source from becoming too weak or too bright due to the transmission of the light ID.

Although the transmitter 100 is the projector in the above-described example, it is to be noted that the transmitter 100 may be configured as a large LED display. The large LED display includes a pixel switch and a common switch. A video is shown by ON and OFF of the pixel switch, and a light ID is transmitted by ON and OFF of the common switch. In this case, the pixel switch functionally corresponds to the preparatory member, and the common switch functionally corresponds to the light source. When an average luminance adjusted by the pixel switch is high, the pulse width of the light ID to be transmitted by the common switch may be decreased.

FIG. 143 is a diagram for explaining other operations performed by the transmitter 100 according to this embodiment. More specifically, FIG. 143 indicates the relation between dimming ratios of the transmitter 100 configured as a spot light having a dimming function and currents (specifically, peak current values) to be input to the light source of the transmitter 100.

The transmitter 100 receives a dimming ratio which is specified for the light source provided to the transmitter 100 itself, and causes the light source to emit light at the specified dimming ratio. It is to be noted that the dimming ratio is a ratio of an average luminance of the light source with respect to a maximum average luminance. The average luminance is not a momentary luminance and a time-average luminance. The dimming ratio is adjusted by adjusting the value of a current to be input to the light source, time during which the luminance of the light source is Low, etc. The time during which the luminance of the light source is Low may be OFF time during which the light source is OFF.

Here, when transmitting a transmission target signal as a light ID, the transmitter 100 encodes the transmission target signal in a predetermined mode to generate an encoded signal. The transmitter 100 then transmits the encoded signal as the light ID (that is, a visible light signal) by causing luminance change of the light source of the transmitter 100 itself according to the encoded signal.

For example, when the specified dimming ratio is greater than or equal to 0% and less than or equal to x3 (%), the transmitter 100 encodes a transmission target signal in a PWM mode during which a duty ratio is 35% to generate an encoded signal. Here, for example, x3 (%) is 50%. It is to be noted that the PWM mode during which the duty ratio is 35% is also referred to as a first mode, and x3 described above is also referred to as a first value in this embodiment.

In other words, when the dimming ratio which is specified is greater than or equal to 0% and less than or equal to x3 (%), the transmitter 100 adjusts the dimming ratio of the light source based on a peak current value while maintaining the duty ratio of the visible light signal at 35%.

When the specified dimming ratio is greater than x3 (%) and less than or equal to 100%, the transmitter 100 encodes a transmission target signal in a PWM mode during which a duty ratio is 65% to generate an encoded signal. It is to be noted that the PWM mode during which the duty ratio is 65% is also referred to as a second mode in this embodiment.

In other words, when the dimming ratio which is specified is greater than x3 (%) and less than or equal to 100%, the transmitter 100 adjusts the dimming ratio of the light source based on a peak current value while maintaining the duty ratio of the visible light signal at 65%.

In this way, the transmitter 100 according to this embodiment receives the dimming ratio which is specified for the light source as the specified dimming ratio. When the specified dimming ratio is less than or equal to the first value, the transmitter 100 transmits the signal encoded in the first mode by changing the luminance of the light source while causing the light source to emit light at the specified dimming ratio. When the specified dimming ratio is greater than the first value, the transmitter 100 transmits the signal encoded in the second mode by changing the luminance of the light source while causing the light source to emit light at the specified dimming ratio. More specifically, the duty ratio of the signal encoded in the second mode is greater than the duty ratio of the signal encoded in the first mode.

Here, since the duty ratio in the second mode is greater than the duty ratio in the first mode, it is possible to make the change rate of a peak current with respect to the dimming ratio in the second mode less than the change rate of a peak current with respect to the dimming ratio in the first mode.

In addition, when the dimming ratio which is specified exceeds x3 (%), modes are switched from the first mode to the second mode. Accordingly, it is possible to instantaneously decrease the peak current at this time. In other words, the peak current is y3 (mA) when the dimming ratio which is specified is x3 (%), and it is possible to decrease the peak current to y2 (mA) when the specified dimming ratio which is specified exceeds x3 (%) even slightly. It is to be noted that y3 (mA) is 143 mA for example, and y2 (mA) is 100 mA for example. As a result, in order to increase the dimming ratio, it is possible to prevent the peak current from being greater than y3 (mA) and to reduce deterioration of the light source due to flow of a large current.

When the dimming ratio which is specified exceeds x4 (%), the peak current is greater than y3 (mA) even when a current mode is the second mode. However, when the dimming ratio which is specified rarely exceeds x4 (%), it is possible to reduce deterioration of the light source. It is to be noted that x4 described above is also referred to as a second value in this embodiment. Although x4 (%) is less than 100% in the example indicated in FIG. 143, x4 (%) may be 100%

In other words, in the transmitter 100 according to this embodiment, the peak current value of the light source for transmitting the signal encoded in the second mode by changing the luminance of the light source when the specified dimming ratio is greater than the first value and less than or equal to the second value is less than the peak current value of the light source for transmitting the signal encoded in the first mode by changing the luminance of the light source when the specified dimming ratio is the first value.

By switching the modes for signal encoding in this way, the peak current value of the light source when the specified dimming ratio is greater than the first value and less than or equal to the second value decreases below the peak current value of the light source when the specified dimming ratio is the first value. Accordingly, it is possible to prevent a large peak current from flowing to the light source as the specified dimming ratio is increased. As a result, it is possible to reduce deterioration of the light source.

Furthermore, when the dimming ratio which is specified is greater than or equal to x1 (%) and less than x2 (%), the transmitter 100 according to this embodiment transmits the signal encoded in the first mode by changing the luminance of the light source while causing the light source to emit light at the dimming ratio which is specified, and maintain the peak current value to be a constant value against the change in the specified dimming ratio. Here, x2 (%) is less than x3 (%). It is to be noted that x2 described above is also referred to as a third value in this embodiment.

In other words, when the specified dimming ratio is less than x2 (%), the transmitter 100 increases OFF time during which the light source is OFF as the specified dimming ratio decreases, thereby causing the light source to emit light at the decreasing specified dimming ratio and maintain the peak current value to be a constant value. More specifically, the transmitter 100 lengthens a period during which each of the plurality of encoded signals is transmitted while maintaining the duty ratio of the encoded signal to be 35%. In this way, the OFF time during which the light source is OFF, that is, an OFF period is lengthened. As a result, it is possible to decrease the dimming ratio while maintaining the peak current value to be constant. In addition, since the peak current value is maintained to be constant even when the specified dimming ratio decreases, it is possible to make it easier for the receiver 200 to receive a visible light signal (that is, a light ID) which is a signal to be transmitted by changing the luminance of the light source.

Here, the transmitter 100 determines OFF time during which the light source is OFF so that a period obtained by adding time during which an encoded signal is transmitted by changing the luminance of the light source and the OFF time during which the light source is OFF does not exceed 10 milliseconds. For example, when the period exceeds 10 milliseconds due to long OFF time of the light source, the luminance change in the light source for transmitting the encoded signal may be recognized as a flicker to human eyes. In view of this, the OFF time of the light source is determined so that the period does not exceed 10 milliseconds in this embodiment, it is possible to prevent a flicker from being recognized by a human.

Furthermore, also when the specified dimming ratio is less than x1 (%), the transmitter 100 transmits the signal encoded in the first mode by changing the luminance of the light source while causing the light source to emit light at the specified dimming ratio. At this time, the transmitter 100 decreases the peak current value as the specified dimming ratio decreases, thereby causing the light source to emit light at the decreasing specified dimming ratio. Here, x1 (%) is less than x2 (%). It is to be noted that x1 described above is also referred to as a fourth value in this embodiment.

In this way, it is possible to properly cause the light source to emit light even at the further decreased specified dimming ratio.

Here, although the maximum peak current value (that is, y3 (mA)) in the first mode is less than the maximum peak current value (that is, y4 (mA)) in the second mode in the example indicated in FIG. 143, the both may be the same. In other words, the transmitter 100 encodes a transmission target signal in the first mode until the dimming ratio which is specified reaches x3*a* (%) greater than x3 (%). When the specified dimming ratio is x3*a* (%), the transmitter 100 causes the light source to emit light at the same peak current value as the maximum peak current value (that is, y4 (mA)) in the second mode. In this case, x3*a* is a first value. It is to be noted that the maximum peak current value in the second mode is the peak current value when the dimming ratio which is specified is the maximum value, that is 100%.

In other words, in this embodiment, the peak current value of the light source when the specified dimming ratio is the first value may be the same as the peak current value of the light source when the specified dimming ratio is the maximum value. In this case, a dimming ratio range for causing the light source at a peak current greater than or equal to y3 (mA) is widened, which makes it possible to cause the receiver 200 to easily receive a light ID in the wide dimming ratio range. In other words, since it is possible to pass a large peak current to the light source even in the first mode, it is possible to cause the receiver to easily receive a signal to be transmitted by changing the luminance of the light source. It is to be noted that the light source deteriorates faster because time during which a large peak current flows lengthens.

FIG. 144 is a diagram indicating a comparative example used to explain easiness in reception of a light ID according to this embodiment.

In this embodiment, as indicated in FIG. 143, the first mode is used when the dimming ratio is small, and the second mode is used when the dimming ratio is large. The first mode is a mode for increasing an increase in peak current even when an increase in dimming ratio is small, and the second mode is a mode for decreasing an increase in peak current even when an increase in dimming ratio is large. Accordingly, the second mode prevents a large peak current from flowing to the light source, which makes it possible to reduce deterioration of the light source. Furthermore, the first mode allows a large peak current to flow to the light source even when the dimming ratio is small, which makes it possible to cause the receiver 200 to easily receive the light ID.

When the second mode is used even when the dimming ratio is small, a peak current value is small when a dimming ratio is small as indicated in FIG. 144, and thus it is difficult to cause the receiver 200 to receive the light ID.

Accordingly, the transmitter 100 according to this embodiment is capable of achieving both reduction in deterioration of the light source and easiness in reception of a light ID.

In addition, when the peak current value of the light source exceeds a fifth value, the transmitter 100 may stop transmitting a signal by changing the luminance of the light source. The fifth value may be, for example, y3 (mA).

In this way, it is possible to further reduce deterioration of the light source.

In addition, the transmitter 100 may measure use time of the light source in the same manner as indicated in FIG. 141. When the use time reaches or exceeds predetermined time, the transmitter 100 may transmit a signal by changing the luminance of the light source using the value of a parameter for causing the light source to emit light at a dimming ratio greater than a specified dimming ratio. In this case, the value of the parameter may be a peak current value or OFF time during which the light source is OFF. In this way, it is possible to prevent a light ID from being not received by the receiver 200 due to aging of the light source.

Alternatively, the transmitter 100 measures use time of the light source, and may increase a current pulse width of the light source more when the use time reaches or exceeds the predetermined time than when the use time does not reach the predetermined time. In this way, it is possible to reduce difficulty in receiving the light ID due to deterioration of the light source in the same manner as described above.

Although the transmitter 100 switches between the first mode and the second mode according to a dimming ratio which is specified in the above embodiment, the mode switching may be made according to an operation by a user. In other words, when the user operates a switch, the transmitter 100 switches between the modes from the first mode to the second mode, or inversely from the second mode to the first mode. In addition, when the mode switching is made, the transmitter 100 may notify the user of the fact. For example, the transmitter 100 may notify the user of the mode switching by outputting a sound, causing the light source to blink at a period which allows visual recognition by a human, turning on an LED for notification, or the like. Also at the time when the relation between a peak current and a dimming ratio changes in addition to the time of the mode switching, the transmitter 100 may notify the user of the change in the relation. For example, as illustrated in FIG. 143, the time is time at which the dimming ratio changes from x1 (9'*o*), or time at which the dimming ratio changes from x2 (%).

FIG. 145A is a flowchart indicating operations performed by the transmitter 100 according to this embodiment.

The transmitter 100 firstly receives the dimming ratio which is specified for the light source as a specified dimming ratio (Step S551). Next, the transmitter 100 transmits a signal by changing the luminance of the light source (Step S552). More specifically, when the specified dimming ratio is less than or equal to a first value, the transmitter 100 transmits the signal encoded in the first mode by changing the luminance of the light source while causing the light source to emit light at the specified dimming ratio. When the specified dimming ratio is greater than the first value, the transmitter 100 transmits the signal encoded in the second mode by changing the luminance of the light source while causing the light source to emit light at the specified dimming ratio. Here, the peak current value of the light source for transmitting the signal encoded in the second mode by changing the luminance of the light source when the specified dimming ratio is greater than the first value and less than or equal to the second value is less than the peak current value of the light source for transmitting the signal encoded in the first mode by changing the luminance of the light source when the specified dimming ratio is the first value.

FIG. 145B is a block diagram illustrating a configuration of the transmitter 100 according to this embodiment.

The transmitter 100 includes a reception unit 551 and a transmission unit 552. The reception unit 551 firstly receives the dimming ratio which is specified for the light source as a specified dimming ratio (Step S551). The transmission unit 552 transmits the signal by changing the luminance of the light source. More specifically, when the specified dimming ratio is less than or equal to a first value, the transmission unit 552 transmits the signal encoded in the first mode by changing the luminance of the light source while causing the light source to emit light at the specified dimming ratio. In addition, when the specified dimming ratio is greater than the first value, the transmission unit 552 transmits the signal encoded in the second mode by changing the luminance of the light source while causing the light source to emit light at the specified dimming ratio. Here, the peak current value of the light source for transmitting the signal encoded in the second mode by changing the luminance of the light source when the specified dimming ratio is greater than the first value and less than or equal to the second value is less than the peak current value of the light source for transmitting the signal encoded in the first mode by changing the luminance of the light source when the specified dimming ratio is the first value.

In this way, as illustrated in FIG. 143, the peak current value of the light source when the specified dimming ratio is greater than the first value and less than or equal to the second value is decreased below the peak current value of the light source when the specified dimming ratio is the first value, by switching the modes for signal encoding. Accordingly, it is possible to prevent a large peak current from flowing to the light source as the specified dimming ratio is increased. As a result, it is possible to reduce deterioration of the light source.

FIG. 146 is a diagram illustrating another example in which a receiver 200 according to this embodiment displays an AR image.

The receiver 200 obtains a captured display image Pk which is a normal captured image described above and a decode target image which is a visible light communication image or a bright line image described above, by the image sensor of the receiver 200 capturing an image of a subject.

More specifically, the image sensor of the receiver 200 captures an image of the transmitter 100 configured as a signage and a person 21 who is present adjacent to the transmitter 100. The transmitter 100 is a transmitter according to each of the embodiments, and includes one or more light emitting elements (for example, LED(s)) and a light transmitting plate 144 having a translucency such as a frosted glass. The one or more light emitting elements emit light inside the transmitter 100. The light from the one or more light emitting elements passes through the light transmitting plate 144 and exits to outside. As a result, the light transmitting plate 144 of the transmitter is placed into a bright state. The transmitter 100 in such a state changes luminance by causing the one or more light emitting elements to blink, and transmits a light ID (light identification information) by changing the luminance of the transmitter 100. The light ID is the above-described visible light signal.

Here, the light transmitting plate 144 shows a message of "Hold smartphone over here". A user of the receiver 200 let the person 21 stand adjacent to the transmitter 100, and instructs the person 21 to put his arm on the transmitter 100. The user then directs a camera (that is the image sensor) of the receiver 200 to the person 21 and the transmitter 100 and captures an image of the person 21 and the transmitter 100. The receiver 200 obtains the captured display image Pk in which the transmitter 100 and the person 21 are shown, by capturing the image of the transmitter 100 and the person 21 for a normal exposure time. Furthermore, the receiver 200 obtains a decode target image by capturing an image of the transmitter 100 and the person 21 for a communication exposure time shorter than the normal exposure time.

The receiver 200 obtains a light ID by decoding the decode target image. Specifically, the receiver 200 receives a light ID from the transmitter 100. The receiver 200 transmits the light ID to a server. The receiver 200 obtains an AR image P44 and recognition information associated with the light ID from the server. The receiver 200 recognizes a region according to the recognition information as a target region in the captured display image Pk. For example, the receiver 200 recognizes, as a target region, a region in which the signage that is the transmitter 100 is shown.

The receiver then superimposes the AR image P44 onto the captured display image Pk so that the target region is covered and concealed by the AR image P44, and displays the captured display image Pk on which the AR image P44 is superimposed onto the display 201. For example, the receiver 200 obtains an AR image P44 of a soccer player. In this case, the AR image P44 is superimposed onto the captured display image Pk so that the target region is covered and concealed by the AR image P44, and thus it is possible to display the captured display image Pk on which the soccer player is virtually present adjacent to the person 21. As a result, the person 21 can be shown together with the soccer player in the photograph although the soccer player is not actually present next to the person 21. More specifically, the person 21 can be shown together with the soccer player in the photograph in such a manner that the person 21 puts his arm on the shoulder of the soccer player.

Embodiment 8

This embodiment describes a transmitting method for transmitting a light ID in the form of a visible light signal. It is to be noted that a transmitter and a receiver according to this embodiment may be configured to have the same functions and configurations as those of the transmitter (or the transmitting apparatus) and the receiver (or the receiving apparatus) in any of the above-described embodiments.

FIG. 147 is a diagram for explaining operations performed by the transmitter 100 according to this embodiment. More specifically, FIG. 147 indicates the relation between dimming ratios of the transmitter 100 configured as a spot light having a dimming function and currents (specifically, peak current values) to be input to the light source of the transmitter 100.

When the specified dimming ratio is greater than or equal to 0% and less than or equal to x14 (%), the transmitter 100 encodes a transmission target signal in a PWM mode in which a duty ratio is 35% to generate an encoded signal. In other words, when the dimming ratio which is specified changes from 0% to x14 (%), the transmitter 100 increases a peak current value while maintaining a duty ratio of the visible light signal at 35%, thereby causing the light source to emit light at the specified dimming ratio. It is to be noted that the PWM mode at the duty ratio of 35% is also referred to as a first mode, and x14 described above is also referred to as a first value, in the same manner as in Embodiment 7. For example, x14 (%) is a value within a range from 50 to 60% inclusive.

When the specified dimming ratio is greater than x13 (%) and less than or equal to 100%, the transmitter 100 encodes a transmission target signal in a PWM mode in which a duty ratio is 65% to generate an encoded signal. In other words, when the dimming ratio which is specified changes from 100% to x13 (%), the transmitter 100 decreases a peak current value while maintaining a duty ratio of the visible light signal at 65%, thereby causing the light source to emit light at the specified dimming ratio. It is to be noted that the PWM mode at the duty ratio of 65% is also referred to as a second mode, and x13 described above is also referred to as a second value, in the same manner as in Embodiment 7. Here, for example, x13 (%) is a value less than x14 (%) and included within a range from 40 to 50% inclusive.

In this way, in this embodiment, when the dimming ratio which is specified increases, PWM modes are switched from the PWM mode in which the duty ratio is 35% to the PWM mode in which the duty ratio is 65% at the dimming ratio of x14 (%). In this way, in this embodiment, when the dimming ratio which is specified decreases, PWM modes are switched from the PWM mode in which the duty ratio is 65% to the PWM mode in which the duty ratio is 35% at the dimming ratio of x13 (%) less than the dimming ratio of x14 (%). In other words, in this embodiment, dimming ratios at which the PWM modes are switched are different between when the dimming ratio which is specified increases and when the dimming ratio which is specified decreases. Hereinafter, the dimming ratio at which the PWM modes are switched is referred to as a switching point.

Accordingly, in this embodiment, it is possible to prevent frequent switching of the PWM modes. In the example indicated in FIG. 143 according to Embodiment 7, the switching point between the PWM modes is 50% which is common between when the dimming ratio increases and when the dimming ratio which is specified decreases. As a result, in the example of FIG. 143, when a dimming ratio which is specified is repeatedly increased and decreased around 50%, the PWM modes are frequently switched between the PWM mode in which the duty ratio is 35% and the PWM mode in which the duty ratio is 65%. However, in this embodiment, switching points between the PWM modes are different between when the dimming ratio which is specified increases and when the dimming ratio which is specified decreases, and thus it is possible to prevent such frequent switching of the PWM modes.

In addition, in this embodiment similarly to the example indicated in FIG. 143 according to Embodiment 7, the PWM mode having a small duty ratio is used when the dimming ratio which is specified is small, and the PWM mode having a large duty ratio is used when the dimming ratio which is specified is large.

Accordingly, since the PWM mode having the large duty ratio is used when the dimming ratio which is specified is large, it is possible to decrease the change rate of a peak current with respect to the dimming rate, which makes it possible to cause the light source to emit light at a large dimming ratio using a small peak current. For example, in the PWM mode having a small duty ratio such as the duty ratio of 35%, it is impossible to cause the light source to emit light at a dimming ratio of 100% unless the peak current is set to 250 mA. However, since the PWM mode having a large duty ratio such as the duty ratio of 65% is used for the large dimming ratio in this embodiment, it is possible to cause the light source to emit light at the dimming ratio of 100% only by setting the peak current to a smaller current of 154 mA. In other words, it is possible to prevent an excess current from flowing to the light source so as not to decrease the life of the light source.

When since the PWM mode having a small duty ratio is used when the dimming ratio which is specified is small, it is possible to increase the change rate of a peak current with respect to a dimming ratio. As a result, it is possible to transmit a visible light signal using a large peak current while causing the light source to emit light at the small dimming ratio. The light source emits brighter light as an input current increases. Accordingly, when the visible light signal is transmitted using the large peak current, it is possible to cause the receiver 200 to easily receive the visible light signal. In other words, it is possible to widen the range of dimming ratios which enable transmission of a visible light signal that is receivable by the receiver 200 to a range including smaller dimming ratios. For example, as indicated in FIG. 195, the receiver 200 can receive a visible light signal transmitted using a peak current when the peak current is Ia (mA). In this case, in the PWM mode having a large duty ratio such as the duty ratio of 65%, the range of dimming ratios which enable transmission of a receivable visible light signal is greater than or equal to x12 (%). However, in the PWM mode having a small duty ratio such as the duty ratio of 35%, it is possible to increase the range of dimming ratios which enable transmission of a receivable visible light signal to a range including x12 (%) that is less than x11 (%).

In this way, it is possible to prolong the life of the light source and transmit a visible light signal in the wide dimming ratio range by switching the PWM modes.

FIG. 148A is a flowchart indicating operations performed by a transmitting method according to this embodiment.

The transmitting method according to this embodiment is a method for transmitting a signal by changing the luminance of the light source, and includes a receiving step S561 and a transmitting step S562. In the receiving step S561, the transmitter 100 receives the dimming ratio which is specified for the light source as a specified dimming ratio. In the transmitting step S562, the transmitter 100 transmits a signal encoded in one of a first mode and a second mode by changing the luminance of the light source while causing the light source to emit light at the specified dimming ratio. Here, the duty ratio of the signal encoded in the second mode is greater than the duty ratio of the signal encoded in the first mode. In the transmitting step S562, when a small specified dimming ratio is changed to a large specified dimming ratio, the transmitter 100 switches modes for signal encoding from the first mode to the second mode when the specified dimming ratio is a first value. Furthermore, when a large specified dimming ratio is changed to a small specified dimming ratio, the transmitter 100 switches the modes for signal encoding from the second mode to the first mode when the specified dimming ratio is a second value. Here, the second value is less than the first value.

For example, the first mode and the second mode are the PWM mode having a duty ratio of 35% and the PWM mode having a duty ratio of 65% indicated in FIG. 147, respectively. The first value and the second value are x14 (%) and x15 (%) indicated in FIG. 147, respectively.

In this way, the specified dimming ratios (that are switching points) at which switching between the first mode and the second mode is made are different between when the specified dimming ratio increases and when the specified dimming ratio decreases. Accordingly, it is possible to prevent frequent switching between the modes. Stated differently, it is possible to prevent occurrence of what is called chattering. As a result, it is possible to stabilize operations by the transmitter 100 which transmits a signal. In addition, the duty ratio of the signal encoded in the second mode is greater than the duty ratio of the signal encoded in the first mode. Accordingly, it is possible to prevent a large peak current from flowing to the light source as the specified dimming ratio is increased, in the same manner as in the transmitting method indicated in FIG. 143. As a result, it is possible to reduce deterioration of the light source. In addition, since the deterioration of the light source can be reduced, it is possible to perform communication between various kinds of apparatuses long time. In addition, when the specified dimming ratio is small, the first mode having the small duty ratio is used. Accordingly, it is possible to increase the above-described peak current, and transmit an easily receivable signal to the receiver 200 as a visible light signal.

In addition, in the transmitting step S562, the transmitter 100 changes the peak current of the light source for transmitting an encoded signal by changing the luminance of a light source from a first current value to a second current value less than the first current value when switching from the first mode to the second mode is made. Furthermore, when switching from the second mode to the first mode is made, the transmitter 100 changes the peak current from a third current value to a fourth current value greater than the third current value. Here, the first current value is greater than the fourth current value, and the second current value is greater than the third current value.

For example, the first current value, the second current value, the third current value, and the fourth current value are a current value Ie, a current value Ic, a current value Ib, and a current value Id, indicated in FIG. 147, respectively.

In this way, it is possible to properly switch between the first mode and the second mode.

FIG. 148B is a block diagram illustrating a configuration of the transmitter 100 according to this embodiment.

The transmitter 100 according to this embodiment is a transmitter which transmits a signal by changing the luminance of the light source, and includes a reception unit 561 and a transmission unit 562. The reception unit 561 receives the dimming ratio which is specified for the light source as a specified dimming ratio. The transmission unit 562 transmits a signal encoded in one of the first mode and the second mode by changing the luminance of the light source while causing the light source to emit light at the specified dimming ratio. Here, the duty ratio of the signal encoded in the second mode is greater than the duty ratio of the signal encoded in the first mode. In addition, when a small specified dimming ratio is changed to a large specified dimming ratio, the transmission unit 562 switches the modes for signal encoding from the first mode to the second mode when the specified dimming ratio is the first value. Furthermore, when a large specified dimming ratio is changed to a small specified dimming ratio, the transmitter 100 switches the modes for signal encoding from the second mode to the first mode when the specified dimming ratio is the second value. Here, the second value is less than the first value.

The transmitter 100 as such executes the transmitting method of the flowchart indicated in FIG. 148A.

FIG. 149 is a diagram illustrating an example of a specific configuration of a visible light signal according to this embodiment.

This visible light signal is a signal in a PWM mode.

A packet of the visible light signal includes an L data part, a preamble, and an R data part. It is to be noted that each of the L data part and the R data part corresponds to a payload.

The preamble alternately indicates luminance values of High and Low along the time axis. In other words, the preamble indicates a High luminance value during a time length $C_0$, a Low luminance value during a time length $C_1$ next to the time length $C_0$, a High luminance value during a time length $C_2$ next to the time length $C_1$, and a Low luminance value during a time length $C_3$ next to the time length $C_2$. It is to be noted that the time length $C_0$ and $C_3$ are, for example, 100 μs. In addition, the time length $C_1$ and $C_2$ are, for example, 90 μs which is shorter than the time length $C_1$ and $C_3$ by 10 μs.

The L data part alternately indicates luminance values of High and Low along a time axis, and is disposed immediately before the preamble. In other words, the L data part indicates a High luminance value during a time length $D'_0$, a Low luminance value during a time length $D'_1$ next to the time length $D'_0$, a High luminance value during a time length $D'_2$ next to the time length $D'_1$, and a Low luminance value during a time length $D'_3$ next to the time length $D'_2$. It is to be noted that time lengths $D'_0$ to $D'_3$ are determined respectively in accordance with expressions according to a signal to be transmitted. These expressions are: $D'_0=W_0+W_1\times(3-y_0)$, $D'_1=W_0+W_1\times(7-y_1)$, $D'_2=W_0+W_1\times(3-y_2)$, and $D'_3=W_0+W_1\times(7-y_3)$. Here, a constant $W_0$ is 110 μs for example, and a constant $W_1$ is 30 μs for example. Variables $y_0$ and $y_2$ are each an integer that is any one of 0 to 3 represented in two bits, and variables $y_1$ and $y_3$ are each an integer that is any one of 0 to 7 represented in three bits. In addition, variables $y_0$ to $y_3$ are each a signal to be transmitted. It is to be noted that "*" is used as a symbol indicating a multiplication in FIGS. 149 to 152.

The R data part alternately indicates luminance values of High and Low along the time axis, and is disposed immediately after the preamble. In other words, the R data part indicates a High luminance value during a time length $D_0$, a Low luminance value during a time length $D_1$ next to the time length $D_0$, a High luminance value during a time length $D_2$ next to the time length $D_1$, and a Low luminance value by a time length $D_3$ next to the time length $D_2$. It is to be noted that time lengths $D_0$ to $D_3$ are determined respectively in accordance with expressions according to a signal to be transmitted. These expressions are: $D_0=W_0+W_1\times y_0$, $D_1=W_0+W_1\times y_1$, $D_2=W_0+W_1\times y_2$, and $D_3=W_0+W_1\times y_3$.

Here, the L data part and R data part have a complementary relation with regard to brightness. In other words, the R data part is dark when the L data part is bright, and inversely the R data part is bright when the L data part is dark. In other words, the sum of the time length of the L data part and the time length of the R data part is constant irrespective of the signal to be transmitted. In other words, it is possible to maintain the time average brightness of the visible light signal to be transmitted from the light source to be constant irrespective of the signal to be transmitted.

In addition, it is possible to change the duty ratio in the PWM mode by changing, to a ratio, the ratio between 3 and 7 which are in the expressions: $D'_0=W_0+W_1\times(3-y_0)$, $D'_1=W_0+W_1\times(7-y_1)$, $D'_2=W_0+W_1\times(3-y_2)$, and $D'_3=W_0+W_1\times(7-y_3)$. It is to be noted that the ratio between 3 and 7 corresponds to the ratio between the maximum values of variables $y_0$ and $y_2$ and the maximum values of variables $y_1$ and $y_3$. For example, the PWM mode having the small duty ratio is selected when the ratio is 3:7, and the PWM mode having the large duty ratio is selected when the ratio is 7:3. Accordingly, through adjustment of the ratio, it is possible to switch the PWM modes between the PWM mode in which the duty ratio is 35% and the PWM mode in which the duty ratio is 65% indicated in FIGS. 143 and 147. In addition, a preamble may be used to notify the receiver 200 of to which one of the PWM modes switching is made. For example, the transmitter 100 notifies the receiver 200 of the PWM mode switched to by including a preamble having a pattern associated with the PWM mode switched to in a packet. It is to be noted that the pattern of the preamble is changed by time lengths $C_0$, $C_1$, $C_2$, and $C_3$.

However, in the case of the visible light signal illustrated in FIG. 149, the packet includes two data parts, and it takes long time to transmit the packet. For example, when the transmitter 100 is a DLP projector, the transmitter 100 projects a video of each of red, green, and blue in time division. Here, the transmitter 100 may transmit the visible light signal when projecting the video of red. This is because the visible light signal which is transmitted at this time has a red wavelength and thus is easily received by the receiver 200. The period during which the video of red is being projected is, for example, 1.5 ms. It is to be noted that this period is hereinafter referred to as a red video projection period. It is difficult to transmit the above-described packet including the L data part, the preamble, and the R data part in such a short red video projection period.

In view of this, a packet including only the R data part out of the two data parts is assumed.

FIG. 150 is a diagram illustrating another example of a specific configuration of a visible light signal according to this embodiment.

The packet of the visible light signal illustrated in FIG. 150 does not include any L data part unlike the example illustrated in FIG. 149. The packet of the visible light signal illustrated in FIG. 150 includes ineffective data and an average luminance adjustment part instead.

The ineffective data alternately indicates luminance values of High and Low along the time axis. In other words, the ineffective data indicates a High luminance value during a time length $A_0$, and a Low luminance value during a time length $A_1$ next to the time length $A_0$. The time length $A_0$ is 100 μs for example, and the time length $A_1$ is indicated according to $A_1=W_0-W_1$ for example. This ineffective data indicates that the packet does not include any L data part.

The average luminance adjustment part alternately indicates luminance values of High and Low along the time axis. In other words, the ineffective data indicates a High luminance value during a time length $B_0$, and a Low luminance value during a time length $B_1$ next to the time length $B_0$. The time length $B_0$ is represented according to $B_0=100+W_1\times((3-y_0)+(3-y_2))$ for example, and the time length $B_1$ is represented according to $B_1=W_1\times((7-y_1)+(7-y_3))$.

With such an average luminance adjustment part, it is possible to maintain the average luminance of the packet to be constant irrespective of whether the signal to be transmitted is the signal $y_0$, $y_1$, $y_2$, or $y_3$. In other words, the total sum (that is total ON time) of the time lengths in which the luminance value is High in the packet can be set to 790 according to $A_0+C_0+C_2+D_0+D_2+B_0=790$. Furthermore, the total sum (that is total OFF time) of time lengths in which the luminance value is Low in the packet can be set to 910 according to $A_1+C_1+C_3+D_1+D_3+B_1=910$.

However, even in the case of the visible light signal configured as such, it is impossible to shorten an effective time length $E_1$ that is a part of an entire time length $E_0$ in the packet. The effective time length $E_1$ is time from when a High luminance value firstly appears in the packet to when the last appearing High luminance ends. This time is required by the receiver 200 to demodulate or decode the packet of the visible light signal. More specifically, the effective time length $E_1$ is represented according to $E_1=A_0+A_1+C_0+C_1+C_2+C_3+D_0+D_1+D_2+D_3+B_0$. It is to be noted that the entire time length $E_0$ is represented according to $E_0=E_1+B_1$.

In other words, the effective time length $E_1$ is 1700 μs at maximum even in the case of the visible light signal having the configuration illustrated in FIG. 150, and thus it is difficult for the transmitter 100 to keep transmitting a packet only during the effective time length $E_1$ in the red video projection period.

In view of this, in order to shorten the effective time length $E_1$ and maintain the average luminance of the packet to be constant irrespective of the signal to be transmitted, it is assumed to adjust also the High luminance value in addition to the time length of each of the High and Low luminance values.

FIG. 151 is a diagram illustrating another example of a specific configuration of a visible light signal according to this embodiment.

In the case of the packet of the visible light signal illustrated in FIG. 151, unlike the example illustrated in FIG. 150, the time length $B_0$ of the High luminance value of an average luminance adjustment part is fixed to the shortest time of 100 μs irrespective of a signal to be transmitted in order to shorten an effective time length $E_1$. Instead, in the case of the packet of the visible light signal illustrated in FIG. 151, the High luminance value is adjusted according to variables $y_0$ and $y_2$ included in the signal to be transmitted, in other words, according to time lengths $D_0$ and $D_2$. For example, when the time lengths $D_0$ and $D_2$ are short, the transmitter 100 adjusts the High luminance value to a large value as illustrated in (a) of FIG. 151. When the time lengths $D_0$ and $D_2$ are long, the transmitter 100 adjusts the High luminance value to a small value as illustrated in (b) of FIG. 151. More specifically, when the time lengths $D_0$ and $D_2$ are each the shortest $W_0$ (for example, 100 μs), the High luminance value indicates a brightness of 100%. When the time lengths $D_0$ and $D_2$ are each the longest "$W_0+3W_1$" (for example, 200 μs), the High luminance value indicates a brightness of 77.2%.

In the case of the packet of the visible light signal as such, it is possible to set a total sum of time lengths in which the luminance value is High (that is, a total ON time) to be, for example, in a range from 610 to 790 according to $A_0+C_0+C_2+D_0+D_2+B_0=610$ to 790. Furthermore, it is possible to set the total sum of time lengths in which the luminance value is Low (that is total OFF time) to 910 according to $A_1+C_1+C_3+D_1+D_3+B_1=910$.

However, in the case of the visible light signal illustrated in FIG. 151, it is impossible to shorten the maximum time length although it is possible to shorten the shortest time length of each of the entire time length $E_0$ and the effective time length $E_1$ in the packet, compared with the example illustrated in FIG. 150.

In view of this, in order to shorten the effective time length $E_1$ and maintain the average luminance of the packet irrespective of the signal to be transmitted, it is assumed to selectively use an L data part and an R data part as the data part included in the packet according to the signal to be transmitted.

FIG. 152 is a diagram illustrating another example of a specific configuration of a visible light signal according to this embodiment.

In the case of the visible light signal illustrated in FIG. 152, unlike the example illustrated in FIGS. 149 to 151, in order to shorten an effective time length, a packet including an L data part and a packet including an R data part are selectively used according to the total sum of variables $y_0$ to $y_3$ which are signals to be transmitted.

In other words, when the total sum of the variables $y_0$ to $y_3$ is greater than or equal to 7, the transmitter 100 generates a packet including only the L data part out of the two data parts as illustrated in (a) of FIG. 152. Hereinafter, this packet is referred to as an L packet. In addition, when the total sum of the variables $y_0$ to $y_3$ is greater than or equal to 6, the transmitter 100 generates a packet including only the R data part out of the two data parts as illustrated in (b) of FIG. 152. Hereinafter, this packet is referred to as an R packet.

The L packet includes an average luminance adjustment part, an L data part, a preamble, and ineffective data, as illustrated in (a) in FIG. 152.

The average luminance adjustment part of the L packet indicates a Low luminance value during a time length $B'_0$ without indicating any High luminance value. The time length $B'_0$ is indicated according to, for example, $B'_0=100+W_1\times(y_0+y_1=+y_2+y_3-7)$.

The ineffective data of the L packet alternately indicates luminance values of High and Low along a time axis. In other words, the ineffective data indicates a High luminance value during a time length $A'_0$, and a Low luminance value a time length $A'_1$ next to the time length $A'_0$. The time length $A'_0$ is indicated according to $A'_0=W_0-W_1$, and is 80 μs for example, and the time length $A'_1$ is 150 μs for example. This ineffective data indicates that the packet including the ineffective data does not include any R data part.

In the case of the L packet as such, an entire time length $E'_0$ is represented according to $E'_0=5W_0+12W_1+4b+230=1540$ μs. In addition, an entire time length $E'_1$ is a time length according to the signal to be transmitted, and is in the range from 900 to 1290 μs. While the entire time length $E'_0$ is 1540 μs which is constant, the total sum of time lengths in which the luminance value is High (that is, the total ON time) changes within the range from 490 to 670 μs according to the signal to be transmitted. Accordingly, the transmitter 100 changes the High luminance value within the range from 100% to 73.1% according to the total ON time, that is, time lengths $D_0$ and $D_2$ also in the L packet likewise the example illustrated in FIG. 151.

As illustrated in (b) of FIG. 152 likewise the example illustrated in FIG. 150, the R packet includes ineffective data, a preamble, an R data part, and an average luminance adjustment part.

Here, in the case of the R packet illustrated in (b) of FIG. 152, in order to shorten the effective time length $E_1$, the time length $B_0$ of the High luminance value in the average luminance adjustment part is fixed to the shortest time of 100 μs irrespective of the signal to be transmitted. In addition, in order to maintain the entire time length $E_1$ to be constant, the time length $B_1$ of the Low luminance value in the average luminance adjustment part is indicated, for example, according to $B_1=W_1\times(6-(y_0+y_1+y_2+y_3)$. Furthermore, also in the R packet illustrated in (b) of FIG. 152, the High luminance value is adjusted according to variables $y_0$ and $y_2$ included in the signal to be transmitted, that are, time lengths $D_0$ and $D_2$.

In the case of the R packet as such, the entire time length $E_0$ is represented according to $E_0=4W_0+6W_1+4b+260=1280$ μs irrespective of the signal to be transmitted. In addition, the effective time length $E_1$ is a time length according to the signal to be transmitted, and is in the range from 1100 to 1280 μs. While the entire time length $E_0$ is 1280 μs which is constant, the total sum of time lengths in which the luminance value is High (that is, the total ON time) changes within the range from 610 to 790 μs according to the signal to be transmitted. Accordingly, the transmitter 100 changes the High luminance value within the range from 80.3% to 62.1% according to the total ON time, that is, time lengths $D_0$ and $D_2$ also in the L packet likewise the example illustrated in FIG. 151.

In this way, in the visible light signal illustrated in FIG. 152, it is possible to shorten the maximum value of the effective time length in the packet. Accordingly, the transmitter 100 is capable of keeping transmitting a packet during the effective time length $E_1$ or $E'_1$ in the red video projection period.

Here, in the example illustrated in FIG. 152, the transmitter 100 generates an L packet when the total sum of variables $y_0$ to $y_3$ is greater than or equal to 7, and generates an R packet when the total sum of the variables $y_0$ to $y_3$ is less than or equal to 6. In other words, since the total sum of the variables $y_0$ to $y_3$ is an integer, the transmitter 100 generates the L packet when the total sum of the variables $y_0$ to $y_3$ is greater than 6, and generates the R packet when the total sum of the variables $y_0$ to $y_3$ is less than or equal to 6. In short, the threshold for switching packet types is 6 in this example. However, the threshold for switching packet types as such may be any one of values 3 to 10 without being limited to 6.

FIG. 153 is a diagram indicating relations between a total sum of the variables $y_0$ to $y_3$, an entire time length, and an effective time length. The entire time length indicated in FIG. 153 is a greater one of the entire time length $E_0$ of the R packet and the entire time length $E'_0$ of the L packet. The effective time length indicated in FIG. 153 is a greater one of the maximum value of the effective time length $E_1$ of the R packet and the maximum value of the effective time length $E'_1$ of the L packet. It is to be noted that, in the example indicated in FIG. 153, constants $W_0$, $W_1$, and b are respectively represented according to $W_0=110$ μs, $W_1=15$ μs, and b=100 μs.

The entire time length changes according to the total sum of the variables $y_0$ to $y_3$ as indicated in FIG. 153, and becomes the smallest when the total sum is a minimum value of approximately 10. The effective time length changes according to the total sum of the variables $y_0$ to $y_3$ as indicated in FIG. 153, and the total sum is a minimum value of approximately 3.

Accordingly, the threshold for switching packet types may be set within the range from 3 to 10 according to whether which one of the entire time length and the effective time length is shorten.

FIG. 154A is a flowchart indicating a transmitting method according to this embodiment.

The transmitting method according to this embodiment is a method for transmitting a visible light signal by changing the luminance of a light emitter, and includes a determining step S571 and a transmitting step S572. In the determining step S571, the transmitter 100 determines a luminance change pattern by modulating the signal. In the transmitting step S572, the transmitter 100 changes red luminance represented by a light source included in the light emitter according to the determined pattern, thereby transmitting the visible light signal. Here, the visible light signal includes data, a preamble, and a payload. In the data, a first luminance value and a second luminance value less than the first luminance value appear along a time axis, and the time length in which at least one of the first luminance value and the second luminance value is maintained is less than a first predetermined value. In the preamble, the first and second luminance values alternately appear along the time axis. In the payload, the first and second luminance values alternately appear along the time axis, and the time length in which each of the first and second luminance values is maintained is greater than the first predetermined value, and is determined according to the signal described above and a predetermined method.

For example, the data, the preamble, and the payload are the ineffective data, the preamble, and one of the L data part and the R data part illustrated in (a) and (b) of FIG. 152. In addition, for example, the first predetermined value is 100 μs.

In this way, as illustrated in (a) and (b) of FIG. 152, the visible light signal includes the payload of a waveform determined according to the signal to be modulated (that is, one of the L data part and the R data part), and does not include the two payloads. Accordingly, it is possible to shorten the visible light signal, that is, packets of the visible light signal. As a result, for example, even when light emission time of red light represented by the light source included in the light emitter is short, it is possible to transmit the packets of the visible light signal in the light emission period.

In addition, in the payload, the first luminance value which has the first time length, the second luminance value which has the second time length, the first luminance value which has a third time length, and the second luminance value which has a fourth time length may appear in this listed order. In this case, in the transmitting step S572, the transmitter 100 increases the value of a current that flows to the light source more when the sum of the first time length and the third time length is less than a second predetermined value, than when the sum of the first time length and the third time length is greater than the second predetermined value. Here, the second predetermined value is greater than the first predetermined value. It is to be noted that the second predetermined value is a value greater than 220 μs for example.

In this way, as illustrated in FIGS. 151 and 152, the current value of the light source is increased when the sum of the first time length and the third time length is small, and the current value of the light source is decreased when the sum of the first time length and the third time length is large. Accordingly, it is possible to maintain the average luminance of each of the packets of the data, preamble, and payloads to be constant irrespective of the signals.

In addition, in the payload, the first luminance value which has the first time length $D_0$, the second luminance value which has the second time length $D_1$, the first luminance value which has a third time length $D_2$, and the second luminance value which has a fourth time length $D_3$ may appear in this listed order. In this case, the total sum of the four parameters $y_k$ (k=0, 1, 2, and 3) obtained by the signal is less than or equal to a third predetermined value, each of the first to fourth time lengths $D_0$ to $D_3$ is determined according to $D_k=W_0+W_1\times y_k$ ($W_0$ and $W_1$ are each an integer greater than or equal to 0). For example, the third predetermined value is 3 as illustrated in (b) of FIG. 152.

In this way, as illustrated in (b) of FIG. 152, it is possible to generate the payload having a short waveform according to the signal while setting each of the first to fourth time lengths $D_0$ to $D_3$ to $W_0$ or greater.

In addition, when the total sum of the four parameters $y_k$ (k=0, 1, 2, and 3) is less than or equal to the third predetermined value, in the transmitting step S572, the data, the preamble, and the payload may be transmitted in the order of the data, the preamble, and the payload. It should be noted that the payload is the R data part in the example illustrated in (b) of FIG. 152.

In this way, as illustrated in (b) of FIG. 152, it is possible to notify, using data (that is, ineffective data) included in the packet of the visible light signal, the receiving apparatus which receives the packet of the fact that the packet does not include any L data part.

In addition, when the total sum of the four parameters $y_k$ (k=0, 1, 2, and 3) is greater than or equal to the third predetermined value, the first to fourth time lengths $D_0$ to $D_3$ are respectively determined according to $D_0=W_0+W_1\times(A-y_0)$, $D_1=W_0+W_1\times(B-y_1)$, $D_2=W_0+W_1\times(A-y_2)$, and $D_3=W_0+W_1\times(B-y_3)$ (A and B are each an integer greater than or equal to 0).

In this way, as illustrated in (a) of FIG. 152, it is possible to generate the payload having a short waveform according to the signal even when the above-described total sum is large while setting each of the first to fourth time lengths $D_0$ to $D_3$ (that are the first to fourth time lengths $D'_0$ to $D'_3$) to $W_0$ or greater.

In addition, when the total sum of the four parameters $y_k$ (k=0, 1, 2, and 3) is greater than the third predetermined value, in the transmitting step S572, the data, the preamble, and the payload may be transmitted in the order of the payload, the preamble, and the data. It is be noted that the payload in the example illustrated in (a) of FIG. 152 is the L data part.

In this way, as illustrated in (a) of FIG. 152, it is possible to notify, using data (that is, ineffective data) included in the packet of the visible light signal, the receiving apparatus which receives the packet of the fact that the packet does not include any R data part.

In addition, the light emitter includes a plurality of light sources including a red light source, a blue light source, and a green light source. In the transmitting step S572, a visible light signal may be transmitted using only the red light source from among the plurality of light sources.

In this way, the light emitter can display the video using the red light source, the blue light source, and the green light source, and to transmit the visible light signal having a wavelength which can be easily receivable to the receiver 200.

It is to be noted that the light emitter may be a DLP projector for example. The DLP projector may have a plurality of light sources including a red light source, a blue light source, and a green light source as described above, or may have only one light source. In other words, the DLP projector may include a single light source, a digital micro-mirror device (DMD), and a color wheel disposed between the light source and the DMD. In this case, the DLP projector transmits a packet of a visible light signal in a period during which red light is output among red light, blue light, and green light to be output from the light source to the DMD via the color wheel in time division.

FIG. 154B is a block diagram illustrating a configuration of the transmitter 100 according to this embodiment.

The transmitter 100 according to this embodiment is a transmitter which transmits a visible light signal by changing luminance of a light emitter, and includes a determination unit 571 and a transmission unit 572. The determination unit 571 determines a luminance change pattern by modulating a signal. The transmission unit 572 changes red luminance represented by the light source included in the light emitter according to the determined pattern, thereby transmitting the visible light signal. Here, the visible light signal includes data, a preamble, and a payload. In the data, a first luminance value and a second luminance value less than the first luminance value appear along a time axis, and the time length in which at least one of the first luminance value and the second luminance value is maintained is less than a first predetermined value. In the preamble, the first and second luminance values alternately appear along the time axis. In the payload, the first and second luminance values alternately appear along the time axis, and the time length in which each of the first and second luminance values is maintained is greater than the first predetermined value, and is determined according to the signal described above and a predetermined method.

The transmitter 100 as such executes the transmitting method indicated by the flowchart in FIG. 154A.

Embodiment 9

In present embodiment, similar to Embodiment 4 and the like, a display method and display apparatus, etc., that produce augmented reality (AR) using light ID will be described. Note that the transmitter and the receiver according to the present embodiment may include the same functions and configurations as the transmitter (or transmitting apparatus) and the receiver (or receiving apparatus) in any of the above-described embodiments. Moreover, the receiver according to the present embodiment may be implemented as, for example, a display apparatus.

FIG. 155 is a diagram illustrating a configuration of a display system according to Embodiment 9.

The display system 500 performs object recognition and augmented reality (mixed reality) display using a visible light signal.

As illustrated in, for example, FIG. 155, the transmitter 100 is implemented as a lighting apparatus, and transmits a light ID by changing luminance while illuminating the AR object 501. Since the AR object 501 is illuminated by light from the transmitter 100, the luminance of the AR object 501 changes in the same manner as the transmitter 100, which transmits the light ID.

The receiver 200 captures the AR object 501. In other words, the receiver 200 captures the AR object 501 for each of exposure times, namely the above-described normal exposure time and communication exposure time. With this, like described above, the receiver 200 obtains a captured display image and a decode target image which is a visible light communication image or a bright line image.

The receiver 200 obtains the light ID by decoding the decode target image. In other words, the receiver 200 receives the light ID from the AR object 501. The receiver 200 transmits the light ID to a server 300. The receiver 200 then obtains, from the server 300, the AR image P11 and recognition information associated with the light ID. The receiver 200 recognizes a region according to the recognition information as a target region in the captured display image. For example, the receiver 200 recognizes, as the target region, a region in which the AR object 501 is shown. The receiver 200 then superimposes AR image P11 on the target region and displays the captured display image superimposed with the AR image P11 on the display. For example, the AR image P11 is a video.

Once display or playback of the whole video of the AR image P11 is complete, the receiver 200 notifies the server 300 of the completion of the playback of the video. Having received the notification of the completion of the playback, the server 300 gives payment such as points to the receiver 200. Note that when the receiver 200 notifies the server 300 of the completion of the playback of the video, in addition to the completion of playback, the receiver 200 may also notify the server of personal information on the user of the receiver 200 and of a wallet ID for storing payment. The server 300 gives points to the receiver 200 upon receiving this notification.

FIG. 156 is a sequence diagram illustrating processing operations performed by the receiver 200 and the server 300.

The receiver 200 obtains a light ID as a visible light signal by capturing the AR object 501 (Step S51). The receiver 200 then transmits the light ID to the server 300 (Step S52).

Upon receiving the light ID (Step S53), the server 300 transmits the recognition information and the AR image P11 associated with the light ID to the receiver 200 (Step S54).

In accordance with the recognition information, the receiver 200 recognizes, for example, the region in which the AR object 501 as shown in the captured display image as the target region, and displays a captured display image superimposed with the AR image P11 in the target region on the display. The receiver 200 then starts playback of the video, which is the AR image P11 (Step S56).

Next, the receiver 200 determines whether playback of the whole video is complete or not (Step S57). If the receiver 200 determines that playback of the whole video is complete (Yes in Step S57), the receiver 200 notifies the server 300 of the completion of the playback of the video (Step S58).

Upon receiving the notification of the completion of playback from the receiver 200, the server 300 gives points to the receiver 200 (Step S59).

Here, as illustrated in FIG. 157, the server 300 may implement more strict conditions for giving points to the receiver 200.

FIG. 157 is a flowchart illustrating processing operations performed by the server 300.

The server 300 first obtains a light ID from the receiver 200 (Step S60). Next, the server 300 transmits the recognition information and the AR image P11 associated with the light ID to the receiver 200 (Step S61).

The server 300 then determines whether it has received notification of completion of playback of the video, i.e., the AR image P11, from the receiver 200 (Step S62). Here, when the server 300 determines that it has received notification of the completion of playback of the video (Yes in Step S62), the server 300 further determines whether the same AR image P11 has been played back on the receiver 200 in the past (Step S63). If the server 300 determines that the same AR image P11 has not been played back on the receiver 200 in the past (No in Step S63), the server 300 gives points to the receiver 200 (Step S66). On the other hand, if the server 300 determines that the same AR image P11 has been played back on the receiver 200 in the past (Yes in Step S63), the server 300 further determines whether a predetermined period of time has elapsed since the playback in the past (Step S64). For example, the predetermined period of time may be one month, three months, one year, or any given period of time.

Here, when the server 300 determines that the predetermined period of time has not elapsed (No in Step S64), the server 300 does not give points to the receiver 200. However, if the server 300 determines that the predetermined period of time has elapsed (Yes in Step S64), the server 300 further determines whether the current location of the receiver 200 is the different from the location at which the same AR image P11 was previously played back (hereinafter this location is also referred to as a previous playback location) (Step 565). If the server 300 determines that the current location of the receiver 200 is different from the previous playback location (Yes in Step 565), the server 300 gives points to the receiver 200 (Step S66). However, if the server 300 determines that the current location of the receiver 200 is the same as the previous playback location (No in Step S65), the server 300 does not give points to the receiver 200.

With this, since points are given to the receiver 200 depending on whether the whole AR image P11 is played back or not, it is possible to increase the desire of the user of the receiver 200 to play back the whole AR image P11. For example, data fees are costly for obtaining the AR image P11, which includes a large amount of data, from the server 300, so the user may stop the playback of the AR image P11 midway. However, by giving points, it is possible to have the whole AR image P11 to be played back. Note that the points may be a discount for data fees. Furthermore, points commensurate with the amount of data of the AR image P11 may be given to the receiver 200.

FIG. 158 is a diagram illustrating a communication example when the transmitter 100 and the receiver 200 are provided in vehicles.

Vehicle 200*n* includes the receiver 200 described above, and a plurality of vehicles 100*n* include the transmitter 100 described above. The plurality of vehicles 100*n* are, for example, driving in front of the vehicle 200*n*. Furthermore, the vehicle 200*n* is communicating with any given one of the plurality of vehicles 100*n* over radio waves.

Here, since the vehicle 200*n* knows it is communicating with any given one of the plurality of plurality of vehicles 100*n* in front of the vehicle 200*n* over radio waves, the vehicle 200*n* requests, via wireless communication, the communication partner vehicle 100*n* to transmit a visible light signal.

Upon receiving the request from the vehicle 200*n*, the communication partner vehicle 100*n* transmits a visible light signal rearward. For example, the communication partner vehicle 100*n* transmits the visible light signal by causing the rear lights to blink.

The vehicle 200*n* captures images of a forward area via an image sensor. With this, like described above, the vehicle 200*n* obtains the captured display image and the decode target image. The plurality of vehicles 100*n* driving in front of the vehicle 200*n* are shown in the captured display image.

The vehicle 200*n* identifies the position of the bright line pattern region in the decode target image, and, for example, superimposes a marker at the same position as the bright line pattern region in the captured display image. The vehicle 200*n* displays the captured display image superimposed with the marker on a display in the vehicle. For example, a captured display image superimposed with a marker on the rear lights of any given one of the plurality of vehicles 100*n* is displayed. This allows the occupants, such as the driver, of the vehicle 200*n* to easily know which vehicle 100*n* is the communication partner, by looking at the captured display image.

FIG. 159 is a flowchart illustrating processing operations performed by the vehicle 200*n*.

The vehicle 200*n* starts wireless communication with a vehicle 100*n* in the vicinity of the vehicle 200*n* (Step S71). At this time, when a plurality of vehicles are shown in the image obtained by the image sensor in the vehicle 200*n* capturing the surrounding area, an occupant of the vehicle 200*n* cannot know which of the plurality of vehicles is the wireless communication partner. Accordingly, the vehicle 200*n* requests the communication partner vehicle 100*n* to transmit a visible light signal wirelessly (Step S72). Having received the request, the communication partner vehicle 100*n* transmits the visible light signal. The vehicle 200*n* captures the surrounding area using the image sensor, and as a result, receives the visible light signal transmitted from the communication partner vehicle 100*n* (Step S73). In other words, as described above, the vehicle 200*n* obtains the captured display image and the decode target image. Then, the vehicle 200*n* identifies the position of the bright line pattern region in the decode target image, and superimposes a marker at the same position as the bright line pattern region in the captured display image. With this, even when a plurality of vehicles are shown in the captured display image, the vehicle 200*n* can identify a vehicle superimposed with the marker from among the plurality of vehicles as the communication partner vehicle 100*n* (Step S74).

FIG. 160 is a diagram illustrating an example of the display of an AR image by the receiver 200 according to the present embodiment.

The receiver 200 obtains a captured display image Pk and a decode target image, as a result of the image sensor of the receiver 200 capturing a subject, as illustrated in, for example, FIG. 54.

More specifically, the image sensor of the receiver 200 captures the transmitter 100 implemented as signage and person 21 next to the transmitter 100. The transmitter 100 is a transmitter described in any of the above embodiments, and includes one or more light emitting elements (e.g., LEDs), and a light transmitting plate 144 having a translucency like frosted glass. The one or more light emitting elements emits light inside the transmitter 100, and the light from the one or more light emitting elements is emitted out of the transmitter 100 through the light transmitting plate 144. As a result, the light transmitting plate 144 of the transmitter 100 is brightly illuminated. Such a transmitter 100 changes its luminance by causing the one or more light emitting elements to blink, and transmits a light ID (i.e., light identification information) by changing its luminance. This light ID is the visible light signal described above.

Here, the light transmitting plate 144 shows the message "hold smartphone over here". A user of the receiver 200 has the person 21 stand next to the transmitter 100, and instructs the person 21 to put his or her arm on the transmitter 100. The user then points the camera (i.e., the image sensor) of the receiver 200 toward the person 21 and the transmitter 100, and captures the person 21 and the transmitter 100. The receiver 200 obtains the captured display image Pk in which the transmitter 100 and the person 21 are shown, by capturing the transmitter 100 and the person 21 for a normal exposure time. Furthermore, the receiver 200 obtains a decode target image by capturing the transmitter 100 and the person 21 for a communication exposure time shorter than the normal exposure time.

The receiver 200 obtains the light ID by decoding the decode target image. In other words, the receiver 200 receives the light ID from the transmitter 100. The receiver 200 transmits the light ID to a server. The receiver 200 then obtains, from the server, the AR image P45 and recognition information associated with the light ID.

The receiver 200 recognizes a region in accordance with the recognition information as a target region in the captured display image Pk. For example, the receiver 200 recognizes, as the target region, a region in which the signage, which is the transmitter 100, is shown.

The receiver 200 then superimposes the AR image P45 onto the captured display image Pk so that the target region is covered and concealed by the AR image P45, and displays the captured display image Pk superimposed with the AR image P45 on the display 201. For example, the receiver 200 obtains an AR image P45 of a soccer player. In this case, the AR image P45 is superimposed onto the captured display image Pk so that the target region is covered and concealed by the AR image P45, and thus it is possible to display the captured display image Pk on which the soccer player is virtually present next to the person 21. As a result, the person 21 can be shown together with the soccer player in the photograph although the soccer player is not actually next to the person 21.

Here, the AR image P45 shows a soccer player extending his or her hand. Therefore, the person 21 extends his or her hand out to transmitter 100 so as to produce a captured display image Pk in which the person 21 is shaking hands with the AR image P45. However, the person 21 cannot see the AR image P45 superimposed on the captured display image Pk, and thus does not know whether they are correctly shaking hands with the soccer player in the AR image P45.

In view of this, the receiver 200 according to the present embodiment transmits the captured display image Pk as a live-view to the display apparatus D5, and causes the captured display image Pk to be displayed on the display of the display apparatus D5. The display in display apparatus D5 faces the person 21. Accordingly, the person 21 can know whether they are correctly shaking hands with the soccer player in the AR image P45 by looking at the captured display image Pk displayed on the display apparatus D5.

FIG. 161 is a diagram illustrating another example of the display of an AR image by the receiver 200 according to the present embodiment.

For example, as illustrated in FIG. 161, the transmitter 100 is implemented as digital signage for a music album, for example, and transmits a light ID by changing luminance.

The receiver 200 captures the transmitter 100 to repeatedly obtain a captured display image Pr and a decode target image, like described above. The receiver 200 obtains the light ID by decoding the decode target image. In other words, the receiver 200 receives the light ID from the transmitter 100. The receiver 200 transmits the light ID to a server. The receiver 200 then obtains first AR image P46, recognition information, first music content, and sub-image Ps46 associated with the album specified by the light ID from a server.

The receiver 200 begins playback of the first music content obtained from the server. This causes a first song, which is the first music content, to be output from a speaker on the receiver 200.

The receiver 200 further recognizes a region in accordance with the recognition information as a target region in the captured display image Pr. For example, the receiver 200 recognizes, as the target region, a region in which the transmitter 100 is shown. The receiver 200 then superimposes the first AR image P46 onto the target region and furthermore superimposes the sub-image Ps46 outside of the target region. The receiver 200 displays, on the display 201, the captured display image Pr superimposed with the first AR image P46 and the sub-image Ps46. For example, the first AR image P46 is a video related to the first song, which is the first music content, and the sub-image Ps46 is a still image related to the aforementioned album. The receiver 200 plays back the video of the first AR image P46 in synchronization with the first music content.

FIG. 162 is a diagram illustrating processing operations performed by the receiver 200.

For example, just like is illustrated in FIG. 161, the receiver 200 plays back the first AR image P46 and the first music content in synchronization, as illustrated in (a) in FIG. 162. Here, the user of the receiver 200 operates the receiver 200. For example, as illustrated in (b) in FIG. 162, the user makes a swipe gesture on the receiver 200. More specifically, the user contacts the tip of their finger over the first AR image P46 on the display 201 of receiver 200 and moves the tip of their finger laterally. Stated differently, the user slides the first AR image P46 laterally. In this case, the receiver 200 receives, from a server, second music content, which follows the first music content and is associated with the above-described light ID, and second AR image P46*c*, which follows the first AR image P46 and is associated with the above-described light ID. For example, the second music content is a second song, and the second AR image P46*c* is a video related to the second song.

The receiver 200 then switches the played back music content from the first music content to the second music content. In other words, the receiver 200 stops the playback of the first music content and starts the playback of the second song, which is the second music content.

At this time, the receiver 200 switches the image that is superimposed on the target region of the captured display image Pr from the first AR image P46 to the second AR image P46*c*. In other words, the receiver 20 stops the playback of the first AR image P46 and starts the playback of the second AR image P46*c*.

Here, the initially displayed picture included in the second AR image P46*c* is the same as the initially displayed picture included in the first AR image P46.

Accordingly, as illustrated in (a) in FIG. 162, when playback of the second song begins, the receiver 200 first displays the same picture as the initial picture included in the first AR image P46. Thereafter, the receiver 200 sequentially displays the second and subsequent pictures included in the second AR image P46*c*, as illustrated in (b) in FIG. 162.

Here, the user once again makes a swipe gesture on receiver 200, as illustrated in (b) in FIG. 162. In response to this action, the receiver 200 receives, from the server, third music content, which follows the second music content and is associated with the above-described light ID, and third AR image P46*d*, which follows the second AR image P46*c* and is associated with the above-described light ID, like described above. For example, the third music content is a third song, and the third AR image P46*d* is a video related to the third song.

The receiver 200 then switches the played back music content from the second music content to the third music content. In other words, the receiver 200 stops the playback of the second music content and starts the playback of the third song, which is the third music content.

At this time, the receiver 200 switches the image that is superimposed on the target region of the captured display image Pr from the second AR image P46*c* to the third AR image P46*d*. In other words, the receiver 20 stops the playback of the second AR image P46*c* and starts the playback of the third AR image P46*d*.

Here, the initially displayed picture included in the third AR image P46*d* is the same as the initially displayed picture included in the first AR image P46.

Accordingly, as illustrated in (a) in FIG. 162, when playback of the third song begins, the receiver 200 first displays the same picture as the initial picture included in the first AR image P46. Thereafter, the receiver 200 sequentially displays the second and subsequent pictures included in the third AR image P46*d*, as illustrated in (d) in FIG. 162.

Note that in the above example, as illustrated in (b) in FIG. 162, upon receiving an input of a gesture that slides (i.e., a swipe gesture) the AR image, which is a video, the receiver 200 displays the next video. However, note that the receiver 200 may display the next video when the light ID is recaptured instead of when such an input is received. Recapturing a light ID means reacquiring a light ID by the image sensor capturing the light ID. In other words, the receiver 200 repeatedly captures and obtains the captured display image and the decode target image, and when the bright line pattern region disappears and reappears from the repeatedly obtained decode target image, the light ID is recaptured. For example, when the image sensor of the receiver 200 facing the transmitter 100 is moved so as to face in another direction, the bright line pattern region disappears from the decode target image. When the image sensor is moved so as to face the transmitter 100 once again, the bright line pattern region appears in the decode target image. The light ID is then recaptured.

In this way, with the display method according to the present embodiment, the receiver 200 obtains the light ID (i.e., identification information) of the visible light signal by the image sensor performing capturing. The receiver 200 then displays the first AR image P46, which is the video associated with the light ID. Next, when the receiver 200 receives an input of a gesture that slides the first AR image P46, the receiver 200 displays, after the first AR image P46, the second AR image P46*c*, which is the video associated with the light ID. This makes it possible to easily display an image that is useful to the user.

Moreover, with the display method according to the present embodiment, an object may be located in the same position in the initially displayed picture in the first AR image P46 and in the initially displayed picture in the second AR image P46*c*, For example, in the example illustrated in FIG. 162, the initially displayed picture in the first AR image P46 and the initially displayed picture in the second AR image P46*c* are the same. Therefore, an object in these pictures is located in the same position. For example, as illustrated in (a) in FIG. 162, the artist, which is one example of an object, is located in the same position in the initially displayed picture in the first AR image P46 and in the initially displayed picture in the second AR image P46*c*. As a result, the user can easily ascertain that the first AR image P46 and the second AR image P46*c* are related to each other. Note that in the example illustrated in FIG. 162, the initially displayed picture in the first AR image P46 and the initially displayed picture in the second AR image P46*c* are the same, but so long as an object in those pictures is located in the same position, the pictures may be different.

Moreover, with the display method according to the present embodiment, when the light ID is reacquired by capturing performed by the image sensor, the receiver 200 displays a subsequent video associated with the light ID after the currently displayed video. This makes it possible to more easily display a video that is useful to the user.

Moreover, with the display method according to the present embodiment, as illustrated in FIG. 161, the receiver 200 displays the sub-image Ps46 outside of the region in which a video included in at least one of the first AR image P46 and the second AR image P46*c* is displayed. This makes it possible to more easily display a myriad of images that are useful to the user.

FIG. 163 is a diagram illustrating one example of a gesture made on receiver 200.

For example, as illustrated in FIG. 161 and FIG. 162, when an AR image is displayed on the display 201 of the receiver 200, the user swipes vertically, as illustrated in FIG. 163. More specifically, the user contacts the tip of their finger over the first AR image displayed on the display 201 of receiver 200 and moves the tip of their finger vertically. Stated differently, the user slides the AR image, such as the first AR image P46, vertically. In response to this, the receiver 200 obtains a different AR image associated with the above-described light ID from a server.

FIG. 164 is a diagram illustrating an example of an AR image displayed on the receiver 200.

When a swipe gesture, such as the gesture illustrated in FIG. 163, is received, the receiver 200 superimposes and displays the AR image P47 obtained from the server, which is one example of the above-described different AR image, on the captured display image Pr.

For example, the receiver 200 superimposes and displays, on the captured display image Pr, the AR image P47 as a still image illustrating an artist related to music content, like the examples illustrated in FIG. 146 and FIG. 160. Here, the AR image P47 is superimposed on the target region in the captured display image Pr, that is, on the region in which the transmitter 100, implemented as digital signage, is shown. Accordingly, like the examples illustrated in FIG. 146 and FIG. 160, when a person stands next to the transmitter 100, the captured display image Pr can be displayed such that the artist appears next to the person. As a result, the person can take a picture with the artist although the artist is not actually next to the person.

In this way, with the display method according to the present embodiment, when the receiver 200 receives an input of a gesture that slides the first AR image P46 horizontally, the receiver 200 displays the second AR image P46*c*, and when the receiver 200 receives an input of a gesture that slides the first AR image P46 vertically, the receiver 200 displays the AR image P47, which is a still image associated with the light ID. This makes it possible to easily display a myriad of images that are useful to the user.

FIG. 165 is a diagram illustrating an example of an AR image superimposed on a captured display image.

As illustrated in FIG. 165, when the receiver 200 superimposes AR image P48 onto captured display image Pr1, the receiver 200 may trim away part of the AR image P48 and superimpose only the remaining part onto the captured display image Pr1. For example, the receiver 200 may trim away the edge regions of the square AR image P48, and superimpose only the round center region of the AR image P48 onto the captured display image Pr1.

FIG. 166 is a diagram illustrating an example of an AR image superimposed on a captured display image.

The receiver 200 captures the transmitter 100 implemented as, for example, digital signage for a cafe. Capturing transmitter 100 results in the receiver 200 obtaining captured display image Pr2 and a decode target image, like described above. The transmitter 100, which is implemented as digital signage, appears as signage image 100*i* in the captured display image Pr2. The receiver 200 obtains the light ID by decoding the decode target image, and obtains, from a server, AR image P49 associated with the obtained light ID. The receiver 200 then recognizes the region on the upper side of the signage image 100*i* in the captured display image Pr2 as the target region, and superimposes the AR image P49 in the target region. The AR image P49 is, for example, a video of coffee being poured from a coffee pot. The video of the AR image P49 is such that the transparency of the region of the coffee being poured from the coffee pot increases with proximity to the bottom edge of the AR image P49. This makes it possible to display the AR image P49 such that the coffee appears to be flowing.

Note that the AR image P49 configured in this way may be any kind of video so long as the contour of the video is vague, such as a video of flames. When the AR image P49 is a video of flames, the transparency of the edge regions of the AR image 49 gradually increases outward. The transparency may also change over time. This makes it possible to display the AR image P49 as a flickering flame with striking realism.

Moreover, at least one video from among the first AR image P46, the second AR image P46*c*, and the third AR image P46*d* illustrated in FIG. 162 may be configured so as to have transparency as illustrated in FIG. 166.

In other words, with the display method according to the present embodiment, the transparency of a region of a video included in at least one of the first AR image P46 and the second AR image P46*c* may increase with proximity to an edge of the video. With this, when the video is displayed superimposed on the normal captured image, the captured display image can be displayed such that an object having a vague contour is present in the environment displayed in the normal captured image.

FIG. 167 is a diagram illustrating one example of the transmitter 100 according to the present embodiment.

The transmitter 100 is configured to be capable of transmitting information as an image ID even to receivers that are incapable of capturing images in visible light communication mode, that is to say, receivers that do not support light communication. In other words, like described above, the transmitter 100 is implemented as, for example, digital signage, and transmits a light ID by changing luminance. Moreover, line patterns 151 through 154 are drawn on the transmitter 100. Each of the line patterns 151 through 154 is an aligned pattern of a plurality of short, straight lines extending horizontally, and these straight lines are aligned spaced apart from one another vertically. In other words, each of the line patterns 151 through 154 is configured similar to a barcode. The line pattern 151 is arranged on the left side of letter A drawn on the transmitter 100, and the line pattern 152 is arranged on the right side of the letter A. The line pattern 153 is arranged on the letter B drawn on the transmitter 100, and the line pattern 154 is arranged on the letter C drawn on the transmitter 100. Note that the letters A, B, and C are mere examples; any sort of letters or images may be drawn on the transmitter 100.

Since receivers that do not support light communication cannot set the exposure time of the image sensor to the above-described communication exposure time, even if such receivers capture the transmitter 100, they cannot obtain the light ID from the capturing. However, by capturing the transmitter 100, such receivers can obtain a normal captured image (i.e., captured display image) in which the line patterns 151 through 154 are shown, and can thus obtain an image ID from the line patterns 151 through 154. Accordingly, receivers that do not support light communication can obtain an image ID from the transmitter 100 even though they cannot obtain a light ID from the transmitter 100, and can superimpose and display an AR image onto a captured display image, just like described above, by using the image ID instead of the light ID.

Note that the same image ID may be obtained from each of the line patterns 151 through 154, and mutually different image IDs may be obtained from the respective line patterns 151 through 154.

FIG. 168 is a diagram illustrating another example of the transmitter according to the present embodiment.

Transmitter 100*e* according to the present embodiment includes a transmitter main body 115 and a lenticular lens 116. Note that (a) in FIG. 168 shows a top view of the transmitter 100*e* and (b) in FIG. 168 shows a front view of the transmitter 100*e.*

The transmitter main body 115 has the same configuration as the transmitter 100 illustrated in FIG. 167. In other words, letters A, B, and C and line patterns accompanying the letters are drawn on the front surface of the transmitter main body 115.

The lenticular lens 116 is attached to the transmitter main body 115 so as to cover the front surface of the transmitter main body 115, that is to say, the surface of the transmitter main body 115 on which the letters A, B, and C and the line patterns are drawn.

Accordingly, the line patterns 151 through 154 can be made to appear differently when the transmitter 100*e* is viewed from the left-front, as shown in (c) in FIG. 168, and when the transmitter 100*e* is viewed from the right-front, as shown in (d) in FIG. 168.

FIG. 169 is a diagram illustrating another example of the transmitter 100 according to the present embodiment. Note that (a) in FIG. 169 illustrates an example of when an authentic transmitter 100 is captured by receiver 200*a*. Moreover, (b) in FIG. 169 illustrates an example of when transmitter 100*f*, which is a fake version of the authentic transmitter 100, is captured by the receiver 200*a*.

As illustrated in (a) in FIG. 169, the authentic transmitter 100 is configured to be capable of transmitting an image ID to a receiver that does not support light communication, just like in the example illustrated in FIG. 167. In other words, letters A, B, and C and line pattern 154, etc., are drawn on the front surface of the transmitter 100. Moreover, character string 161 is drawn on the front surface of transmitter 100. This character string 161 may be drawn with infrared reflective paint, infrared absorbent paint, or an infrared barrier coating. Accordingly, the character string 161 is not visible to the naked eye, but shows up in a normal captured image obtained by the image sensor of the receiver 200*a* capturing it.

The receiver 200*a* is a receiver that does not support light communication. Accordingly, even if the transmitter 100 were to transmit the above-described visible light signal, the receiver 200*a* would not be able to receive the visible light signal. However, if the receiver 200*a* captures the transmitter 100, the receiver 200*a* can obtain an image ID from a line pattern shown in the normal captured image obtained by the capturing. Moreover, if the character string 161 says, for example, "hold smartphone over here" in the normal captured image, the receiver 200*a* can determine that the transmitter 100 is authentic. In other words, the receiver 200 is capable of determining that the obtained image ID is not fraudulent. Stated differently, the receiver 200 can authenticate the image ID, based on whether the character string 161 shows up in the normal captured image or not. When the receiver 200 determines that the image ID is not fraudulent, the receiver 200 performs processes using the image ID, such as sending the image ID to a server.

However, fraudulent replicas of the above-described transmitter 100 may be produced. In other words, there may be cases in which the transmitter 100*f*, which is a fake version of the transmitter 100, is placed somewhere instead of the authentic transmitter 100. The letters A, B, and C and line pattern 154*f* are drawn on the front surface of the fake transmitter 100*f*. The letters A, B, and C and line pattern 154*f* are drawn on by a malicious person so as to resemble the letters A, B, and C and line pattern 154 drawn on the authentic transmitter 100. In other words, the line pattern 154*f* is similar to, but different from, the line pattern 154.

However, the malicious person cannot visualize the character string 161 drawn using infrared reflective paint, infrared absorbent paint, or an infrared barrier coating when producing a fraudulent replica of the authentic transmitter 100. Accordingly, the character string 161 is not drawn on the front surface of the fake transmitter 100*f*.

Thus, if the receiver 200*a* captures such a fake transmitter 100*f*, the receiver 200*a* obtains a fraudulent image ID from the line pattern shown in the normal captured image obtained by the capturing. However, as illustrated in (b) in FIG. 169, since the character string 161 does not show up in the normal captured image, the receiver 200*a* can determine that the image ID is fraudulent. As a result, the receiver 200 can prohibit processes that uses the fraudulent image ID.

FIG. 170 is a diagram illustrating one example of a system that uses the receiver 200 that supports light communication and the receiver 200*a* that does not support light communication.

For example, the receiver 200*a* that does not support light communication captures the transmitter 100. Note that just like in the example illustrated in FIG. 167, the line pattern 154 is drawn on the transmitter 100, but the character string 161 illustrated in FIG. 168 is not drawn on the transmitter 100. Accordingly, the receiver 200*a* can obtain an image ID from a line pattern shown in the normal captured image obtained by the capturing, but cannot authenticate the image ID. Thus, even if the image ID is fraudulent, the receiver 200*a* trusts the image ID and performs processes that use the image ID. For example, the receiver 200*a* requests the server 300 to perform processing associated with the image ID. The processing is, for example, transferring money to a fraudulent bank account.

On the other hand, the receiver 200 that supports light communication obtains both the light ID, which is the visible light signal, and the image ID, just as described above, by capturing the transmitter 100. The receiver 200 then determines whether the image ID matches the light ID. If the image ID is different from the light ID, the receiver 200 requests the server 300 to cancel the request to perform processing associated with the image ID.

Accordingly, even if requested to perform the processing associated with the image ID by the receiver 200*a* that does not support light communication, the server 300 cancels the request to perform the processing upon request from the receiver 200 that does support light communication.

With this, even if a line pattern 154 from which a fraudulent image ID can be obtained is drawn on the transmitter 100 by a malicious person, the request to perform processing associated with the image ID can be properly cancelled.

FIG. 171 is a flowchart illustrating processing operations performed by the receiver 200.

The receiver 200 obtains a normal captured image by capturing the transmitter 100 (Step S81). The receiver 200 obtains an image ID from a line pattern shown in the normal captured image (Step S82).

Next, the receiver 200 obtains a light ID from the transmitter 100 via visible light communication (Step S83). In other words, the receiver 200 obtains a decode target image by capturing the transmitter 100 in the visible light communication mode, and obtains the light ID by decoding the decode target image.

The receiver 200 then determines whether the image ID obtained in Step S82 matches the light ID obtained in Step S83 or not (Step S84). Here, when determined to match (Yes in Step S84), the receiver 200 requests the server 300 to perform processing associated with the light ID (Step S85). However, when determined to not match (No in Step S84), the receiver 200 requests the server 300 to cancel the request to perform processing associated with the light ID (Step S86).

FIG. 172 is a diagram illustrating an example of displaying an AR image.

For example, the transmitter 100 is implemented as a saber, and transmits a visible light signal as a light ID by parts of the saber other than the handle changing luminance.

As illustrated in (a) in FIG. 172, the receiver 200 captures the transmitter 100 from a location close to the transmitter 100. As described above, the captured display image Pr3 and the decode target image are repeatedly obtained while the receiver 200 is capturing the transmitter 100. Upon obtaining the light ID by decoding the decode target image, the receiver 200 transmits the light ID to a server. As a result, the receiver 200 obtains, from the server, the AR image P50 and recognition information, which are associated with the light ID. The receiver 200 recognizes a region in accordance with the recognition information as a target region in the captured display image Pr3. For example, the receiver 200 recognizes, as the target region, a region above the region in which part of the saber other than the handle is shown in the captured display image Pr3.

More specifically, as illustrated in the examples in FIG. 50 through FIG. 52, the identification information includes reference information for identifying a reference region in the captured display image Pr3, and target information indicating a relative position of the target region relative to the reference region. For example, the reference information indicates that the position of the reference region in the captured display image Pr3 is the same as the position of the bright line pattern region in the decode target image. Furthermore, the target information indicates that the target region is positioned above the reference region.

Accordingly, the receiver 200 identifies the reference region from the captured display image Pr3 based on the reference information. In other words, the receiver 200 identifies, as the reference region in the captured display image Pr3, a region that is in the same position as the position of the bright line pattern region in the decode target image. That is, the receiver 200 identifies, as the reference region, a region in which part of the saber other than the handle is shown in the captured display image Pr3.

The receiver 200 further recognizes, as the target region in the captured display image Pr3, a region in a relative position indicated by the target information as a reference for the position of the reference region. In the above example, since the target information indicates that the target region is positioned above the reference region, the receiver 200 recognizes a region above the reference region in the captured display image Pr3 as the target region. In other words, the receiver 200 recognizes, as the target region, a region above the region in which part of the saber other than the handle is shown in the captured display image Pr3.

The receiver 200 then superimposes the AR image P50 in the target region and displays the captured display image Pr3 superimposed with the AR image P50 on the display 201. For example, the AR image P50 is a video of a person.

Here, as illustrated in (b) in FIG. 172, the receiver 200 is farther away from the transmitter 100. Accordingly, the saber shown in the captured display image Pr3 is smaller. In other words, the size of the bright line pattern region of the decode target image is smaller. As a result, the receiver 200 reduces the size of the AR image P50 so as to conform to the size of the bright line pattern region. In other words, the receiver 200 adjusts the size of the AR image P50 so as to keep the ratio of the sizes of the bright line pattern region and the AR image P50 constant.

This makes it possible for the receiver 200 to display the captured display image Pr3 such that a person appears on top of the saber.

In this way, with the display method according to the present embodiment, the receiver 200 obtains the normal captured image by the image sensor performing capturing for the normal exposure time (i.e., the first exposure time). Moreover, by performing capturing for a communication exposure time (i.e., the second exposure time) that is shorter than the normal exposure time, the receiver 200 can obtain a decode target image including a bright line pattern region, which is a region of a pattern of a plurality of bright lines, and obtain a light ID by decoding the decode target image. Next, the receiver 200 identifies, in the normal captured image, a reference region that is located in the same position as the bright line pattern region in the decode target image, and based on the reference region, recognizes a region in which the video is to be overlapped in the normal captured image as a target region. The receiver 200 then superimposes the video in the target region. Note that the video may be a video included in at least one of the first AR image P46 and the second AR image P46*c* illustrated in, for example, FIG. 162.

The receiver 200 may recognize, as the target region in the normal captured image, a region that is above, below, left, or right of the reference region.

With this, as illustrated in, for example, FIG. 50 through FIG. 52 and FIG. 172, the target region is recognized based on the reference region, and since the video is to be superimposed in that target region, it is possible to easily improve the degree of freedom of the region in which the video is to be superimposed.

Moreover, with the display method according to the present embodiment, the receiver 200 may change the size of the video in accordance with the size of the bright line pattern region. For example, the receiver 200 may increase the size of the video with an increase in the size of the bright line pattern region.

With this configuration, as illustrated in FIG. 172, since the size of the video changes in accordance with the size of the bright line pattern region, compared to when the size of the video is fixed, the video can be displayed such that the object displayed by the video appears more realistic.

[Summary of Embodiment 9]

FIG. 173A is a flowchart illustrating a display method according to one aspect of the present disclosure.

A display method according to one aspect of the present disclosure is a display method that displays an image, and includes steps SG1 through SG3. In other words, the display apparatus, which is the receiver 200 described above, obtains the visible light signal as identification information (i.e., a light ID) by capturing by the image sensor (Step SG1). Next, the display apparatus displays a first video associated with the light ID (Step SG2). Upon receiving an input of a gesture that slides the first video, the display apparatus displays a second video associated with the light ID after the first video (Step SG3).

FIG. 173B is a block diagram illustrating a configuration of a display apparatus according to one aspect of the present disclosure.

Display apparatus G10 according to one aspect of the present disclosure is an apparatus that displays an image, and includes obtaining unit G11 and display unit G12. Note that the display apparatus G10 is the receiver 200 described above. The obtaining unit G11 obtains the visible light signal as identification information (i.e., a light ID) by capturing by the image sensor. Next, the display unit G12 displays a first video associated with the light ID. Upon receiving an input of a gesture that slides the first video, the display unit G12 displays a second video associated with the light ID after the first video.

For example, the first video is the first AR image P46 illustrated in FIG. 162, and the second video is the second AR image P46*c* illustrated in FIG. 162. With the display method and the display apparatus G10 illustrated in FIG. 173A and FIG. 173B, respectively, upon receiving an input of a gesture that slides the first video, that is, a swipe gesture, a second video associated with the identification information is displayed after the first video. This makes it possible to easily display an image that is useful to the user.

It should be noted that in the embodiment described above, each of the elements may be constituted by dedicated hardware or may be obtained by executing a software program suitable for the element. Each element may be obtained by a program execution unit such as a CPU or a processor reading and executing a software program recorded on a recording medium such as a hard disk or a semiconductor memory. For example, the program causes a computer to execute a display method illustrated in the flowcharts of FIG. 156, FIG. 157, FIG. 159, FIG. 171, and FIG. 173A.

Embodiment 10

In the present embodiment, similar to Embodiments 4 and 9, a display method and display apparatus, etc., that produce augmented reality (AR) using light ID will be described. Note that the transmitter and the receiver according to the present embodiment may include the same functions and configurations as the transmitter (or transmitting apparatus) and the receiver (or receiving apparatus) in any of the above-described embodiments. Moreover, the receiver according to the present embodiment may be implemented as, for example, a display apparatus.

FIG. 174 is a diagram illustrating one example of an image drawn on the transmitter according to the present embodiment. FIG. 175 is a diagram illustrating another example of an image drawn on the transmitter according to the present embodiment.

Just like the example illustrated in FIG. 167, the transmitter 100 is configured to be capable of transmitting information as an image ID even to receivers that are incapable of capturing images in visible light communication mode, that is to say, receivers that do not support light communication. In other words, transmission image Im1 or Im2, which is approximately quadrangular, is drawn on the transmitter 100. In other words, like described above, the transmitter 100 is implemented as, for example, digital signage, and transmits a light ID by changing luminance. Note that the transmitter 100 may include a light source and directly transmit the light ID to the receiver 200 by changing the luminance of the light source. Alternatively, the transmitter 100 may include a light source and illuminate transmission image Im1 or Im2 with light from the light source, and transmit the light that reflects off the transmission image Im1 or Im2 as a light ID to the receiver 200.

Such transmission image Im1 or Im2 drawn on the transmitter 100 is approximately quadrangular, as illustrated in FIG. 174 and FIG. 175. The transmission image Im1 or Im2 includes an approximately quadrangular base image Bi1 or Bi2 and a line pattern 155*a* or 155*b* added to the base image.

In the example illustrated in FIG. 174, the line pattern 155*a* includes an aligned pattern of short straight lines arranged along the four sides of the base image Bi1 so that each of the straight lines extends perpendicular to the direction in which the side along with they are arranged extends. In other words, when a logotype is drawn on the base image on the transmitter 100, a signal is embedded in the periphery of the logotype. Note that the short straight lines included in the line pattern are hereinafter referred to as "short lines".

In the example illustrated in FIG. 174, the short lines included in the line pattern 155*a* are formed so as to be less dense with proximity to the center of the transmitter 100, i.e., the center of the base image Bi1. This makes the line pattern 155*a* less noticeable even when the line pattern 155*a* is added to base image Bi1.

Note that in the example illustrated in FIG. 174, the line pattern 155*a* is not, but may be, disposed at the corners of the base image Bi1. When the corners of the base image Bi1 are rounded, the line pattern 155*a* need not be disposed at the corners.

In contrast, in the example illustrated in FIG. 175, the line pattern 155*b* is disposed inside frame lines w extending along the edges of base image Bi2. For example, the base image Bi2 is formed by drawing the quadrangular frame lines w so as to surround the logotype (specifically, the string of letters "ABC"). The line pattern 155*b* is an aligned pattern of short lines aligned along the quadrangular frame lines w. The short lines extend perpendicular to the frame lines w. Moreover, the short lines are disposed within the frame lines w.

Note that in the example illustrated in FIG. 175, the line pattern 155*b* is not, but may be, disposed at the corners of the frame lines w. When the corners of the frame lines w are rounded, the line pattern 155*b* need not be disposed at the corners.

FIG. 176 is a diagram illustrating an example of the transmitter 100 and the receiver 200 according to the present embodiment.

For example, just like in the example illustrated in FIG. 168, the transmitter 100 may include the lenticular lens 116, as illustrated in FIG. 176. This lenticular lens 116 is attached to the transmitter 100 so as to cover regions of the transmission image Im2 drawn on the transmitter 100, excluding the frame lines w.

By capturing the transmitter 100, the receiver 200 can obtain a normal captured image (i.e., captured display image) in which the line pattern 155*b* is shown, and can thus obtain an image ID from the line pattern 155*b*. Here, the receiver 200 prompts the user of the receiver 200 to operate the receiver 200. For example, the receiver 200 displays the message "please move the receiver" when capturing an image of the transmitter 100. As a result, the receiver 200 is moved by the user. At this time, the receiver 200 determines whether there is a change in the base image Bi2 in the transmitter 100, i.e., the transmission image Im2 shown in the normal captured image, to authenticate the obtained image ID. For example, when the receiver 200 determines that the logotype in the base image Bi2 has changed from ABC to DEF, the receiver 200 determines that the obtained image ID is the correct ID.

The above-described transmission image Im1 or Im2 may be drawn on the transmitter 100 that transmits the light ID. Moreover, the above-described transmission image Im1 or Im2 may transmit the light ID by being illuminated with that is light from the transmitter 100 and includes the light ID, and reflecting that light. In such cases, the receiver 200 can obtain, via capturing, the image ID of the transmission image Im1 or Im2 and the light ID. At this time, the light ID and the image ID may be the same, and, alternatively, part of the light ID and the image ID may be the same.

Moreover, the transmitter 100 may turn on the lamp when the transmission switch is switched on, and turn off the lamp after ten second of it being on. The transmitter 100 transmits the light ID while the lamp is on. In such cases, the receiver 200 may obtain the image ID, and when the transmission switch is switched on, when the brightness of the transmission image shown in the normal captured image suddenly changes, the receiver 200 may determine that the image ID is the correct ID. Alternatively, the receiver 200 may obtain the image ID, and when the transmission switch is switched on, the receiver 200 may determine that the image ID is the correct ID if the transmission image shown in the normal captured image becomes bright and then becomes dark again after elapse of a predetermined amount of time. This makes it possible to inhibit the transmission image Im1 or Im2 from being fraudulently copied and used.

FIG. 177 is a diagram for illustrating base frequency of the line pattern.

The encoding apparatus that generates the transmission image Im1 or Im2 determines the base frequency of the line pattern. At this time, for example, as illustrated in (a) in FIG. 177, when the base image added with the line pattern is quadrilateral that is horizontally long, the encoding apparatus converts the base image into a square, like shown in (b) in FIG. 177. At this time, for example, the quadrilateral base image is converted so that the long sides are the same length as the short sides.

Next, as illustrated in (c) in FIG. 177, the encoding apparatus sets the length of the diagonal of the base image converted into a square as the base frequency cycle, and determines the frequency that is the reciprocal of the base cycle to be the base frequency. Note that the base image converted into a square is hereinafter referred to as a square base image.

FIG. 178A is a flowchart illustrating processing operations performed by the encoding apparatus. FIG. 178B is a diagram for explaining processing operations performed by the encoding apparatus.

First, the encoding apparatus adds an error detection code (also referred to as an error correction code) to information to be processed (Step S171), For example, as illustrated in FIG. 178B, the encoding apparatus adds an 8-bit error detection code to a 13-bit bit string, which is the information to be processed.

Next, the encoding apparatus divides the information added with the error detection code into N-bit (k+1) values xk. Note that k is an integer of one or more. For example, as illustrated in FIG. 178B, when k=6, the encoding apparatus divides the information into N=3-bits of 7 values xk. In other words, the information is divided into values x0, x1, x2, . . . , x6 each of which indicates a 3-bit binary digit. For example, values x0, x1, and x2 are x0=010, x1=010, and x2=100.

Next, for each of the values x0 through x6, i.e., for each value xk, the encoding apparatus calculates frequency fk corresponding to value xk (Step S173). For example, for value xk, the encoding apparatus calculates, as the frequency fk corresponding to the value xk, a value that is (A+B×xk) times the base frequency. Note that A and B are positive integers. With this, as illustrated in FIG. 178B, frequencies f0 through f6 are calculated for the values x0 through x6, respectively.

Next, the encoding apparatus adds the positioning frequency fP ahead of the frequencies f0 through f6 (Step S174). At this time, the encoding apparatus sets the positioning frequency fP to a value less than A times the base frequency or a value greater than $(A+B\times2^{N-1})$ times the base frequency. With this, as illustrated in FIG. 178B, a positioning frequency fP that is different than frequencies f0 through f6 is inserted ahead of frequencies f0 through f6.

Next, the encoding apparatus sets (k+2) specific regions at the edges of the square base image. Then, for each of the specific regions, the encoding apparatus varies the luminance value (or color) of the specific region by the frequency fk, along the direction in which the edges of the square base image extend, using the original color of the specific region as a reference (Step S175). For example, as illustrated in (a) or (b) in FIG. 178B, (k+2) specific regions JP, JO through 36 are set at the edges of the square base image. Note that when there are frame lines around the edges of the square base image, those frame lines are divided into (k+2) regions and the (k+2) regions are set as the specific regions. More specifically, the (k+2) specific regions are set clockwise around the four edges of the square base image in the following order: JP, JP0, JP1, JP2, JP3, JP4, JP5, and JP6. the encoding apparatus changes the luminance value (or color) by the frequency fk in each of the set specific regions. The line pattern is added to the square base image as a result of the changing of the luminance value.

Next, the encoding apparatus returns the aspect ratio of the square base image added with the line pattern to the aspect ratio of the original base image (Step S176). For example, the square base image attached with the line pattern that is illustrated in (a) in FIG. 178B is converted to a base image attached with the line pattern that is illustrated in (c) in FIG. 178B. In such cases, the square base image attached with the line pattern is vertically shrunken. Accordingly, as illustrated in (c) in FIG. 178, in the base image added with the line pattern, the width of the line patterns on the top and bottom of the base image is less than the width of the line patterns on the right and left.

Thus, in Step S175, when the line pattern is added to the square base image, the width of the line patterns added to the top and bottom of the square base image may be different from the width of the line patterns added to the right and left, as illustrated in (b) in FIG. 178B. In order to differentiate the widths, for example, an inverted ratio of the aspect ratio of the original base image may be used. In other words, the encoding apparatus determines the widths of the line patterns or the specific regions added to the top and bottom of the square base image to be the widths obtained by multiplying the above-described inverse ratio with the widths of the line patterns or the specific regions added to the right and left of the square base image. With this, in Step S176, even if the aspect ratio of the square base image added with the line pattern is returned to the original aspect ratio, the line patterns on the top and bottom of the base image and the line patterns on the right and left of the base image can be made the same width, as illustrated in (d) in FIG. 178B.

Furthermore, the encoding apparatus may add a frame of a different color than the (k+2) specific regions, around the periphery of the base image added with the line pattern, i.e., outside of the (k+2) specific regions (step S177). For example, a black frame Q1 may be added, as illustrated in FIG. 178B. This makes it easier to detect the (k+2) specific regions.

FIG. 179 is a flowchart illustrating processing operations performed by the receiver 200, which is the decoding apparatus.

First, the receiver 200 captures a transmission image (Step S181). Next, the receiver 200 performs edge detection on the normal captured image obtained via the capturing (Step S182), and further extracts the contour (Step S183).

Then, the receiver 200 performs the following steps S184 through S187 on regions including a quadrilateral contour of at least a predetermined size or regions including a rounded quadrilateral contour of at least a predetermined size, from among the extracted contours.

The receiver 200 converts the regions into square transparent regions (Step S184). More specifically, when a target region is a quadrilateral region, the receiver 200 performs the transparency conversion based on a corner of the quadrilateral region. When a target region is a rounded quadrilateral region, the receiver 200 extends the edges of the region and performs the transparency conversion based on the point of intersection of two of the extended edges.

Next, for each of the plurality of specific regions in the square region, the receiver 200 calculates the frequency for luminance change in the specific region (Step S185).

Next, the receiver 200 finds the specific region for the frequency fP, and based on the specific region for the frequency fP, lines up the frequencies fk for the specific regions arranged in order clockwise around the edges of the square region (Step S186).

Then, the receiver 200 performs the steps of S171 through S174 in FIG. 178A in reverse on the frequency string to decode the line pattern (Step S187). In other words, the receiver 200 can obtain information to be processed.

In the processing operations performed by the receiver 200, in Step S184, it is possible to correctly decode the line pattern in the transmission image, even when the transmission image is captured from angles other than face-on, by performing transparency conversion on the square region. Moreover, in Step S186, by arranging frequencies of the specific regions in order based on the base frequency fP, even when capturing the transmission image sideways or vertically inverted, the line pattern of the transmission image can be correctly decoded.

FIG. 180 is a flowchart illustrating processing operations performed by the receiver 200.

First, the receiver 200 determines whether the exposure time can be set to the communication exposure time, which is shorter than the normal exposure time (Step S191). In other words, the receiver 200 determines whether it itself supports or does not support light communication. Here, when the receiver 200 determines that the exposure time cannot be set to the communication exposure time (N in Step S191), the receiver 200 receives an image signal (i.e., an image ID) (Step S193). The communication exposure time is, for example, at most 1/2000th of a second.

However, when the receiver 200 determines that the exposure time can be set to the communication exposure time (Y in Step S191), the receiver 200 determines whether the line-scan time is registered in the terminal (i.e., the receiver 200) or the server (Step S192). Note that the line-scan time is the amount of time from the start of the exposure of one exposure line included in the image sensor to the start of the exposure of the next exposure line included in the image sensor, as illustrated in the examples in FIG. 101 and FIG. 102. If the line-scan time is registered, the receiver 200 decodes the decode target image using the registered line-scan time.

When the receiver 200 determines that the line-scan time is not registered (N in Step S192), the receiver 200 performs the processing in Step S193. However, when the receiver 200 determines that the line-scan time is registered (Y in Step S192), the receiver 200 receives the light ID, which is the visible light signal, using the line-scan time (Step S194).

Upon receiving the visible light signal, so long as the receiver 200 is set to the identity authentication mode for the visible light signal, the receiver 200 can authenticate the identicality of the image signal and the visible light signal (Step S195). Here, if the image signal and the visible light signal are different, the receiver 200 displays on the display a message or image indicating that the signals are different. Alternatively, the receiver 200 notifies the server that the signals are different.

FIG. 181A is a diagram illustrating one example of the configuration of a system according to the present embodiment.

This system according to the present embodiment includes a plurality of the transmitters 100 and the receiver 200. The transmitters 100 are implemented as self-propelled robots. For example, the robots are automatic cleaning robots or robots that communicate with people. The receiver 200 is implemented as a camera, such as a surveillance camera or an environmentally installed camera. Hereinafter, the transmitters 100 are referred to as robots 100, and the receiver 200 is referred to as a camera 200.

The robots 100 each transmit a light ID, which is a visible light signal, to the camera 200. The camera 200 receives the light ID transmitted from each robot 100.

FIG. 181B is a diagram illustrating processes performed by the camera 200 according to the present embodiment.

Each of the robots 100 is self-propelled. In such cases, first, the camera 200 captures images in a normal capturing mode, and detects a moving object as the robot 100 from the normal captured images (Step S221). Next, the camera 200 transmits, via radio wave communication, an ID transmission request signal prompting the detected robot 100 to transmit their ID (Step S225). Upon receiving the ID transmission request signal, the robot 100 starts transmitting, via visible light communication, the ID of the robot 100 (i.e., the light ID of the robot 100).

Next, the camera 200 switches the capturing mode from the normal capturing mode to the visible light recognition mode (Step S226). The visible light recognition mode is one type of the visible light communication mode. More specifically, in the visible light recognition mode, only specified exposure lines capturing an image of the robot 100 among all the exposure lines included in the image sensor of the camera 200 are used for the line scanning in the communication exposure time. In other words, the camera 200 performs line scanning on only those specific exposure lines, and does not expose the other exposure lines. By performing such line scanning, the camera 200 detects the ID (i.e., the light ID) from the robot 100 (Step S227).

Next, the camera 200 recognizes the current position of the robot 100 based on the position of the visible light signal, that is to say, the position at which the bright line pattern appears in the decode target image (i.e., bright line image), and the capture direction of the camera 200 (Step S228). The camera 200 then notifies the robot 100 and the server of the ID and current position of the robot 100, and the time of detection of the ID.

Next, the camera 200 switches the capturing mode from the visible light recognition mode to the normal capturing mode (Step S230).

Here, each of the robots 100 may propel itself while transmitting the robot detection signal. The robot detection signal is a visible light signal, and is a light signal of a frequency that can be recognized even when captured while the camera 200 is in the normal capturing mode. In other words, the frequency of the robot detection signal is lower than the frequency of the light ID.

In such cases, instead of when the camera 200 detects a moving object as the robot 100, the camera 200 may perform the processes of Steps S225 through S230 when the camera 200 detects the robot detection signal from the normal captured image (Step S223).

Moreover, each of the robots 100 may transmit a position recognition request signal via, for example, radio wave communication, and may propel itself while transmitting the ID via visible light communication.

In such cases, the camera 200 may perform the processes of Steps S226 through S230 when the camera 200 receives the position recognition request signal (Step S224). Note that there are cases in which the robot 100 is not captured in the normal captured image upon the camera 200 receiving the position recognition request signal. In such cases, the camera 200 may notify the robot 100 that the robot 100 is not captured. In other words, the camera 200 may notify the robot 100 that the camera 200 cannot recognize the position of the robot 100.

FIG. 182 is a diagram illustrating another example of the configuration of a system according to the present embodiment.

For example, the transmitter 100 includes a plurality of light sources 171, and the plurality of light sources 171 each transmit a light ID by changing luminance. This makes it possible to reduce the blind spots of camera 200. In other words, this makes it easier for the camera 200 to receive the light ID. Moreover, when the light sources 171 are captured by the camera 200, the camera 200 can more properly recognize the position of the robot 100 due to multipoint measurement. In other words, this improves the precision of the recognition of the position of the robot 100.

Moreover, the robot 100 may transmit different light IDs from the lights sources 171. In such cases, even when the camera 200 captures some but not all of the light sources 171 (for example, only one light source 171), the camera 200 can accurately recognize the position of the robot 100 from the light IDs from the captured light sources 171.

Moreover, the robot 100 may give payment, such as points, to the camera 200 when the current position of the robot 100 is notified from the camera 200.

FIG. 183 is a diagram illustrating another example of an image drawn on the transmitter according to the present embodiment.

Just like the examples illustrated in FIG. 174 and FIG. 175, the transmitter 100 is configured to be capable of transmitting information as an image ID even to receivers that are incapable of capturing images in visible light communication mode, that is to say, receivers that do not support light communication. Note that the image ID is also referred to as a frame ID. In other words, transmission image Im3, which is approximately quadrangular, is drawn on the transmitter 100. In other words, like described above, the transmitter 100 is implemented as, for example, digital signage, and transmits a light ID by changing luminance. Note that the transmitter 100 may include a light source and directly transmit the light ID to the receiver 200 by changing the luminance of the light source. More specifically, the transmission image Im3 is drawn on the front surface of a translucent board, and light from the light source shines toward the back surface of the board. As a result, the change in luminance of the light source appears as a change in luminance in the transmission image Im3, and the change in luminance of the transmission image Im3 transmits the light ID to the receiver 200 as a visible light signal. Alternatively, the transmitter 100 may be a display apparatus including a display, such as a liquid crystal display of an organic EL display. The transmitter 100 transmits the light ID by changing the luminance of the display, while displaying the transmission image Im3 on the display. Alternatively, the transmitter 100 may include a light source and illuminate transmission image Im3 with light from the light source, and transmit the light that reflects off the transmission image Im3 as a light ID to the receiver 200.

Such transmission image Im3 drawn on the transmitter 100 is approximately quadrangular, just like the transmission images Im1 and Im2 illustrated in FIG. 174 and FIG. 175. The transmission image Im3 includes an approximately quadrangular base image Bi3 and a line pattern 155*c* added to the base image Bi3.

In the example illustrated in FIG. 183, the line pattern 155*c* includes an aligned pattern of short straight lines (hereinafter also referred to as short lines) arranged along the four sides of the base image Bi3 so that each of the straight lines extends perpendicular to the direction in which the side along with they are arranged extends. Moreover, the line pattern 155*c* includes 32 blocks (referred to as specific regions above). These blocks are also hereinafter referred to as PHY symbols. The frequency index for each of the 32 blocks is −1, 0, 1, 2, or 3. The index −1 indicates 200 times the base frequency, the index 0 indicates 210 times the base frequency, the index 1 indicates 220 times the base frequency, the index 2 indicates 230 times the base frequency, and the index 3 indicates 240 times the base frequency. Here, the base frequency is the reciprocal of the length of the diagonal of the base image Bi3 (i.e., the base cycle), as described above. In other words, in blocks corresponding to an index of −1, short lines are arranged at a frequency equal to the base frequency×200. Stated differently, the interval between two adjacent short lines in the block is 1/200th of the diagonal of the base image Bi3. Accordingly, each of the above-described PHY symbols (i.e., blocks) in the present embodiment indicates a value from among −1, 0, 1, 2, and 3, by way of the aligned pattern.

Such a transmission image Im3 is captured as a subject by the image sensor in the receiver 200. In other words, the subject is rectangular from the perspective of the image sensor, and transmits a visible light signal by the light in the central region of the subject changing in luminance, and a barcode-style line pattern is disposed around the edge of the subject.

FIG. 184 is a diagram illustrating one example of the format of a MAC frame that makes up the frame ID.

A MAC (medium access control) frame includes a MAC header and a MAC payload. The MAC header is 4 bits. The MAC payload includes variable-length padding, variable-length ID1, and fixed-length ID2. When the MAC frame is 44 bits, ID2 is 5 bits, and when the MAC frame is 70 bits, ID2 is 3 bits. Padding is a string of bits from the left end up until the first "1" appears, such as "0000000000001", "0001, "01", or "1".

ID1 is the above-described frame ID, and is information that is the same as the light ID, which is the identification information indicated in the visible light signal. In other words, the visible light signal and the signal obtained from the line pattern contain the same identification information. With this, even if the receiver 200 cannot receive visible light signals, so long as the receiver 200 captures the transmission image Im3, the receiver 200 can obtain the same identification information as the visible light signal from the line pattern 155*c* in the transmission image Im3.

FIG. 185 is a diagram illustrating one example of the configuration of a MAC header.

For example, the bit of an address of "0" in the MAC header indicates the header version. More specifically, a bit value of "0" of an address of "0" indicates that the header version is 1.

The two bits of an address of "1-2" in the MAC header indicate the protocol. More specifically, when the two bits of the address of "1-2" are "00", the protocol of the MAC frame is TEC (International Electrotechnical Commission), when the two bits of the address of "1-2" are "01", the protocol of the MAC frame is LinkRay (registered trademark) Data. Moreover, when the two bits of the address of "1-2" are "10", the protocol of the MAC frame is IEEE (The Institute of Electrical and Electronics Engineers, Inc.).

The bit of an address of "3" in the MAC header indicates another protocol. More specifically, when the protocol of the MAC frame is IEC and the bit of an address of "3" is "0", the number of bits per packet is 4. When the protocol of the MAC frame is IEC and the bit of an address of "3" is "1", the number of bits per packet is 8. When the protocol of the MAC frame is LinkRay Data and the bit of an address of "3" is "0", the number of bits per packet is 32. Note that the number of bits per packet described above is the length of DATAPART (i.e., datapart length).

FIG. 186 is a diagram illustrating one example of a table for deriving packet division count.

The receiver 200 decodes the frame ID, which is ID1 included in the MAC frame, from the line pattern 155*c*, and derives the number of divisions to be made that corresponds with that frame ID. In visible light communication achieved through changing luminance, information to be transmitted and received is defined by light ID and packet division count, and even in communication using transmission images, in order to maintain compatibility with the visible light communication, this division count is required.

The receiver 200 according to the present embodiment references the table illustrated in FIG. 186, and using a pair of the ID1 bit value (hereinafter referred to as ID length) and the datapart length, derives the division count corresponding to the frame ID. For example, based on the bit of the address of "3" in the MAC header, the receiver 200 identifies how many bits the datapart length is, and further identifies the ID length, which is the length of ID1 of the MAC frame. Then, the receiver 200 finds the division count associated with the pair of the identified datapart length and ID length in the table illustrated in FIG. 186 to derive the division count. More specifically, if the datapart length is 4 bits and the ID length is 10 bits, the division count is derived as "5".

Note that when the receiver 200 cannot derive the division count based on the table illustrated in FIG. 186, that is to say, when the division count associated with the pair of the identified datapart length and ID length is not in the table, the receiver 200 may determine the division count to be "0".

Moreover, in the table illustrated in FIG. 186, the pair of a datapart length of 4 bits and an ID length of 14 bits is associated with division counts of 6 and 7. Thus, for example, when the frame ID is encoded, if the ID length is 15 bits, the division count may be set to "7". When the receiver 200 decodes the frame ID, if the datapart length is 4 bits and the ID length is 15 bits, the receiver 200 derives a division count of "7". Furthermore, the receiver 200 may ignore the leading first bit in the 15-bit ID1, and may derive the resulting 14-bit ID1 as the final frame ID.

Note that when the protocol of the frame ID is IEEE, the receiver 200 may provisionally derive a division count of "0", for example. Note that a division count of "0" indicates that division is not performed.

With this, the light ID and division count used in the visible light communication achieved through changing luminance can be properly applied as the frame ID and division count used in communication that uses transmission images as well. In other words, compatibility between visible light communication achieved through changing luminance and communication that uses transmission images can be maintained.

FIG. 187 is a diagram illustrating PHY encoding.

First, the encoding apparatus that encodes the frame ID adds an ECC (Error Check Code) to the MAC frame. Next, the encoding apparatus divides the MAC frame added with the ECC into a plurality of blocks. The number of bits of the plurality of blocks is N (N is, for example, 2 or 3). For each of the plurality of blocks, the encoding apparatus converts the value indicated by the N bits included in the block into gray code. Note that gray code is code in which two successive values differ in only one bit. Stated differently, in gray code, there is always a Hamming distance of 1 between adjacent codes. Errors are most likely to occur between adjacent symbols, but if this gray code is used, since there is no difference in a plurality of bits between symbols, it is possible to improve error detection.

For each of the plurality of blocks, the encoding apparatus converts the value converted into gray code, into a PHY symbol corresponding to that value. With this, for example, 30 PHY symbols assigned with symbol numbers (0 through 29) are generated. These PHY symbols correspond to the blocks in line pattern 155*c* illustrated in FIG. 183, and are patterns of short lines arranged spaced apart by a constant interval (i.e., striped patterns). For example, when the value converted to gray code indicates 1, as illustrated in FIG. 183, a block (i.e., PHY symbol) having the frequency equal to 220 times the base frequency is generated.

FIG. 188 is a diagram illustrating one example of a transmission image Im3 having PHY symbols.

As illustrated in FIG. 188, the above-described 30 PHY symbols and two header symbols are arranged in the periphery of the base image Bi3. Note that the header symbol is a symbol including a function of a header, from among the PHY symbols. The two header symbols include a header symbol for rotational positioning and a header symbol for specifying PHY version. The index of the frequency of these header symbols is −1, In other words, as illustrated in FIG. 183, the frequency of these header symbols is 200 times the base frequency. The header symbol for rotational positioning is a symbol for telling the receiver 200 the arrangement of the 30 PHY symbols. The receiver 200 recognizes the arrangement of the PHY symbols based on the position of the header symbol for rotational positioning. For example, such a header symbol for rotational positioning is disposed in the upper left edge of the base image Bi3.

The header symbol for specifying PHY version is a symbol for specifying the PHY version. For example, the PHY is specified based on the position of the header symbol for specifying PHY version relative to the header symbol for rotational positioning. The 30 PHY symbols described above, other than the header symbols, are arranged in order of ascending symbol number, from the right of the header symbol for rotational positioning going clockwise around the base image Bi3.

FIG. 189 is a diagram for explaining the two PHY versions.

The PHY versions include PHY version 1 and PHY version 2. In PHY version 1, the header symbol for specifying PHY version is arranged on the right of and adjacent to the header symbol for rotational positioning. In PHY version 2, the header symbol for specifying PHY version is not arranged on the right of and adjacent to the header symbol for rotational positioning. In other words, in PHY version 2, the header symbol for specifying PHY version is arranged such that a PHY symbol having a symbol number of 0 is disposed between the header symbol for rotational positioning and the header symbol for specifying PHY version. In this way, the positioning of the header symbol for specifying PHY version indicates the PHY version.

In PHY version 1, the number of bits N per PHY symbol is 2, ECC is 16 bits, and the MAC frame is 44 bits. A PHY body includes a MAC frame and an ECC, and is 60 bits. Moreover, the maximum ID length (ID1 length) is 34 bits, and the maximum length of ID2 is 5 bits.

In PHY version 2, the number of bits N per PHY symbol is 3, ECC is 20 bits, and the MAC frame is 70 bits. A PHY body includes a MAC frame and an ECC, and is 90 bits. Moreover, the maximum ID length (ID1 length) is 62 bits, and the maximum length of ID2 is 3 bits.

FIG. 190 is a diagram for explaining gray code.

In PHY version 1, the number of bits N is 2. In such cases, in the gray code conversion in FIG. 187, the binary values of "00, 01, 10, and 11" corresponding to the decimals "0, 1, 2, and 3" are converted into gray code values of "00, 01, 11, and 10".

In PHY version 2, the number of bits N is 3. In such cases, in the gray code conversion in FIG. 187, the binary values of "000, 001, 010, 011, 100, 101, 110, and 111" corresponding to the decimals "0, 1, 2, 3, 4, 5, 6, and 7" are converted into gray code values of "000, 001, 011, 010, 110, 111, 101, and 100".

FIG. 191 illustrates one example of decoding processes performed by the receiver 200.

The receiver 200 captures the transmission image Im3 on transmitter 100, and based on the position of the header symbol (PHY header symbol) included in the line pattern 155*c* of the captured transmission image Im3, recognizes the PHY version (Step S601). Note that the receiver 200 may determine whether visible light communication is possible or not, and when visible light communication is not possible, may capture the transmission image Im3. In such cases, the receiver 200 obtains a captured image by capturing a subject via the image sensor, and extracts at least one contour by performing edge detection on the captured image. Furthermore, the receiver 200 selects, as a selected region, a region including a quadrilateral contour of at least a predetermined size or regions including a rounded quadrilateral contour of at least a predetermined size, from among the at least one contour. There is a high probability that the transmission image Im3, which is the subject, will appear in the selected region. Accordingly, in Step S601, the receiver 200 recognizes the PHY version based on the position of the header symbol included in the line pattern 155*c* in the selected region.

Moreover, when the receiver 200 determines that visible light communication is possible in the above-described determining of the visible light communication, when capturing the subject, just as described in the above embodiments, the receiver 200 sets the exposure time of the image sensor to the first exposure time, and captures the subject for the first exposure time to obtain a decode target image including the identification information. More specifically, when the receiver 200 determines that visible light communication is possible in the above-described determining of the visible light communication, when capturing the subject, just as described in the above embodiments, the receiver 200 obtains a decode target image including a bright line pattern of a plurality of bright lines corresponding to the plurality of exposure lines in the image sensor, and obtains a visible light signal by decoding the bright line pattern. On the other hand, when the receiver 200 determines that visible light communication is not possible in the above-described determining of the visible light communication, when capturing the subject, the receiver 200 sets the exposure time of the image sensor to the second exposure time, and captures the subject for the second exposure time to obtain a normal image as the captured image. Here, the above-described first exposure time is shorter than the second exposure time.

Next, the receiver 200 restores the MAC frame added with the ECC, based on the plurality of PHY symbols that make up the line pattern 155*c*, and checks the ECC (Step S602). As a result, the receiver 200 receives the MAC frame from the transmitter 100. Then, when the receiver 200 confirms that it has received the same MAC frame a specified number of times in a specified time (Step S603), the receiver 200 calculates the division count (i.e., the packet division count) (Step S604). In other words, the receiver 200 derives the division count for the MAC frame by using a combination of the ID length and the datapart length in the MAC frame, with reference to the table illustrated in FIG. 186. As a result, the division count is decoded, and the frame ID, which is ID1 of the MAC frame, is decoded. In other words, the receiver 200 obtains identification information from the line pattern in the above-described selected region. More specifically, when the receiver 200 determines that visible light communication is not possible in the above-described determining of the visible light communication, when capturing the subject, the receiver 200 obtains a signal from the line pattern in the normal image. Here, the visible light signal and the signal include the same identification information.

Note that there is a possibility that the transmitter 100 including the transmission image Im3 is a fraudulent copy. For example, a device such as a smartphone including a camera and a display may be fraudulently posing as the transmitter 100 including the transmission image Im3. More specifically, that smartphone uses its camera to capture the transmission image Im3 of the transmitter 100, and displays the captured transmission image Im3 on its display. With this, the smartphone can transmit the frame ID to the receiver 200 by displaying the transmission image Im3, just like the transmitter 100.

Accordingly, the receiver 200 may determine whether the transmission image Im3 displayed on a device, such as a smartphone, is fraudulent or not, and when the receiver 200 determines the transmission image Im3 to be fraudulent, may prohibit decoding or usage of the frame ID from the fraudulent transmission image Im3.

FIG. 192 is a diagram illustrating a method for detecting the fraudulence of the transmission image Im3 performed by the receiver 200.

For example, the transmission image Im3 is quadrilateral. If the transmission image Im3 is fraudulent, there is a high probability that the frame of the quadrilateral transmission image Im3 is skewed relative to the frame of the display that displays the transmission image Im3, in the same plane. However, if the transmission image Im3 is authentic, the frame of the quadrilateral transmission image Im3 is not skewed relative to the above-described frame, in the same plane.

Moreover, if the transmission image Im3 is fraudulent, there is a high probability that the frame of the quadrilateral transmission image Im3 is skewed depthwise relative to the frame of the display that displays the transmission image Im3. However, if the transmission image Im3 is authentic, the frame of the quadrilateral transmission image Im3 is not skewed depthwise relative to the above-described frame.

The receiver 200 detects fraudulence of the transmission image Im3 based on differences between such above-described authentic and fraudulent transmission images Im3.

More specifically, as illustrated in (a) in FIG. 192, the receiver 200 performs capturing via the camera to check the frame of the transmission image Im3 (the quadrilateral dashed line in (a) in FIG. 192) and the frame of the display of, for example, a smartphone displaying the transmission image Im3 (the quadrilateral solid line in (a) in FIG. 192). Next, for each pair of any given one of the two diagonals of the frame of transmission image Im3 and any given one of the two diagonals of the frame of the display, the receiver 200 calculates the angle between the two diagonals included in the pair. The receiver 200 determines whether an angle having the smallest absolute value among the angles calculated for each pair is greater than or equal to a first threshold (for example, 5 degrees) to determine whether the transmission image Im3 is fraudulent or not. In other words, the receiver 200 determines whether the transmission image Im is fraudulent or not based on whether the frame of the quadrilateral transmission image Im3 is skewed in the same plane relative to the frame of the display. If the angle having the smallest absolute value is greater than or equal to the first threshold, the receiver 200 determines that the transmission image Im3 is fraudulent, and if the angle is less than the first threshold, the receiver 200 determines that the transmission image Im3 is authentic.

Moreover, as illustrated in (b) in FIG. 192, the receiver 200 calculates a ratio (a/b) of the top and bottom sides of the transmission image Im3, and a ratio (A/B) and the top and bottom sides of the frame of the display of the smartphone. The receiver 200 then compares the two ratios. More specifically, the receiver 200 divides the smaller of the ratio (a/b) and the ratio (A/B) by the larger one. The receiver 200 determines whether the transmission image Im3 is fraudulent or not by determining whether the value obtained by the division described above is greater than or equal to a second threshold (for example, 0.9). In other words, the receiver 200 determines whether the transmission image Im is fraudulent or not based on whether the frame of the quadrilateral transmission image Im3 is skewed depthwise relative to the frame of the display. If the value obtained by the division described above is less than the second threshold, the receiver 200 determines that the transmission image Im3 is fraudulent, and if the angle is greater than or equal to the second threshold, the receiver 200 determines that the transmission image Im3 is authentic.

The receiver 200 decodes the frame ID from the transmission image Im3 only when the transmission image Im3 is authentic, and prohibits decoding of the frame ID from the transmission image Im3 when the transmission image Im3 is fraudulent.

FIG. 193 is a flowchart illustrating one example of decoding processes, including the fraudulence detection for transmission image Im3, performed by the receiver 200.

First, the receiver 200 captures the transmission image Im3 and detects the frame of the transmission image Im3 (Step S611). Next, the receiver 200 performs detection processing on the quadrilateral frame encapsulating the transmission image Im3 (Step S612). The quadrilateral frame is a frame that surrounds the outer perimeter of the quadrilateral display of the above-described device, such as a smartphone. Here, the receiver 200 determines whether a quadrilateral frame has been detected or not by performing the detection processing of Step S612 (Step S613). When the receiver 200 determines that a quadrilateral frame has not been detected (No in Step S613), the receiver 200 prohibits decoding of the frame ID (Step S619).

On the other hand, when the receiver 200 determines that a quadrilateral frame has been detected (Yes in Step S613), the receiver 200 calculates the angle between the diagonals of the frame of the transmission image Im3 and the detected quadrilateral frame (Step S614). Then, the receiver 200 determines whether the angle is less than the first threshold or not (Step S615). When the receiver 200 determines that the angle is greater than or equal to the first threshold (No in Step S615), the receiver 200 prohibits decoding of the frame ID (Step S619).

However, when the receiver 200 determines that the angle is less than the second threshold (Yes in Step S615), the receiver 200 performs division involving the ratio (a/b) of two sides of the frame of the transmission image Im3 and the ratio (A/B) of two sides of the quadrilateral frame (Step S616). Then, the receiver 200 determines whether the value obtained from the division is less than the second threshold or not (Step S617). When the receiver 200 determines that the obtained value is greater than or equal to the second threshold (No in Step S617), the receiver 200 decodes the frame ID (Step S618). However, when the receiver 200 determines that the angle is less than the second threshold (Yes in Step S617), the receiver 200 prohibits decoding of the frame ID (Step S619).

Note that in the above example, the receiver 200 prohibits the decoding of the frame ID based on the determination results of Step S613, S615, or S617. However, the receiver 200 may decode the frame ID first, and perform the above steps thereafter. In such cases, the receiver 200 prohibits use of, or discards, the decoded frame ID based on the determination results of Step S613, S615, or S617.

The transmission image Im3 may have a prism sticker adhered thereto. In such cases, just like in the example illustrated in FIG. 176, the receiver 200 determines whether the pattern or color of the prism sticker on the transmission image Im3 changes as a result of the receiver 200 moving. Then, when the receiver 200 determines there to be a change, the receiver 200 determines that the transmission image Im3 is authentic, and decodes the frame ID from the transmission image Im3. However, when the receiver 200 determines there to be no change, the receiver 200 determines that the transmission image Im3 is fraudulent, and prohibits the decoding of the frame ID from the transmission image Im3. Note that, just like described above, the receiver 200 may decode the frame ID first, and determine whether there is a change in the pattern or color thereafter. In such cases, when the receiver 200 determines that there is no change in the pattern or color, the receiver 200 prohibits use of, or discards, the decoded frame ID.

Moreover, the receiver 200 may determine whether the transmission image Im3 is authentic or not by forcing the user to bring the receiver 200 closer to the transmission image Im3. For example, the transmitter 100 transmits a visible light signal by causing the transmission image Im3 to emit light and causing the luminance of the transmission image Im3 to change. In such cases, when the receiver 200 captures the transmission image Im3, the receiver 200 displays a message prompting the user to bring the receiver 200 closer to the transmission image Im3. In response to the message, the user brings the camera (i.e., the image sensor) of the receiver 200 closer to the transmission image Im3. At this time, since the amount of light received from the transmission image Im3 drastically increases, the camera of the receiver 200 sets the exposure time of the image sensor to, for example, the smallest value. As a result, a striped pattern appears in the image displayed on the display as a result of the receiver 200 capturing the transmission image Im3. Note that if the receiver 200 supports light communication, the striped pattern clearly appears as a bright line pattern. However, if the receiver 200 does not support light communication, although the striped pattern does not clearly appear as a bright line pattern, it does appear faintly, and thus the receiver 200 can determine whether the transmission image Im3 is authentic or not based on whether the striped pattern appears or not. In other words, if the striped pattern appears, the receiver 200 determines that the transmission image Im3 is authentic, and if the striped pattern does not appear, the receiver 200 determines that the transmission image Im3 is fraudulent.

Note that, just like described above, the receiver 200 may decode the frame ID first, and perform the determining pertaining to the striped pattern thereafter. In such cases, when the receiver 200 determines that there is no striped pattern, the receiver 200 prohibits use of, or discards, the decoded frame ID.

(Variation)

The receiver 200 according to the present embodiment may be a display apparatus that includes the functions of the receiver 200 according to Embodiment 9. In other words, the display apparatus determines whether visible light communication is possible or not, and when possible, performs processing related to visible light or a light ID, just like the receiver 200 according to the above embodiments, including Embodiment 9. On the other hand, when the display apparatus cannot perform visible light communication, the above-described processing related to the transmission image or frame ID is performed. Note that here, visible light communication is a communication scheme including transmitting a signal as a result of a change in luminance of a subject, and receiving the signal by decoding a bright line pattern that is obtained by the image sensor capturing the subject and corresponds to the exposure lines of the sensor.

FIG. 194A is a flowchart illustrating a display method according to this variation.

A display method according to one aspect of the present disclosure is a display method that displays an image, and includes steps SG1 through SG4. First, the display apparatus, which is the receiver 200 described above, determines whether visible light communication is possible or not (Step SG4). When the display apparatus determines that visible light communication is possible (Yes in Step SG4), the display apparatus obtains a visible light signal as identification information (i.e., a light ID) by capturing a subject with the image sensor (Step SG1). Next, the display apparatus displays a first video associated with the light ID (Step SG2). Upon receiving an input of a gesture that slides the first video, the display apparatus displays a second video associated with the light ID after the first video (Step SG3).

FIG. 194B is a block diagram illustrating a configuration of a display apparatus according to this variation.

Display apparatus G10 according to one aspect of the present disclosure is an apparatus that displays an image, and includes determining unit G13, obtaining unit G11, and display unit G12. Note that the display apparatus G10 is the receiver 200 described above. The determining unit G13 determines whether visible light communication is possible or not. When visible light communication is determined to be possible by the determining unit G13, the obtaining unit G11 obtains the visible light signal as identification information (i.e., a light ID) by the image sensor capturing the subject. Next, the display unit G12 displays a first video associated with the light ID. Upon receiving an input of a gesture that slides the first video, the display unit G12 displays a second video associated with the light ID after the first video.

For example, the first video is the first AR image P46 illustrated in FIG. 162, and the second video is the second AR image P46*c* illustrated in FIG. 162. With the display method and the display apparatus G10 illustrated in FIG. 194A and FIG. 194B, respectively, upon receiving an input of a gesture that slides the first video, that is, a swipe gesture, a second video associated with the identification information is displayed after the first video. This makes it possible to easily display an image that is useful to the user. Moreover, since whether or not visible light communication is possible is determined in advance, it is possible to omit futile processes for attempting to obtain the visible light signal, and thus reduce the processing load.

Here, in the determination pertaining to visible light communication, when the display apparatus G10 determines that visible light communication is not possible, the display apparatus G10 may obtain the identification information (i.e., the frame ID) from the transmission image Im3. In such cases, the display apparatus G10 obtains a captured image by capturing a subject via the image sensor, and extracts at least one contour by performing edge detection on the captured image. Next, the display apparatus G10 selects, as a selected region, a region including a quadrilateral contour of at least a predetermined size or regions including a rounded quadrilateral contour of at least a predetermined size, from among the at least one contour. The display apparatus G10 then obtains identification information from the line pattern in that selected region. Note that "rounded quadrilateral" refers to a quadrilateral shape whose four corner are rounded into arcs.

With this, for example, the transmission image illustrated in FIG. 183 and FIG. 188 is captured as a subject, the region including the transmission image is selected as a selected region, and identification information is obtained from the line pattern in the transmission image. Accordingly, it is possible to properly obtain identification information, even when visible light communication is not possible.

When the display apparatus G10 determines that visible light communication is possible in the above-described determining of the visible light communication, when capturing the subject, the display apparatus G10 sets the exposure time of the image sensor to the first exposure time, and captures the subject for the first exposure time to obtain a decode target image including identification information. When the display apparatus G10 determines that visible light communication is not possible in the above-described determining of the visible light communication, when capturing the subject, the display apparatus G10 sets the exposure time of the image sensor to the second exposure time, and captures the subject for the second exposure time to obtain a normal image as the captured image. Here, the above-described first exposure time is shorter than the second exposure time.

With this, by switching the exposure time, it is possible to properly switch between obtaining identification information via visible light communication and obtaining identification information via capturing a transmission image.

Moreover, the above-described subject is rectangular from the perspective of the image sensor, and transmits a visible light signal by the light in the central region of the subject changing in luminance, and a barcode-shaped line pattern is disposed around the edge of the subject. When the display apparatus G10 determines that visible light communication is possible in the above-described determining of the visible light communication, when capturing the subject, the display apparatus G10 obtains a decode target image including a bright line pattern of a plurality of lines corresponding to the exposure lines in the image sensor, and obtains the visible light signal by decoding the bright line pattern. The visible light signal is, for example, a light ID. When the display apparatus G10 determines that visible light communication is not possible in the above-described determining of the visible light communication, when capturing the subject, the display apparatus G10 obtains a signal from the line pattern in the normal image. Here, the visible light signal and the signal include the same identification information.

With this, since the identification information indicated in the visible light signal and the identification information indicated in the signal of the line pattern are the same, even if visible light communication is not possible, it is possible to properly obtain the identification information indicated in the visible light signal.

FIG. 194C is a flowchart illustrating a communication method according to this variation.

The communication method according to one aspect of the present disclosure is a communication method that uses a terminal including an image sensor, and includes steps SG11 through SG13. In other words, the terminal, which is the receiver 200 described above, determines whether the terminal can perform visible light communication (Step SG11). Here, when the terminal determines that the terminal can perform visible light communication (Yes in Step SG11), the terminal executes the process of Step SG12. In other words, the terminal captures a subject that changes in luminance to obtain a decode target image, and obtains first identification information transmitted by the subject, from the striped pattern appearing in the decode target image (Step SG12). On the other hand, when the terminal determines that the terminal cannot perform visible light communication in the determining pertaining to visible light communication in Step SG11 (No in Step SG11), the terminal executes the process of Step SG13. In other words, the terminal obtains a captured image by the image sensor capturing a subject, extracts at least one contour by performing edge detection on the captured image, specifies a specific region from among the at least one contour, and obtains second identification information to be transmitted by the subject from the line pattern in the specific region (Step SG13). Note that the first identification information is, for example, a light ID, and the second identification information is, for example, an image ID or frame ID.

FIG. 194D is a block diagram illustrating a configuration of a communication apparatus according to this variation.

The communication apparatus G20 according to one aspect of the present disclosure is a communication apparatus that uses a terminal including an image sensor, and includes determining unit G21, first obtaining unit G22, and second obtaining unit G23.

The determining unit G21 determines whether the terminal is capable of performing visible light communication or not.

When the determining unit G21 determines that the terminal is capable of performing visible light communication, the first obtaining unit G22 captures, via the image sensor, a subject that changes in luminance to obtain a decode target image, and obtains first identification information transmitted by the subject, from the striped pattern appearing in the decode target image.

When the determining unit G21 determines that the terminal is not capable of performing visible light communication, the second obtaining unit G23 obtains a captured image by the image sensor capturing a subject, at least one contour is extracted by performing edge detection on the captured image, a predetermined specific region is specified from among the at least one contour, and second identification information to be transmitted by the subject from the line pattern in the specific region is obtained.

Note that the terminal may be included in the communication apparatus G20, and may be provided external to the communication apparatus G20. Moreover, the terminal may include the communication apparatus G20. In other words, the steps in the flowchart of FIG. 194C may be executed by the terminal or the communication apparatus G20.

With this, regardless of whether the terminal, such as the receiver 200, can perform visible light communication or not, the terminal can obtain the first identification information or the second identification information from the subject, such as the transmitter. In other words, when the terminal can perform visible light communication, the terminal obtains, for example, the light ID as the first identification information from the subject. When the terminal cannot perform visible light communication, the terminal obtains, for example, the image ID or the frame ID as the second identification information from the subject. More specifically, for example, the transmission image illustrated in FIG. 183 and FIG. 188 is captured as a subject, the region including the transmission image is selected as a specific region (i.e., a selected region), and second identification information is obtained from the line pattern in the transmission image. Accordingly, it is possible to properly obtain second identification information, even when visible light communication is not possible.

Moreover, in the specifying of the specific region described above, the terminal may specify, as a specific region, a region including a quadrilateral contour of at least a predetermined size or regions including a rounded quadrilateral contour of at least a predetermined size.

This makes it possible to properly specify a quadrilateral or rounded quadrilateral region as the specific region, as illustrated in, for example, FIG. 179.

Moreover, in the determining pertaining to the visible light communication described above, when the terminal is identified as a terminal capable of changing the exposure time to a predetermined value or lower, the terminal may determine that it is capable of performing visible light communication, and when the terminal is identified as a terminal incapable of changing the exposure time to a predetermined value or lower, the terminal may determine that it is not capable of performing visible light communication.

This makes it possible to properly determine whether visible light signal can be performed or not, as illustrated in, for example, FIG. 180.

Moreover, when the terminal determines that visible light communication is possible in the above-described determining of the visible light communication, when capturing the subject, the terminal may set the exposure time of the image sensor to the first exposure time, and capture the subject for the first exposure time to obtain a decode target image. Furthermore, when the terminal determines that visible light communication is not possible in the above-described determining of the visible light communication, when capturing the subject, the terminal may set the exposure time of the image sensor to the second exposure time, and capture the subject for the second exposure time to obtain a captured image. Here, the first exposure time is shorter than the second exposure time.

This makes it possible to obtain a decode target image including a bright line pattern region by performing capturing for the first exposure time, and possible to properly obtain first identification information by decoding the bright line pattern region. This makes it further possible to obtain a normal captured image as a captured image by performing capturing for the second exposure time, and possible to properly obtain second identification information from the line pattern appearing in the normal captured image. With this, the terminal can obtain whichever of the first identification information and the second identification information is appropriate for the terminal, depending on whether the first exposure time or the second exposure time is used.

Moreover, the subject is rectangular from the perspective of the image sensor, and transmits the first identification information by the light in the central region of the subject changing in luminance, and a barcode-style line pattern is disposed around the edge of the subject. When the terminal determines that visible light communication is possible in the above-described determining of the visible light communication, when capturing the subject, the terminal obtains a decode target image including a bright line pattern of a plurality of lines corresponding to the exposure lines in the image sensor, and obtains the first identification information by decoding the bright line pattern. Furthermore, when the terminal determines that visible light communication is not possible in the above-described determining of the visible light communication, when capturing the subject, the terminal may obtain the second identification information from the line pattern in the captured image.

This makes it possible to properly obtain the first identification information and the second identification information from the subject whose central region changes in luminance.

Moreover, the first identification information obtained from the decode target image and the second identification information obtained from the line pattern may be the same information.

This makes it possible to obtain the same information from the subject, regardless of whether the terminal can or cannot perform visible light communication.

FIG. 194E is a block diagram illustrating a configuration of a transmitter according to Embodiment 10 and this variation.

Transmitter G30 corresponds to the above-described transmitter 100. The transmitter G30 includes a light source G31, a microcontroller G32, and a light panel G33. The light source G31 emits light from behind the light panel 33. The microcontroller G32 changes the luminance of the light source G31. Note that the light panel G33 is a panel that transmits light from the light source G31, i.e., is a panel having translucency. Moreover, the light panel G33 is, for example, rectangular in shape.

The microcontroller G32 transmits the first identification information from the light source G31 through the light panel G33, by changing the luminance of the light source G31. Moreover, a barcode-style line pattern G34 is disposed in the periphery of the front of the light panel G33, and the second identification information is encoded in the line pattern G34. Furthermore, the first identification information and the second identification information are the same information.

This makes it possible to transmit the same information, regardless of whether the terminal is capable or incapable of performing visible light communication.

Note that in the above embodiments, the elements are implemented via dedicated hardware, but the elements may be implemented by executing a software program suitable for the elements. Each element may be implemented by a program execution unit such as a CPU or a processor reading and executing a software program recorded on a recording medium such as a hard disk or a semiconductor memory. For example, the program causes a computer to execute a display method illustrated in the flowcharts of FIG. 191, FIG. 193, FIG. 194A, and FIG. 194C.

Embodiment 11

A management method for a server according to the present embodiment is a method that can provide an appropriate service to a user of a mobile terminal.

FIG. 195 is a diagram illustrating one example of the configuration of a communication system including a server according to the present embodiment.

The communication system includes the transmitter 100, the receiver 200, a first server 301, a second server 302, and a store system 310. The transmitter 100 and the receiver 200 according to the present embodiment include the same functions as the transmitter 100 and the receiver 200 described in the above embodiments, respectively. The transmitter 100 is implemented as, for example, signage for a store, and transmits a light ID as a visible light signal by changing in luminance. The store system 310 includes at least one computer for managing the store including the transmitter 100. The receiver 200 is, for example, a mobile terminal implemented as a smartphone including a camera and a display.

For example, the user of the receiver 200 operates the receiver 200 to perform processing for making a reservation in advance in the store system 310. Processing for making a reservation is processing for registering, in the store system 310, user information, which is information related to the user, such as the name of the user, and an item or items ordered by the user, before the user visits the store. Note that the user need not perform such processing for making a reservation.

The user visits the store and captures the transmitter 100, which is signage for the store, using the receiver 200. With this, the receiver 200 receives the light ID from the transmitter 100 via visible light communication. The receiver 200 then transmits the light ID to the second server 302 via wireless communication. Upon receiving the light ID from the receiver 200, the second server 302 transmits store information associated with that light ID to the receiver 200 via wireless communication. The store information is information related to the store that put up the signage.

Upon receiving the store information from the second server 302, the receiver 200 transmits the user information and the store information to the first server 301 via wireless communication. Upon receiving the user information and the store information, first server 301 makes an inquiry to the store system 310 indicated by the store information to determine whether the processing for making a reservation performed by the user indicated by the user information is completed or not.

Here, when the first server 301 determines that the processing for making a reservation is complete, the first server 301 notifies the store system 310 that the user has reached the store, via wireless communication. However, when the first server 301 determines that the processing for making a reservation is not complete, the first server 301 transmits the store's menu to the receiver 200 via wireless communication. Upon receiving the menu, the receiver 200 displays the menu on the display, and receives an input of a selection from the menu from the user. The receiver 200 then notifies the first server 301 of the menu item or items selected by the user, via wireless communication.

Upon receiving the notification of the selected menu item or items from the receiver 200, the first server 301 notifies the store system 310 of the selected menu item or items via wireless communication.

FIG. 196 is a flowchart illustrating the management method performed by the first server 301.

First, the first server 301 receives store information from a mobile terminal, which is the receiver 200 (Step S621). Next, the first server 301 determines whether the processing for making a reservation at the store indicated by the store information is complete or not (Step S622). When the first server 301 determines that the processing for making a reservation is complete (Yes in Step S622), the first server 301 notifies the store system 310 that the user of the mobile terminal has arrived at the store (Step S623). However, when the first server 301 determines that the processing for making a reservation is not complete (No in Step S622), the first server 301 notifies the mobile terminal of the store's menu (Step S624). Furthermore, when the first server 301 is notified from the mobile terminal of a selected item, which is an item or items selected from the menu, the first server 301 notifies the store system 310 of the selected item (Step S625).

In this way, with the management method for a server (i.e., the first server 301) according to the present embodiment, the server receives store information from a mobile terminal, and based on the store information, determines whether processing for making a reservation for an item on the menu of a store by a user of the mobile terminal is complete or not, and notifies the store system that the user of the mobile terminal has arrived at the store when the processing for making a reservation is determined to be complete. Moreover, in the management method, when the processing for making the reservation is not complete, the server notifies the mobile terminal of the menu of the store, and when a selection of an item from the menu is received from the mobile terminal, and notifies the store system of the selected menu item. Moreover, in the management method, the mobile terminal obtains a visible light signal as identification information by capturing a subject provided at the store, transmits the identification information to a different server, receives store information corresponding to the identification information from the different server, and transmits the received store information to the server.

With this, so long as the user of the mobile terminal performs the processing for making a reservation is made in advance, when the user arrives at the store, the store can immediately start preparing the ordered item, allowing the user to consume freshly prepared food. Moreover, even if the user does not perform processing for making a reservation, the user can choose an item from the menu to make an order from the store.

Note that the receiver 200 may transmit identification information (i.e., a light ID) to the first server 301 instead of store information, and the first server 301 may recognize whether the processing for making a reservation is complete or not based on the identification information. In such cases, the identification information is transmitted from the mobile terminal to the first server 301 without the identification information being transmitted to the second server 302.

Embodiment 12

In the present embodiment, just like in the above embodiments, a communication method and a communication apparatus that use a light ID will be described. Note that the transmitter and the receiver according to the present embodiment may include the same functions and configurations as the transmitter (or transmitting apparatus) and the receiver (or receiving apparatus) in any of the above-described embodiments.

FIG. 197 is a diagram illustrating a lighting system according to the present embodiment.

The lighting system includes a plurality of first lighting apparatuses 100*p* and a plurality of second lighting apparatuses 100*q*, as illustrated in (a) in FIG. 197. Such a lighting system is, for example, attached to a ceiling of a large-scale store. Moreover, the plurality of first lighting apparatuses 100*p* and the plurality of second lighting apparatuses 100*q* are each elongated in shape, and arranged in a single row in a direction parallel to the lengthwise direction. Moreover, the plurality of first lighting apparatuses 100*p* and the plurality of second lighting apparatuses 100*q* are alternately arranged in the row.

Each first lighting apparatus 100*p* is implemented as the transmitter 100 according to the above embodiments, and emits light for illuminating a space and also transmits a visible light signal as a light ID. Each second lighting apparatus 100*q* emits light for illuminating a space and also transmits a dummy signal. In other words, each second lighting apparatus 100*q* emits light for illuminating a space and also transmits a dummy signal by cyclically changing in luminance. When the receiver captures the lighting system in the visible light communication mode, the decode target image obtained via the capturing, which is either the visible light communication image bright line image described above, includes a bright line pattern region in a region corresponding to the first lighting apparatus 100*p*. However, in the region corresponding to the second lighting apparatus 100*q* in the decode target image, a bright line pattern region does not appear.

Accordingly, with the lighting system illustrated in (a) in FIG. 197, a second lighting apparatus 100*q* is disposed between two adjacent first lighting apparatuses 100*p*. With this configuration, the receiver that receives the visible light signal can properly identify the end of the bright line pattern region in the decode target image, and can thus distinguish between the visible light signals received from the different first lighting apparatuses 100*p*.

Moreover, the average luminance when the second lighting apparatuses 100*q* are emitting light (i.e., when they are transmitting dummy signals) and the average luminance when the first lighting apparatuses 100*p* are emitting light (i.e., when they are transmitting visible light signals) are equal. Accordingly, it is possible to inhibit differences in brightness of the lighting apparatuses included in the lighting system. Note that the "brightness" of the lighting apparatuses is a brightness felt by a person when looking at the light. Accordingly, this makes it possible to make it difficult for a person in the store to sense a difference in the brightnesses in the lighting system. Moreover, when the changing of the luminance of the second lighting apparatuses 100*q* is accomplished by switching between ON and OFF states, even if the second lighting apparatuses 100*q* do not have a light dimming function, the average luminance of the second lighting apparatuses 100*q* can be adjusted by adjusting the ON/OFF duty cycle.

Moreover, for example, the lighting system may include a plurality of first lighting apparatuses 100*p* and not include any second lighting apparatus 100*q*, as illustrated in (b) in FIG. 197. In such cases, the plurality of first lighting apparatuses 100*p* arranged space apart from each other in a single row in a direction parallel to the lengthwise direction.

Accordingly, even with the lighting system illustrated in (b) in FIG. 197, the receiver that receives the visible light signals can properly identify the end of the bright line pattern region in the decode target image, just like the lighting system illustrated in (a) in FIG. 197. As a result, the receiver can distinguish between the visible light signals received from the different first lighting apparatuses 100*p*.

Alternatively, the plurality of first lighting apparatuses 100*p* may be arranged abutting one another, and the boundary region between two adjacent abutting first lighting apparatuses 100*p* may be covered with a cover. The cover prevents light from being emitted from the boundary region. Alternatively, the plurality of first lighting apparatuses 100*p* may be structured so that light is not emitted from both ends located in the lengthwise direction.

With the lighting systems illustrated in (a) and (b) in FIG. 197, the receiver can calculate the distance from a first lighting apparatus 100*p* included in the lighting system by using the length in the lengthwise direction of that first lighting apparatus 100*p*. Accordingly, the receiver can accurately estimate its own position.

FIG. 198 is a diagram illustrating one example of the arrangement of the lighting apparatuses and a decode target image.

For example, as illustrated in (a) in FIG. 198, a first lighting apparatus 100*p* and a second lighting apparatus 100*q* are arranged abutting each other. Here, the second lighting apparatus 100$q$ transmits a dummy signal by switching between ON and OFF at a cycle of at most 100 μs.

The receiver captures the decode target image illustrated in (b) in FIG. 198 by capturing the first lighting apparatus 100$p$ and the second lighting apparatus 100$q$. Here, the cycle in which the second lighting apparatus 100$q$ switches ON and OFF is too short compared to the exposure time of the receiver. Accordingly, the luminance in the region corresponding to the second lighting apparatus 100$q$ in the decode target image (hereinafter referred to as a dummy region) is even. Moreover, the luminance of the dummy region is higher than the region corresponding to the background, which is the region excluding the first lighting apparatus 100$p$ and the second lighting apparatus 100$q$. Moreover, the luminance of the dummy region is lower than the high luminance of the region corresponding to the first lighting apparatus 100$p$, i.e., the bright line pattern region.

Accordingly, the receiver can differentiate between the lighting apparatus corresponding to the dummy region and the lighting apparatus corresponding to the bright line pattern region.

FIG. 199 is a diagram illustrating another example of the arrangement of the lighting apparatuses and a decode target image.

For example, as illustrated in (a) in FIG. 199, a first lighting apparatus 100$p$ and a second lighting apparatus 100$q$ are arranged abutting each other. Here, the second lighting apparatus 100$q$ transmits a dummy signal by switching between ON and OFF at a cycle of at most 100 μs.

The receiver captures the decode target image illustrated in (b) in FIG. 199 by capturing the first lighting apparatus 100$p$ and the second lighting apparatus 100$q$. Here, the cycle in which the second lighting apparatus 100$q$ switches ON and OFF is long compared to the exposure time of the receiver. Accordingly, the luminance of the dummy region of the decode target image is not even, whereby bright and dark regions alternately appear in the dummy region. For example, when a dark region wider than predefined maximum width appears in the decode target image, the receiver can recognize the range including the dark region as the dummy region.

Accordingly, the receiver can differentiate between the lighting apparatus corresponding to the dummy region and the lighting apparatus corresponding to the bright line pattern region.

FIG. 200 is a diagram for describing position estimation using the first lighting apparatus 100$p$.

As described above, the receiver 200 can estimate its own position by capturing the first lighting apparatus 100$p$.

However, when the height from the ceiling at the estimated position is higher than the allowed range, the receiver 200 may notify the user with an error. For example, the receiver 200 identifies the position and orientation of the first lighting apparatus 100$p$ based on the length in the lengthwise direction of the first lighting apparatus 100$p$ captured in the decode target image or normal captured image, and the output of the acceleration sensor, for example. The receiver 200 furthermore identifies the height from the floor at the position of the receiver 200 by using the height from the floor to the ceiling where the first lighting apparatus 100$p$ is installed. The receiver 200 then notifies the user with an error if the height at the position of the receiver 200 is higher than the allowed range. Note that the position and orientation of the first lighting apparatus 100$p$ described above is a position and orientation relative to the receiver 200. Accordingly, it can be said that by identifying the position and orientation of the first lighting apparatus 100$p$, the position and orientation of the receiver 200 position can be identified.

FIG. 201 is a flowchart illustrating processing operations performed by the receiver 200.

First, as illustrated in (a) in FIG. 201, the receiver 200 estimates the position of the receiver 200 (Step S231). Next, the receiver 200 derives the height from the floor to the ceiling (Step S232). For example, the receiver 200 derives the height from the floor to the ceiling by reading the height stored in memory. Alternatively, the receiver 200 derives the height from the floor to the ceiling by receiving information transmitted over radio waves from a surrounding transmitter.

Next, the receiver determines whether the height from the floor to the receiver 200 is within the allowed range or not, based on the position of the receiver 200 estimated in Step S231 and the height from the floor to the ceiling derived in Step S232 (Step S233). When the receiver determines that the height is within the allowed range (Yes in Step S233), the receiver displays the position and orientation of the receiver 200 (Step S234). However, when the receiver determines that the height is not within the allowed range (No in Step S233), the receiver displays only the orientation of the receiver 200 (Step S235).

Alternatively, the receiver 200 may perform Step S236 instead of Step S235, as illustrated in (b) in FIG. 201. In other words, when the receiver determines that the height is not within the allowed range (No in Step S233), the receiver notifies the user that an error has occurred in the position estimation (Step S236).

FIG. 202 is a diagram illustrating one example of a communication system according to the present embodiment.

The communication system includes the receiver 200 and the server 300. The receiver 200 receives the position information or transmitter ID transmitted via GPS, radio waves, or visible light signal. Note that the position information is information indicating the position of, for example, the transmitter or receiver, and the transmitter ID is identification information for identifying the transmitter. The receiver 200 transmits the received position information or transmitter ID to the server 300. The server 300 transmits a map or contents associated with the position information or transmitter ID to the receiver 200.

FIG. 203 is a diagram for explaining the self-position estimation performed by the receiver 200 according to the present embodiment.

The receiver 200 performs self-position estimation in a predetermined cycle. The self-position estimation includes a plurality of processes. The cycle is, for example, the frame period used in the capturing performed by the receiver 200.

For example, the receiver 200 obtains, as the immediately previous self-position, the result of the self-position estimation performed in the previous frame period. Then, the receiver 200 estimates the travel distance and the travel direction from the immediately previous self-position, based on the output from, for example, the acceleration sensor and the gyrosensor. Furthermore, the receiver 200 performs the self-position estimation for the current frame period by changing the immediately previous self-position in accordance with the estimated travel distance and travel direction. With this, a first self-position estimation result is obtained. On the other hand, the receiver 200 performs self-position estimation in the current frame period based on at least one of radio waves, a visible light signal, and an output from the acceleration sensor and a bearing sensor. With this, a second self-position estimation result is obtained. Then, the receiver 200 adjusts the second self-position estimation result based on the first self-position estimation result, by using, for example, a Kalman filter. With this, a final self-position estimation result for the current frame period is obtained.

FIG. 204 is flowchart illustrating the self-position estimation performed by the receiver 200 according to the present embodiment.

First, the receiver 200 estimates the position of the receiver 200 based on, for example, radio wave strength (Step S241). With this, estimated position A of the receiver 200 is obtained.

Next, the receiver 200 measures the travel direction and travel direction of the receiver 200 based on the output from the acceleration sensor, the gyrosensor, and the bearing sensor (Step S242).

Next, the receiver 200 receives a visible light signal, and measures the position of the receiver 200 based on the received visible light signal and the output from the acceleration sensor and the bearing sensor, for example (Step S243).

The receiver 200 updates the estimated position A obtained in Step S241, by using the travel distance and the travel direction of the receiver 200 measured in Step S242, and the position of the receiver 200 measured in Step S243 (Step S243). An algorithm such as a Kalman filter is used to update the estimated position A. The steps from Step S242 and thereafter are repeatedly performed in a loop.

FIG. 205 is flowchart illustrating an outline of the processes performed n the self-position estimation by the receiver 200 according to the present embodiment.

First, the receiver 200 estimates the general position of the receiver 200 based on, for example, radio wave strength, such as Bluetooth (registered trademark) strength (Step S251). Next, the receiver 200 estimates the specific position of the receiver 200 by using, for example, a visible light signal (Step S252). With this, it is possible to estimate the self-position within a range of ±10 cm, for example.

Note that the number of light IDs that can be assigned to transmitters is limited; not every transmitter in the world can be assigned with a unique light ID. However, in the present embodiment, the area in which the transmitter is located can be narrowed down based on the strength of the radio waves transmitted by the transmitter, like the processing in Step S251 described above. If there are no transmitters having the same light ID in that area, the receiver 200 can identify one transmitter from that area, based on the processing in Step S252, i.e., based on the light ID.

The server stores, for each transmitter, the light ID of the transmitter, position information indicating the position of the transmitter, and a radio wave ID of the transmitter, in association with one another.

FIG. 206 is a diagram illustrating the relationship between the radio wave ID and the light ID according to the present embodiment.

For example, the radio wave ID includes the same information as the light ID. Note that the radio wave ID is identification information used in, for example, Bluetooth (registered trademark) or Wi-Fi (registered trademark). In other words, when transmitting the radio wave ID over radio waves, the transmitter also sends information that at least partially matches the radio wave ID, as a light ID. For example, the lower few bits included in the radio wave ID match the light ID. With this, the server can manage the radio wave ID and the light ID in an integrated fashion.

Moreover, the receiver 200 can check, via radio waves, whether there are transmitters that share the same light ID in the vicinity of the receiver 200. When the receiver 200 confirms that there are transmitters that share the same light ID, the receiver 200 may change the light ID of any number of the transmitters via radio waves.

FIG. 207 is a diagram illustrating one example of capturing performed by the receiver 200 according to the present embodiment.

For example, the receiver 200 at position A captures the first lighting apparatus 100*p* in visible light communication mode, as illustrated in (a) in FIG. 207. Furthermore, the receiver 200 at position B captures the first lighting apparatus 100*p* in visible light communication mode. Here, position A and position B have point symmetry relative to the first lighting apparatus 100*p*. In such cases, the receiver 200 generates the same decode target image via capturing, regardless of whether the capturing is performed from position A or position B, as illustrated by (b) in FIG. 207. Accordingly, the receiver 200 cannot distinguish whether the receiver 200 is in position A or position B from the decode target image illustrated in (b) in FIG. 207 alone. In view of this, the receiver 200 may present the position A and the position B as candidates for self-position estimation. Moreover, the receiver 200 may narrow down a plurality of candidates to a single candidate, based on, for example a previous position of the receiver 200 and the travel direction from that position. Moreover, when two or more lighting apparatuses appear in the decode target image, the decode target image obtained from position A and the decode target image obtained from position B are different. Accordingly, in such cases, it is possible to narrow down the candidate positions for the receiver 200 to a single position.

Note that the receiver 200 can narrow down the positions A and B to a single position based on the output from the bearing sensor. However, in such cases, when the reliability of the bearing sensor is low, the receiver 200 may present both position A and position B as position candidates for the receiver 200.

FIG. 208 is a diagram for explaining another example of capturing performed by the receiver 200 according to the present embodiment.

For example, a mirror 901 is disposed in the periphery of the first lighting apparatus 100*p*. With this, the decode target image obtained by capturing the position A and the decode target image obtained by capturing the position B can be made to be different. In other words, with self-position estimation based on the decode target image, it is possible to inhibit the occurrence of a situation in which the positions of receiver 200 cannot be narrowed down to a single position.

FIG. 209 is a diagram for explaining the cameras used by the receiver 200 according to the present embodiment.

For example, the receiver 200 includes a plurality of cameras and selects a camera to be used for visible light communication from among the plurality of cameras. More specifically, the receiver 200 identifies its orientation based on output data from the acceleration sensor, and selects an upward-facing camera from among the plurality of cameras. Alternatively, the receiver 200 may select one or more cameras that can capture an image facing upward relative to the horizon, based on the orientation of receiver 200 and the angle of views of the plurality of cameras. Moreover, when selecting a plurality of cameras, the receiver 200 may further select one camera having the widest angle of view from among the plurality of selected cameras. The receiver 200 need not perform processing for self-position estimation or receiving a light ID for a partial region in the image captured by the camera. The partial region may be a region below the horizon, or a region below a predetermined angle below the horizon.

This makes it possible to reduce the calculation load of the receiver 200.

FIG. 210 is a flowchart illustrating one example of processing that changes the visible light signal of the transmitter by the receiver 200 according to the present embodiment.

First, the receiver 200 receives a visible light signal A as a visible light signal (Step S261).

Next, the receiver 200 transmits a command over radio waves commanding visible light signal A to be changed to visible light signal B if visible light signal A is being transmitted (Step S262).

The transmitter 100 receives the command transmitted from the receiver in Step S262. If the transmitter, which is the first lighting apparatus 100*p*, is set to transmit visible light signal A, the transmitter changes the set visible light signal A to visible light signal B (Step S263).

FIG. 211 is a flowchart illustrating another example of processing that changes the visible light signal of the transmitter by the receiver 200 according to the present embodiment.

First, the receiver 200 receives a visible light signal A as a visible light signal (Step S271).

Next, the receiver 200 searches for transmitters that are capable of communicating over radio waves, by receiving radio waves in the surrounding area, and creates a list of the transmitters (Step S272).

Next, the receiver 200 reorders the created list of transmitters into a predetermined order (Step S273). The predetermined order is, for example, descending order of radio wave strength, random order, or ascending order of transmitter ID.

Next, the receiver 200 commands the first transmitter in the list to transmit visible light signal B for a predetermined period of time (Step S274). Then, the receiver 200 determines whether the visible light signal A received in Step S271 has been changed to visible light signal B or not (Step S275). When the receiver 200 determines that the visible light signal has been changed (Y in Step S275), the receiver 200 commands the first transmitter in the list to continue transmitting the visible light signal B (Step S276).

However, when the receiver 200 determines that the visible light signal A has not been changed to visible light signal B (N in Step S275), the receiver 200 commands the first transmitter in the list to revert the visible light signal to the signal pre-change (Step S277). The receiver 200 then removes the first transmitter in the list from the list, and moves the second and subsequent transmitters up one place in order (Step S278). The receiver 200 then repeatedly performs the steps from Step S274 and thereafter in a loop.

With this processing, the receiver 200 can properly identify the transmitter that is transmitting the visible light signal that is currently being received by the receiver 200, and can cause that transmitter to change the visible light signal.

Embodiment 13

The receiver 200 performs navigation that uses the self-position estimation and the estimation result thereof, just like the examples illustrated in FIG. 18A through FIG. 18C according to Embodiment 2. When performing the self-position estimation, the receiver 200 uses the size and position of the bright line pattern region in the decode target image. In other words, the receiver 200 identifies a relative position of the receiver 200 relative to the transmitter 100 based on the orientation of the receiver 200, the size and shape of the transmitter 100, and the size, shape, and position of the bright line pattern region in the decode target image. The receiver 200 then estimates the position of the transmitter 100 on the map specified by the visible light signal from the transmitter 100, and its own position by using the identified relative position described above. Note that the orientation of the receiver 200 is, for example, the orientation of the camera of the receiver 200 identified from output data from a sensor or sensors, such as the acceleration sensor and the bearing sensor included in the receiver 200.

FIG. 212 is a diagram for explaining the navigation performed by the receiver 200.

For example, the transmitter 100 is implemented as digital signage for guidance to a bus stop, as illustrated in (a) in FIG. 212, and is disposed in an underground shopping center. The transmitter 100 transmits a visible light signal, just like in the examples illustrated in FIG. 18A through FIG. 18C according to Embodiment 2. Here, the transmitter 100 displays an image that prompts AR navigation. When the user of the receiver 200 looks at the transmitter 100 and wants to be guided to the bus stop by the AR navigation, the user launches an AR navigation application installed in the receiver 200 implemented as a smartphone. Launching the application causes the receiver 200 to alternately switch the on-board camera between visible light communication mode and normal capturing mode. Each time the receiver 200 performs capturing in the normal capturing mode, the normal captured image is displayed on the display of the receiver 200. The user points the camera of the receiver 200 toward the transmitter 100. With this, the receiver 200 obtains a decode target image when capturing is performed in the visible light communication mode, and the bright line pattern region included in the decode target image is decoded to receive a visible light signal from the transmitter 100. The receiver 200 then transmits information indicated in the visible light signal (i.e., the light ID) to a server, and receives data indicating the position of the transmitter 100 associated with that information on a map, from the server. The receiver 200 further performs self-position estimation by using the position of the transmitter 100 on the map, and transmits the estimated self-position to the server. The server searches for the position of the receiver 200 and the path to the bus stop, which is the destination, and transmits, to the receiver 200, data indicating the map and the path. Note that the position of the receiver 200 obtained through this instance of self-position estimation is the starting point for guiding the user to the destination.

Next, the receiver 200 starts navigation in accordance with the path resulting from the search, as illustrated in (b) in FIG. 212. At this time, the receiver 200 displays a directional indicator image 431 superimposed on the normal captured image. The directional indicator image 431 is generated based on the path resulting from the search, the current position of the receiver 200, and the orientation of the camera, and appears as an arrow pointing toward the destination.

When the receiver 200 moves through the underground shopping center, the current self-position is estimated based on the movement of feature points appearing in the normal captured image, as illustrated in (c) and (d) FIG. 212.

When the receiver 200 receives a visible light signal from a transmitter 100 that is different from the transmitter 100 illustrated in (a) in FIG. 212, the receiver 200 corrects the self-position estimated up to that point, as illustrated in (e) in FIG. 212. In other words, the receiver 200 updates the self-position each time the self-position estimation that uses the visible light signal is performed.

Then, as illustrated in (f) in FIG. 212, the receiver 200 guides the user to the bus stop, which is the destination.

In this way, the receiver 200 may firstly perform self-position estimation based on a visible light signal at the starting point, and then periodically update the estimated self-position. For example, as illustrated in (c) and (d) in FIG. 212, when the normal captured images captured in the normal capturing mode are obtained at a constant frame rate, the receiver 200 may update the self-position based on the amount of displacement of the feature points appearing in the normal captured images. The receiver 200 then regularly captures images in the visible light communication mode while performing capturing in the normal capturing mode. As illustrated in (e) in FIG. 212, if a bright line pattern region appears in the decode target image captured in the visible light communication mode, at that point in time, the receiver 200 may update the most recent self-position based on the bright line pattern region that appears in the decode target image.

Here, the receiver 200 can estimate the self-position even if the receiver 200 cannot receive the visible light signal, by decoding the bright line pattern region. In other words, even if the receiver 200 cannot completely decode the bright line pattern region appearing in the decode target image, the receiver 200 may perform the self-position estimation based on either the bright line pattern region or a striped region like the bright line pattern region.

FIG. 213 is a flowchart illustrating an example of self-position estimation performed by the receiver 200.

The receiver 200 obtains a map and transmitter data for the plurality of transmitters 100 from a recording medium included in the server or the receiver 200 (Step S341). Note that transmitter data indicates the position of the transmitter 100 on the map and the shape and size of the transmitter 100.

Next, the receiver 200 performs capturing in the visible light communication mode (i.e., short-time exposure), and detects a striped region (i.e., region A) from the captured decode target image (Step S342).

The receiver 200 then determines whether there is a possibility that the striped region is a visible light signal (Step S343). In other words, the receiver 200 determines whether the striped region is a bright line pattern region that appears as a result of the visible light signal. When the receiver 200 determines that there is no possibility that the striped region is a visible light signal (N in Step S343), the receiver 200 ends the processing. However, when the receiver 200 determines that there is a possibility that the striped region is a visible light signal (Y in Step S343), the receiver 200 further determines whether the visible light signal can be received or not (Step S344). In other words, the receiver 200 decodes the bright line pattern region of the decode target image, and determines whether the light ID can be obtained as the visible light signal via the decoding.

When the receiver 200 determines that the visible light signal can be received (Y in Step S344), the receiver 200 obtains the shape, size, and position of region A in the decode target image (Step S347). In other words, the receiver 200 obtains the shape, size, and position of the transmitter 100 appearing as a striped image in the decode target image as a result of being captured in the visible light communication mode.

The receiver 200 then calculates the relative positions of the transmitter 100 and the receiver 200 based on the transmitter data on the transmitter 100 and the shape, size, and position of the obtained region A, and updates the current position of the receiver 200 (i.e., its self-position) (Step S348). For example, the receiver 200 selects transmitter data on the transmitter 100 that corresponds to the received visible light signal, from among the transmitter data for all transmitters 100 obtained in Step S341. In other words, the receiver 200 selects, from among the plurality of transmitters 100 shown on the map, the transmitter 100 that corresponds to the visible light signal, as the transmitter 100 to be captured as the image of the region A. The receiver 200 then calculates the relative positions of the receiver 200 and the transmitter 100 based on the shape, size, and position of the transmitter 100 obtained in Step S347 and the shape and size indicated in the transmitter data on the transmitter 100 to be captured. Thereafter, the receiver 200 updates its self-position based on the relative positions, the map obtained in Step S341, and the position on the map shown in the transmitter data on the transmitter 100 to be captured.

However, when the receiver 200 determines that the visible light signal cannot be received in Step S344 (N in Step S344), the receiver 200 estimates what position or range is captured on the map by the camera of the receiver 200 (Step S345). In other words, the receiver 200 estimates the position or range captured on the map based on the current self-position estimated at that time and the orientation or direction of the camera, which is the imaging unit of the receiver 200. The receiver 200 then regards the transmitter 100 that is most likely to be captured from among the plurality of transmitters 100 shown on the map as the transmitter 100 that is captured as the image of the region A (Step S346). In other words, the receiver 200 selects, from among the plurality of transmitters 100 shown on the map, the transmitter 100 that is most likely to be captured, as the transmitter 100 to be captured. Note that the transmitter 100 most likely to be captured is, for example, the transmitter 100 closest to the position or range of the image estimated in Step S345.

FIG. 214 is a diagram for explaining the visible light signal received by the receiver 200.

There are two cases in which the bright line pattern region included in the decode target image appears. In the first case, the bright line pattern region appears as a result of the receiver 200 directly capturing the transmitter 100, such as a lighting apparatus provided on a ceiling, for example. In other words, in the first case, the light that causes the bright line pattern region to appear is direct light. In the second case, the bright line pattern region appears as a result of the receiver 200 indirectly capturing the transmitter 100. In other words, the receiver 200 does not capture the transmitter 100, such as a lighting apparatus, but captures a region of, for example, a wall or the floor, in which light from the transmitter 100 is reflected. As a result, the bright line pattern region appears in the decode target image. In other words, in the second case, the light that causes the bright line pattern region to appear is reflected light.

Accordingly, if there is a bright line pattern region in the decode target image, the receiver 200 according to the present embodiment determines whether the bright line pattern region applies to the first case or the second case. In other words, the receiver 200 determines whether the bright line pattern region appears due to direct light from the transmitter 100 or appears due to reflected light from the transmitter 100.

When the receiver 200 determines that the bright line pattern region applies to the first case, the receiver 200 identifies the relative position of the receiver 200 relative to the transmitter 100, by regarding the bright line pattern region in the decode target image as the transmitter 100 that appears in the decode target image. In other words, the receiver 200 identifies its relative position by triangulation or a geometric measurement method using the orientation and the angle of view of the camera used in the capturing, the shape, size and position of the bright line pattern region, and the shape and size of the transmitter 100.

On the other hand, when the receiver 200 determines that the bright line pattern region applies to the second case, the receiver 200 identifies the relative position of the receiver 200 relative to the transmitter 100, by regarding the bright line pattern region in the decode target image as a reflection region that appears in the decode target image. In other words, the receiver 200 identifies its relative position by triangulation or a geometric measurement method using the orientation and the angle of view of the camera used in the capturing, the shape, size and position of the bright line pattern region, the position and orientation of the floor or wall indicated on the map, and the shape and size of the transmitter 100. At this time, the receiver 200 may regard the center of the bright line pattern region as the position of the bright line pattern region.

FIG. 215 is a flowchart illustrating another example of self-position estimation performed by the receiver 200.

First, the receiver 200 receives a visible light signal by performing capturing in the visible light communication mode (Step S351). The receiver 200 then obtains a map and transmitter data for the plurality of transmitters 100 from a recording medium (i.e., a database) included in the server or the receiver 200 (Step S352).

Next, the receiver 200 determines whether the visible light signal received in Step S351 has been received via reflected light or not (Step S353).

When the receiver 200 determines that the visible light signal has been received via reflected light in Step S353 (Y in Step S353), the receiver 200 regards the central area of the striped region in the decode target image obtained by the capturing performed in Step S351 as the position of the transmitter 100 appearing on the floor or wall (Step S354).

Next, just like Step S348 in FIG. 213, the receiver 200 calculates the relative positions of the transmitter 100 and the receiver 200, and updates the current position of the receiver 200 (Step S355). However, when the receiver 200 determines that the visible light signal has not been received via reflected light in Step S353 (N in Step S353), the receiver 200 updates the current position of the receiver 200 without considering the reflection on the floor or wall.

FIG. 216 is a flowchart illustrating an example of reflected light determination performed by the receiver 200.

The receiver 200 detects a striped region or bright line pattern region from the decode target image as region A (Step S641). Next, the receiver 200 identifies the orientation of the camera when the decode target image was captured by using the acceleration sensor (Step S642) Next, the receiver 200 identifies, from the position of the receiver 200 already estimated at that point in time on the map, whether a transmitter 100 is present or not in the orientation of the camera identified in Step S642, from map data (Step S643). In other words, the receiver 200 determines whether the transmitter 100 is being captured directly or not based on the position of the receiver 200 estimated at that point in time on the map, the orientation or direction of the capturing of the receiver 200, and the positions of the transmitters 100 on the map.

When the receiver 200 determines that there is a transmitter 100 present (Yes in Step S644), the receiver 200 determines that the light in region A, that is, the light used in the reception of the visible light signal, is direct light (Step S645). On the other hand, when the receiver 200 determines that there is not a transmitter 100 present (No in Step S644), the receiver 200 determines that the light in region A, that is, the light used in the reception of the visible light signal, is reflected light (Step S646).

In this way, the receiver 200 determines whether direct light or reflected light caused the bright line pattern region to appear, by using the acceleration sensor. Moreover, if the orientation of the camera is upward, the receiver 200 may determine that the light is direct light, and if the orientation of the camera is downward, the receiver 200 may determine that the light is reflected light.

Moreover, instead of the output from the acceleration sensor, the receiver 200 may determine whether the light is direct light or reflected light based on, for example, the intensity, position, and size of the light in the bright line pattern region included in the decode target image. For example, if the intensity of the light is less than a predetermined intensity, the receiver 200 determines that the light that caused the bright line pattern region to appear is reflected light. Alternatively, if the bright line pattern region is positioned in the bottom portion of the decode target image, the receiver 200 determines that the light is reflected light. Alternatively, if the size of the bright line pattern region is greater than a predetermined size, the receiver 200 determines that the light is reflected light.

FIG. 217 is a flowchart illustrating an example of navigation performed by the receiver 200.

The receiver 200 is, for example, a smartphone including a rear-facing camera, a front-facing camera, and a display, and performs navigation by displaying an image for guiding the user to a destination on the display. In other words, the receiver 200 executes AR navigation as shown in the examples in FIG. 18A through FIG. 18C described in Embodiment 2, At this time, the receiver 200 detects danger in the surrounding area based on images captured using the rear-facing camera. The receiver 200 determines whether the user is in a dangerous situation or not (Step S361).

When the receiver 200 determines that the user is in a dangerous situation (Y in Step S361), the receiver 200 displays a warning message on the display of the receiver 200 or stops the navigation (Step S364).

However, when the receiver 200 determines that the user is not in a dangerous situation (N in Step S361), the receiver 200 determines whether using a smartphone while walking is prohibited in the area in which the receiver 200 is positioned (Step S362). For example, the receiver 200 refers to map data, and determines whether the current position of the receiver 200 is included in a range in which using a smartphone while walking is prohibited as indicated in the map data. When the receiver 200 determines that using a smartphone while walking is not prohibited (N in Step S362), the receiver 200 continues navigation (Step S366). However, when the receiver 200 determines that using a smartphone while walking is prohibited (Y in Step S362), the receiver 200 determines whether the user is looking at the receiver 200 by recognition of the gaze of the user using the front-facing camera (Step S363). When the receiver 200 determines that the user is not looking at the receiver 200 (N in Step S363), the receiver 200 continues navigation (Step S366). However, when the receiver 200 determines that the user is looking at the receiver 200 (Y in Step S363), the receiver 200 displays a warning message on the display of the receiver 200 or stops navigation (Step S364).

The receiver 200 next determines whether the user has left the dangerous situation or not or whether the user has ceased gazing at the receiver 200 or not (Step S365). When the receiver 200 determines that the user has left the dangerous situation or the user has ceased gazing at the receiver 200 (Y in Step S365), the receiver 200 continues navigation (Step S366). However, when the receiver 200 determines that the user has not left the dangerous situation or the user has not ceased gazing at the receiver 200 (N in Step S365), the receiver 200 repeatedly performs Step S364.

Moreover, the receiver 200 may detect the traveling speed based on the outputs from, for example, the acceleration sensor and the gyrosensor. In such cases, the receiver 200 may determine whether the traveling speed is greater than or equal to a threshold, and stop navigation when greater than the threshold. At this time, the receiver 200 may display a message for notifying the user that traveling at the that traveling speed on foot is dangerous. This makes it possible to avoid a dangerous situation resulting from using a smartphone while walking.

Here, the transmitter 100 may be implemented as a projector.

FIG. 218 illustrates an example of a transmitter 100 implemented as a projector.

For example, the transmitter 100 projects image 441 on the floor or wall. Moreover, while projecting the image 441, the transmitter 100 transmits a visible light signal by changing the luminance of the light used to project the image 441. Note that, for example, text that prompts AR navigation may be displayed in the projected image 441. The receiver 200 receives the visible light signal by capturing the image 441 projected on the floor or wall. The receiver 200 may then perform self-position estimation using the projected image 441. For example, the receiver 200 obtains, from a server, the position, on a map, of the image 441 corresponding to the visible light signal, and performs self-position estimation using that position of the image 441. Alternatively, the receiver 200 may obtain, from a server, the position, on a map, of the transmitter 100 associated with the visible light signal, and perform self-position estimation by regarding the image 441 projected on the floor or wall as reflected light, similar to the second case described above.

FIG. 219 is a flowchart illustrating another example of self-position estimation performed by the receiver 200.

First, the receiver 200 captures a predetermined image of transmitter 100 or a predetermined code (for example, a two-dimensional code) associated with transmitter 100 (Step S371). Note that in the capturing of the transmitter 100, the receiver 200 receives a visible light signal from the transmitter 100.

Next, the receiver 200 obtains the position (i.e., the position on the map), of the subject captured in Step S371. The receiver 200 then estimates the position of the receiver 200, that is to say, its self-position, based on the position, shape, and size, and the position, shape and size of the subject in the image captured in Step S371 (Step S372).

Next, the receiver 200 starts navigation for guiding the user to a predetermined position indicated by the image captured in Step S371 (Step S373). Note that if the subject is a transmitter 100, the predetermined position is the position specified by the visible light signal. If the subject is a predetermined image, the predetermined position is a position obtained by analyzing the predetermined image. If the subject is a code, the predetermined position is a position obtained by decoding the code. While navigating, the receiver 200 repeatedly captures images with the camera and displays the normal captured images sequentially in real time superimposed with a directional indicator image, such as an arrow indicating where the user is to go. The user begins traveling in accordance with the displayed directional indicator image while holding the receiver 200.

Next, the receiver 200 determines whether position information such as GPS information (i.e., GPS data) can be received or not (Step S374). When the receiver 200 determines that position information can be received, (Y in Step S374), the receiver 200 estimates the current self-position of receiver 200 based on the position information such as GPS information (Step S375). However, when the receiver 200 determines that position information such as GPS information cannot be received, (N in Step S374), the receiver 200 estimates the self-position of receiver 200 based on movement of objects or feature points shown in the above-described normal captured images (Step S376). For example, the receiver 200 detects the movement of objects or feature points shown in the above-described normal captured images, and based on the detected movement, estimates a travel direction and travel distance of the receiver 200. The receiver 200 then estimates the current self-position of the receiver 200 based on the estimated travel direction and travel distance, and the position estimated in Step S372.

Next, the receiver 200 determines whether the most recently estimated self-position is within a predetermined range of a predetermined position, i.e., the destination (Step S377). When the receiver 200 determines that the self-position is within the range (Y in Step S377), the receiver 200 determines that the user has arrived at the destination, and ends processing for performing the navigation. However, when the receiver 200 determines that the self-position is not within the range (N in Step S377), the receiver 200 determines that the user has not arrived at the destination, and repeatedly performs processes from step S374.

Moreover, when the current self-position becomes unknown when performing navigation, that is to say, when the self-position cannot be estimated, the receiver 200 may stop superimposing the directional indicator image on the normal captured image and may display the most recently estimated self-position on the map. Alternatively, the receiver 200 may display the surrounding area including the most recently estimated self-position on the map.

FIG. 220 is a flowchart illustrating one example of processes performed by the transmitter 100. In the example illustrated in FIG. 220, the transmitter 100 is a lighting apparatus provided in an elevator.

The transmitter 100 determines whether elevator operation information indicating the operational state of the elevator can be obtained or not (Step S381). Note that elevator operation information may indicate the state of the elevator, such as whether the elevator is going up, going down, stopped, may indicate the floor that the elevator is currently on, and may indicate a floor that the elevator is scheduled to stop at.

When the transmitter 100 determines that elevator operation information can be obtained (Y in Step S381), the transmitter 100 transmits all or some of the elevator operation information in a visible light signal (Step S386). Alternatively, the transmitter 100 may associate and store in a server elevator operation information with the visible light signal (i.e., the light ID) to be transmitted from the transmitter 100.

When the transmitter 100 determines that elevator operation information cannot be obtained (N in Step S381), the transmitter 100 recognizes whether the elevator is any one of stopped, going up, or going down, via the acceleration sensor (Step S382). Furthermore, the transmitter 100 determines, from the floor display unit that displays what floor the elevator is on, whether the current floor of the elevator can be identified or not (Step S383). Note that the floor display unit corresponds to the floor number display unit illustrated in FIG. 18C. When the transmitter 100 determines that the floor has been identified (Y in Step S383), the transmitter 100 performs the process of Step S386 described above. However, when the transmitter 100 determines that the floor has not been identified (N in Step S383), the transmitter 100 further captures the floor display unit with the camera, and determines, from the captured image, whether the floor that the elevator is currently on can be recognized or not (Step S384).

When the transmitter 100 has determined the current floor (Y in Step S384), the transmitter 100 performs the process of Step S386 described above. However, when the transmitter 100 has determined that it cannot recognize the current floor (N in Step S384), the transmitter 100 transmits a predetermined visible light signal (Step S385).

FIG. 221 is a flowchart illustrating another example of navigation performed by the receiver 200. In the example illustrated in FIG. 221, the transmitter 100 is a lighting apparatus provided in an elevator.

The receiver 200 first determines whether current position of the receiver 200 is on an escalator or not (Step S391). The escalator may be an inclined escalator or a horizontal escalator.

When the receiver 200 determines that the receiver 200 is on an escalator (Y in Step S391), the receiver 200 estimates the movement of the receiver 200 (Step S392). The movement is movement of receiver 200 with reference to a fixed floor or wall other than the escalator. In other words, the receiver 200 first obtains, from a server, the direction and speed of the movement of the escalator. Then, the receiver 200 adds the movement of the escalator to the movement of the receiver 200 on the escalator recognized by interframe image processing such as Simultaneous Localization and Mapping (SLAM), to estimate the movement of receiver 200.

However, when the receiver 200 determines that the receiver 200 is not on an escalator (N in Step S391), the receiver 200 determines whether the current position of the receiver 200 is in an elevator or not (Step S393). When the receiver 200 determines that the receiver 200 is not in an elevator (N in Step S393), the receiver 200 ends the processing. However, when the receiver 200 determines that the receiver 200 is in an elevator (Y in Step S393), the receiver 200 determines whether the current floor of the elevator (more specifically, the current floor of the elevator cabin) can be identified by a visible light signal, radio wave signal, or some other means (Step S394).

When the current floor cannot be identified (N in Step S394), the receiver 200 displays the floor that the user is scheduled to exit the elevator at (Step S395). Moreover, the receiver 200 recognizes whether the receiver 200 has exited the elevator or not by the user exiting the elevator and recognizes the current floor that the receiver 200 is on by the visible light signal, radio wave signal, or some other means. Then, if the recognized floor is different from the floor that the user is scheduled to exit at, the receiver 200 notifies the user that he or she has got off at the wrong floor (Step S396).

When the receiver 200 determines in Step S394 that the floor that the elevator is currently at has been identified (Y in Step S394), the receiver 200 determines whether the receiver 200 is at the floor that the user is scheduled to get off at, that is to say, the destination floor of the receiver 200 (Step S397). When the receiver 200 determines that the receiver 200 is at the destination floor (Y in Step S397), the receiver 200 displays, for example, a message prompting the user to exit the elevator (Step S399). Alternatively, the receiver 200 displays an advertisement related to the destination floor. When the user does not exit, the receiver 200 may display a warning message.

However, when the receiver 200 determines that the receiver 200 is not on the destination floor (N in Step S397), the receiver 200 displays, for example, a message warning the user to not exit (Step S398). Alternatively, the receiver 200 displays an advertisement. When the user tries to exit, the receiver 200 may display a warning message.

FIG. 222 is a flowchart illustrating one example of processes performed by the receiver 200.

In the flowchart illustrated in FIG. 222, the receiver 200 uses the visible light signal in conjunction with normal exposure image information (i.e., normal captured image).

For example, the receiver 200 implemented as a smartphone or a wearable device, such smart glasses, obtains image A (i.e., the decode target image described above) captured for a shorter exposure time than the normal exposure time (Step S631). First, the receiver 200 receives a visible light signal by decoding the image A (Step S632). In one example, the receiver 200 identifies the current position of the receiver 200 based on the received visible light signal, and begins navigation to a predetermined position.

Next, the receiver 200 captures an image B (i.e., the normal captured image described above) for an exposure time longer than the above-described shorter exposure time (for example, an exposure time set in automatic exposure setting mode) (Step S633). Here, the image A is suitable for detecting objects or extracting feature quantities. Accordingly, the receiver 200 repeatedly and alternately obtains image A captured for the above-described shorter exposure time and image B captured for the above-described longer exposure time, a predetermined number of times. With this, the receiver 200 performs image processing such as the above-described object detection or feature quantity extraction, by using the plurality of obtained images B (Step S634). For example, the receiver 200 corrects the position of the receiver 200 by detecting specific objects in images B. Moreover, for example, the receiver 200 extracts feature points from each of two or more images B and identifies how each feature point moved between images. As a result, the receiver 200 recognizes the distance and direction of movement of the receiver 200 between points of capture times of two or more images B, and can correct the current position of the receiver 200.

FIG. 223 is a diagram illustrating one example of a screen displayed on the display of receiver 200.

When a navigation application is launched, the receiver 200 displays a logo of the transmitter 100, for example, as illustrated in FIG. 223. The logo is a logo that says, for example, "AR Navigation".

The receiver 200 may lead the user to capture the logo. The transmitter 100 is implemented as, for example, digital signage, and displays the logo while changing the luminance of the logo to transmit a visible light signal. Alternatively, the transmitter 100 is implemented as, for example, a projector, and projects the logo on the floor or a wall while changing the luminance of the logo to transmit a visible light signal. The receiver 200 receives the visible light signal from the transmitter 100 by capturing the logo in the visible light communication mode. Note that the receiver 200 may display an image of a nearby lighting apparatus or landmark implemented as the transmitter 100, instead of the logo.

Moreover, the receiver 200 may display the telephone number of a call center for assisting the user when the user needs assistance. In this case, receiver 200 may notify the server of the call center of the language that the user uses and the estimated self-position. The language that the user uses may be, for example, registered in advance in the receiver 200, and may be set by the user. With this, the call center can rapidly respond to the user of the receiver 200 when the user calls the call center. For example, the call center can guide the user to the destination over the phone.

The receiver 200 may correct the self-position based on the form of a landmark registered in advance, the size of the landmark, and the position of the landmark on the map. In other words, when the normal captured image is obtained, the receiver 200 detects the region in the normal captured image in which the landmark appears. The receiver 200 then performs self-position estimation based on the shape, size, and position of that region in the normal captured image, the size of the landmark, and the position of the landmark on the map.

Moreover, the receiver 200 may recognize or detect a landmark that is on the ceiling or behind the user by using the front-facing camera. Moreover, the receiver 200 may use only a region above a predetermined angle of view (or below a predetermined angle of view) relative to the horizon, from the image captured by the camera. For example, if there are many transmitters 100 or landmarks provided on the ceiling, the receiver 200 uses only regions in which subjects appear above the horizon in the images captured by the camera. The receiver 200 detects, from only those regions, the region of the bright line pattern region or landmark. This reduces the processing load of the receiver 200.

Moreover, as illustrated in the example in FIG. 212, when performing AR navigation, the receiver 200 superimposes the directional indicator image 431 onto the normal captured image, but the receiver 200 may further superimpose a character.

FIG. 224 illustrates one example of a display of a character by the receiver 200.

Upon receiving the visible light signal from the transmitter 100 implemented as, for example, digital signage, the receiver 200 obtains a character 432 corresponding to the visible light signal, as an AR image, from, for example, a server. The receiver 200 then displays both the directional indicator image 431 and the character 432 superimposed on the normal captured image, as illustrated in FIG. 224. For example, the character 432 is a character used in an advertisement for a drinking water manufacturing and sales company, and is displayed as, for example, an image of a can filled with the drinking water. Moreover, the character 432 is a character used in an advertisement for drinking water sold on the path to the destination of the user. Such a character 432 may be displayed in the direction or position pointed to by the directional indicator image 431, so as to guide the user. An advertisement including such a character may be realized through an affiliate service.

Moreover, the character may be in the shape of an animal or person. In such cases, the receiver 200 may superimpose the character on the normal captured image so as to be walking on the directional indicator image. Moreover, a plurality of characters may be superimposed on the normal captured image. Furthermore, instead of a character, or in addition to a character, the receiver 200 may superimpose a video of an advertisement as a commercial onto the normal captured image.

Moreover, the receiver 200 may change the size and display time of the character for the advertisement depending on the advertisement fee paid for the advertisement of a company. When a plurality of advertisement characters are displayed, the receiver 200 may determined the order in which the characters are displayed depthwise depending on the advertisement fee paid for each character. When the receiver 200 enters a store that sells products advertised by the displayed character, the receiver 200 electronically settle a bill to the store.

Moreover, when receiver 200 receives another visible light signal from another digital signage while the receiver 200 is displaying the character 432, receiver 200 may change the displayed character 432 to another character in accordance with the other visible light signal.

The receiver 200 may superimpose a video of a commercial for a company on the normal captured image. The advertiser may be billed based on the display time of and number of times the video of a commercial or advertisement is displayed. The receiver 200 may display the commercial in the language of the user, and text or an audio link for notifying a person affiliated with the store that the user is interested in the product in the commercial may be displayed in the language of the person affiliated with the store. Moreover, the receiver 200 may display the price of the product in the currency of the user.

FIG. 225 is a diagram illustrating another example of a screen displayed on the display of receiver 200.

For example, as illustrated in (a) in FIG. 225, the receiver 200 displays a message for notifying the user that a bookstore named XYZ is in front of the user, in the language of the user, which is English. Such a message may be displayed as a video commercial as described above. Then, for example as illustrated in (b) in FIG. 225, when the user enters the book store, the receiver 200 may display text for communicating with an employee of the bookstore, in the language of the employee (for example, Japanese) and the language of the user, which is English.

The receiver 200 may prompt the user to take a detour during navigation. In such cases, receiver 200 may propose a detour depending on surplus time. Surplus time is, in the example in FIG. 212, the difference between the departure time of the bus from the bus stop and the arrival time of the user at the bus stop.

The receiver 200 may display an advertisement for a nearby store. In such cases, the receiver 200 may display an advertisement for a nearby store that is adjacent to the user or along the path to be taken by the user. The receiver 200 may calculate the timing at which to start playback of the video commercial so that the video ends when the receiver 200 is adjacent to the store corresponding to the commercial. The receiver 200 may stop the display of an advertisement for a store that receiver 200 has passed by.

Furthermore, when the user takes a detour to, for example, a store, a transmitter 100 for obtaining a starting point, embodied as, for example, a lighting apparatus, may be provided at the store, so that the receiver 200 can return to the guidance to the original destination. Alternatively, the receiver 200 may display a button with the text "restart from in front of XYZ store". The receiver 200 may apply a discounted price or display a coupon to only those who watched the commercial and visited the store. The receiver 200 may, in order to pay for the purchase of a product, display a barcode via an application and make an electronic transaction.

A server may analyze path lines based on the result of navigations performed by receivers 200 of users.

When a camera is not used in the navigation, the receiver 200 may switch the self-position estimation technique to PDR (Pedestrian Dead Reckoning) performed via, for example, an acceleration sensor. For example, when the navigation application is off, or when receiver 200 is in, for example, the user's pocket and the image from the camera is pitch black, the self-position estimation technique may be switched to PDR. The receiver 200 may use radio waves (Bluetooth (registered trademark) or Wi-Fi) or sound waves for the self-position estimation.

When the user begins to proceed in the wrong direction, the receiver 200 may notify the user with vibration or sound. For example, the receiver 200 may use different types of vibrations or sound depending on whether the user is beginning to proceed in the correct direction or wrong direction at an intersection. Note that the receiver 200 may notify the user with vibration or sound as described above when the user faces the wrong direction or faces the correct direction, even without moving. This makes it possible to improve user friendliness even for the visually impaired. Note that the "correct direction" is the direction toward the destination along the searched path, and a "wrong direction" is a direction other than the correct direction.

Note that although the receiver 200 is implemented as a smartphone in the above example, the receiver 200 may be implemented as a smart watch or smart glasses. When the receiver 200 is implemented as smart glasses, navigation that uses a camera and is performed by the receiver 200 can inhibit interruption of the navigation from an application unrelated to the navigation.

Moreover, the receiver 200 may end the navigation after a certain period of time has elapsed since the start of the navigation. The length of the certain period may be changed depending on the distance to the destination. Alternatively, the receiver 200 may end the navigation when the receiver 200 enters an area in which GPS data can be received. Alternatively, the receiver 200 may end the navigation when the receiver 200 becomes a certain distance away from the area in which GPS data can be received. The receiver 200 may display the estimated time of arrival or remaining distance to the destination. Moreover, the receiver 200 may, in the example in FIG. 212, display the time of departure of the bus from the bus stop, which is the destination.

Moreover, the receiver 200 may warn the user when at, for example, stairs or an intersection, and may guide the user to an elevator rather than the starts depending on the preference or health status of the user. For example, the receiver 200 may avoid stairs and guide the user to an elevator if the user is elderly (for example, in his or her 80s). Moreover, the receiver 200 may avoid stairs and guide the user to an elevator if it is determined that the user is carrying large luggage. For example, based on the output from the acceleration sensor, the receiver 200 may determine whether the walking speed of the user is faster or slower than normal, and when slower, may determine that the user is carrying large luggage. Alternatively, based on the output from the acceleration sensor, the receiver 200 may determine whether the stride of the user is shorter than normal or not, and when shorter, may determine that the user is carrying large luggage. Furthermore, the receiver 200 may guide the user along a safe course when the user is female. Note that a safe course is indicated in the map data.

Moreover, the receiver 200 may recognize an obstacle such as a person or vehicle in the periphery of receiver 200, based on an image captured by the camera. When the user is likely to collide with the obstacle, the receiver 200 may prompt the user to go around the obstacle. For example, the receiver 200 may prompt the user to stop moving or avoid the obstacle by making a sound.

When performing navigation, the receiver 200 may correct the estimated time of arrival based on past travel time for other users. At this time, the receiver 200 may correct the estimated time based on the age and sex of the user. For example, if the user is in his or her 20s, the receiver 200 may advance the estimated time of arrival, and if the user is in his or her 80s, the receiver may delay the estimated time of arrival.

The receiver 200 may change the destination depending on the user even when the same digital signage, which is the transmitter 100, is captured at the start of navigation. For example, when the destination is a bathroom, the receiver 200 may change the position of the bathroom depending on the sex of the user, and may change the destination to either an immigration counter or re-entry counter depending on the nationality of the user. Alternatively, when the destination is a boarding point for a train or airplane, the receiver 200 may change the boarding point depending on the ticket held by the user. Moreover, when the destination is a seat at a show, the receiver 200 may change the destination based on the ticket held by the user. Moreover, when the destination is a prayer space, the receiver 200 may change the destination based on the religion of the user.

When the navigation begins, rather than immediately beginning the navigation, the receiver 200 may display a dialog stating, for example, "Start navigation to XYZ? Yes/No". The receiver 200 may also ask the user where the destination is (for example, a boarding gate, lounge, or store).

When performing navigation, the receiver 200 may block notifications from other applications or incoming calls. This makes it possible to inhibit the navigation from being interrupted.

The receiver 200 may guide the user to a meeting place as the destination.

FIG. 226 illustrates a system configuration for performing navigation to a meeting place.

For example, a user having a receiver 200*a* and a user having a receiver 200*b* will meet at a meeting place. Note that the receiver 200*a* and the receiver 200*b* have the functions of the receiver 200 described above.

When a meeting such as described above will take place, the receiver 200*a* sends, to the server 300, the position obtained by self-position estimation, the number of receiver 200*a*, and the number of the meeting partner (i.e., the number of receiver 200*b*), like illustrated in (a) in FIG. 226. Note that the number may be a telephone number and may be any sort of identifying number so long as the receiver can be identified. Information other than a number may also be used.

Upon receiving the various information from the receiver 200*a*, the server 300 transmits the position of the receiver 200*a* and the number of the receiver 200*a* to the receiver 200*b*, as illustrated in (b) in FIG. 226. The server 300 then asks the receiver 200*b* whether it will accept an invitation to meet from the receiver 200*a*. Here, the user of the receiver 200*b* accepts the invitation by operating the receiver 200*b*. In other words, the receiver 200*b* notifies the server 300 that it acknowledges the meeting, as illustrated in (c) in FIG. 226. The receiver 200*b* then notifies the server 300 of the position of receiver 200*b* obtained through self-position estimation, as illustrated in (d) in FIG. 226.

As a result, the server 300 identifies the positions of receiver 200*a* and receiver 200*b*. The server 300 then sets a midpoint between the positions as the meeting place (i.e., the destination), and notifies the receiver 200*a* and the receiver 200*b* of paths to the meeting place. This implements AR navigation to the meeting place on the receiver 200*a* and receiver 200*b*. Note that in the above example, the midpoint between the positions of the receiver 200*a* and the receiver 200*b* is set as the destination, but some other location may be set as the destination. For example, from among a plurality of locations set as landmarks, a location having the shortest travel time may be set as the destination. Note that travel time is the estimated time from the receiver 200*a* and receiver 200*b* to that location.

This makes it possible to smoothly arrange a meeting.

Here, when the receiver 200*a* reaches the vicinity of the destination, the receiver 200*a* may superimpose an image on the normal captured image for identifying the user of the receiver 200*b*.

FIG. 227 is a diagram illustrating one example of a screen displayed on the display of receiver 200*a*.

For example, the server 300 is transmits the position of the receiver 200*b* to the receiver 200*a* at regular intervals. The position of the receiver 200*b* is a position obtained by self-position estimation performed by receiver 200*b*. Accordingly, the receiver 200*a* can know the position of the receiver 200*b* on the map. Then, when the receiver 200*a* shows the position of the receiver 200*b* on the normal captured image, an arrow 433 indicating that position may be superimposed on the normal captured image, as illustrated in FIG. 227. Note that just like the receiver 200*a*, the receiver 200*b* may also superimpose an arrow indicating the position of the receiver 200*a* on the normal captured image.

This makes it possible to easily find the meeting partner even when there are many people at the meeting place.

Note that in the above example, an indicator, such as the arrow 433, is used for the meeting, but such an indicator may be used for purposes other than a meeting. When the user of the receiver 200*b* needs assistance in some regard to the destination, regardless of whether it pertains to a meeting or not, the user may notify this to the server 300 by operating the receiver 200*b*. In such cases, the server 300 may display, on the display of the receiver 200*a* possessed by an employee of a call center, the image illustrated in the example in FIG. 227. At this time, the server 300 may display a question mark instead of the arrow 433. With this, the employee of the call center can easily confirm that the user of the receiver 200*b* is needs assistance.

The receiver 200 may perform guidance inside of a concert hall.

FIG. 228 illustrates the inside of a concert hall.

The receiver 200 may obtain, from a server, a map of the inside of the concert hall illustrated in FIG. 228, for example, and a path 434 from an entrance of the concert hall to a seat. For example, the receiver 200 estimates the self-position by receiving a visible light signal from a transmitter 100 disposed at the entrance and guides the user to the user's seat along the path 434. Here, if there are stairs inside in the concert hall, the receiver 200 identifies how many steps the user climbed up or down based on the output from, for example, the acceleration sensor, and updates the self-position based on the identified number of steps.

In the above example, when the receiver 200 does not receive the visible light signal, the self-position estimation is performed based on the movement of feature points, but when feature points cannot be detected in the normal captured image, the output from the acceleration sensor may be used. More specifically, when the receiver 200 can detect feature points in the normal captured image, the receiver 200 estimates travel distance as described above, and learns the relationship between the travel distance and the output data from the acceleration sensor while traveling. The learning may use, for example, machine learning such as DNN (Deep Neural Network). When the receiver 200 becomes unable to detect feature points, the learning result and the output data from the acceleration sensor while traveling may be used to derive the travel distance. Alternatively, when the receiver 200 becomes unable to detect feature points, the receiver 200 may assume that the receiver 200 is traveling at the same speed as the immediately previous travel speed, and derive the travel distance based on that assumption.

[First Aspect]

The communication method includes: determining whether an incline of a terminal is greater than a predetermined angle relative to a plane parallel to the ground; when smaller than the predetermined angle and capturing a subject that changes in luminance with a rear-facing camera, setting an exposure time of an image sensor of the rear-facing camera to a first exposure time; obtaining a decode target image by capturing the subject for the first exposure time using the image sensor; when a first signal transmitted by the subject can be decoded from the decode target image, decoding the first signal from the decode target image and obtaining a position specified by the first signal; and when a signal transmitted by the subject cannot be decoded from the decode target image, identifying a position related to a transmitter in a predetermined range from the position of the terminal, by using map information that is stored in the terminal and includes the positions of a plurality of transmitters, and the position of the terminal.

FIG. 229 is a flowchart illustrating one example of the communication method according to the first aspect of the present disclosure.

First, a terminal, which is the receiver 200, determines whether the incline of the terminal is greater than a predetermined angle relative to a plane parallel with the ground or not (Step SG21). Note that a plane parallel to the ground may be, for example, a horizontal plane. More specifically, the terminal determines whether the incline is greater than the predetermined angle or not by detecting the incline of the terminal using output data from an acceleration sensor. The incline is the incline of the front surface or the rear surface of the terminal.

When the incline of the terminal is determined to be greater than the predetermined angle and a subject that changes in luminance is being captured with the rear-facing camera (Yes in Step SG21), the exposure time of the image sensor of the rear-facing camera is set to the first exposure time (Step SG22). The terminal then obtains a decode target image by capturing the subject for the first exposure time using the image sensor (Step SG23).

Here, since the obtained decode target image is an image that is obtained when the incline of the terminal is greater than the predetermined angle relative to a plane parallel to the ground, it is not an image obtained by capturing a subject toward the ground. Accordingly, it is highly likely that the capturing of the decode target image is performed to capture, as the subject, a transmitter 100 capable of transmitting a visible light signal, such as a lighting apparatus disposed on the ceiling or digital signage disposed on a wall. Stated differently, in the capturing of the decode target image, it is unlikely that reflected light from the transmitter 100 is captured as the subject. Accordingly, a decode target image that highly likely captures transmitter 100 as the subject can be properly obtained. In other words, as indicated in FIG. 214 and Step S353 in FIG. 215, it is possible to properly determine whether what is captured is reflected light from the floor or a wall, or direct light from the transmitter 100.

Next, the terminal determines whether a first signal transmitted by the subject can be decoded from the decode target image (Step SG24). When the first signal can be decoded (Yes in Step SG24), the terminal decodes the first signal from the decode target image (Step SG25), and obtains the position specified by the first signal (Step SG26). However, when the signal transmitted by the subject cannot be decoded from the decode target image (No in Step SG24), the terminal identifies a position related to a transmitter in a predetermined range from the position of the terminal, by using map information that is stored in the terminal and includes the positions of a plurality of transmitters, and the position of the terminal (Step SG27).

With this, as illustrated in Steps S344 through S348 in FIG. 213, for example, regardless of whether it is possible or not to receive the first signal, which is the visible light signal, it is possible to identify the position of the transmitter, which is the subject. As a result, it is possible to properly estimate the current self-position of the terminal.

[Second Aspect]

According to a second aspect of the communication method, in the first communication method, the first exposure time is set so that a bright line corresponding to a plurality of exposure lines included in the image sensor appears in the decode target image.

With this, it is possible to properly decode the first signal from the decode target image.

[Third Aspect]

According to a third aspect of the communication method, in the first aspect of the communication method, the subject is reflected light, which is light from a first transmitter that transmits a signal by changing in luminance that has reflected off a floor surface.

With this, even when the decode target image is obtained by capturing reflected light and the first signal cannot be decoded from the decode target image, it is possible to identify the position of the first transmitter.

[Fourth Aspect]

According to a fourth aspect of the communication method, in the first aspect of the communication method, a plurality of normal images are obtained by setting an exposure time of the image sensor in the rear-facing camera to a second exposure time longer than the first exposure time and performing capturing for the second exposure time, a plurality of spatial feature quantities are calculated from the plurality of normal images, and the position of the terminal is calculated by using the plurality of spatial feature quantities.

Note that the normal image is the normal captured image described above.

With this, as illustrated in (c) and (d) in FIG. 212, it is possible to properly estimate the current self-position of the terminal from the plurality of normal images, even for a terminal to which GPS data cannot reach, such as a terminal that is in an underground shopping center. Note that the spatial feature quantity may be a feature point.

[Fifth Aspect]

According to a fifth aspect of the communication method, in the fourth aspect of the communication method, the decode target image is obtained by capturing a second transmitter for the first exposure time, a second signal transmitted by the second transmitter is decoded from the decode target image, a position specified by the second signal is obtained, the position specified by the second signal is taken as a travel start position in the map information, and the position of the terminal is identified by calculating a travel amount of the terminal by using the plurality of the spatial feature quantities.

With this, it is possible to perform self-position estimation more precisely, since the position of the terminal is identified based on an amount of travel from the starting point, which is the travel start position illustrated in (a) in FIG. 212.

Although exemplary embodiments have been described above, the scope of the claims of the present application is not limited to those embodiments. Without departing from novel teaching and advantages of subject matters described in the appended claims, various modifications may be made to the above embodiments, and elements in the above embodiments may be arbitrarily combined to achieve another embodiment, which is readily understood by a person skilled in the art. Therefore, such modifications and other embodiments are also included in the present disclosure.

INDUSTRIAL APPLICABILITY

The communication method according to the present disclosure achieves the advantageous effect that it is possible to perform communication between various types of devices, and is applicable in, for example, display apparatuses, such as smartphones, smart glasses, and tablets.

The invention claimed is:

1. A communication method which uses a terminal including an image sensor, the communication method comprising:

determining whether the terminal is capable of performing visible light communication;

when the terminal is determined to be capable of performing the visible light communication, obtaining a decode target image by the image sensor capturing a subject whose luminance changes, and obtaining, from a striped pattern appearing in the decode target image, first identification information transmitted by the subject; and when the terminal is determined to be incapable of performing the visible light communication in the determining pertaining to the visible light communication, obtaining a captured image by the image sensor capturing the subject, extracting at least one contour by performing edge detection on the captured image, specifying a specific region from among the at least one contour, and obtaining, from a line pattern in the specific region, second identification information transmitted by the subject, the specific region being predetermined.

2. The communication method according to claim 1, wherein in the specifying of the specific region, a region including a quadrilateral contour of at least a predetermined size or a region including a rounded quadrilateral contour of at least a predetermined size is specified as the specific region.

3. The communication method according to claim 1, wherein in the determining pertaining to the visible light communication, the terminal is determined to be capable of performing the visible light communication when the terminal is identified as a terminal capable of changing an exposure time to or below a predetermined value, and the terminal is determined to be incapable of performing the visible light communication when the terminal is identified as a terminal incapable of changing the exposure time to or below the predetermined value.

4. The communication method according to claim 1, wherein when the terminal is determined to be capable of performing the visible light communication in the determining pertaining to the visible light communication, an exposure time of the image sensor is set to a first exposure time when capturing the subject, and the decode target image is obtained by capturing the subject for the first exposure time, when the terminal is determined to be incapable of performing the visible light communication in the determining pertaining to the visible light communication, the exposure time of the image sensor is set to a second exposure time when capturing the subject, and the captured image is obtained by capturing the subject for the second exposure time, and the first exposure time is shorter than the second exposure time.

5. The communication method according to claim 4, wherein the subject is rectangular from a viewpoint of the image sensor, the first identification information is transmitted by a central region of the subject changing in luminance, and a barcode-style line pattern is disposed at a periphery of the subject, when the terminal is determined to be capable of performing the visible light communication in the determining pertaining to the visible light communication, the decode target image including a bright line pattern of a plurality of bright lines corresponding to a plurality of exposure lines of the image sensor is obtained when capturing the subject, and the first identification information is obtained by decoding the bright line pattern, and when the terminal is determined to be incapable of performing the visible light communication in the determining pertaining to the visible light communication, the second identification information is obtained from the line pattern in the captured image when capturing the subject.

6. The communication method according to claim 5, wherein the first identification information obtained from the decode target image and the second identification information obtained from the line pattern are the same information.

7. The communication method according to claim 1, wherein when the terminal is determined to be capable of performing the visible light communication in the determining pertaining to the visible light communication, a first video associated with the first identification information is displayed, and upon receipt of a gesture that slides the first video, a second video associated with the first identification information is displayed after the first video.

8. The communication method according to claim 7, wherein in the displaying of the second video, the second video is displayed upon receipt of a gesture that slides the first video laterally, and a still image associated with the first identification information is displayed upon receipt of a gesture that slides the first video vertically.

9. The communication method according to claim 8, wherein an object is located in the same position in an initially displayed picture in the first video and in an initially displayed picture in the second video.

10. The communication method according to claim 7, wherein when reacquiring the first identification information by capturing by the image sensor, a subsequent video associated with the first identification information is displayed after a currently displayed video.

11. The communication method according to claim 10, wherein an object is located in the same position in an initially displayed picture in the currently displayed video and in an initially displayed picture in the subsequent video.

12. The communication method according to claim 11, wherein a transparency of a region of at least one of the first video and the second video increases with proximity to an edge of the video.

13. The communication method according to claim 12, wherein an image is displayed outside a region in which at least one of the first video and the second video is displayed.

14. The communication method according to claim 7, wherein a normal captured image is obtained by capturing by the image sensor for a first exposure time, the decode target image including a bright line pattern region is obtained by capturing by the image sensor for a second exposure time shorter than the first exposure time, and the first identification information is obtained by decoding the decode target image, the bright line pattern region being a region of a pattern of a plurality of bright lines, in at least one of the displaying of the first video or the displaying of the second video, a reference region located in the same position as the bright line pattern region is located in the decode target image is identified in the normal captured image, and a region in which the video is to be superimposed is recognized as a target region in the normal captured image based on the reference region, and the video is superimposed in the target region.

15. The communication method according to claim 14, wherein in at least one of the displaying of the first video or the displaying of the second video, a region above, below, left, or right of the reference region is recognized as the target region in the normal captured image.

16. The communication method according to claim 14, wherein in at least one of the displaying of the first video or the displaying of the second video, a size of the video is increased with an increase in a size of the bright line pattern region.

17. A communication device which uses a terminal including an image sensor, the communication device comprising:

a determining unit configured to determine whether the terminal is capable of performing the visible light communication;

a first obtaining unit configured to, when the determining unit determines that the terminal is capable of performing the visible light communication, obtain a decode target image by the image sensor capturing a subject whose luminance changes, and obtain, from a striped pattern appearing in the decode target image, first identification information transmitted by the subject; and a second obtaining unit configured to, when the determining unit determines that the terminal is incapable of performing the visible light communication, obtain a captured image by the image sensor capturing the subject, extract at least one contour by performing edge detection on the captured image, specify a specific region from among the at least one contour, and obtain, from a line pattern in the specific region, second identification information transmitted by the subject, the specific region being predetermined.

18. A non-transitory computer-readable recording medium having recorded thereon a computer program for executing a communication method which uses a terminal including an image sensor, the computer program causing the computer to execute:

determining whether the terminal is capable of performing visible light communication;

when the terminal is determined to be capable of performing the visible light communication, obtaining a decode target image by the image sensor capturing a subject whose luminance changes, and obtaining, from a striped pattern appearing in the decode target image, first identification information transmitted by the subject; and when the terminal is determined to be incapable of performing the visible light communication in the determining pertaining to the visible light communication, obtaining a captured image by the image sensor capturing the subject, extracting at least one contour by performing edge detection on the captured image, specifying a specific region from among the at least one contour, and obtaining, from a line pattern in the specific region, second identification information transmitted by the subject, the specific region being predetermined.

* * * * *